(12) United States Patent
Guzman et al.

(10) Patent No.: US 12,045,014 B2
(45) Date of Patent: Jul. 23, 2024

(54) USER INTERFACES FOR INDICATING TIME

(71) Applicant: Apple Inc., Cupertino, CA (US)

(72) Inventors: Aurelio Guzman, San Jose, CA (US);
Kevin W. Chen, Cupertino, CA (US);
Lynnette L. Galloway, Emeryville, CA (US); Andre R. Jointe, Woodland Hills, CA (US); Gilbert E. Kuruneri, San Francisco, CA (US); Michael T. Nartey, San Jose, CA (US); Oladapo Onikuyide, San Francisco, CA (US); Shedrick W. Turner, Jr., Lithonia, GA (US); Noah A. Witherspoon, San Francisco, CA (US); Pani Page, Las Vegas, NV (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/949,081

(22) Filed: Sep. 20, 2022

(65) Prior Publication Data
US 2023/0236549 A1 Jul. 27, 2023

Related U.S. Application Data

(60) Provisional application No. 63/349,116, filed on Jun. 5, 2022, provisional application No. 63/332,998, filed
(Continued)

(51) Int. Cl.
*G04G 9/00* (2006.01)
*G04B 19/26* (2006.01)
(Continued)

(52) U.S. Cl.
CPC .......... *G04B 19/268* (2013.01); *G04G 9/007* (2013.01); *G04G 9/02* (2013.01); *G04G 9/10* (2013.01);
(Continued)

(58) Field of Classification Search
CPC .......... G04G 21/02; G04G 9/02; G04G 9/007; G04G 21/08; G04G 9/10; G04G 9/12; G04B 19/268
See application file for complete search history.

(56) References Cited

U.S. PATENT DOCUMENTS 872,200 A * 11/1907 Rowe .................. G04B 19/305
362/384
898,910 A    9/1908 Mcclain
(Continued)

FOREIGN PATENT DOCUMENTS

AU    2010249319 A1    6/2012
AU    2015101019 A4    9/2015
(Continued)

OTHER PUBLICATIONS

Applicant-Initiated Interview Summary received for U.S. Appl. No. 17/556,165, mailed on Oct. 28, 2022, 4 pages.
(Continued)

*Primary Examiner* — Sean Kayes
(74) *Attorney, Agent, or Firm* — DLA Piper LLP (US)

(57) ABSTRACT

The present disclosure generally relates to methods and user interfaces for providing clock user interfaces. In some embodiments, methods and user interfaces for providing clock user interfaces displaying simulated emitted light, methods and user interfaces for displaying clock user interfaces including astronomical object, methods and user interfaces for displaying clock user interfaces that include adjustable time indications, methods and user interfaces for displaying clock user interfaces that include multiple calendar systems, methods and user interfaces for displaying clock user interfaces including animated numerals, methods and user interfaces for displaying clock user interfaces with colors that are based on a selected color, and/or methods and
(Continued)

user interfaces for displaying clock user interfaces including animated lines are described.

69 Claims, 64 Drawing Sheets

Related U.S. Application Data on Apr. 20, 2022, provisional application No. 63/302,272, filed on Jan. 24, 2022.

(51) Int. Cl.
*G04G 9/02* (2006.01)
*G04G 9/10* (2006.01)
*G04G 9/12* (2006.01)
*G04G 21/02* (2010.01)
*G04G 21/08* (2010.01)
*G06F 3/0362* (2013.01)
*G06F 3/04845* (2022.01)
*G06F 3/0482* (2013.01)

(52) U.S. Cl.
CPC ............ *G04G 9/12* (2013.01); *G04G 21/02* (2013.01); *G04G 21/08* (2013.01); *G06F 3/0362* (2013.01); *G06F 3/04845* (2013.01); *G06F 3/0482* (2013.01)

(56) References Cited

U.S. PATENT DOCUMENTS

| | | |
|---|---|---|
| 3,148,500 A | 9/1964 | Thomas |
| 3,633,354 A | 1/1972 | Stemmler |
| 4,205,628 A | 6/1980 | Null |
| 4,355,380 A | 10/1982 | Huguenin et al. |
| 4,597,674 A | 7/1986 | Thompson, III |
| 4,847,819 A | 7/1989 | Hong |
| 4,945,521 A | 7/1990 | Klaus |
| 5,124,959 A | 6/1992 | Yamazaki et al. |
| 5,208,790 A | 5/1993 | Sato et al. |
| 5,220,541 A | 6/1993 | Vuilleumier |
| 5,383,165 A | 1/1995 | Vaucher |
| 5,455,808 A | 10/1995 | Grupp et al. |
| 5,500,835 A | 3/1996 | Born |
| 5,508,979 A | 4/1996 | Eisenegger |
| 5,659,693 A | 8/1997 | Hansen et al. |
| 5,825,353 A | 10/1998 | Will |
| 5,845,257 A * | 12/1998 | Fu .................... G06Q 10/1095 368/21 |
| 5,892,519 A | 4/1999 | Hirai et al. |
| 5,986,655 A | 11/1999 | Chiu et al. |
| 5,999,195 A | 12/1999 | Santangeli |
| 6,043,818 A | 3/2000 | Nakano et al. |
| 6,084,598 A | 7/2000 | Chekerylla |
| 6,128,012 A | 10/2000 | Seidensticker et al. |
| 6,160,767 A | 12/2000 | Ho |
| 6,279,018 B1 | 8/2001 | Kudrolli et al. |
| 6,297,795 B1 | 10/2001 | Kato et al. |
| 6,353,449 B1 | 3/2002 | Gregg et al. |
| 6,359,839 B1 | 3/2002 | Schenk et al. |
| 6,441,824 B2 | 8/2002 | Hertzfeld et al. |
| 6,449,219 B1 | 9/2002 | Hepp et al. |
| 6,452,597 B1 | 9/2002 | Goldberg et al. |
| 6,477,117 B1 | 11/2002 | Narayanaswami et al. |
| 6,496,780 B1 | 12/2002 | Harris et al. |
| 6,525,997 B1 | 2/2003 | Narayanaswami et al. |
| 6,539,243 B1 | 3/2003 | Kimura et al. |
| 6,539,343 B2 | 3/2003 | Zhao et al. |
| 6,549,218 B1 | 4/2003 | Gershony et al. |
| 6,556,222 B1 | 4/2003 | Narayanaswami |
| 6,690,623 B1 | 2/2004 | Maano |
| 6,728,533 B2 | 4/2004 | Ishii et al. |
| 6,806,893 B1 | 10/2004 | Kolawa et al. |
| 6,809,724 B1 | 10/2004 | Shiraishi et al. |
| 6,871,076 B2 | 3/2005 | Samn et al. |
| 7,036,025 B2 | 4/2006 | Hunter |
| 7,113,809 B2 | 9/2006 | Noesgaard et al. |
| 7,203,380 B2 | 4/2007 | Chiu et al. |
| 7,257,254 B2 | 8/2007 | Tunney et al. |
| 7,302,650 B1 | 11/2007 | Allyn et al. |
| 7,378,954 B2 | 5/2008 | Wendt et al. |
| 7,479,949 B2 | 1/2009 | Jobs et al. |
| 7,515,509 B2 | 4/2009 | Klein et al. |
| 7,515,903 B1 | 4/2009 | Cast |
| 7,619,615 B1 | 11/2009 | Donoghue et al. |
| 7,637,204 B2 | 12/2009 | Sumser et al. |
| 7,716,057 B2 | 5/2010 | Horvitz |
| 7,751,285 B1 | 7/2010 | Cain et al. |
| 7,773,460 B2 | 8/2010 | Holt |
| 7,843,769 B2 | 11/2010 | Ishida et al. |
| 7,898,542 B1 | 3/2011 | Yu et al. |
| 7,907,476 B2 | 3/2011 | Lee |
| 8,041,968 B2 | 10/2011 | Tupman |
| 8,046,617 B2 | 10/2011 | Fleck et al. |
| 8,238,876 B2 | 8/2012 | Teng et al. |
| 8,245,143 B2 | 8/2012 | Yach et al. |
| 8,364,855 B2 | 1/2013 | James et al. |
| 8,405,663 B2 | 3/2013 | Wikkerink et al. |
| 8,462,997 B2 | 6/2013 | Soldan et al. |
| 8,595,649 B2 | 11/2013 | Sherrard et al. |
| 8,635,475 B2 | 1/2014 | Lin et al. |
| 8,725,842 B1 | 5/2014 | Al-Nasser |
| 8,768,648 B2 | 7/2014 | Panther et al. |
| 8,775,844 B1 | 7/2014 | Peterson |
| 8,847,903 B2 | 9/2014 | Stokes et al. |
| 8,854,925 B1 | 10/2014 | Lee et al. |
| 8,924,894 B1 | 12/2014 | Yaksick et al. |
| 8,938,394 B1 | 1/2015 | Faaborg et al. |
| 8,948,819 B2 | 2/2015 | Yun et al. |
| 8,963,894 B2 | 2/2015 | Klassen et al. |
| 9,070,092 B2 | 6/2015 | Shieh et al. |
| 9,082,314 B2 | 7/2015 | Tsai |
| 9,141,270 B1 | 9/2015 | Stuart et al. |
| 9,152,211 B2 | 10/2015 | Gunn et al. |
| 9,152,212 B2 | 10/2015 | Gunn |
| 9,171,268 B1 | 10/2015 | Penilla et al. |
| 9,173,052 B2 | 10/2015 | Hauser et al. |
| 9,197,738 B2 | 11/2015 | Peev et al. |
| 9,237,855 B2 | 1/2016 | Hong et al. |
| 9,239,605 B1 | 1/2016 | Nanda et al. |
| 9,259,615 B2 | 2/2016 | Weast et al. |
| 9,292,310 B2 | 3/2016 | Chaudhri et al. |
| 9,369,537 B1 | 6/2016 | Mathew et al. |
| 9,377,762 B2 | 6/2016 | Hoobler et al. |
| 9,436,269 B2 | 9/2016 | Yang |
| 9,448,685 B1 | 9/2016 | Somin et al. |
| 9,459,781 B2 | 10/2016 | Kocienda et al. |
| 9,542,070 B2 | 1/2017 | Xu et al. |
| 9,547,425 B2 | 1/2017 | Kocienda et al. |
| 9,557,806 B2 | 1/2017 | Väyrynen |
| 9,568,891 B2 | 2/2017 | Adams et al. |
| 9,582,165 B2 | 2/2017 | Wilson et al. |
| 9,594,354 B1 | 3/2017 | Kahn et al. |
| 9,600,178 B2 | 3/2017 | Yun et al. |
| 9,606,695 B2 | 3/2017 | Matas |
| 9,625,987 B1 | 4/2017 | Lapenna et al. |
| 9,753,436 B2 | 9/2017 | Ely et al. |
| 9,756,172 B2 | 9/2017 | Piemonte et al. |
| 9,794,397 B2 | 10/2017 | Min et al. |
| 9,939,872 B2 | 4/2018 | Graham et al. |
| 10,019,599 B1 | 7/2018 | Moran et al. |
| 10,062,133 B1 | 8/2018 | Mishra et al. |
| 10,268,432 B2 | 4/2019 | Kyung |
| 10,282,078 B2 | 5/2019 | Choi |
| 10,304,347 B2 | 5/2019 | Wilson et al. |
| 10,317,977 B2 | 6/2019 | Yang |
| 10,356,070 B2 | 7/2019 | Cha et al. |
| 10,459,887 B1 | 10/2019 | Dvortsov et al. |
| 10,489,508 B2 | 11/2019 | Zhai et al. |
| 10,620,590 B1 * | 4/2020 | Guzman ............ G06F 3/04817 |
| 10,643,246 B1 | 5/2020 | Suprasadachandran Pillai |
| 10,684,592 B2 | 6/2020 | Chang et al. |
| 10,721,711 B2 | 7/2020 | Kirov et al. |

(56) References Cited

U.S. PATENT DOCUMENTS

| | | |
|---|---|---|
| 10,761,702 B2 | 9/2020 | Block et al. |
| 10,788,797 B1 | 9/2020 | Guzman et al. |
| 10,807,005 B2 | 10/2020 | Dugan et al. |
| 10,817,981 B1 | 10/2020 | Belkin |
| 10,852,905 B1 | 12/2020 | Guzman et al. |
| 10,878,782 B1 | 12/2020 | Guzman et al. |
| 10,908,559 B1 | 2/2021 | Guzman et al. |
| 10,936,345 B1 | 3/2021 | Guzman et al. |
| 11,009,833 B2 | 5/2021 | Essery |
| 11,023,090 B2 | 6/2021 | Xu et al. |
| 11,050,873 B2 | 6/2021 | Kim et al. |
| 11,061,372 B1 | 7/2021 | Chen et al. |
| 11,435,887 B1 | 9/2022 | Mirho et al. |
| 11,694,590 B2 | 7/2023 | Connor et al. |
| 2002/0054066 A1 | 5/2002 | Kikinis et al. |
| 2002/0054157 A1 | 5/2002 | Hayashi et al. |
| 2002/0054541 A1 | 5/2002 | Hall et al. |
| 2002/0059623 A1 | 5/2002 | Rodriguez et al. |
| 2002/0081976 A1 | 6/2002 | Fujisawa et al. |
| 2002/0098857 A1 | 7/2002 | Ishii |
| 2002/0099452 A1 | 7/2002 | Kawai |
| 2002/0131331 A1 | 9/2002 | Molander et al. |
| 2003/0002391 A1 | 1/2003 | Biggs et al. |
| 2003/0027621 A1 | 2/2003 | Libby et al. |
| 2003/0067497 A1 | 4/2003 | Pichon et al. |
| 2003/0107603 A1 | 6/2003 | Clapper |
| 2003/0135769 A1 | 7/2003 | Loughran |
| 2003/0140309 A1 | 7/2003 | Saito et al. |
| 2003/0164847 A1 | 9/2003 | Zaima et al. |
| 2003/0169306 A1 | 9/2003 | Makipaa et al. |
| 2003/0214885 A1 | 11/2003 | Powell et al. |
| 2003/0229900 A1 | 12/2003 | Reisman |
| 2004/0001105 A1 | 1/2004 | Chew et al. |
| 2004/0017733 A1 | 1/2004 | Sullivan |
| 2004/0021699 A1 | 2/2004 | Fildebrandt et al. |
| 2004/0047244 A1 | 3/2004 | Iino et al. |
| 2004/0066710 A1 | 4/2004 | Yuen et al. |
| 2004/0075699 A1 | 4/2004 | Franchi et al. |
| 2004/0075700 A1 | 4/2004 | Liu et al. |
| 2004/0083474 A1 | 4/2004 | Mckinlay et al. |
| 2004/0168107 A1 | 8/2004 | Sharp et al. |
| 2004/0181771 A1 | 9/2004 | Anonsen et al. |
| 2004/0192332 A1 | 9/2004 | Samn |
| 2004/0203342 A1 | 10/2004 | Sibecas et al. |
| 2004/0218472 A1 | 11/2004 | Narayanaswami et al. |
| 2004/0225966 A1 | 11/2004 | Besharat et al. |
| 2004/0243547 A1 | 12/2004 | Chhatrapati et al. |
| 2004/0266491 A1 | 12/2004 | Howard et al. |
| 2005/0041667 A1 | 2/2005 | Miller et al. |
| 2005/0052446 A1 | 3/2005 | Plut |
| 2005/0094492 A1* | 5/2005 | Rosevear ............... G04G 9/02 368/17 |
| 2005/0122543 A1 | 6/2005 | Walker |
| 2005/0124389 A1 | 6/2005 | Yang |
| 2005/0139852 A1 | 6/2005 | Chen et al. |
| 2005/0156873 A1 | 7/2005 | Walter et al. |
| 2005/0188856 A1 | 9/2005 | Sumser et al. |
| 2005/0190653 A1 | 9/2005 | Chen |
| 2005/0195173 A1 | 9/2005 | McKay |
| 2005/0198319 A1 | 9/2005 | Chan et al. |
| 2005/0200611 A1 | 9/2005 | Goto et al. |
| 2005/0261031 A1 | 11/2005 | Seo et al. |
| 2005/0278757 A1 | 12/2005 | Grossman et al. |
| 2006/0007785 A1 | 1/2006 | Fernandez et al. |
| 2006/0020904 A1 | 1/2006 | Aaltonen et al. |
| 2006/0035628 A1 | 2/2006 | Miller et al. |
| 2006/0085765 A1 | 4/2006 | Peterson et al. |
| 2006/0087502 A1 | 4/2006 | Karidis et al. |
| 2006/0092770 A1 | 5/2006 | Demas |
| 2006/0123362 A1 | 6/2006 | Keely |
| 2006/0166708 A1 | 7/2006 | Kim et al. |
| 2006/0214935 A1 | 9/2006 | Boyd et al. |
| 2006/0239640 A1 | 10/2006 | Watanabe et al. |
| 2006/0277469 A1 | 12/2006 | Chaudhri et al. |
| 2007/0004451 A1 | 1/2007 | Anderson |
| 2007/0006096 A1 | 1/2007 | Kim et al. |
| 2007/0021153 A1 | 1/2007 | Novak |
| 2007/0052851 A1 | 3/2007 | Ochs et al. |
| 2007/0055947 A1 | 3/2007 | Ostojic et al. |
| 2007/0057775 A1 | 3/2007 | O'reilly et al. |
| 2007/0094330 A1 | 4/2007 | Russell et al. |
| 2007/0101279 A1 | 5/2007 | Chaudhri et al. |
| 2007/0113181 A1 | 5/2007 | Blattner et al. |
| 2007/0146344 A1 | 6/2007 | Martin et al. |
| 2007/0192718 A1 | 8/2007 | Voorhees et al. |
| 2007/0211042 A1 | 9/2007 | Kim et al. |
| 2007/0213955 A1* | 9/2007 | Ishida .................. G04G 9/00 702/178 |
| 2007/0226653 A1 | 9/2007 | Moore et al. |
| 2007/0236475 A1 | 10/2007 | Wherry |
| 2007/0239754 A1 | 10/2007 | Schnitman et al. |
| 2007/0250772 A1 | 10/2007 | Milosevski |
| 2007/0261537 A1 | 11/2007 | Eronen et al. |
| 2007/0279190 A1 | 12/2007 | Lugt et al. |
| 2007/0287140 A1 | 12/2007 | Liebowitz |
| 2008/0005599 A1 | 1/2008 | Theocharous et al. |
| 2008/0071885 A1 | 3/2008 | Hardy et al. |
| 2008/0082930 A1 | 4/2008 | Omernick et al. |
| 2008/0095470 A1 | 4/2008 | Chao et al. |
| 2008/0098031 A1 | 4/2008 | Ducharme |
| 2008/0127268 A1 | 5/2008 | Bergeron et al. |
| 2008/0130421 A1 | 6/2008 | Akaiwa et al. |
| 2008/0143729 A1 | 6/2008 | Wyatt et al. |
| 2008/0150959 A1 | 6/2008 | Marui et al. |
| 2008/0151700 A1 | 6/2008 | Inoue et al. |
| 2008/0167834 A1 | 7/2008 | Herz et al. |
| 2008/0168396 A1 | 7/2008 | Matas et al. |
| 2008/0174606 A1 | 7/2008 | Rengarajan et al. |
| 2008/0186808 A1 | 8/2008 | Lee |
| 2008/0192021 A1 | 8/2008 | Lim et al. |
| 2008/0195961 A1 | 8/2008 | Bae et al. |
| 2008/0201438 A1 | 8/2008 | Mandre et al. |
| 2008/0201647 A1 | 8/2008 | Lagerstedt et al. |
| 2008/0215240 A1 | 9/2008 | Howard et al. |
| 2008/0246778 A1 | 10/2008 | Ham et al. |
| 2008/0247519 A1 | 10/2008 | Abella et al. |
| 2008/0270934 A1 | 10/2008 | Firebaugh et al. |
| 2009/0005882 A1 | 1/2009 | Boyer et al. |
| 2009/0012988 A1 | 1/2009 | Brown |
| 2009/0016168 A1 | 1/2009 | Smith |
| 2009/0016492 A1 | 1/2009 | Tsuchiya |
| 2009/0017800 A1 | 1/2009 | Middleton |
| 2009/0051327 A1 | 2/2009 | Bohne |
| 2009/0058821 A1 | 3/2009 | Chaudhri et al. |
| 2009/0059730 A1 | 3/2009 | Lyons et al. |
| 2009/0068984 A1 | 3/2009 | Burnett |
| 2009/0070675 A1 | 3/2009 | Li |
| 2009/0077497 A1 | 3/2009 | Cho et al. |
| 2009/0143114 A1 | 6/2009 | Vargas et al. |
| 2009/0146962 A1 | 6/2009 | Ahonen et al. |
| 2009/0158173 A1 | 6/2009 | Palahnuk et al. |
| 2009/0164923 A1 | 6/2009 | Ovi et al. |
| 2009/0178007 A1 | 7/2009 | Matas et al. |
| 2009/0178008 A1 | 7/2009 | Herz et al. |
| 2009/0183080 A1 | 7/2009 | Thakkar et al. |
| 2009/0199130 A1 | 8/2009 | Tsern et al. |
| 2009/0249247 A1 | 10/2009 | Tseng et al. |
| 2009/0259958 A1 | 10/2009 | Ban |
| 2009/0262088 A1 | 10/2009 | Moll-carrillo et al. |
| 2009/0264116 A1 | 10/2009 | Thompson et al. |
| 2009/0279392 A1 | 11/2009 | Scott et al. |
| 2009/0284389 A1 | 11/2009 | Klassen et al. |
| 2009/0287470 A1 | 11/2009 | Farnsworth et al. |
| 2009/0300146 A1 | 12/2009 | Park et al. |
| 2009/0300598 A1 | 12/2009 | Choi |
| 2009/0305732 A1 | 12/2009 | Marcellino et al. |
| 2009/0312059 A1 | 12/2009 | Pratt et al. |
| 2009/0319467 A1 | 12/2009 | Berg et al. |
| 2009/0327886 A1 | 12/2009 | Whytock et al. |
| 2009/0327897 A1 | 12/2009 | Serpico et al. |
| 2010/0015774 A1 | 1/2010 | Shimamune et al. |
| 2010/0016771 A1 | 1/2010 | Jardine et al. |
| 2010/0026640 A1 | 2/2010 | Kim et al. |
| 2010/0060586 A1 | 3/2010 | Pisula et al. |

(56) References Cited

U.S. PATENT DOCUMENTS

| | | |
|---|---|---|
| 2010/0062905 A1 | 3/2010 | Rottler et al. |
| 2010/0064255 A1 | 3/2010 | Rottler et al. |
| 2010/0069035 A1 | 3/2010 | Johnson |
| 2010/0081473 A1 | 4/2010 | Chatterjee et al. |
| 2010/0085203 A1 | 4/2010 | Kahn et al. |
| 2010/0088597 A1 | 4/2010 | Shin et al. |
| 2010/0100841 A1 | 4/2010 | Shin et al. |
| 2010/0110082 A1 | 5/2010 | Myrick et al. |
| 2010/0124152 A1 | 5/2010 | Lee |
| 2010/0146437 A1 | 6/2010 | Woodcock et al. |
| 2010/0146463 A1 | 6/2010 | Cho et al. |
| 2010/0149573 A1 | 6/2010 | Pat et al. |
| 2010/0156833 A1 | 6/2010 | Kim et al. |
| 2010/0157742 A1 | 6/2010 | Relyea et al. |
| 2010/0167712 A1 | 7/2010 | Stallings et al. |
| 2010/0205563 A1 | 8/2010 | Haapsaari et al. |
| 2010/0217657 A1 | 8/2010 | Gazdzinski et al. |
| 2010/0218089 A1 | 8/2010 | Chao et al. |
| 2010/0223563 A1 | 9/2010 | Green |
| 2010/0225495 A1 | 9/2010 | Marui |
| 2010/0226213 A1 | 9/2010 | Drugge |
| 2010/0235726 A1 | 9/2010 | Ording et al. |
| 2010/0243516 A1 | 9/2010 | Martin et al. |
| 2010/0248688 A1 | 9/2010 | Teng et al. |
| 2010/0257469 A1 | 10/2010 | Kim et al. |
| 2010/0281374 A1 | 11/2010 | Schulz et al. |
| 2010/0289723 A1 | 11/2010 | London |
| 2010/0309149 A1 | 12/2010 | Blumenberg et al. |
| 2011/0000968 A1 | 1/2011 | Phillips et al. |
| 2011/0003665 A1 | 1/2011 | Burton et al. |
| 2011/0004835 A1 | 1/2011 | Yanchar et al. |
| 2011/0022294 A1 | 1/2011 | Apley |
| 2011/0025719 A1 | 2/2011 | Yanase et al. |
| 2011/0026368 A1 | 2/2011 | Relyea |
| 2011/0029870 A1 | 2/2011 | May et al. |
| 2011/0047014 A1 | 2/2011 | De |
| 2011/0061010 A1 | 3/2011 | Wasko et al. |
| 2011/0070924 A1 | 3/2011 | Kim et al. |
| 2011/0071818 A1 | 3/2011 | Jiang |
| 2011/0076992 A1 | 3/2011 | Chou et al. |
| 2011/0078624 A1 | 3/2011 | Missig et al. |
| 2011/0080411 A1 | 4/2011 | Wikkerink et al. |
| 2011/0083111 A1 | 4/2011 | Forutanpour et al. |
| 2011/0098928 A1 | 4/2011 | Hoffman et al. |
| 2011/0109540 A1 | 5/2011 | Milne et al. |
| 2011/0115721 A1 | 5/2011 | Li et al. |
| 2011/0119610 A1 | 5/2011 | Hackborn et al. |
| 2011/0138329 A1 | 6/2011 | Wells et al. |
| 2011/0151415 A1 | 6/2011 | Darling et al. |
| 2011/0157046 A1 | 6/2011 | Lee et al. |
| 2011/0166777 A1 | 7/2011 | Chavakula |
| 2011/0173221 A1 | 7/2011 | Ahiakpor et al. |
| 2011/0179372 A1 | 7/2011 | Moore et al. |
| 2011/0181521 A1 | 7/2011 | Reid et al. |
| 2011/0182151 A1 | 7/2011 | Geyer et al. |
| 2011/0191661 A1 | 8/2011 | Phillips et al. |
| 2011/0193878 A1 | 8/2011 | Seo et al. |
| 2011/0197165 A1 | 8/2011 | Filippov et al. |
| 2011/0202834 A1 | 8/2011 | Mandryk et al. |
| 2011/0202883 A1 | 8/2011 | Oh et al. |
| 2011/0205851 A1 | 8/2011 | Harris |
| 2011/0218765 A1 | 9/2011 | Rogers et al. |
| 2011/0230986 A1 | 9/2011 | Lafortune et al. |
| 2011/0234152 A1 | 9/2011 | Frossen et al. |
| 2011/0237221 A1 | 9/2011 | Prakash et al. |
| 2011/0248992 A1 | 10/2011 | Van et al. |
| 2011/0256848 A1 | 10/2011 | Bok et al. |
| 2011/0261079 A1 | 10/2011 | Ingrassia et al. |
| 2011/0275940 A1 | 11/2011 | Nims et al. |
| 2011/0281342 A1 | 11/2011 | Porsch et al. |
| 2011/0296324 A1 | 12/2011 | Goossens et al. |
| 2011/0306421 A1 | 12/2011 | Nishimoto et al. |
| 2011/0316858 A1 | 12/2011 | Shen et al. |
| 2011/0320938 A1 | 12/2011 | Schorsch et al. |
| 2012/0001922 A1 | 1/2012 | Escher et al. |
| 2012/0013552 A1 | 1/2012 | Ahn |
| 2012/0017180 A1 | 1/2012 | Flik et al. |
| 2012/0028707 A1 | 2/2012 | Raitt et al. |
| 2012/0036220 A1 | 2/2012 | Dare et al. |
| 2012/0047447 A1 | 2/2012 | Haq |
| 2012/0059787 A1 | 3/2012 | Brown et al. |
| 2012/0062470 A1 | 3/2012 | Chang et al. |
| 2012/0077554 A1 | 3/2012 | Ahn et al. |
| 2012/0079375 A1 | 3/2012 | Ogino et al. |
| 2012/0084729 A1 | 4/2012 | Lin et al. |
| 2012/0092383 A1 | 4/2012 | Hysek et al. |
| 2012/0110438 A1 | 5/2012 | Peraza et al. |
| 2012/0113762 A1 | 5/2012 | Frost |
| 2012/0116550 A1 | 5/2012 | Hoffman et al. |
| 2012/0117507 A1 | 5/2012 | Tseng et al. |
| 2012/0124499 A1 | 5/2012 | Tsai et al. |
| 2012/0150327 A1 | 6/2012 | Altman et al. |
| 2012/0154156 A1 | 6/2012 | Kuntzel |
| 2012/0182226 A1 | 7/2012 | Tuli |
| 2012/0197523 A1 | 8/2012 | Kirsch |
| 2012/0210263 A1 | 8/2012 | Perry et al. |
| 2012/0212495 A1 | 8/2012 | Butcher et al. |
| 2012/0218201 A1 | 8/2012 | Tamas et al. |
| 2012/0231849 A1 | 9/2012 | Yamashita et al. |
| 2012/0243735 A1 | 9/2012 | Wu et al. |
| 2012/0254804 A1 | 10/2012 | Sheha et al. |
| 2012/0254810 A1 | 10/2012 | Heck et al. |
| 2012/0288139 A1 | 11/2012 | Singhar |
| 2012/0297346 A1 | 11/2012 | Hoffknecht et al. |
| 2012/0304084 A1 | 11/2012 | Kim et al. |
| 2012/0319984 A1 | 12/2012 | Borovsky et al. |
| 2012/0320081 A1 | 12/2012 | Kim et al. |
| 2012/0323933 A1 | 12/2012 | He et al. |
| 2012/0324390 A1 | 12/2012 | Tao et al. |
| 2013/0007665 A1 | 1/2013 | Chaudhri et al. |
| 2013/0019175 A1 | 1/2013 | Kotler et al. |
| 2013/0021236 A1 | 1/2013 | Bender et al. |
| 2013/0030892 A1 | 1/2013 | Liu et al. |
| 2013/0044072 A1 | 2/2013 | Kobayashi et al. |
| 2013/0044080 A1 | 2/2013 | Chiang |
| 2013/0050263 A1 | 2/2013 | Khoe et al. |
| 2013/0055147 A1 | 2/2013 | Vasudev et al. |
| 2013/0057566 A1 | 3/2013 | Kriese et al. |
| 2013/0063084 A1 | 3/2013 | Tilvis et al. |
| 2013/0063383 A1 | 3/2013 | Anderssonreimer et al. |
| 2013/0069893 A1 | 3/2013 | Brinda et al. |
| 2013/0076757 A1 | 3/2013 | Pritting |
| 2013/0082965 A1 | 4/2013 | Wada et al. |
| 2013/0107674 A1 | 5/2013 | Gossweiler et al. |
| 2013/0111550 A1 | 5/2013 | Naveh et al. |
| 2013/0111579 A1 | 5/2013 | Newman et al. |
| 2013/0116967 A1 | 5/2013 | Akcasu et al. |
| 2013/0121119 A1 | 5/2013 | Umamoto |
| 2013/0132888 A1 | 5/2013 | Tijssen |
| 2013/0141371 A1 | 6/2013 | Hallford et al. |
| 2013/0143512 A1 | 6/2013 | Hernandez et al. |
| 2013/0147825 A1 | 6/2013 | Martin et al. |
| 2013/0157646 A1 | 6/2013 | Ferren et al. |
| 2013/0170324 A1 | 7/2013 | Tu et al. |
| 2013/0185813 A1 | 7/2013 | Shim et al. |
| 2013/0191785 A1 | 7/2013 | Wu et al. |
| 2013/0205194 A1 | 8/2013 | Decker et al. |
| 2013/0215044 A1 | 8/2013 | Ahn et al. |
| 2013/0222271 A1 | 8/2013 | Alberth et al. |
| 2013/0225152 A1 | 8/2013 | Matthews et al. |
| 2013/0232443 A1 | 9/2013 | Ryu et al. |
| 2013/0234964 A1 | 9/2013 | Kim et al. |
| 2013/0239060 A1 | 9/2013 | Kang et al. |
| 2013/0239063 A1 | 9/2013 | Ubillos et al. |
| 2013/0254705 A1 | 9/2013 | Mooring et al. |
| 2013/0305189 A1 | 11/2013 | Kim |
| 2013/0314204 A1 | 11/2013 | Ho et al. |
| 2013/0316763 A1 | 11/2013 | Kader |
| 2013/0318437 A1 | 11/2013 | Jung et al. |
| 2013/0318466 A1 | 11/2013 | Estrada et al. |
| 2013/0322218 A1 | 12/2013 | Burkhardt et al. |
| 2013/0326418 A1 | 12/2013 | Utsuki et al. |
| 2013/0332721 A1 | 12/2013 | Chaudhri et al. |
| 2013/0332856 A1 | 12/2013 | Sanders et al. |

(56) References Cited

U.S. PATENT DOCUMENTS

| | | |
|---|---|---|
| 2013/0345978 A1 | 12/2013 | Lush et al. |
| 2013/0345980 A1 | 12/2013 | Van Os et al. |
| 2014/0013414 A1 | 1/2014 | Bruck et al. |
| 2014/0013945 A1 | 1/2014 | Tanaka et al. |
| 2014/0022183 A1 | 1/2014 | Ayoub et al. |
| 2014/0037109 A1 | 2/2014 | Ban |
| 2014/0043367 A1 | 2/2014 | Sakaino et al. |
| 2014/0047389 A1 | 2/2014 | Aarabi |
| 2014/0047525 A1 | 2/2014 | Bonhoff |
| 2014/0055495 A1 | 2/2014 | Kim et al. |
| 2014/0059493 A1 | 2/2014 | Kim |
| 2014/0063049 A1 | 3/2014 | Armstrong-Muntner |
| 2014/0068755 A1 | 3/2014 | King et al. |
| 2014/0074570 A1 | 3/2014 | Hope et al. |
| 2014/0080465 A1 | 3/2014 | Cho |
| 2014/0082533 A1 | 3/2014 | Kelley et al. |
| 2014/0086123 A1 | 3/2014 | Deivasigamani et al. |
| 2014/0094224 A1 | 4/2014 | Lozovoy et al. |
| 2014/0101169 A1 | 4/2014 | Kurata et al. |
| 2014/0125620 A1 | 5/2014 | Panther et al. |
| 2014/0126336 A1 | 5/2014 | Goeller et al. |
| 2014/0129959 A1 | 5/2014 | Battles et al. |
| 2014/0135631 A1 | 5/2014 | Brumback et al. |
| 2014/0139454 A1 | 5/2014 | Mistry et al. |
| 2014/0139637 A1 | 5/2014 | Mistry et al. |
| 2014/0143678 A1 | 5/2014 | Mistry et al. |
| 2014/0143737 A1 | 5/2014 | Mistry et al. |
| 2014/0157189 A1 | 6/2014 | Morita |
| 2014/0157321 A1 | 6/2014 | Kurita et al. |
| 2014/0164907 A1 | 6/2014 | Jung et al. |
| 2014/0171132 A1 | 6/2014 | Ziemianska et al. |
| 2014/0173439 A1 | 6/2014 | Gutierrez et al. |
| 2014/0179272 A1 | 6/2014 | Zhang et al. |
| 2014/0189578 A1 | 7/2014 | Shuttleworth et al. |
| 2014/0189584 A1 | 7/2014 | Weng et al. |
| 2014/0195476 A1 | 7/2014 | Sxhmidt |
| 2014/0200691 A1 | 7/2014 | Lee et al. |
| 2014/0201655 A1 | 7/2014 | Mahaffey et al. |
| 2014/0210708 A1 | 7/2014 | Simmons et al. |
| 2014/0210801 A1 | 7/2014 | Li |
| 2014/0229752 A1 | 8/2014 | Lee et al. |
| 2014/0244009 A1 | 8/2014 | Mestas |
| 2014/0244165 A1 | 8/2014 | Bells et al. |
| 2014/0245161 A1 | 8/2014 | Yuen et al. |
| 2014/0245177 A1 | 8/2014 | Maklouf et al. |
| 2014/0250374 A1 | 9/2014 | Ohki et al. |
| 2014/0250391 A1 | 9/2014 | Jong et al. |
| 2014/0253487 A1 | 9/2014 | Bezinge et al. |
| 2014/0258935 A1 | 9/2014 | Nishida et al. |
| 2014/0267303 A1 | 9/2014 | Larkin et al. |
| 2014/0276244 A1 | 9/2014 | Kamyar |
| 2014/0282103 A1 | 9/2014 | Jerry |
| 2014/0282153 A1 | 9/2014 | Christiansen et al. |
| 2014/0282207 A1 | 9/2014 | Wouhaybi et al. |
| 2014/0282254 A1 | 9/2014 | Feiereisen et al. |
| 2014/0289660 A1 | 9/2014 | Min |
| 2014/0293755 A1 | 10/2014 | Geiser et al. |
| 2014/0302834 A1 | 10/2014 | Jones |
| 2014/0304664 A1 | 10/2014 | Lee et al. |
| 2014/0310350 A1 | 10/2014 | Borggaard et al. |
| 2014/0310618 A1 | 10/2014 | Venkatesh |
| 2014/0310643 A1 | 10/2014 | Karmanenko et al. |
| 2014/0317543 A1 | 10/2014 | Kim |
| 2014/0325384 A1 | 10/2014 | Kobayashi |
| 2014/0325408 A1 | 10/2014 | Leppanen et al. |
| 2014/0328151 A1 | 11/2014 | Serber |
| 2014/0331314 A1 | 11/2014 | Fujioka |
| 2014/0342792 A1 | 11/2014 | Markus |
| 2014/0344723 A1 | 11/2014 | Malik et al. |
| 2014/0344820 A1 | 11/2014 | Kumar |
| 2014/0344951 A1 | 11/2014 | Brewer |
| 2014/0347275 A1 | 11/2014 | Jung et al. |
| 2014/0359124 A1 | 12/2014 | Adimatyam et al. |
| 2014/0359477 A1 | 12/2014 | Chen |
| 2014/0362105 A1 | 12/2014 | Kocienda et al. |
| 2014/0365956 A1 | 12/2014 | Karunamuni et al. |
| 2014/0371887 A1 | 12/2014 | Hoffman et al. |
| 2014/0380229 A1 | 12/2014 | Volodin et al. |
| 2015/0011204 A1 | 1/2015 | Seo et al. |
| 2015/0015500 A1 | 1/2015 | Lee et al. |
| 2015/0019981 A1 | 1/2015 | Petitt et al. |
| 2015/0019982 A1 | 1/2015 | Petitt et al. |
| 2015/0022438 A1 | 1/2015 | Hong |
| 2015/0026615 A1 | 1/2015 | Choi et al. |
| 2015/0037545 A1 | 2/2015 | Sun |
| 2015/0042571 A1 | 2/2015 | Lombardi et al. |
| 2015/0043046 A1 | 2/2015 | Iwamoto |
| 2015/0049033 A1 | 2/2015 | Kim et al. |
| 2015/0052461 A1 | 2/2015 | Sullivan et al. |
| 2015/0055197 A1 | 2/2015 | Romanoff et al. |
| 2015/0058651 A1 | 2/2015 | Choi et al. |
| 2015/0061988 A1 | 3/2015 | Galu, Jr. |
| 2015/0062052 A1 | 3/2015 | Bernstein et al. |
| 2015/0062130 A1 | 3/2015 | Ho |
| 2015/0067596 A1 | 3/2015 | Brown et al. |
| 2015/0070378 A1 | 3/2015 | Kriese et al. |
| 2015/0071043 A1 | 3/2015 | Kubota |
| 2015/0081474 A1 | 3/2015 | Kostka et al. |
| 2015/0082193 A1 | 3/2015 | Wallace et al. |
| 2015/0082446 A1 | 3/2015 | Flowers et al. |
| 2015/0083970 A1 | 3/2015 | Koh et al. |
| 2015/0100621 A1 | 4/2015 | Pan |
| 2015/0105125 A1 | 4/2015 | Min et al. |
| 2015/0106221 A1 | 4/2015 | Tapley et al. |
| 2015/0106752 A1 | 4/2015 | Yang |
| 2015/0111558 A1 | 4/2015 | Yang |
| 2015/0112700 A1 | 4/2015 | Sublett et al. |
| 2015/0113468 A1 | 4/2015 | Clark |
| 2015/0117162 A1 | 4/2015 | Tsai et al. |
| 2015/0118657 A1 | 4/2015 | Shrake et al. |
| 2015/0128042 A1 | 5/2015 | Churchill et al. |
| 2015/0128078 A1 | 5/2015 | Oh et al. |
| 2015/0143234 A1 | 5/2015 | Norris, III |
| 2015/0160806 A1 | 6/2015 | Fey et al. |
| 2015/0160812 A1 | 6/2015 | Yuan et al. |
| 2015/0160856 A1 | 6/2015 | Jang et al. |
| 2015/0163210 A1 | 6/2015 | Meyers et al. |
| 2015/0172438 A1 | 6/2015 | Yang |
| 2015/0185703 A1 | 7/2015 | Tanaka |
| 2015/0185995 A1 | 7/2015 | Shoemaker et al. |
| 2015/0194137 A1 | 7/2015 | Wyatt |
| 2015/0205509 A1 | 7/2015 | Scriven et al. |
| 2015/0207922 A1 | 7/2015 | Kobayashi et al. |
| 2015/0217163 A1 | 8/2015 | Amis et al. |
| 2015/0220265 A1 | 8/2015 | Takahashi |
| 2015/0228048 A1 | 8/2015 | Heo et al. |
| 2015/0248235 A1 | 9/2015 | Offenberg et al. |
| 2015/0253736 A1 | 9/2015 | Watterson |
| 2015/0253740 A1 | 9/2015 | Nishijima et al. |
| 2015/0254875 A1 | 9/2015 | Zhang |
| 2015/0261284 A1 | 9/2015 | Lee et al. |
| 2015/0277545 A1 | 10/2015 | Flowers et al. |
| 2015/0286372 A1 | 10/2015 | Swindell et al. |
| 2015/0286391 A1 | 10/2015 | Jacobs et al. |
| 2015/0301506 A1 | 10/2015 | Koumaiha |
| 2015/0301608 A1 | 10/2015 | Nagaraju et al. |
| 2015/0302624 A1 | 10/2015 | Burke |
| 2015/0317945 A1 | 11/2015 | Andress et al. |
| 2015/0331589 A1 | 11/2015 | Kawakita |
| 2015/0339261 A1 | 11/2015 | Jha et al. |
| 2015/0346694 A1 | 12/2015 | Hoobler et al. |
| 2015/0346824 A1 | 12/2015 | Chen et al. |
| 2015/0355830 A1 | 12/2015 | Chaudhri et al. |
| 2015/0365892 A1 | 12/2015 | Ma et al. |
| 2015/0366518 A1 | 12/2015 | Sampson |
| 2015/0370469 A1 | 12/2015 | Leong et al. |
| 2015/0378592 A1 | 12/2015 | Kim |
| 2015/0379476 A1 | 12/2015 | Chaudhri et al. |
| 2016/0004393 A1 | 1/2016 | Faaborg et al. |
| 2016/0019360 A1 | 1/2016 | Pahwa et al. |
| 2016/0022202 A1 | 1/2016 | Peterson et al. |
| 2016/0027420 A1 | 1/2016 | Eronen |
| 2016/0034133 A1 | 2/2016 | Wilson et al. |
| 2016/0034148 A1 | 2/2016 | Wilson et al. |

(56) References Cited

U.S. PATENT DOCUMENTS

| | | |
|---|---|---|
| 2016/0034152 A1 | 2/2016 | Wilson et al. |
| 2016/0034166 A1 | 2/2016 | Wilson et al. |
| 2016/0034167 A1 | 2/2016 | Wilson et al. |
| 2016/0044091 A1 | 2/2016 | Doumet |
| 2016/0044442 A1 | 2/2016 | Pacelli et al. |
| 2016/0048161 A1 | 2/2016 | Carceroni et al. |
| 2016/0048283 A1 | 2/2016 | Yang et al. |
| 2016/0049106 A1 | 2/2016 | Connell et al. |
| 2016/0054710 A1 | 2/2016 | Jo et al. |
| 2016/0054892 A1 | 2/2016 | Kim et al. |
| 2016/0058336 A1 | 3/2016 | Blahnik et al. |
| 2016/0058337 A1 | 3/2016 | Blahnik et al. |
| 2016/0062450 A1 | 3/2016 | Han et al. |
| 2016/0062540 A1 | 3/2016 | Yang et al. |
| 2016/0062541 A1 | 3/2016 | Anzures et al. |
| 2016/0062570 A1 | 3/2016 | Dascola et al. |
| 2016/0062572 A1 | 3/2016 | Yang et al. |
| 2016/0062589 A1 | 3/2016 | Wan et al. |
| 2016/0062630 A1 | 3/2016 | Anzures et al. |
| 2016/0073034 A1 | 3/2016 | Mukherjee et al. |
| 2016/0085397 A1 | 3/2016 | Jain |
| 2016/0091867 A1 | 3/2016 | Mansour et al. |
| 2016/0098137 A1 | 4/2016 | Kim et al. |
| 2016/0103427 A1 | 4/2016 | Westra et al. |
| 2016/0134840 A1 | 5/2016 | Mcculloch |
| 2016/0142763 A1 | 5/2016 | Kim et al. |
| 2016/0165037 A1 | 6/2016 | Youn et al. |
| 2016/0165038 A1 | 6/2016 | Lim et al. |
| 2016/0170731 A1 | 6/2016 | Maddern et al. |
| 2016/0179353 A1 | 6/2016 | Iskander |
| 2016/0180568 A1 | 6/2016 | Bullivant et al. |
| 2016/0187995 A1 | 6/2016 | Rosewall |
| 2016/0188179 A1 | 6/2016 | Roh |
| 2016/0188181 A1 | 6/2016 | Smith |
| 2016/0189328 A1 | 6/2016 | Vranjes et al. |
| 2016/0191511 A1 | 6/2016 | Tijerina et al. |
| 2016/0192324 A1 | 6/2016 | Zhang et al. |
| 2016/0205244 A1 | 7/2016 | Dvortsov |
| 2016/0217601 A1 | 7/2016 | Tsuda et al. |
| 2016/0259518 A1 | 9/2016 | King et al. |
| 2016/0259656 A1 | 9/2016 | Sumner et al. |
| 2016/0261675 A1 | 9/2016 | Block et al. |
| 2016/0266548 A1 | 9/2016 | Akiyama |
| 2016/0283094 A1 | 9/2016 | Choi |
| 2016/0313869 A1 | 10/2016 | Jang et al. |
| 2016/0320756 A1 | 11/2016 | Lee et al. |
| 2016/0327911 A1 | 11/2016 | Eim et al. |
| 2016/0327915 A1 | 11/2016 | Katzer et al. |
| 2016/0332025 A1 | 11/2016 | Repka |
| 2016/0342327 A1 | 11/2016 | Chi et al. |
| 2016/0357151 A1 | 12/2016 | Block et al. |
| 2016/0357282 A1 | 12/2016 | Block et al. |
| 2016/0357354 A1 | 12/2016 | Chen et al. |
| 2016/0357386 A1 | 12/2016 | Choi |
| 2016/0357413 A1 | 12/2016 | Block et al. |
| 2016/0358311 A1 | 12/2016 | Chen et al. |
| 2017/0003659 A1 | 1/2017 | Nakanishi |
| 2017/0004798 A1 | 1/2017 | Park et al. |
| 2017/0011210 A1 | 1/2017 | Cheong et al. |
| 2017/0039535 A1 | 2/2017 | Park et al. |
| 2017/0040001 A1 | 2/2017 | Zhang et al. |
| 2017/0045993 A1 | 2/2017 | Oh et al. |
| 2017/0046024 A1 | 2/2017 | Dascola et al. |
| 2017/0046052 A1 | 2/2017 | Lee et al. |
| 2017/0053542 A1 | 2/2017 | Wilson et al. |
| 2017/0061934 A1 | 3/2017 | Shin |
| 2017/0068407 A1 | 3/2017 | Wilson et al. |
| 2017/0075305 A1 | 3/2017 | Ryu et al. |
| 2017/0075316 A1 | 3/2017 | Berdinis et al. |
| 2017/0082983 A1 | 3/2017 | Katzer et al. |
| 2017/0105081 A1 | 4/2017 | Jin et al. |
| 2017/0109011 A1 | 4/2017 | Jiang |
| 2017/0123571 A1 | 5/2017 | Huang et al. |
| 2017/0123640 A1 | 5/2017 | Wilson et al. |
| 2017/0127354 A1 | 5/2017 | Garland et al. |
| 2017/0134321 A1 | 5/2017 | Ushio et al. |
| 2017/0149795 A1 | 5/2017 | Day, II |
| 2017/0160898 A1 | 6/2017 | Lee et al. |
| 2017/0164292 A1 | 6/2017 | Santamaria et al. |
| 2017/0176950 A1 | 6/2017 | Jung et al. |
| 2017/0186399 A1 | 6/2017 | Moritani et al. |
| 2017/0209766 A1 | 7/2017 | Riley et al. |
| 2017/0212648 A1 | 7/2017 | Choi et al. |
| 2017/0230236 A1 | 8/2017 | Kim et al. |
| 2017/0236497 A1 | 8/2017 | Huitema et al. |
| 2017/0255169 A1 | 9/2017 | Lee et al. |
| 2017/0257426 A1 | 9/2017 | Wilbur et al. |
| 2017/0266494 A1 | 9/2017 | Crankson et al. |
| 2017/0269715 A1 | 9/2017 | Kim et al. |
| 2017/0269792 A1 | 9/2017 | Xu et al. |
| 2017/0277136 A1 | 9/2017 | Minami et al. |
| 2017/0286913 A1 | 10/2017 | Liu et al. |
| 2017/0287312 A1 | 10/2017 | Schofield et al. |
| 2017/0294174 A1 | 10/2017 | Albadawi et al. |
| 2017/0300013 A1 | 10/2017 | Satou et al. |
| 2017/0322658 A1 | 11/2017 | Lee et al. |
| 2017/0322711 A1 | 11/2017 | Robinson et al. |
| 2017/0325196 A1 | 11/2017 | Cho et al. |
| 2017/0329477 A1 | 11/2017 | Sachidanandam et al. |
| 2017/0337554 A1 | 11/2017 | Mokhasi et al. |
| 2017/0354845 A1 | 12/2017 | Williams et al. |
| 2017/0357329 A1 | 12/2017 | Park et al. |
| 2017/0357358 A1 | 12/2017 | Teutschler et al. |
| 2017/0357413 A1 | 12/2017 | Green |
| 2017/0357426 A1 | 12/2017 | Wilson et al. |
| 2017/0357427 A1 | 12/2017 | Wilson et al. |
| 2017/0357495 A1 | 12/2017 | Crane et al. |
| 2017/0371394 A1 | 12/2017 | Chan et al. |
| 2018/0011450 A1 | 1/2018 | Stackowski |
| 2018/0024619 A1 | 1/2018 | Kasuo et al. |
| 2018/0033311 A1 | 2/2018 | Berggren |
| 2018/0039232 A1 | 2/2018 | Abramov et al. |
| 2018/0052428 A1 | 2/2018 | Abramov |
| 2018/0059903 A1 | 3/2018 | Lim et al. |
| 2018/0061308 A1 | 3/2018 | Bae et al. |
| 2018/0067633 A1 | 3/2018 | Wilson et al. |
| 2018/0074462 A1 | 3/2018 | Helder et al. |
| 2018/0081515 A1 | 3/2018 | Block et al. |
| 2018/0088537 A1 | 3/2018 | Murai |
| 2018/0088733 A1 | 3/2018 | Syed et al. |
| 2018/0088797 A1 | 3/2018 | Mcatee et al. |
| 2018/0097925 A1 | 4/2018 | Ryu et al. |
| 2018/0120927 A1 | 5/2018 | Ma et al. |
| 2018/0121060 A1 | 5/2018 | Jeong et al. |
| 2018/0136810 A1 | 5/2018 | Martin et al. |
| 2018/0150212 A1 | 5/2018 | Chen et al. |
| 2018/0150443 A1 | 5/2018 | Singleton |
| 2018/0157452 A1 | 6/2018 | Nelson et al. |
| 2018/0174550 A1 | 6/2018 | Zhang et al. |
| 2018/0181078 A1 | 6/2018 | Imamura |
| 2018/0181381 A1 | 6/2018 | Michaely et al. |
| 2018/0188925 A1 | 7/2018 | Na et al. |
| 2018/0205675 A1 | 7/2018 | Koo et al. |
| 2018/0246635 A1 | 8/2018 | Baer et al. |
| 2018/0246639 A1 | 8/2018 | Han et al. |
| 2018/0260080 A1 | 9/2018 | Cho |
| 2018/0261183 A1 | 9/2018 | Gou et al. |
| 2018/0275739 A1 | 9/2018 | Minami et al. |
| 2018/0288560 A1 | 10/2018 | Naik et al. |
| 2018/0316783 A1 | 11/2018 | Ye et al. |
| 2018/0321842 A1 | 11/2018 | Lee et al. |
| 2018/0329587 A1 | 11/2018 | Ko et al. |
| 2018/0335927 A1 | 11/2018 | Anzures et al. |
| 2018/0341389 A1 | 11/2018 | Kim et al. |
| 2018/0343023 A1 | 11/2018 | Park et al. |
| 2018/0348844 A1 | 12/2018 | Lingutla et al. |
| 2018/0352435 A1 | 12/2018 | Donley et al. |
| 2018/0364648 A1 | 12/2018 | Chi et al. |
| 2018/0366068 A1 | 12/2018 | Liu et al. |
| 2018/0374429 A1 | 12/2018 | Nakamura |
| 2019/0018445 A1 | 1/2019 | Watanabe et al. |
| 2019/0050045 A1 | 2/2019 | Jha et al. |
| 2019/0069244 A1 | 2/2019 | Jeon et al. |
| 2019/0072909 A1 | 3/2019 | Misaki et al. |

(56) References Cited

U.S. PATENT DOCUMENTS

| | | |
|---|---|---|
| 2019/0079576 A1 | 3/2019 | Liu et al. |
| 2019/0121300 A1 | 4/2019 | Peterson et al. |
| 2019/0121523 A1 | 4/2019 | Block et al. |
| 2019/0139207 A1 | 5/2019 | Jeong et al. |
| 2019/0163142 A1 | 5/2019 | Chang et al. |
| 2019/0180221 A1 | 6/2019 | Greenberger et al. |
| 2019/0181078 A1* | 6/2019 | Yamamoto ........ H01L 23/49575 |
| 2019/0182749 A1 | 6/2019 | Breaux et al. |
| 2019/0212707 A1 | 7/2019 | Minami et al. |
| 2019/0213037 A1 | 7/2019 | Kim et al. |
| 2019/0235748 A1 | 8/2019 | Seol et al. |
| 2019/0237003 A1 | 8/2019 | Cao et al. |
| 2019/0250813 A1 | 8/2019 | Block et al. |
| 2019/0268771 A1 | 8/2019 | Seo et al. |
| 2019/0279520 A1 | 9/2019 | Wilson et al. |
| 2019/0281154 A1 | 9/2019 | Choi et al. |
| 2019/0302972 A1 | 10/2019 | Kline et al. |
| 2019/0324620 A1 | 10/2019 | Gu et al. |
| 2019/0339860 A1 | 11/2019 | Chen et al. |
| 2019/0340348 A1 | 11/2019 | Yu et al. |
| 2019/0349469 A1 | 11/2019 | Skogen et al. |
| 2020/0042311 A1 | 2/2020 | Shin |
| 2020/0050332 A1 | 2/2020 | Yang et al. |
| 2020/0068095 A1 | 2/2020 | Nabetani |
| 2020/0073122 A1 | 3/2020 | Rothkopf et al. |
| 2020/0089302 A1 | 3/2020 | Kim et al. |
| 2020/0110946 A1 | 4/2020 | Kline et al. |
| 2020/0125037 A1 | 4/2020 | Jo et al. |
| 2020/0133206 A1 | 4/2020 | Jo et al. |
| 2020/0175485 A1 | 6/2020 | Knock |
| 2020/0228646 A1 | 7/2020 | Hotes et al. |
| 2020/0242228 A1 | 7/2020 | Farraro et al. |
| 2020/0249632 A1 | 8/2020 | Olwal et al. |
| 2020/0264567 A1 | 8/2020 | Ok et al. |
| 2020/0319348 A1 | 10/2020 | Oshita et al. |
| 2020/0327862 A1 | 10/2020 | Sinha et al. |
| 2020/0342144 A1 | 10/2020 | Alameh et al. |
| 2020/0348827 A1 | 11/2020 | Wilson et al. |
| 2020/0356063 A1 | 11/2020 | Guzman et al. |
| 2020/0356224 A1 | 11/2020 | Wilson |
| 2020/0356242 A1 | 11/2020 | Wilson et al. |
| 2020/0356252 A1 | 11/2020 | Ko et al. |
| 2020/0356687 A1 | 11/2020 | Salzman et al. |
| 2020/0359204 A1 | 11/2020 | Hawkins et al. |
| 2020/0379413 A1 | 12/2020 | Chen et al. |
| 2020/0408521 A1 | 12/2020 | Lyons et al. |
| 2021/0042028 A1 | 2/2021 | Block et al. |
| 2021/0048929 A1 | 2/2021 | Agnoli et al. |
| 2021/0132780 A1 | 5/2021 | Kyung |
| 2021/0149694 A1 | 5/2021 | Guzman et al. |
| 2021/0201732 A1 | 7/2021 | Ranjan et al. |
| 2021/0216654 A1 | 7/2021 | Ko et al. |
| 2021/0294438 A1 | 9/2021 | Yang et al. |
| 2021/0349426 A1 | 11/2021 | Chen et al. |
| 2021/0349427 A1 | 11/2021 | Chen et al. |
| 2021/0349583 A1 | 11/2021 | Guzman et al. |
| 2021/0349611 A1 | 11/2021 | Chen et al. |
| 2021/0349741 A1 | 11/2021 | Guzman et al. |
| 2022/0157184 A1 | 5/2022 | Wilson et al. |
| 2022/0184309 A1 | 6/2022 | Rosinko et al. |
| 2022/0198984 A1 | 6/2022 | Connor et al. |
| 2022/0214785 A1 | 7/2022 | Giv |
| 2022/0221964 A1 | 7/2022 | Ko et al. |
| 2022/0229537 A1 | 7/2022 | Chen et al. |
| 2022/0236867 A1 | 7/2022 | Chen et al. |
| 2022/0276780 A1 | 9/2022 | Ko et al. |
| 2022/0342514 A1 | 10/2022 | Chao et al. |
| 2023/0004270 A1 | 1/2023 | Chen et al. |
| 2023/0004406 A1 | 1/2023 | Hu et al. |
| 2023/0008229 A1 | 1/2023 | Chen et al. |
| 2023/0035532 A1 | 2/2023 | Chen et al. |
| 2023/0071987 A1 | 3/2023 | Zeng et al. |
| 2023/0078153 A1 | 3/2023 | Yang et al. |
| 2023/0082876 A1 | 3/2023 | Guzman et al. |
| 2023/0236547 A1 | 7/2023 | Chen et al. |
| 2023/0236550 A1 | 7/2023 | Chen et al. |
| 2023/0282146 A1 | 9/2023 | Connor et al. |
| 2023/0350564 A1 | 11/2023 | Chen et al. |
| 2024/0045578 A1 | 2/2024 | Chen et al. |
| 2024/0053878 A1 | 2/2024 | Wilson et al. |

FOREIGN PATENT DOCUMENTS

| | | |
|---|---|---|
| AU | 2015101639 A4 | 12/2015 |
| AU | 2020239749 A1 | 11/2021 |
| CA | 2356232 A1 | 3/2002 |
| CA | 2781636 A1 | 7/2010 |
| CA | 2800123 C | 7/2016 |
| CA | 2986980 A1 | 5/2019 |
| CH | 707412 A2 | 6/2014 |
| CN | 1083229 A | 3/1994 |
| CN | 1337638 A | 2/2002 |
| CN | 1397904 A | 2/2003 |
| CN | 2602404 Y | 2/2004 |
| CN | 1536511 A | 10/2004 |
| CN | 1610866 A | 4/2005 |
| CN | 1997957 A | 7/2007 |
| CN | 101382438 A | 3/2009 |
| CN | 100492288 C | 5/2009 |
| CN | 101505320 A | 8/2009 |
| CN | 101627349 A | 1/2010 |
| CN | 101702112 A | 5/2010 |
| CN | 101819486 A | 9/2010 |
| CN | 101939740 A | 1/2011 |
| CN | 101981987 A | 2/2011 |
| CN | 202217134 U | 5/2012 |
| CN | 102681648 A | 9/2012 |
| CN | 102687176 A | 9/2012 |
| CN | 102750070 A | 10/2012 |
| CN | 103154954 A | 6/2013 |
| CN | 103191557 A | 7/2013 |
| CN | 103399480 A | 11/2013 |
| CN | 103544920 A | 1/2014 |
| CN | 103562832 A | 2/2014 |
| CN | 103607660 A | 2/2014 |
| CN | 103649897 A | 3/2014 |
| CN | 103902165 A | 7/2014 |
| CN | 103914238 A | 7/2014 |
| CN | 103973899 A | 8/2014 |
| CN | 203773233 U | 8/2014 |
| CN | 104281405 A | 1/2015 |
| CN | 104487929 A | 4/2015 |
| CN | 104501043 A | 4/2015 |
| CN | 104580576 A | 4/2015 |
| CN | 104737114 A | 6/2015 |
| CN | 104898402 A | 9/2015 |
| CN | 105204931 A | 12/2015 |
| CN | 105260049 A | 1/2016 |
| CN | 105264479 A | 1/2016 |
| CN | 105286843 A | 2/2016 |
| CN | 105302468 A | 2/2016 |
| CN | 105335087 A | 2/2016 |
| CN | 105388966 A | 3/2016 |
| CN | 105389078 A | 3/2016 |
| CN | 105389107 A | 3/2016 |
| CN | 105453016 A | 3/2016 |
| CN | 105607858 A | 5/2016 |
| CN | 205608658 U | 9/2016 |
| CN | 106056848 A | 10/2016 |
| CN | 106486044 A | 3/2017 |
| CN | 106598201 A | 4/2017 |
| CN | 106605201 A | 4/2017 |
| CN | 106909064 A | 6/2017 |
| CN | 107239101 A | 10/2017 |
| CN | 107257951 A | 10/2017 |
| CN | 107430489 A | 12/2017 |
| CN | 107561904 A | 1/2018 |
| CN | 107643677 A | 1/2018 |
| CN | 107710135 A | 2/2018 |
| CN | 107870560 A | 4/2018 |
| CN | 108255049 A | 7/2018 |
| CN | 109196469 A | 1/2019 |
| CN | 109313655 A | 2/2019 |
| CN | 109690445 A | 4/2019 |

(56) References Cited

FOREIGN PATENT DOCUMENTS

| | | |
|---|---|---|
| CN | 110471582 B | 10/2021 |
| DE | 202017105858 U1 | 3/2018 |
| EP | 0579093 A1 | 1/1994 |
| EP | 0831629 A2 | 3/1998 |
| EP | 1659504 A2 | 5/2006 |
| EP | 1674889 A1 | 6/2006 |
| EP | 1674977 A2 | 6/2006 |
| EP | 1750242 A2 | 2/2007 |
| EP | 1832969 A2 | 9/2007 |
| EP | 1855170 A2 | 11/2007 |
| EP | 1988432 A1 | 11/2008 |
| EP | 2120115 A2 | 11/2009 |
| EP | 2175367 A2 | 4/2010 |
| EP | 2194508 A1 | 6/2010 |
| EP | 2204702 A1 | 7/2010 |
| EP | 2290922 A1 | 3/2011 |
| EP | 2312512 A1 | 4/2011 |
| EP | 2360902 A2 | 8/2011 |
| EP | 2413577 A2 | 2/2012 |
| EP | 2423810 A1 | 2/2012 |
| EP | 2426902 A1 | 3/2012 |
| EP | 2600215 A1 | 6/2013 |
| EP | 2629483 A1 | 8/2013 |
| EP | 2738640 A2 | 6/2014 |
| EP | 2942932 A1 | 11/2015 |
| EP | 2955591 A2 | 12/2015 |
| EP | 2990887 A2 | 3/2016 |
| EP | 2993602 A1 | 3/2016 |
| EP | 3056949 A1 | 8/2016 |
| EP | 3101958 A1 | 12/2016 |
| EP | 3152643 A1 | 4/2017 |
| EP | 3376342 A1 | 9/2018 |
| EP | 3401770 A1 | 11/2018 |
| EP | 3465408 B1 | 8/2020 |
| EP | 3896560 A1 | 10/2021 |
| EP | 3175344 B1 | 1/2022 |
| GB | 2475669 A | 6/2011 |
| JP | 49-134364 A | 12/1974 |
| JP | 53-31170 A | 3/1978 |
| JP | 56-621 A | 1/1981 |
| JP | 3007616 U | 2/1995 |
| JP | 8-110955 A | 4/1996 |
| JP | 9-251084 A | 9/1997 |
| JP | 10-143636 A | 5/1998 |
| JP | 10-506472 A | 6/1998 |
| JP | 11-109066 A | 4/1999 |
| JP | 11-160470 A | 6/1999 |
| JP | 11-232013 A | 8/1999 |
| JP | 2000-162349 A | 6/2000 |
| JP | 3062531 B2 | 7/2000 |
| JP | 2001-144884 A | 5/2001 |
| JP | 2001-147282 A | 5/2001 |
| JP | 2001-273064 A | 10/2001 |
| JP | 2001-313886 A | 11/2001 |
| JP | 2001-318852 A | 11/2001 |
| JP | 2002-73486 A | 3/2002 |
| JP | 2002-507718 A | 3/2002 |
| JP | 2002-251238 A | 9/2002 |
| JP | 2002-271451 A | 9/2002 |
| JP | 2003-9404 A | 1/2003 |
| JP | 2003-121568 A | 4/2003 |
| JP | 2003-233616 A | 8/2003 |
| JP | 2003-296246 A | 10/2003 |
| JP | 2004-28918 A | 1/2004 |
| JP | 2004-177148 A | 6/2004 |
| JP | 2004-184396 A | 7/2004 |
| JP | 2005-521890 A | 7/2005 |
| JP | 2005-339017 A | 12/2005 |
| JP | 2006-71582 A | 3/2006 |
| JP | 2006-101505 A | 4/2006 |
| JP | 2006-242717 A | 9/2006 |
| JP | 2006-293340 A | 10/2006 |
| JP | 2008-175800 A | 7/2008 |
| JP | 2009-147889 A | 7/2009 |
| JP | 2009-217612 A | 9/2009 |
| JP | 2009-229106 A | 10/2009 |
| JP | 2009-293960 A | 12/2009 |
| JP | 2010-124181 A | 6/2010 |
| JP | 2010-257051 A | 11/2010 |
| JP | 2011-515726 A | 5/2011 |
| JP | 3168099 U | 6/2011 |
| JP | 2011-159172 A | 8/2011 |
| JP | 2011-217000 A | 10/2011 |
| JP | 2012-32306 A | 2/2012 |
| JP | 2012-53642 A | 3/2012 |
| JP | 2012-505478 A | 3/2012 |
| JP | 2012-109778 A | 6/2012 |
| JP | 2012-147432 A | 8/2012 |
| JP | 2012-517630 A | 8/2012 |
| JP | 2012-203537 A | 10/2012 |
| JP | 2012-203832 A | 10/2012 |
| JP | 2012-531607 A | 12/2012 |
| JP | 2013-3671 A | 1/2013 |
| JP | 2013-29925 A | 2/2013 |
| JP | 2013-92989 A | 5/2013 |
| JP | 2013-146557 A | 8/2013 |
| JP | 2013-232230 A | 11/2013 |
| JP | 2014-35766 A | 2/2014 |
| JP | 2014-123197 A | 7/2014 |
| JP | 2014-143575 A | 8/2014 |
| JP | 2014-519126 A | 8/2014 |
| JP | 2014-216868 A | 11/2014 |
| JP | 5630676 B2 | 11/2014 |
| JP | 2015-504619 A | 2/2015 |
| JP | 2015-210587 A | 11/2015 |
| JP | 2016-13151 A | 1/2016 |
| JP | 2017-111083 A | 6/2017 |
| JP | 2017-527026 A | 9/2017 |
| JP | 2017-531225 A | 10/2017 |
| JP | 2017-531230 A | 10/2017 |
| JP | 2018-514838 A | 6/2018 |
| JP | 2018-113544 A | 7/2018 |
| JP | 2018-116067 A | 7/2018 |
| JP | 2020-056745 A | 4/2020 |
| KR | 10-2004-0107489 A | 12/2004 |
| KR | 20-0425314 Y1 | 9/2006 |
| KR | 10-2007-0025292 A | 3/2007 |
| KR | 10-2008-0058246 A | 6/2008 |
| KR | 10-0864578 B1 | 10/2008 |
| KR | 10-2009-0112132 A | 10/2009 |
| KR | 10-2010-0025846 A | 3/2010 |
| KR | 10-2010-0025853 A | 3/2010 |
| KR | 10-2011-0093729 A | 8/2011 |
| KR | 10-2012-0132134 A | 12/2012 |
| KR | 10-2013-0109466 A | 10/2013 |
| KR | 10-2014-0025552 A | 3/2014 |
| KR | 10-2014-0064687 A | 5/2014 |
| KR | 10-2014-0074824 A | 6/2014 |
| KR | 10-2015-0008996 A | 1/2015 |
| KR | 10-2015-0038711 A | 4/2015 |
| KR | 10-2015-0081140 A | 7/2015 |
| KR | 10-2015-0140212 A | 12/2015 |
| KR | 10-2016-0026314 A | 3/2016 |
| KR | 10-2017-0006761 A | 1/2017 |
| KR | 10-2017-0032471 A | 3/2017 |
| KR | 10-2017-0076452 A | 7/2017 |
| KR | 10-2017-0081391 A | 7/2017 |
| KR | 10-2017-0082698 A | 7/2017 |
| KR | 10-2017-0130417 A | 11/2017 |
| KR | 10-2018-0011581 A | 2/2018 |
| KR | 10-2018-0046206 A | 5/2018 |
| KR | 10-1875907 B1 | 7/2018 |
| KR | 10-2018-0108531 A | 10/2018 |
| KR | 10-2019-0020850 A | 3/2019 |
| KR | 10-2019-0071285 A | 6/2019 |
| KR | 10-2019-0114034 A | 10/2019 |
| TW | 498240 B | 8/2002 |
| TW | 546942 B | 8/2003 |
| TW | 200512616 A | 4/2005 |
| TW | 200850058 A | 12/2008 |
| TW | 200915698 A | 4/2009 |
| TW | I348803 B | 9/2011 |
| TW | 201232486 A | 8/2012 |
| TW | 201419115 A | 5/2014 |

(56) References Cited

FOREIGN PATENT DOCUMENTS

| | | |
|---|---|---|
| WO | 1998/40795 A1 | 9/1998 |
| WO | 2001/71433 A1 | 9/2001 |
| WO | 2002/054157 A1 | 7/2002 |
| WO | 2003/048872 A1 | 6/2003 |
| WO | 2003/085460 A2 | 10/2003 |
| WO | 2006/012343 A2 | 2/2006 |
| WO | 2006/112641 A1 | 10/2006 |
| WO | 2006/131780 A1 | 12/2006 |
| WO | 2007/018881 A2 | 2/2007 |
| WO | 2008/114491 A1 | 9/2008 |
| WO | 2009/053775 A1 | 4/2009 |
| WO | 2009/146857 A2 | 12/2009 |
| WO | 2010/017627 A1 | 2/2010 |
| WO | 2011/000893 A1 | 1/2011 |
| WO | 2011/062871 A2 | 5/2011 |
| WO | 2011/099819 A2 | 8/2011 |
| WO | 2012/021507 A2 | 2/2012 |
| WO | 2012/161434 A2 | 11/2012 |
| WO | 2012/170446 A2 | 12/2012 |
| WO | 2013/051048 A1 | 4/2013 |
| WO | 2013/093558 A1 | 6/2013 |
| WO | 2013/103570 A1 | 7/2013 |
| WO | 2013/136548 A1 | 9/2013 |
| WO | 2013/169842 A2 | 11/2013 |
| WO | 2013/169846 A1 | 11/2013 |
| WO | 2013/169849 A2 | 11/2013 |
| WO | 2013/169875 A2 | 11/2013 |
| WO | 2013/169882 A2 | 11/2013 |
| WO | 2014/078114 A1 | 5/2014 |
| WO | 2014/081181 A1 | 5/2014 |
| WO | 2014/105274 A1 | 7/2014 |
| WO | 2014/105278 A1 | 7/2014 |
| WO | 2014/189197 A1 | 11/2014 |
| WO | 2014/200730 A1 | 12/2014 |
| WO | 2015/023419 A1 | 2/2015 |
| WO | 2015/029313 A1 | 3/2015 |
| WO | 2015/034960 A1 | 3/2015 |
| WO | 2015/065402 A1 | 5/2015 |
| WO | 2015/084891 A1 | 6/2015 |
| WO | 2015/163536 A1 | 10/2015 |
| WO | 2016/022203 A1 | 2/2016 |
| WO | 2016/022204 A1 | 2/2016 |
| WO | 2016/022205 A1 | 2/2016 |
| WO | 2016/022496 A2 | 2/2016 |
| WO | 2016/025395 A2 | 2/2016 |
| WO | 2016/032076 A1 | 3/2016 |
| WO | 2016/036427 A1 | 3/2016 |
| WO | 2016/036522 A2 | 3/2016 |
| WO | 2016/057062 A1 | 4/2016 |
| WO | 2016/099097 A1 | 6/2016 |
| WO | 2016/144385 A1 | 9/2016 |
| WO | 2016/144563 A1 | 9/2016 |
| WO | 2016/144577 A1 | 9/2016 |
| WO | 2016/144977 A1 | 9/2016 |
| WO | 2017/030646 A1 | 2/2017 |
| WO | 2017/062621 A1 | 4/2017 |
| WO | 2017/213777 A1 | 12/2017 |
| WO | 2017/213899 A1 | 12/2017 |
| WO | 2017/213937 A1 | 12/2017 |
| WO | 2018/048700 A1 | 3/2018 |
| WO | 2018/213451 A1 | 11/2018 |
| WO | 2019/200350 A1 | 10/2019 |
| WO | 2019/217086 A2 | 11/2019 |
| WO | 2019/217249 A2 | 11/2019 |
| WO | 2021/050190 A1 | 3/2021 |

OTHER PUBLICATIONS

Corrected Notice of Allowance received for U.S. Appl. No. 17/341,839, mailed on Oct. 26, 2022, 2 pages.
Intention to Grant received for European Patent Application No. 21177569.7, mailed on Oct. 27, 2022, 8 pages.
International Search Report and Written Opinion received for PCT Patent Application No. PCT/US2022/026371, mailed on Oct. 12, 2022, 16 pages.
Invitation to Pay Additional Fees received for PCT Patent Application No. PCT/US2022/026371, mailed on Aug. 18, 2022, 9 pages.
Non-Final Office Action received for U.S. Appl. No. 17/713,016, mailed on Oct. 27, 2022, 25 pages.
Notice of Allowance received for Korean Patent Application No. 10-2021-7036016, mailed on Sep. 28, 2022, 7 pages (2 pages of English Translation and 5 pages of Official Copy).
Office Action received for European Patent Application No. 19724997.2, mailed on Oct. 27, 2022, 5 pages.
Office Action received for Chinese Patent Application No. 201910924197.0, mailed on Nov. 30, 2022, 13 pages (06 pages of English Translation and 07 pages of Official Copy).
Office Action received for Chinese Patent Application No. 202110783860.7, mailed on Nov. 15, 2022, 8 pages (2 pages of English Translation and 6 pages of Official Copy).
Office Action received for Korean Patent Application No. 10-2020-0123857, mailed on Dec. 16, 2022, 8 pages (4 pages of English Translation and 4 pages of Official Copy).
Non-Final Office Action received for U.S. Appl. No. 17/068,386, mailed on Jan. 30, 2023, 20 pages.
Non-Final Office Action received for U.S. Appl. No. 17/746,807, mailed on Feb. 2, 2023, 14 pages.
Non-Final Office Action received for U.S. Appl. No. 17/948,578, mailed on Feb. 2, 2023, 13 pages.
Office Action received for Chinese Patent Application No. 202110453180.9, mailed on Dec. 26, 2022, 13 pages (8 pages of English Translation and 5 pages of Official Copy).
Summons to Attend Oral Proceedings received for European Patent Application No. 20729346.5, mailed on Jan. 23, 2023, 11 pages.
Advisory Action received for U.S. Appl. No. 14/841,606, mailed on Feb. 28, 2019, 3 pages.
Advisory Action received for U.S. Appl. No. 14/815,898, mailed on Aug. 30, 2016, 3 pages.
Advisory Action received for U.S. Appl. No. 14/846,511, mailed on Oct. 22, 2019, 5 pages.
Advisory Action received for U.S. Appl. No. 14/846,511, mailed on Sep. 19, 2018, 8 pages.
Advisory Action received for U.S. Appl. No. 15/405,122, mailed on Apr. 18, 2022, 5 pages.
Advisory Action received for U.S. Appl. No. 15/421,865, mailed on Apr. 16, 2020, 7 pages.
Advisory Action received for U.S. Appl. No. 15/554,204, mailed on Mar. 12, 2020, 3 pages.
Advisory Action received for U.S. Appl. No. 16/389,722, mailed on Mar. 9, 2021, 5 pages.
Advisory Action received for U.S. Appl. No. 16/582,020, mailed on Aug. 3, 2020, 4 pages.
Advisory Action received for U.S. Appl. No. 16/861,651, mailed on Jul. 29, 2022, 4 pages.
Advisory Action received for U.S. Appl. No. 16/935,002, mailed on May 6, 2022, 3 pages.
Advisory Action received for U.S. Appl. No. 16/943,737, mailed on Jun. 1, 2022, 6 pages.
AdyClock—Night Alarm Clock, App for android, Google play store page: https://web.archive.org/web/20130924223153/https://play.google.com/store/apps/details?id=com.adyclock&hl=en, Sep. 24, 2013, 2 pages.
Airshow, "Airshow App for Mobile Devices", 2012, 4 pages.
Andro Dollar, "Huawei Watch GT Always on Mode Update is finally here!", Online available at: https://www.youtube.com/watch?v=AJw_FIAf7v4, Jun. 6, 2019, 4 pages.
Android Central, "BeWeather weather app for Android", Available online at: <https://www.youtube.com/watch?v=G2EY2K-XkSI>, Sep. 1, 2011, 1 page.
Android Central, "Changing the watchface on your Android Wear device", Retrieved from: https://www.youtube.com/watch?v=YYwFe2K_qil, Jul. 2, 2014, 4 pages.
Android Tips, "Create a Minimal Lock Screen with WidgetLocker", Online Available at: http://appstap192.blogspot.com/2012/01/create-minimal-lock-screen-with.html, Jan. 18, 2012, 6 pages.

(56) References Cited

OTHER PUBLICATIONS

Androidika, "Butterfly 3D Live Wallpaper 1.0 APK", Available at: <http://net-suckga-ilauncher2.apk-dl.com/butterfly-3d-live-wallpaper>, Feb. 26, 2013, 7 pages.
AOD too dim. I've answered my own question to help others, Online Available: https://forums.androidcentral.com/samsung-galaxy-s9-s9-plus/874444-aod-too-dim-ive-answered-my-own-question-help-others.html, Mar. 11, 2018, 3 pages.
Applicant-Initiated Interview Summary received for U.S. Appl. No. 14/846,511, mailed on Apr. 20, 2020, 4 pages.
Applicant-Initiated Interview Summary received for U.S. Appl. No. 15/405,122, mailed on Dec. 22, 2020, 5 pages.
Applicant-Initiated Interview Summary received for U.S. Appl. No. 15/405,122, mailed on Jul. 7, 2021, 4 pages.
Applicant-Initiated Interview Summary received for U.S. Appl. No. 15/405,122, mailed on Mar. 1, 2022, 4 pages.
Applicant-Initiated Interview Summary received for U.S. Appl. No. 15/405,122, mailed on May 21, 2020, 5 pages.
Applicant-Initiated Interview Summary received for U.S. Appl. No. 15/421,865, mailed on Dec. 15, 2020, 6 pages.
Applicant-Initiated Interview Summary received for U.S. Appl. No. 15/421,865, mailed on Feb. 3, 2020, 5 pages.
Applicant-Initiated Interview Summary received for U.S. Appl. No. 15/421,865, mailed on Feb. 28, 2022, 5 pages.
Applicant-Initiated Interview Summary received for U.S. Appl. No. 15/421,865, mailed on Jun. 30, 2021, 6 pages.
Applicant-Initiated Interview Summary received for U.S. Appl. No. 15/554,204, mailed on Jan. 31, 2020, 3 pages.
Applicant-Initiated Interview Summary received for U.S. Appl. No. 15/554,204, mailed on Oct. 11, 2019, 5 pages.
Applicant-Initiated Interview Summary received for U.S. Appl. No. 15/798,235, mailed on Feb. 3, 2020, 3 pages.
Applicant-Initiated Interview Summary received for U.S. Appl. No. 16/389,722, mailed on Feb. 11, 2021, 4 pages.
Applicant-Initiated Interview Summary received for U.S. Appl. No. 16/389,722, mailed on Feb. 18, 2022, 5 pages.
Applicant-Initiated Interview Summary received for U.S. Appl. No. 16/389,722, mailed on Jul. 7, 2020, 5 pages.
Applicant-Initiated Interview Summary received for U.S. Appl. No. 16/389,722, mailed on Sep. 7, 2021, 4 pages.
Applicant-Initiated Interview Summary received for U.S. Appl. No. 16/401,934, mailed on Feb. 23, 2021, 8 pages.
Applicant-Initiated Interview Summary received for U.S. Appl. No. 16/418,786, mailed on Mar. 30, 2021, 4 pages.
Applicant-Initiated Interview Summary received for U.S. Appl. No. 16/418,786, mailed on May 9, 2022, 2 pages.
Applicant-Initiated Interview Summary received for U.S. Appl. No. 16/418,786, mailed on Sep. 23, 2022, 2 pages.
Applicant-Initiated Interview Summary received for U.S. Appl. No. 16/582,020, mailed on Jul. 9, 2021, 4 pages.
Applicant-Initiated Interview Summary received for U.S. Appl. No. 16/582,020, mailed on Jul. 14, 2020, 5 pages.
Applicant-Initiated Interview Summary received for U.S. Appl. No. 16/582,020, mailed on Mar. 25, 2020, 5 pages.
Applicant-Initiated Interview Summary received for U.S. Appl. No. 16/584,281, mailed on Mar. 9, 2020, 5 pages.
Applicant-Initiated Interview Summary received for U.S. Appl. No. 16/584,281, mailed on Sep. 14, 2020, 6 pages.
Applicant-Initiated Interview Summary received for U.S. Appl. No. 16/584,445, mailed on Mar. 17, 2020, 5 pages.
Applicant-Initiated Interview Summary received for U.S. Appl. No. 16/585,399, mailed on Mar. 25, 2020, 3 pages.
Applicant-Initiated Interview Summary received for U.S. Appl. No. 16/585,714, mailed on Jul. 20, 2020, 5 pages.
Applicant-Initiated Interview Summary received for U.S. Appl. No. 16/585,721, mailed on Aug. 31, 2020, 5 pages.
Applicant-Initiated Interview Summary received for U.S. Appl. No. 16/585,721, mailed on Mar. 13, 2020, 5 pages.
Applicant-Initiated Interview Summary received for U.S. Appl. No. 16/659,507, mailed on Nov. 17, 2020, 3 pages.
Applicant-Initiated Interview Summary received for U.S. Appl. No. 16/861,651, mailed on Dec. 29, 2021, 5 pages.
Applicant-Initiated Interview Summary received for U.S. Appl. No. 16/861,651, mailed on Mar. 25, 2021, 6 pages.
Applicant-Initiated Interview Summary received for U.S. Appl. No. 16/861,651, mailed on Sep. 3, 2021, 5 pages.
Applicant-Initiated Interview Summary received for U.S. Appl. No. 16/935,002, mailed on Sep. 21, 2021, 4 pages.
Applicant-Initiated Interview Summary received for U.S. Appl. No. 16/943,737, mailed on Apr. 29, 2022, 6 pages.
Applicant-Initiated Interview Summary received for U.S. Appl. No. 16/943,737, mailed on Sep. 7, 2021, 4 pages.
Applicant-Initiated Interview Summary received for U.S. Appl. No. 16/997,588, mailed on Jan. 29, 2021, 3 pages.
Applicant-Initiated Interview Summary received for U.S. Appl. No. 16/997,588, mailed on May 12, 2021, 2 pages.
Applicant-Initiated Interview Summary received for U.S. Appl. No. 17/031,654, mailed on Feb. 1, 2021, 2 pages.
Applicant-Initiated Interview Summary received for U.S. Appl. No. 17/031,671, mailed on Aug. 2, 2021, 5 pages.
Applicant-Initiated Interview Summary received for U.S. Appl. No. 17/031,671, mailed on Jun. 13, 2022, 7 pages.
Applicant-Initiated Interview Summary received for U.S. Appl. No. 17/031,671, mailed on Nov. 8, 2021, 5 pages.
Applicant-Initiated Interview Summary received for U.S. Appl. No. 17/031,765, mailed on Dec. 15, 2021, 4 pages.
Applicant-Initiated Interview Summary received for U.S. Appl. No. 17/031,765, mailed on May 23, 2022, 5 pages.
Applicant-Initiated Interview Summary received for U.S. Appl. No. 17/031,765, mailed on Sep. 22, 2021, 5 pages.
Applicant-Initiated Interview Summary received for U.S. Appl. No. 17/041,350, mailed on Aug. 18, 2021, 2 pages.
Applicant-Initiated Interview Summary received for U.S. Appl. No. 17/041,350, mailed on Feb. 2, 2022, 2 pages.
Applicant-Initiated Interview Summary received for U.S. Appl. No. 17/068,386, mailed on Jan. 13, 2022, 2 pages.
Applicant-Initiated Interview Summary received for U.S. Appl. No. 17/068,386, mailed on Sep. 21, 2021, 2 pages.
Applicant-Initiated Interview Summary received for U.S. Appl. No. 17/078,896, mailed on Apr. 25, 2022, 2 pages.
Applicant-Initiated Interview Summary received for U.S. Appl. No. 17/317,042, mailed on Apr. 29, 2022, 2 pages.
Applicant-Initiated Interview Summary received for U.S. Appl. No. 17/341,839, mailed on Apr. 29, 2022, 2 pages.
Applicant-Initiated Interview Summary received for U.S. Appl. No. 17/341,839, mailed on Sep. 16, 2022, 2 pages.
Applicant-Initiated Interview Summary received for U.S. Appl. No. 17/373,163, mailed on Apr. 11, 2022, 2 pages.
Applicant-Initiated Interview Summary received for U.S. Appl. No. 17/591,184, mailed on Sep. 23, 2022, 2 pages.
Avdonin Nikita, "Astroviewer 3D", Available at <: https: jjwww.youtube.comjwatch?v=zY0tslx3JHY/>, Nov. 5, 2013, 2 pages.
Baar Marius, "Fitbit Ace—Unboxing, Setup and 24-Hour Test", YouTube [online] [video], Retrieved from: <https://youtu.be/ekvkfqOyrls>.See especially 4:44., Oct. 24, 2018, 3 pages.
Barbosa Jonathan, "Weather Clock 2.1 for Android", APKPure, Online Available at: https://apkpure.com/weather-clock/com.urbandroid.wclock, Oct. 15, 2015, 3 pages.
Big Phil TV, "Gear S3 Watch faces with great always on display (A O D)", Available online at: https://www.youtube.com/watch?v=2cxMnrMiGU8, Apr. 5, 2017, 3 pages.
Bogdanov, Alexei, "SKMEI 1016", XP054977588, Available online at URL: https://www.youtube.com/watch?v=E4q4Fug05Fw, Jun. 21, 2014, 2 pages (Official Copy Only) (See Communication under 37 CFR § 1.98(a) (3)).
Brief Communication regarding Oral Proceedings received for European Patent Application No. 15730925.3, mailed on Feb. 18, 2020, 7 pages.
Brief Communication regarding Oral Proceedings received for European Patent Application No. 17206177.2, mailed on Nov. 21, 2019, 5 pages.

(56) References Cited

OTHER PUBLICATIONS

Brightness on lock screen, Online Available at: https://www.reddit.com/r/galaxys10/comments/b4d5fb/brightness_on_lock_screen/, 2019, 1 page.
Cancellation of Oral Proceedings received for European Patent Application No. 17206177.2, mailed on Dec. 4, 2019, 2 pages.
Castellini Rick, "Google Earth", Retrieved from <https://www.youtube.com/watch?v=bgjMSBXsFZQ>, How to Use Google Earth for Beginners, Feb. 12, 2013, 3 pages.
Cengic Suad, "Samsung Gear S3—Display Always on! Cool!", Available online at: https://www.youtube.com/watch?v=ceeDinbPwOY, Mar. 10, 2017, 3 pages.
Certificate of Examination received for Australian Patent Application No. 2020102158, mailed on Jun. 8, 2021, 2 pages.
Clark, Josh, "Designing Great iPhone Apps", O'Reilly Japan Co., O'Reilly Tim, vol. 1, May 24, 2012, 5 pages (Official Copy only) (See Communication under 37 CFR § 1.98(a) (3)).
Corrected Notice of Allowance received for U.S. Appl. No. 14/815,879, mailed on Jul. 13, 2017, 3 pages.
Corrected Notice of Allowance received for U.S. Appl. No. 14/815,879, mailed on Jul. 28, 2017, 3 pages.
Corrected Notice of Allowance received for U.S. Appl. No. 14/815,879, mailed on Sep. 21, 2017, 2 pages.
Corrected Notice of Allowance received for U.S. Appl. No. 15/183,663, mailed on Feb. 25, 2019, 3 pages.
Corrected Notice of Allowance received for U.S. Appl. No. 15/183,663, mailed on Mar. 27, 2019, 2 pages.
Corrected Notice of Allowance received for U.S. Appl. No. 15/355,956, mailed on Jan. 3, 2020, 2 pages.
Corrected Notice of Allowance received for U.S. Appl. No. 15/554,204, mailed on Aug. 19, 2020, 3 pages.
Corrected Notice of Allowance received for U.S. Appl. No. 15/798,257, mailed on Aug. 26, 2019, 2 pages.
Corrected Notice of Allowance received for U.S. Appl. No. 15/798,257, mailed on Jul. 9, 2019, 2 pages.
Corrected Notice of Allowance received for U.S. Appl. No. 15/798,257, mailed on Jun. 12, 2019, 2 pages.
Corrected Notice of Allowance received for U.S. Appl. No. 16/401,934, mailed on Dec. 23, 2021, 3 pages.
Corrected Notice of Allowance received for U.S. Appl. No. 16/401,934, mailed on Feb. 28, 2022, 2 pages.
Corrected Notice of Allowance received for U.S. Appl. No. 16/418,786, mailed on Jan. 5, 2022, 3 pages.
Corrected Notice of Allowance received for U.S. Appl. No. 16/418,786, mailed on Jun. 23, 2022, 2 pages.
Corrected Notice of Allowance received for U.S. Appl. No. 16/582,020, mailed on Aug. 11, 2021, 2 pages.
Corrected Notice of Allowance received for U.S. Appl. No. 17/041,350, mailed on Apr. 4, 2022, 3 pages.
Corrected Notice of Allowance received for U.S. Appl. No. 17/041,350, mailed on Mar. 15, 2022, 3 pages.
Corrected Notice of Allowance received for U.S. Appl. No. 17/373,163, mailed on Jul. 15, 2022, 5 pages.
Corrected Notice of Allowance received for U.S. Appl. No. 17/373,163, mailed on Jun. 27, 2022, 5 pages.
Cyr Jim, "Apple Watch—Customize Modular Watch Face", available online at: https://www.youtube.com/watch?v=02W93HbKIK8, May 13, 2015, 2 pages.
Dan, "Get This Look: 'Minimal' Zooper Widget", Online Available at: https://www.androidguys.com/featured/customize/get-look-minimal-zooper-widget/, Mar. 7, 2014, 2 pages.
Decision on Acceptance received for Australian Patent Application No. 2015298710, mailed on Jul. 19, 2019, 18 pages.
Decision on Acceptance received for Australian Patent Application No. 2018201089, mailed on Apr. 20, 2021, 28 pages.
Decision on Appeal received for U.S. Appl. No. 14/815,890, mailed on Nov. 24, 2020, 13 pages.
Decision on Appeal received for U.S. Appl. No. 14/846,511, mailed on Dec. 29, 2021, 20 pages.
Decision on Opposition received for Australian Patent Application No. 2015298710, mailed on Aug. 9, 2019, 4 pages.
Decision on Opposition received for Australian Patent Application No. 2015298710, mailed on Aug. 20, 2018, 20 pages.
Decision to Grant Received for Danish Patent Application No. PA201770397, mailed on Feb. 6, 2018, 2 pages.
Decision to Grant received for Danish Patent Application No. PA201770791, mailed on Jul. 7, 2020, 2 pages.
Decision to Grant received for Danish Patent Application No. PA201970596, mailed on Feb. 26, 2021, 2 pages.
Decision to Grant received for Danish Patent Application No. PA201970597, mailed on Aug. 19, 2021, 2 pages.
Decision to Grant received for Danish Patent Application No. PA202070609, mailed on May 3, 2021, 2 pages.
Decision to Grant received for European Patent Application No. 15730925.3, mailed on Dec. 9, 2021, 2 pages.
Decision to Grant received for European Patent Application No. 15747595.5, mailed on Jul. 16, 2020, 2 pages.
Decision to Grant received for European Patent Application No. 16762356.0, mailed on Apr. 26, 2022, 2 pages.
Decision to Grant received for European Patent Application No. 17206177.2, mailed on Aug. 6, 2020, 2 pages.
Decision to Grant received for European Patent Application No. 20185974.1, mailed on Aug. 19, 2022, 3 pages.
Decision to Refuse received for European Patent Application No. 15730924.6, mailed on Mar. 15, 2019, 12 pages.
Deluxe Moon—Guide, available online at:- https://web.archive.org/web/20130520161057/http://www.lifewaresolutions.com/deluxe_moon_guide_ip.html, May 20, 2013, 5 pages.
Digital alarm clock app for Android, Goggle play store digital alarm clock description page, Mar. 25, 2015, 3 pages.
Droid Life, "How to: Use Always-on Apps with Android Wear", Available online at: https://www.youtube.com/watch?v=_-xYB9EBTaA, Jun. 26, 2015, 3 pages.
Ebpman Tech Reviews, "LG G3 Tips: How to customize the clock face", Available online at: https://www.youtube.com/watch?v=evraMWFb1fY, Jul. 25, 2014, 1 page.
Elecont, "Weather clock—hourly forecast description", Accurate 10-day weather forecast, NOAA radar and satellite, buoy, Elecont LLC Forums, Online Available at: https://www.tapatalk.com/groups/elecontfr/weather-clock-hourly-forecast-description-t427.html, Dec. 1, 2011, 5 pages.
Ergonomic requirements for office work with visual display terminals (VDTs), Part 13: User guidance, International Standard ISO, Zuerich, CH, vol. 9241-13, Jul. 15, 1998, 40 pages.
European Search Report received for European Patent Application No. 17206177.2, mailed on Apr. 30, 2018, 4 pages.
European Search Report received for European Patent Application No. 20172197.4, mailed on Jul. 28, 2020, 4 pages.
Evgenyevich Sergey, "Earth & Moon in HD Gyro 3D", Available at <https://www.youtube.com/watch?v=IRwNcaSYrls/>, Dec. 1, 2013, 2 pages.
Examiner's Answer to Appeal Brief received for U.S. Appl. No. 14/815,890, mailed on Mar. 20, 2020, 16 pages.
Examiner's Answer to Appeal Brief received for U.S. Appl. No. 14/846,511, mailed on Jun. 14, 2021, 15 pages.
Extended European Search Report received for European Patent Application No. 16762356.0, mailed on Nov. 9, 2018, 10 pages.
Extended European Search Report received for European Patent Application No. 16837432.0, mailed on Mar. 11, 2019, 10 pages.
Extended European Search Report received for European Patent Application No. 17810723.1, mailed on Nov. 12, 2019, 9 pages.
Extended European Search Report received for European Patent Application No. 20185974.1, mailed on Oct. 28, 2020, 7 pages.
Extended European Search Report received for European Patent Application No. 21169911.1, mailed on Sep. 20, 2021, 9 pages.
Extended European Search Report received for European Patent Application No. 21177569.7, mailed on Sep. 20, 2021, 8 pages.
Extended European Search Report received for European Patent Application No. 22173249.8, mailed on Aug. 19, 2022, 15 pages.

(56) References Cited

OTHER PUBLICATIONS

Feist Jonathan, "Android customization—how to create a custom clock widget using Zooper Widget", Available Online at: https://www.androidauthority.com/zooper-widget-clock-366476/, May 15, 2014, 10 pages.
Feldman Ari, "Excerpts from: Designing Arcade Computer Game Graphics", Available online at: http://www.phatcode.net/res/269/files/dacgg.pdf, Jan. 1, 2001, 35 pages.
Final Office Action received for U.S. Appl. No. 14/815,890, mailed on Feb. 26, 2018, 20 pages.
Final Office Action received for U.S. Appl. No. 14/815,890, mailed on May 14, 2019, 22 pages.
Final Office Action received for U.S. Appl. No. 14/815,890, mailed on Nov. 21, 2016, 18 pages.
Final Office Action received for U.S. Appl. No. 14/815,898, mailed on Jun. 9, 2016, 19 pages.
Final Office Action received for U.S. Appl. No. 14/821,667, mailed on Apr. 26, 2018, 13 pages.
Final Office Action received for U.S. Appl. No. 14/841,606, mailed on Sep. 7, 2018, 34 pages.
Final Office Action received for U.S. Appl. No. 14/846,511 mailed on May 10, 2018, 21 pages.
Final Office Action received for U.S. Appl. No. 14/846,511, mailed on Aug. 11, 2020, 25 pages.
Final Office Action received for U.S. Appl. No. 14/846,511, mailed on Jun. 5, 2019, 24 pages.
Final Office Action received for U.S. Appl. No. 15/405,122, mailed on Jan. 21, 2020, 36 pages.
Final Office Action received for U.S. Appl. No. 15/405,122, mailed on Nov. 5, 2021, 45 pages.
Final Office Action received for U.S. Appl. No. 15/421,865, mailed on Dec. 2, 2019, 19 pages.
Final Office Action received for U.S. Appl. No. 15/421,865, mailed on Jul. 12, 2022, 27 pages.
Final Office Action received for U.S. Appl. No. 15/421,865, mailed on Mar. 19, 2021, 20 pages.
Final Office Action received for U.S. Appl. No. 15/554,204, mailed on Oct. 31, 2019, 22 pages.
Final Office Action received for U.S. Appl. No. 15/798,235, mailed on Oct. 9, 2018, 45 pages.
Final Office Action received for U.S. Appl. No. 15/798,235, mailed on Oct. 18, 2019, 25 pages.
Final Office Action received for U.S. Appl. No. 15/881,544, mailed on Jan. 29, 2019, 14 pages.
Final Office Action received for U.S. Appl. No. 16/389,722, mailed on Dec. 6, 2021, 19 pages.
Final Office Action received for U.S. Appl. No. 16/389,722, mailed on Dec. 8, 2020, 18 pages.
Final Office Action received for U.S. Appl. No. 16/401,934, mailed on Jun. 14, 2021, 30 pages.
Final Office Action received for U.S. Appl. No. 16/418,786, mailed on Jan. 13, 2021, 14 pages.
Final Office Action received for U.S. Appl. No. 16/582,020, mailed on Apr. 28, 2020, 31 pages.
Final Office Action received for U.S. Appl. No. 16/584,281, mailed on Apr. 15, 2020, 26 pages.
Final Office Action received for U.S. Appl. No. 16/585,721, mailed on Apr. 1, 2020, 28 pages.
Final Office Action received for U.S. Appl. No. 16/861,651, mailed on Apr. 20, 2021, 14 pages.
Final Office Action received for U.S. Appl. No. 16/861,651, mailed on Jan. 26, 2022, 16 pages.
Final Office Action received for U.S. Appl. No. 16/935,002, mailed on Jan. 5, 2022, 25 pages.
Final Office Action received for U.S. Appl. No. 16/943,737, mailed on Feb. 4, 2022, 24 pages.
Final Office Action received for U.S. Appl. No. 16/997,588, mailed on Mar. 30, 2021, 23 pages.
Final Office Action received for U.S. Appl. No. 17/031,671, mailed on Sep. 7, 2021, 27 pages.
Final Office Action received for U.S. Appl. No. 17/031,765, mailed on Oct. 29, 2021, 34 pages.
Final Office Action received for U.S. Appl. No. 17/031,765, mailed on Sep. 12, 2022, 37 pages.
Final Office Action received for U.S. Appl. No. 17/041,350, mailed on Sep. 17, 2021, 25 pages.
Final Office Action received for U.S. Appl. No. 17/068,386, mailed on Mar. 3, 2022, 29 pages.
Final Office Action received for U.S. Appl. No. 17/341,839, mailed on Jul. 18, 2022, 15 pages.
Final Office Action received for U.S. Appl. No. 14/815,879, mailed on Mar. 24, 2016, 46 pages.
First Action Interview received for U.S. Appl. No. 14/815,890, mailed on Aug. 12, 2016, 3 pages.
Fitbit surge Fitness Watch, Manual version 1.0, May 7, 2015, 48 pages.
Fuchphone Extras, "LG G Watch—Designs | Watch Faces", Available online at: https://www.youtube.com/watch?v=yqxzqdi_MSE, Jul. 27, 2014, 1 page.
Fuchphone Extras, "Samsung Gear Live—Designs | Watch Faces", Available online at: https://www.youtube.com/watch?v=fFjtVAxyimE, Jul. 26, 2014, 1 page.
Fukuda Kazuhiro, "Xperia Z1 Perfect Manual", Sotec Co., Ltd., No. 1, Nov. 15, 2013, pp. 217-218.
Gazer, "iPhone 4S Super Manual", Shuwa System Co., Saito Kazukuni, vol. 1, Jun. 6, 2013, 7 pages (Official Copy only) (See Communication under 37 CFR § 1.98(a) (3)).
Geary David, "Programming HTML5 Canvas", O'Reilly Japan, Inc., No. 1, Jul. 23, 2014, pp. 327-330.
Geek, "How to Put the Day of the Week into the Windows Taskbar Clock", available online at: https://www.howtogeek.com/194103/how-to-put-the-day-of-the-week-into-the-windows-taskbar-clock/, 2014, 3 pages.
Google Earth 7.0.1.8244, retrieved from the Internet: http://dl.google.com/dl/earth/client/ge7/release_7_0_1/googleearth-win-bundle-7.0.1.8244.exe, Oct. 29, 2012, 1 page.
Google Earth on Android—AndroidCentral.com, Available online at:—https://www.youtube.com/watch?v=1WxN1RunrE4, Feb. 22, 2010, 1 page.
Google, "Android User's Guide", Retrieved from the Internet: https://static.googleusercontent.com/media/www.google.com/en//help/hc/pdfs/mobile/AndroidUsersGuide-30-100.pdf, Feb. 23, 2011, 140 pages.
Gottabemobile, "How to Change Watch Faces on Android Wear", available online at URL: https://www.youtube.com/watch?v=B8iRGkGq6a8, Jul. 9, 2014, 4 pages.
Ilovex, "Stripe Generator", a tool that makes it easy to create striped materials, Online available at: https://www.ilovex.co.jp/blog/system/webconsulting/stripe-generator.html, May 2, 2012, 3 pages (Official Copy Only) (See Communication under 37 CFR § 1.98(a) (3)).
Instruction Manual, Detailed version, KDDI Corporation, No. 1, vol. 1, Jun. 2014, 4 pages.
Intention to Grant received for Danish Patent Application No. PA201570496, mailed on Feb. 17, 2016, 6 pages.
Intention to Grant Received for Danish Patent Application No. PA201770397, mailed on Aug. 18, 2017, 7 pages.
Intention to Grant received for Danish Patent Application No. PA201770791, mailed on Feb. 19, 2020, 2 pages.
Intention to Grant Received for Danish Patent Application No. PA201970596, mailed on Dec. 1, 2020, 2 pages.
Intention to Grant received for Danish Patent Application No. PA201970597, mailed on Apr. 20, 2021, 2 pages.
Intention to Grant received for Danish Patent Application No. PA202070609, mailed on Jan. 14, 2021, 2 pages.
Intention to Grant received for Danish Patent Application No. PA202070623, mailed on Jul. 20, 2022, 2 pages.
Intention to Grant received for European Patent Application No. 15730925.3, mailed on Aug. 16, 2021, 10 pages.
Intention to Grant received for European Patent Application No. 15730925.3, mailed on May 28, 2020, 10 pages.
Intention to Grant received for European Patent Application No. 15747595.5, mailed on Feb. 17, 2020, 8 pages.

(56) References Cited

OTHER PUBLICATIONS

Intention to Grant received for European Patent Application No. 16762356.0, mailed on Dec. 23, 2021, 8 pages.
Intention to Grant received for European Patent Application No. 17206177.2, mailed on Feb. 24, 2020, 8 pages.
Intention to Grant received for European Patent Application No. 20185974.1, mailed on Apr. 28, 2022, 8 pages.
International Preliminary Report on Patentability received for PCT Application No. PCT/US2016/037686, mailed on Mar. 1, 2018, 12 pages.
International Preliminary Report on Patentability received for PCT Patent Application No. PCT/US2015/034604, mailed on Feb. 16, 2017, 21 pages.
International Preliminary Report on Patentability received for PCT Patent Application No. PCT/US2015/034606, mailed on Feb. 16, 2017, 11 pages.
International Preliminary Report on Patentability received for PCT Patent Application No. PCT/US2015/034607, mailed on Feb. 16, 2017, 18 pages.
International Preliminary Report on Patentability received for PCT Patent Application No. PCT/US2015/044473, mailed on Mar. 2, 2017, 20 pages.
International Preliminary Report on Patentability received for PCT Patent Application No. PCT/US2015/044485, mailed on Mar. 2, 2017, 20 pages.
International Preliminary Report on Patentability received for PCT Patent Application No. PCT/US2015/053353, mailed on Sep. 21, 2017, 15 pages.
International Preliminary Report on Patentability received for PCT Patent Application No. PCT/US2015/054223, mailed on Dec. 14, 2017, 18 pages.
International Preliminary Report on Patentability received for PCT Patent Application No. PCT/US2016/021403, mailed on Sep. 21, 2017, 21 pages.
International Preliminary Report on Patentability received for PCT Patent Application No. PCT/US2016/035090, mailed on Dec. 14, 2017, 14 pages.
International Preliminary Report on Patentability received for PCT Patent Application No. PCT/US2017/034834, mailed on Dec. 20, 2018, 9 pages.
International Preliminary Report on Patentability received for PCT Patent Application No. PCT/US2018/032164, mailed on Nov. 21, 2019, 11 pages.
International Preliminary Report on Patentability received for PCT Patent Application No. PCT/US2019/030770, mailed on Nov. 19, 2020, 14 pages.
International Preliminary Report on Patentability received for PCT Patent Application No. PCT/US2020/030079, mailed on Nov. 18, 2021, 12 pages.
International Preliminary Report on Patentability received for PCT Patent Application No. PCT/US2020/031536, mailed on Nov. 18, 2021, 11 pages.
International Preliminary Report on Patentability received for PCT Patent Application No. PCT/US2020/031575, mailed on Nov. 18, 2021, 9 pages.
International Preliminary Report on Patentability received for PCT Patent Application No. PCT/US2020/045814, mailed on Mar. 17, 2022, 12 pages.
International Search Report and Written Opinion received for PCT Application No. PCT/US2015/034604, mailed on Nov. 9, 2015, 30 pages.
International Search Report and Written Opinion received for PCT Patent Application No. PCT/US2015/034606, mailed on Dec. 2, 2015, 17 pages.
International Search Report and Written Opinion received for PCT Patent Application No. PCT/US2015/044473, mailed on Feb. 12, 2016, 24 pages.
International Search Report and Written Opinion received for PCT Patent Application No. PCT/US2015/044485, mailed on Feb. 9, 2016, 27 pages.
International Search Report and Written Opinion received for PCT Patent Application No. PCT/US2015/053353, mailed on May 9, 2016, 21 pages.
International Search Report and Written Opinion received for PCT Patent Application No. PCT/US2015/054223, mailed on Jul. 6, 2016, 25 pages.
International Search Report and Written Opinion received for PCT Patent Application No. PCT/US2016/021403, mailed on May 12, 2016, 23 pages.
International Search Report and Written Opinion received for PCT Patent Application No. PCT/US2016/035090, mailed on Oct. 4, 2016, 17 pages.
International Search Report and Written Opinion received for PCT Patent Application No. PCT/US2016/037686, mailed on Sep. 9, 2016, 19 pages.
International Search Report and Written Opinion received for PCT Patent Application No. PCT/US2017/034834, mailed on Aug. 23, 2017, 10 pages.
International Search Report and Written Opinion received for PCT Patent Application No. PCT/US2018/032164, mailed on Oct. 18, 2018, 16 pages.
International Search Report and Written Opinion received for PCT Patent Application No. PCT/US2019/030770, mailed on Oct. 31, 2019, 23 pages.
International Search Report and Written Opinion received for PCT Patent Application No. PCT/US2020/030079, mailed on Sep. 4, 2020, 18 pages.
International Search Report and Written Opinion received for PCT Patent Application No. PCT/US2020/031536, mailed on Sep. 23, 2020, 16 pages.
International Search Report and Written Opinion received for PCT Patent Application No. PCT/US2020/031575, mailed on Aug. 20, 2020, 14 pages.
International Search Report and Written Opinion received for PCT Patent Application No. PCT/US2020/045814, mailed on Jan. 20, 2021, 16 pages.
International Search Report and Written Opinion received for PCT Patent Application No. PCT/US2021/031212, mailed on Sep. 21, 2021, 21 pages.
International Search Report and Written Opinion received for PCT Patent Application No. PCT/US2021/031669, mailed on Oct. 13, 2021, 17 pages.
International Search Report and Written Opinion received for PCT Patent Application No. PCT/US2015/034607, mailed on Dec. 1, 2015, 23 pages.
Internet Blog Post,"[PC] Pre-Customization of Black Desert's Characters", Online Available at: <https://blog.naver.com/hsh6051/220209813968>, Dec. 14, 2014, 41 pages (21 pages of English translation and 20 pages of Official Copy).
Inventerium, "Tropical Fish 14", Available online at: https://www.turbosquid.com/3d-models/tropical-fish-3d-model/388510, Feb. 4, 2008, 2 pages.
Invitation to Additional Fees and Partial International Search Report received for PCT Patent Application No. PCT/US2015/034604 mailed on Sep. 4, 2015, 6 pages.
Invitation to Additional Fees and Partial International Search Report received for PCT Patent Application No. PCT/US2015/034606 mailed on Sep. 9, 2015, 6 pages.
Invitation to Pay Additional Fee received for European Patent Application No. 15747595.5, mailed on Feb. 9, 2018, 6 pages.
Invitation to Pay Additional Fees received for PCT Patent Application No. PCT/US2015/034607, mailed on Sep. 30, 2015, 4 pages.
Invitation to Pay Additional Fees received for PCT Patent Application No. PCT/US2015/044473, mailed on Nov. 3, 2015, 5 pages.
Invitation to Pay Additional Fees received for PCT Patent Application No. PCT/US2015/044485, mailed on Nov. 3, 2015, 7 pages.
Invitation to Pay Additional Fees received for PCT Patent Application No. PCT/US2015/053353, mailed on Jan. 21, 2016, 7 pages.
Invitation to Pay Additional Fees received for PCT Patent Application No. PCT/US2015/054223, mailed on Mar. 9, 2016, 9 pages.
Invitation to Pay Additional Fees received for PCT Patent Application No. PCT/US2016/035090, mailed on Jul. 15, 2016, 2 pages.

(56) References Cited

OTHER PUBLICATIONS

Invitation to Pay Additional Fees received for PCT Patent Application No. PCT/US2018/032164, mailed on Aug. 21, 2018, 10 pages.
Invitation to Pay Additional Fees received for PCT Patent Application No. PCT/US2019/030770, mailed on Jul. 26, 2019, 12 pages.
Invitation to Pay Additional Fees received for PCT Patent Application No. PCT/US2020/030079, mailed on Jul. 14, 2020, 12 pages.
Invitation to Pay Additional Fees received for PCT Patent Application No. PCT/US2020/031536, mailed on Jul. 31, 2020, 9 pages.
Invitation to Pay Additional Fees received for PCT Patent Application No. PCT/US2020/045814, mailed on Nov. 18, 2020, 11 pages.
Invitation to Pay Additional Fees received for PCT Patent Application No. PCT/US2021/031212, mailed on Jul. 28, 2021, 19 pages.
Invitation to Pay Additional Fees received for PCT Patent Application No. PCT/US2021/031669, mailed on Aug. 19, 2021, 9 pages.
Invitation to Pay Search Fees received for European Patent Application No. 20730136.7, mailed on Jul. 1, 2022, 4 pages.
Invitation to Pay Search Fees received for European Patent Application No. 20761084.1, mailed on Dec. 7, 2021, 3 pages.
Jean, "Our Pact Parental Control Review", Available online at: https://www.bewebsmart.com/parental-controls/our-pact-parental-control-review/, Jun. 25, 2016, 25 pages.
Jurick et al., "iPhone Hacks", Tips & Tools for Unlocking the Power of Your iPhone & iPod touch, Online: URL: https://api.pageplace.de/preview/DT0400.9780596550974_A23629666/preview-9780596550974_A23629666.pdf >, Apr. 2009, 49 pages.
Kasai, Yoshino, "Apple Watch Absolute Basics—Season 3—The key is to customize the dial", Mynavi Corporation, Online Available at: https://news.mynavi.jp/article/20171104-apple_watch/, Nov. 4, 2017, 5 pages (Official Copy only) (See Communication under 37 CFR § 1.98(a) (3)).
Kenney Briley, "How to Customize a Smartwatch and other Personalization Questions", Available online at: <https://smartwatches.org/learn/customize-smartwatch/>, Jan. 23, 2014, 3 pages.
Kidizoom Smartwatch, Available online at <URL: https://www.vtechnl.com/media/downloads/Kidizoom-Smart-Watch.pdf>, Jun. 24, 2014, 23 pages.
Lein et al., "Patternizer", Available online at : https://patternizer.com/, Apr. 2016, 5 pages.
Link to Wayback Machine with link to Google Play showing different layouts of complications associated with a clock face, available online at <https://play.google.com/store/apps/details?id=com.levelup.beautifulwidgets.free&hl=da >, Sep. 9, 2013, 6 pages.
Living Earth, available at: http://www.livingearthapp.com/, 2014, 6 pages.
Looking for a launcher that changes the default homescreen or widgets based on wifi, location, or other context., Online Available at: https://www.reddit.com/r/androidapps/comments/35lu90/looking_for_a_launcher_that_changes_the_default/, 2015, 2 pages.
Minutes of Oral Proceedings received for European Patent Application No. 15730924.6, mailed on Mar. 13, 2019, 4 pages.
Minutes of Oral Proceedings received for European Patent Application No. 15730925.3, mailed on May 26, 2020, 11 pages.
Minutes of Oral Proceedings received for European Patent Application No. 16762356.0, mailed on Dec. 17, 2021, 5 pages.
MS Excel 2013, Jan. 29, 2013, 2 pages.
My Mate Vince, "Setting up the Fitbit Alta HR Activity Tracker on Apple IOS", Online available at:—<https://youtu.be/FdwRF4lfvFc>, Jun. 18, 2017, 3 pages.
Nerdtalk, "The Best Android Clock Widgets", available at: https://www.youtube.com/watch?v=E1bAprWByfU, Apr. 25, 2011, 1 page.
New, but unsigned—Easy StopWatch for Symbian, XP55393563, Available online at <http://www.allaboutsymbian.com/flow/item/19490_New_but_unsigned-Easy_StopWatc.php>, Mar. 15, 2014, 15 pages.
Night Display (Alarm Clock) App, Google Play Store Night Display (Alarm Clock) Description page, available at <https://web.archive.org/web/20141007124222/https://play.google.com/store/apps/details?id=com.srk.nighttimedisplay&hl=en>, Oct. 7, 2014, pp. 1-3.
Non-Final Office Action received for U.S. Appl. No. 14/815,890, mailed on Jun. 6, 2017, 19 pages.
Non-Final Office Action received for U.S. Appl. No. 15/554,204, mailed on Apr. 17, 2019, 19 pages.
Non-Final Office Action received for U.S. Appl. No. 14/815,879, mailed on Dec. 15, 2016, 33 pages.
Non-Final Office Action received for U.S. Appl. No. 14/815,890, mailed on Dec. 18, 2018, 21 pages.
Non-Final Office Action received for U.S. Appl. No. 14/815,890, mailed on Oct. 19, 2015, 5 pages.
Non-Final Office Action received for U.S. Appl. No. 14/821,667, mailed on Feb. 4, 2019, 13 pages.
Non-Final Office Action received for U.S. Appl. No. 14/821,667, mailed on Jul. 14, 2017, 12 pages.
Non-Final Office Action received for U.S. Appl. No. 14/839,889, mailed on Mar. 7, 2017, 26 pages.
Non-Final Office Action received for U.S. Appl. No. 14/841,606, mailed on Dec. 7, 2017, 30 pages.
Non-Final Office Action received for U.S. Appl. No. 14/841,606, mailed on May 8, 2019, 28 pages.
Non-Final Office Action received for U.S. Appl. No. 14/846,511 mailed on Jan. 7, 2020, 25 pages.
Non-Final Office Action received for U.S. Appl. No. 14/846,511 mailed on Oct. 27, 2017, 15 pages.
Non-Final Office Action received for U.S. Appl. No. 15/183,663, mailed on Jul. 9, 2018, 13 pages.
Non-Final Office Action received for U.S. Appl. No. 15/355,956, mailed on May 31, 2019, 32 pages.
Non-Final Office Action received for U.S. Appl. No. 15/405,122, mailed on Apr. 2, 2021, 35 pages.
Non-Final Office Action received for U.S. Appl. No. 15/405,122, mailed on May 31, 2019, 43 pages.
Non-Final Office Action received for U.S. Appl. No. 15/405,122, mailed on Sep. 24, 2020, 30 pages.
Non-Final Office Action received for U.S. Appl. No. 15/421,865, mailed on Dec. 29, 2021, 23 pages.
Non-Final Office Action received for U.S. Appl. No. 15/421,865, mailed on Mar. 21, 2019, 18 pages.
Non-Final Office Action received for U.S. Appl. No. 15/421,865, mailed on Oct. 7, 2020, 20 pages.
Non-Final Office Action received for U.S. Appl. No. 15/798,235, mailed on Apr. 24, 2019, 25 pages.
Non-Final Office Action received for U.S. Appl. No. 15/798,235, mailed on Mar. 14, 2018, 58 pages.
Non-Final Office Action received for U.S. Appl. No. 15/881,544, mailed on Jun. 7, 2018, 15 pages.
Non-Final Office Action received for U.S. Appl. No. 16/389,722, mailed on Apr. 3, 2020, 15 pages.
Non-Final Office Action received for U.S. Appl. No. 16/389,722, mailed on Jul. 7, 2022, 16 pages.
Non-Final Office Action received for U.S. Appl. No. 16/389,722, mailed on Jun. 3, 2021, 17 pages.
Non-Final Office Action received for U.S. Appl. No. 16/401,934, mailed on Dec. 11, 2020, 26 pages.
Non-Final Office Action received for U.S. Appl. No. 16/418,786, mailed on Apr. 24, 2020, 16 pages.
Non-Final Office Action received for U.S. Appl. No. 16/418,786, mailed on Aug. 1, 2022, 18 pages.
Non-Final Office Action received for U.S. Appl. No. 16/418,786, mailed on Mar. 28, 2022, 14 pages.
Non-Final Office Action received for U.S. Appl. No. 16/418,786, mailed on Oct. 4, 2021, 10 pages.
Non-Final Office Action received for U.S. Appl. No. 16/582,020, mailed on Apr. 5, 2021, 29 pages.
Non-Final Office Action received for U.S. Appl. No. 16/582,020, mailed on Jan. 13, 2020, 39 pages.
Non-Final Office Action received for U.S. Appl. No. 16/584,281, mailed on Dec. 10, 2019, 23 pages.
Non-Final Office Action received for U.S. Appl. No. 16/584,445, mailed on Dec. 26, 2019, 19 pages.

(56) References Cited

OTHER PUBLICATIONS

Non-Final Office Action received for U.S. Appl. No. 16/585,399, mailed on Jan. 23, 2020, 28 pages.
Non-Final Office Action received for U.S. Appl. No. 16/585,714, mailed on Apr. 16, 2020, 18 pages.
Non-Final Office Action received for U.S. Appl. No. 16/585,721, mailed on Dec. 27, 2019, 25 pages.
Non-Final Office Action received for U.S. Appl. No. 16/659,507, mailed on Oct. 7, 2020, 16 pages.
Non-Final Office Action received for U.S. Appl. No. 16/861,651, mailed on Nov. 27, 2020, 11 pages.
Non-Final Office Action received for U.S. Appl. No. 16/861,651, mailed on Sep. 30, 2021, 16 pages.
Non-Final Office Action received for U.S. Appl. No. 16/935,002, mailed on Jun. 25, 2021, 20 pages.
Non-Final Office Action received for U.S. Appl. No. 16/943,737, mailed on Jun. 25, 2021, 18 pages.
Non-Final Office Action received for U.S. Appl. No. 16/997,588, mailed on Dec. 14, 2020, 21 pages.
Non-Final Office Action received for U.S. Appl. No. 17/031,654, mailed on Nov. 19, 2020, 12 pages.
Non-Final Office Action received for U.S. Appl. No. 17/031,671, mailed on Apr. 1, 2022, 32 pages.
Non-Final Office Action received for U.S. Appl. No. 17/031,671, mailed on Apr. 30, 2021, 27 pages.
Non-Final Office Action received for U.S. Appl. No. 17/031,765, mailed on Jun. 28, 2021, 32 pages.
Non-Final Office Action received for U.S. Appl. No. 17/031,765, mailed on Mar. 29, 2022, 33 pages.
Non-Final Office Action received for U.S. Appl. No. 17/041,350, mailed on Jun. 10, 2021, 24 pages.
Non-Final Office Action received for U.S. Appl. No. 17/068,386, mailed on Jul. 15, 2021, 16 pages.
Non-Final Office Action received for U.S. Appl. No. 17/068,386, mailed on Oct. 28, 2021, 20 pages.
Non-Final Office Action received for U.S. Appl. No. 17/078,896, mailed on Dec. 24, 2021, 17 pages.
Non-Final Office Action received for U.S. Appl. No. 17/317,042, mailed on Nov. 10, 2021, 13 pages.
Non-Final Office Action received for U.S. Appl. No. 17/341,839, mailed on Mar. 17, 2022, 14 pages.
Non-Final Office Action received for U.S. Appl. No. 17/373,163, mailed on Jan. 27, 2022, 14 pages.
Non-Final Office Action received for U.S. Appl. No. 17/556,165, mailed on Sep. 7, 2022, 15 pages.
Non-Final Office Action received for U.S. Appl. No. 17/591,184, mailed on Aug. 4, 2022, 18 pages.
Non-Final Office Action received for U.S. Appl. No. 14/815,879, mailed on Nov. 6, 2015, 35 pages.
Non-Final Office Action received for U.S. Appl. No. 14/815,898, mailed on Dec. 1, 2015, 22 pages.
Non-Final Office Action received for U.S. Appl. No. 14/815,907, mailed on Jan. 12, 2016, 22 pages.
Non-Final Office Action received for U.S. Appl. No. 14/815,909, mailed on Nov. 27, 2015, 12 pages.
Non-Final Office Action received for U.S. Appl. No. 14/846,511, mailed on Nov. 30, 2018, 22 pages.
Notice of Acceptance received for Australian Patent Application No. 2015298710, mailed on Oct. 8, 2019, 3 pages.
Notice of Acceptance received for Australian Patent Application No. 2016229847, mailed on Sep. 12, 2018, 3 pages.
Notice of Acceptance received for Australian Patent Application No. 2017277813, mailed on Jun. 16, 2020, 3 pages.
Notice of Acceptance received for Australian Patent Application No. 2018201089, mailed on May 28, 2021, 3 pages.
Notice of Acceptance received for Australian Patent Application No. 2018279037, mailed on May 13, 2020, 3 pages.
Notice of Acceptance received for Australian Patent Application No. 2019208225, mailed on Jan. 21, 2021, 3 pages.
Notice of Acceptance received for Australian Patent Application No. 2019267413, mailed on Nov. 23, 2021, 3 pages.
Notice of Acceptance received for Australian Patent Application No. 2020204506, mailed on Apr. 8, 2021, 3 pages.
Notice of Acceptance received for Australian Patent Application No. 2020239670, mailed on Jul. 2, 2021, 3 pages.
Notice of Acceptance received for Australian Patent Application No. 2020239749, mailed on May 27, 2022, 3 pages.
Notice of Acceptance received for Australian Patent Application No. 2020239774, mailed on Jan. 5, 2022, 3 pages.
Notice of Acceptance received for Australian Patent Application No. 2020250323, mailed on Feb. 28, 2022, 3 pages.
Notice of Acceptance received for Australian Patent Application No. 2020269232, mailed on Dec. 16, 2021, 3 pages.
Notice of Acceptance received for Australian Patent Application No. 2020309093, mailed on Jul. 8, 2021, 3 pages.
Notice of Acceptance received for Australian Patent Application No. 2021202797, mailed on May 9, 2022, 3 pages.
Notice of Acceptance received for Australian Patent Application No. 2021202834, mailed on Jul. 15, 2021, 3 pages.
Notice of Acceptance received for Australian Patent Application No. 2021202836, mailed on Jun. 25, 2021, 3 pages.
Notice of Acceptance received for Australian Patent Application No. 2021203216, mailed on Jul. 26, 2022, 3 pages.
Notice of Acceptance received for Australian Patent Application No. 2022202292, mailed on Jul. 6, 2022, 3 pages.
Notice of Allowance received for Chinese Patent Application No. 201510479088.4, mailed on Jan. 21, 2021, 2 pages (1 page of English Translation and 1 page of Official Copy).
Notice of Allowance received for Chinese Patent Application No. 201510481525.6, mailed on May 27, 2019, 2 pages (1 page of English Translation and 1 page of Official Copy).
Notice of Allowance received for Chinese Patent Application No. 201510483268.X, mailed on Nov. 6, 2019, 2 pages (1 page of English translation and 1 page of Official Copy).
Notice of Allowance received for Chinese Patent Application No. 201510483305.7, mailed on Jan. 8, 2019, 3 pages (1 page of English Translation and 2 pages of Official Copy).
Notice of Allowance received for Chinese Patent Application No. 201510484514.3, mailed on Jun. 6, 2019, 2 pages (1 page of English Translation and 1 page of Official Copy).
Notice of Allowance received for Chinese Patent Application No. 201520594249.X, mailed on Jul. 12, 2016, 4 pages (2 pages of English Translation and 2 pages of Official Copy).
Notice of Allowance received for Chinese Patent Application No. 201680013193.1, mailed on May 7, 2021, 5 pages (1 page of English Translation and 4 pages of Official Copy).
Notice of Allowance received for Chinese Patent Application No. 201680047983.1, mailed on Apr. 28, 2021, 3 pages (1 page of English Translation and 2 pages of Official Copy).
Notice of Allowance received for Chinese Patent Application No. 201780033973.7, mailed on Jul. 7, 2021, 5 pages (1 page of English Translation and 4 pages of Official Copy).
Notice of Allowance received for Chinese Patent Application No. 201810037665.8, mailed on Jul. 9, 2019, 4 pages (1 page of English Translation and 3 pages of Official Copy).
Notice of Allowance received for Chinese Patent Application No. 201910906898.1, mailed on Oct. 28, 2021, 4 pages (1 page of English Translation and 3 pages of Official Copy).
Notice of Allowance received for Chinese Patent Application No. 202110194015.6, mailed on Mar. 9, 2022, 6 pages (3 pages of English Translation and 3 pages of Official Copy).
Notice of Allowance received for Chinese Patent Application No. 202110454541.1, mailed on May 31, 2022, 6 pages (3 pages of English Translation and 3 pages of Official Copy).
Notice of Allowance received for Danish Patent Application No. PA201570495, mailed on Feb. 22, 2017, 1 page.
Notice of Allowance received for Danish Patent Application No. PA201570496, mailed on Apr. 18, 2016, 2 pages.
Notice of Allowance received for Danish Patent Application No. PA202070623, mailed on Sep. 20, 2022, 2 pages.

(56) References Cited

OTHER PUBLICATIONS

Notice of Allowance received for Japanese Patent Application No. 2017-505450, mailed on Mar. 9, 2018, 10 pages (7 pages of English Translation and 3 pages of Official Copy).
Notice of Allowance received for Japanese Patent Application No. 2017-505842, mailed on Mar. 16, 2020, 4 pages (1 page of English Translation and 3 pages of Official Copy).
Notice of Allowance received for Japanese Patent Application No. 2017-505847, mailed on May 20, 2019, 4 pages (1 page of English Translation and 3 pages of Official Copy).
Notice of Allowance received for Japanese Patent Application No. 2017-545918, mailed on Jul. 22, 2019, 4 pages (1 page of English Translation and 3 pages of Official Copy).
Notice of Allowance received for Japanese Patent Application No. 2018-074971, mailed on Apr. 23, 2019, 4 pages (1 page of English Translation and 3 pages of Official Copy).
Notice of Allowance received for Japanese Patent Application No. 2018-537840, mailed on Mar. 19, 2020, 4 pages (1 page of English Translation and 3 pages of Official Copy).
Notice of Allowance received for Japanese Patent Application No. 2019-096219, mailed on Jun. 26, 2020, 4 pages (1 page of English Translation and 3 pages of Official Copy).
Notice of Allowance received for Japanese Patent Application No. 2019-151358, mailed on Jan. 22, 2021, 4 pages (1 page of English Translation and 3 pages of Official Copy).
Notice of Allowance received for Japanese Patent Application No. 2020-074878, mailed on May 28, 2021, 4 pages (1 page of English Translation and 3 pages of Official Copy).
Notice of Allowance received for Japanese Patent Application No. 2020-159825, mailed on Mar. 25, 2022, 5 pages (1 page of English Translation and 4 pages of Official Copy).
Notice of Allowance received for Japanese Patent Application No. 2020-551465, mailed on Jun. 28, 2021, 4 pages (1 page of English Translation and 3 pages of Official Copy).
Notice of Allowance received for Japanese Patent Application No. 2020-562622, mailed on Aug. 26, 2022, 4 pages (1 page of English Translation and 3 pages of Official Copy).
Notice of Allowance received for Japanese Patent Application No. 2021-105941, mailed on Jul. 4, 2022, 4 pages (1 page of English Translation and 3 pages of Official Copy).
Notice of Allowance received for Japanese Patent Application No. 2021-122610, mailed on Aug. 5, 2022, 4 pages (1 page of English Translation and 3 pages of Official Copy).
Notice of Allowance received for Japanese Patent Application No. 2021-565837, mailed on May 16, 2022, 4 pages (1 page of English Translation and 3 pages of Official Copy).
Notice of Allowance received for Korean Patent Application No. 10-2017-7005939, mailed on Mar. 30, 2018, 5 pages (2 pages of English Translation and 3 pages of Official Copy).
Notice of Allowance received for Korean Patent Application No. 10-2018-7018904, mailed on Jun. 26, 2020, 4 pages (1 page of English Translation and 3 pages of Official copy).
Notice of Allowance received for Korean Patent Application No. 10-2018-7022101, mailed on Oct. 14, 2019, 4 pages (1 page of English Translation and 3 pages of Official Copy).
Notice of Allowance received for Korean Patent Application No. 10-2019-7029673, mailed on Aug. 3, 2021, 3 pages (1 page of English Translation and 2 pages of Official Copy).
Notice of Allowance received for Korean Patent Application No. 10-2020-7001340, mailed on May 10, 2021, 5 pages (2 pages of English Translation and 3 pages of Official Copy).
Notice of Allowance received for Korean Patent Application No. 10-2020-7026036, mailed on Jul. 26, 2021, 4 pages (1 page of English Translation and 3 pages of Official Copy).
Notice of Allowance received for Korean Patent Application No. 10-2020-7028759, mailed on Oct. 19, 2021, 4 pages (1 page of English Translation and 3 pages of Official Copy).
Notice of Allowance received for Korean Patent Application No. 10-2021-7002597, mailed on Feb. 25, 2021, 5 pages (1 page of English Translation and 4 pages of Official Copy).
Notice of Allowance received for Korean Patent Application No. 10-2021-7013453, mailed on Aug. 11, 2021, 5 pages (2 pages of English Translation and 3 pages of Official Copy).
Notice of Allowance received for Korean Patent Application No. 10-2021-7013454, mailed on Aug. 12, 2021, 4 pages (1 page of English Translation and 3 pages of Official Copy).
Notice of Allowance received for Korean Patent Application No. 10-2021-7025301, mailed on Mar. 16, 2022, 4 pages (1 page of English Translation and 3 pages of Official Copy).
Notice of Allowance received for Korean Patent Application No. 10-2021-7034748, mailed on Jan. 27, 2022, 6 pages (2 pages of English Translation and 4 pages of Official Copy).
Notice of Allowance received for Korean Patent Application No. 10-2021-7036246, mailed on Mar. 2, 2022, 5 pages (1 page of English Translation and 4 pages of Official Copy).
Notice of Allowance received for Korean Patent Application No. 10-2021-7036678, mailed on Mar. 7, 2022, 5 pages (1 page of English Translation and 4 pages of Official Copy).
Notice of Allowance received for Korean Patent Application No. 10-2022-7001721, mailed on Feb. 28, 2022, 5 pages (1 page of English Translation and 4 pages of Official Copy).
Notice of Allowance received for Taiwanese Patent Application No. 104124962, mailed on Jul. 27, 2017, 3 pages (Official Copy Only) (See Communication under 37 CFR § 1.98(a) (3)).
Notice of Allowance received for Taiwanese Patent Application No. 104124963, mailed on Sep. 28, 2017, 5 pages (1 page of English Translation of Search report and 4 pages of Official Copy).
Notice of Allowance received for Taiwanese Patent Application No. 104124995, mailed on Jul. 27, 2017, 3 pages (Official Copy Only) (See Communication under 37 CFR § 1.98(a) (3)).
Notice of Allowance received for Taiwanese Patent Application No. 104124997, mailed on Jun. 16, 2017, 5 pages (1 page of English Translation of Search report and 4 pages of Official Copy).
Notice of Allowance received for Taiwanese Patent Application No. 104124998, mailed on Mar. 31, 2017, 3 pages (Official copy Only) (See Communication under 37 CFR § 1.98(a) (3)).
Notice of Allowance received for Taiwanese Patent Application No. 104134740, mailed on Dec. 8, 2016, 5 pages (1 page of English Translation of Search Report and 4 pages of Official Copy).
Notice of Allowance received for U.S. Appl. No. 14/815,879, mailed on Jun. 26, 2017, 8 pages.
Notice of Allowance received for U.S. Appl. No. 14/815,890, mailed on Feb. 12, 2021, 8 pages.
Notice of Allowance received for U.S. Appl. No. 14/815,898, mailed on Dec. 5, 2016, 3 pages.
Notice of Allowance received for U.S. Appl. No. 14/815,898, mailed on Oct. 24, 2016, 14 pages.
Notice of Allowance received for U.S. Appl. No. 14/815,907, mailed on Jul. 28, 2016, 9 pages.
Notice of Allowance received for U.S. Appl. No. 14/815,907, mailed on Nov. 30, 2016, 2 pages.
Notice of Allowance received for U.S. Appl. No. 14/815,909, mailed on Jun. 9, 2016, 3 pages.
Notice of Allowance received for U.S. Appl. No. 14/815,909, mailed on May 3, 2016, 12 pages.
Notice of Allowance received for U.S. Appl. No. 14/815,909, mailed on May 20, 2016, 2 pages.
Notice of Allowance received for U.S. Appl. No. 14/815,909, mailed on Sep. 6, 2016, 2 pages.
Notice of Allowance received for U.S. Appl. No. 14/821,667, mailed on Jun. 12, 2019, 9 pages.
Notice of Allowance received for U.S. Appl. No. 14/839,889, mailed on Oct. 30, 2017, 16 pages.
Notice of Allowance received for U.S. Appl. No. 15/183,663, mailed on Jan. 17, 2019, 6 pages.
Notice of Allowance received for U.S. Appl. No. 15/355,956, mailed on Nov. 22, 2019, 29 pages.
Notice of Allowance received for U.S. Appl. No. 15/554,204, mailed on Jul. 13, 2020, 10 pages.
Notice of Allowance received for U.S. Appl. No. 15/798,235, mailed on Apr. 1, 2020, 8 pages.
Notice of Allowance received for U.S. Appl. No. 15/798,235, mailed on Sep. 22, 2020, 8 pages.

(56) References Cited

OTHER PUBLICATIONS

Notice of Allowance received for U.S. Appl. No. 15/798,257, mailed on May 22, 2019, 14 pages.
Notice of Allowance received for U.S. Appl. No. 15/881,544, mailed on Jun. 26, 2019, 6 pages.
Notice of Allowance received for U.S. Appl. No. 15/881,544, mailed on Nov. 7, 2019, 5 pages.
Notice of Allowance received for U.S. Appl. No. 16/401,934, mailed on Feb. 2, 2022, 8 pages.
Notice of Allowance received for U.S. Appl. No. 16/401,934, mailed on Nov. 1, 2021, 11 pages.
Notice of Allowance received for U.S. Appl. No. 16/418,786, mailed on Dec. 9, 2021, 9 pages.
Notice of Allowance received for U.S. Appl. No. 16/418,786, mailed on Jun. 14, 2022, 9 pages.
Notice of Allowance received for U.S. Appl. No. 16/582,020, mailed on Jul. 27, 2021, 29 pages.
Notice of Allowance received for U.S. Appl. No. 16/584,281, mailed on Nov. 18, 2020, 8 pages.
Notice of Allowance received for U.S. Appl. No. 16/584,281, mailed on Sep. 29, 2020, 5 pages.
Notice of Allowance received for U.S. Appl. No. 16/584,445, mailed on Apr. 17, 2020, 9 pages.
Notice of Allowance received for U.S. Appl. No. 16/584,445, mailed on Jul. 23, 2020, 8 pages.
Notice of Allowance received for U.S. Appl. No. 16/584,445, mailed on Jun. 24, 2020, 5 pages.
Notice of Allowance received for U.S. Appl. No. 16/584,445, mailed on May 29, 2020, 5 pages.
Notice of Allowance received for U.S. Appl. No. 16/584,445, mailed on Oct. 21, 2020, 6 pages.
Notice of Allowance received for U.S. Appl. No. 16/585,366, mailed on Jan. 2, 2020, 6 pages.
Notice of Allowance received for U.S. Appl. No. 16/585,399, mailed on Jul. 21, 2020, 9 pages.
Notice of Allowance received for U.S. Appl. No. 16/585,714, mailed on Jan. 8, 2021, 8 pages.
Notice of Allowance received for U.S. Appl. No. 16/585,714, mailed on Jan. 27, 2021, 2 pages.
Notice of Allowance received for U.S. Appl. No. 16/585,714, mailed on Sep. 25, 2020, 15 pages.
Notice of Allowance received for U.S. Appl. No. 16/585,721, mailed on Oct. 30, 2020, 9 pages.
Notice of Allowance received for U.S. Appl. No. 16/585,721, mailed on Sep. 30, 2020, 15 pages.
Notice of Allowance received for U.S. Appl. No. 16/659,507, mailed on Feb. 24, 2021, 7 pages.
Notice of Allowance received for U.S. Appl. No. 16/867,002, mailed on Aug. 20, 2021, 12 pages.
Notice of Allowance received for U.S. Appl. No. 16/867,002, mailed on Mar. 1, 2022, 7 pages.
Notice of Allowance received for U.S. Appl. No. 16/997,588, mailed on Mar. 18, 2022, 9 pages.
Notice of Allowance received for U.S. Appl. No. 16/997,588, mailed on Sep. 30, 2021, 12 pages.
Notice of Allowance received for U.S. Appl. No. 17/031,654, mailed on Feb. 10, 2021, 9 pages.
Notice of Allowance received for U.S. Appl. No. 17/031,654, mailed on May 27, 2021, 8 pages.
Notice of Allowance received for U.S. Appl. No. 17/041,350, mailed on Feb. 24, 2022, 6 pages.
Notice of Allowance received for U.S. Appl. No. 17/078,896, mailed on May 13, 2022, 8 pages.
Notice of Allowance received for U.S. Appl. No. 17/087,845, mailed on Mar. 3, 2022, 9 pages.
Notice of Allowance received for U.S. Appl. No. 17/087,845, mailed on Oct. 28, 2021, 9 pages.
Notice of Allowance received for U.S. Appl. No. 17/317,042, mailed on Jul. 26, 2022, 12 pages.
Notice of Allowance received for U.S. Appl. No. 17/373,163, mailed on Jul. 27, 2022, 8 pages.
Notice of Allowance received for U.S. Appl. No. 17/373,163, mailed on May 11, 2022, 8 pages.
Nova Launcher—Lock Screen Edit, Online Available at: https://forums.androidcentral.com/ask-question/835057-nova-launcher-lock-screen-edit.html, Sep. 2017, 2 pages.
Nova, "Tour of the Solar System", Retrieved from <http://www.pbs.org/wgbh/nova/space/tour-solar-system.html>, May 24, 2013, 14 pages.
Obara, Yuuta, "iPhone Application Selection for University Students", Shuwa System Co., Saito Kazukuni, vol. 1, May 16, 2013, 4 pages (Official Copy only) (See Communication under 37 CFR § 1.98(a) (3)).
Octoba, "Just Install It—Utilizing Method for Android Application Business", ASCII Media Works Co. Takano Kiyoshi, vol. 1, Apr. 25, 2013, 6 pages (Official Copy only) (See Communication under 37 CFR § 1.98(a) (3)).
Office Action and Search Report received for Danish Patent Application No. PA201970598, mailed on Jan. 28, 2020, 6 pages.
Office Action received for Australian Patent Application No. 2015101020, mailed on Oct. 26, 2015, 8 pages.
Office Action received for Danish Patent Application No. PA201570499, mailed on Nov. 1, 2017, 6 pages.
Office Action received for European Patent Application No. 15730924.6, mailed on Dec. 12, 2017, 8 pages.
Office Action received for Australian Patent Application No. 2015101019, mailed on Oct. 14, 2015, 3 pages.
Office Action received for Australian Patent Application No. 2015101019, mailed on Apr. 7, 2016, 4 pages.
Office Action received for Australian Patent Application No. 2015101021, mailed on Apr. 26, 2016, 4 pages.
Office Action received for Australian Patent Application No. 2015101021, mailed on Oct. 28, 2015, 10 pages.
Office Action received for Australian Patent Application No. 2015298710, mailed on Apr. 13, 2017, 3 pages.
Office Action received for Australian Patent Application No. 2015298710, mailed on Feb. 15, 2017, 2 pages.
Office Action received for Australian Patent Application No. 2015298710, mailed on Nov. 6, 2018, 4 pages.
Office Action received for Australian Patent Application No. 2015298710, mailed on Sep. 24, 2018, 4 pages.
Office Action received for Australian Patent Application No. 2016100411, mailed on Jun. 10, 2016, 3 pages.
Office Action received for Australian Patent Application No. 2016100476, mailed on Jun. 9, 2016, 4 pages.
Office Action received for Australian Patent Application No. 2016100765, mailed on Aug. 5, 2016, 2 pages.
Office Action received for Australian Patent Application No. 2016100765, mailed on Dec. 16, 2016, 3 pages.
Office Action received for Australian Patent Application No. 2016229847, mailed on Jul. 3, 2018, 4 pages.
Office Action received for Australian Patent Application No. 2017277813, mailed on Jun. 11, 2019, 3 pages.
Office Action received for Australian Patent Application No. 2017277813, mailed on Mar. 20, 2020, 4 pages.
Office Action received for Australian Patent Application No. 2018201089, mailed on Jul. 23, 2020, 4 pages.
Office Action received for Australian Patent Application No. 2018201089, mailed on Oct. 11, 2019, 4 pages.
Office Action received for Australian Patent Application No. 2018206770, mailed on Apr. 30, 2019, 4 pages.
Office Action received for Australian Patent Application No. 2018206770, mailed on Jul. 16, 2019, 5 pages.
Office Action received for Australian Patent Application No. 2018206770, mailed on Jul. 25, 2018, 5 pages.
Office Action received for Australian Patent Application No. 2018206770, mailed on Mar. 5, 2019, 3 pages.
Office Action received for Australian Patent Application No. 2018279037, mailed on Jan. 17, 2020, 4 pages.
Office Action received for Australian Patent Application No. 2018279037, mailed on Jun. 18, 2019, 5 pages.

(56) References Cited

OTHER PUBLICATIONS

Office Action received for Australian Patent Application No. 2019208225, mailed on Dec. 21, 2020, 3 pages.
Office Action received for Australian Patent Application No. 2019208225, mailed on Mar. 20, 2020, 3 pages.
Office Action received for Australian Patent Application No. 2019267413, mailed on Jun. 29, 2021, 3 pages.
Office Action received for Australian Patent Application No. 2020102158, mailed on Apr. 27, 2021, 5 pages.
Office Action received for Australian Patent Application No. 2020102158, mailed on Dec. 8, 2020, 9 pages.
Office Action received for Australian Patent Application No. 2020204506, mailed on Dec. 7, 2020, 6 pages.
Office Action received for Australian Patent Application No. 2020239670, mailed on Mar. 3, 2021, 4 pages.
Office Action received for Australian Patent Application No. 2020239749, mailed on Jan. 21, 2022, 4 pages.
Office Action received for Australian Patent Application No. 2020239749, mailed on Jul. 16, 2021, 5 pages.
Office Action received for Australian Patent Application No. 2020239774, mailed on Jun. 28, 2021, 8 pages.
Office Action received for Australian Patent Application No. 2020239774, mailed on Oct. 5, 2021, 3 pages.
Office Action received for Australian Patent Application No. 2020250323, mailed on Dec. 14, 2021, 2 pages.
Office Action received for Australian Patent Application No. 2020309093, mailed on Jan. 21, 2021, 3 pages.
Office Action received for Australian Patent Application No. 2021202797, mailed on Feb. 4, 2022, 5 pages.
Office Action received for Australian Patent Application No. 2021202834, mailed on May 28, 2021, 2 pages.
Office Action received for Australian Patent Application No. 2021203216, mailed on Mar. 7, 2022, 8 pages.
Office Action received for Australian Patent Application No. 2021245228, mailed on Aug. 31, 2022, 2 pages.
Office Action received for Australian Patent Application No. 2022202292, mailed on May 10, 2022, 2 pages.
Office Action received for Australian Patent Application No. 2015101019, mailed on Feb. 12, 2016, 4 pages.
Office Action received for Chinese Patent Application No. 201520595384.6, mailed on Mar. 25, 2016, 3 pages (1 page of English Translation and 2 pages of Official copy).
Office Action received for Chinese Patent Application No. 201510479088.4, mailed on Apr. 22, 2020, 7 pages (3 pages of English Translation and 4 pages of Official Copy).
Office Action received for Chinese Patent Application No. 201510479088.4, mailed on Mar. 12, 2018, 20 pages (6 pages of English Translation and 14 pages of Official Copy).
Office Action received for Chinese Patent Application No. 201510479088.4, mailed on May 7, 2019, 6 pages (3 pages of English Translation and 3 pages of Official Copy).
Office Action received for Chinese Patent Application No. 201510481525.6, mailed on Aug. 29, 2018, 10 pages (5 pages of English Translation and 5 pages of Official copy).
Office Action received for Chinese Patent Application No. 201510481525.6, mailed on Nov. 29, 2017, 9 pages (3 pages of English Translation and 6 pages of Official Copy).
Office Action received for Chinese Patent Application No. 201510483268.X, mailed on Apr. 16, 2019, 6 pages (3 pages of English Translation and 3 pages of Official Copy).
Office Action received for Chinese Patent Application No. 201510483268.X, mailed on Dec. 1, 2017, 11 pages (5 pages of English Translation and 6 pages of Official Copy).
Office Action received for Chinese Patent Application No. 201510483268.X, mailed on Oct. 19, 2018, 10 pages (5 pages of English Translation and 5 pages of Official Copy).
Office action received for Chinese Patent Application No. 201510483305.7, mailed on Aug. 31, 2018, 10 pages (5 pages of English Translation and 5 pages of Official copy).
Office action received for Chinese Patent Application No. 201510483305.7, mailed on Dec. 1, 2017, 13 pages (5 pages of English Translation and 8 pages of Official Copy).
Office Action received for Chinese Patent Application No. 201510484514.3, mailed on Apr. 4, 2018, 12 pages (5 pages of English Translation and 7 pages of Official Copy).
Office Action received for Chinese Patent Application No. 201510484514.3, mailed on Dec. 24, 2018, 13 pages (6 pages of English Translation and 7 pages of Official Copy).
Office Action received for Chinese Patent Application No. 201520594249.X, mailed on Mar. 25, 2016, 3 pages (1 page of English Translation and 2 pages of Official copy).
Office Action received for Chinese Patent Application No. 201520595384.6, mailed on Dec. 30, 2016, 2 pages (Official Copy only) (See Communication under 37 CFR § 1.98(a) (3)).
Office Action received for Chinese Patent Application No. 201520595384.6, mailed on Jul. 22, 2016, 3 pages (1 page of English Translation and 2 pages of Official Copy).
Office Action received for Chinese Patent Application No. 201520595385.0, mailed on Dec. 30, 2016, 2 pages (Official Copy only) (See Communication under 37 CFR § 1.98(a) (3)).
Office Action received for Chinese Patent Application No. 201520595385.0, mailed on Jul. 22, 2016, 3 pages (1 page of English Translation and 2 pages of Official Copy).
Office Action received for Chinese Patent Application No. 201520595385.0, mailed on Mar. 25, 2016, 3 pages (1 page of English Translation and 2 pages of Official copy).
Office Action Received for Chinese Patent Application No. 201520595408.8, mailed on Dec. 9, 2015, 4 pages. (2 pages of English Translation and 2 pages of Official Copy).
Office Action received for Chinese Patent Application No. 201520595408.8, mailed on Dec. 30, 2016, 2 pages (Official Copy Only) (See Communication under 37 CFR § 1.98(a) (3)).
Office Action received for Chinese Patent Application No. 201520595408.8, mailed on Jul. 25, 2016, 3 pages (1 page of English Translation and 2 pages of Official Copy).
Office Action received for Chinese Patent Application No. 201520595408.8, mailed on Mar. 25, 2016, 3 pages (1 page of English Translation and 2 pages of Official copy).
Office Action received for Chinese Patent Application No. 201520595538.1, mailed on Dec. 30, 2016, 2 pages (Official Copy only) (See Communication under 37 CFR § 1.98(a) (3)).
Office Action received for Chinese Patent Application No. 201520595538.1, mailed on Jul. 22, 2016, 3 pages (1 page of English Translation and 2 pages of Official copy).
Office Action received for Chinese Patent Application No. 201520595538.1, mailed on Mar. 25, 2016, 3 pages (1 page of English Translation and 2 pages of Official copy).
Office Action received for Chinese Patent Application No. 201680013193.1, mailed on Feb. 1, 2021, 8 pages (3 pages of English Translation and 5 pages of Official Copy).
Office Action received for Chinese Patent Application No. 201680013193.1, mailed on Mar. 25, 2020, 21 pages (8 pages of English Translation and 13 pages of Official Copy).
Office Action received for Chinese Patent Application No. 201680013193.1, mailed on Sep. 7, 2020, 6 pages (3 pages of English Translation and 3 pages of Official Copy).
Office Action received for Chinese Patent Application No. 201680047983.1, mailed on Feb. 1, 2021, 6 pages (3 pages of English Translation and 3 pages of Official Copy).
Office Action received for Chinese Patent Application No. 201680047983.1, mailed on Jul. 1, 2020, 6 pages (3 pages of English Translation and 3 pages of Official Copy).
Office Action received for Chinese Patent Application No. 201680047983.1, mailed on Mar. 18, 2019, 18 pages (6 pages of English Translation and 12 pages of Official Copy).
Office Action received for Chinese Patent Application No. 201680047983.1, mailed on Nov. 28, 2019, 9 pages (4 pages of English Translation and 5 pages of Official Copy).
Office Action received for Chinese Patent Application No. 201780033973.7, mailed on Jan. 22, 2021, 27 pages (11 pages of English Translation and 16 pages of Official Copy).

(56) References Cited

OTHER PUBLICATIONS

Office Action received for Chinese Patent Application No. 201810037665.8, mailed on Dec. 7, 2018, 10 pages (5 pages of English Translation and 5 pages of Official Copy).
Office Action received for Chinese Patent Application No. 201910906898.1, mailed on Jun. 23, 2021, 6 pages (3 pages of English Translation and 3 pages of Official Copy).
Office Action received for Chinese Patent Application No. 201910906898.1, mailed on Sep. 9, 2020, 8 pages (3 pages of English Translation and 5 pages of Official Copy).
Office Action received for Chinese Patent Application No. 202110194015.6, mailed on Sep. 28, 2021, 13 pages (6 pages of English Translation and 7 pages of Official Copy).
Office Action received for Chinese Patent Application No. 202110453180.9, mailed on Jun. 16, 2022, 14 pages (7 pages of English Translation and 7 pages of Official Copy).
Office Action received for Chinese Patent Application No. 202110453180.9, mailed on Nov. 8, 2021, 21 pages (11 pages of English Translation and 10 pages of Official Copy).
Office Action received for Chinese Patent Application No. 202110454541.1, mailed on Oct. 20, 2021, 19 pages (10 pages of English Translation and 9 pages of Official Copy).
Office Action received for Chinese Patent Application No. 202110783860.7, mailed on Mar. 10, 2022, 15 pages (5 pages of English Translation and 10 pages of Official Copy).
Office Action received for Chinese Patent Application No. 202111457936.3, mailed on Jul. 5, 2022, 18 pages (9 pages of English Translation and 9 pages of Official Copy).
Office Action Received for Chinese Patent Application No. 201520594249.X, mailed on Dec. 9, 2015, 4 pages (2 pages of English Translation and 2 pages of Official Copy).
Office Action Received for Chinese Patent Application No. 201520595384.6, mailed on Dec. 9, 2015, 4 pages. (2 pages of English Translation and 2 pages of Official Copy).
Office Action Received for Chinese Patent Application No. 201520595385.0, mailed on Dec. 9, 2015, 4 pages (2 pages of English Translation and 2 pages of Official Copy).
Office Action Received for Chinese Patent Application No. 201520595538.1, mailed on Dec. 9, 2015, 4 pages (2 pages of English Translation and 2 pages of Official Copy).
Office Action received for Danish Patent Application No. PA201570495, mailed on Dec. 9, 2016, 2 pages.
Office action received for Danish Patent Application No. PA201570495, mailed on May 4, 2016, 8 pages.
Office Action received for Danish Patent Application No. PA201570495, mailed on Oct. 29, 2015, 7 pages.
Office Action received for Danish Patent Application No. PA201570497, mailed on Feb. 21, 2017, 3 pages.
Office Action received for Danish Patent Application No. PA201570497, mailed on May 17, 2016, 6 pages.
Office Action received for Danish Patent Application No. PA201570497, mailed on Nov. 15, 2016, 2 pages.
Office Action received for Danish Patent Application No. PA201570497, mailed on Oct. 24, 2017, 2 pages.
Office Action received for Danish Patent Application No. PA201570498, mailed on Feb. 6, 2017, 2 pages.
Office Action received for Danish Patent Application No. PA201570498, mailed on Jun. 2, 2016, 8 pages.
Office Action received for Danish Patent Application No. PA201570498, mailed on Oct. 26, 2017, 5 pages.
Office Action received for Danish Patent Application No. PA201570498, mailed on Oct. 30, 2015, 7 pages.
Office Action received for Danish Patent Application No. PA201570499, mailed on Feb. 14, 2017, 2 pages.
Office Action received for Danish Patent Application No. PA201570499, mailed on Jun. 16, 2016, 8 pages.
Office Action received for Danish Patent Application No. PA201570499, mailed on Jun. 19, 2018, 4 pages.
Office Action received for Danish Patent Application No. PA201570499, mailed on Nov. 3, 2015, 7 pages.
Office Action Received for Danish Patent Application No. PA201570768, mailed on Sep. 13, 2016, 8 pages.
Office Action received for Danish Patent Application No. PA201570770, mailed on Apr. 7, 2017, 7 pages.
Office Action received for Danish Patent Application No. PA201570770, mailed on Mar. 17, 2016, 9 pages.
Office Action received for Danish Patent Application No. PA201570770, mailed on Sep. 12, 2016, 6 pages.
Office Action received for Danish Patent Application No. PA201770791, mailed on Jan. 31, 2018, 8 pages.
Office Action received for Danish Patent Application No. PA201770791, mailed on Jul. 13, 2018, 2 pages.
Office Action received for Danish Patent Application No. PA201770791, mailed on Jun. 11, 2019, 3 pages.
Office Action received for Danish Patent Application No. PA201970596, mailed on May 6, 2020, 4 pages.
Office Action received for Danish Patent Application No. PA201970597, mailed on Oct. 29, 2020, 4 pages.
Office Action received for Danish Patent Application No. PA201970598, mailed on Apr. 15, 2021, 6 pages.
Office Action received for Danish Patent Application No. PA201970598, mailed on Oct. 9, 2020, 4 pages.
Office Action received for Danish Patent Application No. PA201970599, mailed on Jan. 23, 2020, 6 pages.
Office Action received for Danish Patent Application No. PA201970599, mailed on Mar. 1, 2021, 4 pages.
Office Action received for Danish Patent Application No. PA201970599, mailed on May 27, 2020, 4 pages.
Office Action received for Danish Patent Application No. PA202070609, mailed on Dec. 10, 2020, 8 pages.
Office Action received for Danish Patent Application No. PA202070610, mailed on Jun. 18, 2021, 8 pages.
Office Action received for Danish Patent Application No. PA202070610, mailed on Mar. 14, 2022, 7 pages.
Office Action received for Danish Patent Application No. PA202070623, mailed on Aug. 24, 2021, 3 pages.
Office Action received for Danish Patent Application No. PA202070623, mailed on May 23, 2022, 3 pages.
Office Action received for Danish Patent Application No. PA202070624, mailed on Feb. 4, 2022, 4 pages.
Office Action received for Danish Patent Application No. PA202070624, mailed on Jun. 16, 2021, 5 pages.
Office Action received for Danish Patent Application No. PA202070625, mailed on Feb. 8, 2022, 2 pages.
Office Action received for Danish Patent Application No. PA202070625, mailed on Jun. 16, 2021, 3 pages.
Office Action received for Danish Patent Application No. PA202070625, mailed on Sep. 23, 2022, 4 pages.
Office Action received for Danish Patent Application No. PA201570496, mailed on Oct. 29, 2015, 6 pages.
Office Action received for Danish Patent Application No. PA201570497, mailed on Oct. 30, 2015, 6 pages.
Office Action received for European Patent Application No. 15730925.3, mailed on Apr. 12, 2018, 8 pages.
Office Action received for European Patent Application No. 15747595.5, mailed on Apr. 15, 2019, 4 pages.
Office Action received for European Patent Application No. 15747595.5, mailed on Jun. 27, 2018, 8 pages.
Office Action received for European Patent Application No. 16762356.0, mailed on Dec. 11, 2020, 7 pages.
Office Action received for European Patent Application No. 16837432.0, mailed on Jan. 10, 2020, 7 pages.
Office Action received for European Patent Application No. 16837432.0, mailed on Jan. 27, 2021, 7 pages.
Office Action received for European Patent Application No. 17206177.2, mailed on May 15, 2018, 6 pages.
Office Action received for European Patent Application No. 17810723.1, mailed on Jul. 9, 2021, 8 pages.
Office Action received for European Patent Application No. 20172197.4, mailed on Aug. 5, 2020, 6 pages.
Office Action received for European Patent Application No. 20172197.4, mailed on Jul. 8, 2021, 5 pages.

(56) References Cited

OTHER PUBLICATIONS

Office Action received for European Patent Application No. 20729346.5, mailed on Jan. 17, 2022, 8 pages.
Office Action received for European Patent Application No. 20729346.5, mailed on Jul. 28, 2022, 9 pages.
Office Action received for European Patent Application No. 20761084.1, mailed on May 9, 2022, 9 pages.
Office Action received for European Patent Application No. 21169911.1, mailed on Jun. 3, 2022, 5 pages.
Office Action received for European Patent Application No. 21177569.7, mailed on Jun. 9, 2022, 5 pages.
Office Action received for European Patent Application No. 15730925.3, mailed on Feb. 27, 2019, 5 pages.
Office Action received for German Patent Application No. 112015003083.2, mailed on Mar. 9, 2018, 12 pages (5 pages of English Translation and 7 pages of Official Copy).
Office Action received for Indian Patent Application No. 202017041557, mailed on Dec. 8, 2021, 8 pages.
Office Action received for Indian Patent Application No. 202017048447, mailed on Sep. 5, 2022, 6 pages.
Office Action received for Indian Patent Application No. 202118025047, mailed on Apr. 26, 2022, 6 pages.
Office Action received for Japanese Patent Application No. 2017-505450, mailed on Jun. 20, 2017, 8 pages (4 pages of English Translation and 4 pages of Official Copy).
Office Action received for Japanese Patent Application No. 2017-505842, mailed on Feb. 22, 2019, 11 pages (6 pages of English Translation and 5 pages of Official Copy).
Office Action received for Japanese Patent Application No. 2017-505842, mailed on Sep. 9, 2019, 7 pages (3 pages of English Translation and 4 pages of Official Copy).
Office Action received for Japanese Patent Application No. 2017-505847, mailed on Feb. 12, 2019, 13 pages (6 pages of English Translation and 7 pages of Official Copy).
Office Action received for Japanese Patent Application No. 2017-545918, mailed on Sep. 14, 2018, 12 pages (7 pages of English Translation and 5 pages of Official copy).
Office Action received for Japanese Patent Application No. 2018-074971, mailed on Jan. 28, 2019, 6 pages (3 pages of English Translation and 3 pages of Official Copy).
Office Action received for Japanese Patent Application No. 2018-537840, mailed on Jul. 8, 2019, 15 pages (8 pages of English Translation and 7 pages of Official copy).
Office Action received for Japanese Patent Application No. 2019-151358, mailed on Oct. 2, 2020, 5 pages (2 pages of English Translation and 3 pages of Official Copy).
Office Action received for Japanese Patent Application No. 2020-074878, mailed on Sep. 7, 2020, 13 pages (7 pages of English Translation and 6 pages of Official Copy).
Office Action received for Japanese Patent Application No. 2020-124605, mailed on Dec. 17, 2021, 2 pages (1 page of English Translation and 1 page of Official Copy).
Office Action received for Japanese Patent Application No. 2020-124605, mailed on May 13, 2022, 6 pages (3 pages of English Translation and 3 pages of Official Copy).
Office Action received for Japanese Patent Application No. 2020-124605, mailed on Sep. 3, 2021, 5 pages (2 pages of English Translation and 3 pages of Official Copy).
Office Action received for Japanese Patent Application No. 2020-159823, mailed on Aug. 15, 2022, 6 pages (3 pages of English Translation and 3 pages of Official Copy).
Office Action received for Japanese Patent Application No. 2020-159823, mailed on Dec. 23, 2021, 8 pages (4 pages of English Translation and 4 pages of Official Copy).
Office Action received for Japanese Patent Application No. 2020-159824, mailed on Dec. 17, 2021, 13 pages (7 pages of English Translation and 6 pages of Official Copy).
Office Action received for Japanese Patent Application No. 2020-159825, mailed on Dec. 10, 2021, 4 pages (2 pages of English Translation and 2 pages of Official Copy).
Office Action received for Japanese Patent Application No. 2020-562622, mailed on Jan. 7, 2022, 13 pages (6 pages of English Translation and 7 pages of Official Copy).
Office Action received for Japanese Patent Application No. 2021-023661, mailed on Feb. 25, 2022, 6 pages (3 pages of English Translation and 3 pages of Official Copy).
Office Action received for Korean Patent Application No. 10-2017-7005939, mailed on Jun. 30, 2017, 6 pages (2 pages of English Translation and 4 pages of Official copy).
Office Action received for Korean Patent Application No. 10-2017-7024570, mailed on Jul. 10, 2019, 6 pages (3 pages of English Translation and 3 pages of Official Copy).
Office Action received for Korean Patent Application No. 10-2017-7024570, mailed on Sep. 28, 2018, 14 pages (6 pages of English Translation and 8 pages of Official copy).
Office Action received for Korean Patent Application No. 10-2018-7018904, mailed on Aug. 20, 2019, 8 pages (3 pages of English Translation and 5 pages of Official Copy).
Office Action received for Korean Patent Application No. 10-2018-7022101, mailed on Feb. 14, 2019, 15 pages (6 pages of English Translation and 9 pages of Official Copy).
Office Action received for Korean Patent Application No. 10-2018-7022101, mailed on Jul. 9, 2019, 10 pages (5 pages of English Translation and 5 pages of Official Copy).
Office Action received for Korean Patent Application No. 10-2019-7029673, mailed on Apr. 8, 2021, 7 pages (3 pages of English Translation and 4 pages of Official Copy).
Office Action received for Korean Patent Application No. 10-2019-7029673, mailed on Nov. 5, 2019, 10 pages (4 pages of English Translation and 6 pages of Official Copy).
Office Action received for Korean Patent Application No. 10-2019-7029673, mailed on Sep. 3, 2020, 9 pages (4 pages of English Translation and 5 pages of Official Copy).
Office Action received for Korean Patent Application No. 10-2020-0123852, mailed on Jun. 9, 2022, 10 pages (4 pages of English Translation and 6 pages of Official Copy).
Office Action received for Korean Patent Application No. 10-2020-0123857, mailed on Jun. 9, 2022, 12 pages (5 pages of English Translation and 7 pages of Official Copy).
Office Action received for Korean Patent Application No. 10-2020-0123887, mailed on Jun. 9, 2022, 5 pages (2 pages of English Translation and 3 pages of Official Copy).
Office Action received for Korean Patent Application No. 10-2020-7001340, mailed on Mar. 26, 2021, 13 pages (6 pages of English Translation and 7 pages of Official Copy).
Office Action received for Korean Patent Application No. 10-2020-7001340, mailed on Sep. 24, 2020, 19 pages (8 pages of English Translation and 11 pages of Official Copy).
Office Action received for Korean Patent Application No. 10-2020-7026036, mailed on Dec. 7, 2020, 8 pages (3 pages of English Translation and 5 pages of Official Copy).
Office Action received for Korean Patent Application No. 10-2020-7028759, mailed on Jun. 29, 2021, 12 pages (5 pages of English Translation and 7 pages of Official Copy).
Office Action received for Korean Patent Application No. 10-2020-7032187, mailed on Jun. 10, 2022, 16 pages (7 pages of English Translation and 9 pages of Official Copy).
Office Action received for Korean Patent Application No. 10-2021-7013453, mailed on Jun. 5, 2021, 6 pages (2 pages of English Translation and 4 pages of Official Copy).
Office Action received for Korean Patent Application No. 10-2021-7013454, mailed on Jun. 5, 2021, 6 pages (2 pages of English Translation and 4 pages of Official Copy).
Office Action received for Korean Patent Application No. 10-2021-7025301, mailed on Oct. 15, 2021, 5 pages (2 pages of English Translation and 3 pages of Official Copy).
Office Action received for Korean Patent Application No. 10-2021-7036016, mailed on Nov. 10, 2021, 13 pages (6 pages of English Translation and 7 pages of Official Copy).
Office Action received for Korean Patent Application No. 10-2021-7036246, mailed on Nov. 26, 2021, 5 pages (2 pages of English Translation and 3 pages of Official Copy).

(56) References Cited

OTHER PUBLICATIONS

Office Action received for Korean Patent Application No. 10-2021-7036678, mailed on Dec. 22, 2021, 6 pages (2 pages of English Translation and 4 pages of Official Copy).
Office Action received for Korean Patent Application No. 10-2022-7019205, mailed on Sep. 21, 2022, 6 pages (2 pages of English Translation and 4 pages of Official Copy).
Office Action received for Netherland Patent Application No. 2015245, mailed on Jan. 24, 2017, 11 pages (1 page of English Translation and 10 pages of Official Copy).
Office Action received for Netherlands Patent Application No. 2015239, mailed on Oct. 28, 2016, 13 pages (5 pages of English Translation and 8 pages of Official Copy).
Office Action Received for Taiwanese Patent Application No. 104124962, mailed on Nov. 29, 2016, 6 pages (3 pages of English Translation and 3 pages of Official Copy).
Office Action received for Taiwanese Patent Application No. 104124998, mailed on Nov. 29, 2016, 6 pages (3 pages of English Translation and 3 pages of Official Copy).
Office Action received for Taiwanese Patent Application No. 104124963, mailed on Jan. 5, 2017, 11 pages (5 pages of English Translation and 6 pages of Official Copy).
Office Action received for Taiwanese Patent Application No. 104124995, mailed on Dec. 1, 2016, 6 pages (3 pages of English Translation and 3 pages of Official Copy).
Office Action received for Taiwanese Patent Application No. 104124997, mailed on Dec. 8, 2016, 12 pages (5 pages of English Translation and 7 pages of Official Copy).
Office Action received for Taiwanese Patent Application No. 104126627, mailed on Aug. 30, 2018, 22 pages (9 pages of English Translation and 13 pages of Official Copy).
Office Action received for Taiwanese Patent Application No. 104126627, mailed on Dec. 20, 2018, 4 pages (2 pages of English Translation and 2 pages of Official Copy).
Office Action received for Taiwanese Patent Application No. 104126627, mailed on Nov. 29, 2016, 9 pages (4 pages of English Translation and 5 pages of Official Copy).
Office Action received for Taiwanese Patent Application No. 104126627, mailed on Oct. 16, 2017, 7 pages (3 pages of English Translation and 4 pages of Official Copy).
Office Action received for Taiwanese Patent Application No. 104132636, mailed on Dec. 13, 2018, 26 pages (9 pages of English Translation and 17 pages of Official Copy).
Office Action received for Taiwanese Patent Application No. 104132636, mailed on Mar. 23, 2017, 25 pages (10 pages of English Translation and 15 pages of Official copy).
Office Action received for Taiwanese Patent Application No. 104132636, mailed on Oct. 31, 2017, 10 pages (4 pages of English Translation and 6 pages of Official Copy).
Omar Romero, "Sony Smartwatch 2 Custom Watchfaces Tutorial", Retrieved From: <https://www.youtube.com/watch?v=8odbxqwSQR8>, May 1, 2014, 2 pages.
Online Alarm Clock, https://web.archive.org/web/20150505081746/http://www.online-stopwatch.com/online-alarm-clock, May 5, 2015, 2 pages.
Pentax K20D Operating Manual, http://www.ricoh-imaging.eu/en/operating-manuals-download.html, Pentax Corporation, 2008, pp. 173-174.
Phandroid, "New Android Wear Wrist Gestures in Marshmallow", Available online at: https://www.youtube.com/watch?v=0WhKuklpQ9A, Feb. 11, 2016, 3 pages.
Phlam Dev, "Clockwork Tomato Presentation", Retrieved from the Internet: URL: https://www.youtube.com/watch?v=2IQDx9REn0E, Apr. 29, 2016, 6 pages.
Phonebuff, "Hybrid Stopwatch & Timer Android App Review", Available Online at: https://www.youtube.com/watch?v=B43oCFPiWvY, Apr. 4, 2012, 7 pages.
Pre-Interview First Office Action received for U.S. Appl. No. 14/815,890, mailed on May 26, 2016, 4 pages.
Programmatically download APK from google play store, retrieved from the Internet: https://stackoverflow.com/questions/13703982/prog ram maticallydownload-apk-from-google-play-store/13704021#13704021, Dec. 10, 2012, 2 pages.
Record of Oral Hearing received for U.S. Appl. No. 14/815,890, mailed on Nov. 20, 2020, 18 pages.
Rehman A, "Install Android 4.2 Gesture-Based Keyboard & Clock App on Jelly Bean 4.1 or Higher", Excerpts From, Available online at <http://www.addictivetips.com/android/install-android-4-2-keyboard-clock-app-apk-on-jelly-bean-4-1-x/>, Nov. 3, 2012, 4 pages.
Restriction Requirement received for U.S. Appl. No. 14/815,890, mailed on Feb. 22, 2016, 5 pages, 5 pages.
Result of Consultation received for European Patent Application No. 16762356.0, mailed on Nov. 29, 2021, 3 pages.
Result of Consultation received for European Patent Application No. 20185974.1, mailed on Apr. 4, 2022, 4 pages.
Result of Consultation received for European Patent Application No. 15730925.3, mailed on Nov. 24, 2020, 4 pages.
Rosa et al., "Stripe Generator—a Free Tool for the Web Design Community", Available online at: http://www.stripegenerator.com/, Mar. 28, 2019, 10 pages.
Rowinski Dan, "Why the All-In-One Smartwatch Isn't Happening Any Time Soon", Online available at:—https://web.archive.org/web/20140123074218if_/https://readwrite.com/2014/01/20/smartwatch-wearable-fitness-remote-control/, Jan. 20, 2014, 6 pages.
Search Report and Opinion received for Danish Patent Application No. PA201970596, mailed on Dec. 4, 2019, 11 pages.
Search Report and Opinion received for Danish Patent Application No. PA201970597, mailed on Dec. 18, 2019, 10 pages.
Search Report and Opinion received for Danish Patent Application No. PA201970598, mailed on Oct. 31, 2019, 9 pages.
Search Report and Opinion received for Danish Patent Application No. PA201970599, mailed on Nov. 8, 2019, 12 pages.
Search Report and Opinion received for Danish Patent Application No. PA202070610, mailed on Jan. 8, 2021, 9 pages.
Search Report and Opinion received for Danish Patent Application No. PA202070623, mailed on Dec. 21, 2020, 9 pages.
Search Report and Opinion received for Danish Patent Application No. PA202070624, mailed on Dec. 10, 2020, 10 pages.
Search Report and Opinion received for Danish Patent Application No. PA202070625, mailed on Dec. 17, 2020, 9 pages.
Search Report and Opinion Received for Netherland Patent Application No. 2015232, mailed on Jan. 25, 2017, 9 pages (1 page of English Translation and 8 pages of Official Copy).
Search Report and Opinion received for Netherlands Patent Application No. 2015242, mailed on Jul. 4, 2017, 20 pages (10 pages of English Translation of Search Opinion and 10 pages of official copy).
Search Report and Opinion received for Netherlands Patent Application No. 2018531, mailed on Jul. 27, 2017, 14 pages (6 pages of English Translation and 8 pages of Official Copy).
Search Report received for Danish Patent Application No. 201570768, mailed on Mar. 17, 2016, 11 pages.
Search Report received for Netherlands Patent Application No. 2015236, mailed on Apr. 21, 2021, 19 pages (13 pages of English Translation and 6 pages of Official Copy).
Shiota Shinji, "Windows 7 Dojo", Weekly ASCII, Ascii Mediaworks Inc., vol. 798, Aug. 31, 2010, 3 pages.
Singh Lovepreet, "Samsung Galaxy Watch: How to Change Watch Face—Tips and Tricks", Online available at: <https://www.youtube.com/watch?pp=desktop&v=IN7gPxTZ1qU>, Dec. 4, 2018, 80 pages.
Smartwatch, "App Earth Space HD Live Wallpaper APK for Smart Watch", Version 1.7, Android version 2.2, Aug. 27, 2013, 1 page.
Solar Walk Free, Vito Technology, Jun. 19, 2014, 9 pages.
Sony Smartwatch 2 update—new features and watchface creator!!! New!!!, Online available at:- https://www.youtube.com/watch?v=k3jjBv7QZSk, May 8, 2014, 3 pages.
Sony, "Live View™ micro display", Extended User Guide, Aug. 2010, 27 pages.
Sony, "Sony SmartWatch", User Guide, Dec. 2011, 18 pages.
Stateoftech, "Samsung Galaxy Gear Tips—Installing and Customizing Clock Faces", Online available at:—https://www.youtube.com/watch?v=p2GzpL3xIUo, Dec. 12, 2013, 3 pages.

(56) References Cited

OTHER PUBLICATIONS

Stateoftech, "Samsung Galaxy Gear Tips—Change the Clock Face", Retrieved from: https://www.youtube.com/watch?v=GOom7AZUAjY, Dec. 11, 2013, 2 pages.
Summons to Attend Oral Proceedings received for European Patent Application No. 15730924.6, mailed on Jun. 13, 2018, 10 pages.
Summons to Attend Oral Proceedings received for European Patent Application No. 15730925.3, mailed on Oct. 2, 2019, 8 pages.
Summons to Attend Oral Proceedings received for European Patent Application No. 16762356.0, mailed on May 10, 2021, 10 pages.
Summons to Attend Oral Proceedings received for European Patent Application No. 17206177.2, mailed on Jun. 3, 2019, 8 pages.
Summons to Attend Oral Proceedings received for European Patent Application No. 17810723.1, mailed on Jul. 5, 2022, 8 pages.
Sun Set, "Sun Set solar image clock", Available at <https://web.archive.orgjweb/20140719005410/http://www.sunsetclock.com/>, 2013, 5 pages.
Supplemental Notice of Allowance received for U.S. Appl. No. 14/815,890, mailed on Mar. 10, 2021, 2 pages.
Supplemental Notice of Allowance received for U.S. Appl. No. 16/585,399, mailed on Aug. 26, 2020, 2 pages.
Supplemental Notice of Allowance received for U.S. Appl. No. 16/867,002, mailed on Mar. 16, 2022, 2 pages.
Supplemental Notice of Allowance received for U.S. Appl. No. 16/867,002, mailed on Sep. 9, 2021, 2 pages.
Supplemental Notice of Allowance received for U.S. Appl. No. 16/997,588, mailed on Apr. 20, 2022, 4 pages.
Supplemental Notice of Allowance received for U.S. Appl. No. 16/997,588, mailed on Oct. 22, 2021, 4 pages.
Talkandroid, "Android Wear walkthrough", Available online at: https://www.youtube.com/watch?v=4xntpZac4sw, Jun. 30, 2014, 1 page.
Techcloud, "How to Create Custom Watch Face for Samsung Galaxy Gear Smartwatch just in Few Seconds", Online available at:—https://www.youtube.com/watch?v=6rO-_SREDjQ, Oct. 9, 2013, 3 pages.
The Simply Alarm app for Pebble, available online at <https://web.archive.org/web/20150517070400>/http://www.rebootsramblings.ca/n/sahhelp/https://www.youtube.com/watch?v=IVp1scQPw08, May 17, 2015, 1 page.
Theunlockr, "How to Change the Watch Face on the Galaxy Gear", Online available at:—https://www.youtube.com/watch?v=Z7EBG5aBiZg, Jan. 3, 2014, 3 pages.
Tweedie Steven, "Create and Customize Your Own Emojis with 'Makemoji' for iPhone", Available online at: http://www.businessinsider.com/create-custom-emojis-with-makemoji-app-2014-8, Aug. 19, 2014, 6 pages.
UIKit User Interface Catalog: Page Controls, Available online at https://web.archive.org/web/20140703123442/https://developer.apple.com/library/ios/documentation/userexperience/conceptual/UIKitUICatalog/UIPageControl.html, Dec. 16, 2013, 4 pages.
Vidstube, "Bitmoji Clockface on Fitbit Versa Sense/Versa 3/Versa 2", Available online at:<https://www.youtube.com/watch?v=4V_xDnSLeHE>, Retrieved on Dec. 3, 2020, Jun. 30, 2019, 1 page.
Viticci Frederico, "Checking Time Zones with Living Earth—MacStories", Available at <https://www.macstories.net/reviews/checking-time-zones-with-living-earth/>, Dec. 11, 2013, pp. 1-5.
Wade Cliff, "Get the most out of Nova Launcher: Changing Icon Sizes", Online Available at: https://www.androidguys.com/tips-tools/get-nova-launcher-changing-icon-sizes/, Nov. 16, 2015, 6 pages.
Wade Cliff, "Get the most out of Nova Launcher: Customizing the Dock (Contest Included)", Online Available at: https://www.androidguys.com/tips-tools/get-nova-launcher-customizing-dockcontest-included/, Dec. 1, 2015, 5 pages.
Watchophilia, "Mickey Mouse Watches", Online Available at: https://web.archive.org/web/20130929065422/https://www.watchophilia.com/photogallery/mickey-mouse/, Sep. 29, 2013, 16 pages.
Watchuseek, "The watch every father needs: M-I-C-K-E-Y, M-O-U-S-E. Mickey Mouse . . . ?", Online Available at: https://forums.watchuseek.com/f2/watch-every-father-needs-m-i-c-k-e-y-m-o-u-s-e-mickey-mouse-855069.html, 2013, 3 pages.
Wearablezone, "How to Set up Your Fitbit Profile", Online available at:—<https://youtu.be/jsWPtcDWiJM>, Jun. 6, 2016, 3 pages.
Whitwam Ryan, "Facer is Fast Becoming the De Facto Custom Watch Face Maker for Android Wear", Available online at: http://www.androidpolice.com/2014/09/19/facer-is-fast-becoming-the-defacto-custom-watch-face-maker-for-android-wear, Sep. 19, 2014, 11 pages.
Wikipedia, "Emoji", Available online at: https://en.wikipedia.org/w/index.php?title=Emoji&oldid=648831795, Feb. 25, 2015, 12 pages.
Wikipedia, "Emoticon", Available online at: https://en.wikipedia.org/w/index.php?title=Emoticon&oldid=648776142, Feb. 25, 2015, 9 pages.
Woolsey Amanda, "How to Customize the Clock on the Apple Watch", Available online at:<https://www.youtube.com/watch?v=t-3Bckdd9B4>, Retrieved on Dec. 11, 2020, Apr. 25, 2015, 1 page.
Xdream, "TickTalk Video User Manual", YouTube [online] [video], Online available at: <https://youtu.be/jYhq3DwmVzo>, Mar. 17, 2017, 3 pages.
Zelgadis, "Reuse Animations—Synfig Animation Studio", Available online at: https://wiki.synfig.org/index.php?title=Doc:Reuse_Animations&oldid=18173, May 20, 2013, 5 pages.
Zephyrnix, "Steam's In-Game Home menu", Online Available at: <https://www.youtube.com/watch?v=jLoRFiPkcUw>, see 0;00-1;06., Feb. 15, 2011, 3 pages.
Zukerman Erez, "6 Beautiful, Interesting & Versatile Timer Apps [Android]", available at: http://www.makeuseof.com/tag/beautiful-interesting-versatile-timer-apps-android/, May 18, 2012, 5 pages.
Applicant-Initiated Interview Summary received for U.S. Appl. No. 16/389,722, mailed on Nov. 4, 2022, 4 pages.
Applicant-Initiated Interview Summary received for U.S. Appl. No. 17/031,765, mailed on Nov. 16, 2022, 5 pages.
Brief Communication Regarding Oral Proceedings received for European Patent Application No. 17810723.1, mailed on Nov. 11, 2022, 1 page.
Final Office Action received for U.S. Appl. No. 17/031,671, mailed on Nov. 15, 2022, 27 pages.
International Search Report and Written Opinion received for PCT Patent Application No. PCT/US2022/029279, mailed on Nov. 9, 2022, 16 pages.
Invitation to Pay Additional Fees and Partial International Search Report received for PCT Patent Application No. PCT/US2022/029279, mailed on Sep. 15, 2022, 9 pages.
Notice of Allowance received for Chinese Patent Application No. 202111457936.3, mailed on Nov. 7, 2022, 4 pages (1 page of English Translation and 3 pages of Official Copy).
Notice of Allowance received for U.S. Appl. No. 16/418,786, mailed on Nov. 22, 2022, 6 pages.
Notice of Allowance received for U.S. Appl. No. 17/317,042, mailed on Nov. 9, 2022, 10 pages.
Examiner's Answer to Appeal Brief received for U.S. Appl. No. 15/405,122, mailed on Jan. 11, 2023, 16 pages.
Examiner's Answer to Appeal Brief received for U.S. Appl. No. 16/861,651, mailed on Jan. 18, 2023, 16 pages.
Non-Final Office Action received for U.S. Appl. No. 17/681,584, mailed on Jan. 18, 2023, 12 pages.
Notice of Acceptance received for Australian Patent Application No. 2021250863, mailed on Jan. 13, 2023, 3 pages.
Notice of Allowance received for Japanese Patent Application No. 2022-139320, mailed on Jan. 6, 2023, 4 pages (1 page of English Translation and 3 pages of Official Copy).
Notice of Allowance received for Korean Patent Application No. 10-2022-7019205, mailed on Jan. 5, 2023, 8 pages (2 pages of English Translation and 6 pages of Official Copy).
Office Action received for European Patent Application No. 20730136.7, mailed on Jan. 19, 2023, 4 pages.
Applicant-Initiated Interview Summary received for U.S. Appl. No. 17/158,936, mailed on Dec. 28, 2022, 4 pages.
Final Office Action received for U.S. Appl. No. 17/591,184, mailed on Dec. 23, 2022, 10 pages.
Intention to Grant received for European Patent Application No. 17810723.1, mailed on Dec. 16, 2022, 9 pages.

(56) References Cited

OTHER PUBLICATIONS

Non-Final Office Action received for U.S. Appl. No. 17/738,940, mailed on Dec. 22, 2022, 31 pages.
Notice of Allowance received for Korean Patent Application No. 10-2022-7014529, mailed on Dec. 13, 2022, 8 pages (2 pages of English Translation and 6 pages of Official Copy).
Notice of Allowance received for U.S. Appl. No. 17/515,143, mailed on Dec. 16, 2022, 11 pages.
Office Action received for European Patent Application No. 20761084.1, mailed on Dec. 14, 2022, 5 pages.
Poppinga et al., "Sensor-Based Identification of Opportune Moments for Triggering Notifications", IEEE CS, Mar. 14, 2014, pp. 22-29.
Pradhan et al., "Understanding and Managing Notifications", IEEE Infocom 2017—IEEE Conference on Computer Communications, May 1, 2017, 9 pages.
Decision to Refuse received for Japanese Patent Application No. 2020-159824, mailed on Sep. 30, 2022, 6 pages (3 pages of English Translation and 3 pages of Official Copy).
Notice of Acceptance received for Australian Patent Application No. 2021245228, mailed on Oct. 4, 2022, 3 pages.
Notice of Acceptance received for Australian Patent Application No. 2022220279, mailed on Sep. 27, 2022, 3 pages.
Notice of Allowance received for Japanese Patent Application No. 2022-512865, mailed on Oct. 3, 2022, 4 pages (1 page of English Translation and 3 pages of Official Copy).
Notice of Allowance received for U.S. Appl. No. 17/341,839, mailed on Oct. 5, 2022, 5 pages.
Office Action received for Australian Patent Application No. 2021250863, mailed on Oct. 6, 2022, 6 pages.
Office Action received for European Patent Application No. 20730136.7, mailed on Oct. 6, 2022, 11 pages.
Office Action received for Japanese Patent Application No. 2021-023661, mailed on Oct. 3, 2022, 8 pages (4 pages of English Translation and 4 pages of Official Copy).
Advisory Action received for U.S. Appl. No. 17/031,765, mailed on Dec. 12, 2022, 7 pages.
Applicant-Initiated Interview Summary received for U.S. Appl. No. 17/031,671, mailed on Dec. 9, 2022, 5 pages.
International Preliminary Report on Patentability received for PCT Patent Application No. PCT/US2021/031212, mailed on Nov. 24, 2022, 16 pages.
International Preliminary Report on Patentability received for PCT Patent Application No. PCT/US2021/031669, mailed on Nov. 24, 2022, 12 pages.
Minutes of the Oral Proceedings received for European Patent Application No. 17810723.1, mailed on Dec. 9, 2022, 7 pages.
Non-Final Office Action received for U.S. Appl. No. 17/158,936, mailed on Nov. 30, 2022, 17 pages.
Notice of Allowance received for Japanese Patent Application No. 2020-124605, mailed on Dec. 5, 2022, 4 pages (1 page of English Translation and 3 pages of Official Copy).
Notice of Allowance received for Korean Patent Application No. 10-2020-0123852, mailed on Nov. 28, 2022, 7 pages (2 pages of English Translation and 5 pages of Official Copy).
Notice of Allowance received for Korean Patent Application No. 10-2020-0123887, mailed on Nov. 28, 2022, 7 pages (2 pages of English Translation and 5 pages of Official Copy).
Notice of Allowance received for U.S. Appl. No. 17/341,839, mailed on Dec. 2, 2022, 6 pages.
Office Action received for European Patent Application No. 21169911.1, mailed on Dec. 1, 2022, 4 pages.
Result of Consultation received for European Patent Application No. 17810723.1, mailed on Nov. 30, 2022, 3 pages.
Hoffman, Chris, "5+ Cool Uses for Android's Daydream Mode", retrieved from—https://www.howtogeek.com/170990/5-cool-uses-for-androids-daydream-mode, Jul. 12, 2017, 8 pages.
Spears, Ann, "dimming screen before/instead of screensaver?", retrieved from—https://discussions.apple.com/thread/339700, Jan. 28, 2006, 1 page.

Applicant-Initiated Interview Summary received for U.S. Appl. No. 17/591,184, mailed on Feb. 27, 2023, 2 pages.
Applicant-Initiated Interview Summary received for U.S. Appl. No. 17/713,016, mailed on Feb. 14, 2023, 4 pages.
Notice of Allowance received for U.S. Appl. No. 16/935,002, mailed on Feb. 15, 2023, 15 pages.
Notice of Allowance received for U.S. Appl. No. 17/556,165, mailed on Feb. 21, 2023, 12 pages.
Notice of Allowance received for U.S. Appl. No. 17/591,184, mailed on Feb. 22, 2023, 5 pages.
Applicant Initiated Interview Summary received for U.S. Appl. No. 17/681,584, mailed on Mar. 24, 2023, 2 pages.
Corrected Notice of Allowance received for U.S. Appl. No. 16/935,002, mailed on Mar. 28, 2023, 2 pages.
Corrected Notice of Allowance received for U.S. Appl. No. 17/515,143, mailed on Mar. 29, 2023, 2 pages.
Final Office Action received for U.S. Appl. No. 16/389,722, mailed on Mar. 17, 2023, 14 pages.
Intention to Grant received for European Patent Application No. 20761084.1, mailed on Mar. 27, 2023, 10 pages.
Non-Final Office Action received for U.S. Appl. No. 16/943,737, mailed on Mar. 28, 2023, 28 pages.
Non-Final Office Action received for U.S. Appl. No. 17/031,671, mailed on Mar. 17, 2023, 34 pages.
Non-Final Office Action received for U.S. Appl. No. 17/031,765, mailed on Mar. 28, 2023, 31 pages.
Notice of Allowance received for Korean Patent Application No. 10-2020-0123852, mailed on Mar. 9, 2023, 7 pages (2 pages of English Translation and 5 pages of Official Copy).
Office Action received for Australian Patent Application No. 2022201419, mailed on Mar. 20, 2023, 3 pages.
Office Action received for Australian Patent Application No. 2022202583, mailed on Mar. 24, 2023, 4 pages.
Droid Life, "20+ Galaxy S9, S9+ Tips and Tricks", Available Online at: https://www.youtube.com/watch?v=sso0mYTfV6w, Mar. 22, 2018, pp. 1-33.
Gauging Gadgets, "How to Customize Watch Faces—Garmin Venu Tutorial", Online Available at: https://www.youtube.com/watch?v=dxajKKulaP0, Jan. 7, 2020, 14 pages.
Applicant Initiated Interview Summary received for U.S. Appl. No. 17/746,807, mailed on Mar. 31, 2023, 2 pages.
Applicant-Initiated Interview Summary received for U.S. Appl. No. 17/948,578, mailed on Apr. 11, 2023, 3 pages.
Decision to Grant received for European Patent Application No. 21177569.7, mailed on Apr. 6, 2023, 3 pages.
Final Office Action received for U.S. Appl. No. 17/158,936, mailed on Apr. 7, 2023, 18 pages.
Non-Final Office Action received for U.S. Appl. No. 17/546,630, mailed on Mar. 30, 2023, 41 pages.
Non-Final Office Action received for U.S. Appl. No. 17/947,530, mailed on Mar. 31, 2023, 14 pages.
Applicant-Initiated Interview Summary received for U.S. Appl. No. 17/738,940, mailed on Mar. 7, 2023, 4 pages.
Corrected Notice of Allowance received for U.S. Appl. No. 16/935,002, mailed on Mar. 2, 2023, 2 pages.
Extended European Search Report received for European Patent Application No. 22188724.3, mailed on Mar. 2, 2023, 14 pages.
Final Office Action received for U.S. Appl. No. 17/713,016, mailed on Mar. 15, 2023, 6 pages.
Intention to Grant received for European Patent Application No. 21169911.1, mailed on Mar. 6, 2023, 9 pages.
Lee et al., "Pass: Reducing Redundant Notifications between a Smartphone and a Smartwatch for Energy Saving", IEEE Transactions on Mobile Computing, vol. 19, No. 11, Jul. 23, 2019, pp. 2656-2669.
Lyons, Kent, "Smartwatch Innovation: Exploring a Watch-First Model", Pervasive Computing, Jan. 2016, pp. 10-13.
Notice of Allowance received for Korean Patent Application No. 10-2020-0123857, mailed on Feb. 21, 2023, 6 pages (1 page of English Translation and 5 pages of Official Copy).
Notice of Allowance received for U.S. Appl. No. 17/515,143, mailed on Mar. 13, 2023, 10 pages.

(56) References Cited

OTHER PUBLICATIONS

Notice of Allowance received for U.S. Appl. No. 17/941,962, mailed on Mar. 10, 2023, 11 pages.
Pre-Appeal Review Report received for Japanese Patent Application No. 2020-159823, mailed on Jan. 12, 2023, 4 pages (2 pages of English Translation and 2 pages of Official Copy).
Applicant-Initiated Interview Summary received for U.S. Appl. No. 17/031,765, mailed on Apr. 17, 2023, 4 pages.
Applicant-Initiated Interview Summary received for U.S. Appl. No. 17/068,386, mailed on Apr. 24, 2023, 2 pages.
Corrected Notice of Allowance received for U.S. Appl. No. 17/941,962, mailed on Apr. 14, 2023, 6 pages.
Final Office Action received for U.S. Appl. No. 17/681,584, mailed on Apr. 20, 2023, 15 pages.
Final Office Action received for U.S. Appl. No. 17/746,807, mailed on Apr. 26, 2023, 16 pages.
Intention to Grant received for European Patent Application No. 16837432.0, mailed on Apr. 14, 2023, 8 pages.
Non-Final Office Action received for U.S. Appl. No. 17/591,184, mailed on Apr. 21, 2023, 15 pages.
Notice of Allowance received for Chinese Patent Application No. 201910924197.0, mailed on Apr. 5, 2023, 3 pages (2 pages of English Translation and 1 page of Official Copy).
Notice of Allowance received for Japanese Patent Application No. 2021-023661, mailed on Apr. 10, 2023, 4 pages (1 page of English Translation and 3 pages of Official Copy).
Notice of Allowance received for U.S. Appl. No. 17/713,016, mailed on Apr. 18, 2023, 10 pages.
Office Action received for Australian Patent Application No. 2022218607, mailed on Apr. 14, 2023, 3 pages.
Summons to Attend Oral Proceedings received for European Patent Application No. 20172197.4, mailed on Apr. 14, 2023, 8 pages.
Applicant-Initiated Interview Summary received for U.S. Appl. No. 17/031,765, mailed on May 3, 2023, 6 pages.
Final Office Action received for U.S. Appl. No. 17/068,386, mailed on May 8, 2023, 23 pages.
Invitation to Pay Additional Fees and Partial International Search Report received for PCT Patent Application No. PCT/US2023/011151, mailed on May 12, 2023, 13 pages.
Notice of Allowance received for U.S. Appl. No. 17/941,962, mailed on May 3, 2023, 10 pages.
Office Action received for Australian Patent Application No. 2022203957, mailed on May 12, 2023, 5 pages.
Applicant-Initiated Interview Summary received for U.S. Appl. No. 17/031,765, mailed on Oct. 31, 2023, 5 pages.
Applicant-Initiated Interview Summary received for U.S. Appl. No. 17/746,807, mailed on Nov. 3, 2023, 2 pages.
Extended European Search Report received for European Patent Application No. 23201849.9, mailed on Oct. 26, 2023, 9 pages.
Office Action received for Chinese Patent Application No. 202310124087.2, mailed on Sep. 9, 2023, 24 pages (13 pages of English Translation and 11 pages of Official Copy).
Office Action received for European Patent Application No. 20730136.7, mailed on Nov. 3, 2023, 5 pages.
Office Action received for Japanese Patent Application No. 2022-152693, mailed on Oct. 27, 2023, 6 pages (3 pages of English Translation and 3 pages of Official Copy).
Applicant-Initiated Interview Summary received for U.S. Appl. No. 15/421,865, mailed on Oct. 3, 2023, 6 pages.
Applicant-Initiated Interview Summary received for U.S. Appl. No. 17/717,275, mailed on Sep. 26, 2023, 6 pages.
Decision to Grant received for European Patent Application No. 17810723.1, mailed on Sep. 21, 2023, 2 pages.
Notice of Acceptance received for Australian Patent Application No. 2022203957, mailed on Sep. 27, 2023, 3 pages.
Notice of Acceptance received for Australian Patent Application No. 2022235622, mailed on Sep. 13, 2023, 3 pages.
Notice of Allowance received for U.S. Appl. No. 17/738,940, mailed on Oct. 2, 2023, 9 pages.
Office Action received for Korean Patent Application No. 10-2022-7019034, mailed on Sep. 18, 2023, 6 pages (2 pages of English Translation and 4 pages of Official Copy).
Decision on Appeal received for U.S. Appl. No. 15/405,122, mailed on Dec. 12, 2023, 18 pages.
Examiner's Answer to Appeal Brief received for U.S. Appl. No. 17/031,671, mailed on Dec. 8, 2023, 16 pages.
Office Action received for Korean Patent Application No. 10-2023-7008854, mailed on Nov. 15, 2023, 6 pages (2 pages of English Translation and 4 pages of Official Copy).
Examiner's Answer to Appeal Brief received for U.S. Appl. No. 16/943,737, mailed on Feb. 2, 2024, 15 pages.
Notice of Allowance received for Chinese Patent Application No. 202310124087.2, mailed on Jan. 25, 2024, 4 pages (1 page of English Translation and 3 pages of Official Copy).
Notice of Allowance received for Japanese Patent Application No. 2022-152693, mailed on Feb. 5, 2024, 4 pages (1 page of English Translation and 3 pages of Official Copy).
Notice of Allowance received for Korean Patent Application No. 10-2022-7019034, mailed on Feb. 1, 2024, 7 pages (2 pages of English Translation and 5 pages of Official Copy).
Applicant-Initiated Interview Summary received for U.S. Appl. No. 17/713,005, mailed on Feb. 29, 2024, 2 pages.
Final Office Action received for U.S. Appl. No. 17/746,807, mailed on Feb. 20, 2024, 24 pages.
Notice of Acceptance received for Australian Patent Application No. 2023201920, mailed on Feb. 9, 2024, 3 pages.
Office Action received for Chinese Patent Application No. 201980030338.2, mailed on Feb. 7, 2024, 20 pages (12 pages of English Translation and 8 pages of Official Copy).
Advisory Action received for U.S. Appl. No. 17/031,765, mailed on Nov. 13, 2023, 5 pages.
Decision to Grant received for European Patent Application No. 20729346.5, mailed on Nov. 16, 2023, 2 pages.
International Preliminary Report on Patentability received for PCT Patent Application No. PCT/US2022/029279, mailed on Nov. 23, 2023, 11 pages.
Office Action received for Australian Patent Application No. 2023201920, mailed on Nov. 10, 2023, 2 pages.
Office Action received for Korean Patent Application No. 10-2023-7008379, mailed on Nov. 13, 2023, 15 pages (7 pages of English Translation and 8 pages of Official Copy).
Corrected Notice of Allowance received for U.S. Appl. No. 16/861,651, mailed on Jan. 18, 2024, 3 pages.
Corrected Notice of Allowance received for U.S. Appl. No. 17/738,940, mailed on Jan. 24, 2024, 3 pages.
Non-Final Office Action received for U.S. Appl. No. 17/713,005, mailed on Jan. 19, 2024, 17 pages.
Non-Final Office Action received for U.S. Appl. No. 18/196,345, mailed on Jan. 23, 2024, 17 pages.
Office Action received for Australian Patent Application No. 2023282284, mailed on Jan. 19, 2024, 6 pages.
Applicant-Initiated Interview Summary received for U.S. Appl. No. 17/947,530, mailed on Sep. 19, 2023, 2 pages.
Notice of Acceptance received for Australian Patent Application No. 2023200039, mailed on Aug. 31, 2023, 3 pages.
Record of Oral Hearing received for U.S. Appl. No. 15/405,122, mailed on Sep. 12, 2023, 20 pages.
Record of Oral Hearing received for U.S. Appl. No. 16/861,651, mailed on Sep. 5, 2023, 16 pages.
International Search Report and Written Opinion received for PCT Patent Application No. PCT/US2023/011151, mailed on Jul. 5, 2023, 20 pages.
Applicant Initiated Interview Summary received for U.S. Appl. No. 17/746,807, mailed on Jun. 9, 2023, 2 pages.
Applicant-Initiated Interview Summary received for U.S. Appl. No. 17/031,671, mailed on May 23, 2023, 3 pages.
Applicant-Initiated Interview Summary received for U.S. Appl. No. 17/941,962, mailed on May 30, 2023, 2 pages.
Applicant-Initiated Interview Summary received for U.S. Appl. No. 17/947,530, mailed on Jun. 14, 2023, 2 pages.
Corrected Notice of Allowance received for U.S. Appl. No. 16/935,002, mailed on Jul. 17, 2023, 5 pages.

(56) References Cited

OTHER PUBLICATIONS

Corrected Notice of Allowance received for U.S. Appl. No. 17/941,962, mailed on Aug. 3, 2023, 2 pages.
Decision on Appeal received for U.S. Appl. No. 16/861,651, mailed on Sep. 1, 2023, 14 pages.
Final Office Action received for U.S. Appl. No. 17/031,765, mailed on Sep. 1, 2023, 37 pages.
Final Office Action received for U.S. Appl. No. 17/947,530, mailed on Jul. 13, 2023, 17 pages.
Intention to Grant received for European Patent Application No. 17810723.1, mailed on Jun. 12, 2023, 9 pages.
Intention to Grant received for European Patent Application No. 20729346.5, mailed on Jul. 10, 2023, 9 pages.
Minutes of the Oral Proceedings received for European Patent Application No. 20729346.5, mailed on Jul. 4, 2023, 6 pages.
Non-Final Office Action received for U.S. Appl. No. 15/421,865, mailed on Jul. 11, 2023, 32 pages.
Non-Final Office Action received for U.S. Appl. No. 17/717,275, mailed on Jul. 3, 2023, 10 pages.
Non-Final Office Action received for U.S. Appl. No. 17/746,807, mailed on Jul. 20, 2023, 14 pages.
Notice of Acceptance received for Australian Patent Application No. 2022201419, mailed on May 31, 2023, 3 pages.
Notice of Acceptance received for Australian Patent Application No. 2022202583, mailed on Aug. 7, 2023, 3 pages.
Notice of Allowance received for Japanese Patent Application No. 2020-159823, mailed on Jul. 24, 2023, 23 pages (1 page of English Translation and 22 pages of Official Copy).
Notice of Allowance received for Japanese Patent Application No. 2022-096730, mailed on Jun. 5, 2023, 4 pages (1 page of English Translation and 3 pages of Official Copy).
Notice of Allowance received for U.S. Appl. No. 16/935,002, mailed on Jun. 28, 2023, 8 pages.
Notice of Allowance received for U.S. Appl. No. 17/738,940, mailed on Jun. 22, 2023, 9 pages.
Notice of Allowance received for U.S. Appl. No. 17/941,962, mailed on Jul. 3, 2023, 9 pages.
Office Action received for Australian Patent Application No. 2022235622, mailed on Jun. 27, 2023, 3 pages.
Office Action received for Australian Patent Application No. 2022235622, mailed on May 22, 2023, 2 pages.
Office Action received for Australian Patent Application No. 2023200039, mailed on Jul. 4, 2023, 2 pages.
Office Action received for European Patent Application No. 20730136.7, mailed on Jun. 27, 2023, 5 pages.
Office Action received for European Patent Application No. 21728746.5, mailed on Aug. 21, 2023, 4 pages.
Office Action received for Korean Patent Application No. 10-2023-0064928, mailed on Jun. 9, 2023, 6 pages (2 pages of English Translation and 4 pages of Official Copy).
Result of Consultation received for European Patent Application No. 20729346.5, mailed on Jun. 21, 2023, 3 pages.
Rozario Hamlin, "How to Edit Photos on iPhone & iPad", Online Available at:https://osxdaily.com/2020/01/23/how-to-edit-photos-on-iphone-ipad/, Jan. 23, 2020, 10 pages.
Notice of Allowance received for U.S. Appl. No. 16/861,651, mailed on Jan. 9, 2024, 6 pages.
Office Action received for Chinese Patent Application No. 202110957983.8, mailed on Dec. 27, 2023, 23 pages (13 pages of English Translation and 10 pages of Official Copy).
Office Action received for European Patent Application No. 21728746.5, mailed on Jan. 11, 2024, 4 pages.
Advisory Action received for U.S. Appl. No. 17/947,530, mailed on Oct. 13, 2023, 3 pages.
Notice of Allowance received for Korean Patent Application No. 10-2023-0064928, mailed on Sep. 22, 2023, 7 pages (2 pages of English Translation and 5 pages of Official Copy).
Final Office Action received for U.S. Appl. No. 15/421,865, mailed on Mar. 7, 2024, 27 pages.
Intention to Grant received for European Patent Application No. 20730136.7, mailed on Mar. 1, 2024, 9 pages.
Notice of Allowance received for U.S. Appl. No. 18/220,715, mailed on Mar. 7, 2024, 11 pages.
Office Action received for Japanese Patent Application No. 2022-205934, mailed on Mar. 11, 2024, 4 pages (2 pages of English Translation and 2 pages of Official Copy).
Notice of Allowance received for U.S. Appl. No. 17/717,275, mailed on Dec. 26, 2023, 8 pages.
Office Action received for Korean Patent Application No. 10-2023-7033642, mailed on Dec. 4, 2023, 5 pages (2 pages of English Translation and 3 pages of Official Copy).
Notice of Allowance received for U.S. Appl. No. 17/031,765, mailed on Apr. 2, 2024, 34 pages.
Office Action received for European Patent Application No. 22729905.4, mailed on Mar. 22, 2024, 8 pages.
Office Action received for Japanese Patent Application No. 2022-194369, mailed on Mar. 15, 2024, 11 pages (5 pages of English Translation and 6 pages of Official Copy).

\* cited by examiner

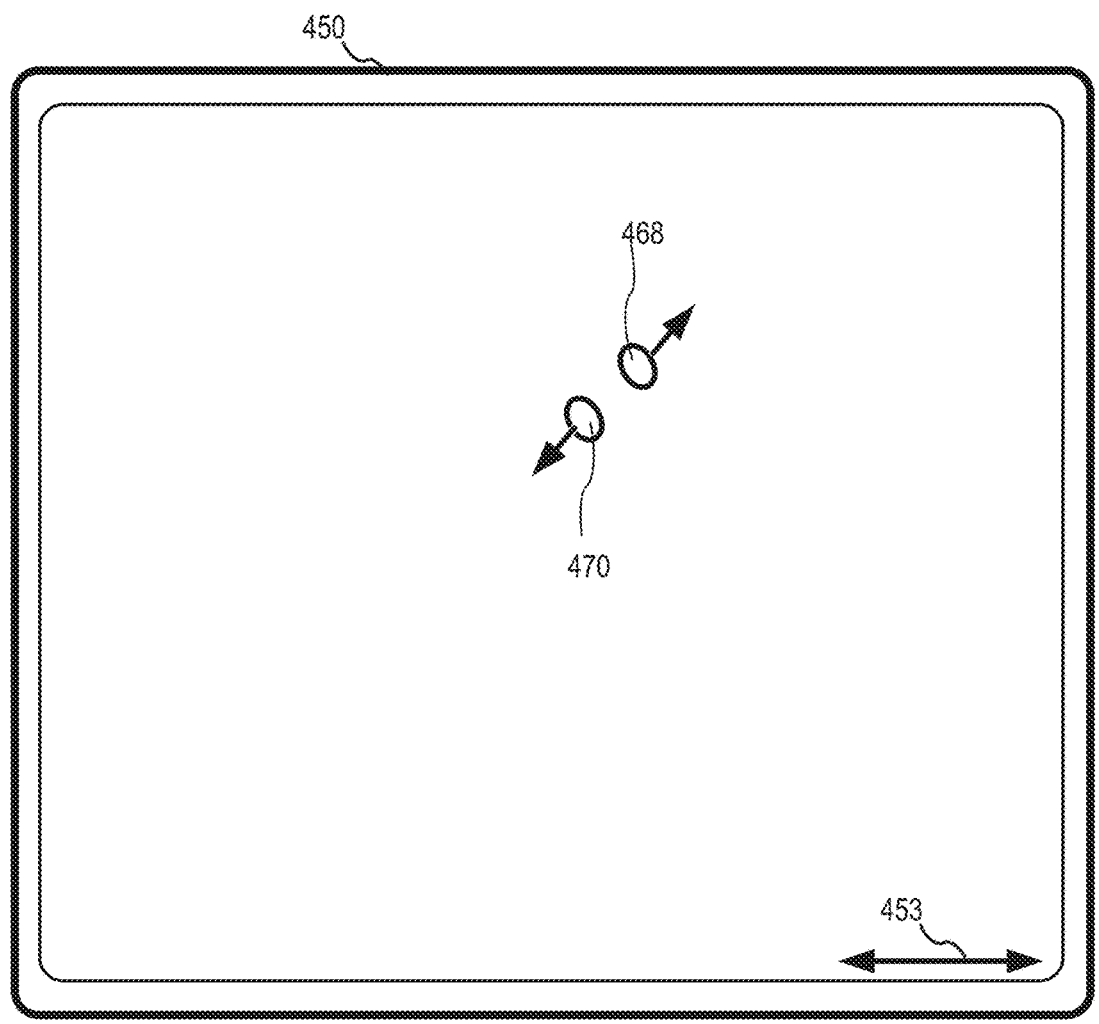
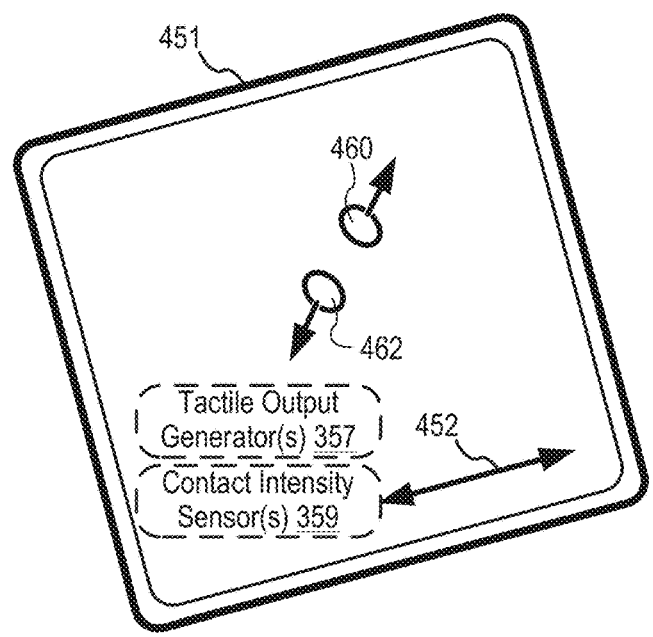
*FIG. 4B*

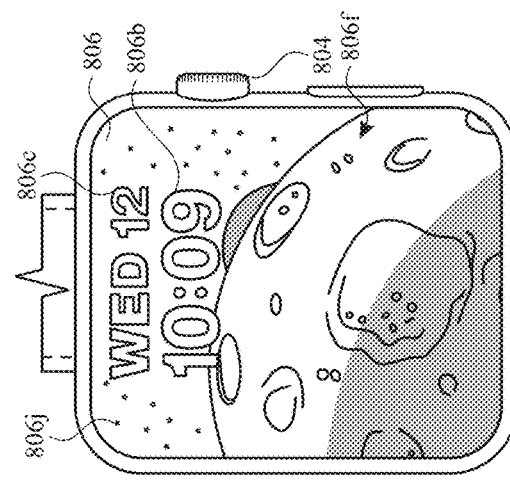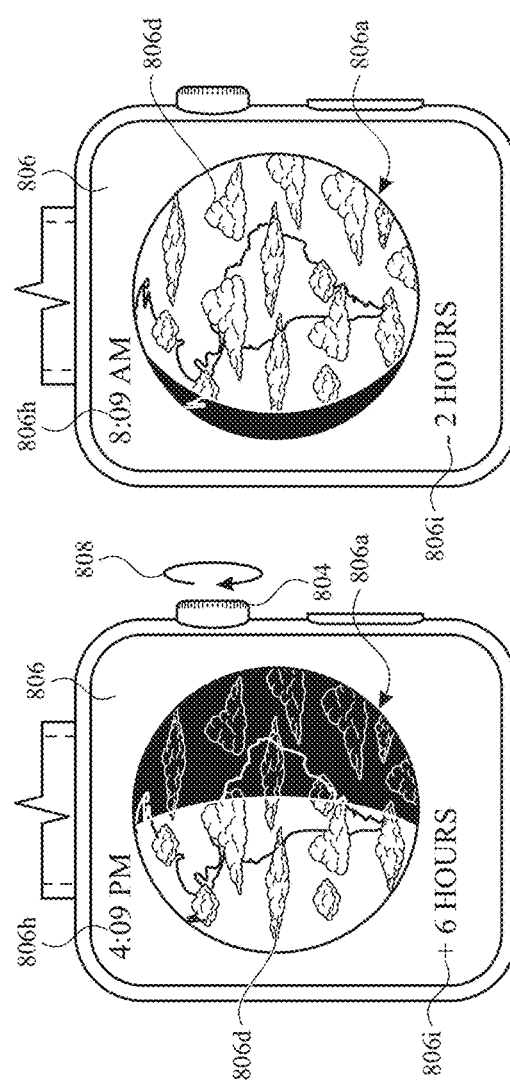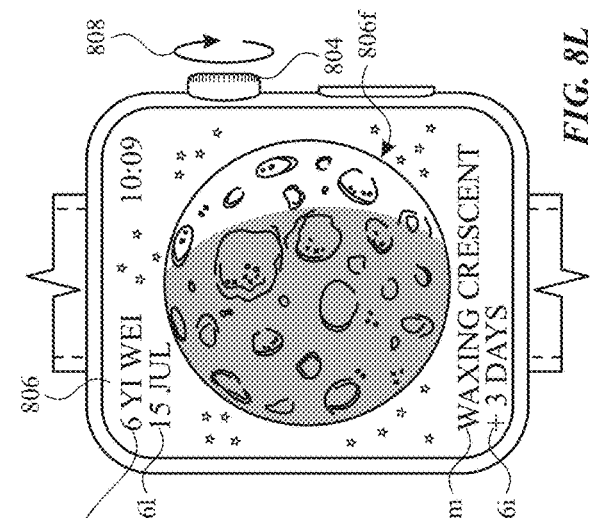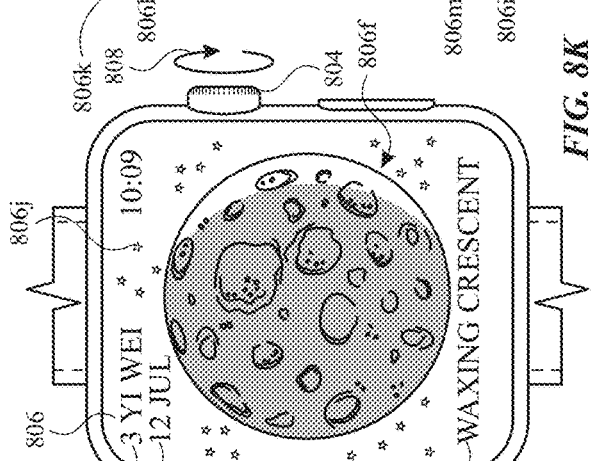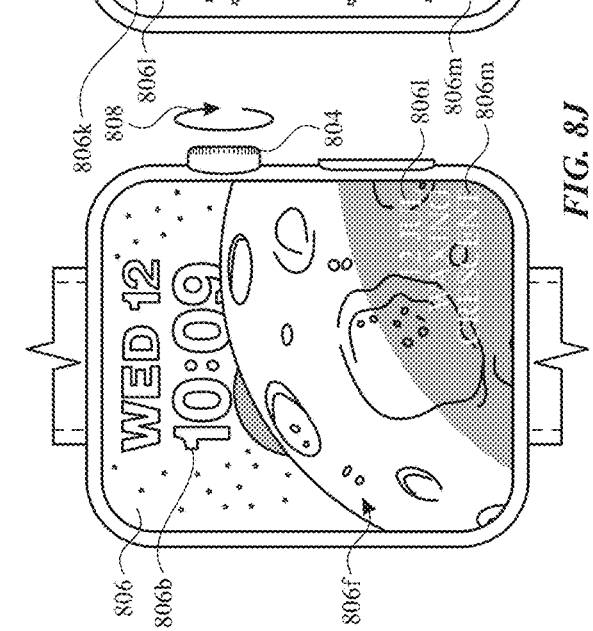

1100 ⤵

1102
Displaying, via the display generation component, a clock user interface that includes a time indication having a first set of style options.

1104
While displaying the clock user interface in a mode in which an indication of time on the clock user interface is updated to reflect a current time:

1106
Detecting, via the one or more input devices, a set of one or more inputs.

1108
In response to detecting the set of one or more inputs displaying the time indication with a second set of style options different from the first set of style options.

1110
While displaying the time indication with a second set of style options different from the first set of style options, updating the clock user interface to indicate a current time.

*FIG. 11*

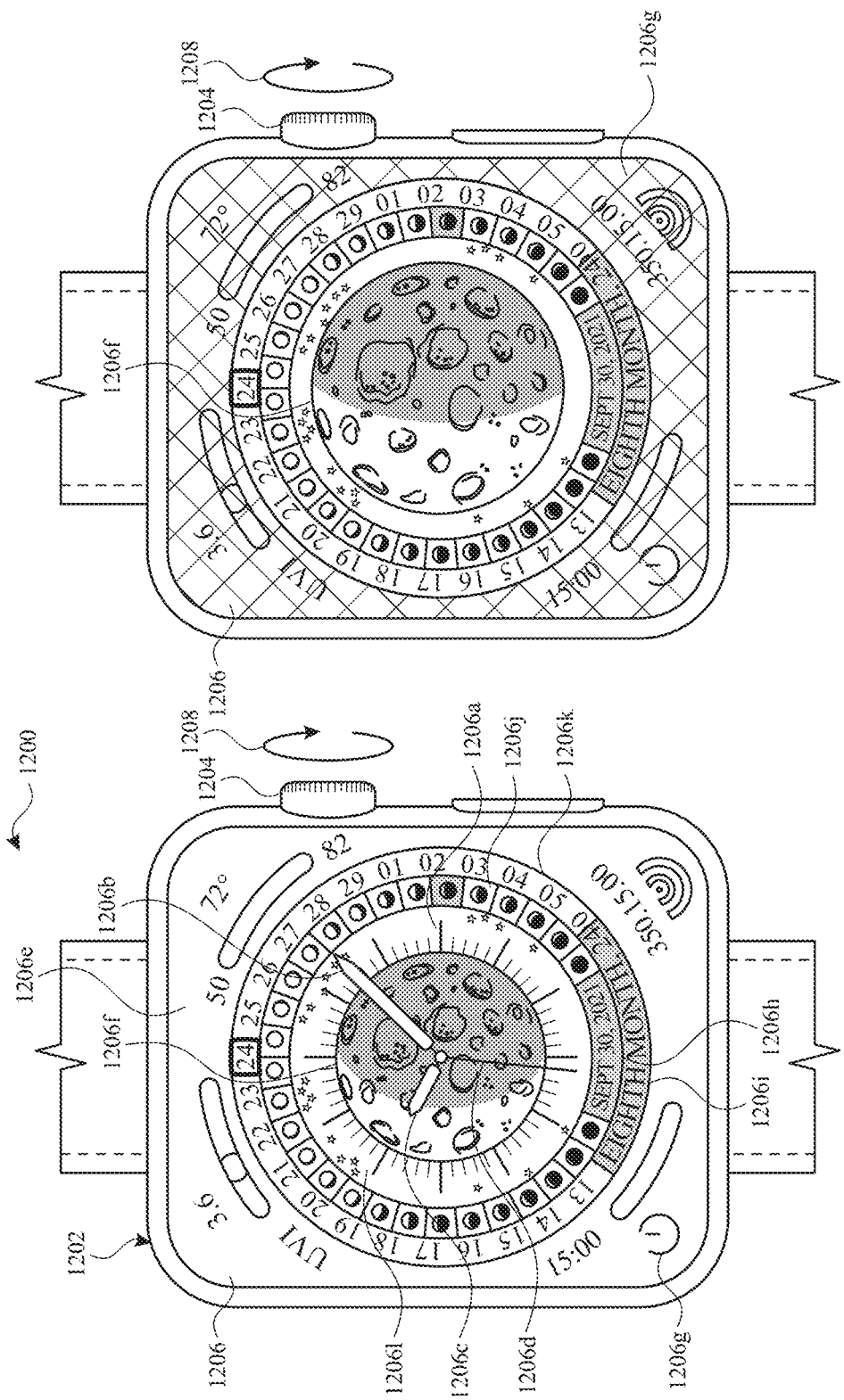

1300 ⇘

1302
Displaying, via the display generation component, a user interface including an indication of a first calendar date in a first calendar system that divides a year with a first set of subdivisions and an indication of a first calendar date in a second calendar system that divides the year with a second set of subdivisions that is different from the first set of subdivisions, wherein the first calendar date of the first calendar system corresponds to the first calendar date of the second calendar system.

1304
Detecting, via the one or more input devices, a set of one or more inputs.

1306
In response to detecting the set of one or more inputs, displaying, via the display generation component, the user interface including an indication of a second calendar date of the first calendar system and an indication of a second calendar date of the second calendar system, wherein the second calendar date of the first calendar system corresponds to the second calendar date of the second calendar system.

*FIG. 13*

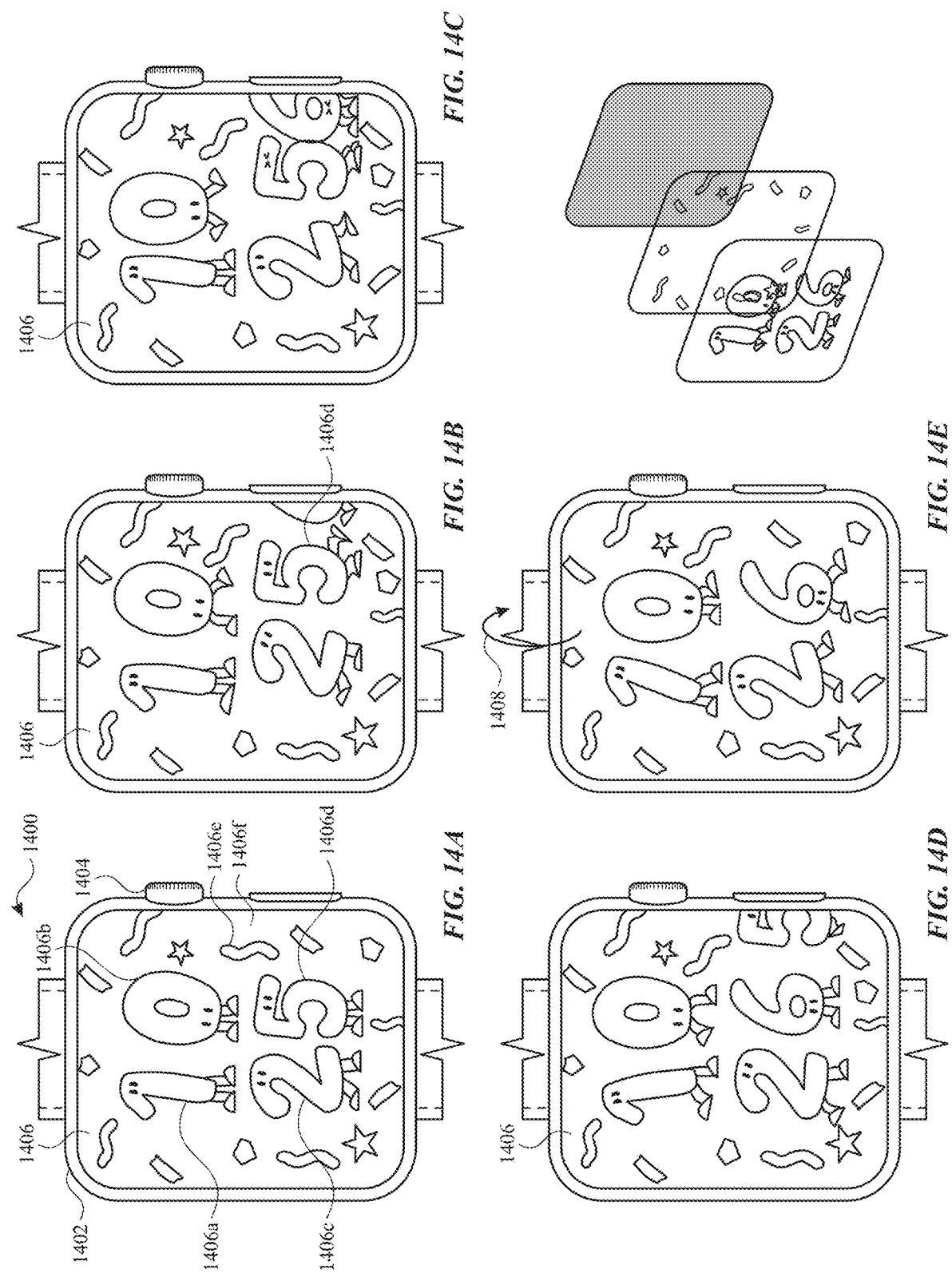

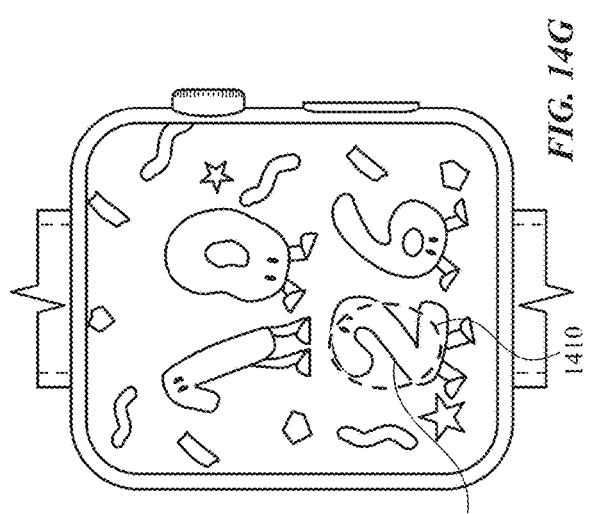
FIG. 14G
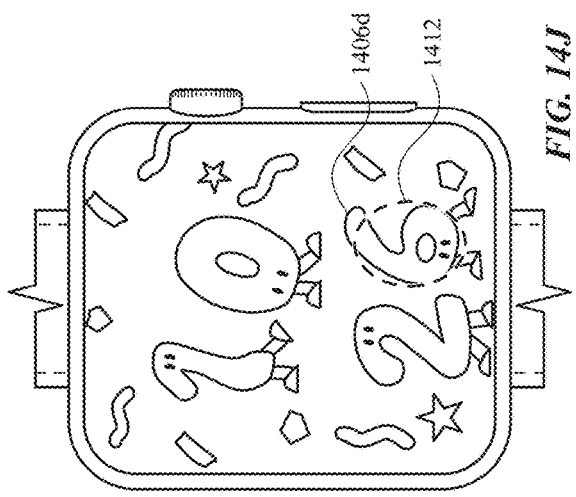
FIG. 14J
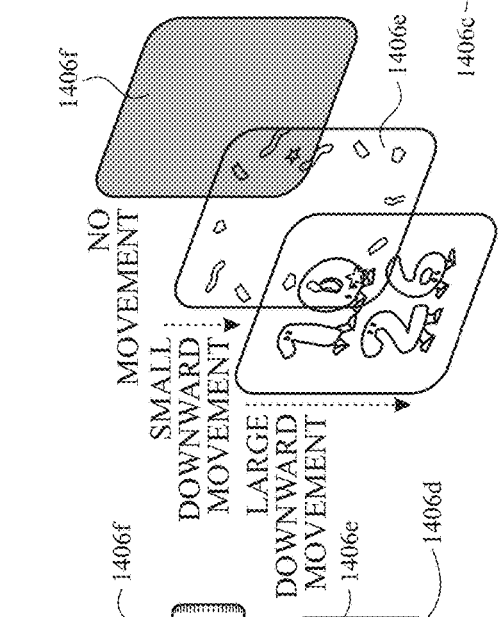
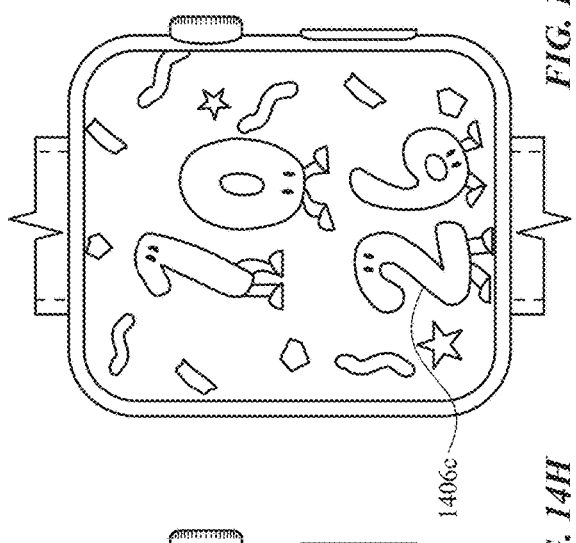
FIG. 14F
FIG. 14I
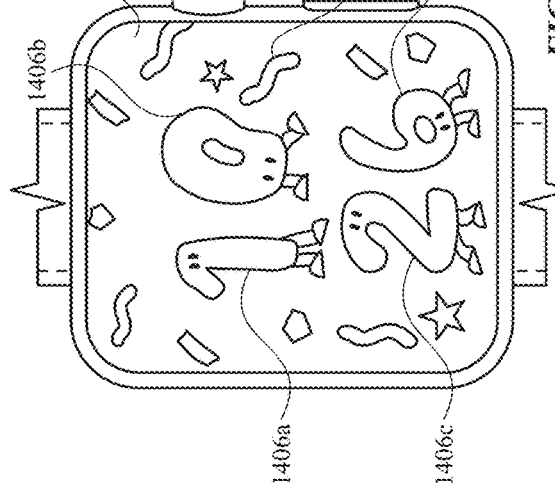
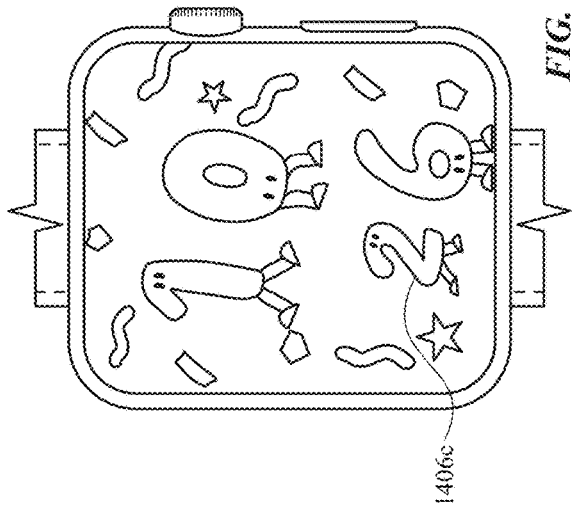
FIG. 14H

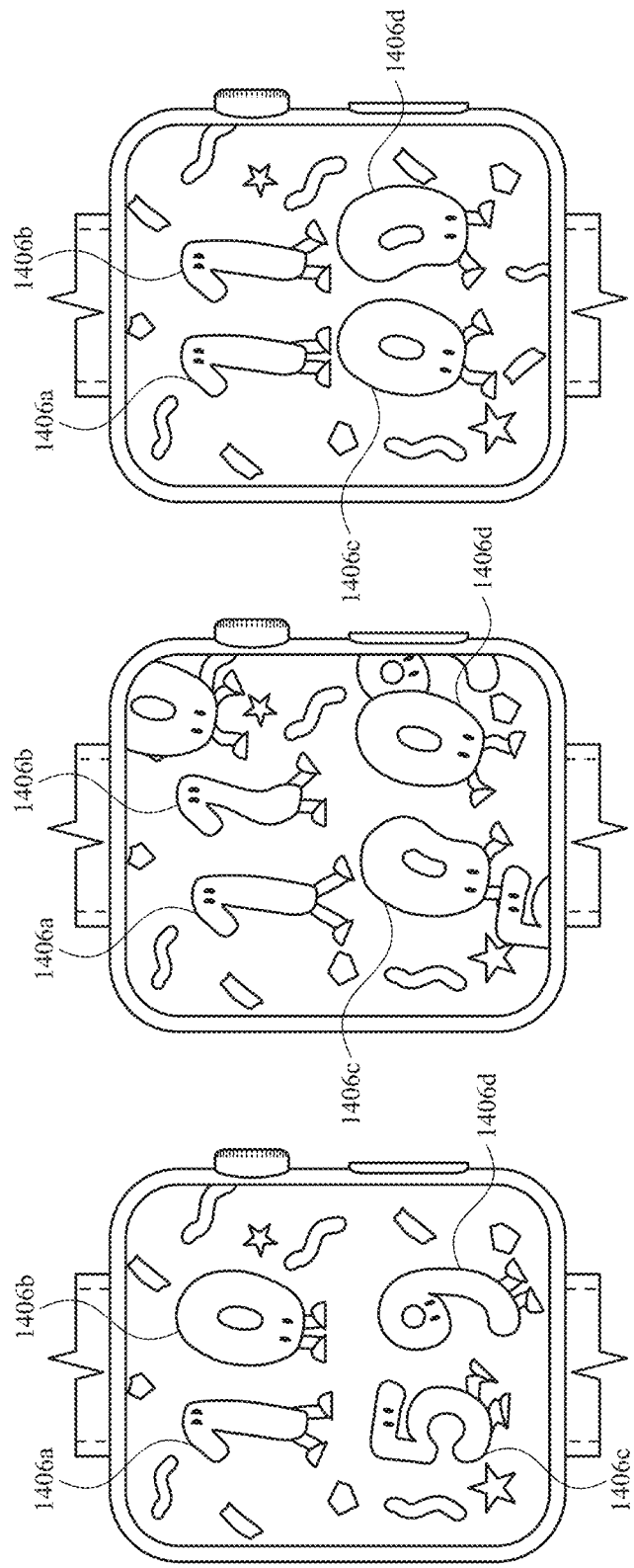

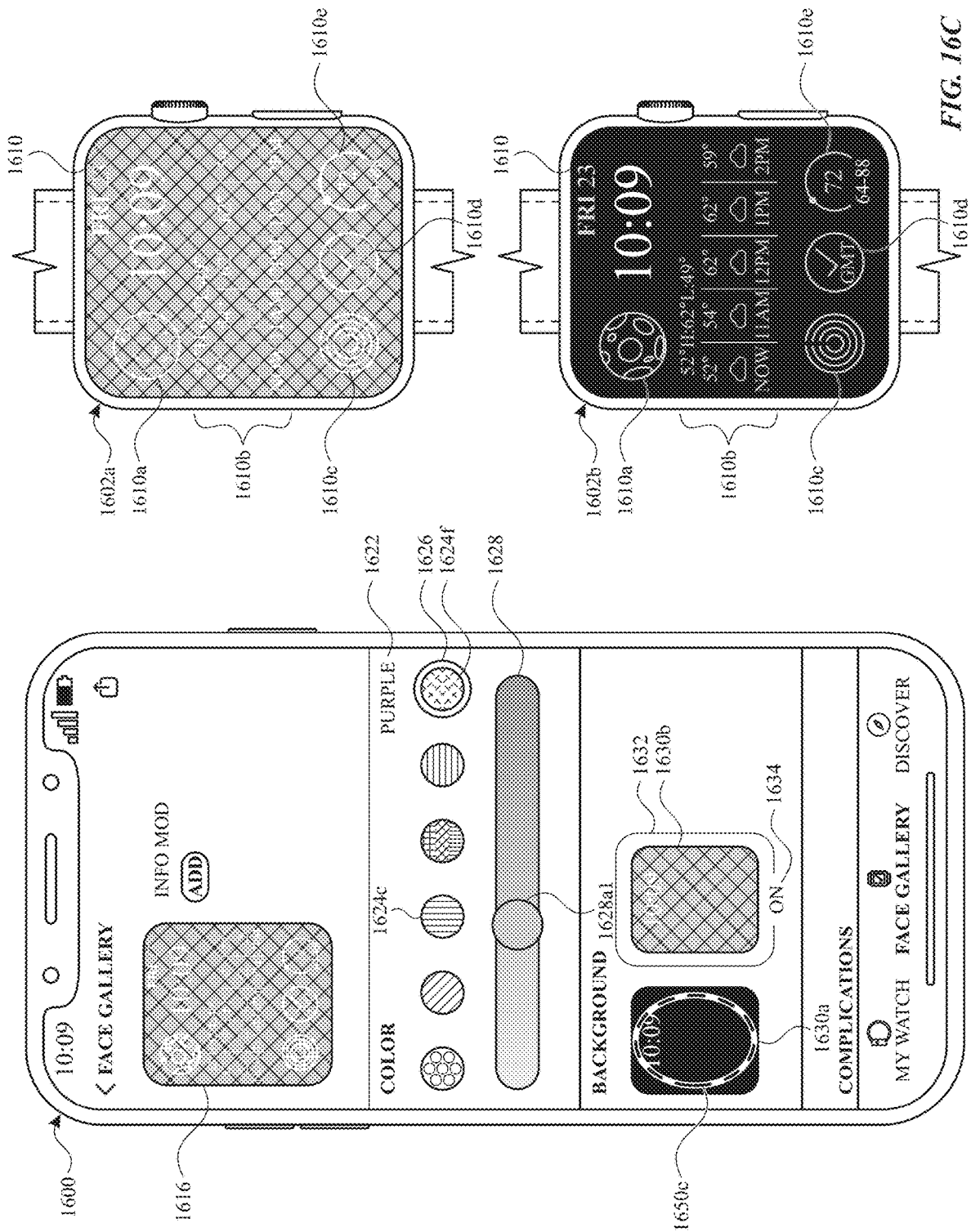

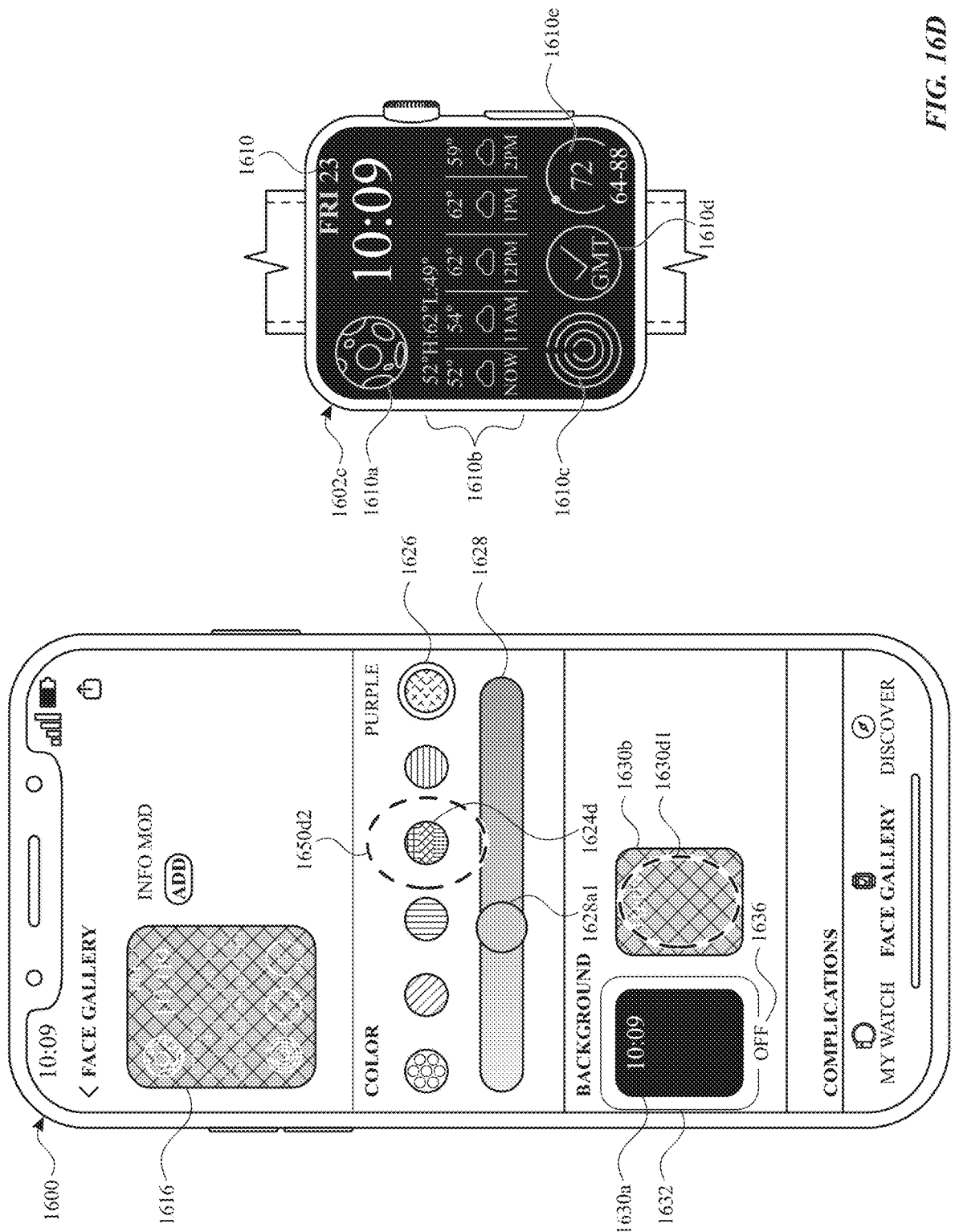

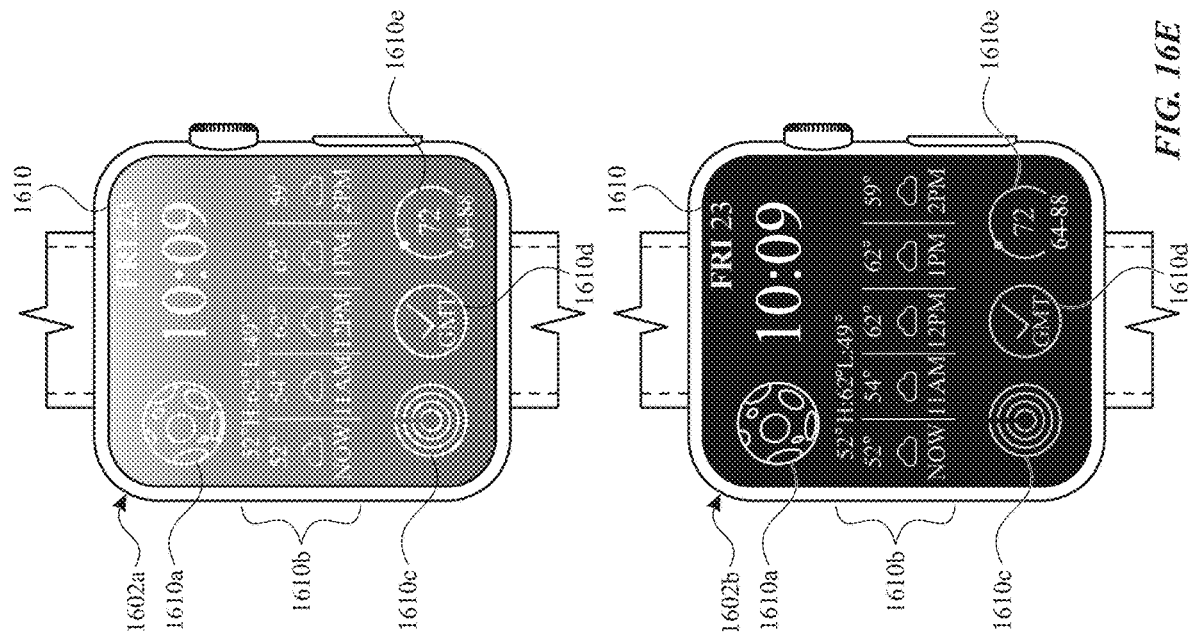
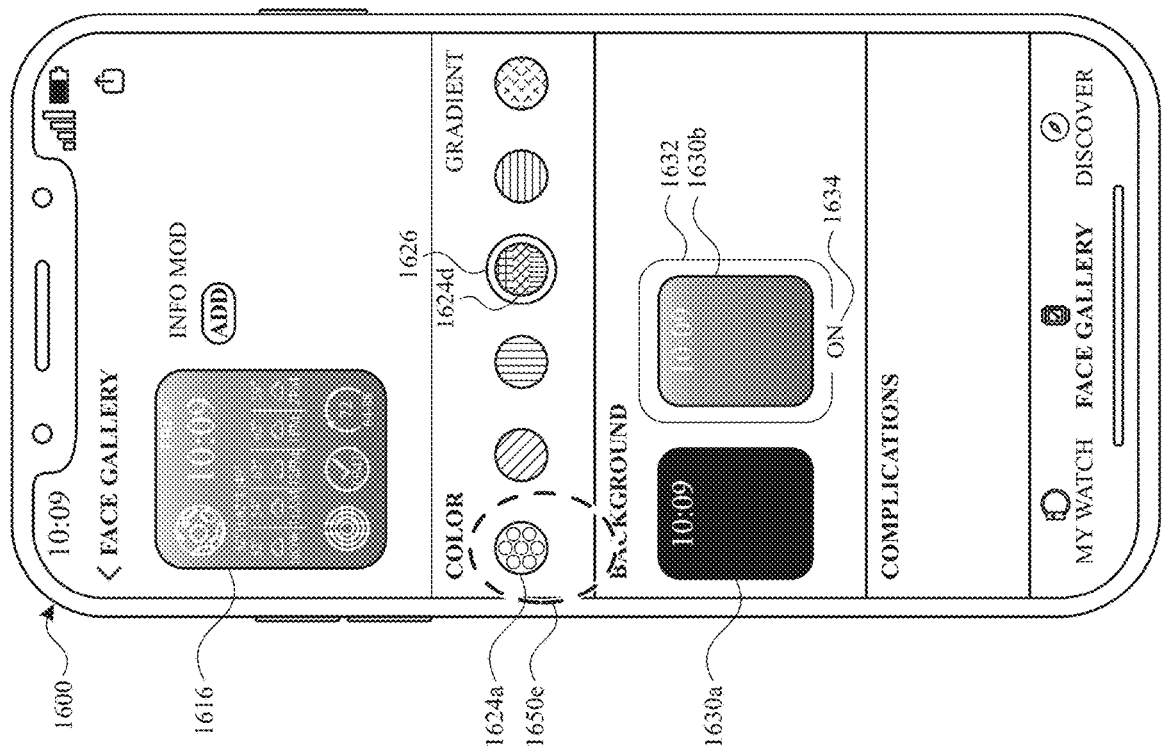
FIG. 16E

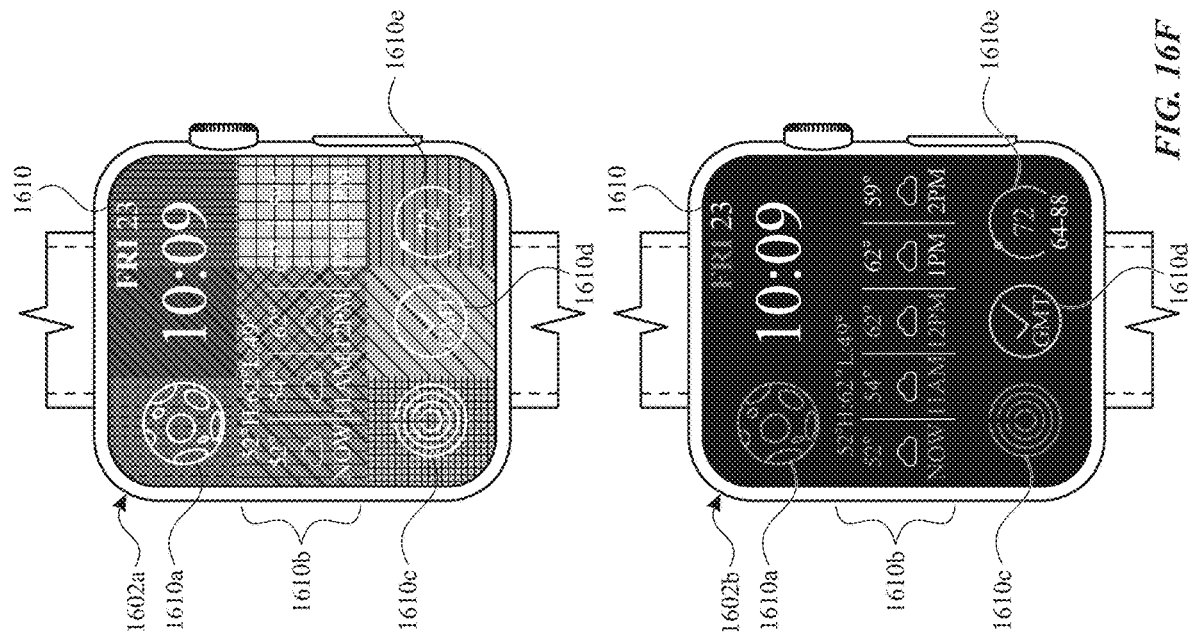
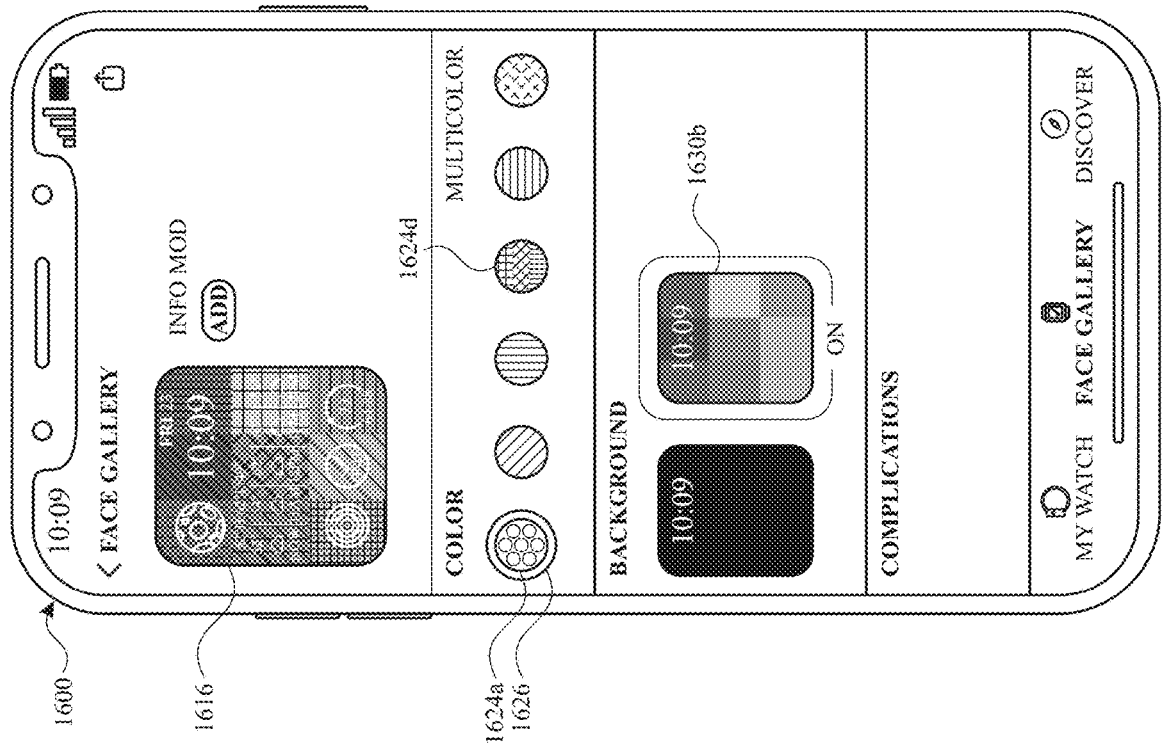
FIG. 16F

1700 ⇘

1702
Detect a request to display a clock user interface that includes a background and one or more foreground user interface elements, where the background is associated with a currently selected background color pattern.

1704
In response to detecting the request to display the clock user interface that includes the background and the one or more foreground user interface elements, display, via the display generation component, the clock user interface, including:

1706
In accordance with a determination that the currently selected background color pattern corresponds to a first background color pattern:

1708
Display, via the display generation component, the background with the first background color pattern.

1710
Display, via the display generation component, the one or more foreground user interface elements with a first foreground element color pattern that is different from the first background color pattern.

1712
In accordance with a determination that the currently selected background color patten corresponds to a second background color pattern that is different from the first background color pattern:

1714
Display, via the display generation component, the background with the second background color pattern.

1716
Display, via the display generation component, the one or more foreground user interface elements with a second foreground element color pattern that is different from the first foreground element color pattern and is different from the second background color pattern.

*FIG. 17*

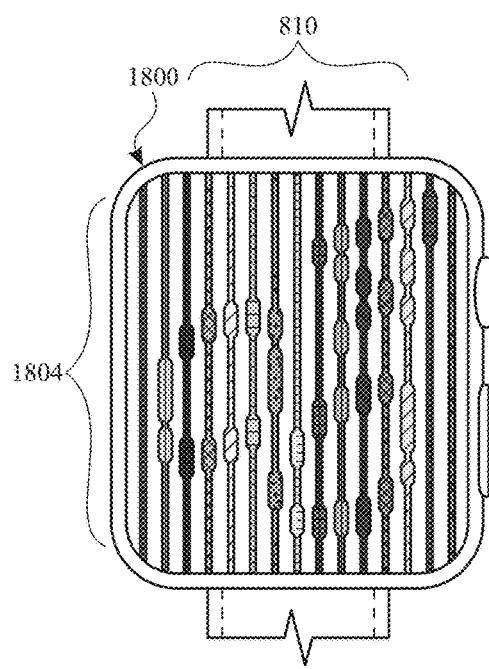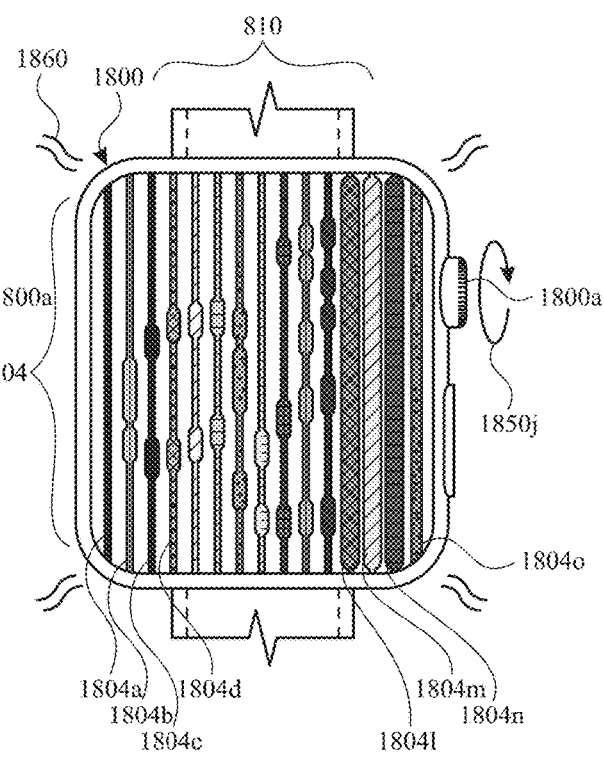
*FIG. 18I*     *FIG. 18J*

1900 ↘

1902
Display, via the display generation component, a clock user interface that includes a plurality of lines that indicate a first time, wherein:

1904
A first set of lines of the plurality of lines includes a first line of the first set of lines having a variable thickness and a second line of the first set of lines having a variable thickness, the variable thickness in lines in the first set of lines indicating a first portion of the first time.

1906
A second set of lines of the plurality of lines includes a first line of the second set of lines having a variable thickness and a second line of the second set of lines having a variable thickness, the variable thickness in lines in the second set of lines indicating a second portion of the first time.

1908
While displaying the clock user interface that includes the first set of lines and the second set of lines, detect a change in the current time from the first time to a second time.

1910
In response to detecting the change in current time from the first time to the second time, modify the variable thickness in lines in the first set of lines to indicate the first portion of the second time.

*FIG. 19*

USER INTERFACES FOR INDICATING TIME

CROSS-REFERENCE TO RELATED APPLICATIONS

This application claims priority to U.S. Provisional Patent Application Ser. No. 63/302,272, entitled "USER INTERFACES FOR INDICATING TIME," filed on Jan. 24, 2022; and claims priority to U.S. Provisional Patent Application Ser. No. 63/332,998, entitled "USER INTERFACES FOR INDICATING TIME," filed on Apr. 20, 2022; and claims priority to U.S. Provisional Patent Application Ser. No. 63/349,116, entitled "USER INTERFACES FOR INDICATING TIME," filed on Jun. 5, 2022. The contents of each of these applications are hereby incorporated by reference in their entireties.

FIELD

The present disclosure relates generally to computer user interfaces, and more specifically to techniques for managing and displaying clock user interfaces.

BACKGROUND

Smart watch devices and other personal electronic devices can indicate time and allow users to manipulate the appearance of a clock face. Users can select a variety of options to manage how the clock faces appear.

BRIEF SUMMARY

Some techniques for providing clock faces using electronic devices, however, are generally cumbersome and inefficient. For example, some existing techniques use a complex and time-consuming user interface, which may include multiple key presses or keystrokes. Existing techniques require more time than necessary, wasting user time and device energy. This latter consideration is particularly important in battery-operated devices.

Accordingly, the present technique provides electronic devices with faster, more efficient methods and interfaces for providing clock faces. Such methods and interfaces optionally complement or replace other methods for providing clock faces. Such methods and interfaces reduce the cognitive burden on a user and produce a more efficient human-machine interface. For battery-operated computing devices, such methods and interfaces conserve power and increase the time between battery charges.

In accordance with some embodiments, a method performed at a computer system that is in communication with a display generation component and one or more input devices is described. The method comprises: receiving, via the one or more input devices, a request to display a clock user interface; and in response to receiving the request to display the clock user interface, displaying, via the display generation component, the clock user interface, including concurrently displaying: a first visual effect portion that includes simulated emitted light that indicates a position of a first user interface region in the clock user interface, wherein the position and/or shape of the first user interface region indicates a current time of day; and a second visual effect portion that is based on the simulated emitted light from the first visual effect portion and a position of the first user interface region relative to a position of a second user interface region, wherein the second user interface region is different from the first user interface region.

In accordance with some embodiments, a non-transitory computer-readable storage medium is described. The non-transitory computer-readable storage medium stores one or more programs configured to be executed by one or more processors of a computer system that is in communication with a display generation component and one or more input devices, the one or more programs including instructions for: receiving, via the one or more input devices, a request to display a clock user interface; and in response to receiving the request to display the clock user interface, displaying, via the display generation component, the clock user interface, including concurrently displaying: a first visual effect portion that includes simulated emitted light that indicates a position of a first user interface region in the clock user interface, wherein the position and/or shape of the first user interface region indicates a current time of day; and a second visual effect portion that is based on the simulated emitted light from the first visual effect portion and a position of the first user interface region relative to a position of a second user interface region, wherein the second user interface region is different from the first user interface region.

In accordance with some embodiments, a transitory computer-readable storage medium is described. The transitory computer-readable storage medium stores one or more programs configured to be executed by one or more processors of a computer system that is in communication with a display generation component and one or more input devices, the one or more programs including instructions for: receiving, via the one or more input devices, a request to display a clock user interface; and in response to receiving the request to display the clock user interface, displaying, via the display generation component, the clock user interface, including concurrently displaying: a first visual effect portion that includes simulated emitted light that indicates a position of a first user interface region in the clock user interface, wherein the position and/or shape of the first user interface region indicates a current time of day; and a second visual effect portion that is based on the simulated emitted light from the first visual effect portion and a position of the first user interface region relative to a position of a second user interface region, wherein the second user interface region is different from the first user interface region.

In accordance with some embodiments, a computer system is described. The computer system comprises one or more processors, wherein the computer system is in communication with a display generation component and one or more input devices; and memory storing one or more programs configured to be executed by the one or more processors, the one or more programs including instructions for: receiving, via the one or more input devices, a request to display a clock user interface; and in response to receiving the request to display the clock user interface, displaying, via the display generation component, the clock user interface, including concurrently displaying: a first visual effect portion that includes simulated emitted light that indicates a position of a first user interface region in the clock user interface, wherein the position and/or shape of the first user interface region indicates a current time of day; and a second visual effect portion that is based on the simulated emitted light from the first visual effect portion and a position of the first user interface region relative to a position of a second user interface region, wherein the second user interface region is different from the first user interface region.

In accordance with some embodiments, a computer system is described. The computer system is in communication with a display generation component and one or more input devices. The computer system comprises: means for receiving, via the one or more input devices, a request to display a clock user interface; and means responsive to receiving the request to display the clock user interface, displaying, via the display generation component, the clock user interface, including concurrently displaying: a first visual effect portion that includes simulated emitted light that indicates a position of a first user interface region in the clock user interface, wherein the position and/or shape of the first user interface region indicates a current time of day; and a second visual effect portion that is based on the simulated emitted light from the first visual effect portion and a position of the first user interface region relative to a position of a second user interface region, wherein the second user interface region is different from the first user interface region.

In accordance with some embodiments, a computer program product is described. The computer program product comprises one or more programs configured to be executed by one or more processors of a computer system that is in communication with a display generation component and one or more input devices, the one or more programs including instructions for: receiving, via the one or more input devices, a request to display a clock user interface; and in response to receiving the request to display the clock user interface, displaying, via the display generation component, the clock user interface, including concurrently displaying: a first visual effect portion that includes simulated emitted light that indicates a position of a first user interface region in the clock user interface, wherein the position and/or shape of the first user interface region indicates a current time of day; and a second visual effect portion that is based on the simulated emitted light from the first visual effect portion and a position of the first user interface region relative to a position of a second user interface region, wherein the second user interface region is different from the first user interface region.

In accordance with some embodiments, a method performed at a computer system that is in communication with a display generation component is described. The method comprises displaying, via the display generation component, a clock user interface, including concurrently displaying: a first portion of an astronomical object; and a selectable user interface element; detecting an occurrence of a predetermined event; and in response to detecting the occurrence of the predetermined event, displaying, via the display generation component, the clock user interface, including concurrently displaying: a second portion of an astronomical object that is different from the first portion of the astronomical object; and the selectable user interface element.

In accordance with some embodiments, a non-transitory computer-readable storage medium is described. The non-transitory computer-readable storage medium stores one or more programs configured to be executed by one or more processors of a computer system that is in communication with a display generation component, the one or more programs including instructions for: displaying, via the display generation component, a clock user interface, including concurrently displaying: a first portion of an astronomical object; and a selectable user interface element; detecting an occurrence of a predetermined event; and in response to detecting the occurrence of the predetermined event, displaying, via the display generation component, the clock user interface, including concurrently displaying: a second portion of an astronomical object that is different from the first portion of the astronomical object; and the selectable user interface element.

In accordance with some embodiments, a transitory computer-readable storage medium is described. The transitory computer-readable storage medium stores one or more programs configured to be executed by one or more processors of a computer system that is in communication with a display generation component, the one or more programs including instructions for: displaying, via the display generation component, a clock user interface, including concurrently displaying: a first portion of an astronomical object; and a selectable user interface element; detecting an occurrence of a predetermined event; and in response to detecting the occurrence of the predetermined event, displaying, via the display generation component, the clock user interface, including concurrently displaying: a second portion of an astronomical object that is different from the first portion of the astronomical object; and the selectable user interface element.

In accordance with some embodiments, a computer system is described. The computer system is configured to communicate with a display generation component. The computer system comprises: one or more processors; and memory storing one or more programs configured to be executed by the one or more processors, the one or more programs including instructions for: displaying, via the display generation component, a clock user interface, including concurrently displaying: a first portion of an astronomical object; and a selectable user interface element; detecting an occurrence of a predetermined event; and in response to detecting the occurrence of the predetermined event, displaying, via the display generation component, the clock user interface, including concurrently displaying: a second portion of an astronomical object that is different from the first portion of the astronomical object; and the selectable user interface element.

In accordance with some embodiments, a computer system is described. The computer system is configured to communicate with a display generation component. The computer system comprises: means for displaying, via the display generation component, a clock user interface, including concurrently displaying: a first portion of an astronomical object; and a selectable user interface element; means for detecting an occurrence of a predetermined event; and means for in response to detecting the occurrence of the predetermined event, displaying, via the display generation component, the clock user interface, including concurrently displaying: a second portion of an astronomical object that is different from the first portion of the astronomical object; and the selectable user interface element.

In accordance with some embodiments, a computer program product is described. The computer program product comprises: one or more programs configured to be executed by one or more processors of a computer system that is in communication with a display generation component, the one or more programs including instructions for: displaying, via the display generation component, a clock user interface, including concurrently displaying: a first portion of an astronomical object; and a selectable user interface element; detecting an occurrence of a predetermined event; and in response to detecting the occurrence of the predetermined event, displaying, via the display generation component, the clock user interface, including concurrently displaying: a second portion of an astronomical object that is different from the first portion of the astronomical object; and the selectable user interface element.

In accordance with some embodiments, a method performed at a computer system that is in communication with a display generation component and one or more input devices is described. The method comprises: displaying, via the display generation component, a clock user interface that includes a time indication having a first set of style options; while displaying the clock user interface in a mode in which an indication of time on the clock user interface is updated to reflect a current time: detecting, via the one or more input devices, a set of one or more inputs; in response to detecting the set of one or more inputs displaying the time indication with a second set of style options different from the first set of style options; and while displaying the time indication with a second set of style options different from the first set of style options, updating the clock user interface to indicate a current time.

In accordance with some embodiments, a non-transitory computer-readable storage medium is described. The non-transitory computer-readable storage medium stores one or more programs configured to be executed by one or more processors of a computer system that is in communication with a display generation component and one or more input devices, the one or more programs including instructions for: displaying, via the display generation component, a clock user interface that includes a time indication having a first set of style options; while displaying the clock user interface in a mode in which an indication of time on the clock user interface is updated to reflect a current time: detecting, via the one or more input devices, a set of one or more inputs; in response to detecting the set of one or more inputs displaying the time indication with a second set of style options different from the first set of style options; and while displaying the time indication with a second set of style options different from the first set of style options, updating the clock user interface to indicate a current time.

In accordance with some embodiments, a transitory computer-readable storage medium is described. The transitory computer-readable storage medium stores one or more programs configured to be executed by one or more processors of a computer system that is in communication with a display generation component and one or more input devices, the one or more programs including instructions for: displaying, via the display generation component, a clock user interface that includes a time indication having a first set of style options; while displaying the clock user interface in a mode in which an indication of time on the clock user interface is updated to reflect a current time: detecting, via the one or more input devices, a set of one or more inputs; in response to detecting the set of one or more inputs displaying the time indication with a second set of style options different from the first set of style options; and while displaying the time indication with a second set of style options different from the first set of style options, updating the clock user interface to indicate a current time.

In accordance with some embodiments, a computer system is described. The computer system is configured to communicate with a display generation component and one or more input devices. The computer system comprises: one or more processors; and memory storing one or more programs configured to be executed by the one or more processors, the one or more programs including instructions for: displaying, via the display generation component, a clock user interface that includes a time indication having a first set of style options; while displaying the clock user interface in a mode in which an indication of time on the clock user interface is updated to reflect a current time: detecting, via the one or more input devices, a set of one or more inputs; in response to detecting the set of one or more inputs displaying the time indication with a second set of style options different from the first set of style options; and while displaying the time indication with a second set of style options different from the first set of style options, updating the clock user interface to indicate a current time.

In accordance with some embodiments, a computer system is described. The computer system is configured to communicate with a display generation component and one or more input devices. The computer system comprises: means for displaying, via the display generation component, a clock user interface that includes a time indication having a first set of style options; means for while displaying the clock user interface in a mode in which an indication of time on the clock user interface is updated to reflect a current time: means for detecting, via the one or more input devices, a set of one or more inputs; means for in response to detecting the set of one or more inputs displaying the time indication with a second set of style options different from the first set of style options; and means for while displaying the time indication with a second set of style options different from the first set of style options, updating the clock user interface to indicate a current time.

In accordance with some embodiments, a computer program product is described. The computer program product comprises: one or more programs configured to be executed by one or more processors of a computer system that is in communication with a display generation component and one or more input devices, the one or more programs including instructions for: displaying, via the display generation component, a clock user interface that includes a time indication having a first set of style options; while displaying the clock user interface in a mode in which an indication of time on the clock user interface is updated to reflect a current time: detecting, via the one or more input devices, a set of one or more inputs; in response to detecting the set of one or more inputs displaying the time indication with a second set of style options different from the first set of style options; and while displaying the time indication with a second set of style options different from the first set of style options, updating the clock user interface to indicate a current time.

In accordance with some embodiments, a method performed at a computer system that is in communication with a display generation component and one or more input devices is described. The method comprises: displaying, via the display generation component, a user interface including an indication of a first calendar date in a first calendar system that divides a year with a first set of subdivisions and an indication of a first calendar date in a second calendar system that divides the year with a second set of subdivisions that is different from the first set of subdivisions, wherein the first calendar date of the first calendar system corresponds to the first calendar date of the second calendar system; detecting, via the one or more input devices, a set of one or more inputs; and in response to detecting the set of one or more inputs, displaying, via the display generation component, the user interface including an indication of a second calendar date of the first calendar system and an indication of a second calendar date of the second calendar system, wherein the second calendar date of the first calendar system corresponds to the second calendar date of the second calendar system.

In accordance with some embodiments, a non-transitory computer-readable storage medium is described. The non-transitory computer-readable storage medium stores one or more programs configured to be executed by one or more processors of a computer system that is in communication with a display generation component and one or more input devices, the one or more programs including instructions for: displaying, via the display generation component, a user interface including an indication of a first calendar date in a first calendar system that divides a year with a first set of subdivisions and an indication of a first calendar date in a second calendar system that divides the year with a second set of subdivisions that is different from the first set of subdivisions, wherein the first calendar date of the first calendar system corresponds to the first calendar date of the second calendar system; detecting, via the one or more input devices, a set of one or more inputs; and in response to detecting the set of one or more inputs, displaying, via the display generation component, the user interface including an indication of a second calendar date of the first calendar system and an indication of a second calendar date of the second calendar system, wherein the second calendar date of the first calendar system corresponds to the second calendar date of the second calendar system.

In accordance with some embodiments, a transitory computer-readable storage medium is described. The transitory computer-readable storage medium stores one or more programs configured to be executed by one or more processors of a computer system that is in communication with a display generation component and one or more input devices, the one or more programs including instructions for: displaying, via the display generation component, a user interface including an indication of a first calendar date in a first calendar system that divides a year with a first set of subdivisions and an indication of a first calendar date in a second calendar system that divides the year with a second set of subdivisions that is different from the first set of subdivisions, wherein the first calendar date of the first calendar system corresponds to the first calendar date of the second calendar system; detecting, via the one or more input devices, a set of one or more inputs; and in response to detecting the set of one or more inputs, displaying, via the display generation component, the user interface including an indication of a second calendar date of the first calendar system and an indication of a second calendar date of the second calendar system, wherein the second calendar date of the first calendar system corresponds to the second calendar date of the second calendar system.

In accordance with some embodiments, a computer system is described. The computer system is configured to communicate with a display generation component and one or more input devices. The computer system comprises: one or more processors; and memory storing one or more programs configured to be executed by the one or more processors, the one or more programs including instructions for: displaying, via the display generation component, a user interface including an indication of a first calendar date in a first calendar system that divides a year with a first set of subdivisions and an indication of a first calendar date in a second calendar system that divides the year with a second set of subdivisions that is different from the first set of subdivisions, wherein the first calendar date of the first calendar system corresponds to the first calendar date of the second calendar system; detecting, via the one or more input devices, a set of one or more inputs; and in response to detecting the set of one or more inputs, displaying, via the display generation component, the user interface including an indication of a second calendar date of the first calendar system and an indication of a second calendar date of the second calendar system, wherein the second calendar date of the first calendar system corresponds to the second calendar date of the second calendar system.

In accordance with some embodiments, a computer system is described. The computer system is configured to communicate with a display generation component and one or more input devices. The computer system comprises: means for displaying, via the display generation component, a user interface including an indication of a first calendar date in a first calendar system that divides a year with a first set of subdivisions and an indication of a first calendar date in a second calendar system that divides the year with a second set of subdivisions that is different from the first set of subdivisions, wherein the first calendar date of the first calendar system corresponds to the first calendar date of the second calendar system; means for detecting, via the one or more input devices, a set of one or more inputs; and means for in response to detecting the set of one or more inputs, displaying, via the display generation component, the user interface including an indication of a second calendar date of the first calendar system and an indication of a second calendar date of the second calendar system, wherein the second calendar date of the first calendar system corresponds to the second calendar date of the second calendar system.

In accordance with some embodiments, a computer program product is described. The computer program product comprises one or more programs configured to be executed by one or more processors of a computer system that is in communication with a display generation component and one or more input devices, the one or more programs including instructions for: displaying, via the display generation component, a user interface including an indication of a first calendar date in a first calendar system that divides a year with a first set of subdivisions and an indication of a first calendar date in a second calendar system that divides the year with a second set of subdivisions that is different from the first set of subdivisions, wherein the first calendar date of the first calendar system corresponds to the first calendar date of the second calendar system; detecting, via the one or more input devices, a set of one or more inputs; and in response to detecting the set of one or more inputs, displaying, via the display generation component, the user interface including an indication of a second calendar date of the first calendar system and an indication of a second calendar date of the second calendar system, wherein the second calendar date of the first calendar system corresponds to the second calendar date of the second calendar system.

In accordance with some embodiments, a method performed at a computer system that is in communication with a display generation component is described. The method comprises: displaying, via the display generation component, a clock user interface including a digital indication of time that includes a first numeral and a second numeral; detecting a predetermined event; and in response to detecting the predetermined event, displaying, via the display generation component, an animated interaction between the first numeral and the second numeral in the clock user interface.

In accordance with some embodiments, a non-transitory computer-readable storage medium is described. The non-transitory computer-readable storage medium stores one or more programs configured to be executed by one or more processors of a computer system that is in communication with a display generation component, the one or more programs including instructions for: displaying, via the display generation component, a clock user interface including a digital indication of time that includes a first numeral and a second numeral; detecting a predetermined event; and in response to detecting the predetermined event, displaying, via the display generation component, an animated interaction between the first numeral and the second numeral in the clock user interface.

In accordance with some embodiments, a transitory computer-readable storage medium is described. The transitory computer-readable storage medium stores one or more programs configured to be executed by one or more processors of a computer system that is in communication with a display generation component, the one or more programs including instructions for: displaying, via the display generation component, a clock user interface including a digital indication of time that includes a first numeral and a second numeral; detecting a predetermined event; and in response to detecting the predetermined event, displaying, via the display generation component, an animated interaction between the first numeral and the second numeral in the clock user interface.

In accordance with some embodiments, a computer system is described. The computer system is configured to communicate with a display generation component. The computer system comprises: one or more processors; and memory storing one or more programs configured to be executed by the one or more processors, the one or more programs including instructions for: displaying, via the display generation component, a clock user interface including a digital indication of time that includes a first numeral and a second numeral; detecting a predetermined event; and in response to detecting the predetermined event, displaying, via the display generation component, an animated interaction between the first numeral and the second numeral in the clock user interface.

In accordance with some embodiments, a computer system is described. The computer system is configured to communicate with a display generation component. The computer system comprises: means for displaying, via the display generation component, a clock user interface including a digital indication of time that includes a first numeral and a second numeral; means for detecting a predetermined event; and means for in response to detecting the predetermined event, displaying, via the display generation component, an animated interaction between the first numeral and the second numeral in the clock user interface.

In accordance with some embodiments, a computer program product is described. The computer program product comprises: one or more programs configured to be executed by one or more processors of a computer system that is in communication with a display generation component, the one or more programs including instructions for: displaying, via the display generation component, a clock user interface including a digital indication of time that includes a first numeral and a second numeral; detecting a predetermined event; and in response to detecting the predetermined event, displaying, via the display generation component, an animated interaction between the first numeral and the second numeral in the clock user interface.

In accordance with some embodiments, a method is described. The method comprises: at a computer system that is in communication with a display generation component: detecting a request to display a clock user interface that includes a background and one or more foreground user interface elements, wherein the background is associated with a currently selected background color pattern; and in response to detecting the request to display the clock user interface that includes the background and the one or more foreground user interface elements, displaying, via the display generation component, the clock user interface, including: in accordance with a determination that the currently selected background color pattern corresponds to a first background color pattern: displaying, via the display generation component, the background with the first background color pattern; and displaying, via the display generation component, the one or more foreground user interface elements with a first foreground element color pattern that is different from the first background color pattern; and in accordance with a determination that the currently selected background color pattern corresponds to a second background color pattern that is different from the first background color pattern: displaying, via the display generation component, the background with the second background color pattern; and displaying, via the display generation component, the one or more foreground user interface elements with a second foreground element color pattern that is different from the first foreground element color pattern and is different from the second background color pattern.

In accordance with some embodiments, a non-transitory computer-readable storage medium is described. The non-transitory computer-readable storage medium stores one or more programs configured to be executed by one or more processors of a computer system that is in communication with a display generation component, the one or more programs including instructions for: detecting a request to display a clock user interface that includes a background and one or more foreground user interface elements, wherein the background is associated with a currently selected background color pattern; and in response to detecting the request to display the clock user interface that includes the background and the one or more foreground user interface elements, displaying, via the display generation component, the clock user interface, including: in accordance with a determination that the currently selected background color pattern corresponds to a first background color pattern: displaying, via the display generation component, the background with the first background color pattern; and displaying, via the display generation component, the one or more foreground user interface elements with a first foreground element color pattern that is different from the first background color pattern; and in accordance with a determination that the currently selected background color pattern corresponds to a second background color pattern that is different from the first background color pattern: displaying, via the display generation component, the background with the second background color pattern; and displaying, via the display generation component, the one or more foreground user interface elements with a second foreground element color pattern that is different from the first foreground element color pattern and is different from the second background color pattern.

In accordance with some embodiments, a transitory computer-readable storage medium is described. The transitory computer-readable storage medium stores one or more programs configured to be executed by one or more processors of a computer system that is in communication with a display generation component, the one or more programs including instructions for: detecting a request to display a clock user interface that includes a background and one or more foreground user interface elements, wherein the background is associated with a currently selected background color pattern; and in response to detecting the request to display the clock user interface that includes the background and the one or more foreground user interface elements, displaying, via the display generation component, the clock user interface, including: in accordance with a determination that the currently selected background color pattern corresponds to a first background color pattern: displaying, via the display generation component, the background with the first background color pattern; and displaying, via the display generation component, the one or more foreground user interface elements with a first foreground element color pattern that is different from the first background color pattern; and in accordance with a determination that the currently selected background color pattern corresponds to a second background color pattern that is different from the first background color pattern: displaying, via the display generation component, the background with the second background color pattern; and displaying, via the display generation component, the one or more foreground user interface elements with a second foreground element color pattern that is different from the first foreground element color pattern and is different from the second background color pattern.

In accordance with some embodiments, a computer system configured to communicate with a display generation component is described. The computer system comprises: one or more processors; and memory storing one or more programs configured to be executed by the one or more processors, the one or more programs including instructions for: detecting a request to display a clock user interface that includes a background and one or more foreground user interface elements, wherein the background is associated with a currently selected background color pattern; and in response to detecting the request to display the clock user interface that includes the background and the one or more foreground user interface elements, displaying, via the display generation component, the clock user interface, including: in accordance with a determination that the currently selected background color pattern corresponds to a first background color pattern: displaying, via the display generation component, the background with the first background color pattern; and displaying, via the display generation component, the one or more foreground user interface elements with a first foreground element color pattern that is different from the first background color pattern; and in accordance with a determination that the currently selected background color pattern corresponds to a second background color pattern that is different from the first background color pattern: displaying, via the display generation component, the background with the second background color pattern; and displaying, via the display generation component, the one or more foreground user interface elements with a second foreground element color pattern that is different from the first foreground element color pattern and is different from the second background color pattern.

In accordance with some embodiments, a computer system configured to communicate with a display generation component is described. The computer system comprises: means for detecting a request to display a clock user interface that includes a background and one or more foreground user interface elements, wherein the background is associated with a currently selected background color pattern; and means for, in response to detecting the request to display the clock user interface that includes the background and the one or more foreground user interface elements, displaying, via the display generation component, the clock user interface, including: means for, in accordance with a determination that the currently selected background color pattern corresponds to a first background color pattern: displaying, via the display generation component, the background with the first background color pattern; and displaying, via the display generation component, the one or more foreground user interface elements with a first foreground element color pattern that is different from the first background color pattern; and means for, in accordance with a determination that the currently selected background color pattern corresponds to a second background color pattern that is different from the first background color pattern: displaying, via the display generation component, the background with the second background color pattern; and displaying, via the display generation component, the one or more foreground user interface elements with a second foreground element color pattern that is different from the first foreground element color pattern and is different from the second background color pattern.

In accordance with some embodiments, a computer program product is described. The computer program product comprises one or more programs configured to be executed by one or more processors of a computer system that is in communication with a display generation component, the one or more programs including instructions for: detecting a request to display a clock user interface that includes a background and one or more foreground user interface elements, wherein the background is associated with a currently selected background color pattern; and in response to detecting the request to display the clock user interface that includes the background and the one or more foreground user interface elements, displaying, via the display generation component, the clock user interface, including: in accordance with a determination that the currently selected background color pattern corresponds to a first background color pattern: displaying, via the display generation component, the background with the first background color pattern; and displaying, via the display generation component, the one or more foreground user interface elements with a first foreground element color pattern that is different from the first background color pattern; and in accordance with a determination that the currently selected background color pattern corresponds to a second background color pattern that is different from the first background color pattern: displaying, via the display generation component, the background with the second background color pattern; and displaying, via the display generation component, the one or more foreground user interface elements with a second foreground element color pattern that is different from the first foreground element color pattern and is different from the second background color pattern.

In accordance with some embodiments, a method is described. The method comprises: at a computer system that is in communication with a display generation component: displaying, via the display generation component, a clock user interface that includes a plurality of lines that indicate a first time, wherein: a first set of lines of the plurality of lines including a first line of the first set of lines having a variable thickness and a second line of the first set of lines having a variable thickness, the variable thickness in lines in the first set of lines indicating a first portion of the first time; and a second set of lines of the plurality of lines including a first line of the second set of lines having a variable thickness and a second line of the second set of lines having a variable thickness, the variable thickness in lines in the second set of lines indicating a second portion of the first time; while displaying the clock user interface that includes the first set of lines and the second set of lines, detecting a change in the current time from the first time to a second time; and in response to detecting the change in current time from the first time to the second time, modifying the variable thickness in lines in the first set of lines to indicate the first portion of the second time.

In accordance with some embodiments, a non-transitory computer-readable storage medium is described. The non-transitory computer-readable storage medium stores one or more programs configured to be executed by one or more processors of a computer system that is in communication with a display generation component, the one or more programs including instructions for: displaying, via the display generation component, a clock user interface that includes a plurality of lines that indicate a first time, wherein: a first set of lines of the plurality of lines including a first line of the first set of lines having a variable thickness and a second line of the first set of lines having a variable thickness, the variable thickness in lines in the first set of lines indicating a first portion of the first time; and a second set of lines of the plurality of lines including a first line of the second set of lines having a variable thickness and a second line of the second set of lines having a variable thickness, the variable thickness in lines in the second set of lines indicating a second portion of the first time; while displaying the clock user interface that includes the first set of lines and the second set of lines, detecting a change in the current time from the first time to a second time; and in response to detecting the change in current time from the first time to the second time, modifying the variable thickness in lines in the first set of lines to indicate the first portion of the second time.

In accordance with some embodiments, a transitory computer-readable storage medium is described. The transitory computer-readable storage medium stores one or more programs configured to be executed by one or more processors of a computer system that is in communication with a display generation component, the one or more programs including instructions for: displaying, via the display generation component, a clock user interface that includes a plurality of lines that indicate a first time, wherein: a first set of lines of the plurality of lines including a first line of the first set of lines having a variable thickness and a second line of the first set of lines having a variable thickness, the variable thickness in lines in the first set of lines indicating a first portion of the first time; and a second set of lines of the plurality of lines including a first line of the second set of lines having a variable thickness and a second line of the second set of lines having a variable thickness, the variable thickness in lines in the second set of lines indicating a second portion of the first time; while displaying the clock user interface that includes the first set of lines and the second set of lines, detecting a change in the current time from the first time to a second time; and in response to detecting the change in current time from the first time to the second time, modifying the variable thickness in lines in the first set of lines to indicate the first portion of the second time.

In accordance with some embodiments, a computer system configured to communicate with a display generation component is described. The computer system comprises: one or more processors; and memory storing one or more programs configured to be executed by the one or more processors, the one or more programs including instructions for: displaying, via the display generation component, a clock user interface that includes a plurality of lines that indicate a first time, wherein: a first set of lines of the plurality of lines including a first line of the first set of lines having a variable thickness and a second line of the first set of lines having a variable thickness, the variable thickness in lines in the first set of lines indicating a first portion of the first time; and a second set of lines of the plurality of lines including a first line of the second set of lines having a variable thickness and a second line of the second set of lines having a variable thickness, the variable thickness in lines in the second set of lines indicating a second portion of the first time; while displaying the clock user interface that includes the first set of lines and the second set of lines, detecting a change in the current time from the first time to a second time; and in response to detecting the change in current time from the first time to the second time, modifying the variable thickness in lines in the first set of lines to indicate the first portion of the second time.

In accordance with some embodiments, a computer system configured to communicate with a display generation component is described. The computer system comprises: means for displaying, via the display generation component, a clock user interface that includes a plurality of lines that indicate a first time, wherein: a first set of lines of the plurality of lines including a first line of the first set of lines having a variable thickness and a second line of the first set of lines having a variable thickness, the variable thickness in lines in the first set of lines indicating a first portion of the first time; and a second set of lines of the plurality of lines including a first line of the second set of lines having a variable thickness and a second line of the second set of lines having a variable thickness, the variable thickness in lines in the second set of lines indicating a second portion of the first time; means for, while displaying the clock user interface that includes the first set of lines and the second set of lines, detecting a change in the current time from the first time to a second time; and means for, in response to detecting the change in current time from the first time to the second time, modifying the variable thickness in lines in the first set of lines to indicate the first portion of the second time.

In accordance with some embodiments, a computer program product is described. The computer program product comprises one or more programs configured to be executed by one or more processors of a computer system that is in communication with a display generation component, the one or more programs including instructions for: displaying, via the display generation component, a clock user interface that includes a plurality of lines that indicate a first time, wherein: a first set of lines of the plurality of lines including a first line of the first set of lines having a variable thickness and a second line of the first set of lines having a variable thickness, the variable thickness in lines in the first set of lines indicating a first portion of the first time; and a second set of lines of the plurality of lines including a first line of the second set of lines having a variable thickness and a second line of the second set of lines having a variable thickness, the variable thickness in lines in the second set of lines indicating a second portion of the first time; while displaying the clock user interface that includes the first set of lines and the second set of lines, detecting a change in the current time from the first time to a second time; and in response to detecting the change in current time from the first time to the second time, modifying the variable thickness in lines in the first set of lines to indicate the first portion of the second time.

Executable instructions for performing these functions are, optionally, included in a non-transitory computer-readable storage medium or other computer program product configured for execution by one or more processors. Executable instructions for performing these functions are, optionally, included in a transitory computer-readable storage medium or other computer program product configured for execution by one or more processors.

Thus, devices are provided with faster, more efficient methods and interfaces for providing clock faces, thereby increasing the effectiveness, efficiency, and user satisfaction with such devices. Such methods and interfaces may complement or replace other methods for providing clock faces.

DESCRIPTION OF THE FIGURES

For a better understanding of the various described embodiments, reference should be made to the Description of Embodiments below, in conjunction with the following drawings in which like reference numerals refer to corresponding parts throughout the figures.

FIG. 4B illustrates an exemplary user interface for a multifunction device with a touch-sensitive surface that is separate from the display in accordance with some embodiments.

FIG. 11 is a flow diagram illustrating a method for displaying clock user interfaces that include adjustable time indications, in accordance with some embodiments.

FIG. 13 is a flow diagram illustrating a method for displaying clock user interfaces that include multiple calendar systems, in accordance with some embodiments.

FIGS. 16A-16I illustrate example clock user interfaces that are displayed with colors that are based on a selected color, in accordance with some embodiments.

FIG. 17 is a flow diagram illustrating a method for displaying clock user interfaces with colors that are based on a selected color, in accordance with some embodiments.

FIG. 19 is a flow diagram illustrating a method for displaying clock user interfaces including animated lines, in accordance with some embodiments.

DESCRIPTION OF EMBODIMENTS

The following description sets forth exemplary methods, parameters, and the like. It should be recognized, however, that such description is not intended as a limitation on the scope of the present disclosure but is instead provided as a description of exemplary embodiments.

There is a need for electronic devices that provide efficient methods and interfaces for providing clock faces. For example, there is a need for devices that enable an intuitive and efficient method for displaying a clock face including simulated emitted light. For another example, there is a need for devices that enable an intuitive and efficient method for displaying a clock face including an astronomical object. For another example, there is a need for devices that enable an intuitive and efficient method for displaying a clock face with adjustable time indications. For another example, there is a need for devices that enable an intuitive and efficient method for displaying a clock face with multiple calendar systems. For another example, there is a need for devices that enable an intuitive and efficient method for displaying a clock face with animated numerals. Such techniques can reduce the cognitive burden on a user who accesses clock faces, thereby enhancing productivity. Further, such techniques can reduce processor and battery power otherwise wasted on redundant user inputs.

Below, FIGS. 1A-1B, 2, 3, 4A-4B, and 5A-5B provide a description of exemplary devices for performing the techniques for managing event notifications. FIGS. 6A-6K illustrate example clock user interfaces including simulated emitted light. FIG. 7 is a flow diagram illustrating methods of displaying clock user interfaces including simulated emitted light in accordance with some embodiments. The user interfaces in FIGS. 6A-6K are used to illustrate the processes described below, including the processes in FIG. 7.

Figure 8A:
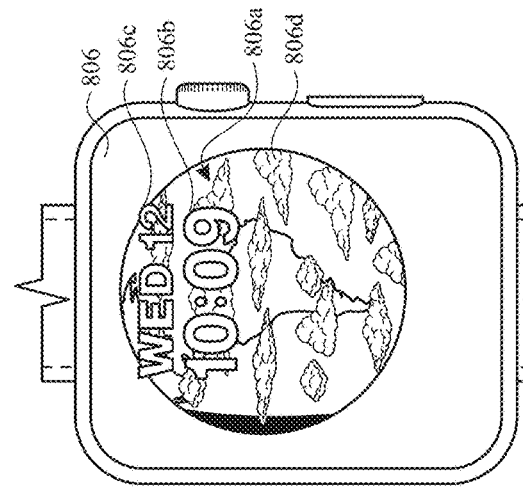
FIGS. 8A-8T illustrate example clock user interfaces including astronomical object, in accordance with some embodiments.
Figure 8B:
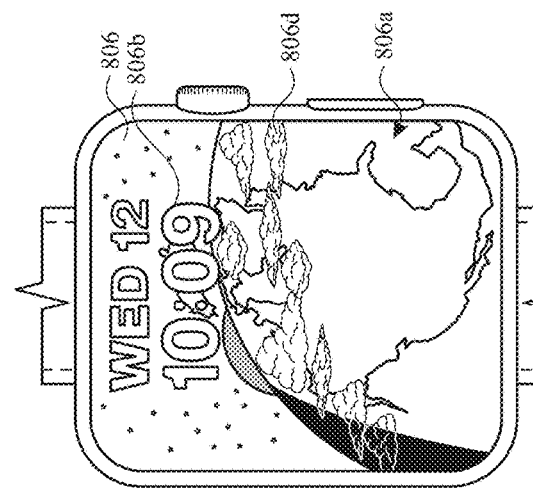
Figure 8C:
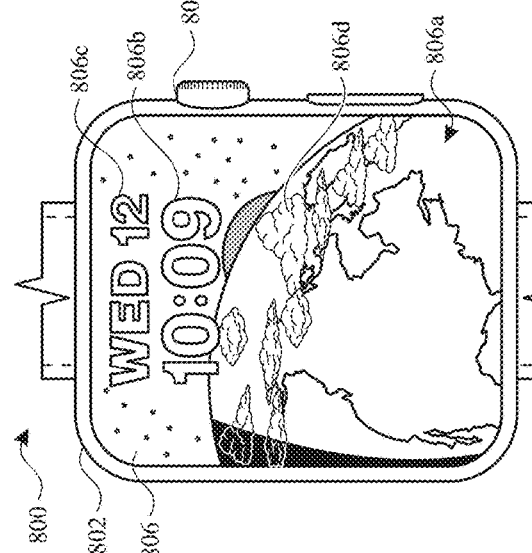
Figure 8D:
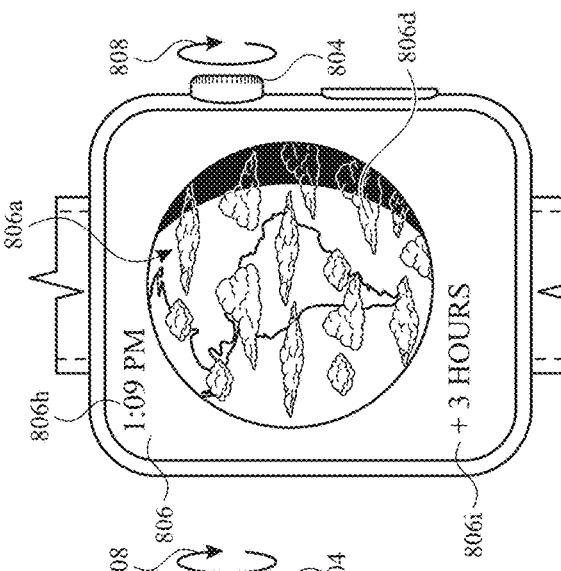
Figure 8E:
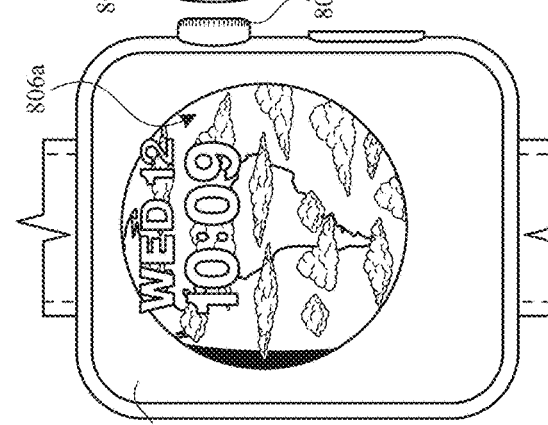
Figure 8F:
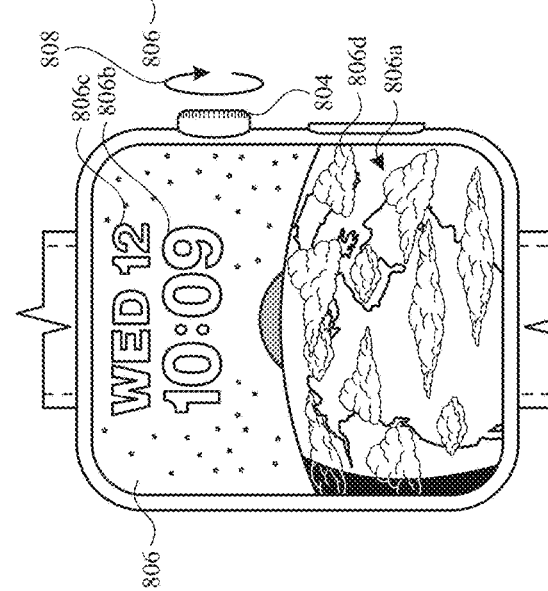
Figure 8M:
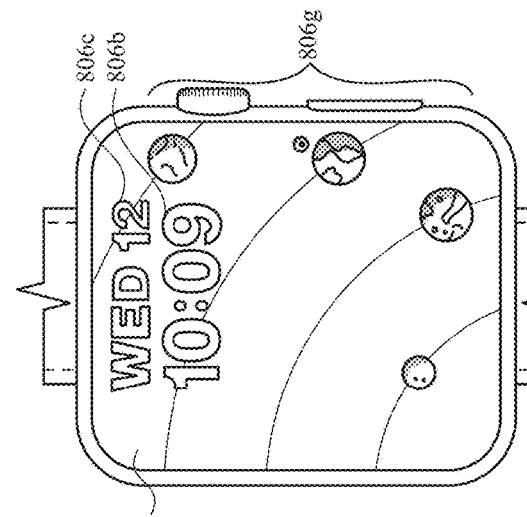
Figure 8O:
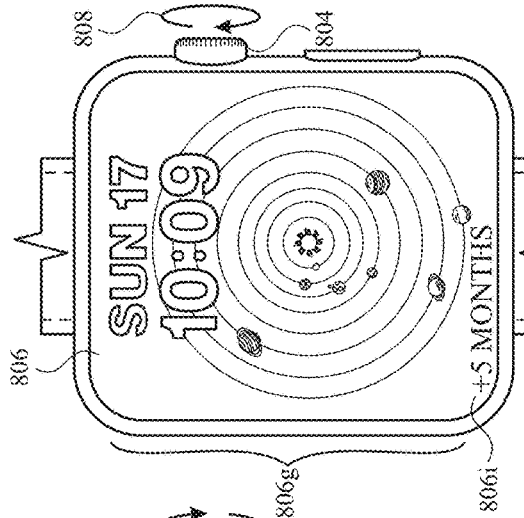
Figure 8N:
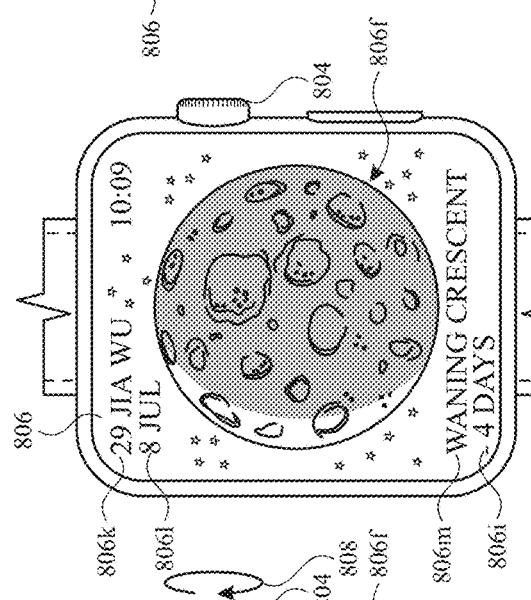
Figure 8P:
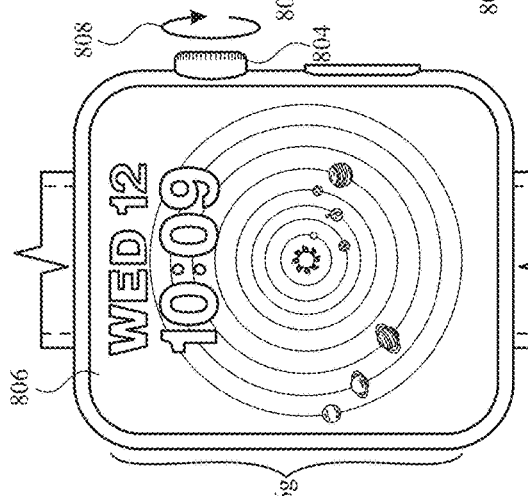
Figure 8Q:
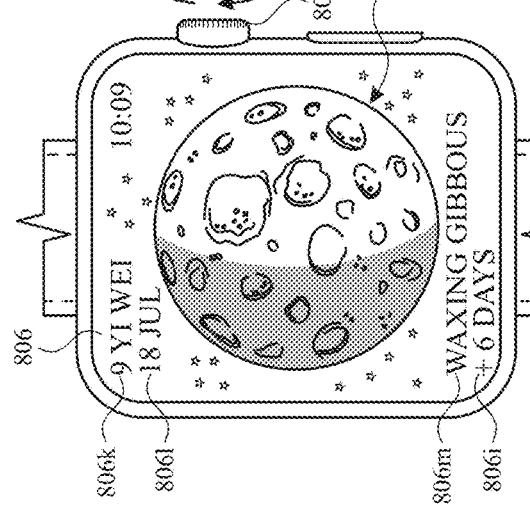
Figure 8R:
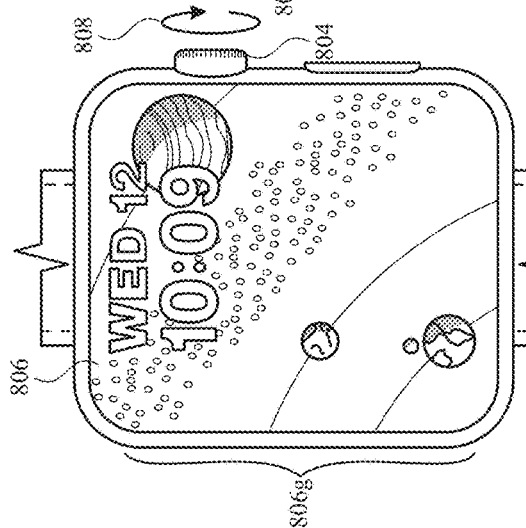
Figure 8S:
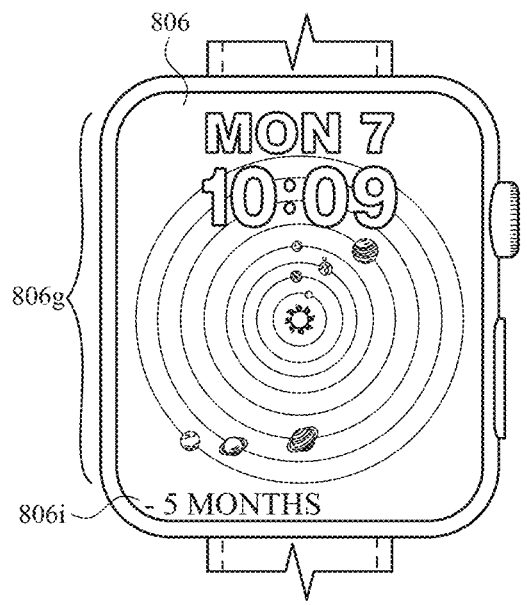
Figure 8T:
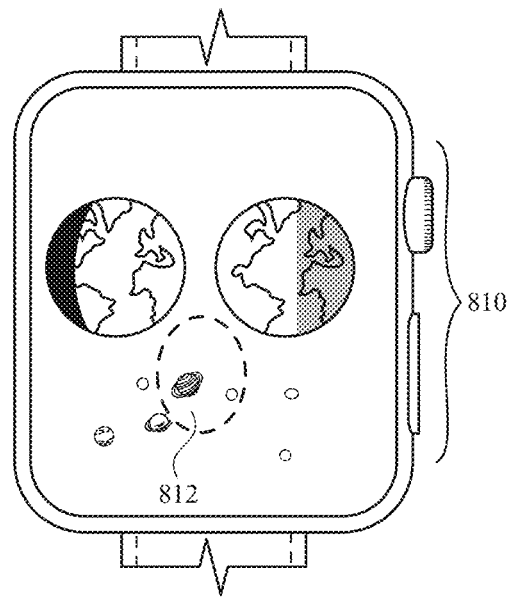
Figure 9:
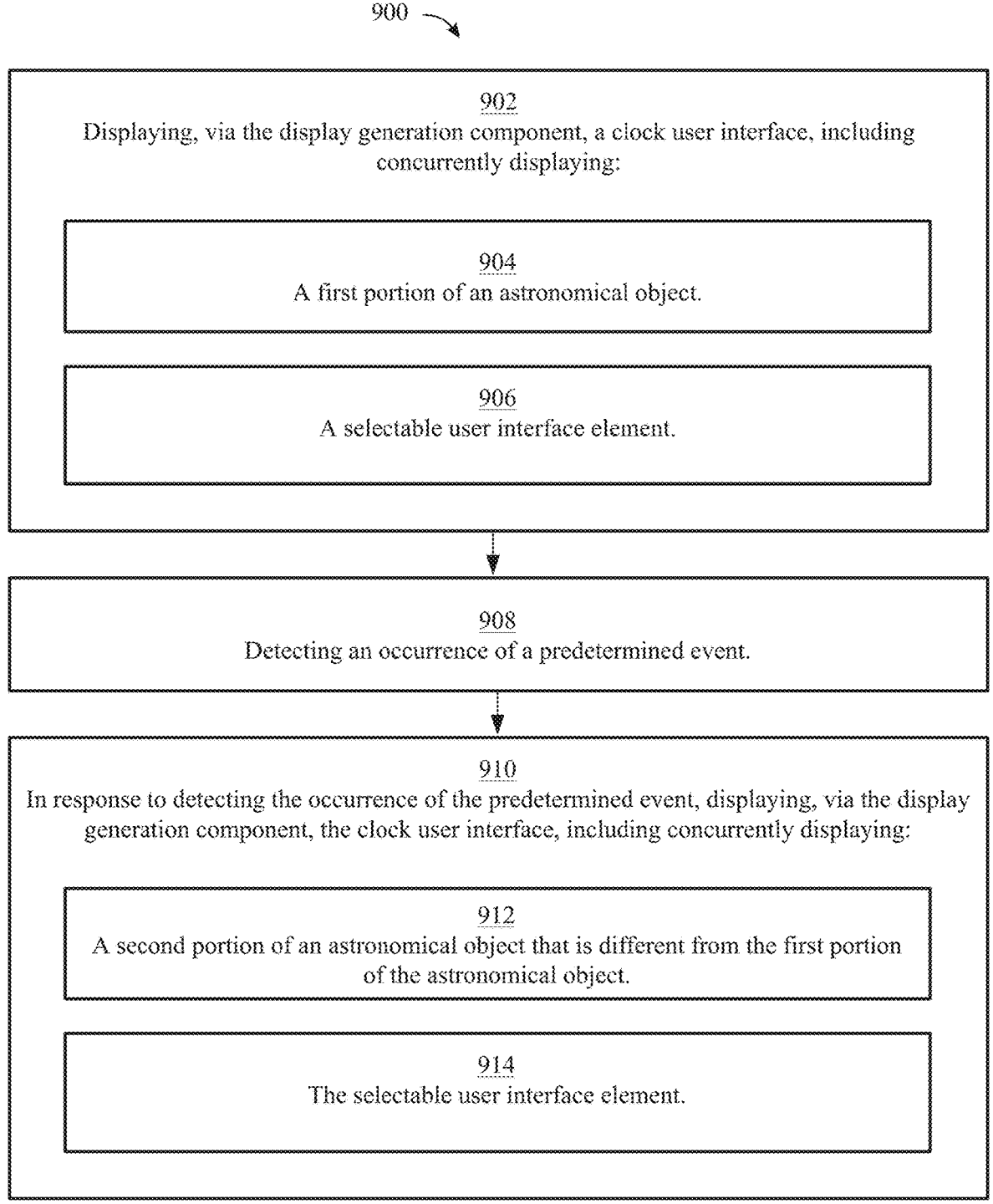
FIG. 9 is a flow diagram illustrating a method for displaying clock user interfaces including astronomical object, in accordance with some embodiments.

FIGS. 8A-8T illustrate example clock user interfaces including astronomical object, in accordance with some embodiments. FIG. 9 is a flow diagram illustrating a method for displaying clock user interfaces including astronomical object, in accordance with some embodiments. The user interfaces in FIGS. 8A-8T are used to illustrate the processes described below, including the processes in FIG. 9.

Figure 10A:
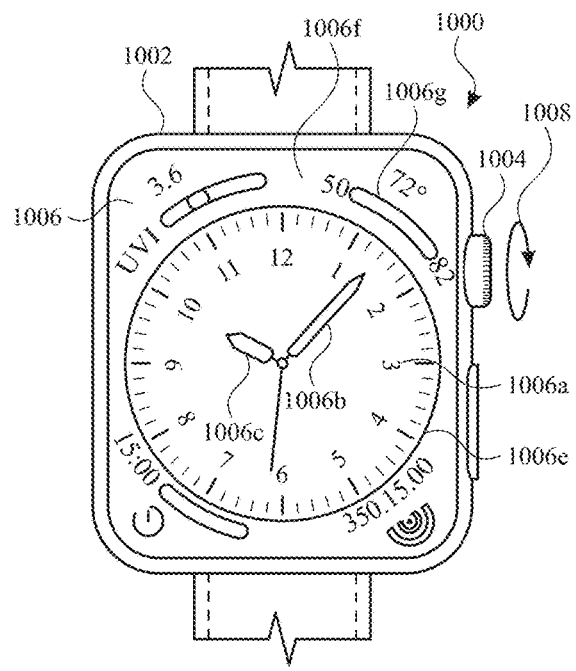
FIGS. 10A-10O illustrate example clock user interfaces that include adjustable time indications, in accordance with some embodiments.
Figure 10B:
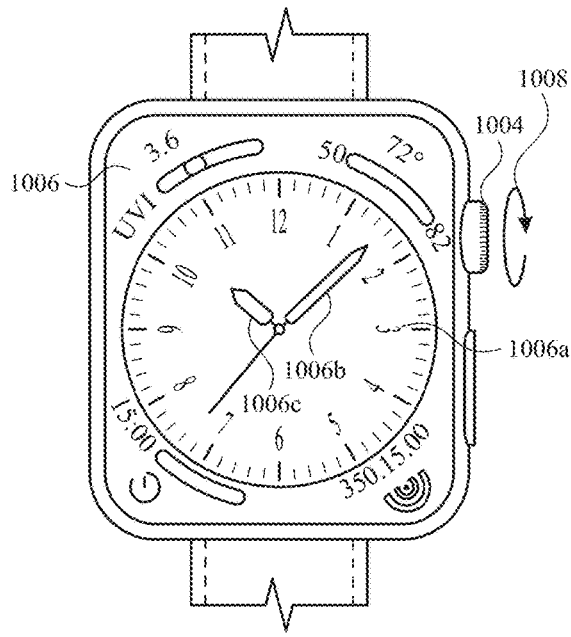
Figure 10C:
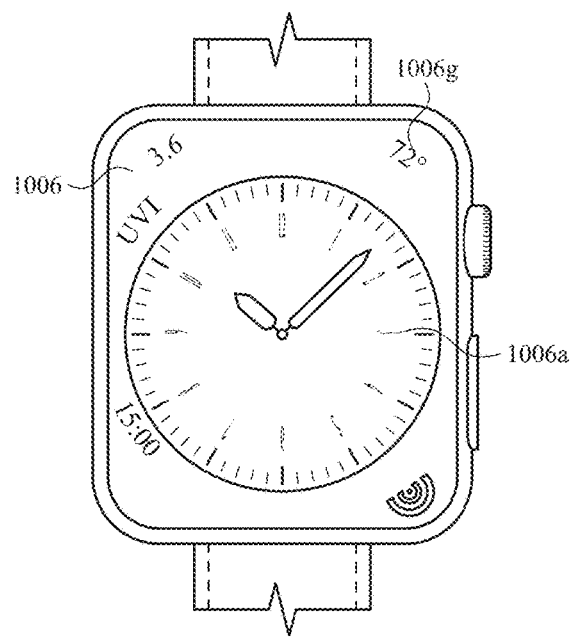
Figure 10D:
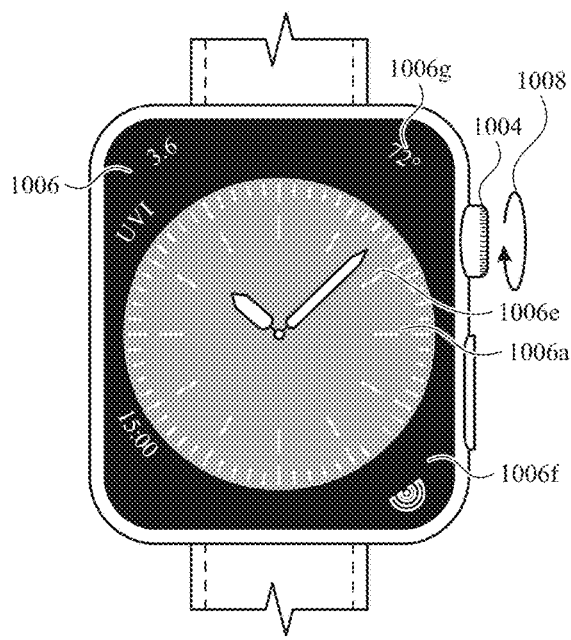
Figure 10E:
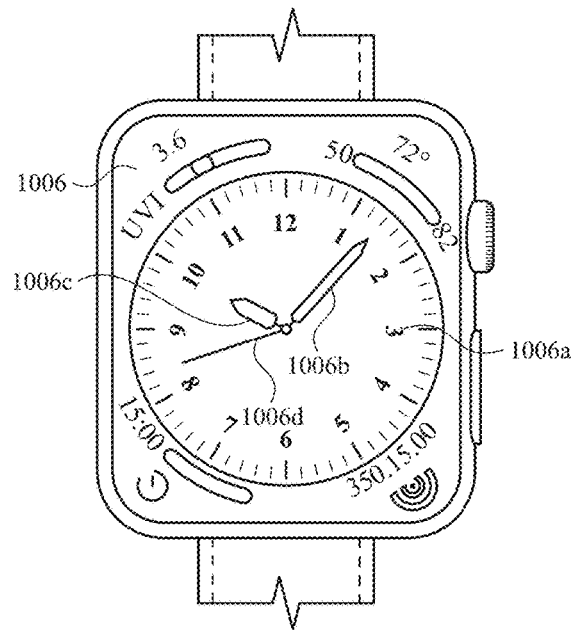
Figure 10F:
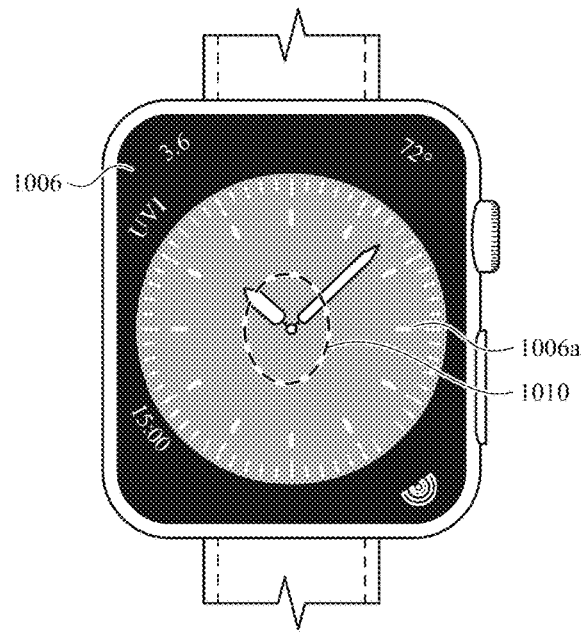
Figure 10G:
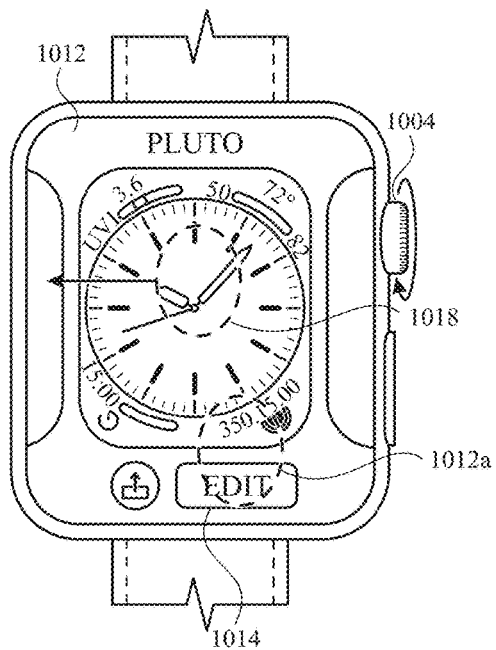
Figure 10H:
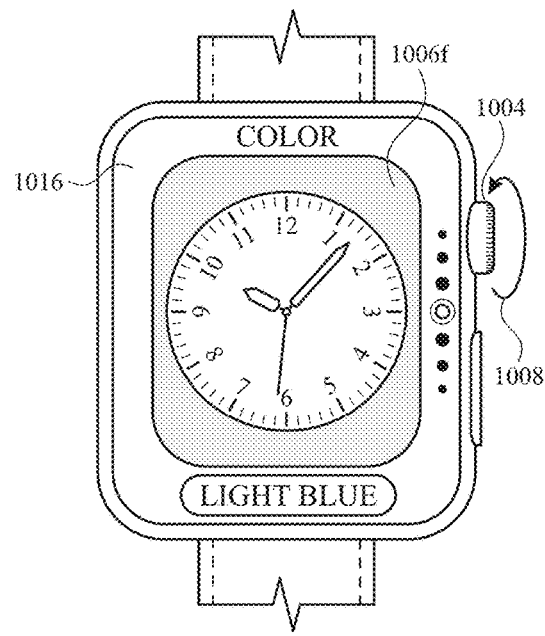
Figure 10I:
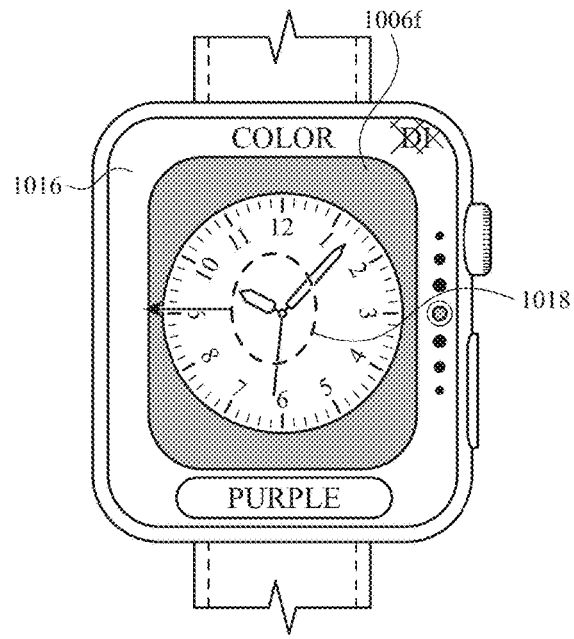
Figure 10J:
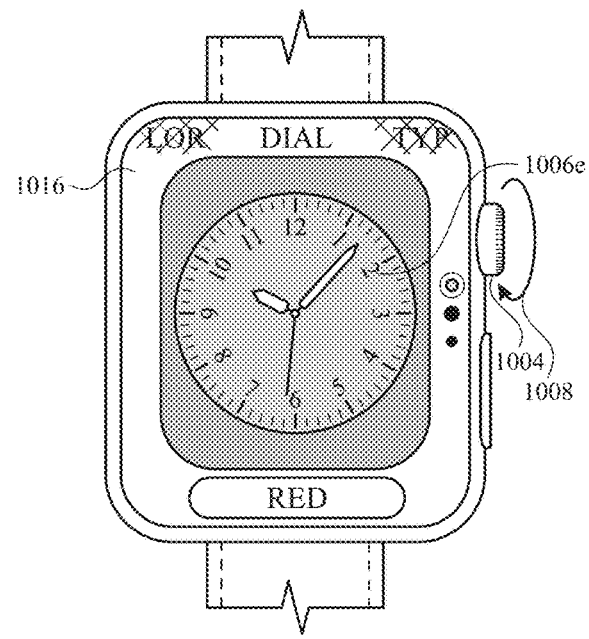
Figure 10K:
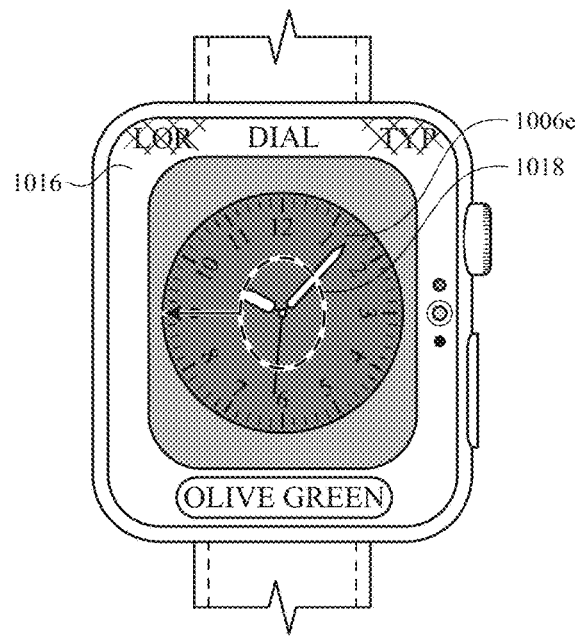
Figure 10L:
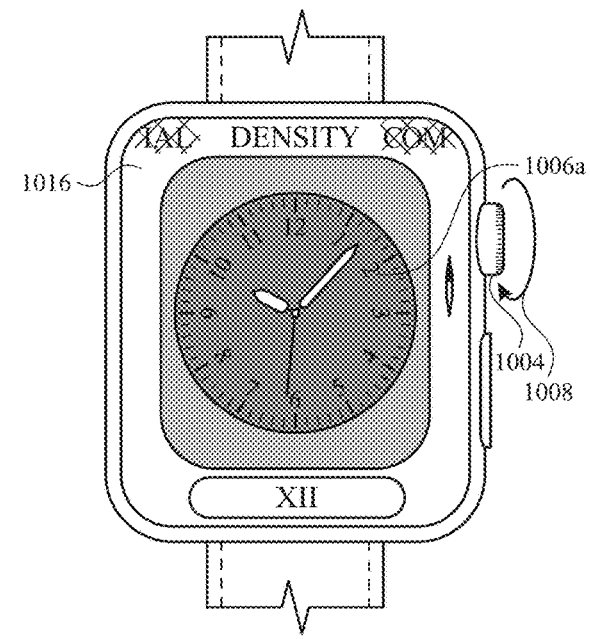
Figure 10M:
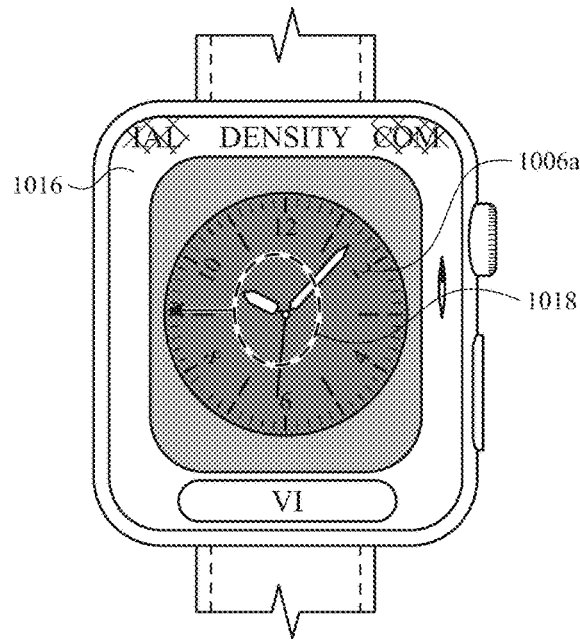
Figure 10N:
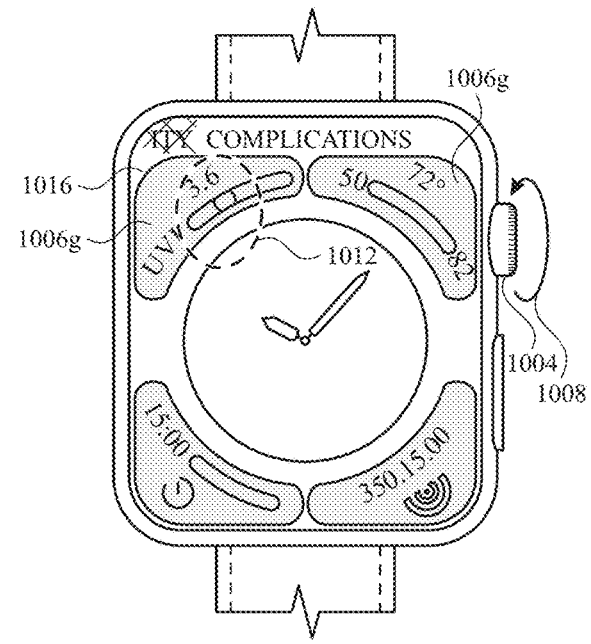
Figure 10O:
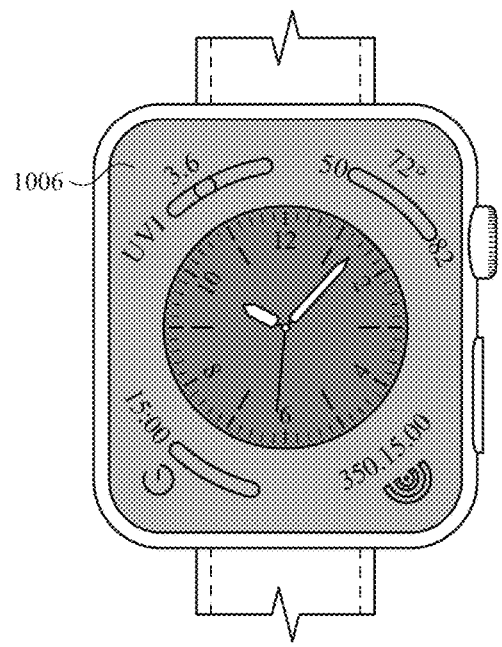

FIGS. 10A-10O illustrate example clock user interfaces that include adjustable time indications, in accordance with some embodiments. FIG. 11 is a flow diagram illustrating a method for displaying clock user interfaces that include adjustable time indications, in accordance with some embodiments. The user interfaces in FIGS. 10A-10O are used to illustrate the processes described below, including the processes in FIG. 11.

Figure 12D:
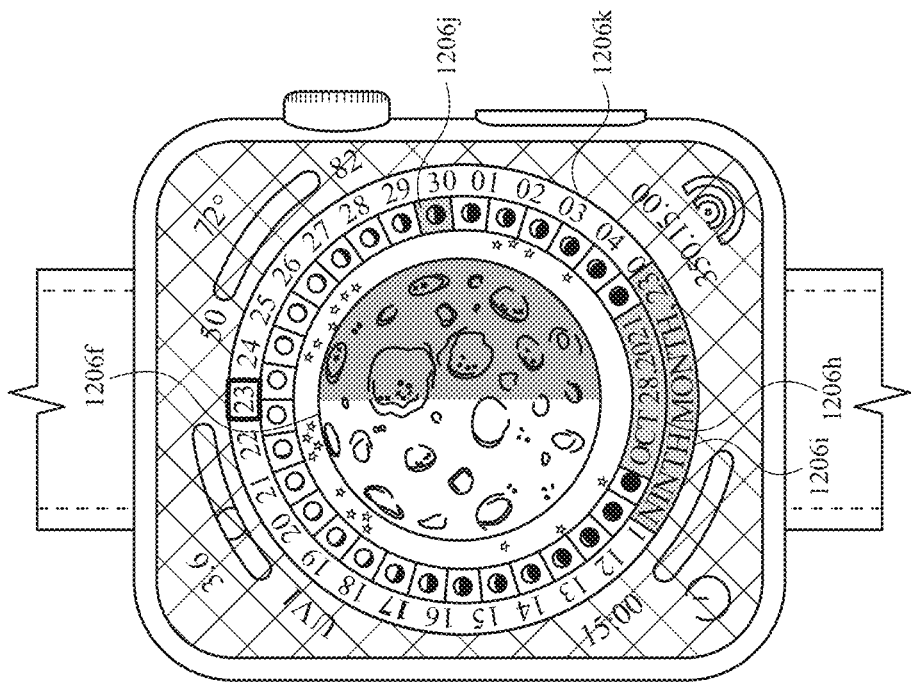
FIGS. 12A-12O illustrate example clock user interfaces that include multiple calendar systems, in accordance with some embodiments.
Figure 12C:
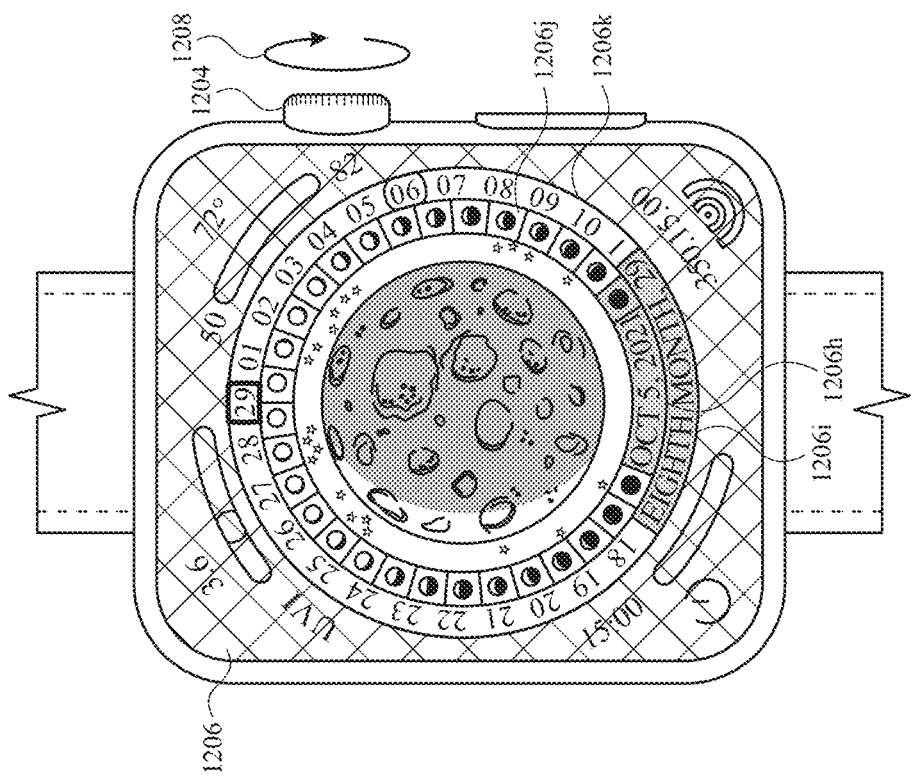
Figure 12E:
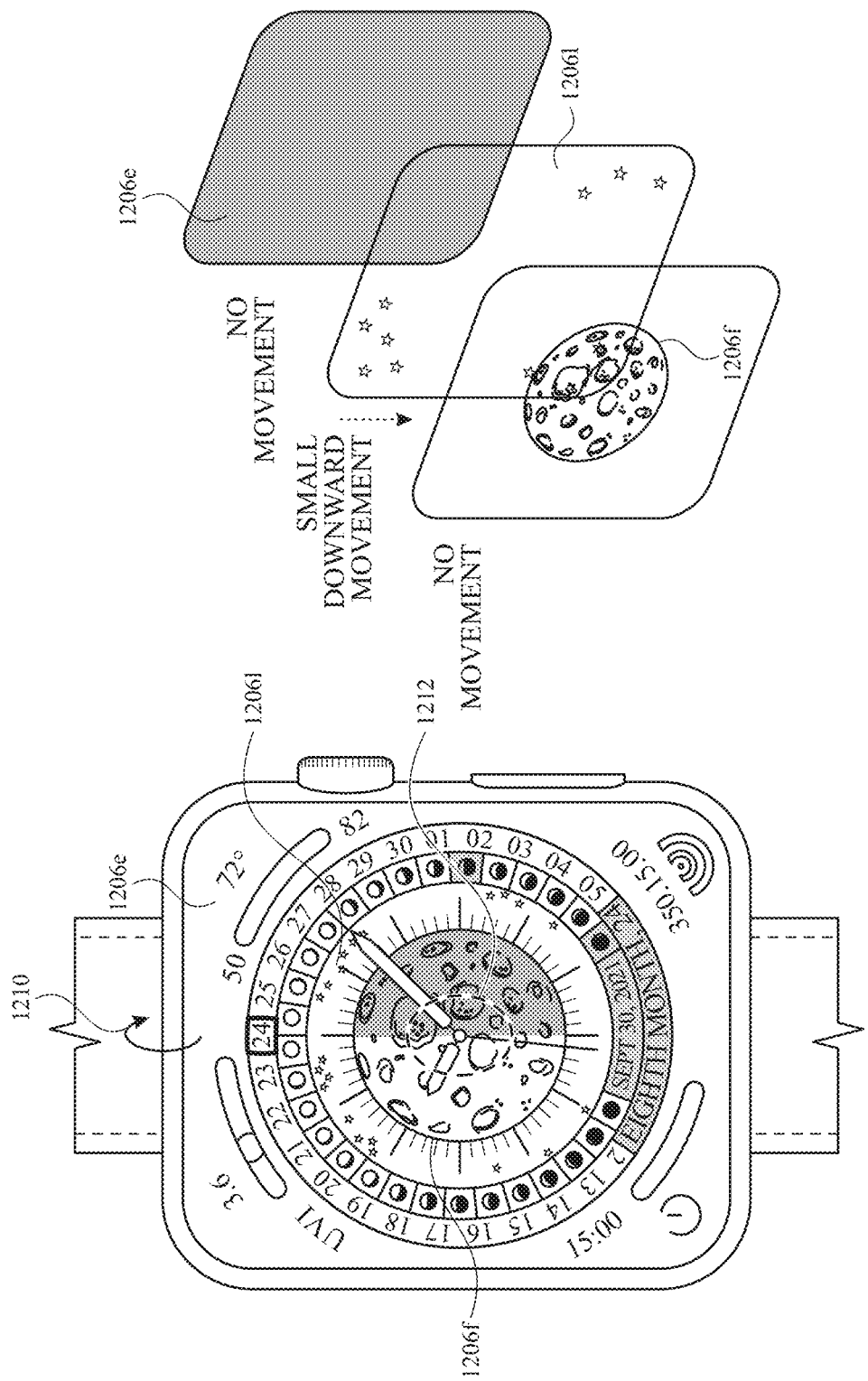
Figure 12G:
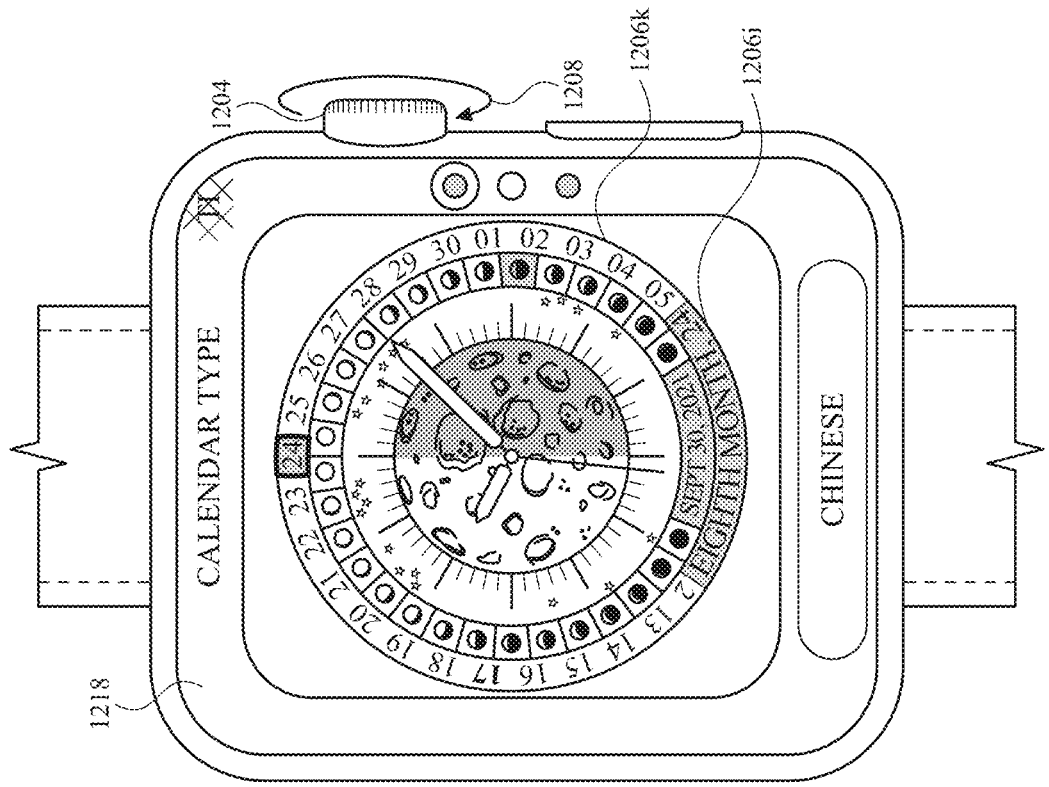
Figure 12F:
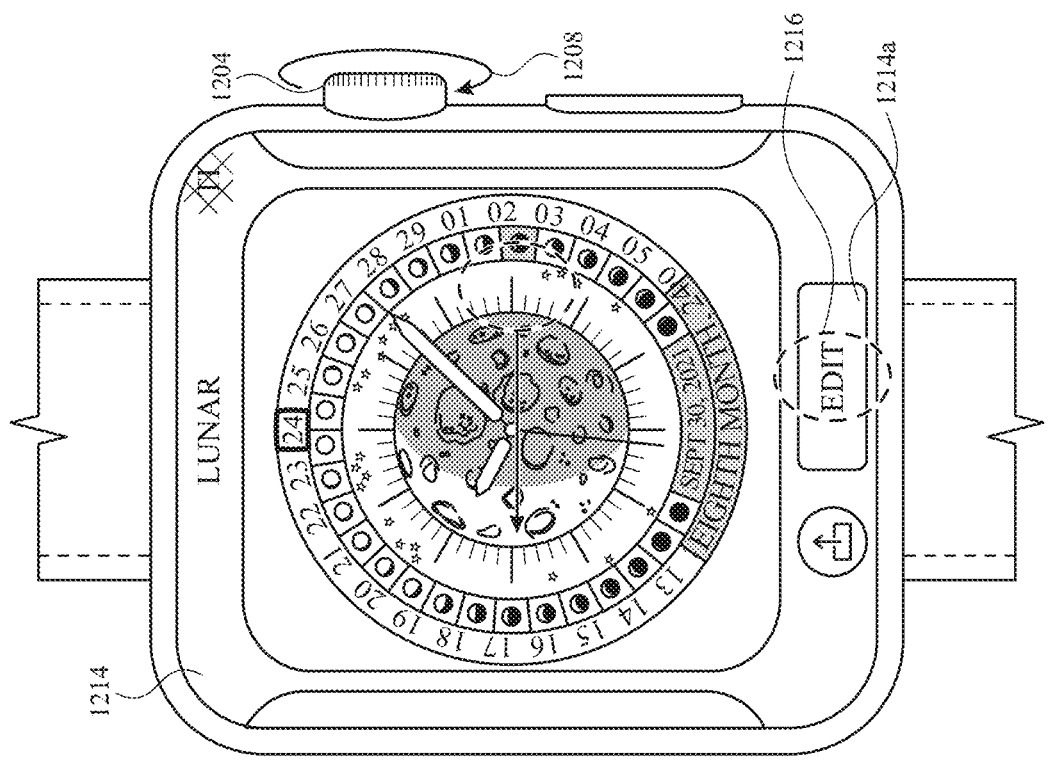
Figure 12I:
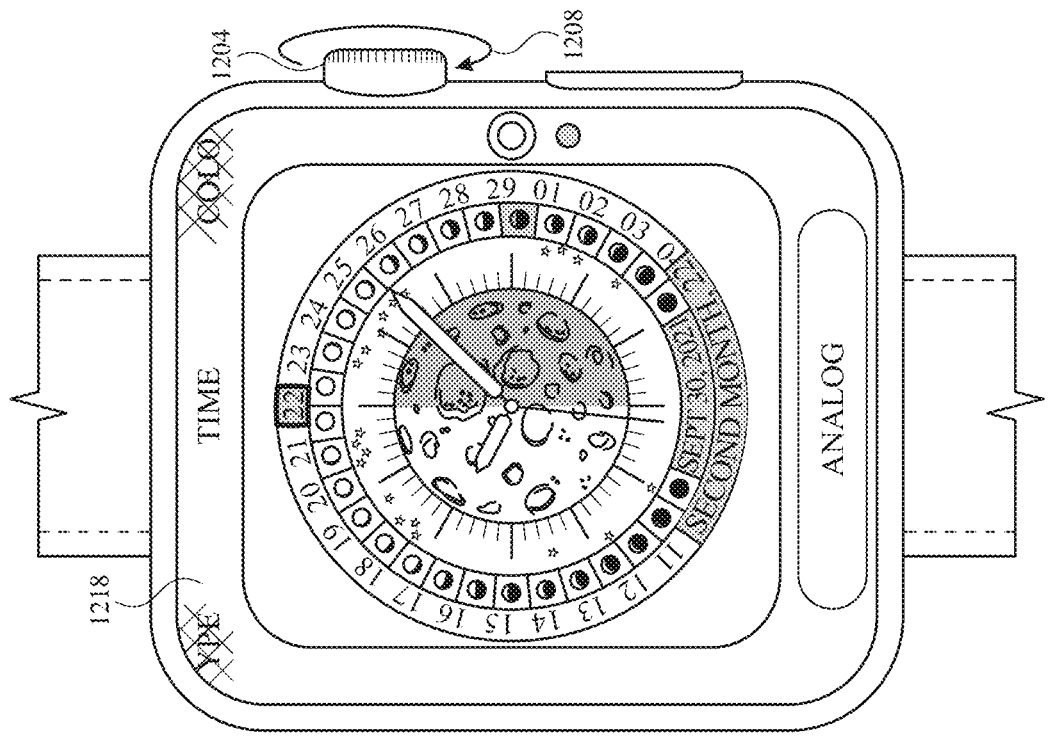
Figure 12H:
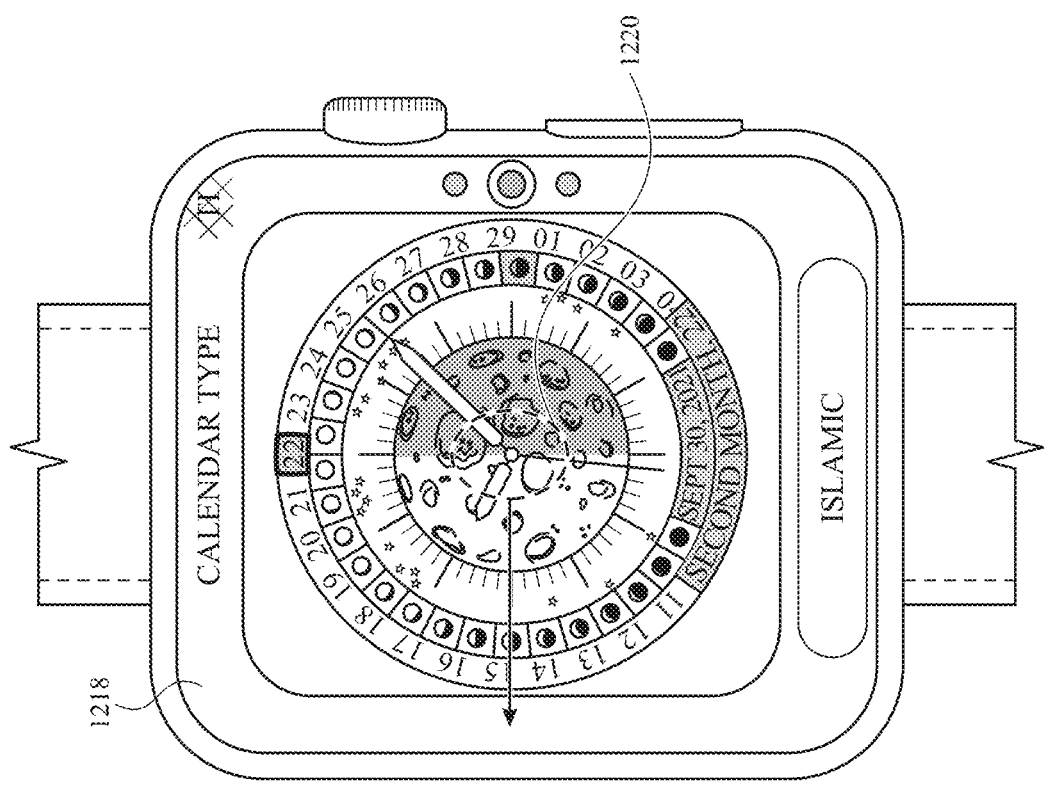
Figure 12K:
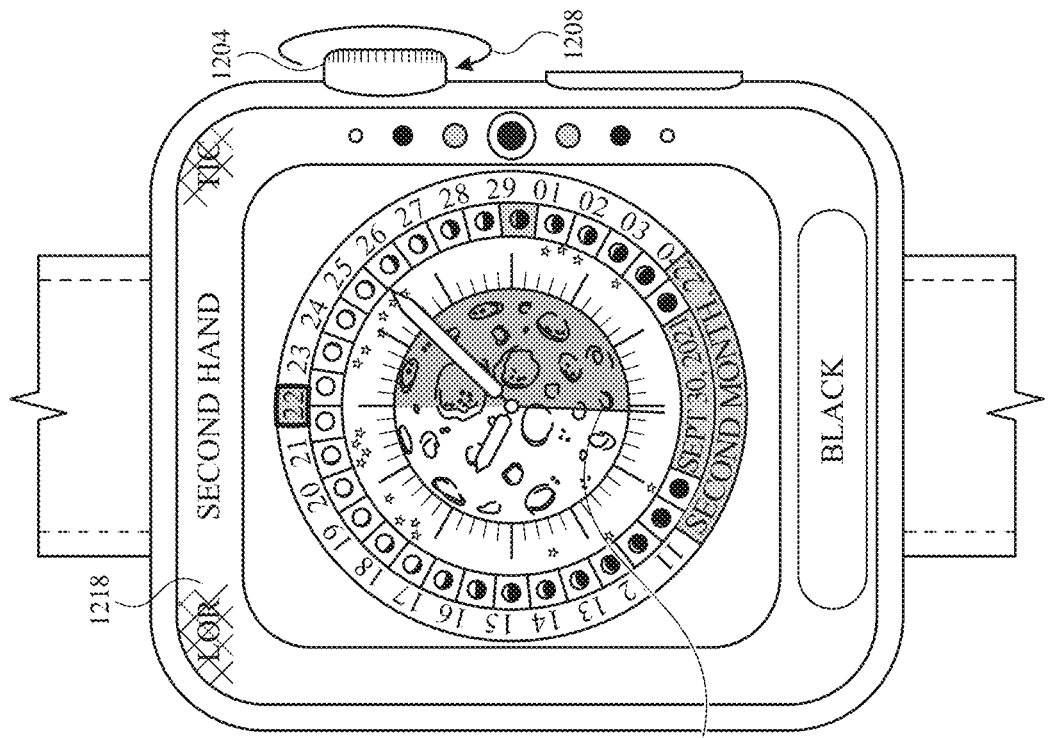
Figure 12J:
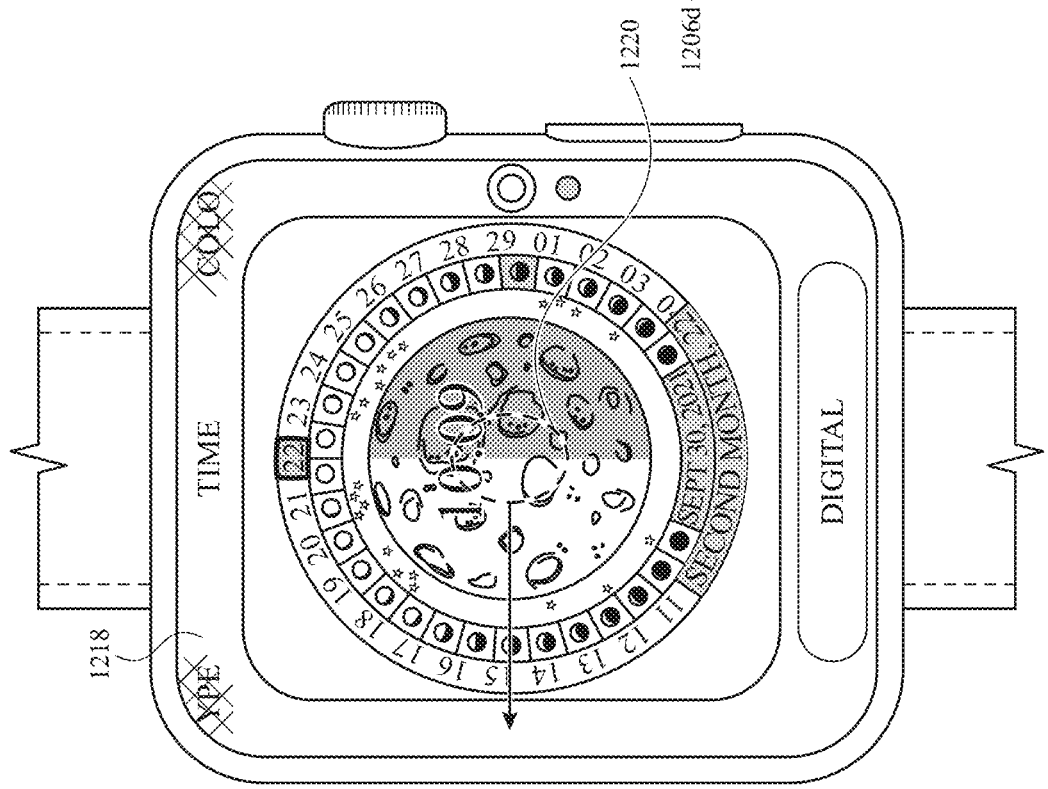
Figure 12L:
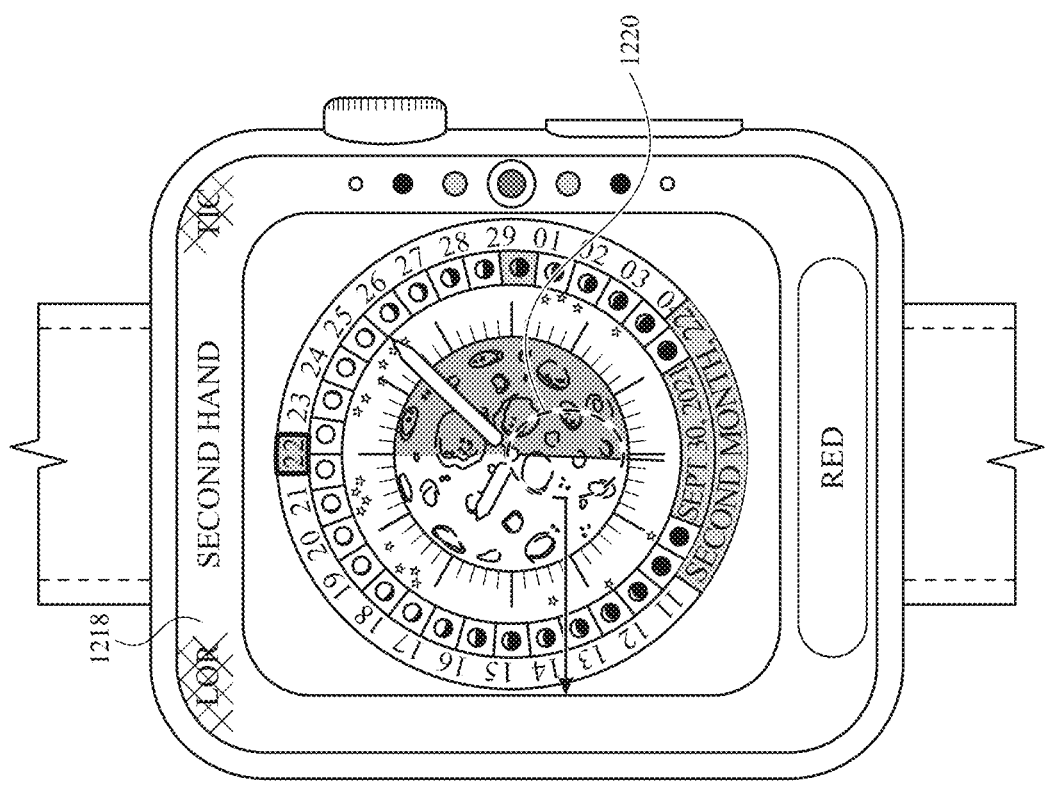
Figure 12M:
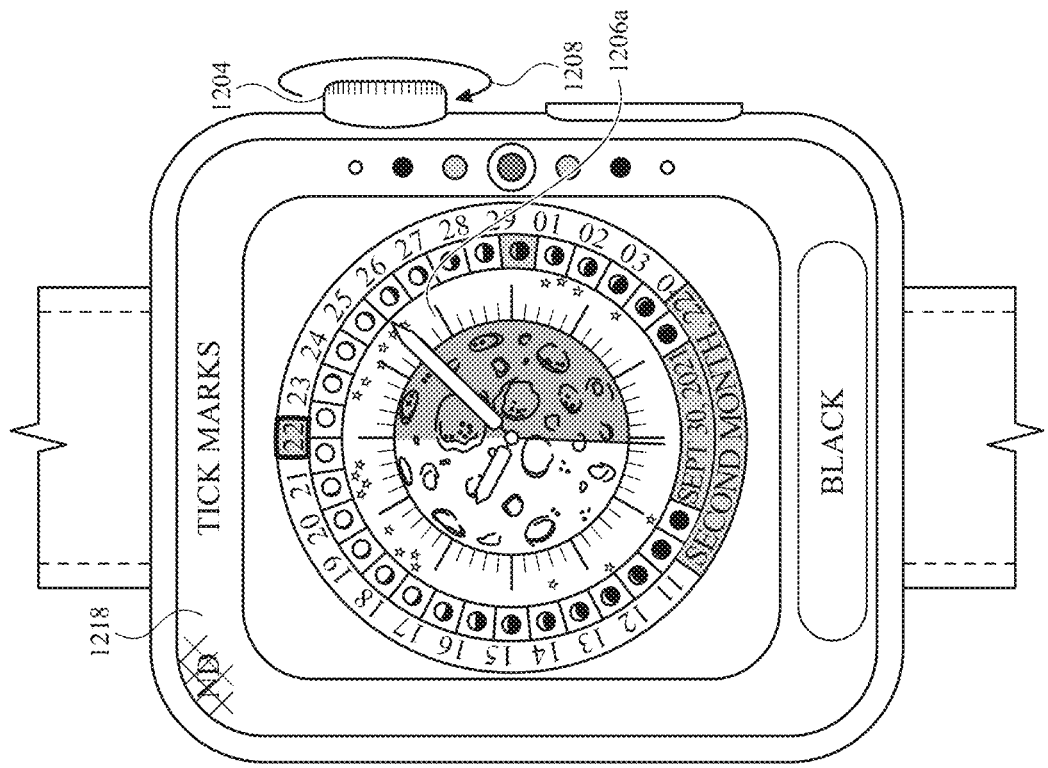
Figure 12O:
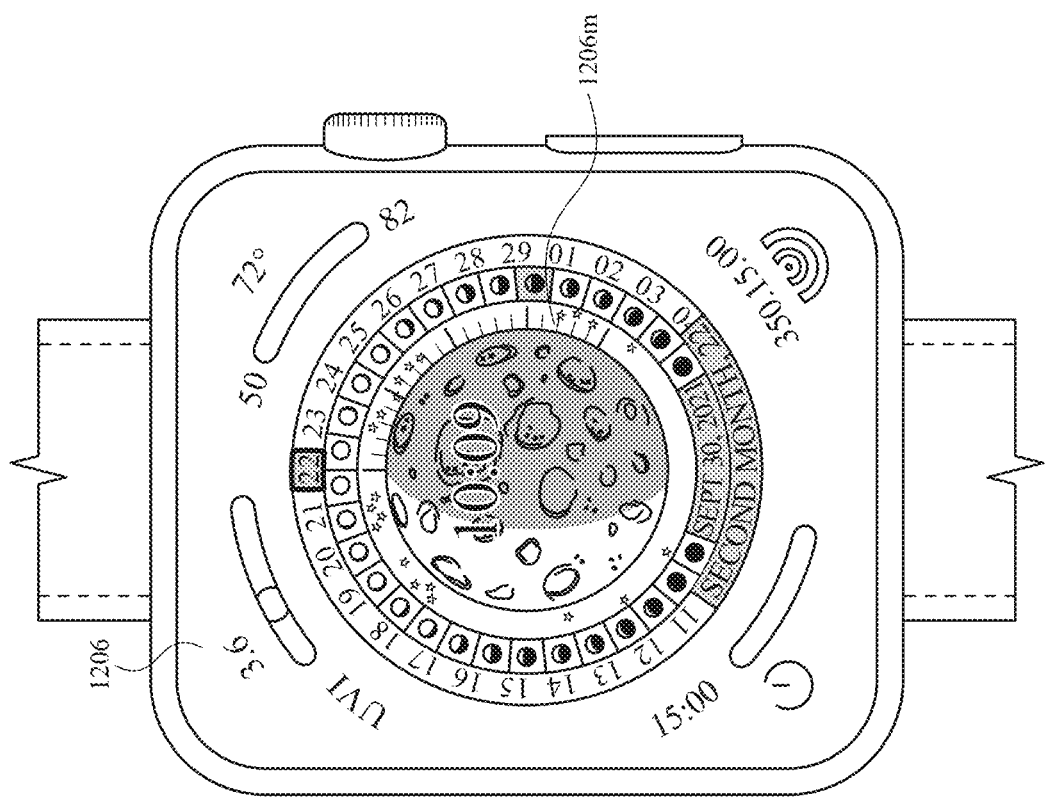

FIGS. 12A-12O illustrate example clock user interfaces that include multiple calendar systems, in accordance with some embodiments. FIG. 13 is a flow diagram illustrating a method for displaying clock user interfaces that include multiple calendar systems, in accordance with some embodiments. The user interfaces in FIGS. 12A-12O are used to illustrate the processes described below, including the processes in FIG. 13.

Figure 14M:
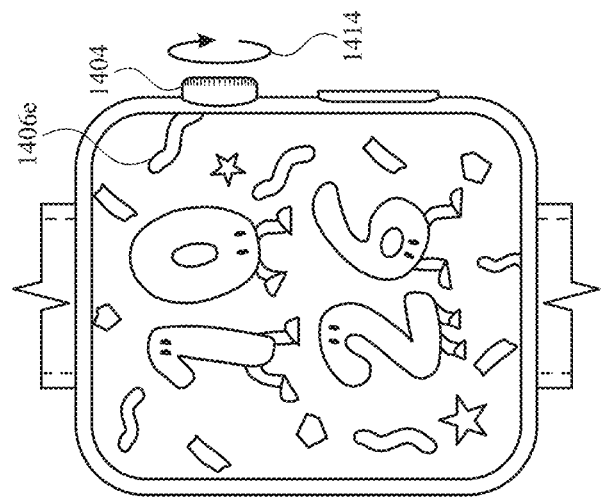
FIGS. 14A-14S illustrate example clock user interfaces including animated numerals, in accordance with some embodiments.
Figure 15:
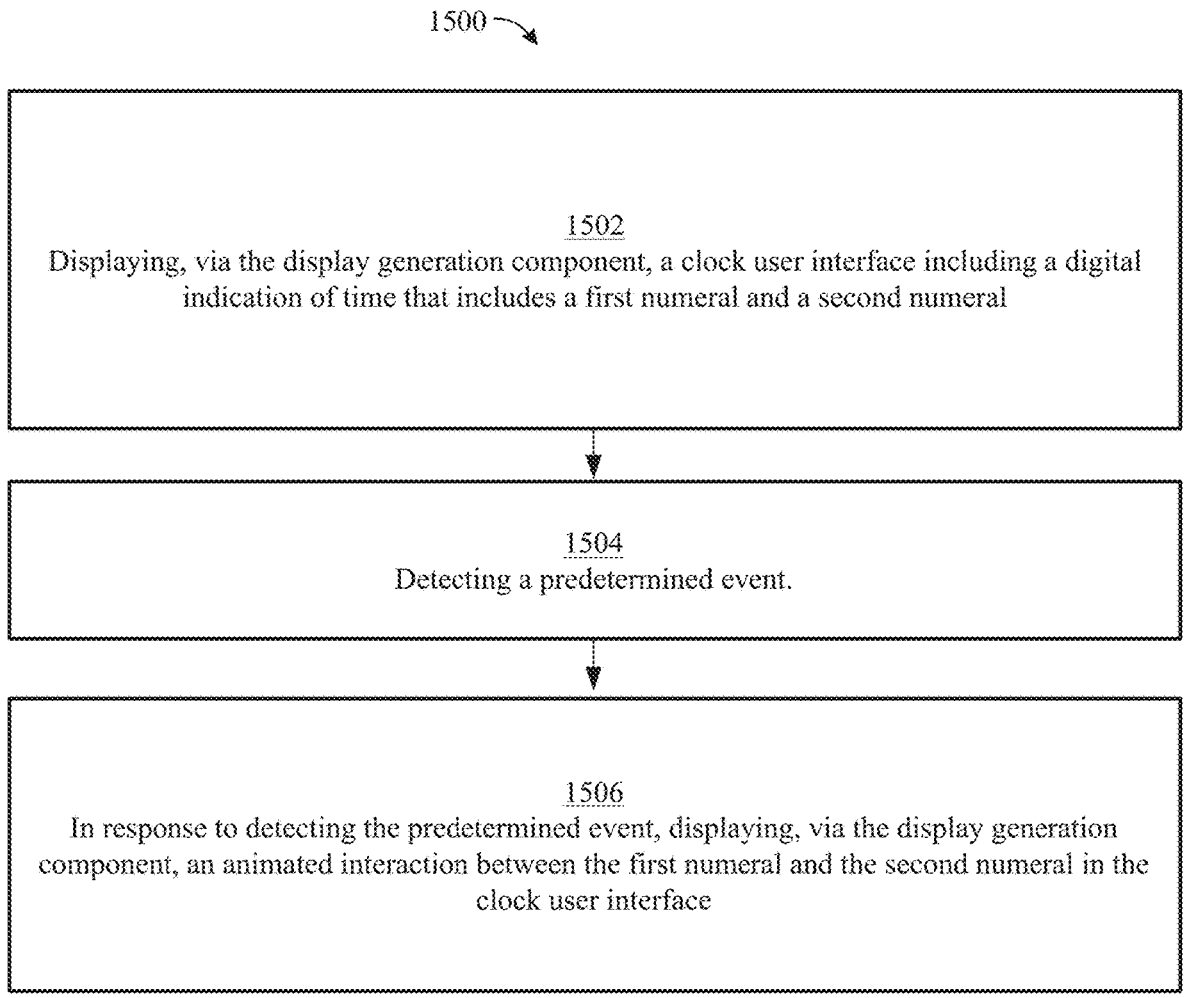
FIG. 15 is a flow diagram illustrating a method for displaying clock user interfaces including animated numerals, in accordance with some embodiments.

FIGS. 14A-14S illustrate example clock user interfaces including animated numerals, in accordance with some embodiments. FIG. 15 is a flow diagram illustrating a method for displaying clock user interfaces including animated numerals, in accordance with some embodiments. The user interfaces in FIGS. 14A-14S are used to illustrate the processes described below, including the processes in FIG. 15.

FIGS. 16A-16I illustrate example clock user interfaces that are displayed with colors that are based on a selected color, in accordance with some embodiments. FIG. 17 is a flow diagram illustrating a method for displaying clock user interfaces with colors that are based on a selected color, in accordance with some embodiments. The user interfaces in FIGS. 16A-16I are used to illustrate the processes described below, including the processes in FIG. 17.

Figure 18A:
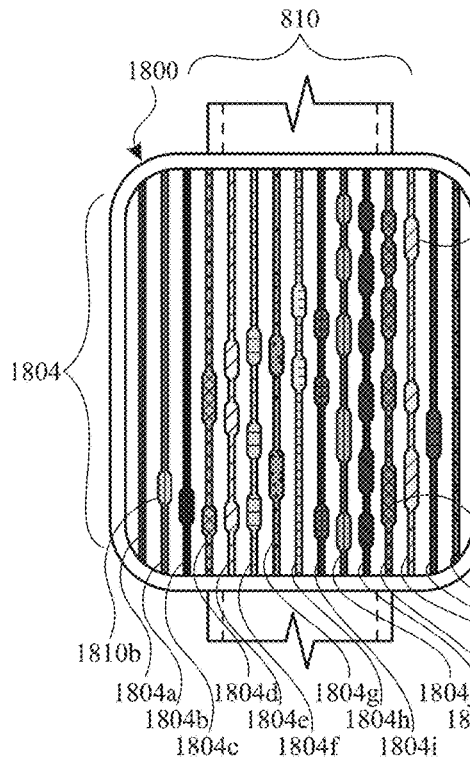
FIGS. 18A-18Q illustrate example clock user interfaces including animated lines, in accordance with some embodiments.
Figure 18B:
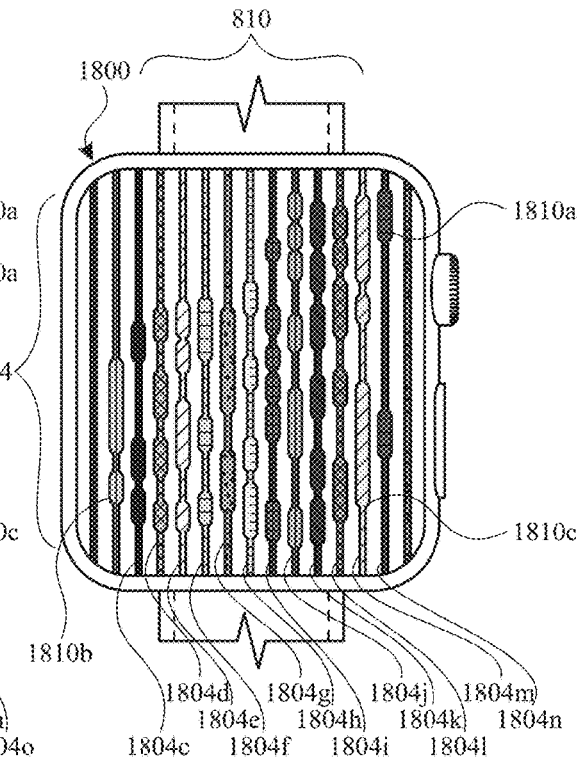
Figure 18C:
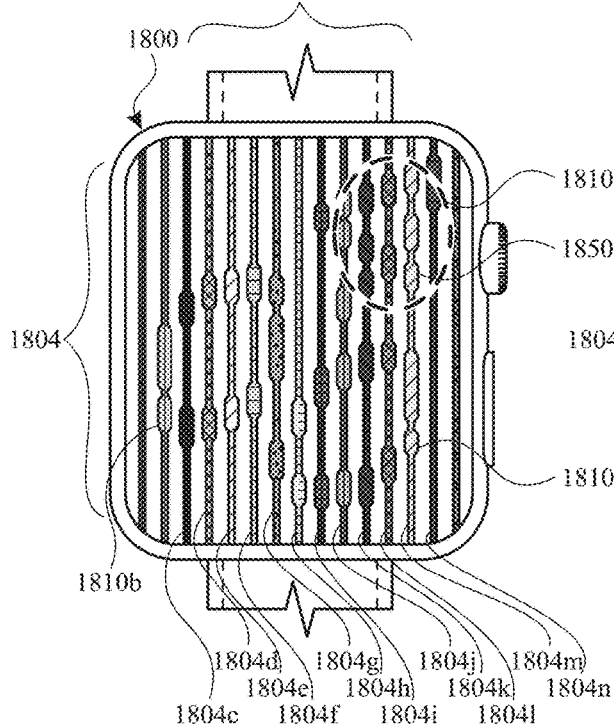
Figure 18D:
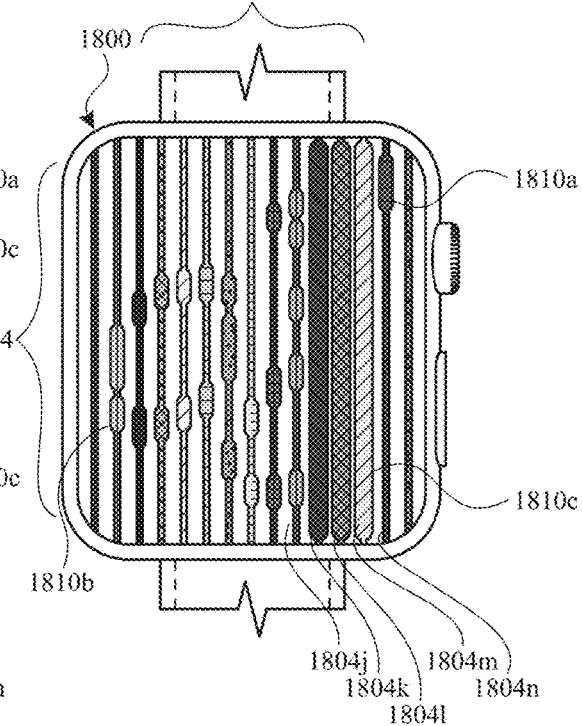
Figure 18E:
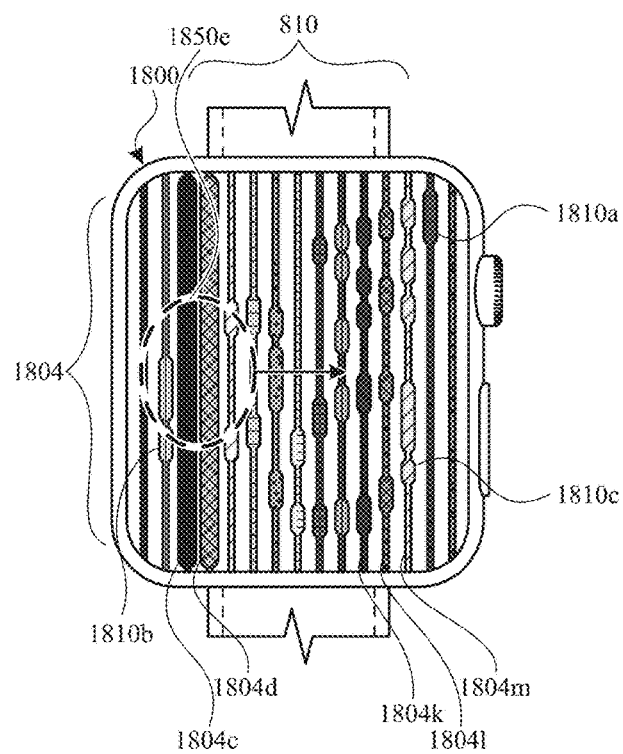
Figure 18F:
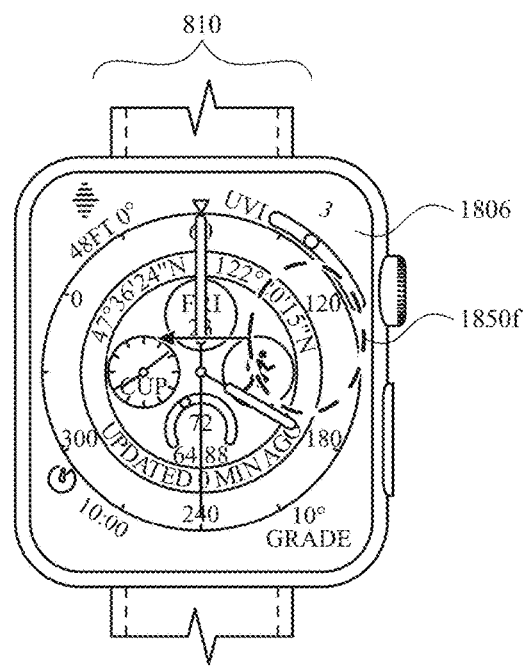
Figure 18G:
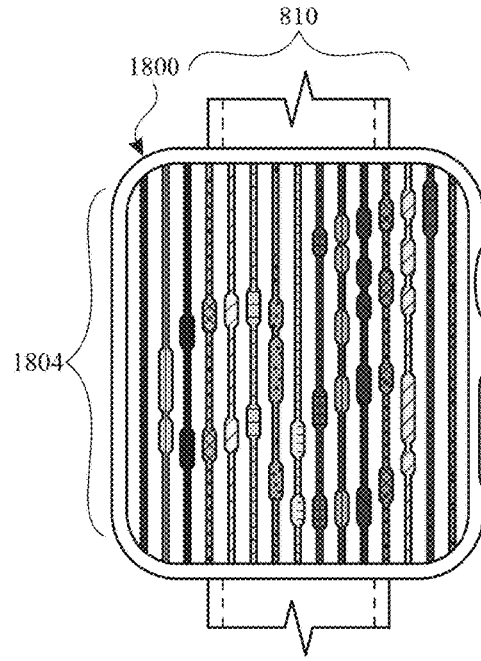
Figure 18H:
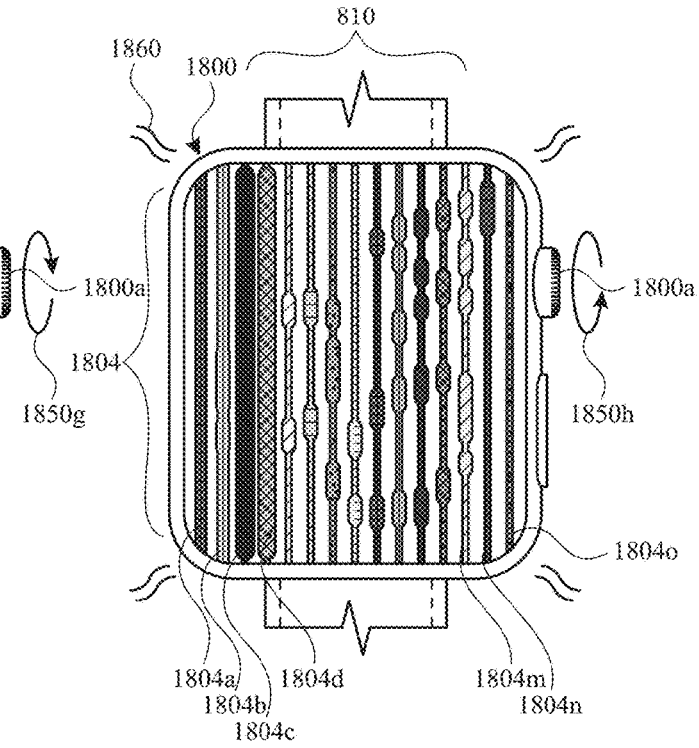
Figure 18K:
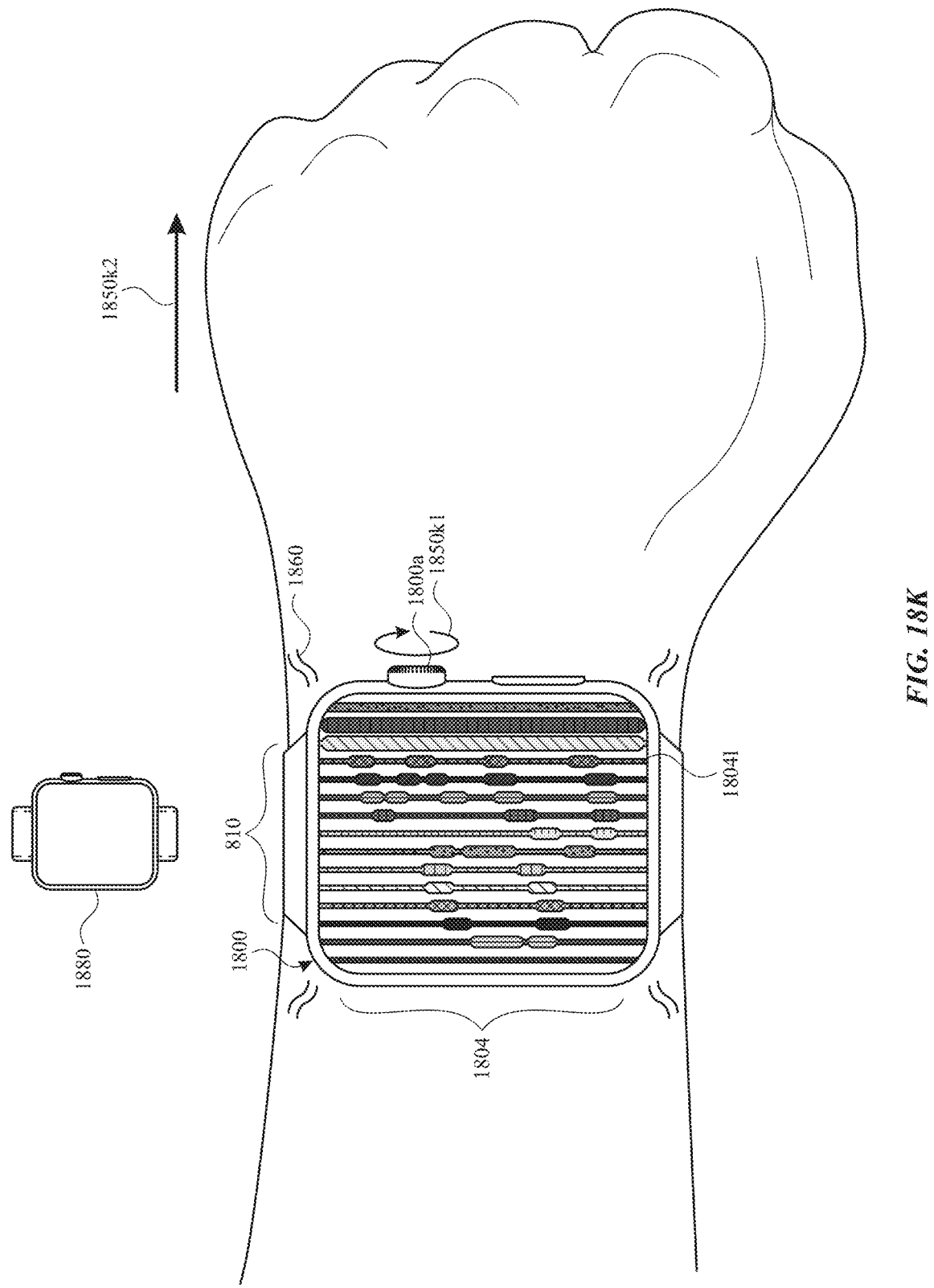
Figure 18L:
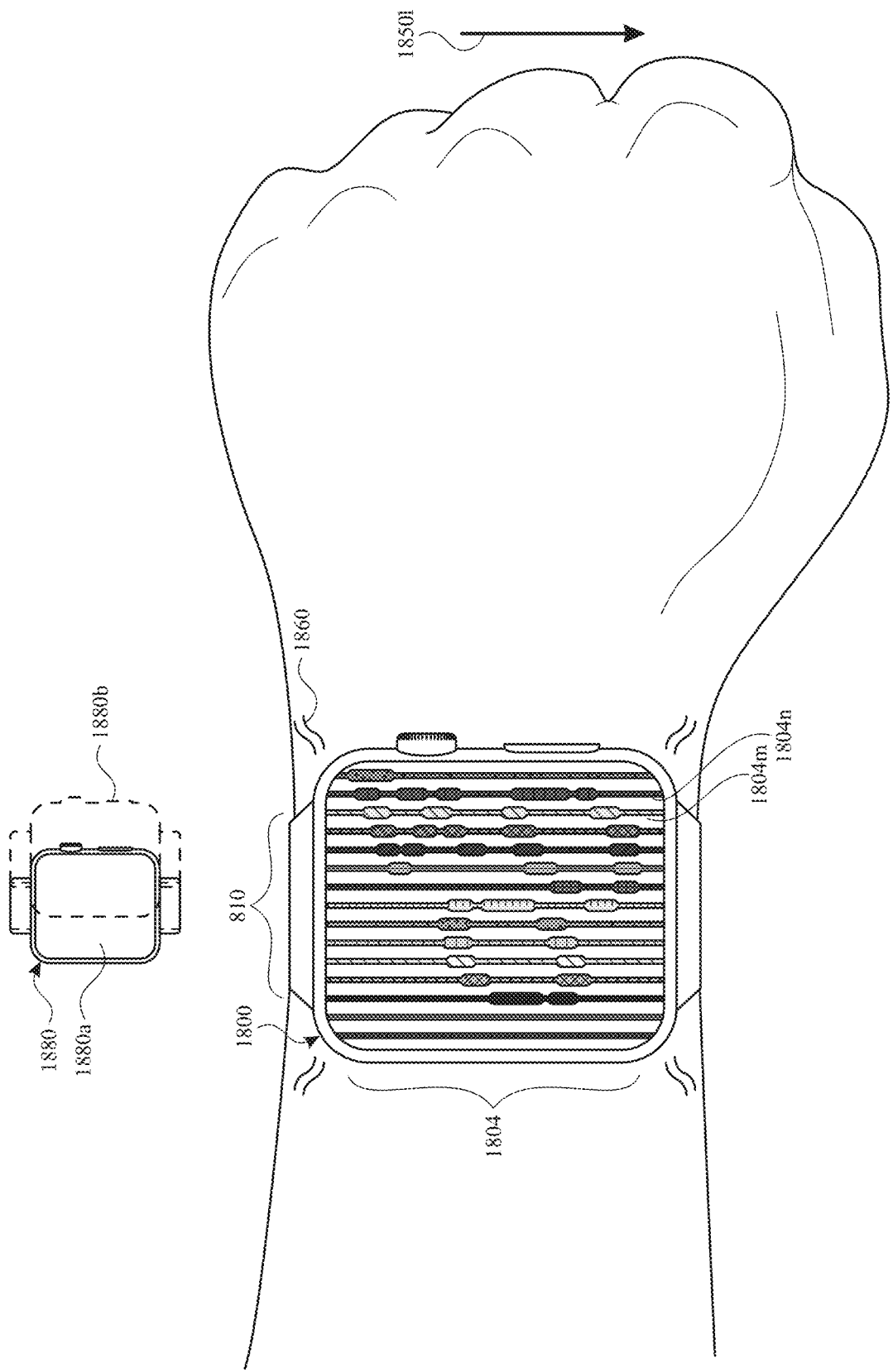
Figure 18M:
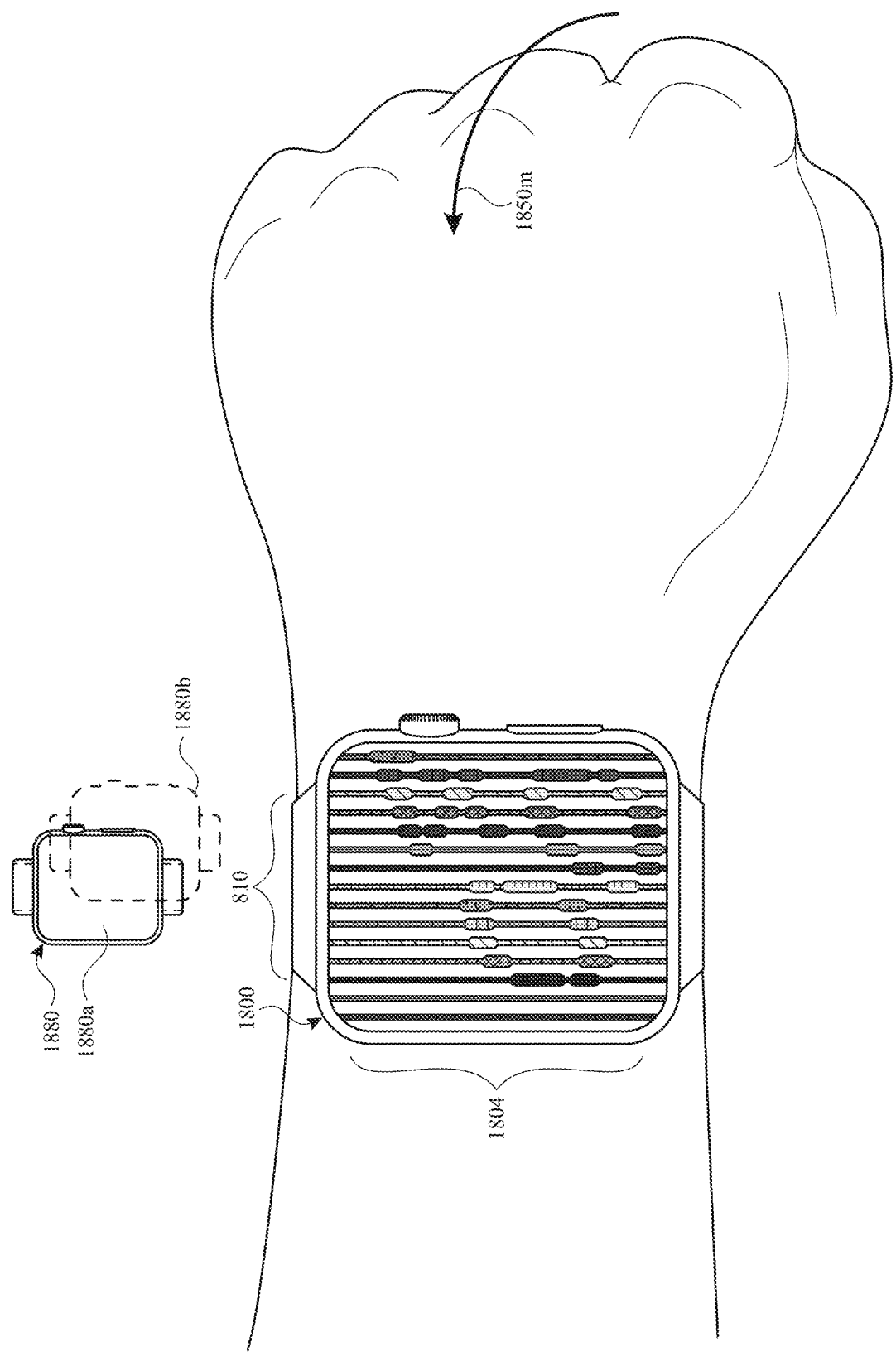
Figure 18N:
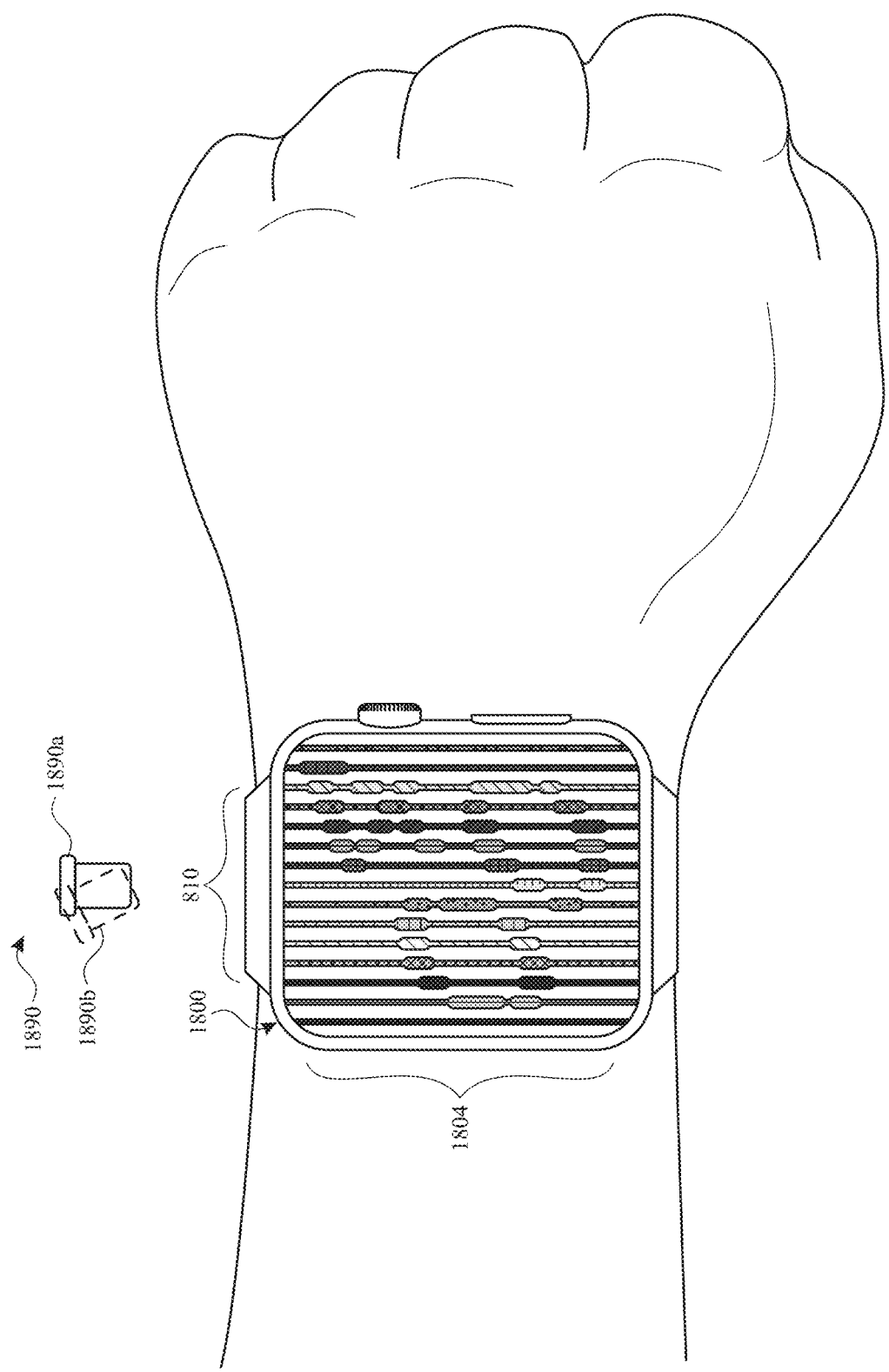
Figure 18O:
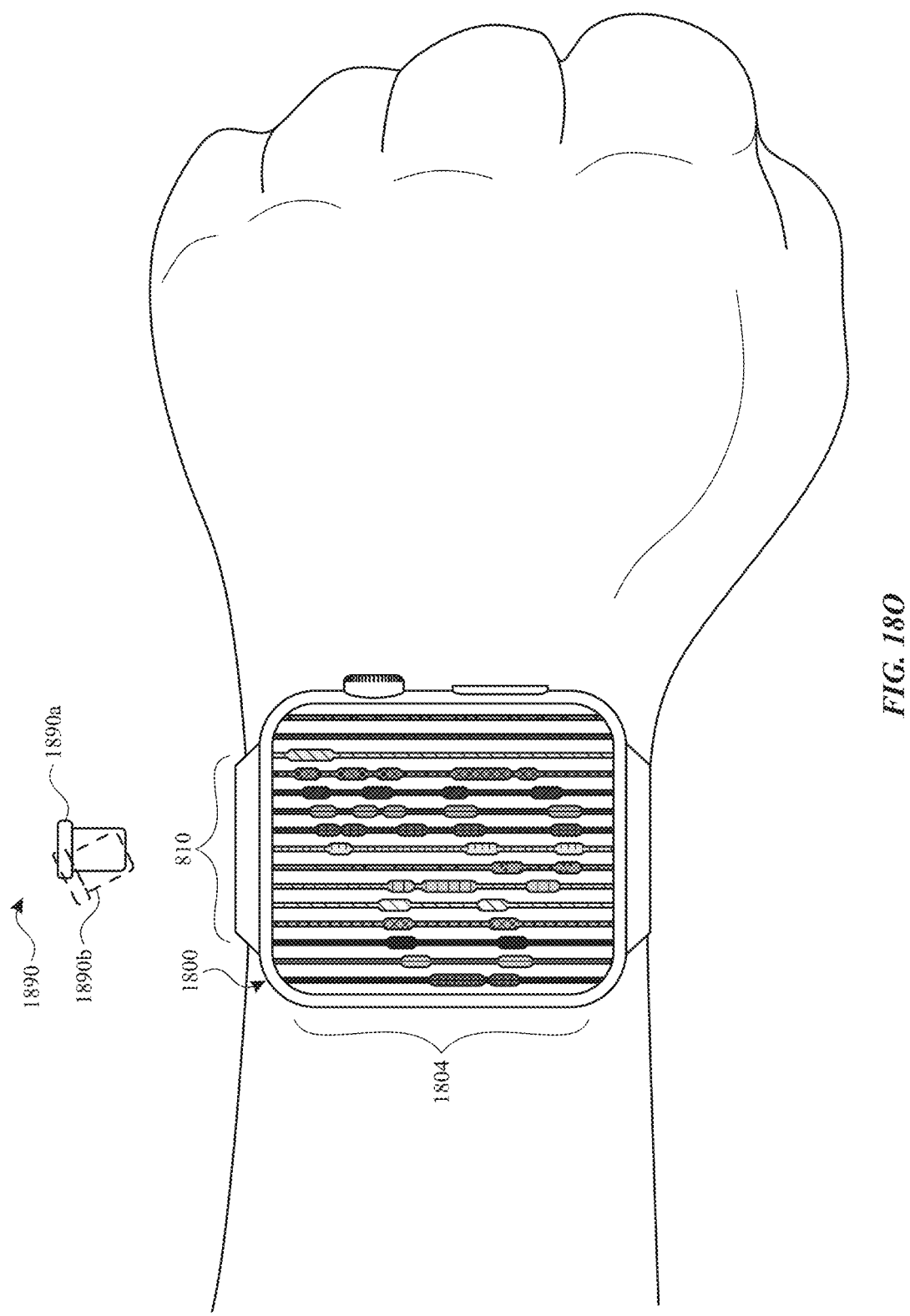
Figure 18P:
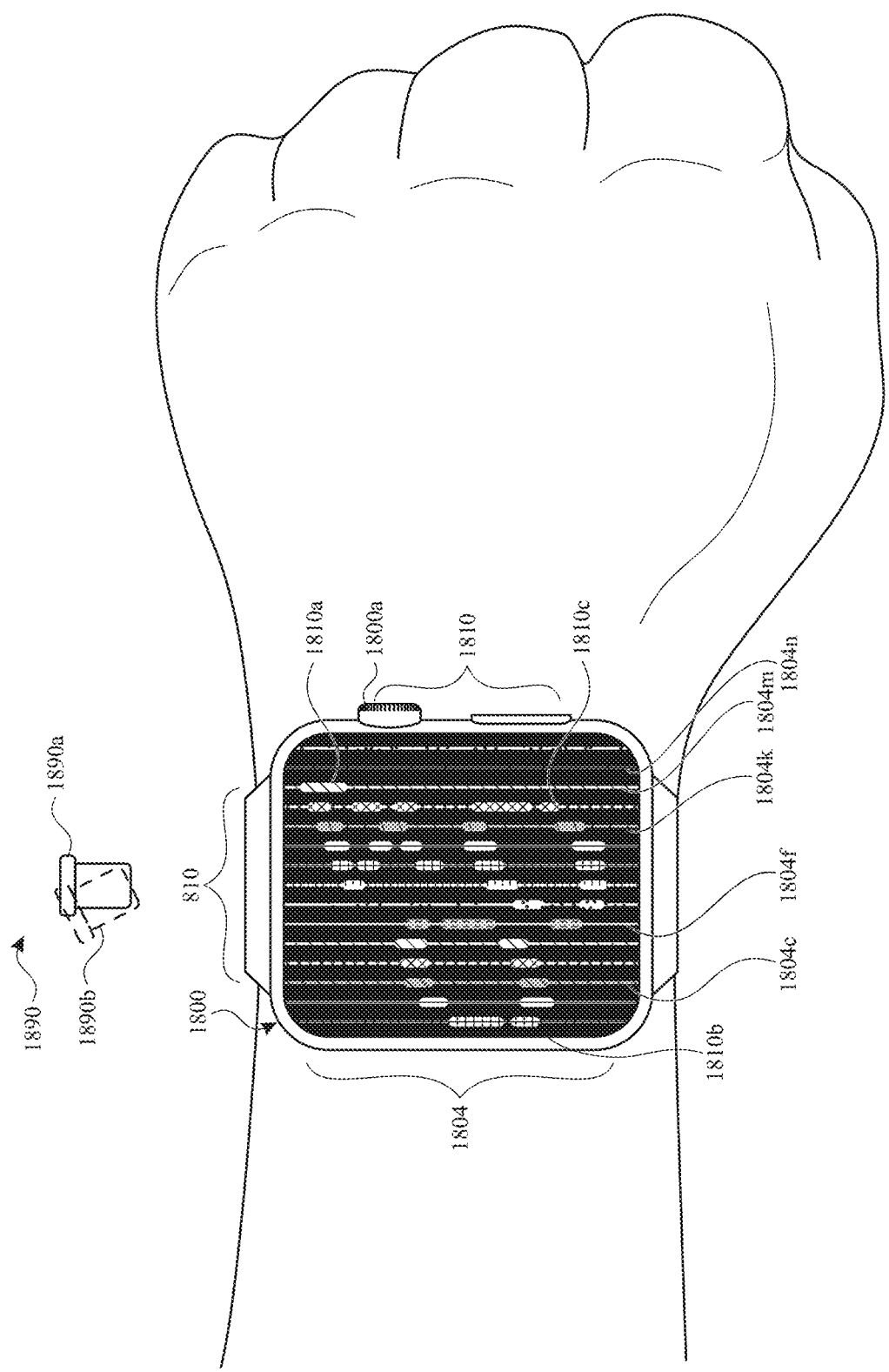
Figure 18Q:
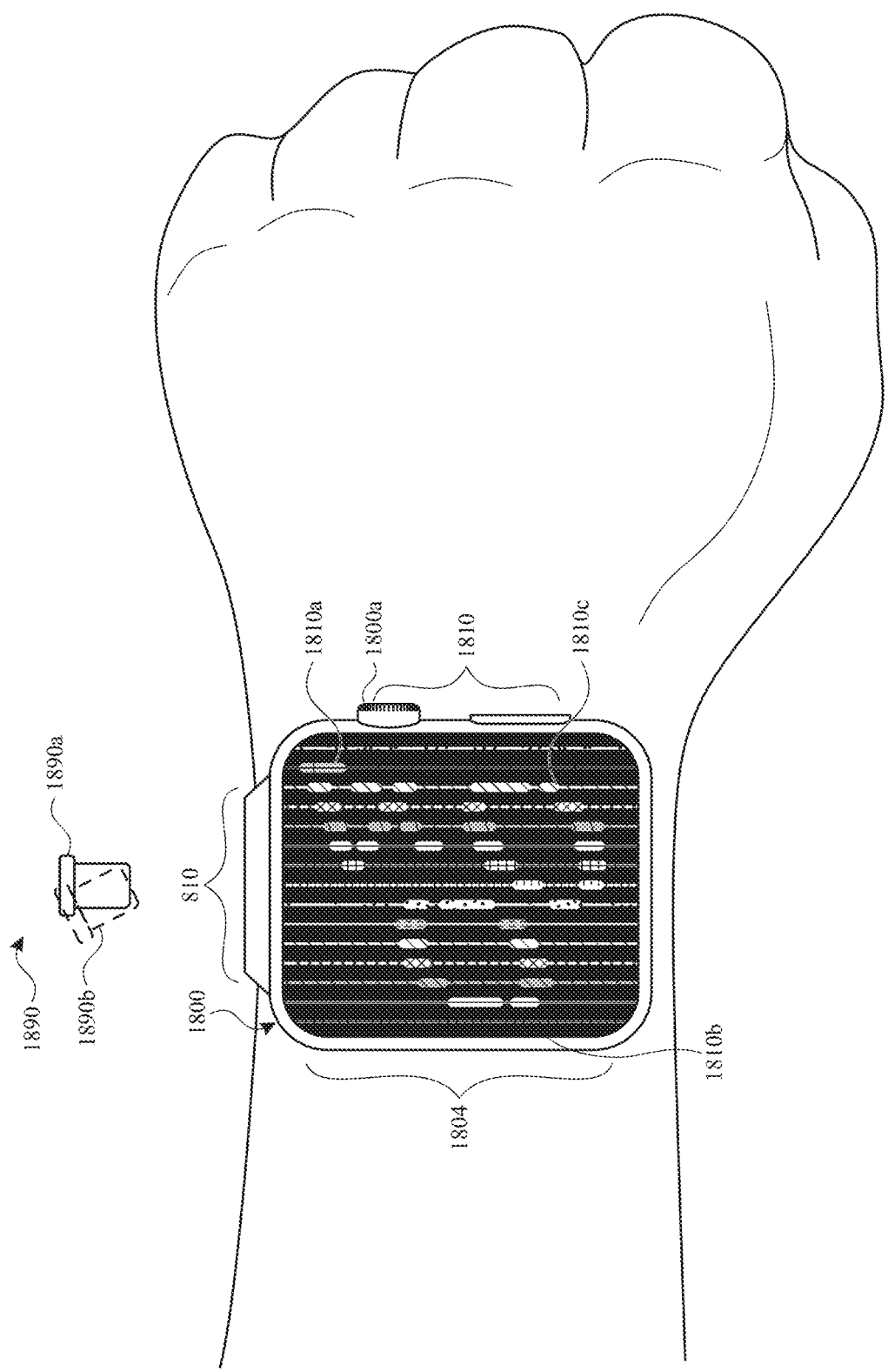

FIGS. 18A-18Q illustrate example clock user interfaces including animated lines, in accordance with some embodiments. FIG. 19 is a flow diagram illustrating a method for displaying clock user interfaces including animated lines, in accordance with some embodiments. The user interfaces in FIGS. 18A-18Q are used to illustrate the processes described below, including the processes in FIG. 19.

The processes described below enhance the operability of the devices and make the user-device interfaces more efficient (e.g., by helping the user to provide proper inputs and reducing user mistakes when operating/interacting with the device) through various techniques, including by providing improved visual feedback to the user, reducing the number of inputs needed to perform an operation, providing additional control options without cluttering the user interface with additional displayed controls, performing an operation when a set of conditions has been met without requiring further user input, and/or additional techniques. These techniques also reduce power usage and improve battery life of the device by enabling the user to use the device more quickly and efficiently.

In addition, in methods described herein where one or more steps are contingent upon one or more conditions having been met, it should be understood that the described method can be repeated in multiple repetitions so that over the course of the repetitions all of the conditions upon which steps in the method are contingent have been met in different repetitions of the method. For example, if a method requires performing a first step if a condition is satisfied, and a second step if the condition is not satisfied, then a person of ordinary skill would appreciate that the claimed steps are repeated until the condition has been both satisfied and not satisfied, in no particular order. Thus, a method described with one or more steps that are contingent upon one or more conditions having been met could be rewritten as a method that is repeated until each of the conditions described in the method has been met. This, however, is not required of system or computer readable medium claims where the system or computer readable medium contains instructions for performing the contingent operations based on the satisfaction of the corresponding one or more conditions and thus is capable of determining whether the contingency has or has not been satisfied without explicitly repeating steps of a method until all of the conditions upon which steps in the method are contingent have been met. A person having ordinary skill in the art would also understand that, similar to a method with contingent steps, a system or computer readable storage medium can repeat the steps of a method as many times as are needed to ensure that all of the contingent steps have been performed.

Although the following description uses terms "first," "second," etc. to describe various elements, these elements should not be limited by the terms. In some embodiments, these terms are used to distinguish one element from another. For example, a first touch could be termed a second touch, and, similarly, a second touch could be termed a first touch, without departing from the scope of the various described embodiments. In some embodiments, the first touch and the second touch are two separate references to the same touch. In some embodiments, the first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, California Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad). In some embodiments, the electronic device is a computer system that is in communication (e.g., via wireless communication, via wired communication) with a display generation component. The display generation component is configured to provide visual output, such as display via a CRT display, display via an LED display, or display via image projection. In some embodiments, the display generation component is integrated with the computer system. In some embodiments, the display generation component is separate from the computer system. As used herein, "displaying" content includes causing to display the content (e.g., video data rendered or decoded by display controller 156) by transmitting, via a wired or wireless connection, data (e.g., image data or video data) to an integrated or external display generation component to visually produce the content.

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Figure 1A:
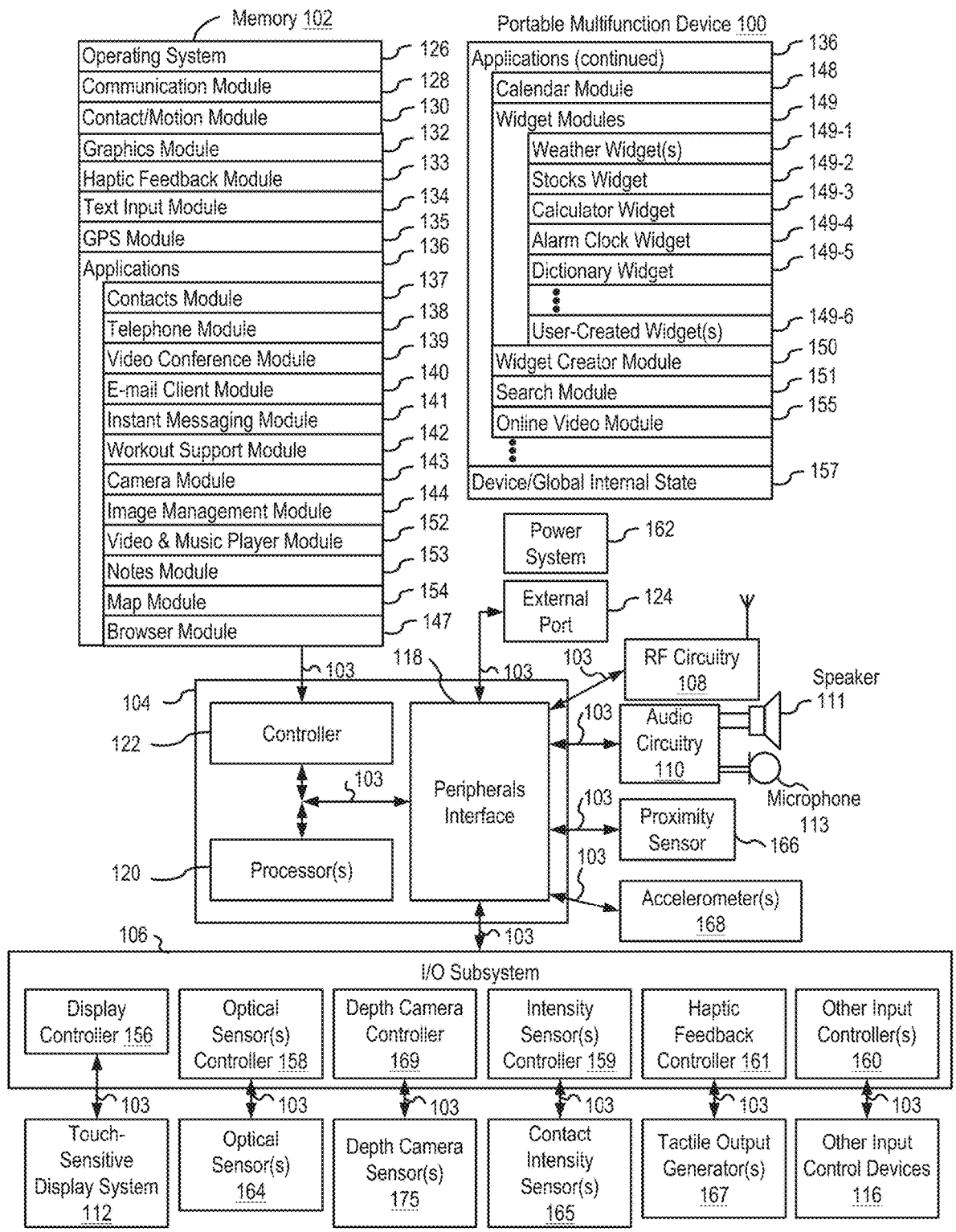
FIG. 1A is a block diagram illustrating a portable multifunction device with a touch-sensitive display in accordance with some embodiments.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs (such as computer programs (e.g., including instructions)) and/or sets of instructions stored in memory 102 to perform various functions for device 100 and to process data. In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, depth camera controller 169, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2). In some embodiments, the electronic device is a computer system that is in communication (e.g., via wireless communication, via wired communication) with one or more input devices. In some embodiments, the one or more input devices include a touch-sensitive surface (e.g., a trackpad, as part of a touch-sensitive display). In some embodiments, the one or more input devices include one or more camera sensors (e.g., one or more optical sensors 164 and/or one or more depth camera sensors 175), such as for tracking a user's gestures (e.g., hand gestures and/or air gestures) as input. In some embodiments, the one or more input devices are integrated with the computer system. In some embodiments, the one or more input devices are separate from the computer system. In some embodiments, an air gesture is a gesture that is detected without the user touching an input element that is part of the device (or independently of an input element that is a part of the device) and is based on detected motion of a portion of the user's body through the air including motion of the user's body relative to an absolute reference (e.g., an angle of the user's arm relative to the ground or a distance of the user's hand relative to the ground), relative to another portion of the user's body (e.g., movement of a hand of the user relative to a shoulder of the user, movement of one hand of the user relative to another hand of the user, and/or movement of a finger of the user relative to another finger or portion of a hand of the user), and/or absolute motion of a portion of the user's body (e.g., a tap gesture that includes movement of a hand in a predetermined pose by a predetermined amount and/or speed, or a shake gesture that includes a predetermined speed or amount of rotation of a portion of the user's body).

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output optionally corresponds to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, California.

A touch-sensitive display in some embodiments of touch screen 112 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more depth camera sensors 175. FIG. 1A shows a depth camera sensor coupled to depth camera controller 169 in I/O subsystem 106. Depth camera sensor 175 receives data from the environment to create a three dimensional model of an object (e.g., a face) within a scene from a viewpoint (e.g., a depth camera sensor). In some embodiments, in conjunction with imaging module 143 (also called a camera module), depth camera sensor 175 is optionally used to determine a depth map of different portions of an image captured by the imaging module 143. In some embodiments, a depth camera sensor is located on the front of device 100 so that the user's image with depth information is, optionally, obtained for video conferencing while the user views the other video conference participants on the touch screen display and to capture selfies with depth map data. In some embodiments, the depth camera sensor 175 is located on the back of device, or on the back and the front of the device 100. In some embodiments, the position of depth camera sensor 175 can be changed by the user (e.g., by rotating the lens and the sensor in the device housing) so that a depth camera sensor 175 is used along with the touch screen display for both video conferencing and still and/or video image acquisition.

In some embodiments, a depth map (e.g., depth map image) contains information (e.g., values) that relates to the distance of objects in a scene from a viewpoint (e.g., a camera, an optical sensor, a depth camera sensor). In one embodiment of a depth map, each depth pixel defines the position in the viewpoint's Z-axis where its corresponding two-dimensional pixel is located. In some embodiments, a depth map is composed of pixels wherein each pixel is defined by a value (e.g., 0-255). For example, the "0" value represents pixels that are located at the most distant place in a "three dimensional" scene and the "255" value represents pixels that are located closest to a viewpoint (e.g., a camera, an optical sensor, a depth camera sensor) in the "three dimensional" scene. In other embodiments, a depth map represents the distance between an object in a scene and the plane of the viewpoint. In some embodiments, the depth map includes information about the relative depth of various features of an object of interest in view of the depth camera (e.g., the relative depth of eyes, nose, mouth, ears of a user's face). In some embodiments, the depth map includes information that enables the device to determine contours of the object of interest in a z direction.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer and a GPS (or GLONASS or other global navigation system) receiver for obtaining information concerning the location and orientation (e.g., portrait or landscape) of device 100.

Figure 3:
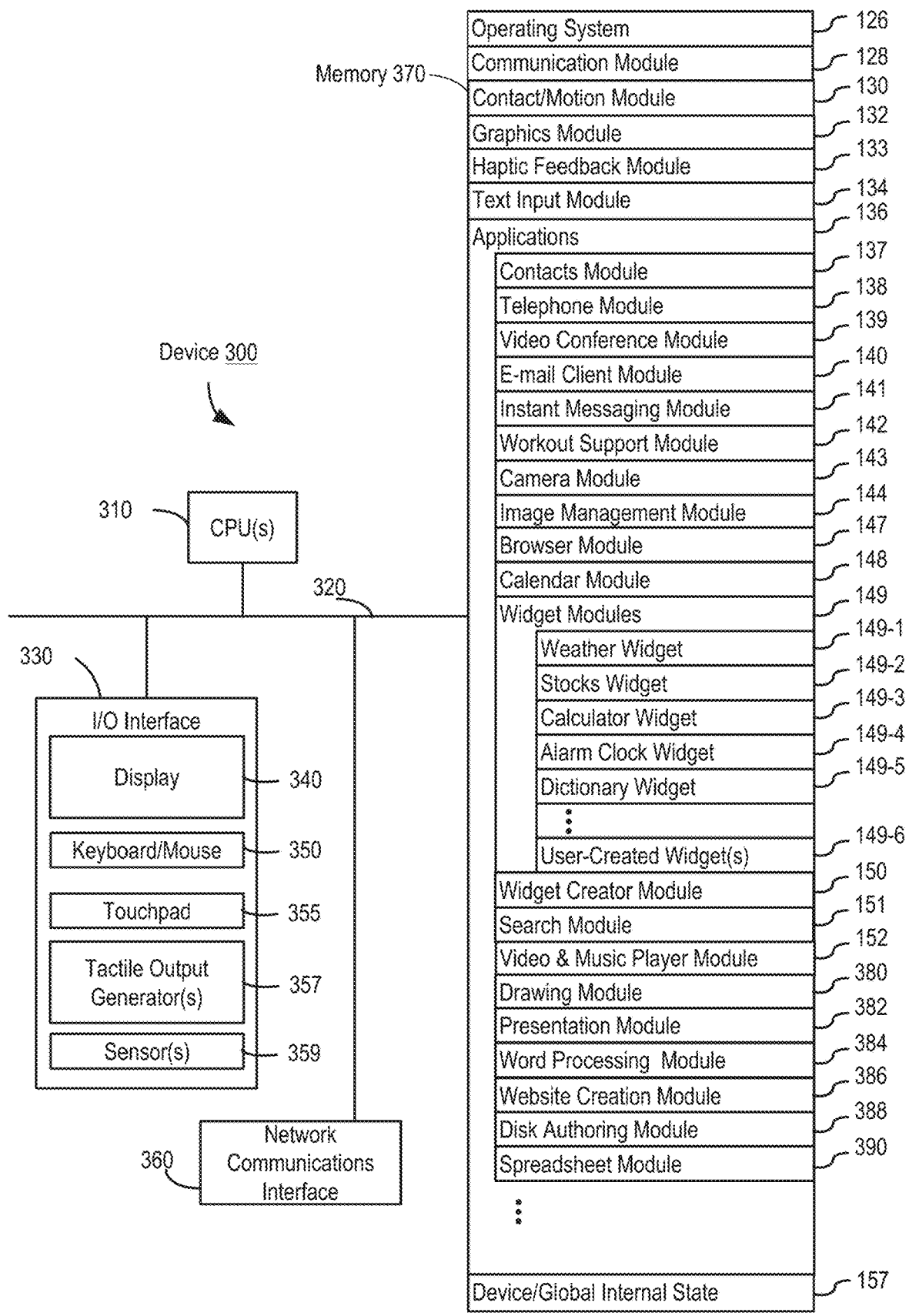
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIRE-WIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts module 137, e-mail client module 140, IM module 141, browser module 147, and any other application that needs text input).

GPS module 135 determines the location of the device and provides this information for use in various applications (e.g., to telephone module 138 for use in location-based dialing; to camera module 143 as picture/video metadata; and to applications that provide location-based services such as weather widgets, local yellow page widgets, and map/navigation widgets).

Applications 136 optionally include the following modules (or sets of instructions), or a subset or superset thereof:

Contacts module 137 (sometimes called an address book or contact list);
    Telephone module 138;
    Video conference module 139;
    E-mail client module 140;
    Instant messaging (IM) module 141;
    Workout support module 142;
    Camera module 143 for still and/or video images;
    Image management module 144;
    Video player module;
    Music player module;

Browser module 147;

Calendar module 148;

Widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;

Widget creator module 150 for making user-created widgets 149-6;

Search module 151;

Video and music player module 152, which merges video player module and music player module;

Notes module 153;

Map module 154; and/or

Online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone module 138, video conference module 139, e-mail client module 140, or IM module 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs (such as computer programs (e.g., including instructions)), procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
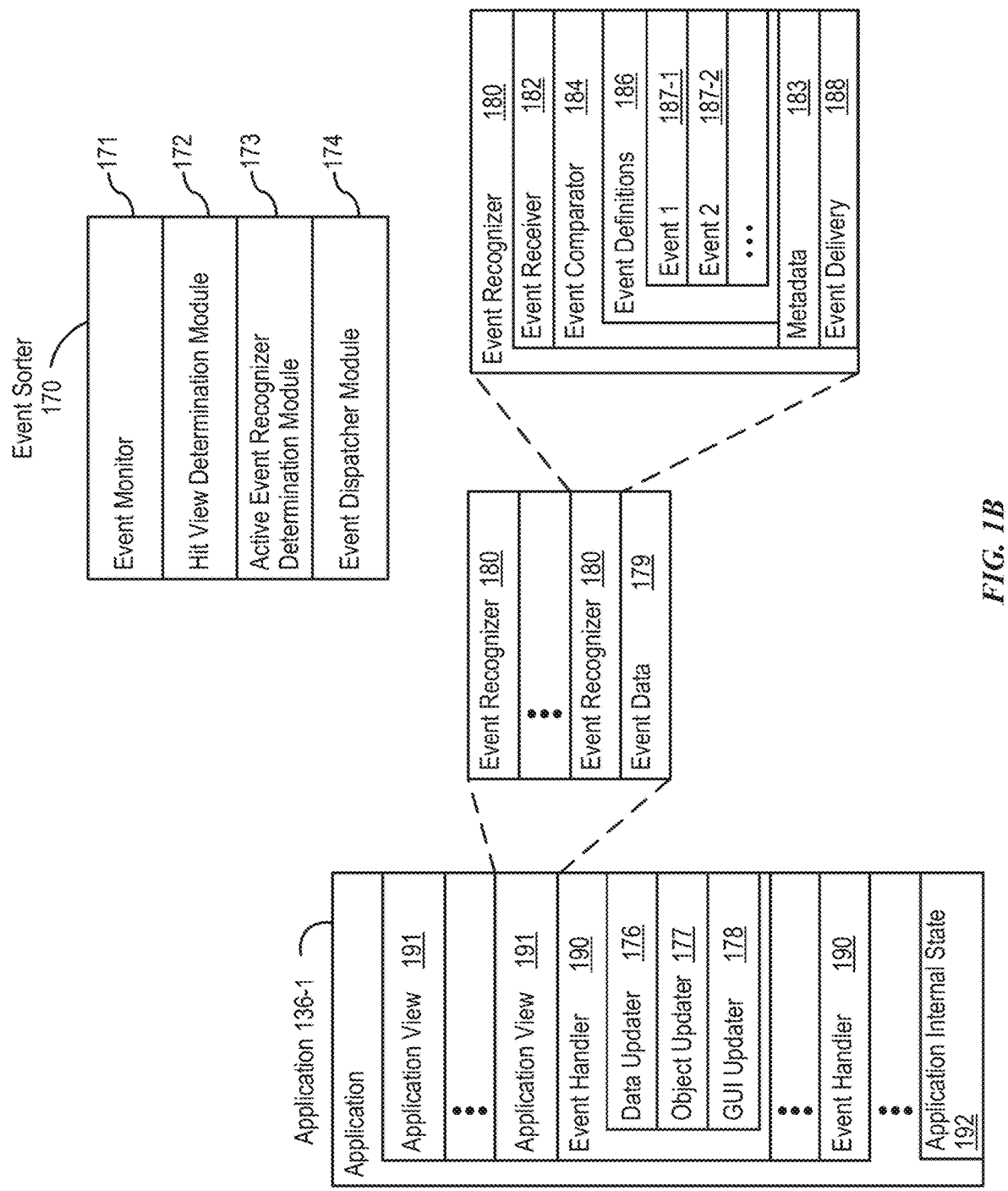
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
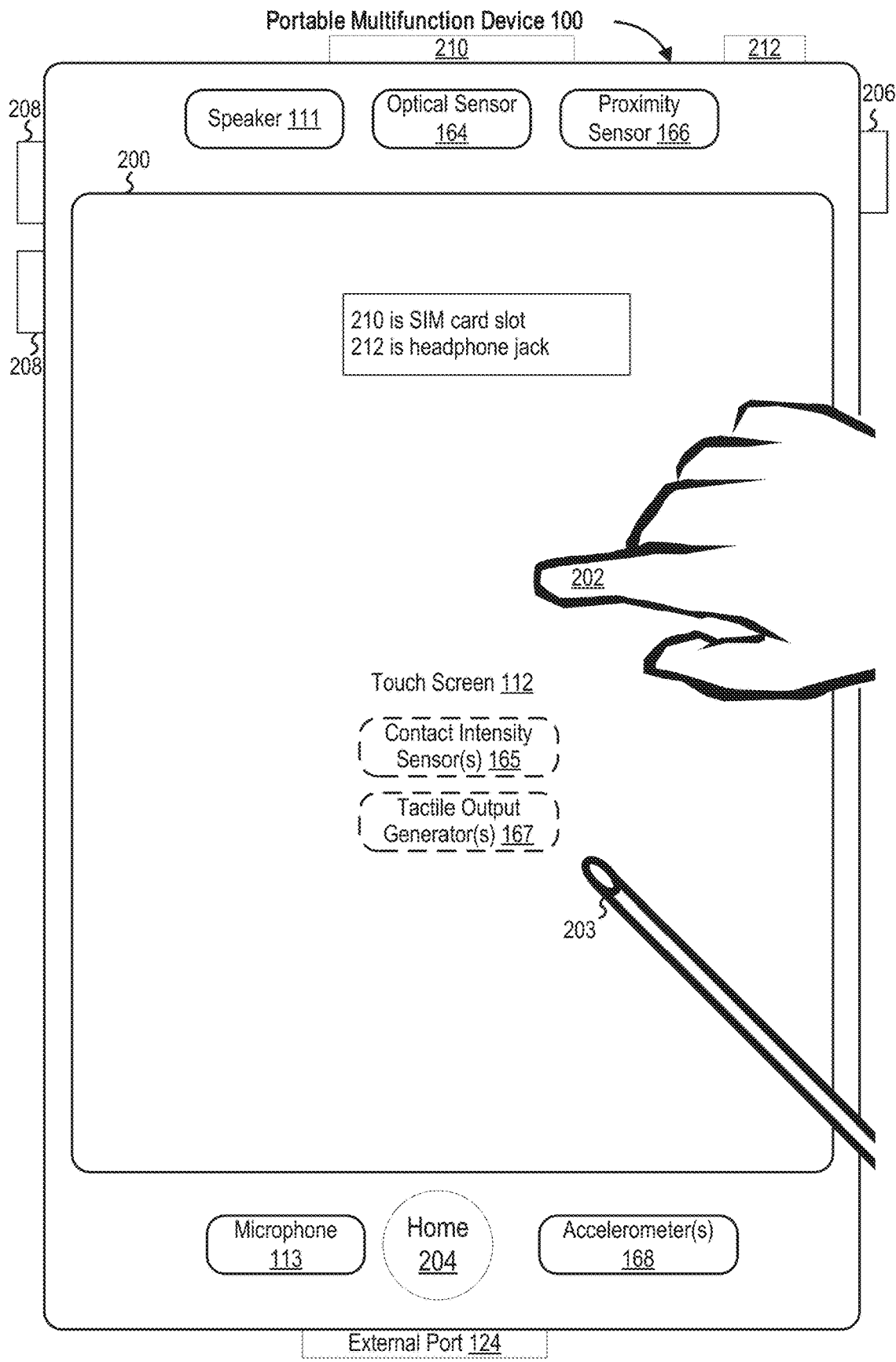
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also include one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 is, optionally, stored in one or more of the previously mentioned memory devices. Each of the above-identified modules corresponds to a set of instructions for performing a function described above. The above-identified modules or computer programs (e.g., sets of instructions or including instructions) need not be implemented as separate software programs (such as computer programs (e.g., including instructions)), procedures, or modules, and thus various subsets of these modules are, optionally, combined or otherwise rearranged in various embodiments. In some embodiments, memory 370 optionally stores a subset of the modules and data structures identified above. Furthermore, memory 370 optionally stores additional modules and data structures not described above.

Attention is now directed towards embodiments of user interfaces that are, optionally, implemented on, for example, portable multifunction device 100.

Figure 4A:
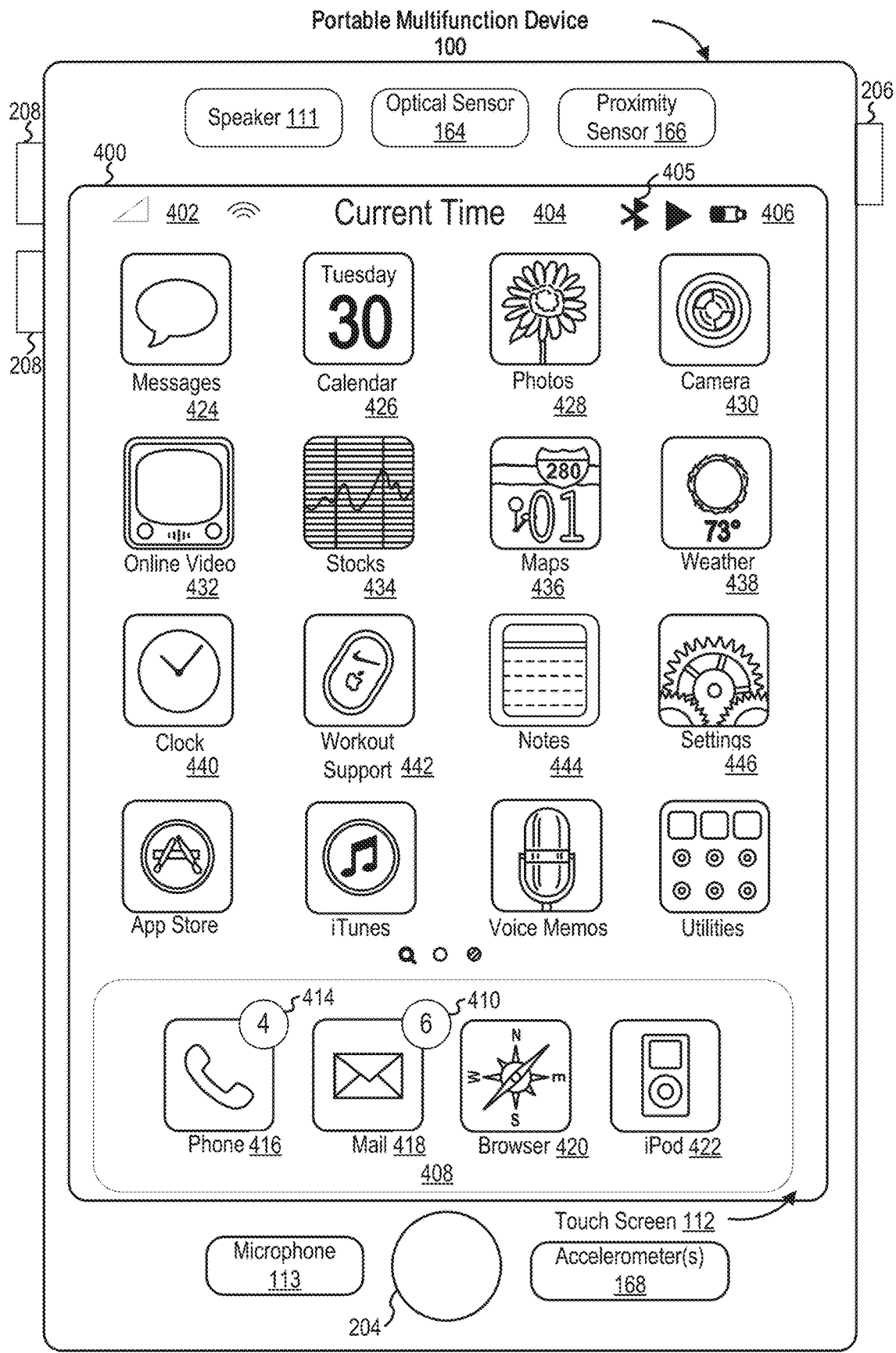
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
  Icon 416 for telephone module 138, labeled "Phone," which optionally includes an indicator 414 of the number of missed calls or voicemail messages;
  Icon 418 for e-mail client module 140, labeled "Mail," which optionally includes an indicator 410 of the number of unread e-mails;
  Icon 420 for browser module 147, labeled "Browser;" and
  Icon 422 for video and music player module 152, also referred to as iPod (trademark of Apple Inc.) module 152, labeled "iPod;" and
Icons for other applications, such as:
  Icon 424 for IM module 141, labeled "Messages;"
  Icon 426 for calendar module 148, labeled "Calendar;"
  Icon 428 for image management module 144, labeled "Photos;"
  Icon 430 for camera module 143, labeled "Camera;"
  Icon 432 for online video module 155, labeled "Online Video;"
  Icon 434 for stocks widget 149-2, labeled "Stocks;"
  Icon 436 for map module 154, labeled "Maps;"
  Icon 438 for weather widget 149-1, labeled "Weather;"
  Icon 440 for alarm clock widget 149-4, labeled "Clock;"
  Icon 442 for workout support module 142, labeled "Workout Support;"
  Icon 444 for notes module 153, labeled "Notes;" and
  Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
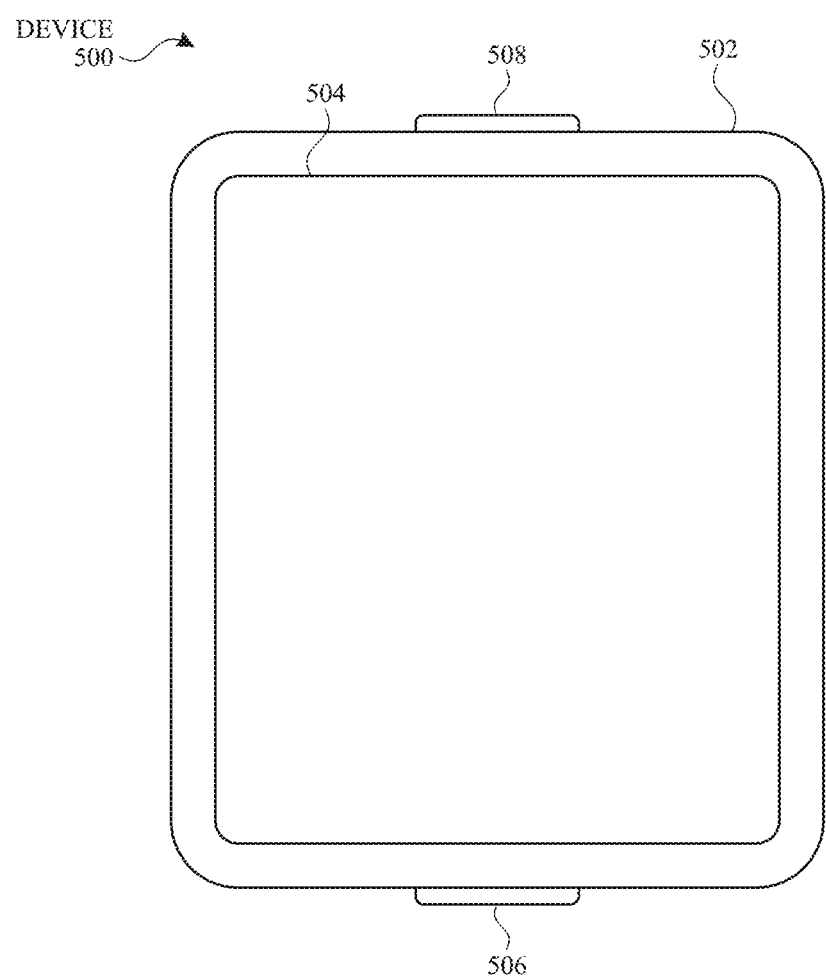
FIG. 5A illustrates a personal electronic device in accordance with some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) optionally includes one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Exemplary techniques for detecting and processing touch intensity are found, for example, in related applications: International Patent Application Serial No. PCT/US2013/040061, titled "Device, Method, and Graphical User Interface for Displaying User Interface Objects Corresponding to an Application," filed May 8, 2013, published as WIPO Publication No. WO/2013/169849, and International Patent Application Serial No. PCT/US2013/069483, titled "Device, Method, and Graphical User Interface for Transitioning Between Touch Input to Display Output Relationships," filed Nov. 11, 2013, published as WIPO Publication No. WO/2014/105276, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms permit device 500 to be worn by a user.

Figure 5B:
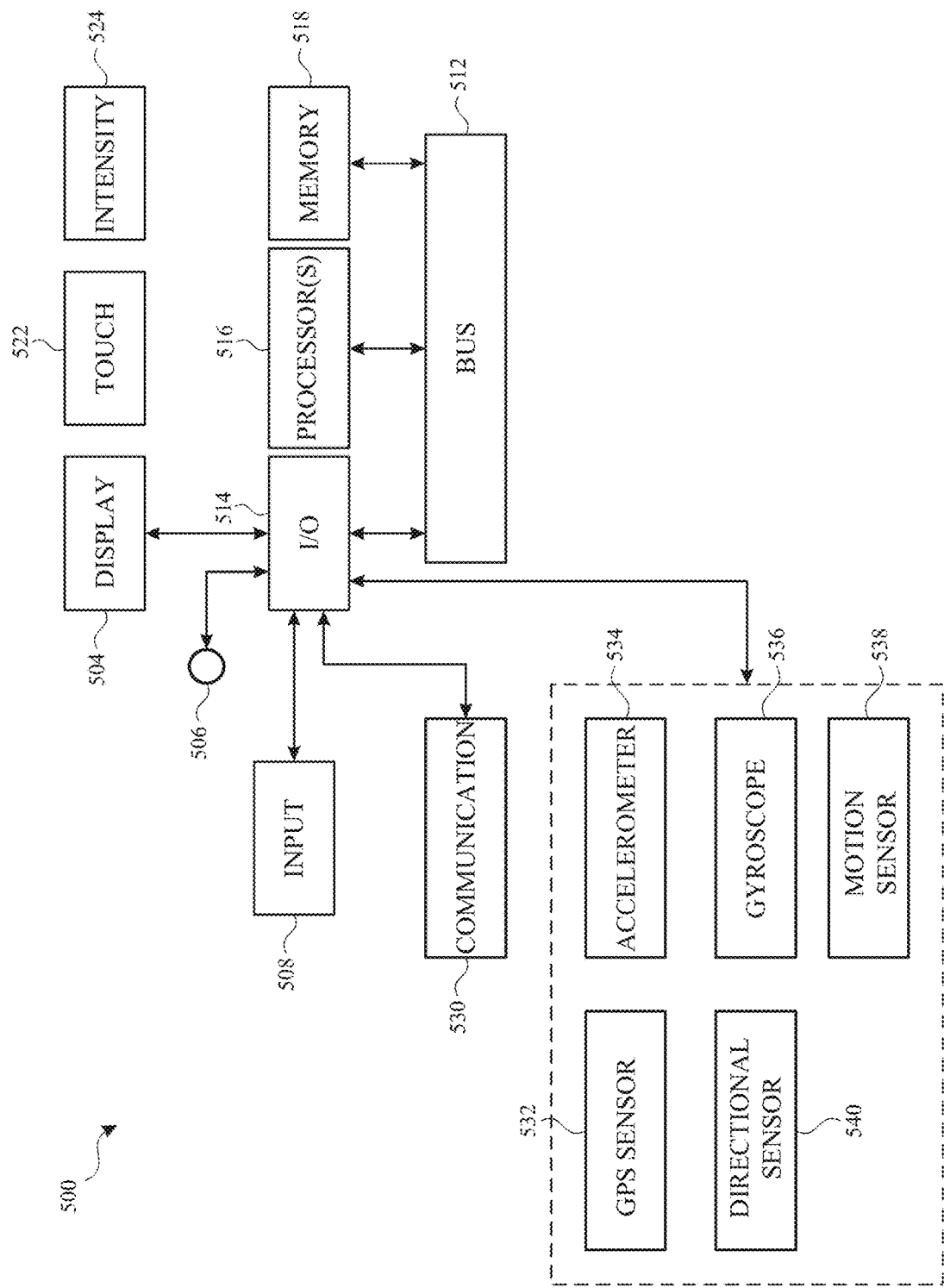
FIG. 5B is a block diagram illustrating a personal electronic device in accordance with some embodiments.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input device or a depressible and rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can include one or more non-transitory computer-readable storage mediums, for storing computer-executable instructions, which, when executed by one or more computer processors 516, for example, can cause the computer processors to perform the techniques described below, including processes 700, 900, 1100, 1300, 1500, 1700, and 1900 (FIGS. 7, 9, 11, 13, 15, 17, and 19). A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B, but can include other or additional components in multiple configurations.

As used here, the term "affordance" refers to a user-interactive graphical user interface object that is, optionally, displayed on the display screen of devices 100, 300, and/or 500 (FIGS. 1A, 3, and 5A-5B). For example, an image (e.g., icon), a button, and text (e.g., hyperlink) each optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider, or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

As used herein, an "installed application" refers to a software application that has been downloaded onto an electronic device (e.g., devices 100, 300, and/or 500) and is ready to be launched (e.g., become opened) on the device. In some embodiments, a downloaded application becomes an installed application by way of an installation program that extracts program portions from a downloaded package and integrates the extracted portions with the operating system of the computer system.

As used herein, the terms "open application" or "executing application" refer to a software application with retained state information (e.g., as part of device/global internal state 157 and/or application internal state 192). An open or executing application is, optionally, any one of the following types of applications:

an active application, which is currently displayed on a display screen of the device that the application is being used on;

a background application (or background processes), which is not currently displayed, but one or more processes for the application are being processed by one or more processors; and a suspended or hibernated application, which is not running, but has state information that is stored in memory (volatile and non-volatile, respectively) and that can be used to resume execution of the application.

As used herein, the term "closed application" refers to software applications without retained state information (e.g., state information for closed applications is not stored in a memory of the device). Accordingly, closing an application includes stopping and/or removing application processes for the application and removing state information for the application from the memory of the device. Generally, opening a second application while in a first application does not close the first application. When the second application is displayed and the first application ceases to be displayed, the first application becomes a background application.

Attention is now directed towards embodiments of user interfaces ("UI") and associated processes that are implemented on an electronic device, such as portable multifunction device 100, device 300, or device 500.

FIGS. 6A-6K illustrate example clock user interfaces including simulated emitted light, in accordance with some embodiments. The user interfaces in these figures are used to illustrate the processes described below, including the processes in FIG. 7.

Figure 6A:
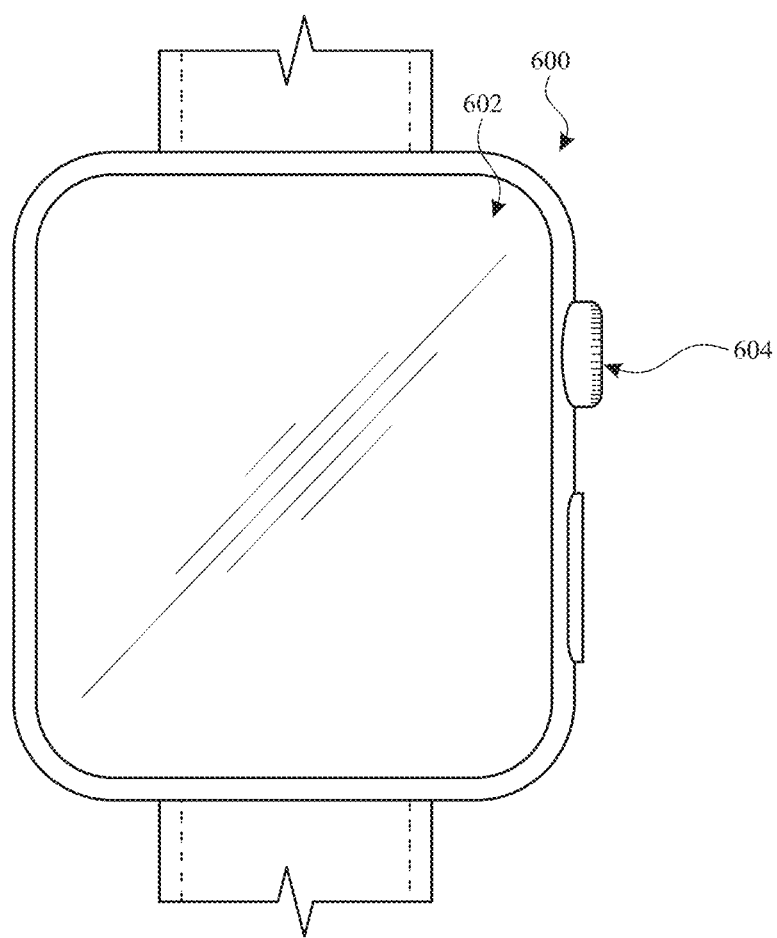
FIGS. 6A-6K illustrate example clock user interfaces including simulated emitted light, in accordance with some embodiments.
Figure 7:
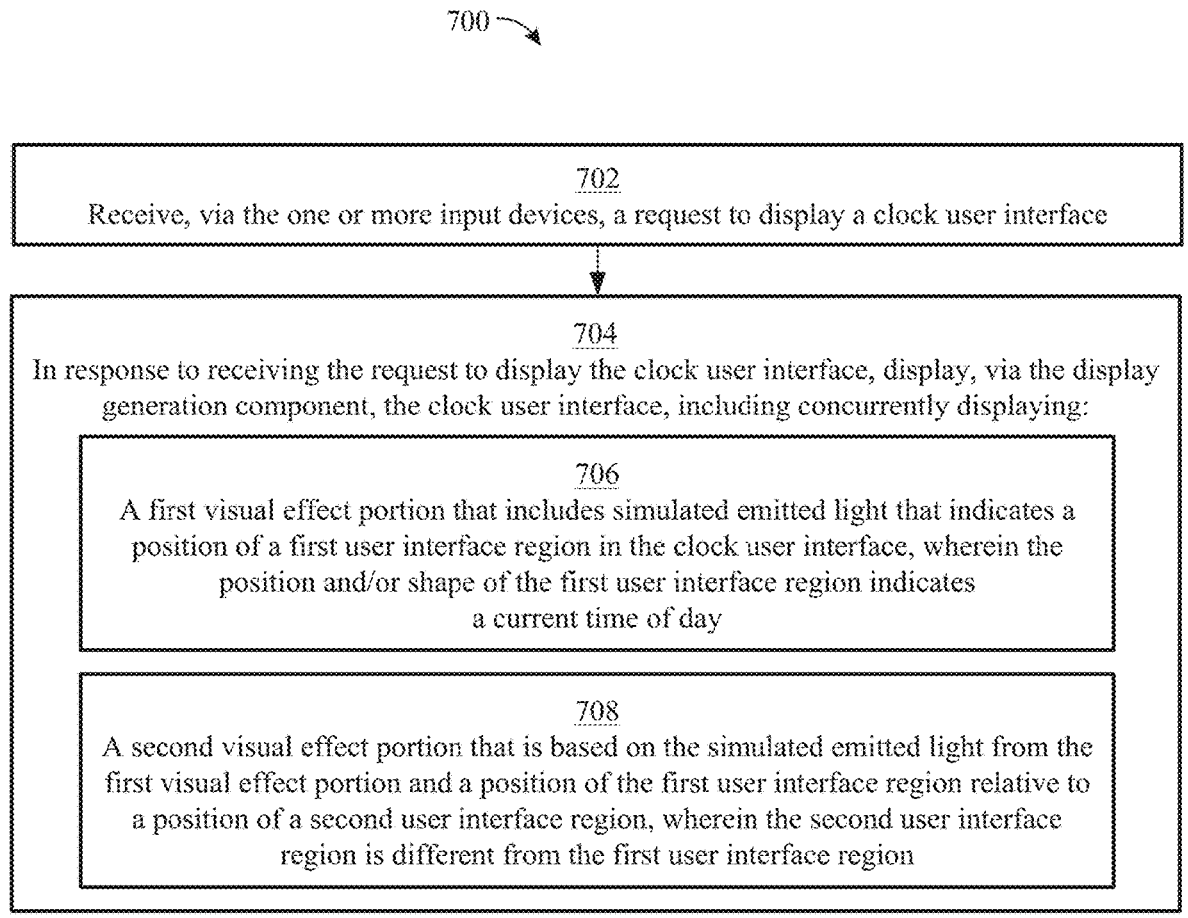
FIG. 7 is a flow diagram illustrating a method for displaying clock user interfaces including simulated emitted light, in accordance with some embodiments.

FIG. 6A illustrates computer system 600 (e.g., a smartwatch) with display 602. In some embodiments, computer system 600 and/or display 602 is in a sleep or low power mode. In some embodiments, display 602 is dimmed and/or disabled. Computer system 600 includes rotatable and depressible input mechanism 604. In some embodiments, computer system 600 includes one or more features of device 100, device 300, and/or device 500. In some embodiments, computer system 600 is a tablet, phone, laptop, desktop, and/or camera. In some embodiments, the inputs described below can be substituted for alternate inputs, such as a press input and/or a rotational input received via rotatable and depressible input mechanism 604.

Figure 6B:
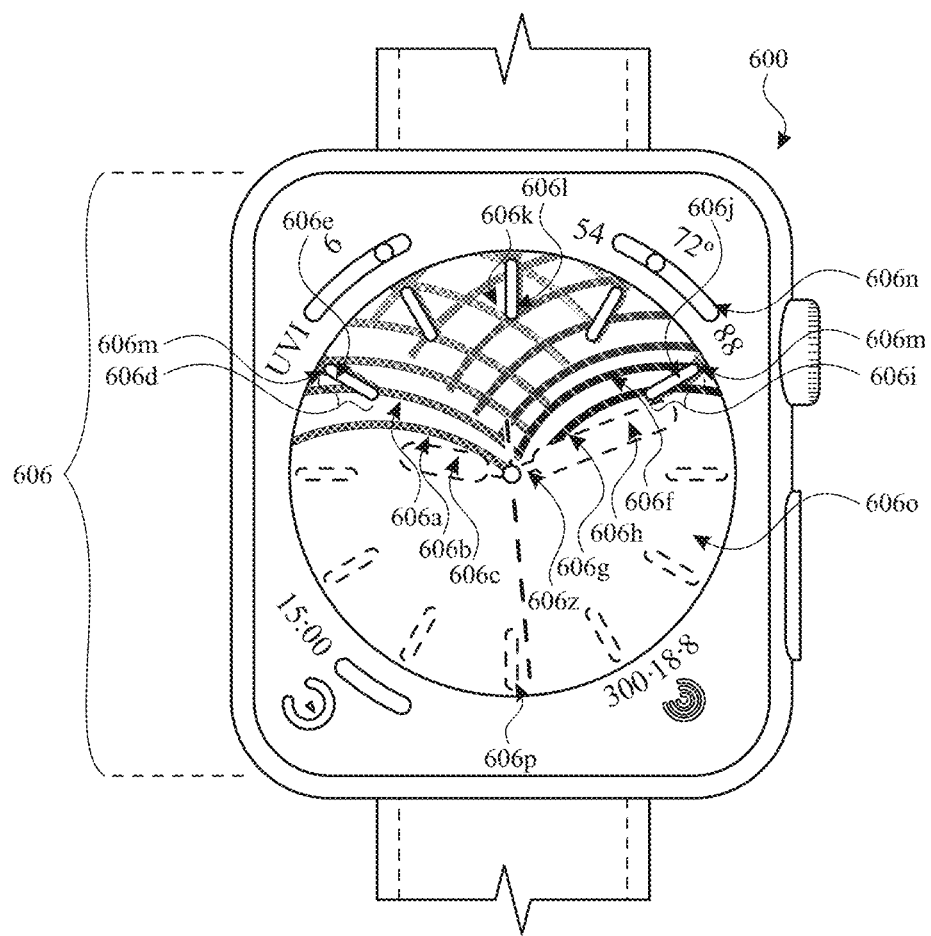

In response to detecting an input, such as a tap input, a wrist raise input, a press input received via rotatable and depressible input mechanism 604, and/or a rotational input received via rotatable and depressible input mechanism 604, computer system 600 displays clock user interface 606 shown in FIG. 6B.

In some embodiments, clock user interface 606 is displayed on a tablet, phone (e.g., a smartphone), laptop, and/or desktop. In some embodiments, clock user interface 606 is displayed on a home screen, lock screen, and/or wake screen of a tablet, phone, laptop, and/or desktop.

Clock user interface 606 includes visual effect 606a, simulated emitted light 606b, hour-hand region 606c, visual effect 606d, dial-element region 606e, visual effect 606f, simulated emitted light 606g, minute-hand region 606h, visual effect 606i, dial-element region 606j, visual effect 606k, dial-element region 606l, shadow 606m, complication 606n associated with a current temperature, background 606o, dial-element region 606p, and seconds-hand region 606s. Clock user interface 606 represents a 12-hour analog clock face and includes hour-hand region 606c, minute-hand region 606h, and seconds-hand region 606s, which represent positions of respective clock hands. In particular, simulated emitted light 606b and simulated emitted light 606g are (or appear to be) emitted from hour-hand region 606c and minute-hand region 606h, respectively, to provide an indication of the positions of clock hands. In the embodiment illustrated in FIG. 6B, an hour hand and a minute hand are not actually displayed in hour-hand region 606c and minute-hand region 606h, respectively. In some embodiments, clock hands that emit simulated emitted light 606b and simulated emitted light 606g are displayed. For example, rather than simulated emitted light 606b appearing to be emitted from a region of clock user interface 606, an hour hand is displayed in the position of hour-hand region 606c.

In FIG. 6B, clock user interface 606 is shown when the current time of day is 9:11. Thus, hour-hand region 606c (e.g., the hour hand) is positioned at the 9 o'clock hour position and minute-hand region 606h (e.g., the minute hand) is positioned at the 11 minute position. Visual effect 606a of clock user interface 606 includes simulated emitted light 606b, which indicates the position of hour-hand region 606c at the 9 o'clock hour position because simulated emitted light 606b appears to be emitted from the clockwise facing edge of hour-hand region 606c. Visual effect 606f of clock user interface 606 includes simulated emitted light 606g, which indicates the position of minute-hand region 606h at the 11 minute position because simulated emitted light 606g appears to be emitted from the counter-clockwise facing edge of minute-hand region 606h.

While simulated emitted light 606b and simulated emitted light 606g are described as being emitted from the clockwise-facing edge of hour-hand region 606c and the counter-clockwise facing edge of minute hand region 606h, respectively, with respect to FIG. 6B, simulated emitted light 606b and simulated emitted light 606g can be emitted from other edges of hour-hand region 606c and minute hand region 606h. In some embodiments, simulated emitted light 606b is emitted from the counter-clockwise facing edge of hour-hand region 606c and simulated emitted light 606g is emitted from the counter-clockwise facing edge of minute-hand region 606h. In some embodiments, simulated emitted light 606b is emitted from the clockwise-facing edge of hour-hand region 606c and simulated emitted light 606g is emitted from the clockwise-facing edge of minute-hand region 606h. In some embodiments, simulated emitted light 606b is emitted from the counter-clockwise facing edge of hour-hand region 606c and simulated emitted light 606g is emitted from the clockwise-facing edge of minute-hand region 606h. Thus, any combination of edges of hour-hand region 606c and minute-hand region 606h can emit simulated emitted light 606b and simulated emitted light 606g, respectively.

Visual effect 606d is based on simulated emitted light 606b from hour-hand region 606c and the position of hour-hand region 606c relative to the position of dial-element region 606e (e.g., a time marker). For example, the position of hour-hand region 606c causes simulated emitted light 606b to illuminate dial-element region 606e (e.g., the time marker) creating visual effect 606d (e.g., the displayed time marker and corresponding shadow). Further, dial-element region 606e (e.g., the time marker) blocks simulated emitted light 606b and creates shadow 606m. Similarly, visual effect 606i is based on simulated emitted light 606g from minute-hand region 606h and the position of minute-hand region 606h relative to the position of dial-element region 606j. Thus, the position of minute-hand region 606h causes simulated emitted light 606g to illuminate dial-element region 606j creating visual effect 606i. Further, dial-element region 606j blocks simulated emitted light 606g and creates shadow 606m.

In some embodiments, simulated emitted light 606b and simulated emitted light 606g illuminate the same dial-element region, such as dial element region 606l. In this position dial element region 606l blocks both simulated emitted light 606b and simulated emitted light 606g and creates a shadow based on simulated emitted light 606b and a shadow based on simulated emitted light 606g. Thus, visual effect 606k includes two shadows created by dial element region 606l interacting with simulated emitted light 606b and simulated emitted light 606g that will change as the positions of hour-hand region 606c and hour-hand region 606h change.

In some embodiments, minute-hand region 606h blocks simulated emitted light 606b. For example, when minute-hand region 606h is closer to hour-hand region 606c such as near the 12 o'clock position or 0 minute position, minute-hand region 606h blocks the dispersal of simulated emitted light 606b across clock user interface 606.

In FIG. 6B, hour-hand region 606c includes cutout 606z, and a portion of the edge of hour-hand region 606c is curved. The curves and cutouts of hour-hand region 606c interact with simulated emitted light 606b such that simulated emitted light 606b appears to naturally emit out of the curves and cutouts of hour-hand region 606c. This can enhance the appearance of simulated emitted light 606b and clock user interface 606, as a whole, by providing simulated emitted light that behaves realistically and clearly indicates the position of hour-hand region 606c to aid the user in determining the current time of day.

In some embodiments, hour-hand region 606c and minute-hand region 606h are the same color (e.g., black) as background 606o of clock user interface 600. Thus, the position of hour-hand region 606c and minute-hand region 606h are observable based on simulated emitted light 606b and simulated emitted light 606g as discussed above to provide a user with an indication of the current time even when hour-hand region 606c and minute-hand region 606h appear to blend in with background 606o (e.g., no hour hand or minute hand is displayed).

Some regions of clock user interface 606 that are not illuminated by simulated emitted light 606b and/or simulated emitted light 606g, such as user interface region 606p, are also the same color as background 606o and do not appear to be displayed. Thus, the number of user interface regions that are illuminated by simulated emitted light 606b and/or simulated emitted light 606g, and thus block simulated emitted light 606b and/or simulated emitted light 606g, is based on the positions of hour-hand region 606c and minute-hand region 606h. As the positions of hour-hand region 606c and minute-hand region 606h change, simulated emitted light 606b and simulated emitted light 606g interact with different user interface regions causing the user interface regions to be illuminated and creating shadows, as shown in FIGS. 6F-6K discussed further below.

In some embodiments, a user can select whether or not simulated emitted light 606b and/or simulated emitted light 606g interact with dial-element region 606e, dial-element region 606j, dial-element region 606l, and dial-element region 606p which represent time markers of clock user interface 606 (e.g., whether or not hour and/or minute markers are displayed and/or visible when in the path of the emitted light). The user can make a selection by selecting a setting or parameter for clock user interface 606 (e.g., in a settings or editing menu). Accordingly, clock user interface 606 can be displayed without any time markers, allowing simulated emitted light 606b and simulated emitted light 606g to illuminate background 606o without interference from the user interface regions representing time markers.

In FIG. 6B, simulated emitted light 606b includes a first color and simulated emitted light 606g includes a second color different from the first color. For example, simulated emitted light 606b can be red while simulated emitted light 606g is green. In some embodiments, simulated emitted light 606b and simulated emitted light 606g are the same color. For example, clock user interface 606 can be displayed in a black and white mode in which simulated emitted light 606b and simulated emitted light 606g are both white (or shades of grey).

In some embodiments, computer system 600 detects an input corresponding to a selection to change the color of simulated emitted light 606b and simulated emitted light 606g, and in response, changes the colors of simulated emitted light 606b and simulated emitted light 606g. For example, an option to change the colors of simulated emitted light 606b and simulated emitted light 606g from red and green to white can be selected and the color of simulated emitted light 606b can be changed from red to white and the color simulated emitted light 606g can be changed from green to white.

In FIG. 6B, simulated emitted light 606b is emitted from the clockwise facing edge of hour-hand region 606c but not the counter-clockwise facing edge of hour-hand region 606c. Similarly, simulated emitted light 606g is emitted from the counter-clockwise facing edge of minute-hand region 606h but not the clockwise facing edge of minute-hand region 606h. Accordingly, because the light emitting edges of hour-hand region 606c and minute-hand region 606h face towards each other, simulated emitted light 606b combines (e.g., interacts, merges, and/or overlaps) with simulated emitted light 606g in visual effect 606k of clock user interface 606. In some embodiments, such as those discussed below in FIGS. 6I-6K, the light emitting edges of hour-hand region 606c and minute-hand region 606h face away from each other and simulated emitted light 606b and simulated emitted light 606g do not interact or interact minimally.

In some embodiments, simulated emitted light 606b and/or simulated emitted light 606g does not affect the visual appearance of complication 606m. For example, simulated emitted light 606b and/or simulated emitted light 606g stops prior to reaching the complication or is blocked by the boundary of the complication. In FIG. 6B, simulated emitted light 606b and simulated emitted light 606g stop prior to interacting with complication 606m associated with a current temperature and/or a weather application (e.g., at the boundary of the circular area of the clock user interface). Similarly, simulated emitted light 606b and simulated emitted light 606g stop prior to interacting with a complication for the current UV index and/or any other complication displayed in clock user interface 606. Thus, simulated emitted light 606b and simulated emitted light 606g do not affect complication 606m or the other complications of clock user interface 606 allowing a user to clearly view the information being displayed by complications.

In some embodiments, computer system 600 changes (e.g., in response to user input, such as in a clock face editing user interface) complication 606m from a complication associated with a current temperature and/or a weather application to a complication associated with another application, such as an exercise application. Similarly, in some embodiments, computer system 600 changes some or all of the complications displayed in clock user interface 606 to other complications. Thus, some or all of the complications displayed in clock user interface 606 can be associated with applications other than those described herein.

In some embodiments, computer system 600 does not display (or ceases to display) complication 606m (and/or one or more of the other complications displayed in clock user interface 606) and displays simulated emitted light 606b and simulated emitted light 606g in the region(s) of clock user interface 606 shown in FIG. 6B as being occupied (or that were previously occupied) by the complications. For example, when complication 606m and the other complications are not displayed in clock user interface 606, the simulated emitted light extends to the edge of display 602 and is not blocked by the regions of clock user interface 606 occupied by the complications in FIG. 6B.

In some embodiments, when the complications are not displayed in (or removed from) clock user interface 606 (e.g., computer system 600 ceases to display complication 606m and/or the other complications), dial-element regions 606e, 606j, 606l, and 606p (which represent time markers) occupy different positions on clock user interface 606 than in FIG. 6B. For example, when the complications are not displayed in clock user interface 606 dial-element regions 606e, 606j, 606l, and/or 606p occupy at least a portion of the area occupied by the complications in FIG. 6B.

In some embodiments, computer system 600 displays dial-element regions 606e, 606j, 606l, and/or 606p such that simulated emitted light 606b and simulated emitted light 606g do not interact with the dial-element regions. Thus, when the dial-element regions are displayed in this manner, simulated emitted light 606b and simulated emitted light 606g can extend to the edge of clock user interface 606 without being blocked by dial-element regions. In some embodiments, computer system 600 displays dial-element regions 606e, 606j, 606l, and 606p such that simulated emitted light 606b and simulated emitted light 606g do not interact with the dial-element regions and ceases display of complication 606m and the other complications, allowing simulated emitted light 606b and simulated emitted light 606g to extend to the edge of clock user interface 606, which includes at least a portion of the area previously occupied by the complications.

Figure 6C:
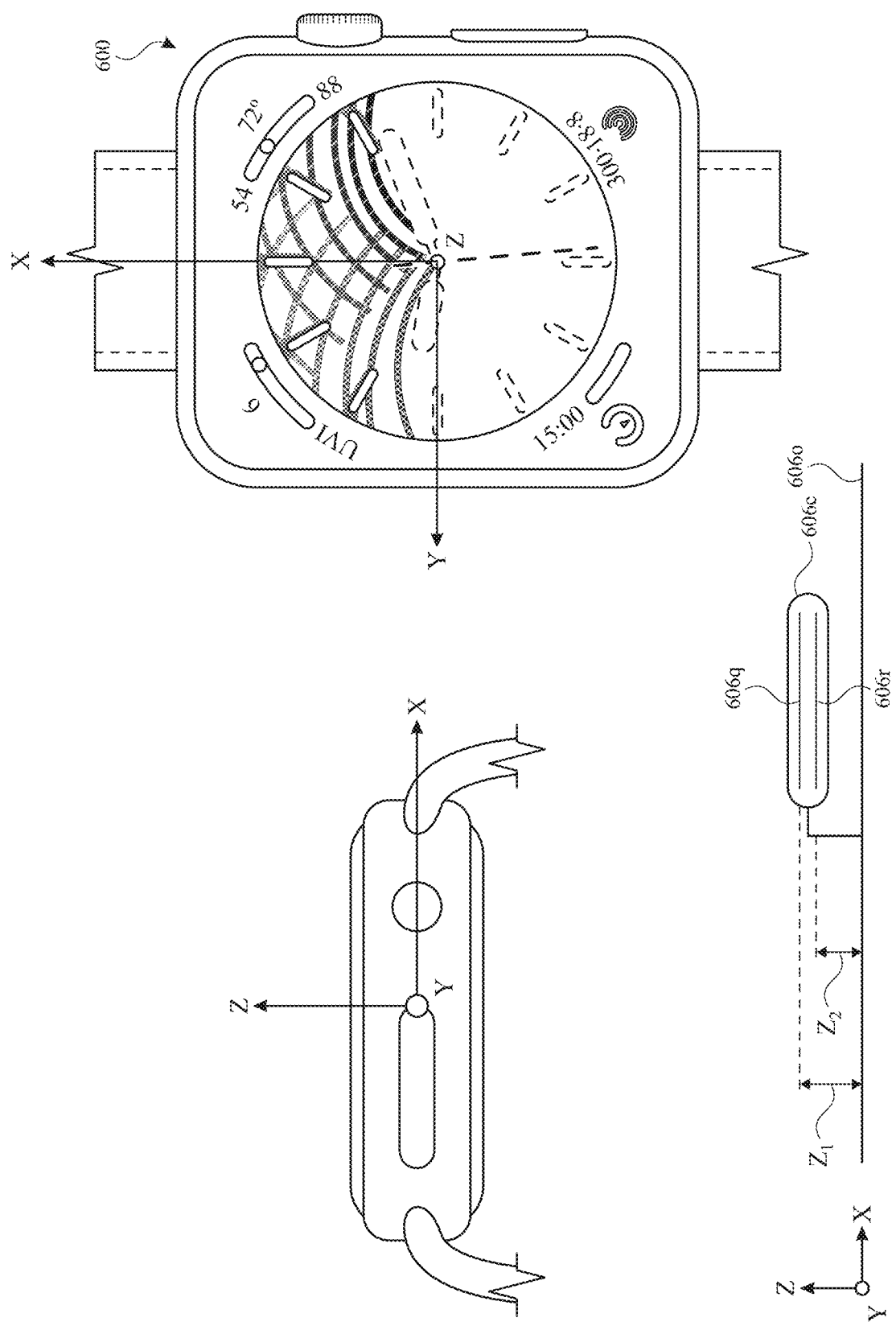

FIG. 6C illustrates views of computer system 600 and a conceptual view of clock user interface 606 from a side perspective. The side perspective includes background 606o and multiple simulated light sources on hour-hand region 606c, light source 606q and light source 606r. Light source 606q and light source 606r create simulated emitted light 606b. In particular, light source 606q has simulated height z1 relative to background 606o and light source 606r has simulated height z2 relative to background 606o, where simulated height z2 is different from simulated height z1. Accordingly, simulated emitted light 606b created by light source 606q and light source 606r illuminates background 606o based on simulated heights z1 and z2 to create a realistic dispersal of light.

In some embodiments, light source 606q includes (e.g., produces or emits) light of a first color and light source 606r includes light of a second color different from the first color. For example, light source 606q includes green light and light source 606r light source includes white light, causing simulated emitted light 606b to have an appearance which is more vibrant in color, as light source 606q appears to be closer to the user viewing clock user interface 606 and further away from background 606o. In some embodiments, light source 606q includes white light and light source 606r can include green light, causing simulated emitted light 606b to have an appearance that is lighter and brighter because the white light is closer to a user viewing clock user interface 606 and further away from background 606o.

Figure 6D:
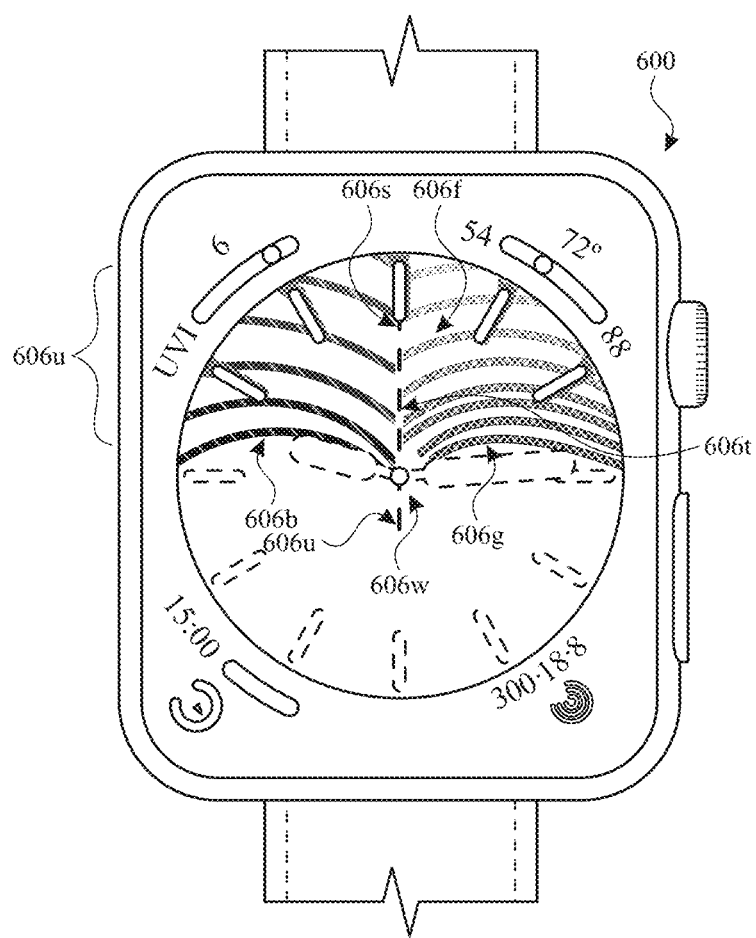

In FIG. 6D, seconds-hand region 606s has progressed from the 30-seconds position (as shown in FIG. 6C) to the zero-seconds position. In this position, seconds-hand region 606s divides simulated emitted light 606b and simulated emitted light 606g, and prevents simulated emitted light 606b and simulated emitted light 606g from interacting and/or combining to create visual effect 606k.

Seconds-hand region 606s includes side 606t and side 606u. Side 606u is shorter than side 606t relative to point of rotation 606w of seconds-hand region 606s at the center of clock user interface 606. Further, seconds-hand region 606s emits simulated emitted light 606v around seconds-hand region 606s that is a different color than simulated emitted light 606b and/or simulated emitted light 606g. This allows a user to distinguish seconds-hand region 606s from simulated emitted light 606b and simulated emitted light 606g while dividing and blocking simulated emitted light 606b and simulated emitted light 606g.

Figure 6E:
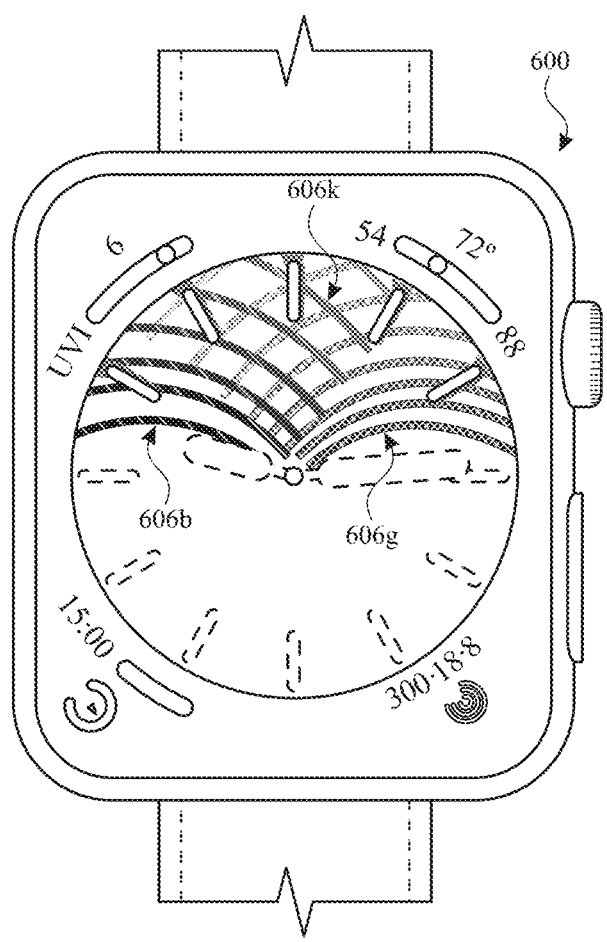

When computer system 600 detects a predetermined condition, such as entering a low power state, computer system 600 displays clock user interface 606 including visual effect 606k, as shown in FIG. 6E. When entering the low power state, clock user interface 606 ceases display of seconds-hand region 606s allowing simulated emitted light 606b and simulated emitted light 606g to combine to create visual effect 606k.

Figure 6F:
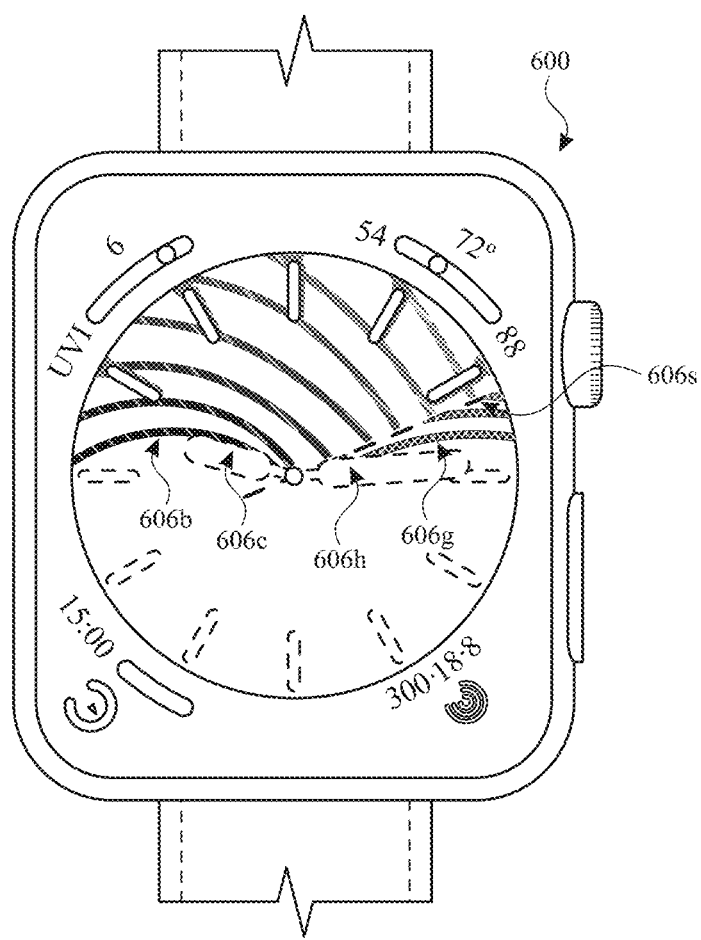

Turning to FIG. 6F, seconds-hand region 606s has progressed from the 0 seconds position as shown in FIG. 6D to the 10 seconds position. At this position, seconds-hand region 606s intersects simulated emitted light 606b and simulated emitted light 606g. In particular, seconds-hand region 606s intersects minute-hand region 606h at a point near the center of clock user interface 606 where it blocks some or all of simulated emitted light 606g being emitted by minute-hand region 606h. However, seconds-hand region 606s does not intersect minute-hand region 606h further away from the center of clock user interface 606 and thus simulated emitted light 606g is emitted from user interface 606h near the edge of clock user interface 606.

Figure 6G:
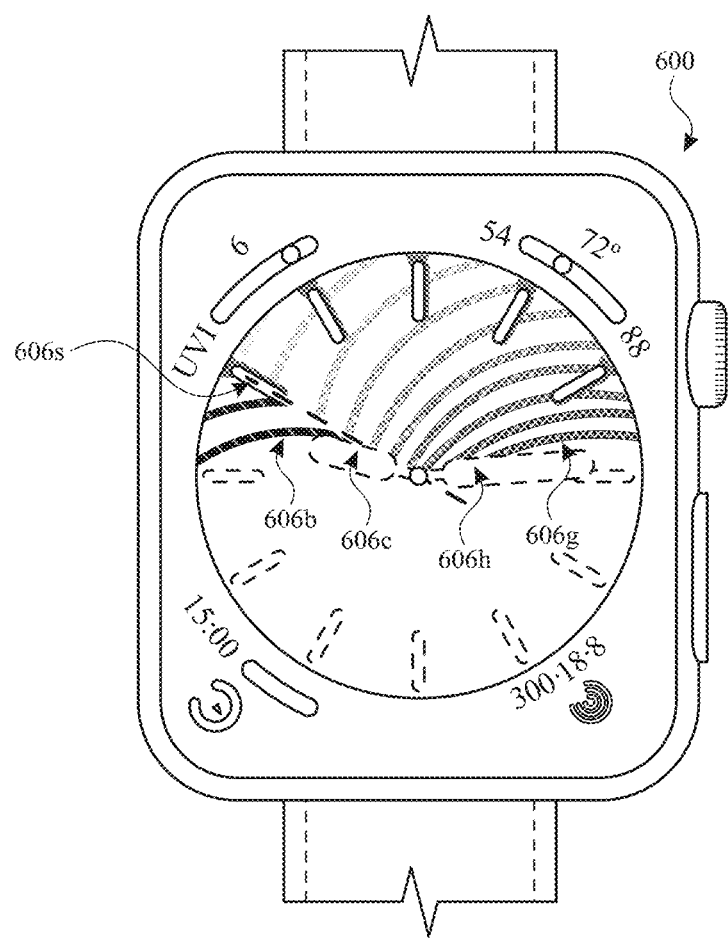

In FIG. 6G, seconds-hand region 606s has progressed from the 10 second position as shown in FIG. 6F to the 50 second position. At this position, seconds-hand region 606s intersects simulated emitted light 606b and simulated emitted light 606g at a different position than in FIG. 6F. In particular, seconds-hand region 606s intersects hour-hand region 606c at a point near the center of clock user interface 606 where it blocks some or all of simulated emitted light 606b being emitted by hour-hand region 606c. However, seconds-hand region 606s does not intersect hour-hand region 606c further away from the center of clock user interface 606 and thus simulated emitted light 606b is emitted from user interface 606c near the edge of clock user interface 606.

Figure 6H:
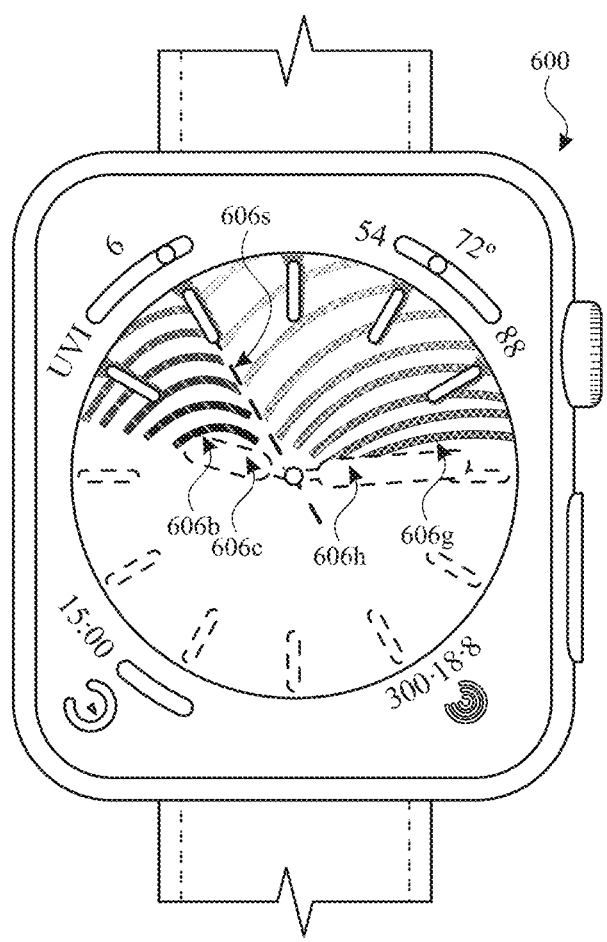

In FIG. 6H, seconds-hand region 606s has progressed from the 50 second position as shown in FIG. 6G to the 11 second position. At this position, seconds-hand region 606s intersects simulated emitted light 606b and simulated emitted light 606g in between hour-hand region 606C and minute-hand region 606g and does not directly intersect hour-hand region 606c or minute-hand region 606h. Thus, both simulated emitted light 606b and simulated emitted light 606g are not blocked as they are emitted. Rather, simulated emitted light 606b and simulated emitted light 606g are blocked at a point in between hour-hand region 606c and minute-hand region 606h to prevent simulated emitted light 606b and simulated emitted light 606g from mixing (e.g., combining).

Figure 6I:
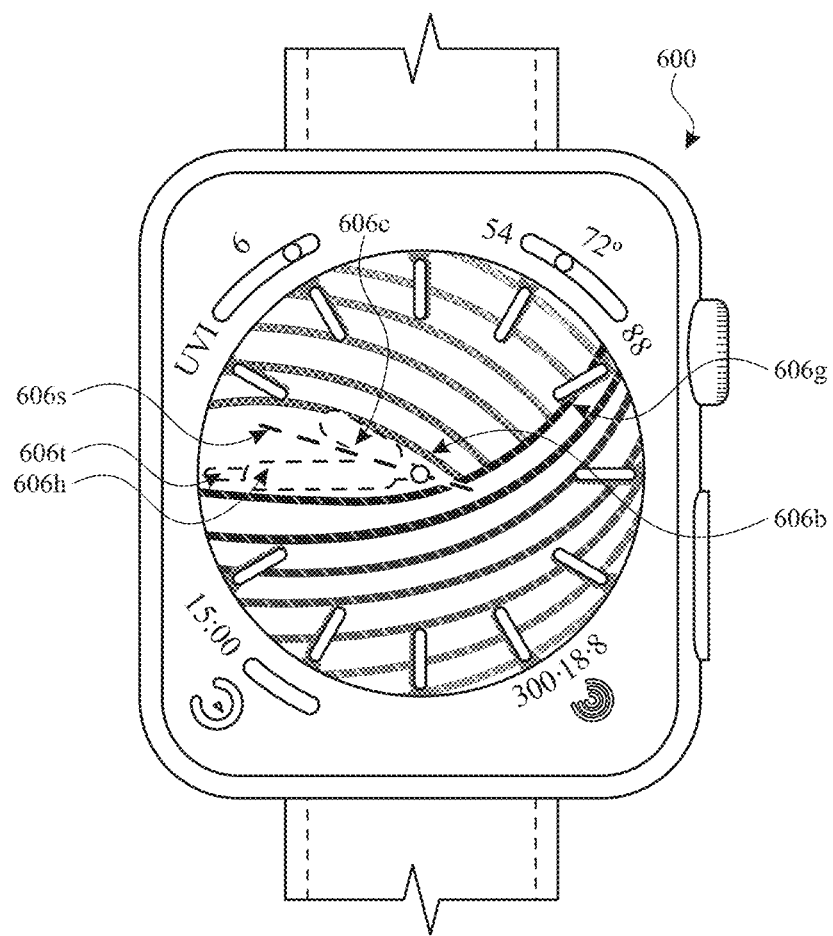

Turning to FIG. 6I, clock user interface 606 is displayed when the current time of day is 10:45. Accordingly, hour-hand region 606c has remained at the 10 o'clock position and minute-hand region 606h has progressed from the 11 minute position as shown in FIGS. 6B and 6D-6H to the 45 minute position. In this position, the clock-wise edge of hour-hand region 606c that emits simulated emitted light 606b and the counter-clockwise edge of minute-hand region 606h that emits simulated emitted light 606g are facing away from each other causing simulated emitted light 606b (from hour-hand region 606c) and simulated emitted light 606g (from minute-hand region 606h) to illuminate each of the time markers of clock user interface 606 except for dial-element region 606t. Accordingly, some or all of the time markers of clock user interface 606 except for dial-element region 606t are displayed. Further, seconds-hand region 606s is located in-between hour-hand region 606c and minute-hand region 606h and thus does not block simulated emitted light 606b or simulated emitted light 606g.

Figure 6J:
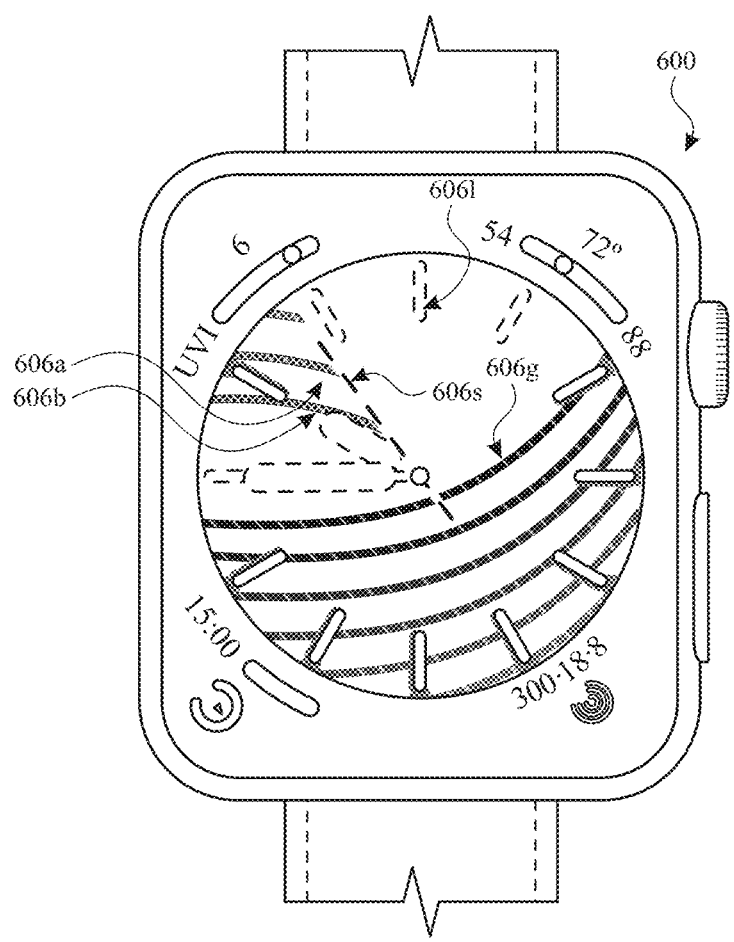

In FIG. 6J, seconds-hand region 606s has progressed from in between the 45 and 50 second position as shown in FIG. 6I to the 55 second position. At this position, seconds-hand region 606s now intersects visual effect 606a and blocks simulated emitted light 606b from hour-hand region 606c. This prevents simulated emitted light 606b from interacting with dial-element region 606l as well as the dial-element regions immediately counter-clockwise and clockwise of dial-element region 606l. As a result, these dial-element regions are not illuminated by simulated emitted light 606b from hour-hand region 606c and are not displayed on clock user interface region 606. However, simulated emitted light 606g from minute-hand region 606h is not affected by seconds-hand region 606s at this time and thus, simulated emitted light 606g disperses naturally across clock user interface 606 interacting with several elements of the clock user interface.

Figure 6K:
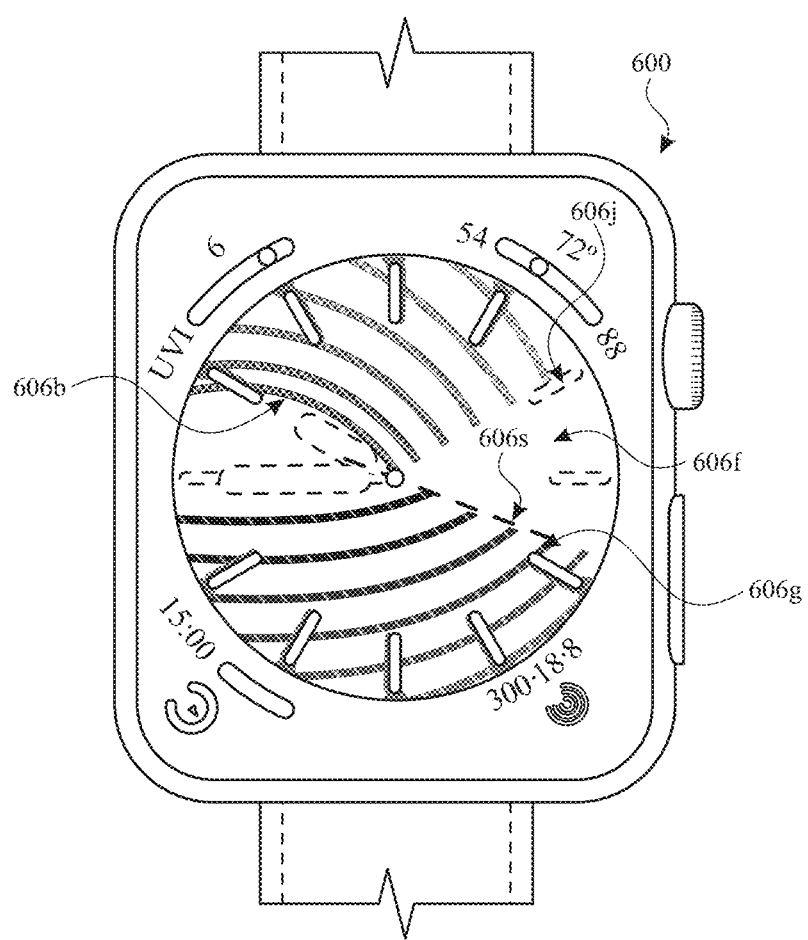

In FIG. 6K, seconds-hand region 606s has progressed from the 55 second position as shown in FIG. 6J to the 20 second position. Accordingly, seconds-hand region 606s now intersects visual effect 606f and blocks simulated emitted light 606g from minute-hand region 606h. This prevents simulated emitted light 606g from interacting with dial-element region 606j as well as the dial-element region immediately clockwise of dial-element region 606j. As a result, these dial-element regions are not illuminated by simulated emitted light 606g from minute-hand region 606h and are not displayed on clock user interface region 606. However, simulated emitted light 606b from hour-hand region 606c is not affected by seconds-hand region 606s at this time and thus, simulated emitted light 606b disperses naturally across clock user interface 606 interacting with several elements of the clock user interface.

It will be understood from these examples that as hour-hand region 606c, minute-hand region 606h, and seconds-hand region 606s move around clock user interface 606 corresponding to the current time, the areas of clock user interface 606 that are illuminated by simulated emitted light 606b and simulated emitted light 606g will change, allowing a user to view the current time.

FIG. 7 is a flow diagram illustrating a method for displaying clock user interfaces including simulated emitted light using a computer system in accordance with some embodiments. Method 700 is performed at a computer system (e.g., 100, 300, 500, or 600) that is in communication with a display generation component (e.g., a display controller and/or a touch-sensitive display system) and one or more input devices (e.g., a button, a rotatable input mechanism, a speaker, a camera, a motion detector (e.g., an accelerometer and/or gyroscope), and/or a touch-sensitive surface). Some operations in method 700 are, optionally, combined, the orders of some operations are, optionally, changed, and some operations are, optionally, omitted.

As described below, method 700 provides an intuitive way for displaying clock faces including simulated emitted light. The method reduces the cognitive burden on a user for viewing clock faces including simulated emitted light, thereby creating a more efficient human-machine interface. For battery-operated computing devices, enabling a user to view clock faces faster and more efficiently conserves power and increases the time between battery charges.

The computer system (e.g., 600) (e.g., a smartwatch, a wearable electronic device, a smartphone, a desktop computer, a laptop, or a tablet) receives (702) via the one or more input devices, a request (e.g., an input, a raise or rotation gesture, a tap gesture (e.g., on a touch-sensitive surface), a voice command, a button press, and/or a rotation of a rotatable input mechanism) to display a clock user interface (e.g., a watch face user interface).

In some embodiments, the request to display the user interface is received while the display generation component is in a locked state, an inactive state, a low-power state, a sleep state, and/or a dimmed state. In some embodiments, the request to display the user interface is received while the display generation component is displaying a home screen or springboard user interface (e.g., a user interface that includes a plurality of selectable objects for launching respective applications). In some embodiments, the request to display the user interface is received while the display generation component is displaying a wake screen, a lock screen, a user interface of an application (e.g., a music application, email application, or messaging application), and/or a user interface other than a clock face user interface. In some embodiments, the request to display the user interface is received while the display generation component is displaying a user interface (e.g., a clock face user interface) in a first state (e.g., in a locked state, an inactive state, a low-power state, a sleep state, and/or a dimmed state). In some embodiments, the request to display the user interface is received while the display generation component is displaying a different clock face user interface (e.g., a clock face user interface other than the clock face user interface in FIGS. 6B-6K). In some embodiments, the request to display the user interface is received while the display generation component is displaying a user interface associated with notifications (e.g., a user interface that displays a summary or list of notifications and/or concurrently displays two or more notifications).

In response to receiving the request to display the clock user interface, the computer system displays (704), via the display generation component, the clock user interface (e.g., 606). Displaying the clock user interface includes concurrently displaying: a first visual effect portion (706) (e.g., 606a, 606d, 606i, 606f, and/or 606k) that includes simulated emitted light (e.g., 606b and/or 606g) that indicates a position of a first user interface region (e.g., 606c, 606h, and/or 606s) (e.g., a clock hand region, a region that represents an area occupied by a clock hand, and/or a boundary (e.g., that represents an edge of a clock hand)), in the clock user interface, wherein the position and/or shape of the first user interface region indicates a current time of day (e.g., a current hour, a current minute, and/or a current second) and a second visual effect portion (708) (e.g., 606a, 606d, 606i, 606f, and/or 606k) (e.g., a visual effect (e.g., a shadow) that is included in, part of, and/or created by the first visual effect portion (or the simulated emitted light of the first visual effect portion), or a combination of the simulated emitted light and another simulated emitted light) that is based on the simulated emitted light from the first visual effect portion and a position of the first user interface region relative to a position of a second user interface region (e.g., a background, a watch hand, a complication, a time indicator, and/or an element of an analog dial (e.g., an hour and/or minute marker), wherein the second user interface region is different from the first user interface region. Automatically displaying a user interface, where displaying the user interface includes concurrently displaying a first visual effect portion that includes simulated emitted light that indicates a position of a first user interface region in the clock user interface such that the position and/or shape of the first user interface region indicates a current time of day, and a second visual effect portion that is based on the simulated emitted light from the first visual effect portion and a position of the first user interface region relative to a position of a second user interface region, enables the user interface to convey the current time and be displayed without requiring the user to provide additional inputs to configure the user interface (e.g., configuring the user interface by manually selecting which area of the user interface should be illuminated by emitted light, and/or by manually selecting where the second visual effect portion should be located), thereby performing an operation when a set of conditions has been met without requiring further user input.

In some embodiments, a clock hand is not displayed and/or is not visible in the first user interface region (e.g., 606c, 606h, and/or 606s) (e.g., the first user interface region is an area (e.g., an empty area) that a clock hand would occupy in the clock user interface if the clock hand were to be displayed). In some embodiments, the first user interface region includes a boundary (e.g., an edge of a clock hand). In some embodiments, the first user interface region does not include a clock hand (e.g., only the boundary is visible due to the simulated emitted light). In some embodiments, the first user interface region is dynamic (e.g., capable of movement). In some embodiments, the first user interface region has a static size, shape, and/or length (e.g., the first user interface region does not otherwise change as is moves around the clock user interface). In some embodiments, the first user interface region includes two boundaries (e.g., the two edges of the clock hand). In some embodiments, the first user interface region has different positions at different times. In some embodiments the first user interface region represents a clock hand (e.g., hour, minute, or seconds) that rotates around a point on the clock user interface to indicate a time (e.g., a current time). In some embodiments, the first user interface region extends from a point on the clock user interface for a predetermined distance (e.g., the length of a clock hand). In some embodiments, the first user interface region has a predetermined width. In some embodiments, the first user interface region rotates with a second user interface region (e.g., 606c, 606h, and/or 606s) (e.g., a second watch hand). In some embodiments, the first user interface region crosses a second user interface region (e.g., a second watch hand). In some embodiments, the first visual effect portion (e.g., 606a, 606d, 606i, 606f, and/or 606k) is based on a characteristic of the first user interface region (e.g., the size, the shape, the length, and/or the width). In some embodiments, the first visual effect portion is based on a position of the first user interface region (e.g., as the first user interface region moves around the clock user interface). In some embodiments, the simulated emitted light (e.g., 606b and/or 606g) appears to be emitted from the first user interface region. In some embodiments, the simulated emitted light radiates outward from the first user interface region. In some embodiments, the simulated emitted light radiates for a predetermined distance (e.g., when a face with an artificial barrier is selected such as a circle). In some embodiments, the simulated emitted light appears to be emitted by a portion (e.g., one side) of the first user interface region. In some embodiments, a portion of the first user interface region does not include the simulated emitted light (e.g., the dark side of the boundary).

In some embodiments, the position and/or shape of the second user interface region (e.g., 606c, 606e, 606h, 606j, 606l, and/or 606s) indicates a current time of day (e.g., a current hour, a current minute, and/or a current second). In some embodiments the second visual effect portion (e.g., 606a, 606d, 606i, 606f, and/or 606k) is based on a position of the first user interface region (e.g., 606c, 606h, and/or 606s) relative to a position of a third user interface region (e.g., 606c, 606e, 606h, 606j, 606l, 606n, and/or 606s) (e.g., a seconds hand, a complication, and/or a time indicator). In some embodiments, the second visual effect portion is based on a characteristic (e.g., position, color, shape, size, and/or brightness) of the first user interface region. In some embodiments, the second visual effect portion is based on a characteristic (e.g., color, shape, and/or brightness) of the simulated emitted light (e.g., 606b and/or 606g). In some embodiments, the second visual effect portion includes emitted light (e.g., different from the emitted light of the first visual effect portion) that indicates a position of the second user interface region. In some embodiments, the second visual effect portion is a portion of the first visual effect portion (e.g., a shadow created by a time indicator, ceasing of lighting effect when hitting a complication, and/or ceasing of lighting effect when intersected by second hand). In some embodiments, the second visual effect portion is based on the position of the first user interface region and the position of the second user interface region (e.g., simulated emitted light from each region combining). In some embodiments the second visual effect portion is based on an edge of the first user interface region (e.g., simulated stopping at the edge of the first user interface region (e.g., watch hand)). In some embodiments, the second visual effect portion is based on an edge of the second user interface region (e.g., simulated light stopping at the edge of the second user interface region (e.g., a complication and/or a watch hand)). In some embodiments, the emitted light of the second visual effect portion is separated from the emitted light of the first visual effect portion (e.g., by a third user interface region). In some embodiments, the second visual effect portion includes emitted light (e.g., different from the emitted light of the first visual effect portion) that indicates a position of the third user interface region (e.g., the seconds hand).

In some embodiments the computer system (e.g., 600) displays a third visual effect portion (e.g., 606k) (e.g., a combination of light from a first user interface region representing a first clock hand (e.g., an hour hand) and light from a second user interface region representing a second clock hand (e.g., a minute hand)) that includes a combination of the simulated emitted light (e.g., 606b) that indicates the position of the first user interface region (e.g., from the first user interface region) (e.g., overlapping, merging, and/or blending) and other simulated emitted light (e.g., 606g) (e.g., from the second user interface region). In some embodiments, the simulated emitted light that indicates the position of the first user interface region and the other simulated emitted light are the same color. In some embodiments, the simulated emitted light and the another simulated emitted light are different colors. In some embodiments, the third visual effect portion includes a color that is a combination of the colors of the simulated emitted light and the another simulated emitted light. In some embodiments, the third visual effect portion is brighter than the simulated emitted light. In some embodiments, the third visual effect portion is darker than the simulated emitted light. Automatically displaying a combination of simulated emitted light that indicates the position of the first user interface region and other simulated emitted light enables the user interface to be displayed without requiring the user to provide additional inputs to configure the user interface (e.g., by indicating portions of the simulated emitted lights that should be combined), thereby performing an operation when a set of conditions has been met without requiring further user input.

In some embodiments, the other simulated emitted light (e.g., 606g) indicates a position of a third user interface region (e.g., 606h and/or 606s) (e.g., a second clock hand) in the clock user interface, wherein the position and/or shape of the third user interface region indicates a current time of day (e.g., a current hour, a current minute, and/or a current second). Displaying simulated emitted light that indicates a current time of day provides visual feedback about the time of day and helps the user quickly and easily view the current time of day, thereby providing improved feedback to the user.

In some embodiments, the second user interface region (e.g., 606e, 606h, 606j, 606l, 606n, and/or 606s) blocks the simulated emitted light (e.g., 606b and/or 606g) (e.g., the simulated emitted light that indicates the position of the first region and/or simulated emitted light that indicates the position of one or more other regions) (e.g., the second user interface region prevents the light from illuminating a portion of the user interface). In some embodiments, the amount of simulated emitted light blocked by the second user interface region changes as the first user interface region (e.g., 606*c*) changes positions. In some embodiments, the amount of simulated emitted light blocked by the second user interface region is based on a current time of day. In some embodiments, the second user interface region is static. In some embodiments, the second user interface region is dynamic (e.g., changes position, shape, and/or size). Automatically blocking simulated emitted light with a user interface region enables the user interface to be displayed without requiring the user to provide additional inputs to configure the user interface (e.g., by indicating portions of the simulated emitted lights that are to be blocked by user interface regions), thereby performing an operation when a set of conditions has been met without requiring further user input.

In some embodiments, the position and/or shape of the second user interface region (e.g., 606*h* and/or 606*s*) indicates a current time of day (e.g., is a clock hand). In some embodiments, the second user interface region blocks a larger portion of the simulated emitted light (e.g., 606*b* and/or 606*g*) at different current times of day. In some embodiments, the second user interface region blocks a smaller portion of the simulated emitted light at different times of day. In some embodiments, the second user interface region blocks the simulated emitted light along one edge of the second user interface region. In some embodiments, the simulated emitted light illuminates a region of the clock user interface that is not blocked by the second user interface region. Displaying a user interface region that indicates a current time of day provides visual feedback about the time of day and helps the user quickly and easily view the current time of day, thereby providing improved feedback to the user.

In some embodiments, the second user interface region (e.g., 606*e*, 606*j*, 606*l*, 606*n*, and/or 606*p*) represents a time marker (e.g., a minute or hour marker of an analog clock dial). Displaying a user interface region that is a time marker provides visual feedback about the time of day and helps the user quickly and easily view the current time of day, thereby providing improved feedback to the user.

In some embodiments, the second visual effect portion (e.g., 606*d*, 606*i*, and/or 606*k*) includes a shadow (e.g., 606*m*) that is based on the simulated emitted light (e.g., 606*b* and/or 606*g*) and the position of the first user interface region (e.g., 606*c* and/or 606*h*) relative to the position of the second user interface region (e.g., 606*e*, 606*j*, 606*l*, and/or 606*p*) (e.g., the shadow created by the simulated emitted light interacting with a marking of time). In some embodiments, the second user interface region is static and the shadow moves around the second user interface region as the position of the first user interface region changes. In some embodiments, the shadow is based on a current time of day. In some embodiments, the simulated emitted light changes position based on the current time of day. In some embodiments, the shadow is a first shadow and the second visual effect portion includes a second shadow that is based on another simulated emitted light (e.g., from a minute hand) that indicates a position of a third user interface region (e.g., the minute hand) in the clock user interface, wherein the position and/or shape of the third user interface region indicates a current time of day. In some embodiments, the second shadow moves around the second user interface region as the position of the third user interface region changes. In some embodiments, the second shadow is based on a current time of day. Automatically displaying a shadow based on the simulated emitted light and the second user interface region enables the user interface to be displayed without requiring the user to provide additional inputs to configure the user interface (e.g., by indicating the location of the second visual effect portion that should include a shadow based on the first user interface region and the second user interface region), thereby performing an operation when a set of conditions has been met without requiring further user input.

In some embodiments, the shadow is created based on the simulated emitted light (e.g., 606*b* and/or 606*g*) interacting with a time marker (e.g., 606*e*, 606*j*, 606*l*, and/or 606*p*) (e.g., the shadow is cast behind the time marker when the simulated emitted light illuminates the time marker). In some embodiments, the shadow is cast on one side of the time marker and not the other. In some embodiments, the position of the shadow relative to the time marker changes based on the position of the first user interface region (e.g., 606*c* and/or 606*h*) (e.g., as the simulated emitted light changes position with the current time of day). In some embodiments, the position of the shadow relative to the time marker is based on a current time of day. In some embodiments, display of the shadow is based on current time of day (e.g., when the current time of day causes the simulated emitted light to illuminate a portion of the clock user interface different from the portion of the clock user interface including the time marker). In some embodiments, a second shadow is created based on the simulated emitted light interacting with a second time marker. In some embodiments, the first shadow and the second shadow have different positions relative to their respective time markers. Automatically displaying a shadow based on the simulated emitted light interacting with a time marker enables the user interface to be displayed without requiring the user to provide additional inputs to configure the user interface (e.g., by indicating the location of the shadow based on the interaction of the simulated emitted light and the time marker), thereby performing an operation when a set of conditions has been met without requiring further user input.

In some embodiments, the computer system (e.g., 600) detects a selection (e.g., a tap, swipe, and/or press on a touch sensitive surface) of an option (e.g., a selectable option) corresponding to the time marker (e.g., 606*e*, 606*j*, 606*l*, and/or 606*p*) (e.g., an option to turn the time marker on and/or off). In some embodiments, after (e.g., in response to) detecting a selection of the option corresponding to the time marker, displaying, via the display generation component and in the clock user interface (e.g., 600), the second visual effect portion (e.g., 606*d*, 606*i*, and/or 606*k*) without the second visual effect portion being based on the second user interface region (e.g., 606*e*, 606*j*, 606*l*, and/or 606*p*) (e.g., the simulated emitted light does not interact with regions of the clock user interface that represented time markers). Changing the second visual effect portion after detection of the option corresponding to the time marker reduces the number of inputs needed to perform an operation (e.g., by removing the time marker and the visual effects created by the time marker in one input), thereby reducing the number of inputs needed to perform an operation.

In some embodiments, a number of regions (e.g., 606*e*, 606*j*, 606*l*, and/or 606*p*) of the clock user interface that block the simulated emitted light (e.g., 606*b* and/or 606*g*) (e.g., the number of time markers that are visible) is based on a position of the first user interface region (e.g., 606*c*, 606*h*, and/or 606*s*) (e.g., the position of the minute and/or hour hand relative to the clock user interface and/or the position of the minute and/or hour hand relative to each other; where the minute and/or hour hand are pointing and/or where the second hand is blocking light). In some embodiments, the number of time markers illuminated by the simulated emitted light is based on a current time of day. Automatically displaying a number of regions of the clock user interface that block the simulated light based on a position of the first user interface region enables the user interface to be displayed without requiring the user to provide additional inputs to configure the user interface (e.g., by indicating a region that should be displayed for different positions of the first user interface region), thereby performing an operation when a set of conditions has been met without requiring further user input.

In some embodiments, the first user interface region (e.g., 606*b* and/or 606*h*) (e.g., the clock hand) is the same color as a background (e.g., 606*o*) of the clock user interface (e.g., 600) (e.g., the watch hand and the background of the clock are both black). In some embodiments, the watch hand and the background of the clock look the same unless illuminated by the simulated emitted light. Displaying a user interface region that is the same color as the background of the clock user interface provides visual feedback about the time of day and helps the user quickly and easily view the current time of day, thereby providing improved feedback to the user.

In some embodiments, the second user interface region (e.g., 606*b* and/or 606*h*) (e.g., that represents a clock hand) is the same color as a background (e.g., 606*o*) of the clock user interface (e.g., 600). Displaying a second user interface region that is the same color as the background of the clock user interface provides visual feedback about the time of day and helps the user quickly and easily view the current time of day, thereby providing improved feedback to the user.

In some embodiments, the second user interface region includes (e.g., is) a user interface element associated with an application (e.g., 606*n*) (e.g., a complication) and the simulated emitted light (e.g., 606*b* and/or 606*g*) does not affect the visual appearance of the second user interface region. In some embodiments, a complication refers to any clock face feature other than those used to indicate the hours and minutes of a time (e.g., clock hands or hour/minute indications). In some embodiments, complications provide data obtained from an application. In some embodiments, a complication includes an affordance that when selected launches a corresponding application. In some embodiments, a complication is displayed at a fixed, predefined location on the display. In some embodiments, complications occupy respective locations at particular regions of a clock face (e.g., lower-right, lower-left, upper-right, and/or upper-left). In some embodiments, the simulated emitted light stops prior to reaching the second user interface region and/or the simulated emitted light does not affect the visual appearance of the second user interface region (e.g., the simulated emitted light reaches the second user interface region but does not affect the visual appearance of the second user interface region). Displaying a user interface element associated with an application that is not affected by the visual appearance of the second user interface region provides visual feedback about applications of the electronic device and helps the user quickly and easily view information from applications of the user device, thereby providing improved feedback to the user.

In some embodiments, in accordance with the current time being a first time, the first user interface region (e.g., 606*c* and/or 606*h*) has a first position (e.g., 606*c* and/or 606*h* in FIG. 6B) (e.g., displaying the first user interface region in a first position at a first time of day); and in accordance with the current time being a second time, the first user interface region has a second position (e.g., 606*c* and/or 606*h* in FIG. 6I) (e.g., displaying the first user interface region in a second position at a second time of day). Displaying the first user interface region in a first position at a first time and at a second position at a second time provides visual feedback about the time of day and helps the user quickly and easily view the current time of day, thereby providing improved feedback to the user.

In some embodiments, the simulated emitted light (e.g., 606*b* and/or 606*g*) is emitted from a first edge (e.g., the clockwise-facing edge with respect to the clock face) of the first user interface region (e.g., 606*c* and/or 606*h*) and not from a second edge (e.g., the counter-clockwise facing edge with respect to the clock face) of the first user interface region. In some embodiments, the first edge and the second edge are on opposite sides of the first user interface region. In some embodiments, the simulated emitted light is emitted from the second edge (e.g., the counter-clockwise facing edge with respect to the clock face) of the first user interface region and not from the first edge (e.g., the clockwise-facing edge with respect to the clock face) of the first user interface region. Displaying the simulated emitted light from a first edge of the first user interface region and not from a second edge of the first user interface region enables the user interface to be displayed without requiring the user to provide additional inputs to configure the user interface (e.g., by indicating which portion of the user interface is illuminated by the simulated emitted light), thereby performing an operation when a set of conditions has been met without requiring further user input.

In some embodiments, at least a portion of the first edge of the first user interface region (e.g., 606*c* and/or 606*h*) is curved. In some embodiments, the portion of the first edge of the first user interface region that is curved represents an end point of the first user interface region. In some embodiments, the portion of the first edge is the entire first edge of the first user interface region. In some embodiments, a portion of the second edge of the first user interface region is curved. In some embodiments, a portion of the first edge of the first user interface region and a portion of the second edge of the first user interface region are curved. In some embodiments, a portion of a first edge of a second user interface region (e.g., 606*c* and/or 606*h*) is curved. In some embodiments, a portion of a second edge of a second user interface region is curved. In some embodiments, a portion of the first edge of the second user interface region and a portion of the second edge of the second user interface region are curved. Displaying a portion of the first edge of the first user interface region as curved provides visual feedback about the user interface and helps the user quickly and easily distinguish element of the user interface, thereby providing improved feedback to the user.

In some embodiments, the simulated emitted light (e.g., 606*b* and/or 606*g*) has (e.g., appears to be emitted from a source that has) a simulated height (e.g., a height in a direction perpendicular or substantially perpendicular to a surface of the display of the device) relative to a background (e.g., 606*o*) of the clock user interface (e.g., 606) (e.g., the simulated emitted light is emitted from a source that is displaced from the background in a direction normal to a surface that defines the background) and illuminates (e.g., casts light onto) the background of the clock user interface. Displaying the simulated emitted light with a simulated height relative to the background of the clock user interface to illuminated the background of the clock user interface enables the user interface to be displayed without requiring the user to provide additional inputs to configure the user interface (e.g., by indicating how the simulated emitted light should disperse across the background of the clock user interface), thereby performing an operation when a set of conditions has been met without requiring further user input.

In some embodiments, the simulated emitted light (e.g., 606b and/or 606g) is based on a first simulated light source (e.g., 606q and/or 606r) and a second simulated light source (e.g., 606q and/or 606r). Displaying the simulated emitted light based on a first simulated light source and a second simulated light source enables the user interface to be displayed without requiring the user to provide multiple inputs to configure the user interface (e.g., by indicating how the simulated emitted light should disperse based on different simulated light sources), thereby performing an operation when a set of conditions has been met without requiring further user input.

In some embodiments, the first simulated light source (e.g., 606q and/or 606r) of the simulated emitted light (e.g., 606b and/or 606g) has a first simulated height relative to the background (e.g., 606o) of the clock user interface (e.g., 606) (e.g., the first simulated light source is displaced from the background in a direction perpendicular to or substantially perpendicular to a surface that defines the background) and the second simulated light source (e.g., 606q and/or 606r) of the simulated emitted light has a second simulated height relative to the background (e.g., the second simulated light source is displaced from the background in a direction perpendicular to or substantially perpendicular to a surface that defines the background) of the clock user interface different from the first simulated height. Displaying the simulated emitted light with two different simulated light sources that have two different simulated heights relative to the background of the clock user interface enables the user interface to be displayed without requiring the user to provide additional inputs to configure the user interface (e.g., by indicating how the simulated emitted light should disperse based on the different simulated light sources), thereby performing an operation when a set of conditions has been met without requiring further user input.

In some embodiments, the first simulated light source (e.g., 606q and/or 606r) of the simulated emitted light (e.g., 606b and/or 606g) includes (e.g., produces or emits) light of a first color and the second simulated light source (e.g., 606q and/or 606r) of the simulated emitted light includes (e.g., produces or emits) light of a second color different from the first color. In some embodiments, the first simulated light source does not include light of the second color. In some embodiments, the second simulated light source does not include light of the first color. In some embodiments, the first color and the second color are the same color. Displaying the simulated emitted light with two different simulated light sources that have two different colors enables the user interface to be displayed without requiring the user to provide multiple inputs to configure the user interface (e.g., by indicating the dispersal of each color of simulated emitted light), thereby performing an operation when a set of conditions has been met without requiring further user input.

In some embodiments, the first user interface region (e.g., 606c and/or 606h) includes one or more cutouts (e.g., 606z) (e.g., a boundary with a sharp angle, such as a cutout in the clock hand, a vertex, and/or a corner point). In some embodiments, the first user interface region includes a boundary with a sharp angle (e.g., a cutout in the clock hand, a vertex, and/or a corner point). In some embodiments, the cutout results in a sharp angle in the simulated emitted light (e.g., the light being emitted in different directions). In some embodiments, the boundary has a radius of curvature and/or an angle. In some embodiments, the angle is 45 degrees, 90 degrees, or 135 degrees. In some embodiments, the radius includes a gradual change in direction of a boundary or edge of the first user interface region. In some embodiments, the cutout includes a sharp change in direction at an angle. In some embodiments, the cutout is at a first point on the first user interface region (e.g., one end of the watch hand). In some embodiments, the first point on the first user interface region is close to the center of the clock user interface (e.g., the point around which the clock hand rotates or from which the clock hand extends). In some embodiments, the first point on the first user interface is close to the edge of the clock user interface (e.g., the point where the clock hand ends). In some embodiments the cutout is at a second point on the first user interface region different from the first point on the first user interface region. In some embodiments, there is a first cutout at the first point and a second cutout at the second point (e.g., both ends of the clock hand have a sharp angle). Displaying the first user interface region with a cutout provides visual feedback about the user interface and helps the user quickly and easily distinguish element of the user interface, thereby providing improved feedback to the user.

In some embodiments, the computer system (e.g., 600) detects a request (e.g., a tap, swipe, and/or press on a touch sensitive surface) to change the color of the simulated emitted light (e.g., 606b and/or 606g) (e.g., to change from a first color to a second color, from red and/or green to white and/or grey). In some embodiments, after (e.g., in response to) detecting the request to change the color of the simulated emitted light in accordance with a determination that the request corresponds to a first color (e.g., red, green, white, and/or grey), the computer system displays the simulated emitted light in the first color (e.g., using a simulated light source of the first color) and in accordance with a determination that the request corresponds to a second color (e.g., red, green, white, and/or grey) different from the first color, the computer system displays the simulated light in the second color (e.g., using a simulated light source of the second color). In some embodiments, the request to change the color of the simulated emitted light is provided in a settings user interface associated with the clock user interface. Changing the color of the simulated emitted light in accordance with a determination that a request corresponds to a color enables a user to edit the color of the simulated emitted light easily and in an intuitive manner, thereby providing improved control options.

In some embodiments, the computer system (e.g., 600) displays the clock user interface (e.g., 606) by displaying (e.g., concurrently with the first visual effect portion and/or the second visual effect portion), via the display generation component, a third visual effect portion (e.g., 606a, 606d, 606i, 606f, and/or 606k) that includes simulated emitted light (e.g., 606b and/or 606g) (e.g., light from the second clock hand) that indicates a position of the second user interface region (e.g., 606c and/or 606h) (e.g., the second clock hand). In some embodiments, the third visual effect portion is the second visual effect portion (e.g., 606a, 606d, 606i, 606f, and/or 606k). In some embodiments, the third visual effect portion interacts (e.g., affects or changes) with the first visual effect portion (e.g., 606a, 606d, 606i, 606f, and/or 606k) and the second visual effect portion (e.g., the second emitted light combines with the first emitted light). In some embodiments, the third visual effect portion does not interact with the first visual effect portion (e.g., when the simulated emitted lights do not touch because they are opposite each other and/or the second hand divides the simulated emitted lights). Displaying a third visual effect portion that includes simulated emitted light that indicates a position of the second user interface region provides visual feedback about the time of day and helps the user quickly and easily view the current time of day, thereby providing improved feedback to the user.

In some embodiments, the simulated emitted light (e.g., 606b and/or 606g) that indicates the position of the first user interface region (e.g., 606c and/or 606h) includes (e.g., is) a first color and the simulated emitted light (e.g., 606b and/or 606g) that indicates the position of the second user interface region (e.g., 606c and/or 606h) includes (e.g., is) a second color different from the first color. In some embodiments, the simulated emitted light that indicates the position of the first user interface region and the simulated emitted light that indicates the position of the second user interface region include (e.g., are) the same color. In some embodiments, the second visual effect portion includes simulated emitted light that is the same color as the simulated emitted light of the first visual effect portion. Displaying the first simulated emitted light in a first color and the second simulated emitted light provides visual feedback distinguishing different portions of the user interface and helps the user quickly and easily distinguish portions of the user interface which indicate different times of day, thereby providing improved feedback to the user.

In some embodiments, the simulated emitted light (e.g., 606b and/or 606g) that indicates the position of the first user interface region (e.g., 606c and/or 606h) is emitted from a from an edge (e.g., the clockwise-facing edge with respect to the clock face) of the first user interface region (e.g., the hour hand) and the simulated emitted light (e.g., 606b and/or 606g) that indicates the position of the second user interface region (e.g., 606c and/or 606h) is emitted from an edge (e.g., the counter clockwise-facing edge with respect to the clock face) of the second user interface region (e.g., the minute hand), wherein the edge of the first user interface region is opposite the edge of the second user interface region relative to the clock user interface (e.g., the clockwise direction of the clock user interface). In some embodiments, the edge of the first user interface region faces clockwise and the edge of the second user interface region faces counterclockwise. In some embodiments, the edge of the first user interface region faces counterclockwise and the edge of the second user interface region faces clockwise. Displaying the simulated emitted light that indicates the position of the first user interface region is emitted from an edge of the first user interface region and the simulated emitted light that indicates the position of the second user interface region is emitted from an edge of the second user interface region, wherein the edge of the first user interface region is opposite the edge of the second user interface region relative to the clock user interface provides visual feedback distinguishing different portions of the user interface, thereby providing improved feedback to the user.

In some embodiments, the edge of the first user interface region (e.g., 606c and/or 606h in FIG. 6B) faces towards the edge of the second user interface region (e.g., 606c and/or 606h in FIG. 6B) (e.g., when the clockwise-facing edge of the hour hand faces towards the counter clockwise-facing edge of the minute hand (e.g., 10:10, 1:30, 6:45, and/or 9:30) and/or when the counter clockwise-facing edge of the hour hand faces towards the clockwise-facing edge of the minute hand (e.g., 1:50, 11:45, and/or 4:10)). Displaying the edge of the first user interface region facing towards the edge of the second user interface region provides visual feedback distinguishing different portions of the user interface and help the user quickly and easily distinguish portion of the user interface that indicate different times of day, thereby providing improved feedback to the user.

In some embodiments, the edge of the first user interface region (e.g., 606c and/or 606h in FIG. 6H) faces away from the edge of the second user interface region (e.g., 606c and/or 606h in FIG. 6H) (e.g., when the clockwise-facing edge of the hour hand faces away from the counter clockwise-facing edge of the minute hand (e.g., 1:55, 10:45, and/or 3:10) and/or when the counter clock-wise facing edge of the hour hand faces away from the clockwise-facing edge of the minute hand (e.g., 11:10, 2:30, 7:45, and/or 8:30)). Displaying the edge of the first user interface region facing away from the edge of the second user interface region provides visual feedback distinguishing different portions of the user interface and helps the user quickly and easily distinguish portions of the user interface which indicate different times of day, thereby providing improved feedback to the user.

In some embodiments a position of the edge of the first user interface region (e.g., 606c and/or 606h in FIG. 6H) and a position of the second edge of the second user interface region (e.g., 606c and/or 606h in FIG. 6H) are based on the current time of day (e.g., whether the first edge of the first user interface region and the second edge of the second user interface region are opposed from each or face each other change throughout the day (e.g., at 10:10 they are towards each other and at 10:45 they are opposed from each other)). In some embodiments, in accordance with a determination that the current time of day is a first time of day, the edge of the first user interface region faces towards the edge of the second user interface region; and in accordance with a determination that the current time of day is a second time of day different from the first time of day, the edge of the first user interface region faces away from the edge of the second user interface region. Displaying a position of the edge of the first user interface region and a position of the edge the second user interface region based on the current time of day provides visual feedback about the time of day and helps the user to be able to quickly and easily determine the current time of day, thereby providing improved feedback to the user.

In some embodiments, the computer system (e.g., 600) displays simulated emitted light (e.g., 606b and/or 606g) that indicates the position of the first user interface region and simulated emitted light (e.g., 606b and/or 606g) that indicates a position of a third user interface region (e.g., a second clock hand, a minute hand) such that the simulated emitted light that indicates the position of the first user interface region and the simulated emitted light that indicates the position of the third user interface region are divided (e.g., separated, blocked from each other, prevented from interacting, mixing, and/or combining) by a fourth user interface region (e.g., 606s) (e.g., that represents a seconds hand), wherein the position and/or shape of the fourth user interface region indicates the current time of day. In some embodiments, the position of the fourth user interface region changes based on the current time of day (e.g., 606s in 6D and 606s in 6F). Displaying simulated emitted light that indicates the position of the first user interface region and simulated emitted light that indicates a position of a third user interface region such that the simulated emitted light that indicates the position of the first user interface region and the simulated emitted light that indicates the position of the third user interface region are divided by a fourth user interface region, wherein the position and/or shape of the fourth user interface region indicates the current time of day provides visual feedback about the time of day and helps the user to be able to quickly and easily determine the current time of day, thereby providing improved feedback to the user.

In some embodiments, the fourth user interface region (e.g., 606s) (e.g., the seconds hand) includes a first side (e.g., 606t) (e.g., a long side) and a second side (e.g., 606u) (e.g., a short side) that is shorter than the first side relative to a point of rotation (e.g., 606w) on the fourth user interface region (e.g., the fourth user interface region is a line passing through a point on the clock user interface and the fourth user interface region has a long side on one side of the point and a short side on the other side of the point). Displaying the fourth user interface region with a first side and a second side that is shorter than the first side relative to a point of rotation on the fourth user interface region provides visual feedback distinguishing different portions of the user interface and helps the user to be able to quickly and easily distinguish portions of the user interface which indicate different times of day, thereby providing improved feedback to the user.

In some embodiments, the fourth user interface region (e.g., 606s in FIG. 6D) prevents mixing of the (e.g., blocks and/or stops from interacting) the simulated emitted light (e.g., 606b and/or 606g) that indicates the position of the first user interface region (e.g., 606c and/or 606h) and the simulated emitted light (e.g., 606b and/or 606g) that indicates the position of the third user interface region (e.g., 606c and/or 606h). In some embodiments the fourth user interface region stops the simulated emitted light that indicates the position of the first user interface region from interacting with the simulated emitted light that indicates the position of the third user interface region. In some embodiments the fourth user interface region stops the simulated light that indicates the position of the first user interface region from interacting with other elements of the clock user interface (e.g., the first user interface region, the second user interface region, and/or the third user interface region). In some embodiments the fourth user interface region stops the simulated light that indicates the position of the third user interface region from interacting with other elements of the clock user interface (e.g., the first user interface region and/or the second user interface region). Displaying the fourth user interface region such that it prevents mixing of the simulated emitted light that indicates the position of the first user interface region and the simulated emitted light that indicates the position of the third user interface region provides visual feedback distinguishing different portions of the user interface and helps the user to be able to quickly and easily distinguish portions of the user interface which indicate different times of day, thereby providing improved feedback to the user.

In some embodiments, in response to a determination that a predetermined condition (e.g., entering a low power state, selection removing the seconds hand, and/or a specific amount of time has passed) is met, the computer system (e.g., 600) displays simulated emitted light (e.g., 606b and/or 606g) that indicates the position of the first user interface region (e.g., 606c and/or 606h) and simulated emitted light (e.g., 606b and/or 606g) that indicates a position of the third user interface region (e.g., 606c and/or 606h) such that the simulated emitted light that indicates the position of the first user interface region is mixed with (e.g., combined with and/or interacts with) the simulated emitted light that indicates the position of the third user interface region. In some embodiments, the mixture of the simulated emitted light that indicates the position of the first user interface region and the simulated emitted light that indicates the position of the third user interface region is based on a position of the first user interface region and a position of the third user interface region. In some embodiments, the mixture of the simulated emitted light that indicates the position of the first user interface region and the simulated emitted light that indicates the position of the third user interface region is based on a color of the simulated emitted light that indicates the position of the first user interface region and a color of the simulated emitted light that indicates the position of the third user interface region. In some embodiments, the mixture of the simulated emitted light that indicates the position of the first user interface region and the simulated emitted light that indicates the position of the third user interface region is based on the second user interface region (e.g., 606c, 606d, 606h, 606j, 606l, 606p) (e.g., being blocked by one or more elements of the clock user interface). In some embodiments, simulated emitted light that indicates the position of the first user interface region and simulated emitted light that indicates a position of the third user interface region are displayed in black and white. In some embodiments, simulated emitted light that indicates the position of the first user interface region and simulated emitted light that indicates a position of the third user interface region change color in response to the determination that the predetermined condition is met (e.g., from red/green to white). In some embodiments, simulated emitted light that indicates the position of the first user interface region and simulated emitted light that indicates a position of the third user interface region change brightness in response to the determination that the predetermined condition is met. Displaying simulated emitted light that indicates the position of the first user interface region and simulated emitted light that indicates a position of the third user interface region such that the simulated emitted light that indicates the position of the first user interface region is mixed with the simulated emitted light that indicates the position of the third user interface region in response to a determination that a predetermined condition is met provides visual feedback distinguishing different portions of the user interface in specific circumstances and helps the user to be able to quickly and easily distinguish portions of the user interface which indicate different times of day when conditions have been met, thereby providing improved feedback to the user.

In some embodiments, the computer system (e.g., 600) displays (e.g., concurrently with the first visual effect portion and/or the second visual effect portion) a third simulated emitted light (e.g., the light of the seconds hand) that indicates a position and/or size of a point of rotation of one or more of the user interface regions (e.g., 606c, 606h, and/or 606s) (e.g., the hours hand, the minutes hand, and/or the seconds hand). In some embodiments, the third simulated emitted light mixes with (e.g., merges and/or interacts with) simulated emitted light that indicates the position of the first user interface region and/or simulated emitted light that indicates a position of a third user interface region (e.g., where the light from the seconds hand merges with the light from the hour hand and the light from the minute hand). In some embodiments the third simulated emitted light is less bright than simulated emitted light that indicates the position of the first user interface region and/or simulated emitted light that indicates a position of a third user interface region. Displaying a third simulated emitted light that indicates a position and/or size of a point of rotation of the fourth user interface region provides visual feedback distinguishing different portions of the user interface and helps the user to be able to quickly and easily distinguish portions of the user interface which indicate different times of day, thereby providing improved feedback to the user.

In some embodiments, in accordance with a determination that the current time of day is a first time of day, the fourth user interface region (e.g., 606s in FIG. 6F) has a first position (e.g., displaying the fourth user interface region in a first position at a first time of day); and in accordance with a determination that the current time of day is a second time of day different from the first time of day, the fourth user interface region (e.g., 606S in FIG. 6G) has a second position (e.g., displaying the third user interface region in a second position at a second time of day), wherein the fourth user interface region overlaps less of the first visual effect portion (e.g., 606a, 606d, 606i, 606f, and/or 606k) in the second position than in the first position (e.g., the intersection point of the fourth user interface region with the first visual effect portion causes less of the simulated emitted light that indicates the position of the first user interface region (e.g., simulated emitted light that indicates the position of the first user interface region illuminates more of the background and/or the first visual effect portion is larger)). In some embodiments, the fourth user interface region overlaps more of the first visual effect portion in the second position than in the first position (e.g., the intersection point of the fourth user interface region with the first visual effect portion causes more of the simulated emitted light that indicates the position of the first user interface region (e.g., simulated emitted light that indicates the position of the first user interface region illuminates less of the background and/or the first visual effect portion is smaller). In some embodiments, the fourth user interface region overlaps less of the second visual effect portion in the second position than in the first position (e.g., the intersection point of the fourth user interface region with the second visual effect portion causes less of the simulated emitted light that indicates a position of a third user interface region to be blocked (e.g., simulated emitted light that indicates a position of a third user interface region illuminates more of the background and/or the second visual effect portion is larger). In some embodiments, the fourth user interface region overlaps more of the second visual effect portion in the second position than in the first position (e.g., the intersection point of the fourth user interface region with the second visual effect portion causes more of simulated emitted light that indicates a position of a third user interface region to be blocked (e.g., simulated emitted light that indicates a position of a third user interface region illuminates less of the background and/or the second visual effect portion is smaller). Displaying the fourth user interface region in different positions at different times of day, wherein the fourth user interface region overlaps less of the first visual effect portion in the second position than in the first position provides visual feedback about the time of day and helps the user to be able to quickly and easily determine the current time of day, thereby providing improved feedback to the user.

In some embodiments, the first user interface region (e.g., 606c and/or 606h) has a first point (e.g., near a point of rotation of the first user interface region and/or near a center of the clock user interface) and a second point (e.g., further from the point of rotation of the first user interface region, further from the center of the clock user interface, and/or near an edge of the clock user interface) and wherein the fourth user interface region (e.g., 606s) blocks (e.g., interacts with, impedes, and/or stops) more light at the first point of the first user interface region than at the second point of the first user interface region. In some embodiments, the first point is at the bottom (e.g., near a point of rotation of the first user interface region and/or near a center of the clock user interface) of the first user interface region and the second point is at the top (e.g., further from the point of rotation of the first user interface region, further from the center of the clock user interface, and/or near an edge of the clock user interface) of the first user interface region. In some embodiments, the fourth user interface region blocks more light at the second point of the first user interface region and blocks less light at the first point of the first user interface region. In some embodiments, the second user interface region (e.g., 606c and/or 606h) has a first point and a second point and the fourth user interface region blocks more light at the first point of the first user interface region and blocks less light at the second point of the first user interface region. In some embodiments, the first point is at the bottom (e.g., near a point of rotation of the first user interface region and/or near a center of the clock user interface) of the second user interface region and the second point is at the top (e.g., further from the point of rotation of the first user interface region, further from the center of the clock user interface, and/or near an edge of the clock user interface) of the second user interface region. In some embodiments, the fourth user interface region blocks more light at the second point of the second user interface region and blocks less light at the first point of the second user interface region. Displaying the fourth user interface region blocking more light at the first point of the first user interface region than at the second point of the first user interface region provides visual feedback distinguishing different portions of the user interface and helps the user to be able to quickly and easily distinguish portions of the user interface which indicate different times of day, thereby providing improved feedback to the user.

In some embodiments, fourth user interface region (e.g., 606s) includes (e.g., is) a third color that is different from the first color and/or the second color. In some embodiments, the fourth user interface region is the same color as the simulated emitted light that indicates the position and/or size of the point of rotation of the third fourth user interface region (e.g., the seconds hand). Displaying the fourth user interface region with a third color that is different from the first color and/or the second color provides visual feedback distinguishing different portions of the user interface and helps the user to be able to quickly and easily distinguish portions of the user interface which indicate different times of day, thereby providing improved feedback to the user.

Note that details of the processes described above with respect to method 700 (e.g., FIG. 7) are also applicable in an analogous manner to the methods described below. For example, methods 900, 1100, 1300, 1500, 1700, and 1900 optionally includes one or more of the characteristics of the various methods described above with reference to method 700. For example, method 700 optionally includes one or more of the characteristics of the various methods described below with reference to method 900. For example, simulated light effect as described with reference to FIGS. 6A-6K can be optionally emitted in a user interface including an astronomical object from as described with reference to FIGS. 8A-8T with reference to method 900. For another example, method 700 optionally includes one or more of the characteristics of the various methods described below with reference to method 1100. For example, the time indicator of method 700 optionally includes adjustable time indicators as described in method 1100. As another example, method 700 optionally includes one or more of the characteristics of the various methods described below with reference to method 1300. For example, clock user interface 606 of FIGS. 6A-6K optionally includes multiple calendar systems as described in method 1300. For another example, method 700 optionally includes one or more of the characteristics of the various methods described below with reference to method 1500. For example, clock user interface 606 can optionally include numbers that interact with each other as described in method 1500. For brevity, these details are not repeated below.

FIGS. 8A-8T illustrate example clock user interfaces including astronomical objects, according to various examples. The user interfaces in these figures are used to illustrate the processes described below, including the processes in FIG. 9.

FIG. 8A illustrates computer system 800 (e.g., a smartwatch) with display 802. Computer system 800 includes rotatable and depressible input mechanism 804. In some embodiments, computer system 800 includes one or more features of device 100, device 300, and/or device 500. In some embodiments, computer system 800 is a tablet, phone, laptop, desktop, and/or camera. In some embodiments, the inputs described below can be substituted for alternate inputs, such as a press input and/or a rotational input received via rotatable and depressible input mechanism 804.

In FIG. 8A, computer system 800 displays clock user interface 806. In some embodiments, computer system 800 displays clock user interface 806 in response to detecting an input, such as a tap input, a wrist raise input, a press input received via rotatable and depressible input mechanism 804, and/or a rotational input received via rotatable and depressible input mechanism 804.

In some embodiments, clock user interface 806 is displayed on a tablet, phone (e.g., a smartphone), laptop, and/or desktop. In some embodiments, clock user interface 806 is displayed on a home screen, lock screen, and/or wake screen of a tablet, phone, laptop, and/or desktop.

Clock user interface 806 includes astronomical object (e.g., the Earth) 806a, digital indication of time 806b, and selectable user interface element 806c. Clock user interface 806 displays different portions, crops, and/or views of astronomical object 806a (or other astronomical objects, as described below) in response to predetermined events such as user inputs and/or changes in an operational mode of computer system 800. In FIG. 8A, a first portion of astronomical object 806a is displayed in clock user interface 806. Astronomical object 806a partially overlaps (e.g., obscures) a portion of digital indication of time 806b, creating a depth affect between astronomical object 806a and other aspects of clock user interface 806 including digital indication of time 806b and selectable user interface element 806c.

Astronomical object 806a includes a representation of the Earth including continents, oceans, and clouds. In particular, astronomical object 806a includes clouds 806d, which are optionally displayed based on a current weather data. Thus, clouds 806d can be realistic and mimic the cloud pattern (e.g., cloud cover) of the current location of computer system 800 to create a view of the Earth that is more realistic. In some embodiments, the pattern of clouds 806d changes in response to detecting a change in the current weather at the current location of computer system 800. In addition to including clouds 806d, astronomical object 806a includes accurate representations of the shadows of clouds 806d displayed on the landmass and ocean of astronomical object 806a.

As discussed further below, in some embodiments, the portion or view of astronomical object 806a that is displayed in clock user interface 806 changes when a predetermined event is detected, but each portion of view of astronomical object 806a includes the current location of computer system 800. Thus, the portion of astronomical object 806a displayed in FIG. 8A includes the landmass or other location of computer system 800 at the current time (e.g., 10:09). Further, the portion of astronomical object 806a that is covered in sunlight and the portion of astronomical object 806a that is not covered by sunlight reflect the portions of the Earth that are covered by sunlight at the current time. Accordingly, in FIG. 8A, the current location of computer system 800 is included in the portion of astronomical object 806a and appears to be covered in sunlight because it is currently daytime in the current location of computer system 800.

Selectable user interface element 806c is associated with a calendar application and includes the current day of the week and date of the current month. In some embodiments, in response to detecting a user input (e.g., a tap, press, and/or swipe) on selectable user interface element 806c, computer system 800 displays a user interface of the associated calendar application. In some embodiments, selectable user interface element 806c (e.g., a complication) is associated with an application other than the calendar application. In some embodiments, the complication displayed as selectable user interface element 806c is selected by a user so that the user may quickly access information from an application that is relevant to the user.

After detecting a predetermined event such as a tap, wrist movement, or other user input, computer system 800 displays clock user interface 806 with a second portion of astronomical object 806a, as shown in FIG. 8B. The second portion of astronomical object 806a overlaps with a different portion of digital indication of time 806b than the first portion of astronomical object 806a displayed in FIG. 8A causing a different depth effect between the second portion of astronomical object 806a and digital indication of time 806b.

Similar to the first portion of astronomical object 806a displayed in FIG. 8A, the second portion of astronomical object 806a includes the current location of computer system 800 and indicates that the current location of computer system 800 is covered by sunlight because it is daytime at the current location of computer system 800. Further, the second portion of astronomical object 806a optionally includes realistic clouds 806d based on the current weather data. However, because the second portion of astronomical object 806a includes astronomical object 806a from a different angle the cloud cover in the second portion of astronomical object 806a appears different from the cloud cover of the first portion of astronomical object 806a.

After detecting another predetermined event, computer system 800 displays clock user interface 806 with a third portion of astronomical object 806a, as shown in FIG. 8C. The third portion of astronomical object 806a displays a different view or angle of astronomical object 806a compared to FIGS. 8A and 8B. In particular, the third portion of astronomical object 806a is a view of astronomical object 806a in which the entire astronomical object 806a is in the field of view as opposed to a field of view which includes less than the entire astronomical object 806a. Similarly to the first and second portions of astronomical object 806a, the third portion of astronomical object 806a includes the current location of computer system 800 and indicates that the current location of computer system 800 is covered in sunlight, even though the view of astronomical object 806a is different.

Further, the third portion of astronomical object 806a is displayed behind digital indication of time 806b and selectable user interface element 806c, causing a different depth effect than the depth effects shown in FIGS. 8A and 8B. However, as with FIGS. 8A and 8B, clock user interface 806 optionally includes realistic clouds 806d based on the current weather pattern at the current location of computer system 800. Thus, clouds 806d will change as the weather at the current location of computer system 800 changes.

In some embodiments, the portion of astronomical object 806a that is displayed in clock user interface 806 is predetermined. For example, the different portions of astronomical object 806a can have a predetermined order and thus can be displayed in the order shown in FIGS. 8A, 8B, and 8C when the portions of astronomical object 806a are cycled.

In some embodiments, the portion of astronomical object 806a is randomly or pseudo-randomly selected. For example, there can be eight different portions (or view) of astronomical object 806a made available to computer system 800 and one can be selected at random from the eight different portions when the predetermined event is detected. As another example, one of the eight different portions can be selected while ensuring that the same portion does not repeat to provide a pseudo-random selection of the portion of astronomical object 806a that is displayed in response to detecting the predetermined event.

After detecting another predetermined event (e.g., the same predetermined event discussed above or a different predetermined event), computer system 800 displays clock user interface 806 with a fourth portion of astronomical object 806a, as shown in FIG. 8D. The fourth portion of astronomical object 806a displays a different view or angle of astronomical object 806a compared to FIGS. 8A, 8B and 8C. Similarly to the other portions of astronomical object 806a, the fourth portion of astronomical object 806a includes the current location of computer system 800 and indicates that the current location of computer system 800 is in sunlight, even though the view of astronomical object 806a is different.

Further, the fourth portion of astronomical object 806a is displayed below (and does not overlap with) digital indication of time 806b and selectable user interface element 806c, causing clock user interface 806 to be displayed without any depth effect between astronomical object 806a, digital indication of time 806b, and selectable user interface element 806c. Thus, the spatial relationship between astronomical object 806a, digital indication of time 806b, and selectable user interface element 806c displayed on computer system 800 is based on the view of astronomical object 806a that is being displayed.

Further, as with the other portions of astronomical object 806a, the fourth portion of astronomical object 806a optionally includes realistic clouds 806d based on the current weather pattern at the current location of computer system 800.

While displaying clock user interface 806 as shown in FIG. 8D, computer system 800 detects user input 808 rotating rotatable input mechanism 804 (which is, optionally, also depressible). After detecting user input 808 rotating rotatable input mechanism 804, computer system 800 displays clock user interface 806 including the third portion of astronomical object 806a as shown in FIG. 8E. User input 808 rotating rotatable input mechanism 804 causes computer system 800 to enter a mode in which astronomical object 806a can be displayed at a time other than the current time (e.g., a time in the past or the future). Accordingly, in response to detecting user input 808, computer system 800 displays the third portion of astronomical object 806a to provide a complete view of astronomical object 806a at the current time prior to displaying astronomical object 806a at a different time.

After (e.g., in response to) detecting further clockwise rotation of rotatable input mechanism 804, computer system 800 displays clock user interface 806 including a view of astronomical object 806a that is three hours ahead of the current time, as shown in FIG. 8F. Computer system 800 changes the time by an amount and in a direction (e.g., into the past or the future) based on the amount and/or direction of the user input. Accordingly, user input 808 rotates rotatable input mechanism 804 by an amount and in a direction that causes clock user interface 806 to be shown 3 hours into the future. Clock user interface 806 updates astronomical object 806a to reflect how astronomical object 806a will look at the time 1:09 PM, while maintaining a view of astronomical object 806a that includes the current location of computer system 800.

Further, in addition to updating the appearance of astronomical object 806a, computer system 800 ceases to display digital indication of time 806b and selectable user interface element 806c, and displays updated time 806h and offset 806i, which both indicate that clock user interface 806 is displaying the Earth three hours into the future.

Updating astronomical object 806a includes displaying astronomical object 806a with updated clouds 806d. Updated clouds 806d are determined based on predicted weather patterns including the predicted weather patterns in the current location of computer system 800. As user input 808 is detected, astronomical object 806a is updated in increments and clouds 806d are updated accordingly. Thus, as rotatable input mechanism 804 is rotated, clouds 806d appear to move as they are predicted to move over the next three hours. Similarly, the amount or area of astronomical object 806a that is covered by sunlight is updated to indicate that the Earth rotates as time passes, and thus different portions of the Earth are covered by sunlight at different times of day.

In some embodiments, rather than displaying updated clouds 806d, computer system 800 ceases to display clouds 806d in clock user interface 806. In some embodiments, rather than displaying or attempting to display realistic clouds based on future weather information, computer system 800 updates astronomical object 806a to include generic cloud cover that is not indicative of the current weather or future weather of the current location of computer system 800.

In some embodiments, the difference between the current time and the time displayed when updating astronomical object 806a is proportional to the rotation of user input 808. Thus, in order to increase the time by 3 hours from the current time as shown in FIG. 8F, a certain amount of rotation must be applied with user input 808, while in order to increase the time 6 hours from the current time, twice as much rotation is applied with user input 808.

After detecting further clockwise rotation of rotatable input mechanism 804, computer system 800 displays clock user interface 806 including a view of astronomical object 806a that is six hours ahead of the current time, as shown in FIG. 8G. As discussed above with respect to FIG. 8F, astronomical object 806a is updated to reflect the time of day displayed (e.g., 4:09 PM), and thus clouds 806d and the amount of astronomical object 806a covered in sunlight are updated to reflect the conditions that are expected to occur at 4:09 PM. Further, updated time 806h and offset 806i are both updated to reflect the time shown of 4:09 PM.

After (e.g., in response to) detecting counterclockwise rotation of rotatable input mechanism 804, computer system 800 displays clock user interface 806, including a view of astronomical object 806a that is 2 hours behind the current time, as shown in FIG. 8H. As discussed above with respect to FIG. 8F, the amount of time change between the previously displayed time (e.g., 4:09 PM) and the display time in FIG. 8H (e.g., 8:09 AM) is proportional to the amount of rotation applied with user input 808. Additionally, astronomical object 806a is updated to reflect the time of day displayed. However, unlike when astronomical object 806a is updated to show a time in the future and predicted cloud and weather patterns are used to display clouds 806d, when a time in the past is shown, the cloud and weather patterns at that earlier time are used to display clouds 806d. Similarly, the amount of sunlight (or cloud cover) at the current location of computer system 800 at the displayed time is also used to update astronomical object 806a. Further, updated time 806h and offset 806i are both updated to reflect the time shown of 8:09 AM.

In some embodiments, after detecting a predetermined event, computer system 800 displays clock user interface 806 including a first portion of astronomical object 806f (e.g., the moon), digital indication of time 806b, selectable user interface element 806c, and star field 806j, as shown in FIG. 8I. In some embodiments, astronomical object 806f is selected from a list of possible astronomical objects. In some embodiments, the predetermined event is a user input such as a tap gesture, a press, a swipe, a wrist raise, and/or a rotation of rotatable input mechanism 804.

In some embodiments, astronomical object 806f (or another astronomical object as discussed further below) is selected by a user in selection interface 810 displayed in FIG. 8T. In some embodiments, the user selects an astronomical object to display by tapping, pressing, swiping, and/or otherwise interacting with the smaller version of the astronomical object displayed in selection interface 810. For example, computer system 800 select astronomical object 806f when a tap gesture is detected on the smaller representation of astronomical object 806f. Accordingly, the predetermined event can include detecting selection of a different astronomical object to be displayed in clock user interface 806.

In some embodiments, astronomical object 806f and/or the portion of astronomical object 806f that is displayed is randomly or pseudo-randomly selected. For example, computer system 800 can randomly select to display the moon, select a portion of the moon from available portions of the moon, and update clock user interface 806 with the selected portion in response to detecting the predetermined event. In some embodiments, the selection of the astronomical object can be restricted to a specific (e.g., one) astronomical object, and thus computer system 800 selects portions of the selected astronomical object. In some embodiments, the astronomical object can be selected from a set of two or more available astronomical objects including the Earth, the moon, and an orrery, as discussed further below.

The first portion of astronomical object 806f is covered by a portion of digital indication of time 806b creating a depth effect between astronomical object 806f and digital indication of time 806b in clock user interface 806. Astronomical object 806f further includes a realistic view of the moon based on the current phase of the moon and the position of the moon in relation to the Earth. Accordingly, the shadows displayed as part of astronomical object 806f are based on the current moon phase.

Star field 806j optionally includes a realistic representation of the night sky as it would be seen from the current location of computer system 800. Accordingly, star field 806j will change as the location of computer system 800 changes and will be updated to reflect the current location.

After (e.g., in response to) detecting a predetermined event (e.g., the same predetermined event discussed above or a different predetermined event) such as a user input, computer system 800 displays clock user interface 806, which includes a second portion of astronomical object 806f, as shown in FIG. 8J. The second portion of astronomical object 806f covers a different portion of digital indication of time 806b creating a different depth effect than the depth effect shown in FIG. 8I. However, like the first portion of astronomical object 806f, the second portion of astronomical object 806f is based on the current moon phase and thus includes a realistic representation of the moon. In some embodiments, computer system 800 displays current solar date 806l and current moon phase 806m.

After (e.g., in response to) detecting user input 808 rotating rotatable input mechanism 804, computer system 800 displays clock user interface 806 including a third portion of astronomical object 806f, as shown in FIG. 8K. User input 808 rotating rotatable input mechanism 804 causes computer system 800 to enter a mode in which astronomical object 806f can be displayed at a time other than the current time (e.g., a time in the past and/or the future). When user input 808 is detected, computer system 800 displays the third portion of astronomical object 806f to provide a field of view including the entire astronomical object 806f at the current time, prior to displaying astronomical object 806f at a different time.

In FIG. 8K, computer system 800 displays current lunar date 806k, current moon phase 806m, and current solar date 806l to demonstrate the relationship between the lunar date, the solar date, and the current moon phase. Similarly to the first and second portions of astronomical object 806f, the third portion of astronomical object 806f is based on the current moon phase and thus includes a realistic representation of the portion of astronomical object 806f that is not covered in sunlight.

In FIG. 8K, computer system 800 displays a different representation of star field 806j compared to FIG. 8J. In particular, star field 806j is updated to reflect a view of a star field when viewing a field of view that includes the entire moon from the current location of computer system 800. Thus, star field 806j is updated to reflect the currently displayed portion of astronomical object 806f, while still using the current location of computer system 800 as a point of reference.

After (e.g., in response to) detecting user input 808 rotating rotatable input mechanism 804 in a clockwise direction, computer system 800 updates clock user interface 806 to show astronomical object 806f at a number of days in the future that is proportional to the amount of rotation provided with user input 808, as shown in FIG. 8L. Accordingly, computer system 800 updates clock user interface 806 to show the updated solar date and lunar date that is three days in the future from the current day. Computer system 800 further updates clock user interface 806 to include astronomical object 806f as it will appear three days in the future. Astronomical object 806f is displayed with the moon phase waxing crescent, which corresponds to the selected date. In FIG. 8L, computer system 800 displays moon phase 806*m* which includes the moon phase three days in the future.

After (e.g., in response to) detecting user input 808 further rotating rotatable input mechanism 804 in a clockwise direction, computer system 800 updates clock user interface 806 to show astronomical object 806*f* at a number of days in the future that is proportional to the amount of rotation provided with user input 808, as shown in FIG. 8M. Accordingly, computer system 800 updates clock user interface 806 to show the updated solar date and lunar date that is six days in the future from the current day. Computer system 800 further updates clock user interface 806 to include astronomical object 806*f* as it will appear six days in the future. Astronomical object 806*f* is displayed with the moon phase waxing gibbous, which corresponds to the selected date. Moon phase 806*m* is further updated to "waxing gibbous" which is the moon phase that occurs six days in the future from the current day.

After (e.g., in response to) detecting user input 808 rotating rotatable input mechanism 804 in a counter-clockwise direction, computer system 800 updates clock user interface 806 to show astronomical object 806*f* at a number of days in the past that is proportional to the amount of rotation provided with user input 808, as shown in FIG. 8N. Accordingly, computer system 800 updates clock user interface 806 to show the updated solar date and lunar date that is four days prior to the current day. Computer system 800 further updates clock user interface 806 to include astronomical object 806*f* as it appeared four days in the past. Astronomical object 806*f* is displayed with the moon phase waning crescent, which corresponds to the selected date. Moon phase 806*m* is further updated to "waning crescent" which is the moon phase that occurs four days prior to the current day.

After (e.g., in response to) detecting a predetermined event (e.g., the same predetermined event discussed above or a different predetermined event), computer system 800 displays clock user interface 806 including astronomical object 806*g*, as shown in FIG. 8O. Astronomical object 806*g* is a representation of the solar system (e.g., an orrery), and more specifically a representation of a portion of the solar system including Earth. The first portion of astronomical object 806*g* shown in FIG. 8O includes Mercury, Venus, Earth, and Mars. As discussed further below, different views and/or portions of the solar system can be shown when astronomical object 806*g* is selected and/or chosen for display in clock user interface 806. Clock user interface includes digital indication of time 806*b* and selectable user interface element 806*c* displayed over (e.g., on top of) astronomical object 806*g*, creating a depth effect between digital indication of time 806*b*, selectable user interface element 806, and astronomical object 806*g*.

After (e.g., in response to) detecting a predetermined event (e.g., the same predetermined event discussed above or a different predetermined event), computer system 800 displays a second portion or view of astronomical object 806*g*, as shown in FIG. 8P. The second portion of astronomical object 806*g* shows a different set of planets than the planets shown in the first portion of astronomical object 806*g* including Earth, Mars, Jupiter, and the asteroid belt. Thus, after the predetermined event, a different set of planets from the solar system is displayed in clock user interface 806.

After (e.g., in response to) detecting user input 808 rotating rotatable input mechanism 804, computer system 800 displays clock user interface 806 including a third portion of astronomical object 806*g*, as shown in FIG. 8Q. User input 808 rotating rotatable input mechanism 804 causes computer system 800 to enter a mode in which astronomical object 806*g* can be displayed at a time other than the current time (e.g., a time in the past and/or the future). Accordingly, in response to detecting user input 808, computer system 800 displays the third portion of astronomical object 806*g* to provide a field of view including the entire astronomical object 806*g* at the current time prior to displaying astronomical object 806*f* at a different time.

The third portion of astronomical object 806*g* includes the full view of the solar system including all eight planets and the sun arranged as they would appear in an orrery or other representation of the solar system. In some embodiments, the third portion of astronomical object 806*g* reflects the current layout of the solar system on the current date such that the planets of astronomical object 806*g* are arranged in their orbits around the sun as they are on the current date.

After (e.g., in response to) detecting user input 808 further rotating rotatable input mechanism 804 in a clockwise direction, computer system 800 updates clock user interface 806 to show astronomical object 806*g* at a number of months in the future that is proportional to the amount of rotation provided with user input 808, as shown in FIG. 8R. Accordingly, computer system 800 updates the position of the planets in astronomical object 806*g* to correlate to the selected month of October. Further, clock user interface 806 displays offset 806*i* between the current date and the displayed date.

After (e.g., in response to) detecting user input 808 rotating rotatable input mechanism 804 in a counter-clockwise direction, computer system 800 updates clock user interface 806 to show astronomical object 806*g* at a number of days in the past that is proportional to the amount of rotation provided with user input 808, as shown in FIG. 8S. Accordingly, computer system 800 updates the position of the planets in astronomical object 806*g* to correlate to the selected month of December. Further, clock user interface 806 displays offset 806*i* between the current date and the displayed date.

As discussed above, in some embodiments, the astronomical object that is displayed is selected by a user. FIG. 8T illustrates an example of a user interface in which a user can select the astronomical object to be displayed. In FIG. 8T, computer system 800 displays selection interface 810 and detects user input 812 indicating selection of astronomical object 806*g*. In response to detecting user input 812 indication selection of astronomical object 806*g*, computer system displays clock user interface 806 including a view or portion of astronomical object 806*g*.

In some embodiments, the astronomical object (e.g., astronomical object 806*a*, astronomical object 806*f*, and/or astronomical object 806*g*) can change after detection of a predetermined event. For example, when displaying the first view of astronomical object 806*a* as shown in FIG. 8A, computer system 800 detects a predetermined condition and displays the second view of astronomical object 806*f* as shown in FIG. 8J. In some embodiments, whether the astronomical object changes in response to detecting a predetermined event is based on selection of a setting. Thus, when a setting for changing the astronomical object in response to detection to a predetermined event is selected, then the astronomical object can change as discussed above. In contrast, when the setting for changing the astronomical object in response to detection to a predetermined event is not selected, then a different view of the currently selected astronomical object is displayed, rather than a different astronomical object. For example, when the setting for changing the astronomical object in response to detection to a predetermined event is not selected, then computer system 800 will transition from displaying the first view of astronomical object 806*a* as shown in FIG. 8A to displaying another view of astronomical object 806*a* such as the fourth view of astronomical object 806*a*, as displayed in FIG. 8D.

FIG. 9 is a flow diagram illustrating a method for displaying a current time while displaying an astronomical object using a computer system (e.g., 800) in accordance with some embodiments. Method 900 is performed at a computer system 800 (e.g., a smartwatch, a wearable electronic device, a smartphone, a desktop computer, a laptop, or a tablet) that is in communication with a display generation component (e.g., 802) (e.g., a display controller and/or a touch-sensitive display system). In some embodiments, the computer system is in communication with one or more input devices (e.g., a button, a rotatable input mechanism, a speaker, a camera, a motion detector (e.g., an accelerometer and/or gyroscope), and/or a touch-sensitive surface). In some embodiments, the rotatable input mechanism is located on a surface of the computer system that is perpendicular to a surface of the display generation component. In some embodiments, the rotatable mechanism is located to the right or left of the display generation component (e.g., the display generation component is on a front side of the computer system and the rotatable input mechanism is on a right side or a left side of the computer system). In some embodiments, the rotatable mechanism rotates clockwise and counterclockwise. In some embodiments, the rotatable mechanism is rotatable around an axis that is perpendicular to a direction normal to a surface of the display generation component (e.g., the movement of the rotatable mechanism is in a plane that is not parallel to the surface of the display generation component). Some operations in method 900 are, optionally, combined, the orders of some operations are, optionally, changed, and some operations are, optionally omitted.

As described below, method 900 provides an intuitive way for displaying a current time while displaying an astronomical object. The method reduces the cognitive burden on a user for viewing a current time while displaying an astronomical object, thereby creating a more efficient human-machine interface. For battery-operated computing devices, enabling a user to view a current time while displaying an astronomical object faster and more efficiently conserves power and increases the time between battery charges.

In method 900, the computer system (e.g., 800) displays (902), via the display generation component (e.g., 802), a clock user interface (e.g., 806) (e.g., a watch face user interface, a user interface that includes an indication of time (e.g., an analog and/or digital indication of time) (e.g., 806*b*)), including concurrently displaying (e.g., in the user interface and/or concurrently with an indication of time): a first portion (904) of (e.g., a first portion of a representation or a first portion of an image of) an astronomical object (e.g., 806*a*, 806*f*, or 806*g*) (e.g., the earth, the moon, the sun, a planet, an asteroid, a star, and/or an orrery (e.g., 806*a*, 806*f*, or 806*g*)); and a selectable user interface element (906) (e.g., 806*c*) (e.g., a complication). In some embodiments, the clock user interface is displayed on a wearable electronic device. In some embodiments, the clock user interface is displayed on a smartphone. In some embodiments, the clock user interface is displayed on a tablet. In some embodiments, displaying the first portion of the astronomical object includes displaying a first view, visual crop, and/or perspective of the astronomical object (e.g., a view of the astronomical object in a first orientation). In some embodiments, the user interface element is associated with an application. In some embodiments, a complication refers to any clock face feature other than those used to indicate the hours and minutes of a time (e.g., clock hands or hour/minute indications). In some embodiments, complications provide data obtained from an application. In some embodiments, a complication includes an affordance that when selected launches a corresponding application. In some embodiments, a complication is displayed at a fixed, predefined location on the display.

The computer system (e.g., 800) detects an occurrence of a predetermined event (908) (e.g., a set of one or more inputs, a raise or rotation gesture, a raise or rotation gesture that follows the device being in a low power display state (e.g., due to a request to transition the device to the low power display state and/or a respective period of time elapsing without receiving user input (e.g., 808)), a set of one or more touch gestures (e.g., on a touch-sensitive surface), a voice command, a button press, and/or a rotation (e.g., 808) of a rotatable input mechanism (e.g., 804)). In response to (or optionally after) detecting the occurrence of the predetermined event (910), the computer system displays, via the display generation component (e.g., 802), the clock user interface (e.g., 806). Displaying the clock user interface includes concurrently displaying (e.g., in the user interface and/or concurrently with an indication of time): a second portion of an astronomical object (912) (e.g., 806*a*, 806*f*, or 806*g*) (and optionally without displaying the first portion of the astronomical object) that is different from the first portion of the astronomical object (e.g., different crops, different angles, different views different perspectives of the same location on the astronomical object, different locations of the astronomical object on the display or relative to an indication of time and/or date, different locations relative to the selectable user interface element (e.g., 806*c*)); and the selectable user interface element (914). In some embodiments, displaying the second portion of the astronomical object includes displaying a second view, visual crop, and/or perspective of the astronomical object (e.g., a view of the astronomical object in a second orientation. Displaying a second portion of an astronomical object in response to detecting an occurrence of the predetermined event provides the user with a visual indication that the predetermined event has occurred and provides variation in the user interface without requiring the user to manually edit the user interface (e.g., without requiring the user to navigate to an editing user interface), thereby providing improved visual feedback and reducing the number of inputs needed to perform an operation.

In some embodiments, the first portion and/or second portion of the astronomical object (e.g., 806*a*, 806*f*, or 806*g*) is predetermined (e.g., the same side of the moon and/or the same view of orrery is displayed). In some embodiments, the first portion and/or second portion of the astronomical object is based on a current location of the computer system (e.g., 800) (e.g., the orientation of the Earth is based on where the computer system is located). In some embodiments, the clock user interface (e.g., 806) includes an indication of the current time (e.g., before and/or after detecting the occurrence of the predetermined event). In some embodiments, the indication of the current time is a digital clock representing the current time. In some embodiments, the first portion and/or second portion of the astronomical object is selected from a set of portions (e.g., one of eight different crops). In some embodiments, the first portion and/or second portion of the astronomical object is selected pseudo-randomly (e.g., the portions will not repeat but otherwise are not deliberately chosen). In some embodiments, the selectable user interface element (e.g., 806*c*) is a complication. In some embodiments, the complication is removed in response to user input (e.g., 808) (e.g., via an editing mode for the clock user interface). In some embodiments, the astronomical object has a depth effect with respect to the selectable user interface element. In some embodiments, the astronomical object is displayed behind the selectable user interface element. In some embodiments, the astronomical object is displayed on top of the selectable user interface element. In some embodiments, the astronomical object partially overlaps the selectable user interface element. In some embodiments, the selectable user interface element partially overlaps the astronomical object. In some embodiments, the first portion of the astronomical object includes the second portion of the astronomical object. In some embodiments, the first portion of the astronomical object includes a portion of the second portion of the astronomical object (e.g., the first portion and the second portion share a portion). In some embodiments, the second portion of the astronomical object includes the first portion of the astronomical object. In some embodiments, display of the selectable user interface element is maintained when displaying the second portion of the astronomical object (e.g., when changing from displaying the first portion of the astronomical object to displaying the second portion of the astronomical object). In some embodiments, display of an indication of time is maintained when displaying the second portion of the astronomical object (e.g., when changing from displaying the first portion of the astronomical object to displaying the second portion of the astronomical object).

In some embodiments, an appearance of the astronomical object (e.g., 806*a*, 806*f*, or 806*g*) indicates a current time and/or date (e.g., with 806*b* and/or 806*c*). The appearance of the astronomical object indicating the current time and/or date provides the user with an accurate representation of the astronomical object and an indication of the current time and/or date (e.g., other than a traditional digital or analog representation of time and/or date), which provides improved visual feedback. In some embodiments, the appearance of the astronomical object indicates the current time by being displayed as the astronomical object would appear at the current time of day (e.g., after sunset at the location of the computer system (e.g., 800) on the earth, the location of the computer system is displayed in shadow, and during daylight hours at the location of the computer system on the earth, the location of the computer system is shown in light). In some embodiments, the appearance of the earth indicates the current time of day by showing the current location of the terminator (e.g., the line that separates day and night). In some embodiments, lights of cities on earth are displayed when the sun has set on those cities. In some embodiments, the appearance of an orrery indicates the current time and/or date by showing the current position of the planets in relation to the sun as the planets would appears on at the current time and/or date. In some embodiments, the appearance of the moon indicates the current day by being displayed with the current lunar phase. In some embodiments, the appearance of stars indicate the current time and/or date by being displayed in as the stars would be seen relative to the earth's current position.

In some embodiments, the astronomical object is the Earth (e.g., 806*a*), the moon (e.g., 806*f*) (e.g., the Earth's moon), or an orrery (e.g., 806*g*) (e.g., a representation of the solar system).

In some embodiments, the first portion of an astronomical object is a portion of a first astronomical object (e.g., 806*a*, 806*f*, or 806*g*) (e.g., of a set of astronomical objects) and the second portion of an astronomical object is a portion of a second astronomical object (e.g., 806*a*, 806*f*, or 806*g*) (e.g., of the set of astronomical objects) that is different from the first astronomical object. Displaying a different astronomical object in response to detecting an occurrence of the predetermined event provides the user with a visual indication that the predetermined event has occurred and provides variation in the user interface without requiring the user to manually edit the user interface (e.g., without requiring the user to navigate to an editing user interface), thereby providing improved visual feedback and reducing the number of inputs needed to perform an operation. In some embodiments, the user can select the earth, moon, or orrery to be displayed randomly in response to detecting the occurrence of the predetermined event.

In some embodiments, while displaying, via the display generation component (e.g., 802), the clock user interface (e.g., 806) including an astronomical object at a first zoom level (e.g., 806*a* as illustrated in FIG. 8A, 8B, or 8D, 806*f* as illustrated in FIG. 8I or 8J, 806*g* as illustrated in FIG. 8O or 8P) (e.g., while displaying the first portion of an astronomical object or the second portion of an astronomical object), the computer system (e.g., 800) detects a first user input (e.g., 808) (e.g., a rotation of a rotatable input mechanism, a tap gesture, and/or a swipe gesture). In response to detecting the first user input, the computer system displays, via the display generation component (e.g., 802), the astronomical object at a second zoom level (e.g., 806*a* as illustrated in FIG. 8E, 806*f* as illustrated in FIG. 8K, 806*g* as illustrated in FIG. 8Q), different from the first zoom level, and with an appearance of the astronomical object at a current time (e.g., a predetermined amount of the astronomical object and/or the entire astronomical object is displayed); in some embodiments, displaying the first amount of the astronomical object includes zooming out to display the entire astronomical object that is displayed at the time of detecting the first user input. While displaying, via the display generation component, the astronomical object at the second zoom level, the computer system detects a second user input (e.g., 808) (e.g., a rotation of a rotatable input mechanism (e.g., 804), a tap gesture, a swipe gesture, a continuation of the first user input, and/or a second portion of the first user input, such as continued or further rotation of a rotatable input mechanism; in some embodiments the second user input is a continuation of the first user input (e.g., additional rotation of the rotatable input mechanism)). In response to detecting the second user input, the computer system displays, via the display generation component, an indication of a respective time and/or date other than a current time and/or date (e.g., 806*h*) (e.g., the noncurrent time is a time in the future or a time in the past; in some embodiments the user input is turning the rotatable input mechanism and the direction of the user input turning the crown determines whether a future or past date is displayed); in some embodiments, the computer system displays an offset from the current time (e.g., 806*i*) (e.g., +3 hours or −2 hours; e.g., +5 days or −6 days; e.g., +7 years; e.g., −10 years) instead of, or concurrently with the indication of the noncurrent time); and displays, via the display generation component, the astronomical object at the second zoom level with an appearance of the astronomical object at the respective time and/or date (e.g., 806*a* as illustrated in FIG. 8F, 8G, or 8H; 806*f* as illustrated in FIG. 8K, 8L, 8M, or 8N; or 806*g* as illustrated in FIG. 8R) (e.g., the astronomical object is displayed as the astronomical would appear on the future/past date and/or time. Displaying the astronomical object at a second zoom level with an appearance of the astronomical object at a current time in response to detecting a first user input indicates that the user interface is in a state in which the user can interact with and/or edit the user interface via further input, which proves improved visual feedback. Displaying an indication of a respective time and/or date other than a current time and/or date and the astronomical object at the second zoom level with an appearance of the astronomical object at the respective time and/or date in response to the second input provides the user with an efficient way to view additional information related to the astronomical object and reduces the number of inputs required to access the information, thereby providing improved visual feedback and reducing the number of inputs needed to perform an operation.

In some embodiments the earth (e.g., 806*a*) is displayed with the terminator in the location as the terminator would be at the future/past date and/or time, and the stars are displayed as the stars would appear in relation to the earth's location and position on the future/past date and/or time. In some embodiments the moon (e.g., 806*f*) is displayed in the lunar phase (e.g., 806*m*) that corresponds to the past/future date. In some embodiments the representation of the orrery (e.g., 806*g*) is displayed with the planets in the positions that the planets would occupy on the past/future date.). In some embodiments the computer system (e.g., 800) displays a zoomed out view of the object at the current time in response to detecting a tap or rotation input, and then, in response to a rotation of the rotatable input mechanism while displaying the zoomed out view of the object (e.g., within a predetermined amount of time after the first user input (e.g., 808)), displays a time and/or date other than a current time and/or date and changes the appearance of the astronomical object to reflect the noncurrent time; in some embodiments detecting input above a threshold changes the zoom of the astronomical object and displays the astronomical object as it would appear on a future or past date/time (e.g., depending on the direction and/or magnitude of the input).

In some embodiments, in response to detecting the first user input (e.g., 808) (or the second user input), the computer system (e.g., 800) displays (e.g., concurrently displaying with the astronomical object at the second zoom level), via the display generation component (e.g., 802), an indication of a calendar date in a first calendar system that divides a year with a first set of subdivisions (e.g., 806*l*) (e.g., a date according to a solar or Gregorian calendar) and an indication of a calendar date in a second calendar system that divides a year with a second set of subdivision that is different from the first set of subdivisions (e.g., 806*k*) (e.g., a date according to a lunar calendar; the lunar date corresponds to the same date as the displayed solar date). Displaying an indication of a calendar date in a first calendar system that divides a year with a first set of subdivisions and an indication of a calendar date in a second calendar system that divides a year with a second set of subdivision that is different from the first set of subdivisions in response to detecting the first input provides the user with an efficient way to view additional information related to the astronomical object and reduces the number of inputs required to access the information, thereby providing improved visual feedback and reducing the number of inputs needed to perform an operation.

In some embodiments, the calendar date of the first calendar system corresponds to the calendar date of the second calendar system. In some embodiments the indication of a solar date and the indication of the lunar date are displayed in accordance with a determination that the astronomical object is the moon. In some embodiments the solar date and the lunar date correspond to the current date. In some embodiments, in response to detecting the second user input (e.g., 808), the solar date and lunar date correspond to the respective time and/or date other than a current time and/or date. In some embodiments, the computer system (e.g., 800) changes the displayed indication of the solar data and indication of the lunar date as it detects user input (e.g., as device detects rotation of the rotatable input mechanism, the device updates the displayed indication of the solar data and indication of the lunar date). In some embodiments rotation of the rotatable input mechanism in a first direction moves the displayed dates forward in time. In some embodiments rotation of the rotatable input direction in a second direction moves the displayed dates backward in time). In some embodiments the user input is a rotation of the rotatable input mechanism and the direction of the rotation determines whether a future or past date is displayed. In some embodiments, the computer system displays an offset from the current time (e.g., 806*i*) (e.g., +3 hours or −2 hours) instead of, or concurrently with, the indication of the noncurrent time.

In some embodiments, in response to detecting the first user input (e.g., 808) (or the second user input), the computer system (e.g., 800) displays (e.g., concurrently with the indication of the solar date and/or the indication of the lunar date), via the display generation component (e.g., 802), a representation of a lunar phase (e.g., 806*m*), wherein the lunar phase corresponds to the indication the current date (e.g., 806*c* or 806*l*) or the indication of a respective time and/or date other than a current time and/or date (e.g., 806*h*) (e.g., display the lunar phase that aligns with the displayed date). Displaying a representation of a lunar phase in response to detecting the first input provides the user with an efficient way to view additional information related to the astronomical object and reduces the number of inputs required to access the information, thereby providing improved visual feedback and reducing the number of inputs needed to perform an operation.

In some embodiments, the representation of the lunar phase is displayed in accordance with a determination that the astronomical object is the moon. In some embodiments, the representation of the lunar phase corresponds to the displayed solar and lunar date). In some embodiments, in response to detecting the second user input (e.g., 808), the lunar phase corresponds to the noncurrent date (e.g., the displayed solar and lunar date). In some embodiments, the computer system (e.g., 800) changes the displayed representation of the lunar phase as it detects user input (e.g., as device detects rotation of the rotatable input mechanism, the device updates the displayed representation of the lunar phase. In some embodiments rotation of the rotatable input mechanism in a first direction moves the displayed dates forward in time. In some embodiments rotation of the rotatable input direction in a second direction moves the displayed dates backward in time). In some embodiments the user input is a rotation the rotatable input mechanism and the direction of the rotation determines whether a future or past date is displayed. In some embodiments, the computer system displays an offset from the current time (e.g., 806*i*) (e.g., +3 hours or −2 hours) instead of or concurrently with the indication of the noncurrent time In some embodiments, while displaying, via the display generation component (e.g., 802), the astronomical object (e.g., 806*a*, 806*f*, or 806*g*) at the first zoom level (e.g., before detecting the first user input (e.g., 808)), the computer system (e.g., 800) displays a first representation of stars (e.g., 806j as illustrated in FIGS. 8A, 8B, and 8D) (e.g., the stars are concurrently displayed with the astronomical object, select user element, and solar/lunar date information; e.g., the first representation of stars displays the stars as they would be seen when viewing a portion of the earth (e.g., viewing the earth from an angel so that only a portion of the earth is displayed) when viewing the current location of the computer system on the earth on the current date or noncurrent date; e.g., the representation of stars is displayed as they would be seen when viewing the a portion of the moon). While displaying, via the display generation component, the astronomical object at the second zoom level (e.g., in response to detecting the first user input), the computer system displays a second representation of stars (e.g., 806j) that is different from the first representation of stars (e.g., the second representation of stars displays the stars as they would be seen when viewing the whole side of the earth when viewing the current location of the computer system on the earth on the current date or noncurrent date; e.g., the representation of stars is displayed as they would be seen when viewing the whole moon (e.g., not just a portion) from current location of the computer system). Displaying a first representation of stars while displaying the astronomical object at the first zoom level and displaying a second representation of stars while displaying the astronomical at the second zoom level provides the user with visual feedback that the user interface has responded to user input (e.g., the first user input), and thereby provides improved visual feedback. Displaying a first representation of stars while displaying the astronomical object at the first zoom level and displaying a second representation of stars while displaying the astronomical at the second zoom level also provides the user with an efficient way to view additional information related to the astronomical object and reduces the number of inputs required to access the information, thereby providing improved visual feedback and reducing the number of inputs needed to perform an operation. In some embodiments the appearance of the representation of stars changes in response to detecting the second user input and correspond to the displayed current or noncurrent date.

In some embodiments, while displaying, via the display generation component (e.g., 802), the astronomical object (e.g., 806a) (e.g., the earth) at the second zoom level, the computer system (e.g., 800) displays, via the display generation component, a first representation of clouds (e.g., 806d as illustrated in FIGS. 8A, 8B, 8C, 8D, and 8E) based on weather data corresponding to a time represented by the astronomical object. In some embodiments the size, shape, and/or position of the clouds are based on real time weather data. Displaying a first representation of clouds provides the user with an efficient way to view additional information (e.g., weather data) related to the astronomical object and reduces the number of inputs required to access the information, thereby providing improved visual feedback and reducing the number of inputs needed to perform an operation. In some embodiments displaying the representation of clouds includes displaying clouds based on past/recorded weather information or future weather predictions; for a past time, the clouds are displayed in their position in the past based on recorded weather data; for a future time, the clouds are displayed in their predicted positions based on weather forecasts. In some embodiments future weather data is not available and generic clouds that are not based on weather data are displayed. In some embodiments the representation of clouds is displayed in accordance with a determination that the astronomical object is the Earth.

In some embodiments, in response to detecting the second user input (e.g., 808), the computer system (e.g., 800) displays, via the display generation component (e.g., 802), an animation of the first representation of the clouds (e.g., 806d) based on weather data corresponding to a time represented by the astronomical object (e.g., 806d as illustrated in FIGS. 8F, 8G, and 8H) (e.g., an animation of the clouds changing size, shape, and/or position). Displaying an animation of the first representation of the clouds also indicates that the user interface is in a state in which the user can interact with and/or edit the user interface via further input, which proves improved visual feedback.

In some embodiments, while displaying, via the display generation component (e.g., 802), the astronomical object (e.g., 806a) at the second zoom level, the computer system (e.g., 800) displays, via the display generation component, a second representation of clouds (e.g., 806d). In some embodiments the size, shape, and/or position of the clouds are based on real time weather data. In response to detecting the second user input (e.g., 808), the computer system ceases display of the second representation of clouds. Displaying a second representation of clouds provides the user with an efficient way to view additional information related to the astronomical object (e.g., weather data) and reduces the number of inputs required to access the information, thereby providing improved visual feedback and reducing the number of inputs needed to perform an operation. Ceasing display of the second representation of the clouds indicates that the device does not have access to weather data (e.g., current weather data and/or weather forecasts and/or recorded weather data), thereby providing improved visual feedback. In some embodiments the display of the representation of clouds ceases in accordance with a determination that noncurrent weather information is not available (e.g., noncurrent weather information may not be available because there is no connection to the internet and current weather information has not been saved).

In some embodiments, while displaying, via the display generation component (e.g., 802), the astronomical object (e.g., 806a) at the second zoom level, the computer system (e.g., 800) displays, via the display generation component, a third representation of clouds (e.g., 806d as illustrated in FIGS. 8A, 8B, 8C, 8D, and 8E) (in some embodiments the size, shape, and/or position of the clouds are based on real time weather data.). In response to detecting the second user input (e.g., 808), the computer system ceases display of the third representation of clouds and displays, via the display generation component, a fourth representation of clouds, wherein the fourth representation of clouds is not based on actual weather data (e.g., generic clouds; e.g., the fourth representation of clouds is not based on current or noncurrent (e.g., past or future) weather data). Displaying a third representation of clouds provides the user with an efficient way to view additional information related to the astronomical object (e.g., weather data) and reduces the number of inputs required to access the information, thereby providing improved visual feedback and reducing the number of inputs needed to perform an operation. Displaying a fourth representation of the clouds that is not based on actual weather data indicates that representation of the clouds is no longer based on actual weather data, while still providing a realistic appearance of the astronomical object, which proves improved visual feedback. In some embodiments, the size, shape, and/or position of the clouds are randomly generated. In some embodiments, the size, shape, and/or position of the clouds are predetermined).

In some embodiments, the predetermined event includes (e.g., is) a tap input (e.g., the tap input is detected on the display generation component (e.g., 802)). Displaying the second portion of an astronomical object in response to detecting a tap input provides the user with an easy way to manually adjust the user interface (e.g., to change the portion of an astronomical object that is displayed), which reduces the number of inputs required to perform an operation.

In some embodiments, the predetermined event includes (e.g., is) a wrist raise gesture (e.g., movement of at least a portion of the computer system (e.g., 800) that is determined to be indicative of a wrist raise gesture). Displaying the second portion of an astronomical object in response to detecting a wrist raise gesture provides the user with an easy way to manually adjust the user interface (e.g., to change the portion of an astronomical object that is displayed), which reduces the number of inputs required to perform an operation. In some embodiments, determination that the movement is indicative of the wrist raise gesture includes a determination that the computer system moves at least a threshold amount in a predetermined direction (e.g., is raised from a lowered position). In some embodiments, the predetermined event includes a wrist rotation gesture (e.g., movement of at least a portion of the computer system that is determined to be indicative of a wrist rotation gesture). In some embodiments, determination that the movement is indicative of the wrist raise gesture includes a determination that the computer system rotates at least a threshold amount in a predetermined direction. In some embodiments, determination that the movement is indicative of the wrist raise gesture includes a determination that the computer system moves at least a threshold amount in a predetermined direction and rotates at least a threshold amount in a predetermined direction.

In some embodiments, the computer system (e.g., 800) displaying, via the display generation component (e.g., 802), the first portion of an astronomical object (e.g., 806*a*) includes displaying, via the display generation component, the first portion of an astronomical object according to (e.g., based on) current weather data. Displaying the first portion of an astronomical object according to current weather data provides the user with an efficient way to view additional information related to the astronomical object (e.g., weather data) and reduces the number of inputs required to access the information, thereby providing improved visual feedback and reducing the number of inputs needed to perform an operation. In some embodiments the astronomical object is displayed with a representation of current weather data, such as a representation of current clouds based on real-time weather data (e.g., the clouds are displayed in their position based on current real-time weather data). In some embodiments displaying the second portion of an astronomical object includes displaying the second portion of an astronomical object according to (e.g., based on) current weather data.

In some embodiments, displaying, via the display generation component (e.g., 802), the first portion of an astronomical object (e.g., 806*a*) includes displaying, via the display generation component, the first portion of an astronomical object with one or more cloud shadows (e.g., clouds are displayed which cast a shadow on the astronomical object; in some embodiments clouds are displayed in their position based on current real-time weather data; in some embodiments clouds are displayed which are not based on current real-time weather data (e.g., the clouds are displayed in their position based on noncurrent weather data (e.g., past or future weather data)); in some embodiments the clouds displayed are generic and do not represent current or non-current weather data). Displaying the first portion of an astronomical object including one or more cloud shadows, further distinguishes a representation of clouds from the astronomical object and thereby provides the user with an efficient way to view additional information related to the astronomical object (e.g., weather data) and reduces the number of inputs required to access the information, thereby providing improved visual feedback and reducing the number of inputs needed to perform an operation.

In some embodiments, displaying, via the display generation component (e.g., 802), the astronomical object (e.g., 806*a*) includes a second representation of the stars (e.g., 806*j*), wherein the second representation of stars corresponds to a real time positions of stars (e.g., the representation of the stars displays the stars as they are seen when viewing the current location of the computer system on the earth; e.g., the representation of the stars displays the stars as they are seen when the moon from the current location of the computer system on the earth; e.g., the representation of stars displays the stars in relation to the representation of an orrery; in some embodiments the real time positions of stars are based on accurate star maps). Displaying the second representation of stars provides the user with an efficient way to view additional information related to the astronomical object and reduces the number of inputs required to access the information, thereby providing improved visual feedback and reducing the number of inputs needed to perform an operation.

In some embodiments, while displaying, via the display generation component (e.g., 802), the clock user interface (e.g., 806): the computer system (e.g., 800) concurrently displays an indication of time (e.g., 806*b*) (e.g., an indication of a current time and/or a clock face; in some embodiments the indication of the current time is displayed concurrently with the astronomical object; in some embodiments the indication of the current time is displayed concurrently with the selectable user interface element (e.g., 806*c*)); and a third portion of an astronomical object (e.g., 806*a*, 806*f*, or 806*g*) (e.g., the first portion of an astronomical object or the second portion of an astronomical object; in some embodiments, displaying the third portion of the astronomical object includes displaying a third view, visual crop, and/or perspective of the astronomical object (e.g., a view of the astronomical object in a third orientation)) that has a depth effect with respect to the indication of time (as illustrated in FIGS. 8A, 8B, 8C, 8I, 8J, 8O, 8P, 8Q, 8R, and 8S) (e.g., the astronomical object obscures at least a portion of the indication of time creating the appearance of perceived depth; e.g., the indication of time obscures at least a portion of the astronomical object creating the appearance of perceived depth). Displaying a third portion of an astronomical object that has a depth effect with respect to the indication of time emphasizes one object or the other, making it easier for the user to perceive the third portion of an astronomical or time indicator, which provides improved visual feedback.

In some embodiments, in response to (or optionally after) detecting the occurrence of the predetermined event, the computer system (e.g., 800) displays, via the display generation component (e.g., 802), the clock user interface (e.g., 806), including concurrently displaying: the indication of time (e.g., 806*b*) (e.g., an indication of a current time and/or a clock face; in some embodiments the indication of the current time is displayed concurrently with the astronomical object; in some embodiments the indication of the current time is displayed concurrently with the selectable user interface element (e.g., 806*c*)); and a fourth portion of an astronomical object (e.g., 806*a*, 806*f*, or 806*g*) that does not have the depth effect with respect to the indication of time (as illustrated in FIG. 8D) (e.g., the astronomical object does not obscure a portion of the indication of time and does not create the appearance of perceived depth; e.g., the indication of time does not obscure the astronomical object and does not create the appearance of perceived depth). Displaying a fourth portion of an astronomical object that does not have a depth effect with respect to the indication of time in response to detecting the occurrence of the predetermined event provides the user with an efficient way to view additional information and reduces the number of inputs required to access the information.

Note that details of the processes described above with respect to method 900 (e.g., FIG. 9) are also applicable in an analogous manner to the methods described below/above. For example, methods 700, 1100, 1300, 1500, 1700, and 1900 optionally includes one or more of the characteristics of the various methods described above with reference to method 900. For example, method 900 optionally includes one or more of the characteristics of the various methods described above with reference to method 700. For example, simulated light effect as described with reference to FIGS. 6A-6K can be optionally emitted from a representation of stars from as described with reference to FIGS. 8A-8T with reference to method 900. For another example, method 900 optionally includes one or more of the characteristics of the various methods described below with reference to method 1100. For example, the time indicator of method 900 optionally includes adjustable time indicators as described in method 1100. As another example, method 900 optionally includes one or more of the characteristics of the various methods described below with reference to method 1300. For example, clock user interface 806 of FIGS. 8A-8T with reference to method 900 optionally includes displaying a first calendar system and a second calendar system as described with reference to method 1300. For another example, method 900 optionally includes one or more of the characteristics of the various methods described below with reference to method 1500. For example, time indicator 806*b* of FIGS. 8A-8T with reference to method 900 can optionally include numbers that interact with each other as described in method 1500. For brevity, these details are not repeated below.

FIGS. 10A-10O illustrate example clock user interfaces that include adjustable time indications, according to various examples. The user interfaces in these figures are used to illustrate the processes described below, including the processes in FIG. 11.

FIG. 10A illustrates computer system 1000 (e.g., a smartwatch) with display 1002. Computer system 1000 includes rotatable and depressible input mechanism 1004. In some embodiments, computer system 1000 includes one or more features of device 100, device 300, and/or device 500. In some embodiments, computer system 1000 is a tablet, phone, laptop, desktop, and/or camera. In some embodiments, the inputs described below can be substituted for alternate inputs, such as a press input and/or a rotational input received via rotatable and depressible input mechanism 1004.

In FIG. 10A, computer system 1000 displays clock user interface 1006. In some embodiments, computer system 1000 displays clock user interface 1006 in response to detecting an input, such as a tap input, a wrist raise input, a press input received via rotatable and depressible input mechanism 1004, and/or a rotational input received via rotatable and depressible input mechanism 1004.

In some embodiments, clock user interface 1006 is displayed on a tablet, phone (e.g., a smartphone), laptop, and/or desktop. In some embodiments, clock user interface 1006 is displayed on a home screen, lock screen, and/or wake screen of a tablet, phone, laptop, and/or desktop.

Clock user interface 1006 includes numerals 1006*a*, hour hand 1006*b*, minute hand 1006*c*, seconds hand 1006*d*, dial 1006*e*, background 1006*f*, and complications 1006*g*. The time indications of clock user interface 1006, including numerals 1006*a*, hour hand 1006*b*, and minute hand 1006*c*, are displayed with a set of style options. The set of style options includes a height, width, size, thickness, length, and/or weight of numerals 1006*a* as well as a height, width, size thickness and/or length of hour hand 1006*b* and minute hand 1006*c*. In some embodiments, the set of style options is a predetermined set of style options that are applied without receiving any input from the user. For example, the set of style of options can be a default set of style options in a setting of computer system 1000. In some embodiments, the set of style options is the last set of style options displayed in response to one or more user inputs, as described further below.

In FIG. 10A, clock user interface 1006 shows a current time of 10:07 and 31 seconds. While updating the current time by, for example, rotating second hand 1006*d* around dial 1000*e*, computer system 1000 detects user input 1008 rotating rotatable input mechanism 1004 (which is, optionally, also depressible). In response to detecting user input 1008, computer system 1000 displays clock user interface 1006 and, in particular, numerals 1006*a*, hour hand 1006*b*, and minute hand 1006*c* with a second set of style options shown in FIG. 10B, which are different from the previous set of style options shown in FIG. 10A. In particular, as user input 1008 rotates rotatable input mechanism 1004 in a counterclockwise direction, the time indications of clock user interface 1006 are stretched and lengthen. Thus, numerals 1006*a* appear to grow longer (e.g., taller) and thinner while stretching towards the center of dial 1000*e*. Similarly, hour hand 1006*b* and minute hand 1006*c* become thinner, resulting in a width that is less than the width when displayed with the previous set of style options.

As the second set of style options is applied to the time indications, clock user interface 1006 continues to update to indicate the current time. Accordingly, computer system 1000 may update clock user interface 1006 in response to user input 1008 while continuing to provide the user with the current time and without interrupting the user's ability to use clock user interface 1006.

In some embodiments, user input 1008 rotates rotatable input mechanism 1004 in a clockwise direction, causing the time indications of clock user interface 1006 to be wider and shorter, as shown in FIG. 10E. User input 1008 rotating rotatable input mechanism 1004 can be received at any time while displaying clock user interface 1006 and can include any combination of clockwise and counter-clockwise rotations to cause the corresponding change in style settings to the time indications of clock user interface 1006 (including numerals 1006*a*, hour hand 1006*b*, and minute hand 1006*c*).

After applying the set of style options in response to user input 1008, the set of style options continues to be applied until another user input rotating rotatable input mechanism 1004 is detected. Accordingly, the change in style options is persistent until further change is detected by computer system 1000. In some embodiments, the set of style options applied to numerals 1006*a*, hour hand 1006*b*, and minute hand 1006*c* is based on a parameter of user input 1008 such as a speed, direction, duration, and/or magnitude. For example, when user input 1008 is a longer input (e.g., a rotation of a greater magnitude) in a counterclockwise direction, the set of style options applied to numerals 1006*a*, hour hand 1006*b*, and minute hand 1006*c* includes a greater amount of stretching. Thus, when user input 1008 is a longer input (e.g., a rotation of a greater magnitude) in a counterclockwise direction, numerals 1006*a* will appear to be much taller than before receiving user input 1008.

After (e.g., in response to) detecting a predetermined event, such as a predetermined amount of time (e.g., 10 second, 30 seconds, 1 minute, and/or 5 minutes) passing without the user interacting with clock user interface 1006, computer system 1000 starts to enter a low power state and/or a sleep state, as shown in FIG. 10C. As computer system 1000 starts to enter the low power state, clock user interface 1006 is displayed without seconds hand 1006*d* and portions of clock user interface 1006, such as complications 1000*g* are generalized to show less information. In this way, computer system 1000 conserves power and performs less processing while in the low power state. Further, to indicate to the user that computer system 1000 is entering the low power state, an animation including numerals 1006*a* rotating from a front view to a side view is displayed in clock user interface 1006, as shown in FIG. 10C.

Once computer system 1000 has finished entering the low power state, computer system 1000 displays clock user interface 1006, as shown in FIG. 10D. As discussed above, in the low power state various features of the clock user interface 1006 are changed to conserve power and indicate to the user that computer system 1000 is in a low power state. In particular, numerals 1006*a* have been rotated and are now displayed with a side view that illuminates less pixels of clock user interface 1006, and computer system 1000 has ceased display of seconds hand 1006*d*. Additionally, dial 1006*e*, background 1006*f*, and complications 1006*g* are displayed in a darker color and/or shade.

While in the low power state, computer system 1000 detects a user input such as user input 1008 rotating rotatable input mechanism 1004 in a clockwise direction. In some embodiments, the user input includes a tap, swipe gesture, wrist movement, and/or other movement of computer system 1000. After (e.g., in response to) detecting user input 1008, computer system 1000 exits the low power state and displays clock user interface 1006 as shown in FIG. 10E.

Clock user interface 1006 includes dial 1000*e*, background 1000*f*, and complications 1000*g* in a lighter and/or previously selected color and/or shade, instead of the darker color and/or shade of the low power state. Further, clock user interface 1006 is displayed with numerals 1006*a* in a front view so that the value of each numeral is visible. Clock user interface 1006 is also displayed with seconds hand 1006*d*. Additionally, because user input 1008 was a clockwise rotation of rotatable input mechanism 1004, numerals 1006*a* are displayed with a set of style options that cause numerals 1006*a* to become more compact (e.g., shorter) and wide in comparison to the set of style options applied to numerals 1006*a* in FIG. 10B. Similarly, hour hand 1006*b* and minute hand 1006*c* are displayed with a set of style options that cause hour hand 1006*b* and minute hand 1006*c* to appear wider in comparison to the set of style options applied to hour hand 1006*b* and minute hand 1006*c* in FIG. 10B.

In some embodiments, the set of style options is applied to numerals 1006*a* and not to hour hand 1006*b* or minute hand 1006*c*. In some embodiments, the set of style options is applied to hour hand 1006*b* and minute hand 1006*c* and not to numerals 1006*a*. In some embodiments, the set of style options is applied to either hour hand 1006*b* or minute hand 1006*c*, but not both.

After (e.g., in response to) detecting a predetermined event, such as a predetermined amount of time (e.g., 10 second, 30 seconds, 1 minute, and/or 5 minutes) passing without the user interacting with clock user interface 1006, computer system 1000 enters a low power state and displays user clock user interface 1006 as shown in FIG. 10F. When clock user interface 1006 is displayed in the low power state, clock user interface 1006 includes numerals 1006*a* shown from a side view, and the size of numerals 1006*a* in the low power state matches the size of numerals 1006*a* displayed when not in the low power state. In some embodiments, numerals 1006*a* are replaced with non-numeric indicators such as lines or tick marks.

While displaying clock user interface 1006 as shown in FIG. 10G, computer system 1000 detects user input 1010 on display 1002. User input 1010 can include a tap, a swipe gesture, and/or a press. After detecting user input 1010 on display 1002, computer system 1000 displays selection interface 1012, as shown in FIG. 10G.

Selection interface 1012 includes edit affordance 1014 and allows the user to select a clock user interface to be displayed by computer system 1000. For example, computer system 1000 can detect a swipe gesture in the left or right direction to change to a different clock user interface. Computer system 1000 can also detect a rotation of rotatable input mechanism 1004 to select a different clock user interface. While displaying selection interface 1012, computer system 1000 detects user input 1012*a* of a tap on edit affordance 1014 and displays editing interface 1016, as shown in FIG. 10I.

Editing interface 1016 displays various settings for clock user interface 1006, allowing the user to select different options for clock user interface 1006. In FIG. 10I, editing interface 1016 includes a currently selected color for background 1006*f* of light blue. While displaying the currently selected color, computer system 1000 detects user input 1008 rotating rotatable input mechanism 1004. In response to detecting user input 1008, editing interface 1016 changes the currently selected color for background 1006*f* from light blue to purple, as shown in FIG. 10J. In some embodiments, computer system 1000 detects a swipe input on display 1002 changing the selected color for background 1006*f*. For example, computer system 1000 can detect a downward swipe gesture to change the currently selected color for background 1006*f* from light blue to purple.

While displaying editing interface 1016 with the currently selected color for background 1000*f* of purple as shown in FIG. 10J, computer system 1000 detects swipe gesture 1018 from the right side to the left side of display 1002. In response to detecting swipe gesture 1018, editing interface 1016 shows a different editable property of clock user interface 1006. In particular, editing interface 1016 displays a currently selected color and/or style of dial 1006*e* of clock user interface 1006, as shown in FIG. 10K.

While displaying editing interface 1016 with the currently selected color for dial 1006*e* of red, computer system 1000 detects user input 1008 rotating rotatable input mechanism 1004 and changes the currently selected color for dial 1006*e* from red to olive green, as shown in FIG. 10L. While displaying editing interface 1016 with the currently selected color for dial 1000*e* of olive green as shown in FIG. 10L, computer system 1000 detects swipe gesture 1018 from the right side to the left side of display 1002. In response to detecting swipe gesture 1018, editing interface 1016 shows a different editable property of clock user interface 1006. In particular, editing interface 1016 displays a currently selected density of numerals 1006*a* of clock user interface 1006, as shown in FIG. 10M. In some embodiments, selection of the density of numerals 1006*a* changes which of numerals 1006*a* are displayed in clock user interface 1006 and which are replaced with lines.

While displaying editing interface 1016 with the currently selected density of numerals 1006*a* of "XII" (e.g., a numeral at all twelve hour positions), computer system 1000 detects user input 1008 rotating rotatable input mechanism 1004 and changes the currently selected density of numerals from XII (all) to VI (half or six), as shown in FIG. 10N. While displaying editing interface 1016 with the currently selected density of numerals as shown in FIG. 10N, computer system 1000 detects swipe gesture 1018 from the right side to the left side of display 1002. In response to detecting swipe gesture 1018, editing interface 1016 shows a different editable property of clock user interface 1006. In particular, editing interface 1016 displays currently selected complications 1006*g* of clock user interface 1006, as shown in FIG. 10O.

While displaying editing interface 1016, including currently selected complications 1006*g*, computer system 1000 detects user input 1008 rotating rotatable input mechanism 1004. In response to detecting user input 1008, computer system 1000 displays a different complication. In some embodiments, the different complication is associated with a different application. In some embodiments. In response to detecting user input 1008, computer system 1000 changes the color of complications 1006*g*. In some embodiments, computer system 1000 detects user input 1012*a* tapping complication 1006*h*. Once complication 1006*h* has been selected, computer system 1000 can change complication 1006*h* or a property of complication 1006*h* in response to detecting a user input such as user input 1008.

In some embodiments, editing interface 1016 includes preset options and combinations of settings. For example, editing interface 1016 can include a predetermined list of colors for background 1006*f* and/or dial 1006*e* as well as a predetermined list of combinations of colors for background 1006*f* and/or dial 1006*e*. Thus, in some embodiments, a user can independently select the color of background 1006*f* and the color of dial 1006*e*, while in other embodiments computer system 1000 provides preset color combinations (e.g., so that the color of dial 1006*e* and background 1006*f* cannot be the same color).

While displaying editing interface 1016, computer system 1000 detects a user input such as a press of rotatable and depressible input mechanism 1004 and exits editing interface 1016 to display clock user interface 1006 with the selected settings, as shown in FIG. 10P. While displaying updated clock user interface 1006, computer system 1000 detects user input 1008 rotating rotatable input mechanism 1004 and applies a set of style options to numerals 1006*a*, hour hand 1006*b*, and/or minute hand 1006*c* as discussed above.

FIG. 11 is a flow diagram illustrating a method for adjusting clock user interfaces including adjustable time indications using a computer system (e.g., 1000) in accordance with some embodiments. Method 1100 is performed at a computer system (e.g., 1000) (e.g., a smartwatch, a wearable electronic device, a smartphone, a desktop computer, a laptop, or a tablet) that is in communication with a display generation component (e.g., 1002) (e.g., a display controller and/or a touch-sensitive display system) and one or more input devices (e.g., 1004) (e.g., a button, a rotatable input mechanism, a speaker, a camera, a motion detector (e.g., an accelerometer and/or gyroscope), and/or a touch-sensitive surface). Some operations in method 1100 are, optionally, combined, the orders of some operations are, optionally, changed, and some operations are, optionally, omitted.

As described below, method 1100 provides an intuitive way for adjusting a clock user interface including adjustable time indications. The method reduces the cognitive burden on a user for adjusting a clock user interface including adjustable time indications, thereby creating a more efficient human-machine interface. For battery-operated computing devices, enabling a user to adjust a clock user interface including adjustable time indications faster and more efficiently conserves power and increases the time between battery charges.

In method 1100, computer system (e.g., 1000) displays (1102), via the display generation component (e.g., 1002), a clock user interface (e.g., 1006) (e.g., a watch face user interface and/or a user interface that includes an indication of time (e.g., an analog and/or digital indication of time)) that includes a time indication (e.g., 1006*a*, 1006*b*, 1006*c*, 1006*d*, or 1006*e*) (e.g., an aspect or element of an analog clock dial such as numeric hour and/or minute markers (e.g., 1, 3, 5, I, III, and/or V), a clock hand (e.g., an hour, minute, and/or second hand), and/or ticks representing hour and/or minute marks on an analog dial) having a first set of style options (e.g., a height, width, font, and/or color). In some embodiments, the time indication includes an aspect or element of a digital indication of time such as a numeral, punctuation (e.g., a colon), and/or text. While displaying the clock user interface in a mode in which an indication of time (e.g., an hour hand, minute hand, and/or seconds hand and/or a digital indication of time) on the clock user interface is updated to reflect a current time (1104) (e.g., while maintaining display of the clock user interface and/or the indication of time, without entering and/or displaying an editing user interface different from the clock user interface, and/or without displaying a menu and/or selectable options for editing and/or changing the time indication), the computer system detects (1106), via the one or more input devices, a set of one or more inputs (e.g., 1008, 1010) (e.g., a rotation of a rotatable input mechanism and/or a touch input). In some embodiments, the set of one or more inputs is a single input. In some embodiments, the set of one or more inputs includes two or more inputs. In response to detecting the set of one or more inputs, the computer system displays (1108) the time indication with a second set of style options different from the first set of style options (e.g., changing and/or transitioning the time indication from the first set of style options to the second set of style options). While displaying the time indication with a second set of style options different from the first set of style options, the computer system updates (1110) the clock user interface to indicate a current time. Displaying time indications with a second set of style options different from the first set of style options in response to detecting the set of one or more inputs while updating the clock user interface to indicate a current time reduces the number of inputs required to edit the user interface (e.g., without requiring the user to navigate to an editing user interface), thereby reducing the number of inputs needed to perform an operation. In some embodiments, the first set of style option includes a first style option and a second style option, where the first style option is associated with the second style option (e.g., a height and width of the time indicators are related or linked). In some embodiments, the first style option and the second style option are inversely related (e.g., a height of the time indication increases as a width of the time indication decreases). In some embodiments, the first style option and the second style option are directly related (e.g., a height of the time indication increases as a width of the time indication increases).

In some embodiments, after displaying the time indication (e.g., 1006a, 1006b, 1006c, 1006d, or 1006e) with the second set of style options, the computer system (e.g., 1000) continues to display the time indication with the second set of style options until receiving a request to change a style option of the time indication. (e.g., the second set of style options is persistent, maintained, and/or continued). Continuing to display the time indication with the second set of style options until receiving a request to change a style option of the time indication provides visual feedback about the time of day and helps the user quickly and easily view the current time of day, thereby providing improved feedback to the user. In some embodiments, the time indication maintains the second set of style options for a predetermined time. In some embodiments, the time indication maintains the second set of style options until the computer system receives a request to change the style option of the time indication, even if, e.g., the computer system enters and/or exits a low-power state, is powered on or off, receives input to display a different user interface (e.g., a different clock user interface, an interface of a different application, or a home screen) and then re-display the clock user interface that includes the time indication, and/or receives user input (e.g., 1008) to edit an element of the clock user interface other than the time indication (e.g., a complication).

In some embodiments, the time indication (e.g., 1006a, 1006b, 1006c, 1006d, or 1006e) includes numerical hour indicators (e.g., 1006a), and wherein the numerical hour indicators have a first length when displayed with the first set of style options (e.g., 1006a as illustrated in FIG. 10A) and the numerical hour indicators have a second length when displayed with the second set of style options (e.g., 1006a as illustrated in FIG. 10B) (e.g., the time indication expands toward or contracts away from a center of the clock user interface). Displaying numerical hour indicators with a first length when displayed with the first set of style options and with a second length when displayed with the second set of style options reduces the number of inputs required to edit the user interface (e.g., without requiring the user to navigate to an editing user interface), thereby reducing the number of inputs needed to perform an operation. In some embodiments, respective numerical hour indicators are oriented along respective lines extending radially from a point on the clock user interface (e.g., a point around which an hour, minute, and/or second hand rotate), and the length of a respective numerical hour indicator is defined as the length along the respective line. In some embodiments, the first length is greater than the second length (e.g., the number contracts). In some embodiments, the second length is greater than the first length (e.g., the number expands). In some embodiments, a first end of the number has a fixed position and the second end of the number changes (e.g., the end of the number that is closer to the center of the clock user interface moves towards or away from the center).

In some embodiments, the set of one or more inputs includes (e.g., is) a rotation (e.g., 1008) of a rotatable input mechanism (e.g., 1004). Displaying the time indication with a second set of style options different from the first set of style options in response to a rotation of a rotatable input mechanism reduces the number of inputs required to edit the user interface (e.g., without requiring the user to navigate to an editing user interface), thereby reducing the number of inputs needed to perform an operation. In some embodiments, displaying the time indication with the second set of style options occurs in response to detecting a clockwise rotation of the rotatable input mechanism in a plane that is perpendicular to the display generation component (e.g., 1002). In some embodiments, displaying the time indication with the second set of style occurs in response to detecting a counterclockwise rotation of the rotatable input mechanism in a plane that is perpendicular to the display generation component.

In some embodiments, the time indication (e.g., 1006a, 1006b, 1006c, 1006d, or 1006e) includes one or more clock hands (e.g., 1006b, 1006c, and/or 1006d). The one or more clock hands have a first set of clock hand visual characteristics (e.g., width, height, length, size, and/or color) when displayed with the first set of style options (e.g., 1006b, 1006c, and/or 1006d as illustrated in FIG. 10A). The one or more clock hands have a second set of clock hand visual characteristics when displayed with the second set of style options (e.g., 1006b, 1006c, and/or 1006d as illustrated in FIG. 10B), wherein the second set of clock hand visual characteristics is different from the first set of clock hand visual characteristics. Displaying clock hands with a first set of clock hand visual characteristics when displayed with the first set of style options and with a second set of clock hand visual characteristics when displayed with the second set of style options reduces the number of inputs required to edit the user interface (e.g., without requiring the user to navigate to an editing user interface), thereby reducing the number of inputs needed to perform an operation. In some embodiments, a characteristic (e.g., the size, width and/or length) of the clock hand increases in response to detecting an input (e.g., a rotation of a rotatable input mechanism or a swipe gesture) in a first direction and decreases in response to detecting an input in a second direction (e.g., a direction that is different from and/or opposite to the first direction).

In some embodiments, the time indication (e.g., 1006a, 1006b, 1006c, 1006d, or 1006e) includes one or more hour indications (e.g., 1006a) (e.g., numerals and/or tick marks at the hour positions on an analog clock face). The one or more hour indications have a first set of hour indication visual characteristics (e.g., width, height, length, size, color, and/or font) when displayed with the first set of style options (as illustrated in FIG. 10A). The one or more hour indications have a second set of hour indication visual characteristics when displayed with the second set of style options, wherein the second set of hour indication visual characteristics is different from the first set of hour indication visual characteristics (as illustrated in FIGS. 10B and 10C) (e.g., the size, width, height, color, font, and/or length of the hour indication changes based on the set of one or more inputs). Displaying hour indications with a first set of hour indication visual characteristics when displayed with the first set of style options and with a second set of hour indication visual characteristics when displayed with the second set of style options reduces the number of inputs required to edit the user interface (e.g., without requiring the user to navigate to an editing user interface), thereby reducing the number of inputs needed to perform an operation. In some embodiments, a characteristic (e.g., the size, height, width, and/or length) of the hour indication increases in response to detecting an input in a first direction and decreases in response to detecting an input in a second direction (e.g., a direction that is different from and/or opposite to the first direction). In some embodiments, the width (and/or change in the width) of the hour indication is inversely related to the height (and/or the change in the height) of the hour indication.

In some embodiments, displaying the time indication (e.g., 1006a, 1006b, 1006c, 1006d, or 1006e) with the second set of style options includes, in accordance with a determination that the set of one or more inputs (e.g., 1008 and/or 1010) has a first parameter (e.g., speed, direction, duration, and/or magnitude), the second set of style options is different from the first set of style options by a first amount. In accordance with a determination that the set of one or more inputs has a second parameter that is different from the first parameter, the second set of style options is different from the first set of style options by a second amount different from the first amount. Displaying a set of style options based on a parameter of the set of one or more inputs reduces the number of inputs required to edit the user interface (e.g., without requiring the user to navigate to an editing user interface), thereby reducing the number of inputs needed to perform an operation. In some embodiments, the second amount is greater than the first amount. In some embodiments, the first amount is greater than the second amount. In some embodiments, a visual characteristic of the set of style options is linked to the amount of change of the parameter (e.g., the change in length, width, and/or size is proportional to the speed, direction, duration, and/or magnitude).

In some embodiments, the time indication (e.g., 1006a, 1006b, 1006c, 1006d, or 1006e) includes a set of numeric indications (e.g., 1006a) (e.g., numerals, hour indications, and/or minute indications) displayed at respective positions on the clock user interface (in some embodiments, the time indication includes two or more numerals displayed at respective positions on the clock user interface). While displaying the clock user interface (e.g., 1006) with the set of numeric indications, the computer system (e.g., 1000) detects a predetermined condition (e.g., entering a low power state, and/or a predetermined amount of time passing without detecting user input (e.g., 1008)). In response to detecting the predetermined condition, the computer system displays a set of non-numeric indications (e.g., 1006a) (e.g., lines, hashes, and/or tick marks) at the respective positions on the clock user interface. Automatically displaying a set of non-numeric indications at respective position on a clock user interface in response to detecting a predetermined condition enables the user interface to convey the current time without requiring the user to provide additional inputs to configure the user interface (e.g., configuring the user interface by manually selecting the position of the set of non-numeric indication), thereby performing an operation when a set of conditions has been met without requiring further user input. In some embodiments, the set of numeric indications change to respective non-numeric indications at the respective positions of the numeric indications on the clock user interface.

In some embodiments, displaying the set of non-numeric indications (e.g., 1006a) includes displaying an animation of the numeric indications respectively rotating from a first orientation (e.g., a front view) to a second orientation (e.g., a side view). Displaying an animation of the numeric indications respectively rotating from a first orientation to a second orientation provides visual feedback about a change in mode of the device, thereby providing improved feedback to the user. In some embodiments, the second orientation of the numeric indications represent non-numeric indications (e.g., a line, a hash, and/or a tick mark). In some embodiments, animation of the numeric indications rotating from the first orientation to the second orientation includes an animation of the numeric indications transforming into the non-numeric indications. In some embodiments, the animation of the numeric indications rotation from the first orientation to the second orientation is displayed in response to entering a low power state.

In some embodiments, a size (e.g., length and/or width) of the non-numeric indications (e.g., 1006a) is based on (e.g., the same as or proportional to) a size (e.g., length and/or width) of the numeric indications (e.g., 1006a). Displaying the non-numeric indications with a size based on a size of the numeric indications provides visual feedback about the time of day and the currently selected set of style options, thereby providing improved feedback to the user. In some embodiments, the height of the non-numeric indications is based on the height of the numeric indications. In some embodiments, the height of the non-numeric indications is the same as the height of the numeric indications. In some embodiments, the width of the non-numeric indications is the same as the width of the numeric indications.

In some embodiments, the computer system (e.g., 1000) detects a set of one or more inputs (e.g., 1008 and/or 1010) (e.g., a rotation of a rotatable input mechanism and/or a touch input; in some embodiments, the set of one or more inputs is a single input; in some embodiments, the set of one or more inputs includes two or more inputs) corresponding to a selection of a color of the time indication (e.g., 1006a, 1006b, 1006c, 1006d, or 1006e) and/or a color of a background (e.g., 1006f) of the clock user interface (e.g., 1006f). In response to detecting the set of one or more inputs (e.g., 1008 and/or 1018) corresponding to the selection of the color of the time indication and/or the color of the background of the clock user interface, the computer system displays the time indication and/or the background of the clock user interface with the selected color. Displaying a time indication and/or a background of the clock user interface with a selected color in response to a user input enables selection of settings according to the user's preference, which provides additional control options without cluttering the user interface. In some embodiments, the set of one or more inputs corresponding to a selection of a color of the time indication and/or a color of a background of the clock user interface is detected in an editing user interface. In some embodiments, the editing user interface is displayed in response to detecting an input to display the editing user interface. In some embodiments, after entering the editing user interface, an input corresponding to selection of a color editing user interface is detected, and the color editing user interface is displayed in response to the input corresponding to the selection of the color editing user interface. In some embodiments, while in the color editing user interface selection of the color of the time indication and/or the color of the background is detected and the editing mode is exited in response to detecting the selection of the color of the time indication and/or the color of the background.

In some embodiments, displaying the time indication (e.g., 1006a, 1006b, 1006c, 1006d, or 1006e) and/or the background (e.g., 1006f) of the clock user interface (e.g., 1006) with the selected color includes, in accordance with a determination that the set of one or more inputs (e.g., 1008 and/or 1018) corresponding to the selection of the color of the time indication and/or the color of the background of the clock user interface includes a selection of the color of the time indication, the computer system (e.g., 1000) displays the time indication with the selected color without changing a color of the background. In accordance with a determination that the set of one or more inputs corresponding to the selection of the color of the time indication and/or the color of the background of the clock user interface includes a selection of the color of the background, the computer system displays the background with the selected color without changing a color of the time indication (e.g., the color of the time indication can be changed without changing the color of the background of the clock user interface, and the color of the background of the clock user interface can be changed without changing the color of the time indication). Displaying a time indication with a selected color without changing the color of the background and displaying the background with the selected color without changing the color of the time indication enables selection of individual settings without affecting other settings, which provides additional control options without cluttering the user interface. In some embodiments, the user can select the color of the time indication and the color of the background at the same time. In some embodiments, the color of the time indication is based on a user's selection of the color of the background. In some embodiments, the color of the background is based on a user's selection of the color of the time indication.

In some embodiments, the selection of the color of the time indication (e.g., 1006a, 1006b, 1006c, 1006d, or 1006e) (e.g., a watch hand, minutes indication, hours indication, and/or seconds indication) and/or the color of the background (e.g., 1006f) of the clock user interface (e.g., 1006) includes selection of a color from a plurality of preset color options (e.g., red, green, black, white, blue, and/or yellow). Selecting a color of a time indication and/or the background of the clock user interface from present color options enables selection of settings according to the user's preference, which provides additional control options without cluttering the user interface. In some embodiments, selection of the color of time indication and/or the color of the background of the clock user interface is detected in an editing user interface. In some embodiments, the plurality of preset color options are predetermined.

In some embodiments, the computer system (e.g., 1000) displays a selectable user interface element (e.g., 1006g and/or 1006h) (e.g., a complication) on a background of the clock user interface (e.g., 1006f), including displaying the selectable user interface element with a user-selected color. Displaying a selectable user interface element with a selected color in response to a user input (e.g., 1008 and/or 1010) enables selection of settings according to the user's preference, which provides additional control options without cluttering the user interface. In some embodiments, the background of the clock user interface is displayed with a user-selected color. In some embodiments, the color of the selectable user interface element is based on the background of the clock user interface. In some embodiments, the color of the selectable user interface is the same as the background of the clock user interface. In some embodiments, a complication refers to any clock face feature other than those used to indicate the hours and minutes of a time (e.g., clock hands or hour/minute indications). In some embodiments, complications provide (e.g., display) data obtained from an application. In some embodiments, a complication is associated with the corresponding application. In some embodiments, a complication includes an affordance that when selected launches a corresponding application. In some embodiments, a complication is displayed at a fixed, predefined location on the display. In some embodiments, complications occupy respective locations at particular regions of a watch face (e.g., lower-right, lower-left, upper-right, and/or upper-left). In some embodiments, complications are displayed at respective complication regions within the clock user interface. In some embodiments, a user can change (e.g., via a set of one or more inputs) the complication displayed at a respective complication region (e.g., from a complication associated with a first application to a complication associated with a second application). In some embodiments, a complication updates the displayed data in accordance with a determination that the data obtained from the application has been updated. In some embodiments, the complication updates the displayed data over time.

In some embodiments, the computer system (e.g., 1000) detects a set of one or more inputs (e.g., 1008, 1010, 1012a, and/or 1018) corresponding to a selection of a style (e.g., shade (such as white, light, and/or dark), color, and/or brightness) of a dial (e.g., 1006e) (e.g., a clock dial) of the clock user interface. In response to detecting the set of one or more inputs corresponding to the selection of the style of the dial of the clock user interface (e.g., 1006), the computer system displays the clock user interface with the selected style of the dial. Displaying the dial of the clock user interface with a selected style in response to a user input enables selection of settings according to the user's preference, which provides additional control options without cluttering the user interface. In some embodiments, the style of the dial of the clock user interface is based on a user input. In some embodiments, the style of the dial is independent of the background of the clock user interface. In some embodiments, the style of the dial is independent of the color of the time indications. In some embodiments, the style of the dial is based on the color of the background of the clock user interface (e.g., some dials are exclusive to some background colors). In some embodiments, the set of one or more inputs corresponding to the selection of the style of the dial is detected in an editing user interface. In some embodiments, the editing user interface is displayed in response to detecting an input to display the editing user interface. In some embodiments, after entering the editing user interface, an input corresponding to selection of a dial editing user interface is detected, and the dial editing user interface is displayed in response to the input corresponding to the selection of the dial editing user interface. In some embodiments, while in the dial editing user interface selection of the style of the dial is detected. In some embodiments, the one or more inputs corresponding to the selection of the style of the dial of the clock user interface includes a request to exit the editing mode, and the clock user interface is displayed with the selected style of the dial in response to detecting the request to exit the editing mode.

In some embodiments, the computer system (e.g., 1000) detects a set of one or more inputs (e.g., 1008, 1010, 1012a, and/or 1018) corresponding to selection of a density of numerals (e.g., 1006a) for a dial (e.g., 1006e) of the clock user interface (e.g., 1006) (e.g., a first density has numerals at the 12, 3, 6, and 9 o'clock positions; a second density has numerals at the 12, 1, 2, 3, 4, 5, 6, 7, 8, 9, 10, and 11 o'clock positions). In response to detecting the set of one or more inputs corresponding to selection of density of numerals for a dial of the clock user interface and in accordance with a selection of a first density, the computer system displays the clock user interface with a first number of numerals. In accordance with a selection of a second density, displaying the clock user interface with a second number of numerals that is different from the first number of numerals (e.g., some of the numerals are replaced with non-numeral indications). Displaying the clock user interface with a selected density of numerals in response to a user input (e.g., 1008) enables selection of settings according to the user's preference, which provides additional control options without cluttering the user interface. In some embodiments, the second number of numerals is less than the first number of numerals. In some embodiments, a portion of the first number of numerals are replaced with non-numeral indications. In some embodiments, the one or more inputs corresponding to the selection of the density of numerals for the dial of the clock user interface includes a request to exit the editing mode, and the clock user interface is displayed with the selected density of numerals in response to detecting the request to exit the editing mode.

In some embodiments, the time indication (e.g., 1006a, 1006b, 1006c, 1006d, or 1006e) includes numeric indications (e.g., 1006a) and non-numeric indications (e.g., 1006a). The numeric indications have a first height when displayed with the first set of style options and the non-numeric indications have a second height (e.g., the first height or a height different from the first height) when displayed with the first set of style options). In some embodiments, the numeric indications and the non-numeric indications have the same height. In some embodiments, the numeric indications and the non-numeric indications have different heights. The numeric indications have a third height when displayed with the second set of style options and the non-numeric indications have a fourth height when displayed with the second set of style options. The first height is different from (e.g., greater than or less than) the third height and the second height is different from (e.g., greater than or less than) the fourth height. Displaying numeric indication and non-numeric indications with a respective height when displayed in a set of style options provides visual feedback about the time of day and the currently selected set of style options, thereby providing improved feedback to the user. In some embodiments, the non-numeric indications and the numeric indications are displayed concurrently.

In some embodiments, displaying the time indication (e.g., 1006a, 1006b, 1006c, 1006d, or 1006e) with a second set of style options (e.g., changing from displaying the time indication with the first set of style options to displaying the time indication with the second set of style options) occurs while updating the time indication to reflect a current time (e.g., a style of the clock hand is changed while the clock hand is rotating around the clock face). Displaying the time indication with a second set of style options while updating the time indication to reflect a current time provides visual feedback about the time of day and the currently selected set of style options, thereby providing improved feedback to the user. In some embodiments, updating the time indication to reflect a current time includes changing display of the time indication from indicating a previous current time to indicating a present current time.

Note that details of the processes described above with respect to method 1100 (e.g., FIG. 11) are also applicable in an analogous manner to the methods described below/above. For example, methods 700, 900, 1300, 1500, 1700, and 1900 optionally includes one or more of the characteristics of the various methods described above with reference to method 1100. For example, method 1100 optionally includes one or more of the characteristics of the various methods described above with reference to method 700. For example, displaying a clock user interface described with reference to method 1100 optionally includes displaying a simulated light effect as described with reference to method 700. For another example, method 1100 optionally includes one or more of the characteristics of the various methods described above with reference to method 900. For example, method 1100 optionally includes displaying an astronomical object as described with reference to method 900. As another example, method 1100 optionally includes one or more of the characteristics of the various methods described below with reference to method 1300. For example, method 1100 optionally includes displaying a first calendar system and a second calendar system as described with reference to method 1300. For another example, method 1100 optionally includes one or more of the characteristics of the various methods described below with reference to method 1500. For example, the second style described with respect to method 1100 optionally includes an animated interaction between the first numeral and the second numeral as described with respective to method 1500. For brevity, these details are not repeated below.

FIGS. 12A-12O illustrate example clock user interfaces that include multiple calendar systems, in accordance with some embodiments. The user interfaces in these figures are used to illustrate the processes described below, including the processes in FIG. 13.

FIG. 12A illustrates computer system 1200 (e.g., a smartwatch) with display 1202. Computer system 1200 includes rotatable and depressible input mechanism 1204. In some embodiments, computer system 1200 includes one or more features of device 100, device 300, and/or device 500. In some embodiments, computer system 1200 is a tablet, phone, laptop, desktop, and/or camera. In some embodiments, the inputs described below can be substituted for alternate inputs, such as a press input and/or a rotational input received via rotatable and depressible input mechanism 1204.

In FIG. 12A, computer system 1200 displays user interface 1206. In some embodiments, computer system 1200 displays user interface 1206 in response to detecting an input, such as a tap input, a wrist raise input, a press input received via rotatable and depressible input mechanism 1204, and/or a rotational input received via rotatable and depressible input mechanism 1204.

In some embodiments, user interface 1206 is displayed on a tablet, phone (e.g., a smartphone), laptop, and/or desktop. In some embodiments, user interface 1206 is displayed on a home screen, lock screen, and/or wake screen of a tablet, phone, laptop, and/or desktop.

User interface 1206 includes time indications 1206a, hour hand 1206b, minute hand 1206c, second hand 1206d, background 1206e, moon representation 1206f, complications 1206g, solar date 1206h, lunar date 1206i, moon phase ring 1206j, lunar date ring 1206k, and star field 1206l. User interface 1206 includes an analog clock face that displays the current time, with time indications 1206a, hour hand 1206b, minute hand 1206c, and second hand 1206d. User interface 1206 includes indications of the current date in two different calendar systems that divide the year with different sets of subdivisions by including the current solar date 1206h and the current lunar date 1206i. In this way, a user can quickly view the current time, the current solar (e.g., Gregorian) date, and the current lunar date.

Moon representation 1206f shows the current phase of the moon (Earth's moon), which corresponds to lunar date 1206i and to the lunar date displayed at the top (e.g., the 12 o'clock) position of lunar date ring 1206k. The lunar date displayed at the top position of lunar date ring 1206k is outlined to indicate that the lunar date displayed at the top position of lunar date ring 1206k is the current lunar date. In some embodiments, the lunar date displayed at the top position of lunar date ring 1206k is displayed more brightly, displayed in a different color, and/or highlighted in some other manner to indicate that the lunar date displayed at the top position of lunar date ring 1206k is the current lunar date.

Additionally, the current moon phase is also highlighted (e.g., outlined, shown in a different color, and/or emphasized) in moon phase ring 1206j, which displays the current moon phase in relation to upcoming moon phases (in the clockwise direction) and previous moon phases (in the counterclockwise direction). In this way, the relationships between the current lunar date, upcoming and past lunar dates, the current moon phase, and upcoming and past moon phases is represented in user interface 1206.

User interface 1206 includes star field 1206l displayed with a parallax effect on background 1206e. In some embodiments, star field 1206l is optionally a realistic star filed that represents the current position of stars as they appear behind the moon based on the position of computer system 1200. For example, when computer system 1200 is located in San Francisco, star field 1206l is displayed as if a user was looking at the night sky in San Francisco. Similarly, when computer system 1200 is located in Barcelona, star field 1206l is displayed as if the user was looking at the night sky in Barcelona.

Displaying star field 1206l with the parallax effect on background 1206e causes star field 1206l to be displayed with a displacement in star field 1206l's apparent position in background 1206e in response to certain movements of computer system 1200, as discussed further below.

While displaying user interface 1206, computer system 1200 detects user input 1208 rotating rotatable input mechanism 1204 (which is, optionally, also depressible). In response to detecting user input 1208, computer system 1200 displays user interface 1206 as shown in FIG. 12B. In particular, as user input 1208 begins to rotate rotatable input mechanism 1204, moon representation 1206f increases in size in user interface 1206, and time indications 1206a, hour hand 1206b, minute hand 1206c, and second hand 1206d cease to be displayed in user interface 1206. In addition, complications 1206g are obscured and/or cease to be displayed in user interface 1206. In some embodiments, time indications 1206a, hour hand 1206b, minute hand 1206c, and seconds hand 1206d fade out or are displayed in a less visible manner as user input 1208 is detected by computer system 1200.

In some embodiments, user input 1208 is a tap, press, and/or other gesture on display 1202, and in response to detecting the tap, press, and/or other gesture on display 1202, computer system 1200 displays user interface 1206 as shown in FIG. 12B. Thus, computer system 1200 can transition user interface 1206 from the state shown in FIG. 12A to the state shown in FIG. 12B in response to detecting a variety of different inputs.

As further user input 1208 rotating rotatable input mechanism 1204 is detected by computer system 1200, computer system 1200 displays user interface 1206 as shown in FIG. 12C, including updated solar date 1206h of Oct. 5, 2021, and updated lunar date 1206i of month 8, day 29. As previously discussed, solar date 1206h and lunar date 1206i are the same date in two different calendar systems, providing an indication of the relationship between the two calendar systems. Additionally, computer system 1200 rotates lunar date ring 1206k so that the updated lunar date is reflected at the top (e.g., the 12 o'clock) position of lunar date ring 1206k. Computer system 1200 further updates moon representation 1206f and the moon phase highlighted in moon phase ring 1206j to correspond to updated lunar date 1206i and updated solar date 1206h.

User interface 1206 is displayed with an indication of an upcoming holiday, by highlighting the $6^{th}$ of the upcoming lunar month in lunar date ring 1206k with a circle. This provides an indication that the $6^{th}$ of the ninth lunar month of the year is a holiday either in the currently selected lunar calendar or in the currently selected solar calendar.

While displaying user interface 1206 as shown in FIG. 12C, computer system 1200 detects user input 1208 rotating rotatable input mechanism 1204, and in response to detecting user input 1208, displays user interface 1206 as shown in FIG. 12D. In FIG. 12D, computer system 1200 displays user interface 1206 with updated solar date 1206h of Oct. 28, 2021, and updated lunar date 1206i of month 9, day 23. Lunar date ring 1206k is displayed with adjusted spacing for the lunar dates to accommodate the 30 days in month 9 of the lunar calendar, in contrast to when lunar date ring 1206k is displayed to accommodate 29 days (the number of days in month 8 of the lunar calendar), as displayed in FIG. 12A.

In response to detecting user input 1208, computer system 1200 rotates lunar date ring 1206k so that the updated lunar date of month 9, day 23 is reflected at the top (e.g., the 12 o'clock) position of lunar date ring 1206k. Computer system 1200 further updates moon representation 1206f and the moon phase highlighted in moon phase ring 1206j to correspond to updated lunar date 1206i and updated solar date 1206h.

In some embodiments, updated solar date 1206h and updated lunar date 1206i are based on a direction of user input 1208. For example, when the rotation of user input 1208 is in a clockwise direction, updated solar date 1206h and updated lunar date 1206i correspond to a date that is forward in time (e.g., in the future), as shown in FIGS. 12C and 12D. In contrast, when the rotation of user input 1208 is in a counterclockwise direction, updated solar date 1206h and updated lunar date 1206i correspond to a date that is backward in time (e.g., in the past).

In some embodiments, updated solar date 1206h and updated lunar date 1206i are based on a magnitude or amount of user input 1208. For example, when the magnitude of user input 1208 is a first amount of rotation, user interface 1206 moves forward five days, as shown when user interface 1206 transitions from the state illustrated in FIG. 12A to the state illustrated in FIG. 12C. As another example, when the magnitude of user input 1208 is a second amount of rotation that is greater than the first amount of rotation, user interface 1206 moves forward 23 days, as shown when user interface 1206 transitions from the state illustrated in FIG. 12C to the state illustrated in FIG. 12D.

While displaying user interface 1206, computer system 1200 detects user input 1210 moving computer system 1200, as shown in FIG. 12E. In some embodiments, user input 1210 corresponds to a wrist movement, arm movement, and/or hand movement and moves computer system 1200 as the user moves the wrist, arm, and/or hand.

In response to detecting user input 1210, computer system 1200 displays star field 1206l with a small downward movement or shift, while continuing to display other elements of user interface 1206 such as moon representation 1206f without any movement (or less movement than star field 1206l). This causes star field 1206l to be displayed with an apparent change in the position of star field 1206l with respect to the other elements of user interface 1206 and background 1206e.

While displaying user interface 1206 as shown in FIG. 12E, computer system 1200 detects user input 1212 on display 1202. User input 1212 can include a tap, a swipe gesture, and/or a press. After (e.g., in response to) detecting user input 1212 on display 1202, computer system 1200 displays selection interface 1214, as shown in FIG. 12F.

Selection interface 1214 includes edit affordance 1214a and allows the user to select a user interface to be displayed by computer system 1200. Accordingly, computer system 1200 can detect a swipe gesture in the left or right direction to change to a different user interface. Computer system 1200 can also detect rotation 1208 of rotatable input mechanism 1204 to select a different user interface. While displaying selection interface 1214, computer system 1200 detects user input 1216 (e.g., a tap) on edit affordance 1214a and displays editing interface 1218, as shown in FIG. 12G.

Editing interface 1218 displays various settings for user interface 1206, allowing the user to select different options for user interface 1206. In FIG. 12G, editing interface 1218 includes a currently selected lunar calendar type of Chinese. The currently selected lunar calendar type affects various elements of user interface 1206 including the current lunar date to be displayed as lunar date 1206i and indicated in lunar date ring 1206k. While displaying the currently selected lunar calendar type, computer system 1200 detects user input 1208 rotating rotatable input mechanism 1204. In response to detecting user input 1208, editing interface 1218 changes the currently selected lunar calendar type from Chinese to Islamic, as shown in FIG. 12H. In some embodiments, computer system 1000 detects a swipe input on display 1202 changing the selected lunar calendar type. For example, computer system 1200 can detect a downward swipe gesture to change the currently selected lunar calendar type from Chinese to Islamic.

While displaying editing interface 1218 with the currently selected lunar calendar type as shown in FIG. 12H, computer system 1000 detects swipe gesture 1220 from the right side to the left side of display 1202. In response to detecting swipe gesture 1220, editing interface 1218 shows a different editable property of user interface 1206. In particular, editing interface 1218 displays a currently selected clock style of analog, as shown in FIG. 12I.

While displaying editing interface 1218 with the currently selected clock style of analog, computer system 1200 detects user input 1208 rotating rotatable input mechanism 1204 and changes the currently selected clock style from analog to digital, as shown in FIG. 12J. While displaying editing interface 1218 with the currently selected clock style of digital as shown in FIG. 12J, computer system 1200 detects swipe gesture 1220 from the right side to the left side of display 1202. In response to detecting swipe gesture 1220, editing interface 1218 shows a different editable property of user interface 1206. In particular, editing interface 1218 displays a currently selected color of seconds hand 1206d, as shown in FIG. 12K.

While displaying editing user interface 1218 with the currently selected color of seconds hand 1206d as red, computer system 1200 detects user input 1208 rotating rotatable input mechanism 1204 and changes the currently selected color of seconds hands 1206d to blue, as shown in FIG. 12L. While displaying editing interface 1218 with the currently selected color of seconds hands 1206d as blue, as shown in FIG. 12L, computer system 1200 detects swipe gesture 1220 from the right side to the left side of display 1202. In response to detecting swipe gesture 1220, editing interface 1218 shows a different editable property of user interface 1206. In particular, editing interface 1218 displays a currently selected color of time indications 1206a, as shown in FIG. 12M.

When the currently selected clock style is analog, the selection of the color of time indications 1206a applies to the minute and hour markers displayed around the analog clock face. However, when the currently selected clock style is digital, as discussed above, the selection of the color of time indications 1206a applies to increasing marks or counters 1206m of the digital clock, as shown in FIG. 12O. Counters 1206m surround moon representation 1206f and increase in a clockwise direction as the seconds pass. Thus, when a new minute has started a first counter at the one minute position will be illuminated to indicate that the first second has passed; when thirty seconds have passed, the counters up to the thirty minute mark will be illuminated; and when forty five seconds have passed, the counters up to the forty five minute mark will be illuminated. Thus, the counters are continuously illuminated in a clockwise direction as the seconds count up to sixty.

Figure 12N:
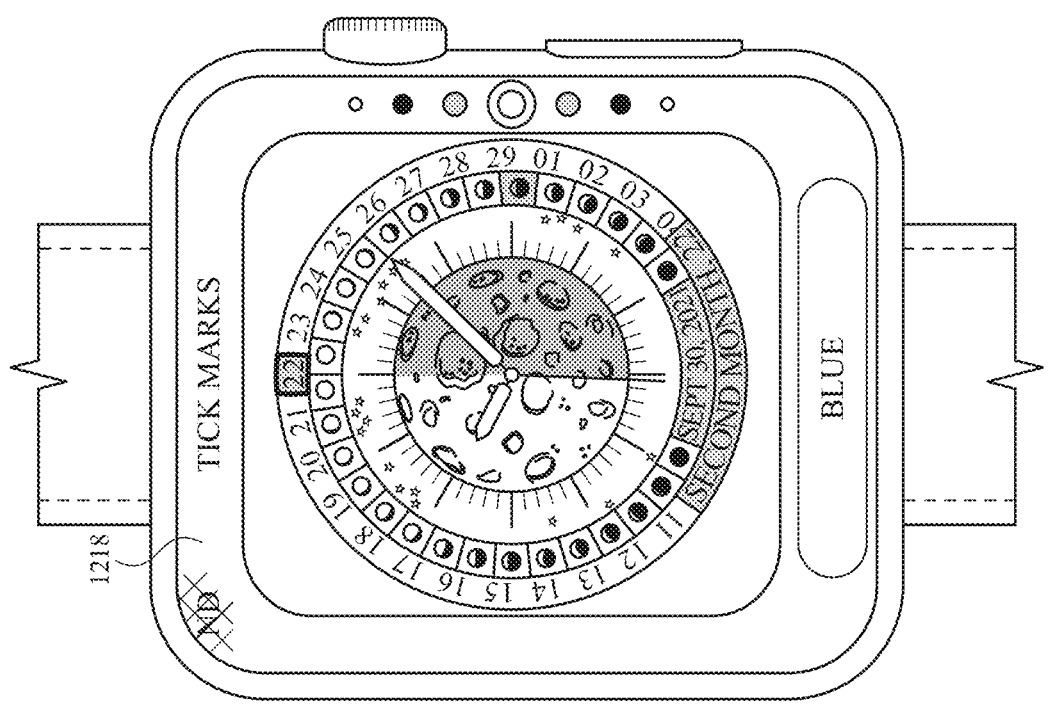

While displaying editing user interface 1218 with the currently selected color of time indications 1206a as blue, computer system 1200 detects user input 1208 rotating rotatable input mechanism 1204 and changes the currently selected color of time indications 1206a to green, as shown in FIG. 12N.

While displaying editing interface 1218, computer system 1200 detects a user input, such as a press of rotatable and depressible input mechanism 1204, and exits editing interface 1218 to display user interface 1206 with the selected settings, as shown in FIG. 12O.

FIG. 13 is a flow diagram illustrating a method for displaying a user interface including multiple calendar systems using a computer system (e.g., 1200) in accordance with some embodiments. Method 1300 is performed at a computer system (e.g., a smartwatch, a wearable electronic device, a smartphone, a desktop computer, a laptop, or a tablet) that is in communication with a display generation component (e.g., 1202) and one or more input devices (e.g., a button, a rotatable input mechanism (e.g., 1204), a speaker, a camera, a motion detector (e.g., an accelerometer and/or gyroscope), and/or a touch-sensitive surface). Some operations in method 1300 are, optionally, combined, the orders of some operations are, optionally, changed, and some operations are, optionally, omitted.

As described below, method 1300 provides an intuitive way for displaying a user interface including multiple calendar systems. The method reduces the cognitive burden on a user for viewing a user interface including multiple calendar systems, thereby creating a more efficient human-machine interface. For battery-operated computing devices, enabling a user to view a user interface including multiple calendar systems faster and more efficiently conserves power and increases the time between battery charges.

In method 1300, computer system (e.g., 1200) displays (1302), via the display generation component (e.g., 1202), a user interface (e.g., 1206) (e.g., a clock user interface, a watch face user interface, a user interface that includes an indication of time (e.g., an analog and/or digital indication of time)) including an indication of a first calendar date in a first calendar system that divides a year with a first set of subdivisions (e.g., 1206h) (e.g., a solar calendar and/or a calendar of a first type) and an indication of a first calendar date in a second calendar system that divides the year with a second set of subdivisions (e.g., 1206i) that is different from the first set of subdivisions (e.g., a lunar calendar, a calendar that is different from the first calendar, and/or a calendar of a second type), wherein the first calendar date of the first calendar system corresponds to the first calendar date of the second calendar system (e.g., the first calendar date of the first calendar and the first calendar date of the second calendar represent the same day). The computer system detects (1304), via the one or more input devices, a set of one or more inputs (e.g., 1208, 1210, and/or 1212) (e.g., a rotation of a rotatable input mechanism, a single input, or two or more inputs). In response to detecting (1306) the set of one or more inputs, the computer system displays, via the display generation component, the user interface including an indication of a second calendar date of the first calendar system (e.g., change the date represented by the first calendar and/or move the date forward or backward on the first calendar) and an indication of a second calendar date of the second calendar system (e.g., change the date represented by the second calendar and/or move the date forward or backward on the second calendar), wherein the second calendar date of the first calendar system corresponds to the second calendar date of the second calendar system (e.g., the second calendar date of the first calendar and the second calendar date of the second calendar represent the same day). Displaying a user interface including an indication of a first calendar date in a first calendar system that divides a year with a first set of subdivisions and an indication of a first calendar date in a second calendar system that divides the year with a second set of subdivisions that is different from the first set of subdivisions wherein the first calendar date in the first calendar system corresponds to the first calendar date in the second calendar system provides visual feedback about the current date and the relationship of two different calendar systems, thereby providing improved feedback to the user. Displaying the user interface including an indication of a second calendar date of the first calendar system and an indication of a second calendar date of the second calendar system, wherein the second calendar date in the first calendar system corresponds to the second calendar date in the second calendar system in response to a user input reduces the number of inputs required to edit the user interface (e.g., without requiring the user to navigate to an editing user interface), thereby reducing the number of inputs needed to perform an operation.

In some embodiments, the first calendar and/or the second calendar is selected based on a locality (e.g., a country and/or region associated with the computer system (e.g., 1200)). In some embodiments, the locality is set by default (e.g., a factory setting) or by a user (e.g., via a settings menu and/or option, such as during an initial device configuration process). In some embodiments, the first calendar and/or the second calendar is selected based on a religion associated with the locality. In some embodiments, the first calendar and/or the second calendar has a format that is based on the locality (e.g., a number of days displayed in the calendar is based on the locality). In some embodiments, the first calendar and/or the second calendar displays phases of an astronomical object. In some embodiments, the first calendar and/or the second calendar displays a number of phases of the astronomical object based on the locality (e.g., the number of phases corresponds to the number of days). In some embodiments, the computer system displays the first calendar and the second calendar as concentric circles. In some embodiments, the first calendar is displayed outside of the second calendar. In some embodiments, the second calendar is displayed outside of the first calendar.

In some embodiments, displaying, via the display generation component (e.g., 1202), the user interface (e.g., 1206) including the indication of the second calendar date includes (e.g., 1206*i*), in accordance with a determination that the set of one or more inputs (e.g., 1208, 1210, and/or 1212) includes an input in a first direction, displaying the second calendar date as a first updated calendar date. In accordance with a determination that the set of one or more inputs includes an input in a second direction, the computer system (e.g., 1200) displays the second calendar date as a second updated calendar date that is different from the first updated calendar date. Displaying the second calendar date based on a direction of the set of one or more inputs reduces the number of inputs required to edit the user interface (e.g., without requiring the user to navigate to an editing user interface), thereby reducing the number of inputs needed to perform an operation. In some embodiments, a future calendar date is selected based on a clockwise rotation of a rotatable input mechanism. In some embodiments, a past calendar date is selected based on a counterclockwise rotation of a rotatable input mechanism.

In some embodiments, displaying, via the display generation component (e.g., 1202), the user interface (e.g., 1206) including the indication of a second calendar date (e.g., 1206*i*) includes in accordance with a determination that the set of one or more inputs (e.g., 1208, 1210, and/or 1212) includes an input of a first magnitude, displaying the second calendar date as a third updated calendar date. In accordance with a determination that the set of one or more inputs includes an input of a second magnitude, displaying the second calendar date as a fourth updated calendar date that is different from the third updated calendar date. Displaying the second calendar date based on a magnitude of the set of one or more inputs reduces the number of inputs required to edit the user interface (e.g., without requiring the user to navigate to an editing user interface), thereby reducing the number of inputs needed to perform an operation. In some embodiments, the third date is selected based on the first magnitude. In some embodiments, the fourth date is selected based on the second magnitude. In some embodiments, the second magnitude is greater than the first magnitude and the fourth date is further into the future than the third date. In some embodiments the second magnitude is less than the first magnitude and the third date is further into the future than the fourth date. In some embodiments, the third date is further into the past than the fourth date. In some embodiments the fourth date is further into the past than the third date. In some embodiments, the magnitude is an amount of rotation of a rotatable input mechanism.

In some embodiments, the computer system (e.g., 1200) displays, via the display generation component (e.g., 1202), an indication of a current day in the second calendar system (e.g., 1206*k*), wherein the indication of the current day includes a different visual characteristic (e.g., location, color, and/or brightness) than indications of other calendar dates in the second calendar system. Displaying an indication of a current day with a different visual characteristic from other indications of dates in the second calendar system provides visual feedback about the current date, thereby providing improved feedback to the user. In some embodiments, the current day is highlighted. In some embodiments, the current day is outlined.

In some embodiments the second calendar system (e.g., 1206*i*) represents (e.g., is) a lunar calendar (e.g., a calendar that is based on the movement of the moon around the Earth or a calendar that is based on phases of the moon in relation to Earth). Displaying a second calendar system that represents a lunar calendar provides visual feedback about the lunar calendar, thereby providing improved feedback to the user. In some embodiments, the lunar calendar is associated with a religion. In some embodiments, the lunar calendar is associated with a location (e.g., a country and/or region).

In some embodiments, the first calendar system represents (e.g., is) a solar calendar (e.g., 1206*h*) (e.g., a calendar that is based on the movement of the Earth around the sun or the setting and rising of the sun in relation to Earth). Displaying a first calendar system that represents a solar calendar provides visual feedback about the solar calendar, thereby providing improved feedback to the user. In some embodiments, the solar calendar is a Gregorian calendar.

In some embodiments, the user interface includes indications of a plurality of calendar dates in the second calendar system (e.g., a lunar calendar) positioned around an indication of time (e.g., 1206*k*) (e.g., a digital indication of time and/or an analog indication of time that includes an hour hand, minute hand, and/or a seconds hand and, optionally, a dial with one or more hour markers and/or minute markers). Displaying a plurality of calendar dates in the second calendar system around an indication of time provides visual feedback about past and future dates of the calendar system, thereby providing improved feedback to the user. In some embodiments, the indications of the plurality of calendar dates in the second calendar system surround the clock face. In some embodiments, the indications of the plurality of calendar dates in the second calendar system form a circle or semi-circle around the clock face. In some embodiments, the indications of the plurality of calendar dates in the second calendar system form a ring around the clock face.

In some embodiments, the indication of time includes an analog indication of time (e.g., 1206*a*, 1206*b*, 1206*c*, or 1206*d*) (e.g., an hour, minute, and/or seconds hand, an hour marker, a minute marker, and/or a seconds marker). Displaying an analog indication of time provides visual feedback about the current time, thereby providing improved feedback to the user.

In some embodiments, in response to detecting the set of one or more inputs (e.g., 1208, 1210, and/or 1212), the computer system (e.g., 1200) rotates the indications of the plurality of calendar dates in the second calendar system (e.g., 1206*k*) (e.g., prior to detecting the set of one or more inputs, the indication of the plurality of calendar dates are displayed in a first orientation; after detecting the set of one or more inputs, the indication of the plurality of calendar dates are displayed in a second orientation that is different from the first orientation). Rotating the indication of the plurality of calendar dates in the second calendar system in response to detecting the set of one or more inputs reduces the number of inputs required to edit the user interface (e.g., without requiring the user to navigate to an editing user interface), thereby reducing the number of inputs needed to perform an operation.

In some embodiments, the indication of the first calendar date in the first calendar system (e.g., 1206*h*) is displayed at a position on the user interface in between the center of the user interface and the indication of the first calendar date in the second calendar system (e.g., 1206*i*). Displaying the indication of the first calendar date in the first calendar system at a position on the user interface in between the center of the user interface and the indication of the first calendar date in the second calendar system provides visual feedback about how the first calendar system and the second calendar system are related, thereby providing improved feedback to the user. In some embodiments, the indication of the first calendar date in the first system is displayed on top of the indication of the first calendar date in the second calendar system. In some embodiments, the indication of the first calendar date in the first system is displayed outside of the indication of the first calendar date in the second calendar system. In some embodiments, a representation of the first calendar system is displayed as a circle (e.g., a ring) around a representation of the second calendar system.

In some embodiments, the computer system (e.g., 1200) displays, via the display generation component (e.g., 1202), a representation of a moon (e.g., 1206*f*) (e.g., the Earth's moon) in the user interface, wherein a visual appearance of the moon indicates a current moon phase. Displaying a representation of a moon with a visual appearance that indicates a current moon phase provides visual feedback about the current moon phase, thereby providing improved feedback to the user. In some embodiments, the representation of the moon is displayed in the center of the user interface. In some embodiments, the representation of the moon is displayed behind an indication of time (e.g., an analog indication of time and/or a digital indication of time). In some embodiments, the representation of the moon is one of a plurality of representations of the moon. In some embodiments, the visual appearances of the plurality of representations of the moon indicates future moon phases and past moon phases. In some embodiments, the representation of the moon is displayed in a portion of a ring surrounding the center of the user interface. In some embodiments, the plurality of representations of the moon are displayed in the ring surrounding the center of the user interface. In some embodiments, the current moon phase is displayed in a subdivision of the ring.

In some embodiments, in response to detecting the set of one or more inputs (e.g., 1208, 1210, and/or 1212), the computer system (e.g., 1200) displays, via the display generation component, the representation of the moon (e.g., 1206*f*) with the visual appearance indicating a moon phase different from the current moon phase. Displaying the representation of the moon with the visual appearance indicating a moon phase different from the current moon phase in response to detecting the set of one or more inputs reduces the number of inputs required to edit the user interface (e.g., without requiring the user to navigate to an editing user interface), thereby reducing the number of inputs needed to perform an operation. In some embodiments the indication of the moon phase different from the current moon phase corresponds to the second calendar date. In some embodiments, the indication of the moon phase different from the current moon phase is a future moon phase. In some embodiments, the indication of the moon phase different from the current moon phase is a past moon phase. In some embodiments, the indication of the moon phase different from the current moon phase is in the middle of the user interface. In some embodiments, the indication of the moon phase different from the current moon phase is one of a plurality of representations of moon phases in the user interface.

In some embodiments, the computer system (e.g., 1200) displays, via the display generation component (e.g., 1202), a representation of a moon (e.g., 1206*f*) with a current moon phase in a central region of (e.g., in a center of) a dial of the user interface that indicates time and/or date information (e.g., a dial that indicates different hours of the day and/or a dial that indicates a correspondence between different dates on calendars of different calendar systems). Displaying a representation of a moon with a visual appearance that indicates a current moon phase in the central region of a dial of the user interface provides visual feedback about the current moon phase that is approximately the same distance from multiple different portions of the dial that indicates time and/or date information, thereby providing improved feedback to the user. In some embodiments, the user interface is a clock user interface and the dial is a dial of the clock user interface. In some embodiments, the current moon phase is displayed behind an indication of time (e.g., one or more watch hands and/or a digital indication of time).

In some embodiments, before detecting the set of one or more inputs (e.g., 1208, 1210, 1212), the representation of the moon (e.g., 1206*f*) is displayed with a first size. In response to detecting the set of one or more inputs (e.g., 1208) (e.g., a rotation of a rotatable input mechanism, a tap, a single input, or two or more inputs), the computer system (e.g., 1200) displays, via the display generation component (e.g., 1202), the representation of the moon with a second size that is larger than the first size (e.g., enlarging the indication of the current moon phase). Displaying the representation of the moon with a second size that is larger than the first size in response to detecting the set of one or more inputs reduces the number of inputs required to edit the user interface (e.g., without requiring the user to navigate to an editing user interface), thereby reducing the number of inputs needed to perform an operation. In some embodiments, the second indication of the current moon phase is displayed in response to detecting a second set of one or more inputs different from the set of one or more inputs.

In some embodiments, in response to detecting the set of one or more inputs (e.g., 1208, 1210, 1212) (e.g., a rotation of a rotatable input mechanism, a tap, a single input, or two or more inputs), the computer system (e.g., 1200) ceases to display an indication of the current time (e.g., 1206*a*, 1206*b*, 1206*c*, or 1206*d*) (e.g., an analog time, a digital time, one or more clock hands, one or more hour indications, one or more minute indications, and/or one or more seconds indications) and/or reducing visibility of the indication of the current time. Ceasing to display an indication of the current time and/or reducing visibility of the indication of the current time in response to detecting the set of one or more inputs reduces the number of inputs required to edit the user interface (e.g., without requiring the user to navigate to an editing user interface), thereby reducing the number of inputs needed to perform an operation. In some embodiments, the indication of the current time ceases to be displayed in response to detecting a second set of one or more inputs different from the set of one or more inputs.

In some embodiments, the set of one or more inputs includes (e.g., is) a rotation (1208) of a rotatable input mechanism (e.g., 1204) (e.g., a rotation of the rotatable input mechanism). Changing the displayed dates in response to a rotation of a rotatable input mechanism reduces the number of inputs required to edit the user interface (e.g., without requiring the user to navigate to an editing user interface), thereby reducing the number of inputs needed to perform an operation.

In some embodiments, in response to detecting the set of one or more inputs (e.g., 1208, 1210, 1212), the computer system (e.g., 1200) ceases to display and/or reducing visibility of a selectable user interface element (e.g., 1206*g*) that corresponds to an application on the computer system (e.g., a complication). Ceasing to display and/or reducing visibility of a selectable user interface element that corresponds to an application of the computer system in response to detecting the set of one or more inputs reduces the number of inputs required to edit the user interface (e.g., without requiring the user to navigate to an editing user interface), thereby reducing the number of inputs needed to perform an operation. In some embodiments, a complication refers to any clock face feature other than those used to indicate the hours and minutes of a time (e.g., clock hands or hour/minute indications). In some embodiments, complications provide data obtained from an application. In some embodiments, a complication includes an affordance that when selected launches a corresponding application. In some embodiments, a complication is displayed at a fixed, predefined location on the display. In some embodiments, complications occupy respective locations at particular regions of a watch face (e.g., lower-right, lower-left, upper-right, and/or upper-left).

In some embodiments, in accordance with a determination that the set of one or more inputs (e.g., 1208, 1210, and/or 1212) includes an input of a first amount and a first direction, the second calendar date of the first calendar system (e.g., 1206*h*) and the second calendar date of the second calendar system (e.g., 1206*i*) correspond to a first updated date. In accordance with a determination that the set of one or more inputs includes an input of a second amount (e.g., different from the first amount) and the first direction, the second calendar date of the first calendar system and the second calendar date of the second calendar system corresponds to a second updated date that is different from the first updated date. In accordance with a determination that the set of one or more inputs includes an input of the first amount and a second direction (e.g., different from the first direction), the second calendar date of the first calendar system and the second calendar date of the second calendar system corresponds to a third updated date that is different from the first updated date and the second updated date. In accordance with a determination that the set of one or more inputs includes an input of the second amount and the second direction, the second calendar date of the first calendar system and the second calendar date of the second calendar system correspond to a fourth updated date that is different from the first updated date, the second updated date, and the third updated date. Displaying the second calendar date corresponding to a first updated date based on a first amount and/or direction of an input and displaying the second calendar date corresponding to a second updated date different from the first updated date based on a second amount and/or direction of the input reduces the number of inputs required to edit the user interface (e.g., without requiring the user to navigate to an editing user interface), thereby reducing the number of inputs needed to perform an operation. In some embodiments, the first amount of the input is greater than the second amount of the input and the first updated date is separated from the first calendar date by more days than the second updated date is separated from the first calendar date. In some embodiments, the second amount of the input is greater than the first amount of the input and the second updated date is separated from the first calendar date by more days than the first updated date is separated from the first calendar date. In some embodiments, in accordance with a determination that the input is a first direction, the first updated date is before the first calendar date. In some embodiments, in accordance with a determination that the input is a second direction, the first updated date is after the first calendar date. In some embodiments, in accordance with a determination that the input is a first direction, the second updated date is before the first calendar date. In some embodiments, in accordance with a determination that the input is a second direction, the second updated date is after the first calendar date. In some embodiments, in accordance with a determination that the set of one or more inputs includes an input of a first amount and a first direction, the first updated date is the first amount of days before the first calendar date. In some embodiments, in accordance with a determination that the set of one or more inputs includes an input of a first amount and a second direction, the first updated date is the first amount of days after the first calendar date. In some embodiments, in accordance with a determination that the set of one or more inputs includes an input of a second amount and a first direction, the first updated date is the second amount of days before the first calendar date. In some embodiments, in accordance with a determination that the set of one or more inputs includes an input of a second amount and a second direction, the first updated date is the second amount of days after the first calendar date. In some embodiments, in accordance with a determination that the set of one or more inputs includes an input of a first amount and a first direction, the second updated date is the first amount of days before the first calendar date. In some embodiments, in accordance with a determination that the set of one or more inputs includes an input of a first amount and a second direction, the second updated date is the first amount of days after the first calendar date. In some embodiments, in accordance with a determination that the set of one or more inputs includes an input of a second amount and a first direction, the second updated date is the second amount of days before the first calendar date. In some embodiments, in accordance with a determination that the set of one or more inputs includes an input of a second amount and a second direction, the second updated date is the second amount of days after the first calendar date.

In some embodiments, the computer system (e.g., 1200) displays, via the display generation component (e.g., 1202), an indication of a holiday in the first calendar system (e.g., 1206*h*). Displaying an indication of a holiday in the first calendar system provides visual feedback about the dates of holidays, thereby providing improved feedback to the user. In some embodiments displaying the indication of the holiday includes highlighting a date in the first calendar system, increasing the brightness of a date in the first calendar system, outlining a date in the first calendar system. In some embodiments, an indication of a holiday for the second calendar system is displayed. In some embodiments, an indication of a holiday in the first calendar system is displayed concurrently with the indication of a holiday in the second calendar system. In some embodiments, the indication of the holiday is displayed in the user interface. In some embodiments, the indication of the holiday is displayed while displaying the first date. In some embodiments, the indication of the holiday is displayed while displaying the second date. In some embodiments, the indication of the holiday is displayed concurrently with the representations of the calendar systems. In some embodiments, in accordance with a determination that a time and/or date before or after a current time and/or date is displayed, the indication of the holiday is updated to indicate a holiday associated with the time and/or date before or after the current time and/or date.

In some embodiments, the computer system (e.g., 1200) detects a set of one or more inputs (e.g., 1208, 1216, and/or 1220) corresponding to a selection of a calendar type (e.g., Chinese, Islamic, Hebrew) of the second calendar system. In response to detecting the set of one or more inputs corresponding to the selection of the type of the second calendar system, the computer system displays the second calendar system with the selected calendar type. Displaying the second calendar system with the selected calendar type in response to a user input enables selection of settings according to the user's preference, which provides additional control options without cluttering the user interface. In some embodiments, the type of the second calendar system is representative of a religion. In some embodiments, the type of the second calendar system is representative of a place (e.g., a country and/or a region). In some embodiments, the set of one or more inputs corresponding to a selection of a calendar type of the second calendar system includes a sequence of inputs for entering an editing mode, selecting a user interface, tab, or page for selecting the type of the second calendar system, selecting the type of the second calendar system, and/or exiting the editing mode.

In some embodiments, the computer system (e.g., 1200) detects a set of one or more inputs (e.g., 1208, 1216, and/or 1220) corresponding to a selection of a color for a seconds indication of the user interface. In response to detecting the set of one or more inputs corresponding to the selection of the color for the seconds indication, displaying the seconds indication with the selected color. Displaying the seconds indication with the selected color in response to a user input enables selection of settings according to the user's preference, which provides additional control options without cluttering the user interface. In some embodiments, the seconds indication is a seconds hand of an analog clock face. In some embodiments, the seconds indication is a seconds counter of a digital clock face. In some embodiments, the set of one or more inputs corresponding to a selection of a color for a seconds indication of the user interface includes a sequence of inputs for entering an editing mode, selecting a user interface, tab, or page for selecting the color for a seconds indication of the user interface, selecting the color for a seconds indication of the user interface, and/or exiting the editing mode.

In some embodiments, the computer system (e.g., 1200) displays, via the display generation component (e.g., 1202), a representation of a star field (e.g., 1206*l*) in a background (e.g., 1206*e*) of the user interface (e.g., 1206). Displaying a representation of a star filed in a background of the user interface provides visual feedback about the position of the Earth, thereby providing improved feedback to the user. In some embodiments, the representation of the star field is based on a location of the computer system. In some embodiments, the representation of the star field changes based on the location of the computer system. In some embodiments, the representation of the star field is predetermined. In some embodiments, the representation of the star field is displayed concurrently with the representation of the moon, an indication of time, and/or the representations of the calendar system.

In some embodiments, the representation of the star field (e.g., 1206*l*) is displayed in a first position. The computer system (e.g., 1200) detects a movement of the computer system (e.g., 1210) and in response to detecting the movement of the computer system, displaying the representation of the star field in a second position. Displaying the representation of the star filed in a second position after detecting movement of the computer system reduces the number of inputs required to edit the user interface (e.g., without requiring the user to navigate to an editing user interface), thereby reducing the number of inputs needed to perform an operation. In some embodiments, the movement of the computer system is a wrist movement. In some embodiments, the first position and the second position represent a parallax effect. In some embodiments, the parallax effect includes updating the position at which the star field is displayed relative to a background of the user interface. In some embodiments, the parallax effect includes translating the star field on the display by a first distance and/or at a first velocity and translating the background of the user interface by a second distance different from the first distance and/or at a second velocity different from the first velocity. In some embodiments, the parallax effect includes translating the star field at the first velocity and translating other elements of the user interface at the second velocity different from the first velocity. In some embodiments, the star field is displayed with a displacement in its apparent position in the user interface. In some embodiments, the apparent position of the star field changes in response to the wrist movement. In some embodiments, the change in the apparent position of the star field is proportional to the change in position of the computer system that occurs due to the wrist movement. In some embodiments, the apparent position of the star field changes without changing the apparent position of other elements of the user interface (e.g., the first calendar date, the second calendar date, a ring, a representation of the moon, and/or a selectable user interface object).

In some embodiments, displaying the user interface (e.g., 1206) includes in accordance with a determination that the first calendar date in the second calendar system (e.g., 1206*i*) corresponds to a first month (e.g., a month that has a first number of days, such as 29), displaying a representation of the second calendar system with a first size (e.g., the amount of the ring dedicated to representing days of the calendar system). In accordance with a determination that the first calendar date in the second calendar system corresponds to a second month (e.g., a month that has a second number of days, such as 30), the computer system (e.g., 1200) displaying a representation of the second calendar system with a second size different from the first size. Automatically displaying the representation of the second calendar system with a size based on a month corresponding to a calendar date enables the user interface to convey the number of days in the month without requiring the user to provide additional inputs to configure the user interface (e.g., configuring the user interface by manually selecting the number of days in the month), thereby performing an operation when a set of conditions has been met without requiring further user input. In some embodiments, in accordance with a determination that the second calendar date in the second calendar system corresponds to the first month, the computer system displays the representation of the second calendar system with the first size. In some embodiments, in accordance with a determination that the second calendar date in the second calendar system corresponds to the second month, the computer system displays the representation of the second calendar system with the second size different from the first size. In some embodiments, in accordance with a determination that the first calendar date in the second calendar system corresponds to the first month and the second calendar date in the second calendar system corresponds to the second month, the computer system displays an animation of the representation of the second calendar system with the first size changing to the representation of the second calendar system with the second size. In some embodiments, in accordance with a determination that the first month and the second month have the same number of days, the representation of the second calendar system is displayed with the same size when displaying a date in the first month or a date in the second month. In some embodiments, displaying the representation of the second calendar system (e.g., a ring) with a second size different from the first size includes increasing and/or decreasing the size of the representation of the second calendar system, increasing and/or decreasing the size of one or more subdivisions (e.g., representations of the days) of the representation of the second calendar system, and/or increasing and/or decreasing the amount of the representation of the second calendar system that is occupied by one or more subdivisions of the representation of the second calendar system.

Note that details of the processes described above with respect to method 1300 (e.g., FIG. 13) are also applicable in an analogous manner to the methods described below/above. For example, methods 700, 900, 1100, 1500, 1700, and 1900 optionally includes one or more of the characteristics of the various methods described above with reference to method 1300. For example, method 1300 optionally includes one or more of the characteristics of the various methods described above with reference to method 700. For example, displaying a clock user interface with described with respect to method 1300 optionally includes displaying a simulated light effect as described with reference to method 700. For another example, method 1300 optionally includes one or more of the characteristics of the various methods described above with reference to method 900. For example, displaying a clock user interface described with reference to method 1300 optionally includes displaying an astronomical object. As another example, method 1300 optionally includes one or more of the characteristics of the various methods described above with reference to method 1100. For example, displaying a first calendar system and a second calendar system as described with respect to method 1300 optionally includes changing the style in which the first calendar system and the second calendar system are displayed as described with respect to method 1100. For another example, method 1300 optionally includes one or more of the characteristics of the various methods described below with reference to method 1500. For example, the indication of a first calendar date and the indication of a second calendar date as described with reference to method 1300 optionally includes an animated interaction between first numeral of the first calendar date and the second number of the second calendar date as described with reference to method 1500. For brevity, these details are not repeated below.

FIGS. 14A-14S illustrate example clock user interfaces including animated numerals, in accordance with some embodiments. The user interfaces in these figures are used to illustrate the processes described below, including the processes in FIG. 15.

FIG. 14A illustrates computer system 1400 (e.g., a smartwatch) with display 1402. Computer system 1400 includes rotatable and depressible input mechanism 1404. In some embodiments, computer system 1400 includes one or more features of device 100, device 300, and/or device 500. In some embodiments, computer system 1400 is a tablet, phone, laptop, desktop, and/or camera. In some embodiments, the inputs described below can be substituted for alternate inputs, such as a press input and/or a rotational input received via rotatable and depressible input mechanism 1404.

Computer system 1400 displays user interface 1406. In some embodiments, computer system 1400 displays user interface 1406 in response to detecting an input, such as a tap input, a wrist raise input, a press input received via rotatable and depressible input mechanism 1404, and/or a rotational input received via rotatable and depressible input mechanism 1404.

In some embodiments, user interface 1406 is displayed on a tablet, phone (e.g., a smartphone), laptop, and/or desktop. In some embodiments, user interface 1406 is displayed on a home screen, lock screen, and/or wake screen of a tablet, phone, laptop, and/or desktop.

In FIG. 14A, user interface 1406 includes a digital indication of time (which includes numerals 1406*a*, 1406*b*, 1406*c*, and 1406*d*), background elements 1406*e*, and background 1406*f*. Numerals 1406*a*, 1406*b*, 1406*c*, and 1406*d* represent animated characters with eyes and feet that move and interact with the environment around them while idle. In some embodiments, the animated characters have different shapes, sizes, and/or features (e.g., arms, hair, clothes, ears, hands, fingers, and/or feet). In some embodiments the animated characters have some shared characteristics (e.g., a plurality of the animated characters have feet or all of the animated characters have feet) and have some different characteristics (e.g., have different clothes and/or shapes). Numerals 1406*a*, 1406*b*, 1406*c*, and 1406*d* can bounce, dance, and/or move while staying in the general positions shown in FIG. 14A. Thus, user interface 1406 is a dynamic display in which the numerals that indicate the current time can interact with each other and the environment in an entertaining and appealing way.

Background elements 1406*e* are displayed in user interface 1406 with a parallax effect that causes the apparent position of background elements 1406*e* to change relative to background 1406*f* and/or numerals 1406*a*, 1406*b*, 1406*c*, and 1406*d* when certain movements of computer system 1400 are detected. In some embodiments, the parallax effect of background elements 1406*e* is not a portion of the animated movement of numerals 1406*a*, 1406*b*, 1406*c*, and 1406*d* discussed further below.

While displaying user interface 1406, computer system 1400 detects a change in time from 10:25 (as shown in FIG. 14A) to 10:26. When computer system 1400 detects a time change, the numeral of the time that is changing leaves (or appears to leave) user interface 1406 and is replaced with a new numeral. Thus, when the time changes from 10:25 to 10:26, numeral 1406*d* ("5") appears to leave user interface 1406 and is replaced with a new numeral 1406*d* ("6").

When the change in time occurs, computer system 1400 displays an animation in user interface 1406 in which the numerals leave and/or enter user interface 1406 and interact with each other. The animation displayed in user interface 1406 includes the numeral 5 moving (e.g., walking) towards the right side of display 1402 while the numeral 6 is entering from the right side of display 1402, as shown in FIG. 14B. The animation includes an interaction between the numeral 5 and the numeral 6 as the numeral 6 replaces the numeral 5 in the indication of time. For example, the numerals 5 and 6 impact (e.g., hit) each other and both of the numerals 5 and 6 close their eyes in response to the impact between them, as shown in FIG. 14C. The animation further includes the numerals 5 and 6 passing each other after impacting each other, with the numeral 6 taking the previous position held by the numeral 5 and the numeral 5 exiting the right side of display 1402, as shown in FIG. 14D. As shown in FIGS. 14B-14D numerals exit to an edge (e.g., a side edge or a top or bottom edge) of user interface 1406 closest to their current position and enter user interface 1406 from the edge closest to their destination position in user interface 1406.

In some embodiments, different numerals of user interface 1406 behave differently based on the value of the numeral. In some embodiments, a numeral moves with a speed and/or amount that is proportional (either directly or inversely) to the value of the numeral. For example, a numeral with a lower value walks faster, moves around more, and/or generally appears more energetic than a numeral with a higher value (e.g., the numeral with the higher value walks slower, moves around less, and/or generally appears less energetic than the numeral with the lower value). Thus, when the numerals 5 and 6 move and interact with each other as described above, the numeral 6 appears to move slower than the numeral 5 and reacts less energetically to the collision between the two numbers. Moreover, while the numerals are idle, the numeral 6 bounces less, sways from side to side less, and/or does not kick, while the numeral 1 bounces frequently and sways more from side to side.

While displaying user interface 1406, as shown in FIG. 14D, computer system 1400 detects user input 1408 of a wrist movement that moves computer system 1400 in an upward direction, as shown in FIG. 14E. FIG. 14E further illustrates the layers of user interface 1406, including a first layer in which numerals 1406*a*, 1406*b*, 1406*c*, and 1406*d* are displayed, a second layer in which background elements 1406*e* are displayed, and a third layer in which the background 1406*f* is displayed.

In response to detecting user input 1408, computer system 1400 displays movement of the various elements of user interface 1406, as shown in FIG. 14F. Numerals 1406*a*, 1406*b*, 1406*c*, and 1406*d* move the opposite direction of detected user input 1408 and thus move down (or appear to move down) in the first layer an amount proportion to the amount of movement. Accordingly, when a wrist movement of a first magnitude is received, numerals 1406*a*, 1406*b*, 1406*c*, and 1406*d* will move an amount proportional to the first magnitude, while when a wrist movement of a second magnitude is received, numerals 1406*a*, 1406*b*, 1406*c*, and 1406*d* move an amount proportional to the second magnitude.

In addition to the movement of numerals 1406*a*, 1406*b*, 1406*c*, and 1406*d*, background elements 1406*e* also move (or appear to move) in response to detecting user input 1408. In particular, as discussed above, background elements 1406*e* are displayed with a parallax effect, and thus the apparent position of background elements 1406*e* appears to move when computer system 1400 moves. In contrast to the movement of numerals 1406*a*, 1406*b*, 1406*c*, and 1406*d*, the movement of background elements 1406*e* is less pronounced and will occur even when minor inputs are received.

While displaying user interface 1406, as shown in FIG. 14G, computer system 1400 detects user input 1410 on numeral 1406*c*. User input 1410 can include a tap or press on the portion of display 1402 displaying numeral 1406*c*. In response to detecting user input 1410, computer system 1400 displays an animation of numeral 1406*c* responding to user input 1410 in user interface 1406. The animation of numeral 1406*c* responding to user input 1410 includes numeral 1406*c* moving away from display 1402 or a plane represented by display 1402 towards background 1406*f*, as shown in FIG. 14H. The distance that numeral 1406*c* moves or appears to move backwards corresponds to a duration of user input 1410, a number of discrete contacts on display 1402 in user input 1410, and/or a force or intensity of user input 1410. In FIG. 14H, user input 1410 is a tap or a quick press, which results in numeral 1406*c* moving back a smaller amount than if user input 1410 was a longer press, a more intense press, or included multiple contacts on display 1402.

As shown in FIG. 14I, after moving backwards in response to user input 1410, numeral 1406*c* moves towards display 1402 (or a plane represented by display 1402) to numeral 1406*c*'s original position (e.g., the position of numeral 1406*c* in FIG. 14G). Thus, numeral 1406*c* moves within user interface 1406 in a realistic manner in response to user input 1410 and similar user inputs.

While displaying user interface 1406 as shown in FIG. 14J, computer system 1400 detects user input 1412 on numeral 1406*d*. In response to detecting user input 1412, computer system 1400 displays an animation of numeral 1406*d* responding to user input 1410 in user interface 1406. Similarly to numeral 1406*c* discussed with respect to FIGS.

Figure 14L:
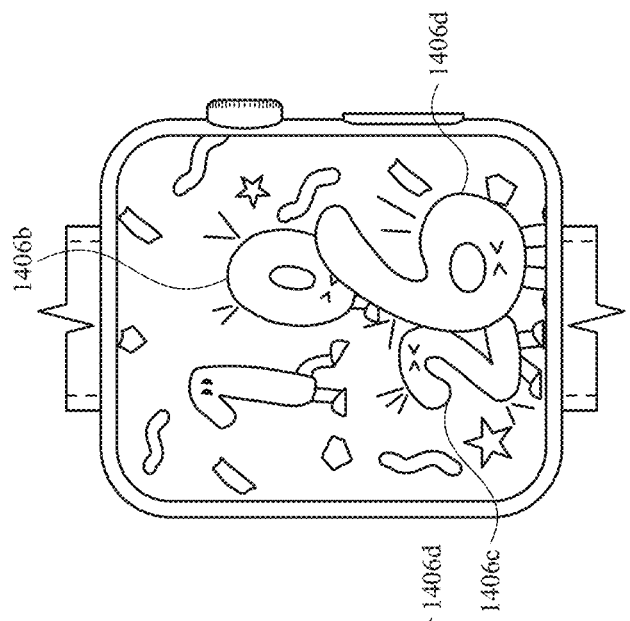
Figure 14K:
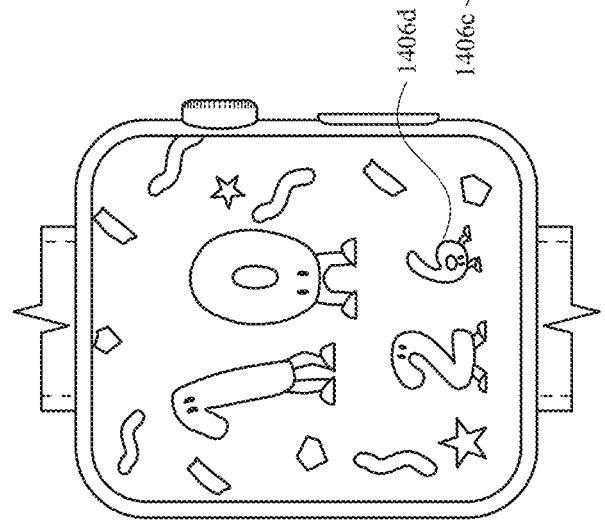

14H and 14I, numeral 1406*d* moves backwards away from display 1402 or a plane representing display 1402 an amount proportional to a magnitude of user input 1412 (as shown in FIG. 14K), and then moves towards display 1402 to return to its original position.

In contrast with user input 1410 discussed with respect to FIGS. 14H and 14I, user input 1412 has a greater magnitude (e.g., is a longer or more forceful input) than user input 1410 and thus numeral 1406*d* moves back farther than numeral 1406*c*. Additionally, because numeral 1406*d* moves back farther, numeral 1406*d* returns forward (e.g., bounces back) by a larger amount. Accordingly, as shown in FIG. 14L, numeral 1406*d* impacts numerals 1406*b* and 1406*c* as it returns towards its original position. Further, numeral 1406*d* moves past its original position to impact a plane representing display 1402 and overlaps numerals 1406*b* and 1406*c* in user interface 1406. After impacting the plane representing display 1402, numeral 1406*d* moves backwards until it reaches its original position, as shown in FIG. 14M.

In some embodiments, multiple taps on the same or substantially the same location are detected by computer system 1400. When multiple taps are detected by computer system 1400 in the same or substantially the same location, numerals 1406*a*, 1406*b*, 1406*c*, and 1406*d*, react to the multiple taps with greater movement than when a single tap is detected. This results in the numeral swinging back towards the plane representing display 1402 with a greater magnitude, as if a greater magnitude press or tap was detected by computer system 1400.

Figure 14P:
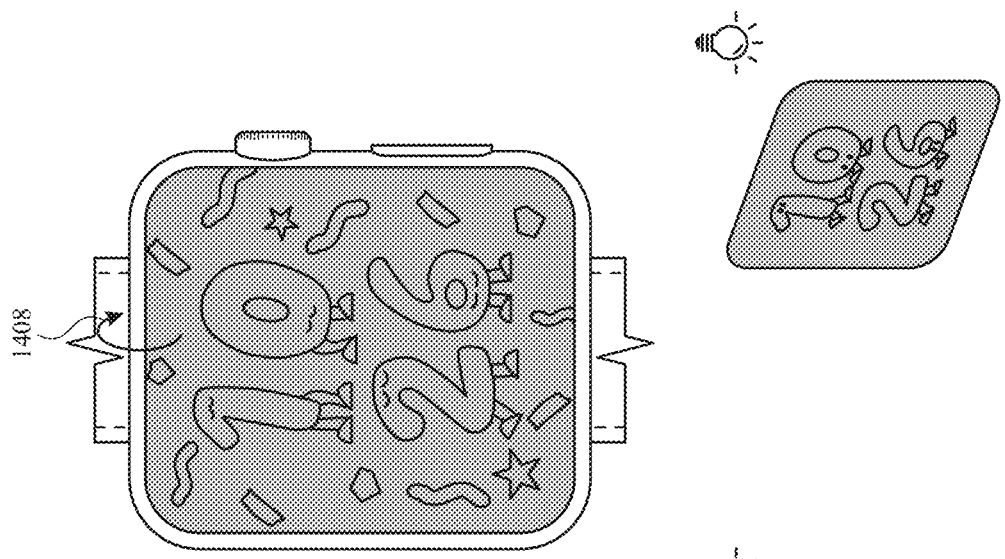

While displaying user interface 1406 as shown in FIG. 14M, computer system 1400 detects user input 1414 rotating rotatable input mechanism 1404 (which is, optionally, also depressible). In response to detecting user input 1414, computer system 1400 displays user interface 1406 including movement of background elements 1406*e* from an initial position in user interface 1406 to an updated position in user interface 1406 as shown in FIG. 14N. For example, user interface 1406 includes an animation of background elements 1406*e* moving around numerals 1406*a*, 1406*b*, 1406*c*, and 1406*d* based on user input 1414.

In some embodiments, the movement of background elements 1406*e* is disabled when a user input corresponding to a selection to disable the movement of background elements 1406*e* is detected. Accordingly, when the movement of background elements 1406*e* is disabled, background elements 1406*e* will not move in response to detecting a user input rotating rotatable input mechanism 1404 or in response to detecting movement of computer system 1400. Thus, the parallax effect of background elements 1406*e* and any movement caused by user input is disabled.

In FIGS. 14A-14N, user interface 1406 is illustrated in an active or full power mode during which a user is actively engaging with user interface 1406. While being displayed in the active mode, user interface 1406 includes a light source that appears to originate from the front of numerals 1406*a*, 1406*b*, 1406*c*, and 1406*d*, and thus user interface 1406 includes numerals 1406*a*, 1406*b*, 1406*c*, and 1406*d* with a front lit appearance. While being displayed in this mode, user interface 1406 also includes other indications of activity, including movements of numerals 1406*a*, 1406*b*, 1406*c*, and 1406*d*, such as numerals 1406*a*, 1406*b*, 1406*c*, and 1406*d* kicking, bouncing, moving their feet, drifting from side to side, and/or drifting back and forth by small amounts. The combination of lighting and movement indicates to a user that the interface is active and that numerals 1406*a*, 1406*b*, 1406*c*, and 1406*d* will respond to a user input.

Figure 14O:
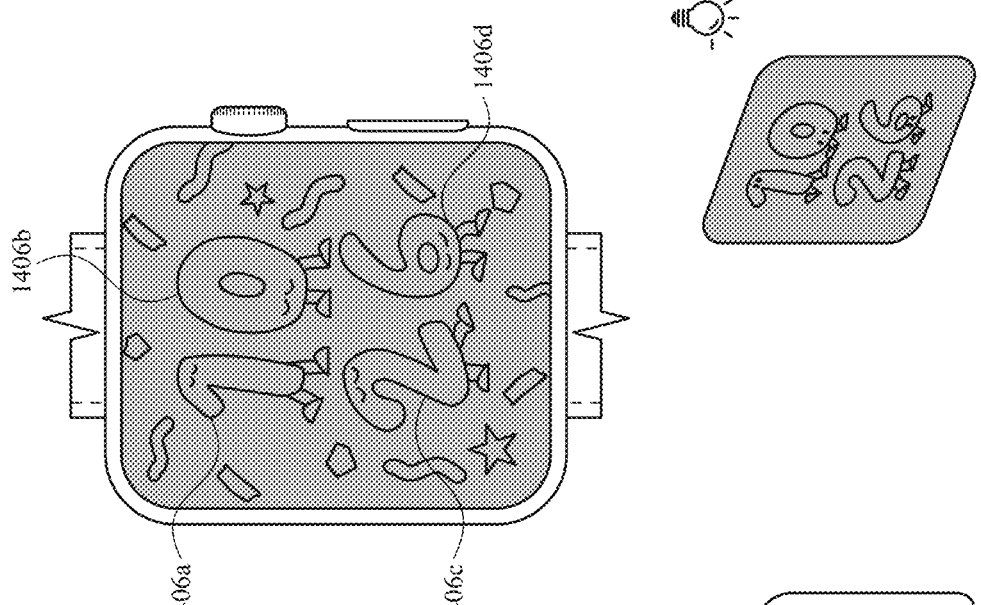
Figure 14N:
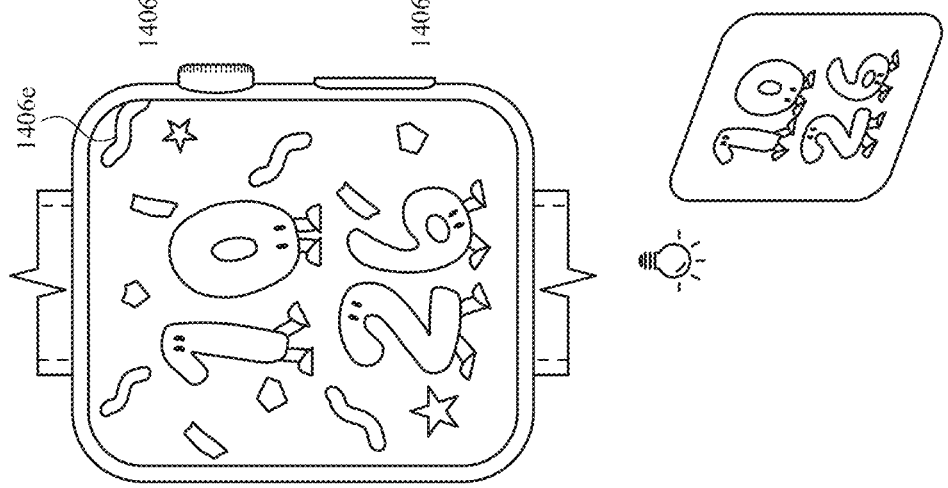

After (e.g., in response to) detecting a predetermined event, such as a predetermined amount of time (e.g., 10 second, 30 seconds, 1 minute, and/or 5 minutes) passing without the user interacting with user interface 1406 and/or computer system 1400, computer system 1400 enters a low power or sleep mode, and displays a corresponding version of user interface 1406, as shown in FIG. 14O. While being displayed in the low power mode, user interface 1406 includes a light source that appears to originate from behind numerals 1406*a*, 1406*b*, 1406*c*, and 1406*d*, and thus user interface 1406 includes numerals 1406*a*, 1406*b*, 1406*c*, and 1406*d* with a backlit appearance. While being displayed in the low power mode, user interface 1406 does not display movements of numerals 1406*a*, 1406*b*, 1406*c*, and 1406*d*, and instead displays numerals 1406*a*, 1406*b*, 1406*c*, and 1406*d* with their eyes closed.

While displaying user interface 1406 in the low power mode, as shown in FIG. 14P, computer system 1400 detects user input 1408 (e.g., a tap on display 1402, an input with rotatable input mechanism 1404, and/or a wrist movement that rotates computer system 1400 and/or moves computer system 1400 in an upward direction). In response to detecting user input 1408, computer system 1400 displays user interface 1406 in the active or high-power mode, as discussed with respect to FIGS. 14A-0.

FIG. 14Q illustrates computer system 1400 displaying user interface 1406 at 10:59, shortly before the current time changes to 11:00. When computer system 1400 detects that the time is changing to 11:00, computer system 1400 displays user interface 1406 with an animation indicating that the time is changing and including numerals 1406*b*, 1406*c*, and 1406*d* changing from 0, 5, and 9 to 1, 0, and 0 respectively, as shown in FIG. 14R. In particular, FIG. 14R shows each of numerals 1406*b*, 1406*c*, and 1406*d* leaving user interface 1406 and interacting with the numerals that will replace them.

Numeral 1406*b* ("0") exits user interface 1406 to the top of user interface 1406 as the top edge of user interface 1406 is the closest edge to the position of numeral 1406*b*. As the 0 moves towards the top of user interface 1406, the 1 that is replacing the 0 as numeral 1406*b* enters user interface 1406 from the same or substantially the same location. As the 0 and 1 pass each other, the animation includes an interaction between the 0 and the 1, including the 0 and the 1 impacting each other and reacting to the impact by, for example, closing their eyes.

Similarly, numeral 1406*c* ("5") exits user interface 1406 to the bottom of user interface 1406 as the bottom edge of user interface 1406 is the closest edge to the position of numeral 1406*c*. As the 5 move towards the bottom of user interface 1406, the 0 that is replacing the 5 as numeral 1406*c* enters user interface 1406 from the same or substantially the same location. As the 5 and the 0 pass each other, the animation includes an interaction between the 5 and the 0, including the 5 and the 0 impacting each other and reacting to the impact by, for example, closing their eyes.

Similarly, numeral 1406*d* ("9") exits user interface 1406 to the right of user interface 1406 as the right edge of user interface 1406 is the closest edge to the position of numeral 1406*d*. As the 9 moves towards the right edge of user interface 1406, the 0 that is replacing the 9 as numeral 1406*d* enters user interface 1406 from the same or substantially the same location. As the 9 and the 0 pass each other, the animation includes an interaction between the 9 and the 0, including the 9 and the 0 impacting each other and reacting to the impact by, for example, closing their eyes.

After each of numerals 1406b, 1406c, and 1406d has been replaced by their new numerals, computer system 1400 displays user interface 1406 including the new (or updated numerals), as shown in FIG. 14S.

FIG. 15 is a flow diagram illustrating a method for displaying a digital clock face with numbers that interact with each other in response to predetermined events using a computer system (e.g., 1400) in accordance with some embodiments. Method 1500 is performed at a computer system (e.g., a smartwatch, a wearable electronic device, a smartphone, a desktop computer, a laptop, or a tablet) that is in communication with a display generation component (e.g., 1402) (e.g., a display controller and/or a touch-sensitive display system). Some operations in method 1500 are, optionally, combined, the orders of some operations are, optionally, changed, and some operations are, optionally, omitted.

As described below, method 1500 provides an intuitive way for displaying a digital clock face with numbers that interact with each other in response to predetermined events. The method reduces the cognitive burden on a user for viewing a digital clock face with numbers that interact with each other in response to predetermined events, thereby creating a more efficient human-machine interface. For battery-operated computing devices, enabling a user to view a digital clock face with numbers that interact with each other in response to predetermined events faster and more efficiently conserves power and increases the time between battery charges.

In method 1500, the computer system (e.g., 1400) displays (1502) (e.g., concurrently displaying), via the display generation component (e.g., 1402), a clock user interface (e.g., 1406) (e.g., a watch face user interface) including a digital indication of time (e.g., an indication of a current time of day) that includes a first numeral (e.g., 1406a, 1406b, 1406c, or 1406d) (e.g., that represent an hour; in some embodiments, the numeral includes a number; in some embodiments, the numeral includes a digit; in some embodiments, the numeral includes multiple digits) and a second numeral (e.g., 1406a, 1406b, 1406c, or 1406d) (e.g., that represents a minute). The computer system detects (1504) a predetermined event (e.g., a change in time, an input, a raise or rotation gesture, a tap gesture (e.g., on a touch-sensitive surface), a voice command, a button press, and/or a rotation of a rotatable input mechanism). In response to detecting the predetermined event (1506), the computer system displays, via the display generation component, an animated interaction between the first numeral and the second numeral in the clock user interface (e.g., the first numeral moves based on movement of the second numeral, the second numeral moves based on movement of the first numeral, and/or the first numeral contacts the second numeral). Automatically displaying an animated interaction between the first numeral and the second numeral in the clock user interface enables the user interface to convey the current time as well as transitions in time without requiring the user to provide additional inputs to configure the user interface (e.g., configuring the user interface by manually the numerals interactions), thereby performing an operation when a set of conditions has been met without requiring further user input.

In some embodiments the computer system (e.g., 1400) is in communication with one or more input devices (e.g., a button, a rotatable input mechanism, a speaker, a camera, a motion detector (e.g., an accelerometer and/or gyroscope), and/or a touch-sensitive surface). In some embodiments, the interaction between the first numeral (e.g., 1406a, 1406b, 1406c, or 1406d) and second numeral (e.g., 1406a, 1406b, 1406c, or 1406d) includes a characteristic (e.g., location, orientation, motion, shape, size, and/or color) of the first numeral being based on (e.g., changing due to) a characteristic (or change in a characteristic) of the second numeral. In some embodiments, the interaction between the first numeral and second numeral includes a characteristic of the second numeral being based on (e.g., changing due to) a characteristic (or change in a characteristic) of the first numeral. In some embodiments, the interaction is based on a direction of the predetermined event (e.g., the numbers move in the same direction as a wrist movement). In some embodiments, the interaction includes a movement of the first numeral and the second numeral. In some embodiments, the movement of the first numeral and the second numeral is based on a direction of the predetermined event. In some embodiments, the first numeral and the second numeral move in the same direction. In some embodiments, the first numeral and the second numeral move in different directions. In some embodiments, the first numeral and second numeral hit when the first number and the second number move in different directions. In some embodiments, the interaction includes the numerals contacting (e.g., bouncing off of) a background of the clock user interface. In some embodiments, the interaction includes the numerals contacting (e.g., rebounding) a wall of the clock user interface. In some embodiments, the interaction includes the numerals contacting a screen (e.g., a virtual barrier representing the screen) of the computer system. In some embodiments, the interaction includes the first numeral contacting the second numeral. In some embodiments the interaction includes the second numeral contacting the first numeral. In some embodiments, in response to detecting the predetermined event, the clock user interface is displayed including an interaction between the first numeral and a third numeral. In some embodiments, the third numeral enters the clock user interface prior to the interaction. In some embodiments, the third numeral interacts with the first numeral as the first numeral leaves the clock user interface. In some embodiments, the direction side of the user interface that the third numeral enters from is based on a current time of day. In some embodiments, the interaction includes the numerals moving past each other. In some embodiments, the first numeral has a set of eyes. In some embodiments, the first numeral has a set of hands. In some embodiments, the first numeral has a set of feet. In some embodiments, the interaction includes the first numeral performing an action (e.g., blinking, waving, and/or dancing) in recognition of the second numeral. In some embodiments, the interaction includes the first numeral looking at the second numeral. In some embodiments, the interaction includes the first numeral looking away from the second numeral. In some embodiments, the interaction includes the first numeral kicking the second numeral. In some embodiments, the interaction includes the first numeral pointing at the second numeral.

In some embodiments, the predetermined event includes (e.g., is) a change in time. Automatically displaying an animated interaction between the first numeral and the second numeral in the clock user interface in response to a change in time enables the user interface to convey the current time as well as transitions in time without requiring the user to provide additional inputs to configure the user interface (e.g., configuring the user interface by manually the numerals interactions), thereby performing an operation when a set of conditions has been met without requiring further user input. In some embodiments, the predetermined event includes (e.g., is) a change in a minute of a current time (e.g., from 10:45 to 10:46) or a change in an hour of a current time (e.g., from 10:59 to 11:00).

In some embodiments, the predetermined event includes (e.g., is) a user input (e.g., 1408, 1410, 1412, and/or 1414). Displaying the animated interaction between the first numeral and the second numeral in the clock user interface in response to a user input reduces the number of inputs required to edit the user interface (e.g., without requiring the user to navigate to an editing user interface), thereby reducing the number of inputs needed to perform an operation. In some embodiments, the predetermined event includes (e.g., is) a predefined movement of at least a portion of the computer system (e.g., 1400) (e.g., a wrist raise gesture), a contact on a touch-sensitive surface (e.g., a tap gesture, a long press, or a swipe gesture), and/or a rotation of a rotatable input mechanism.

In some embodiments, displaying the animated interaction between the first numeral (e.g., 1406a, 1406b, 1406c, or 1406d) and the second numeral (e.g., 1406a, 1406b, 1406c, or 1406d) in the clock user interface (e.g., 1406) includes displaying an animation of the first numeral performing an action from a first set of behaviors and the second numeral performing an action from a second set of behaviors, wherein the first set of behaviors is different from the second set of behaviors. Displaying an animation of the first numeral performing an action from a first set of behaviors and the second numeral performing an action from a second set of behaviors provides visual feedback about first numeral and the second numeral, thereby providing improved feedback to the user. In some embodiments, the first set of behaviors does not change over time. In some embodiments, the second set of behaviors does not change over time. In some embodiments, the first set of behaviors and the second set of behaviors share one or more behaviors. In some embodiments, the first set of behaviors and the second set of behaviors both include walking, interacting with other numerals, and/or blinking.

In some embodiments, the animation of the first numeral (e.g., 1406a, 1406b, 1406c, or 1406d) performing an action from the first set of behaviors includes, in accordance with a determination that the first numeral has a first value, moving the first numeral at a first rate. In accordance with a determination that the first numeral has a second value, the first numeral moves at a second rate different from the first rate (e.g., numeral 9 moves slower than the numeral 2, the numeral 7 moves slower than the numeral 5, and the numeral 2 moves slower than the numeral 0). Moving the first numeral at a first rate when the first numeral has a first value and at a second rate when the first numeral has a second value provides visual feedback about the value of the first numeral, thereby providing improved feedback to the user. In some embodiments, the numerals move (e.g., walk) when the time changes. In some embodiments, the numerals move (e.g., bounce) when idle. In some embodiments, in accordance with a determination that the second numeral has a first value, the display of the second numeral moves at the first rate. In some embodiments, in accordance with a determination that the second numeral has a second value, the display of the second numeral moves at the second rate.

In some embodiments, the animated interaction between the first numeral (e.g., 1406a, 1406b, 1406c, or 1406d) and the second numeral (e.g., 1406a, 1406b, 1406c, or 1406d) includes the first numeral moving (e.g., bouncing, floating, and/or gliding) from an initial position to a second position and then back to the initial position. Displaying the first numeral moving from an initial position to a second position and then back to the initial position provides visual feedback about the interaction between the first numeral and the second numeral, thereby providing improved feedback to the user. In some embodiments, the first numeral and the second numeral contact each other. In some embodiments, the first numeral and the second numeral rebound off of each other. In some embodiments, the first numeral and the second numeral impact each other. In some embodiments, the first numeral and the second numeral bounce off of each other. In some embodiments, the contact between the first numeral and the second numeral is based on simulated physical properties (e.g., simulated mass, simulated inertia, simulated elasticity, and/or simulated friction) of the first numeral and the second numeral. In some embodiments, the movement of the first numeral and the second numeral after contacting each other is proportionally based on simulated physical properties of the first numeral and the second numeral. In some embodiments, the simulated physical properties of the first numeral and the second numeral are based on a characteristic (e.g., position, value, and/or size) of the first numeral and the second numeral. In some embodiments, the movement (e.g., walking, bouncing in place, and/or floating) of the first numeral and the second numeral is based on simulated physical properties of the first numeral and the second numeral.

In some embodiments, the first numeral (e.g., 1406a, 1406b, 1406c, or 1406d) includes a representation of one or more eyes, and wherein the animated interaction between the first numeral and the second numeral (e.g., 1406a, 1406b, 1406c, or 1406d) includes a change in the representation of the one or more eyes of the first numeral. Displaying a change in the representation of the one or more eyes of the first numeral provides visual feedback the about interaction between the first numeral and the second numeral, thereby providing improved feedback to the user. In some embodiments, the change in the eyes of the first numeral includes blinking. In some embodiments, the change in the eyes of the first numeral includes changing a direction the eyes look. In some embodiments the change in the eyes of the first numeral includes winking. In some embodiments, the animated interaction includes a change in the eyes of the second numeral. In some embodiments, the animated interaction includes both a change in the eyes of the first numeral and a change in the eyes of the second numeral. In some embodiments, the change in the eyes of the first numeral is different from the change in the eyes of the second numeral. In some embodiments, the change in the eyes of the first numeral is the same as the change in the eyes of the second numeral.

In some embodiments, the computer system (e.g., 1400) detects a tap gesture (e.g., 1410 and/or 1412) on the clock user interface (e.g., 1406). In some embodiments, the tap gesture is the predetermined event. In response to detecting the tap gesture on the clock user interface, the computer system displays, via the display generation component (e.g., 1402), an animation that includes the first numeral (e.g., 1406a, 1406b, 1406c, or 1406d) and/or the second numeral (e.g., 1406a, 1406b, 1406c, or 1406d) moving (or appearing to move) back away from a surface of the display generation component (e.g., opposite of a direction normal to the surface of the display generation component). Displaying an animation that includes the first numeral and/or the second numeral moving back away from a surface of the display generation component in response to detecting a tap gesture on the clock user interface reduces the number of inputs required to edit the user interface (e.g., without requiring the user to navigate to an editing user interface), thereby reducing the number of inputs needed to perform an operation. In some embodiments, the movement of the first numeral and/or the second numeral is based on simulated physical properties of the first numeral and the second numeral.

In some embodiments, the animation includes the first numeral (e.g., 1406a, 1406b, 1406c, or 1406d)) and/or the second numeral (e.g., 1406a, 1406b, 1406c, or 1406d) moving (or appearing to move) from an initial position towards the surface of the display generation component (e.g., 1402) and then back toward the initial position (e.g., as though rebounding off of a virtual barrier representing the surface of the display generation component). Displaying the animation including the first numeral and/or the second numeral moving from an initial position towards the surface of the display generation component and then back toward the initial position reduces the number of inputs required to edit the user interface (e.g., without requiring the user to navigate to an editing user interface), thereby reducing the number of inputs needed to perform an operation. In some embodiments, the first numeral and the second numeral move towards the screen of the computer system (e.g., 1400) after moving away from the screen of the computer system. In some embodiments, the movement of the first numeral and/or the second numeral towards the screen and away from the screen is based on simulated physical properties of the first numeral and the second numeral.

In some embodiments, in accordance with a determination that the tap gesture (e.g., 1410, 1412) is on a first location of the first numeral (e.g., 1406a, 1406b, 1406c, or 1406d) and/or the second numeral (e.g., 1406a, 1406b, 1406c, or 1406d), the animation includes the first numeral and/or the second numeral moving in a first manner. In accordance with a determination that the tap gesture is on a second location of the first numeral and/or the second numeral, the animation includes the first numeral and/or the second numeral moving in a second manner different from the first manner. Displaying the animation including the first numeral and/or the second numeral moving in a first manner when the tap gesture is on a first location of the first numeral and/or the second numeral and the animation including the first numeral and/or the second numeral moving in a second manner when the tap gesture is on a second location of the first numeral and/or the second numeral provides visual feedback about the location of the tap gesture, thereby providing improved feedback to the user. In some embodiments, the animated interaction is based on a location of the tap gesture on the first numeral. In some embodiments, the animated interaction is based on a location of the tap gesture on the second numeral. In some embodiments, the numeral that is impacted by the tap gesture moves and the other numeral does not move.

In some embodiments, the computer system (e.g., 1400) detects movement (e.g., 1408) (e.g., lifting and/or rotation) of at least a portion of the computer system that is determined to correspond to wrist movement (in some embodiments, the predetermined event includes (or is) the movement of at least a portion of the computer system that is determined to correspond to wrist movement.). In response to detecting the movement of at least a portion of the computer system that is determined to correspond to wrist movement (and/or in response to detecting the predetermined event), the computer system displays, via the display generation component (e.g., 1402), the first numeral (e.g., 1406a, 1406b, 1406c, or 1406d) and/or the second numeral (e.g., 1406a, 1406b, 1406c, or 1406d) in a second position different from a first position of the first numeral and/or the second numeral prior to detecting the movement of at least a portion of the computer system that is determined to correspond to wrist movement, wherein the second position the first numeral and/or the second numeral is based on the movement of at least a portion of the computer system that is determined to correspond to wrist movement (e.g., the first numeral and/or the second numeral move based on the movement). Displaying the first numeral and/or the second numeral in a second position different from a first position of the first numeral and/or the second numeral in response to detecting the movement of at least a portion of the computer system that is determined to correspond to wrist movement reduces the number of inputs required to edit the user interface (e.g., without requiring the user to navigate to an editing user interface), thereby reducing the number of inputs needed to perform an operation. In some embodiments, in accordance with a first movement, the first numeral and/or the second numeral move in a first manner (e.g., to a first position and/or size); and in accordance with second movement that is different from the first movement, the first numeral and/or the second numeral move in a second manner (e.g., to a second position and/or size) that is different from the first manner. In some embodiments, the change in position of the first numeral and/or the second numeral is directly proportional to an amount and/or speed of the movement of at least a portion of the computer system.

In some embodiments, in response to detecting the movement (e.g., 1408) of at least a portion of the computer system (e.g., 1400) that is determined to correspond to wrist movement (and/or in response to detecting the predetermined event), the computer system displays, via the display generation component (e.g., 1402), a background element (e.g., 1406e) (e.g., one or more shapes displayed behind the first numeral and the second numeral) in a second position different from a first position of the background element prior to detecting the movement of at least a portion of the computer system that is determined to correspond to wrist movement, wherein the second position of the background is based on the movement of at least a portion of the computer system that is determined to correspond to wrist movement. Displaying a background element in a second position different from a first position of the background element in response to detecting the movement of at least a portion of the computer system that is determined to correspond to wrist movement reduces the number of inputs required to edit the user interface (e.g., without requiring the user to navigate to an editing user interface), thereby reducing the number of inputs needed to perform an operation. In some embodiments, the change in position of the background element is directly proportional to an amount and/or speed of the movement of at least a portion of the computer system. In some embodiments, the change in position of the background element is greater than a change in position of the first numeral and/or the second numeral in response to the detecting the movement of at least a portion of the computer system, which creates a parallax effect.

In some embodiments, the computer system (e.g., 1400) detects a rotation (e.g., 1414) of a rotatable input mechanism (e.g., 1404) of the computer system. In response to detecting the rotation of the rotatable input mechanism of the computer system (and/or in response to the predetermined event), the computer system displays, via the display generation component (e.g., 1402), a background element (e.g., 1406e) (e.g., a shape and/or other feature displayed behind the numerals in the clock user interface) in a second position different from a first position of the background element prior to detecting the rotation of the rotatable input mechanism of the computer system. Displaying a background element in a second position different from a first position of the background element in response to detecting a rotation of a rotatable input mechanism of the computer system reduces the number of inputs required to edit the user interface (e.g., without requiring the user to navigate to an editing user interface), thereby reducing the number of inputs needed to perform an operation. In some embodiments, displaying the background element in the second position includes translating and/or rotating one or more features of the background element.

In some embodiments, while (or in accordance with a determination that) the computer system (e.g., 1400) is operating in a first display mode (e.g., a full-power mode and/or a normal mode), the computer system displays a first lighting effect (e.g., a daytime virtual lighting effect). While (or in accordance with a determination that) the computer system is operating in a second display mode (e.g., a low power mode and/or a reduced power mode), the computer system displaying a second lighting effect (e.g., a nighttime virtual lighting effect) that is different from the first lighting effect. Automatically displaying a first lighting effect in a first display mode and a second lighting effect in a second display mode enables the user interface to convey a current mode of operation without requiring the user to provide additional inputs to configure the user interface (e.g., configuring the user interface by manually selecting which lighting effect to display), thereby performing an operation when a set of conditions has been met without requiring further user input. In some embodiments, the nighttime virtual lighting effect is darker than the daylight virtual lighting effect. In some embodiments, the numerals are front lit (e.g., are (or appear to be) illuminated by a virtual light source that is in front of the numerals) in the daylight virtual lighting mode. In some embodiments, the numerals are backlit during the nighttime virtual lighting mode. In some embodiments, the numerals appear to be lit from beneath in the nighttime virtual lighting mode. In some embodiments, the numerals appear to be lit from above in the daylight virtual lighting mode.

In some embodiments, the first lighting effect includes lighting the numerals from the front (e.g., 1406a, 1406b, 1406c, and/or 1406d as illustrated in FIGS. 14A-14N) (e.g., a front lighting effect), and wherein the second lighting effect includes lighting the numerals from behind (e.g., 1406a, 1406b, 1406c, and/or 1406d as illustrated in FIGS. 14O and 14P) (e.g., a backlighting effect). Displaying the first lighting effect including lighting the numeral from the front and the second lighting effect including lighting the numerals from behind provides visual feedback about the current mode of operation of the computer system (e.g., 1400), thereby providing improved feedback to the user. Displaying the second lighting effect including light the numerals from behind provides improved visibility of the current time on a darker user interface, thereby providing improved visual feedback to the user.

In some embodiments, the first numeral (e.g., 1406a, 1406b, 1406c, or 1406d) and/or the second numeral (e.g., 1406a, 1406b, 1406c, or 1406d) do not move (e.g., are static) in the second display mode. Displaying the first numeral and/or the second numeral without moving in the second display mode provides visual feedback about the current mode of operation of the computer system, thereby providing improved feedback to the user. In some embodiments, the first numeral and/or the second numeral cease moving when (e.g., in response to) the computer system transitioning to the second display mode (e.g., the low power mode).

In some embodiments, the computer system (e.g., 1400) detects a set of one or more inputs (e.g., 1408, 1410, 1412, and/or 1414) corresponding to selection of a setting enabling movement of a background element (e.g., 1406e) (e.g., movement of one or more images, shapes, and/or icons displayed as part of the background). After (or in response to) detecting the set of one or more inputs corresponding to selection of the setting enabling movement of the background element, enabling movement of the background element. Enabling movement of the background element after detecting the set of one or more inputs corresponding to selection of a setting enabling movement of the background element enables selection of settings according to the user's preference, which provides additional control options without cluttering the user interface. In some embodiments, the computer system detects an input and in response to detecting the input: in accordance with a determination that the setting enabling movement of the background element is enabled, moves the background element, and in accordance with a determination that the setting enabling movement of the background element is disabled, foregoes moving the background element. In some embodiments, moving the background element includes displaying an animation of the background element moving. In some embodiments, the animation of the background element moving is displayed independently of other animations.

In some embodiments, displaying the animated interaction between the first numeral (e.g., 1406a, 1406b, 1406c, or 1406d) and the second numeral (e.g., 1406a, 1406b, 1406c, or 1406d) in the clock user interface includes (e.g., 1406) in accordance with a determination that the predetermined event includes an input (e.g., 1408, 1410, 1412, and/or 1414) (e.g., tap gesture) with a first magnitude (e.g., with a first duration and/or a first intensity), displaying a first animated interaction between the first numeral and the second numeral in the clock user interface. In accordance with a determination that the predetermined event includes an input (e.g., a tap gesture) with a second magnitude (e.g., a second duration and/or a second intensity) that is different from (e.g., longer than or shorter than) the first magnitude, the computer system displays (e.g., 1400) a second animated interaction between the first numeral and the second numeral in the clock user interface, wherein the second animated interaction between the first numeral and the second numeral in the clock user interface is different from the first animated interaction between the first numeral and the second numeral in the clock user interface (e.g., the animated interaction between the first numeral and the second numeral in the clock user interface is based on a duration of a tap gesture). Displaying an animated interaction between the first numeral and the second numeral in the clock user interface based on a duration of a tap gesture reduces the number of inputs required to edit the user interface (e.g., without requiring the user to navigate to an editing user interface), thereby reducing the number of inputs needed to perform an operation.

In some embodiments, displaying the animated interaction between the first numeral (e.g., 1406a, 1406b, 1406c, or 1406d) and the second numeral (e.g., 1406a, 1406b, 1406c, or 1406d) in the clock user interface (e.g., 1406) includes in accordance with a determination that the predetermined event includes a first number of separate inputs (e.g., 1408, 1410, 1412, and/or 1414) (e.g., a first number of tap or swipe gestures), displaying a third animated interaction between the first numeral and the second numeral in the clock user interface. In accordance with a determination that the predetermined event includes a second number of separate inputs (e.g., a second number of tap or swipe gestures) that is different from (e.g., greater than or less than) the first number of separate inputs, the computer system (e.g., 1400) displays a fourth animated interaction between the first numeral and the second numeral in the clock user interface, wherein the fourth animated interaction between the first numeral and the second numeral in the clock user interface is different from the third animated interaction between the first numeral and the second numeral. Displaying an animated interaction between the first numeral and the second numeral in the clock user interface based on a number of tap gestures reduces the number of inputs required to edit the user interface (e.g., without requiring the user to navigate to an editing user interface), thereby reducing the number of inputs needed to perform an operation. In some embodiments, a magnitude of the interaction is proportional to the number of tap gestures (e.g., the magnitude of an interaction that is displayed in response to a single tap is less than the magnitude of an interaction that is displayed in response to two or more taps). In some embodiments, the magnitude of an interaction includes an amount and/or speed of movement of the first numeral and/or the second numeral in the animated interaction.

Note that details of the processes described above with respect to method 1500 (e.g., FIG. 15) are also applicable in an analogous manner to the methods described above. For example, methods 700, 900, 1100, 1300, 1700, and 1900 optionally includes one or more of the characteristics of the various methods described above with reference to method 1500. For example, method 1500 optionally includes one or more of the characteristics of the various methods described above with reference to method 700. For example, displaying a clock user interface as described with respect to method 1500 optionally includes displaying a simulated light effect as described with reference to method 700. For another example, method 1500 optionally includes one or more of the characteristics of the various methods described above with reference to method 900. For example, displaying a clock user interface as described with respect to method 1500 optionally includes displaying an astronomical object as described with reference to method 900. As another example, method 1500 optionally includes one or more of the characteristics of the various methods described above with reference to method 1100. For another example, method 1500 optionally includes one or more of the characteristics of the various methods described above with reference to method 1300. For example, displaying a clock user interface as described with respect to method 1500 optionally includes displaying a time indication with a first set of style options, and in response to detecting the set of one or more inputs, displaying the time indication with a second set of style options as described with reference to method 1100. For example, displaying a clock user interface as described with respect to method 1500 optionally includes displaying a first calendar system and a second calendar system as described with reference to method 1300. For brevity, these details are not repeated below.

FIGS. 16A-16I illustrate example clock user interfaces that are displayed with colors that are based on a selected color, in accordance with some embodiments. The user interfaces in these figures are used to illustrate the processes described below, including the processes in FIG. 17.

Figure 16A:
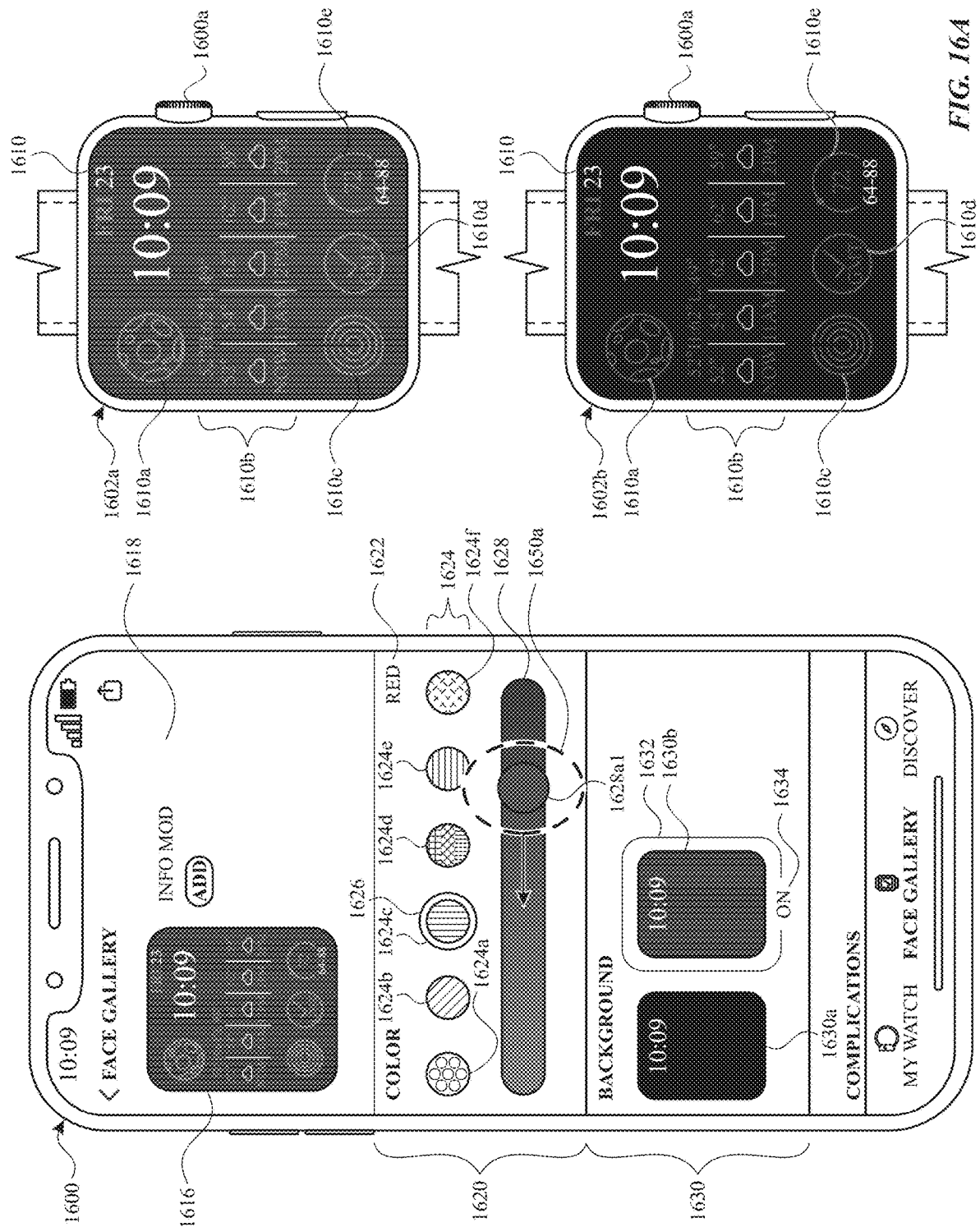

FIG. 16A illustrates computer system 1600 (e.g., a smartphone), computer system 1602*a* (e.g., the smartwatch on the upper portion of FIG. 16A), and computer system 1602*b* (e.g., the smartwatch on the lower portion of FIG. 16A) displaying various user interfaces. In some embodiments, one or more of computer systems 1600, 1602*a*, and 1602*b* is a tablet, phone, laptop, desktop, smartwatch, and/or camera. In some embodiments, one or more of computer systems 1600, 1602*a*, and 1602*b* includes one or more features of device 100, device 300, and/or device 500. In some embodiments, the inputs described below can be substituted for alternate inputs, such as a press input and/or a rotational input received via rotatable and depressible input mechanism 1600*a*. In some embodiments, computer systems 1600, 1602*a*, and 1602*b* are the same computer system.

As illustrated in FIG. 16A, computer system 1600 displays a clockface configuration user interface that includes clockface indicator 1616, clockface description 1618, color adjustment section 1620, and background adjustment section 1630. Clockface indicator 1616 is a preview of the clockface that is being configured using the clockface configuration user interface. Computer system 1600 updates clockface indicator 1616 as the settings for the clockface configuration user interface are changed (e.g., as discussed in relation to dragging input 1650*a* below). Clockface description 1618 is a name ("INFO MOD") that indicates the type of clockface that is currently being edited via the clockface configuration user interface. Adjustment section 1620 includes color controls 1624 and color slider 1628. Color controls 1624 include multi-color control 1624*a*, orange color control 1624*b*, red color control 1624*c*, gradient color control 1624*d*, blue color control 1624*e*, and purple color control 1624*f* The appearances of color controls 1624 are different, such that the appearance of a respective color control is indicative of the color controlled by the respective color control. In FIG. 16A, the color controls are illustrated to be different by each color having different hatching. In some embodiments, computer system 1600 does not display the hatching and/or displays color in lieu of and/or in addition to the hatching.

As illustrated in FIG. 16A, selection indicator 1626 is positioned around red color control 1624*c*, which indicates that red color control 1624*c* is selected. Because red color control 1624*c* is selected, computer system 1600 displays current selected color indicator 1622 ("Red") that indicates that the color is red. Moreover, computer system 600 displays color slider 1628 with a gradient slider that shows a spectrum of red (e.g., from light red on the left side of color slider 1628 to dark red on the right side of color slider 1628) because red color control 1624*c* is selected. The grey shading of color slider 1628 in FIG. 16A is intended to communicate the spectrum of red that is selectable via color slider 1628 (e.g., from light red to dark red). In FIG. 16A, selection indicator 1628*a*1 is located at a position on color slider 1628 that corresponds to a shade of red that is around 75% dark ("75% dark red") (e.g., as compared to the darkest red (e.g., red that is selected when the selection indicator 1628*a*1 is at position that is located at the right end of color slider 1628) that is selectable via color slider 1628)). Because of the location of selection indicator 1628*a*1 on color slider 1628, computer system 1600 shows clockface indicator 1616 with a background that has the 75% dark red color. As illustrated in FIG. 16A, background adjustment section 1630 includes background-off control 1630*a* and background-on control 1630*b*. In FIG. 16A, selection indicator 1632 is displayed around background-on control 1630*b* to indicate that the background of the clockface is turned on. When the background of the clockface is turned on, a computer system (e.g., 1602*a* and/or 1602*b*) can display the background of the clockface as having a non-black color and/or as having a color while the computer system is not operating in a particular reduced power state (e.g., low power state as discussed above in relation to FIG. 10C) (e.g., a particular state where display of one or more colors are minimized to conserve energy) (e.g., one or more particular reduced power states). At FIG. 16A, computer system 1602a (e.g., top right of FIG. 16A) is displaying user interface 1610 while not operating in the reduced power state, and computer system 1602b is displaying user interface 1610 while operating in the reduced power state. User interface 1610 is a clock user interface that includes an indicator of time. Notably, at FIG. 16A, computer system 1602a and computer system 1602b are displaying user interface 1610 based on the current settings (e.g., color controls 1624, color slider 1628, background-off control 1630a, and/or background-on control 1630b) of the clock-face configuration user interface displayed by computer system 1600 in FIG. 16A.

As illustrated in FIG. 16A, because computer system 1602a is not operating in the reduced power state, computer system 1602a displays user interface 1610 with a particular set of colors that are based on the current settings of the configuration user interface displayed by computer system 1600. As illustrated in FIG. 16A, computer system 1602a displays user interface 1610 as having a background that is the 75% dark red color (e.g., as indicated by the vertical hatching of the background at computer system 1602a, which matches the hatching of red color control 1624c, and the grey covering the background match the grey at the position of selection indicator 1628a1). Moreover, computer system 1602a displays user interface 1610 as having foreground elements, such as moon 1610a, weather compilation 1610b, activity complication 1610c, GMT complication 1610d, and thermostat (e.g., smart device) complication 1610e. As illustrated in FIG. 16A, one or more portions of the foreground elements are an accent color that is determined by the state of color slider 1628. Here, the accent color of the foreground element is the lightest red ("lightest red") (e.g., the red that is selected when slider indicator 1628a1 is located at the leftmost position on color slider 1628) that is selectable via color slider 1628. In some embodiments, the accent color is a color that is not represented on color slider 1628, and/or is a color that is not the lightest or the darkest color that is selectable via color slider 1628. In some embodiments, each complication controls and/or includes information from one or more different applications. In some embodiments, weather compilation 1610b includes information concerning, and/or uses, one or more processes associated with a weather application, activity complication 1610c includes information concerning, and/or uses, one or more processes associated with one or more health applications (e.g., such as a fitness tracking application and/or a biometric monitoring application), GMT complication 1610d includes information concerning, and/or uses, one or more processes associated with one or more clock applications, and thermostat complication 1610e includes information concerning, and/or uses, one or more processes associated with one or more smart home applications. In some embodiments, in response to computer system 1602a (or 1602b) detecting an input directed to weather compilation 1610b, computer system 1602 (or 1602b) displays a user interface for a weather application and ceases to display user interface 1610. In some embodiments, in response to computer system 1602a (or 1602b) detecting an input directed to activity complication 1610c, computer system 1602 (or 1602b) displays a user interface for a health application and/or a fitness application and ceases to display user interface 1610. In some embodiments, in response to computer system 1602a (or 1602b) detecting an input directed to thermostat complication 1610e, computer system 1602 (or 1602b) displays a user interface for a smart home application and ceases to display user interface 1610. In some embodiments, one or more user interfaces for the weather application, the health application, the fitness application, smart home application includes more content concerning a respective complication than the content that is displayed for the respective complication on user interface 610.

As illustrated in FIG. 16A, because computer system 1602b is operating in the reduced power state, computer system 1602b displays user interface 1610 with a different set of colors (e.g., different from the set of colors that computer system 1602a is using to display the background and foreground elements of user interface 1610) that are based on the current settings of the configuration user interface displayed by computer system 1600. At FIG. 16A, computer system 1602b displays user interface 1610, such that the background of user interface 1610 appears to be black. In addition, computer system 1602b displays the foreground elements (e.g., 1610a-1610e) of user interface 1610 using the 75% dark red color. Thus, as illustrated in FIG. 16A, when the computer system (e.g., smartwatch at FIG. 16A) is operating in a reduced power state, the computer system uses the selected color (e.g., 75% dark red color at FIG. 16A) as an accent color and/or the color for the foreground elements of user interface 1610, and when the computer system is not operating in the reduced power state, the computer system uses the selected color as the background color and chooses an accent color based on the selected color (e.g., based on the darkness of the selected color). In some embodiments, a computer system transitions from operating in the non-reduced power state (e.g., as shown by computer system 1602a) to a particular reduced power state (e.g., as shown by computer system 1602b), or vice-versa. In some embodiments, the computer system transitions from operating in the reduced power state to the non-reduced power state in response to the computer system detecting one or more inputs, such as a tap input, swipe input, wrist input (e.g., a wrist raise input and/or a wrist movement input) and/or other movement of the computer system (e.g., 1602a and/or 1602b). In some embodiments, the computer system transitions from operating in the non-reduced power state to the reduced power state in response to the computer system detecting one or more inputs, such as a tap input, a swipe input, a selection of a control, a cover gesture (e.g., where one or more portions of the user interface displayed by the computer system is covered with a hand), and/or a wrist lowering input. In some embodiments, the computer system transitions from operating in the non-reduced power state to the reduced power state in response to the computer system detecting one or more conditions, such as detecting that a user has not interacted with the computer system for a predetermined period of time (e.g., 1-90 seconds) and/or detecting that the computer system is no longer being worn (e.g., no longer on a body part (e.g., wrist) of a user). In some embodiments, as a part of transitioning the computer system from the operating in the reduced power state to the non-reduced power state, the computer system changes (e.g., gradually changes) the appearance of user interface 1610 from the appearance of user interface 1610 displayed by computer system 1602b in FIG. 16A to the appearance of user interface 1610 displayed by computer system 1602a in FIG. 16A. In some embodiments, as a part of transitioning the computer system from operating in the non-reduced power state to the reduced power state, the computer system changes (e.g., gradually changes) the appearance of user interface 1610 from the appearance of user interface 1610 displayed by computer system 1602a in FIG. 16A to the appearance of user interface 1610 displayed by computer system 1602b. At FIG. 16A, computer system 1600 detects leftward drag input 1650a on color slider 1628.

Figure 16B:
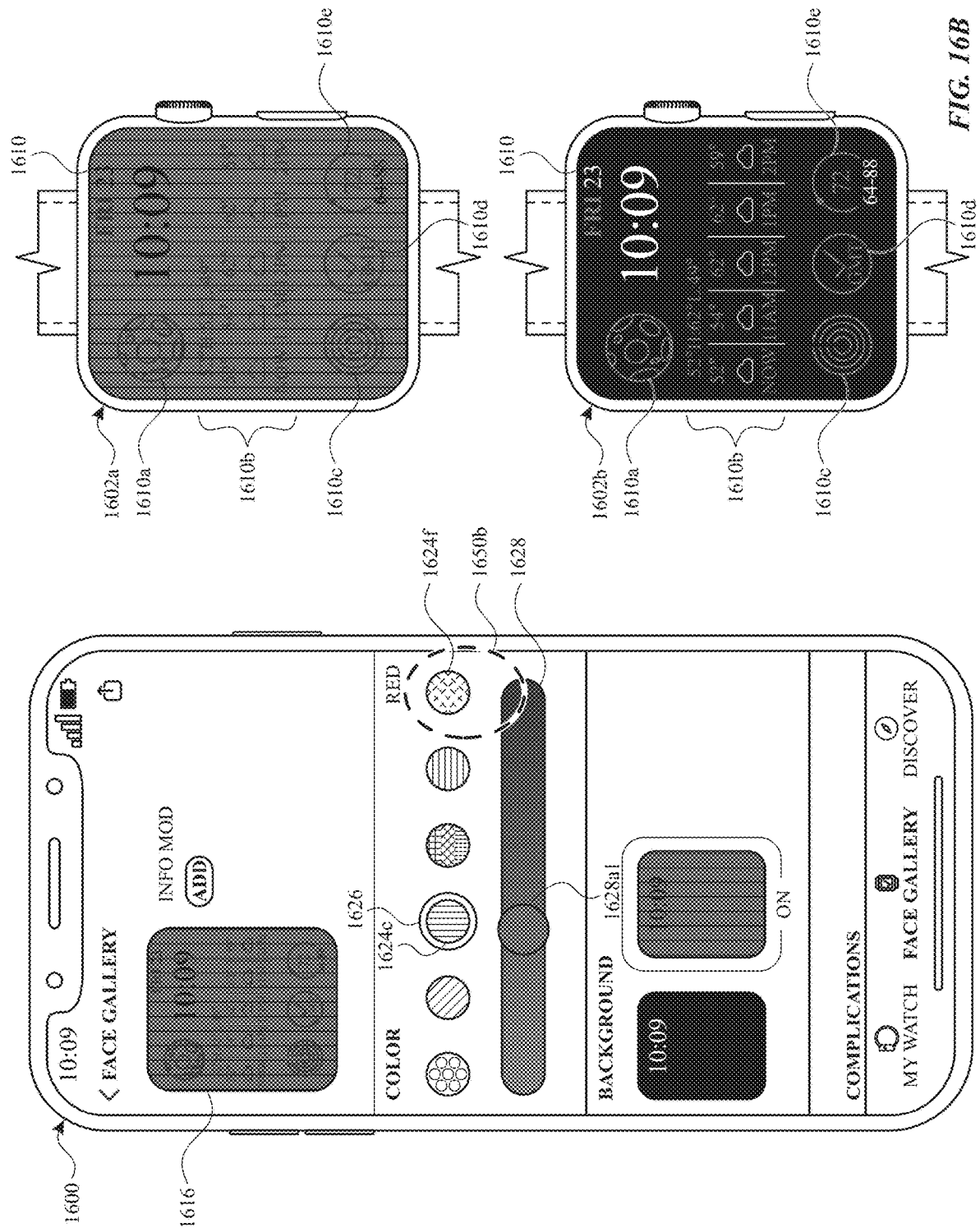

As illustrated in FIG. 16B, in response to detecting leftward drag input 1650a, computer system 1600 moves selection indicator 1628a1 to the left, such that selection indicator 1628a1 is located at a position on color slider 1628 that corresponds to a shade of red that is around 40% dark ("40% dark red"). In response to detecting leftward drag input 1650a, computer system 600 updates the background of clockface indicator 1616 to be 40% dark red (e.g., the newly selected color). As illustrated in FIG. 16B, computer system 1602a displays user interface 1610 based on the updated settings (e.g., updated via computer system 1600). At FIG. 16B, computer system 1602a updates the background of user interface 1610 to be 40% dark red because a new color was selected. In addition, computer system 1602a also updates the foreground elements (e.g., 1610a-1610e) to be a different accent color (e.g., than the accent color at FIG. 16A, the lightest red color). Here, computer system 1602a updates the accent color to be the darkest red ("darkest red") (e.g., the red that is selected when slider indicator 1628a1 is located at the rightmost position on color slider 1628) that is selectable via color slider 1628. Looking back at FIG. 16A, computer system 1602a used the lightest red as an accent color while the background was the darker red because a determination was made that the selected red (e.g., 75% dark red in FIG. 16A) had a first predetermined amount of darkness (e.g., at least 50% or another percentage of darkness). In contrast, at FIG. 16B, computer system 1602a uses the darkest red as the accent color while the background is a lighter red because a determination was made that the selected red (e.g., 40% dark red in FIG. 16B) did not have the first predetermined amount of darkness (e.g., at least 50% or another percentage of darkness). In some embodiments, the accent color is a color that is below/above a threshold on the red color spectrum (e.g., 0-30% below and/or 70-100% above) and not the lightest and/or darkest color on the red color spectrum. As illustrated in FIG. 16B, computer system 1602b displays user interface 1610 based on the updated settings, where computer system 1602b uses the 40% dark red color (e.g., the newly selected color) as the color for the foreground elements (e.g., 1610a-1610e). At FIG. 16B, computer system 1600 detects a tap input 1650b on purple color control 1624f.

As illustrated in FIG. 16C, in response to detecting tap input 1650b, computer system 1600 ceases to display selection indicator 1626 around red color control 1624c and displays selection indicator 1626 around purple color control 1624f, which indicates that purple color control 1624f is selected. As illustrated in FIG. 16C, computer system 1600 updates current selected color indicator 1622 ("Purple") to indicate that the currently selected color is purple. In response to detecting tap input 1650b, computer system 600 updates control slider 1628 to include a gradient slider that shows a spectrum of purple (e.g., from light purple on the left side of color slider 1628 to dark purple on the right side of color slider 1628) (e.g., because purple control 1624c is selected). The grey shading of color slider 1628 in FIG. 16C is intended to communicate the spectrum of purple that is selectable via color slider 1628 (e.g., from light purple to dark purple). The gray shading of color slider 1628 of FIG. 16A is different from the gray shading of color slider 1628 of FIG. 16C to communicate that computer system 1600 changed the appearance of the slider based on the selected colors (e.g., red vs. purple). In some embodiments, the difference in gray shading is not intended to communication an accurate relative portrayal of the red color spectrum and the purple color spectrum that computer system 1600 displays.

At FIG. 16C, selection indicator 1628a1 is positioned on color slider 1628 that corresponds to a shade of purple that is around 40% dark purple. As illustrated in FIG. 16C, computer system 1602a displays the background of user interface 1600 with the selected color 40% purple and displays foreground elements (e.g., 1610a-1610e) with an accent color that is the lightest purple on color slider 1628 because a determination was made that the selected purple (e.g., 40% dark purple in FIG. 16C) did not have the second predetermined amount of darkness (e.g., at least 30% or another percentage of darkness). As illustrated in FIG. 16C, computer system 1602b uses the selected color (e.g., 40% purple) as the accent color for the foreground elements (e.g., 1610a-1610e). Looking at FIGS. 16B-16C, computer system 1602a used a dark color (e.g., darkest red) as the accent color while 40% red was selected at FIG. 16B and uses a light color (e.g., lightest purple) as the accent color while 40% purple is selected at FIG. 16C. Thus, in some embodiments, different colors have different threshold for determining whether a color is dark enough to use a light color (e.g., lightest color on a color spectrum) as an accent color and/or light enough to use a dark color (e.g., darker color on a color spectrum) as the accent color. Therefore, in some embodiments, computer system 600 can display accent colors that are on opposite sides of each of their respective color spectrums for two corresponding colors (e.g., two different colors that represent the same percentage of color and/or two different colors represented by the same location on color slider 628. At FIG. 16C, computer system 1600 detects tap input 1650c on background-off control 1630a.

As illustrated in FIG. 16D, in response to detecting tap input 1650c, computer system 1600 displays background-off control 1630a as being selected (e.g., via selection indicator 1632 being displayed around background-off control 1630a) (e.g., turns a background setting off). As illustrated in FIG. 16D, computer system 1602c displays user interface 1610 while background-off control 1630a is selected. Computer system 1602c displays user interface 1610 while operating in the reduced power mode and the non-reduced power mode because background-off control 1630a is selected. Looking at FIG. 16D, some of the foreground elements (e.g., 610a-610e) and/or other content on user interface 1610 of FIG. 16D are larger than he foreground elements (e.g., 610a-610e) and/or other content on user interface 1610 displayed by computer system 1602b in FIG. 16C. This is because a computer system displays larger content when the background setting is off than when the background setting is on. In some embodiments, the computer system displays larger content when the background setting is off than when the background setting is on because the computer system does not have to transition user interface 1610 between displaying user interface 610 displayed by computer system 1602a at FIG. 16C and displaying user interface 610 displayed by computer system 1602b at FIG. 16C when the background setting is off. In some embodiments, the computer system can display content at a larger size when the background setting is off because the computer system is configured to use more screen real estate to display user interface 610 when the background setting is off than when the background setting is on. In some embodiments, computer system 1602c is computer system 1602a or computer system 1602*b*. At FIG. 16D, computer system 1600 detects tap input 1650*d*1 on background-on control 1630*b* and tap input 1650*d*2 on gradient color control 1624*d*.

As illustrated in FIG. 16E, in response to detecting tap input 1650*d*1 on background-on control 1630*b*, computer system 1600 displays background-on control 1630*b* as being selected (e.g., via selection indicator 1632 being displayed around background-on control 1630*b*) (e.g., turns a background setting on). Because background-on control 1630*b* is selected, a computer system (e.g., 1602*a* and/or 1602*b*) is configured to display different user interfaces based on whether the computer system is operating in the reduced power state or the non-reduced power state. As illustrated in FIG. 16E, in response to detecting tap input 1650*d*2 on gradient color control 1624*d*, computer system 1600 ceases to display selection indicator 1626 around purple color control 1624*f* and displays selection indicator 1626 around gradient color control 1624*d*, which indicates that gradient color control 1624*d* is selected. In addition, computer system 1600 ceases to display color slider 1628 because gradient color control 1624*d* does not correspond to a spectrum of selectable colors (e.g., where one color of the spectrum can be selected, as described above in relation to FIGS. 16A-16C). As illustrated in FIG. 16E, computer system 1602*a* displays user interface 1610 (and clockface indicator 1616) based on the current settings of computer system 1600 while computer system 1602*a* is not operating in the reduced power state. As illustrated in FIG. 16E, computer system 1602*a* displays user interface 1610 with the selected gradient as the background and uses white as the color for the one or more foreground elements (e.g., 1610*a*-1610*e*). In some embodiments, computer system 1602*a* uses black as the color for the one or more foreground elements. As illustrated in FIG. 16E, computer system 1602*b* displays user interface 1610 based on the current settings of computer system 1600 while computer system 1602*b* is operating in the reduced power state. As illustrated in FIG. 16E, computer system 1602*b* uses one or more colors within the selected gradient as accent colors for the foreground elements. At FIG. 16E, each of the foreground elements is a different color in the selected gradient. In some embodiments, the colors of the foreground elements go from light to dark (or dark to light) based on an order of the foreground elements. At FIG. 16E, computer system 1600 detects tap input 1650*e* on multi-color control 1624*a*.

As illustrated in FIG. 16F, in response to detecting tap input 1650*e*, computer system 1600 ceases to display selection indicator 1626 around gradient color control 1624*d* and displays selection indicator 1626 around multi-color control 1624*a*, which indicates that multi-color control 1624*a* selected. As illustrated in FIG. 16F, computer system 1602*a* displays user interface 1610 based on the current settings of computer system 1600 while computer system 1602*a* is not operating in the reduced power state. As illustrated in FIG. 16F, computer system 1602*a* displays the background of user interface 1610 with the colors that correspond to multi-color control 1624*a*, where a different color is used for a different portion of the background of user interface 1610. In addition, computer system 1602*a* displays the foreground elements using white (e.g., using one or more techniques discussed above in relation to FIG. 16E). As illustrated in FIG. 16F, computer system 1602*b* displays user interface 1610 based on the current settings of computer system 1600 while computer system 1602*b* is operating in the reduced power state. As illustrated in FIG. 16F, computer system 1602*b* uses multiple colors that correspond to multi-color control 1624*a* as accent colors for the foreground elements.

Figure 16G:
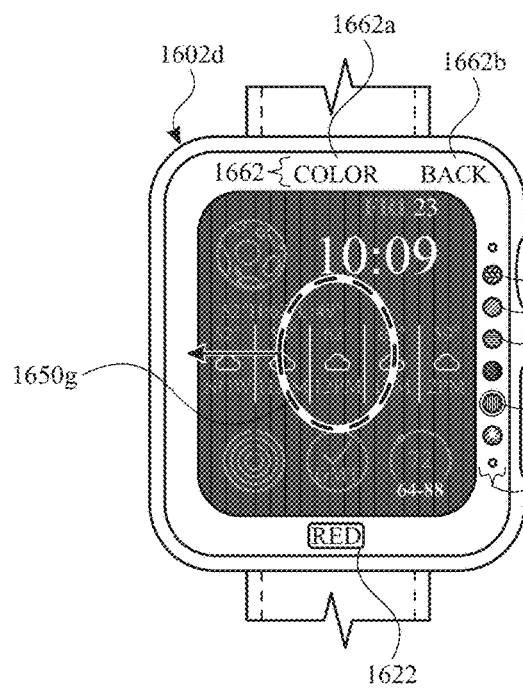
Figure 16H:
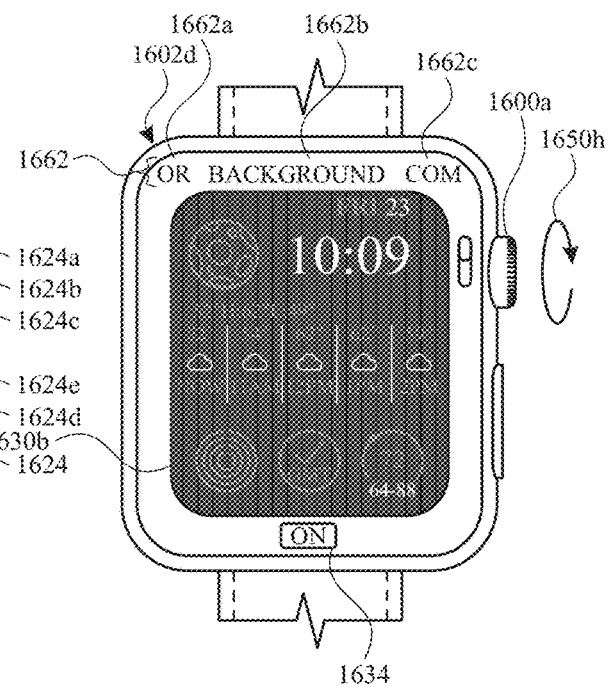

FIGS. 16G-16H illustrates an embodiment where computer system 1602*d* (e.g., a smartwatch) displays a clockface configuration user interface. In some embodiments, computer system 1602*d* is the same computer system as one or more of computer system 1602*a*-1602*c* that were referenced above. In some embodiments, user interface 1610 discussed in FIGS. 16A-16F can be configured using the same computer system that displays user interface 1610 (e.g., a smartwatch).

At FIG. 16G, computer system 1602*d* displays a clock configuration user interface that includes color controls 1624, which includes multi-color control 1624*a*, orange color control 1624*b*, red color control 1624*c*, gradient color control 1624*d*, blue color control 1624*e*, and purple color control 1624*f* The clock configuration user interface in FIG. 16G is currently showing the color settings page (e.g., as indicated by color page indicator 1662*a* being in the selected position (e.g., the center position and/or the center of computer system 1602*d* and/or the clock configuration user interface)). As illustrated in FIG. 16G, the clock user interface also includes background page indicator 1662*b*, which indicates that the next page involves a setting that is different from the color setting. At FIG. 16G, computer system 1602*d* displays red color control 1624*c* as being selected (e.g., as indicated by selection indicator 1626 being around red color control 1624*c*). Because red color control 1624*c*, computer system 1602*d* displays current selected color indicator 1622 around red color control 1624*c* to indicate that the selected color is red. In some embodiments, computer system 1602*d* displays a color slider (e.g., like color slider 1628 discussed above in relation to FIG. 16A) while red color control 1624*c* is selected. In some embodiments, in response to detecting a rotation of input mechanism 1600*a*, computer system 600 move a selection indicator on the slider to select between different colors on the red spectrum that is displayed via the color slider. At FIG. 16G, computer system 1602*d* detects leftward swipe input 1650*g*.

Figure 16I:
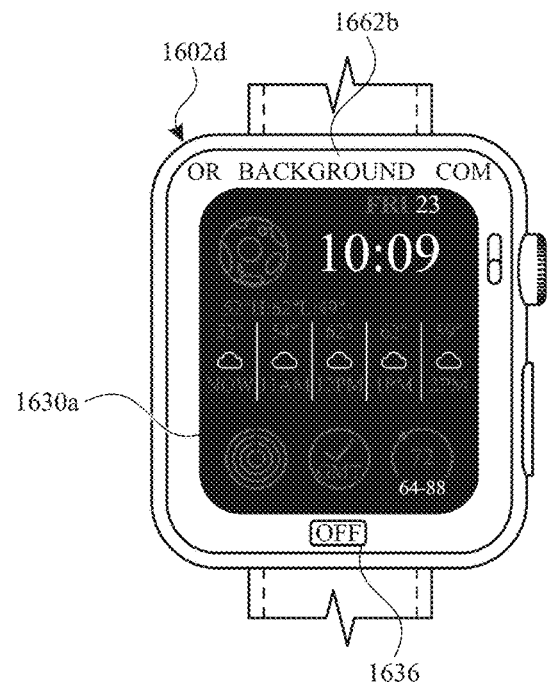

As illustrated in FIG. 16H, in response to detecting leftward swipe input 1650*g*, computer system 600 updates the clock configuration user interface to show the background settings page (e.g., as indicated by color page indicator 1662*b* being in the selected position (e.g., the center position and/or the center of computer system 1602*d* and/or the clock configuration user interface)). At FIG. 16H, the background settings page includes background-on control 1630*b*, which indicates that the background setting is currently on (e.g., as indicated by background setting indicator 1634). At FIG. 16H, computer system 1602*d* detects rotation input 1650*h* on input mechanism 1600*a*. As illustrated in FIG. 16I, in response to detecting rotation input 1650*h* on input mechanism 1800*b*, computer system 1602*d* displays background-off control 1630*c*, which indicates that the background setting is currently off (e.g., background setting indicator 1634). Thus, at FIG. 16I, computer system 1602*d* has turned the background setting off in response to detecting rotation input 1650*h* on input mechanism 1600*a*. In some embodiments, in response to detecting an additional rotation input on input mechanism 1600*a* (e.g., in the opposite direction of rotation input 1650*h*), computer system 1602*d* turns the background setting on and re-displays the user interface of FIG. 16H. In some embodiments, after updating one or more settings (e.g., color, background, and/or completions) via the clock configuration user interface and computer system 1602*d*, computer system 1602*d* displays user interface 1610 (e.g., discussed above in relation to FIGS. 16A-16F) based on the one or more updated settings (e.g., using one or more techniques discussed above in relation to FIGS. 16A-16F).

FIG. 17 is a flow diagram illustrating a method for displaying clock user interfaces that are displayed with colors that are based on a selected color using a computer system (e.g., 1600) in accordance with some embodiments. Method 1700 is performed at a computer system (e.g., 1600 and/or 1602a-1602d) (e.g., a smartwatch, a wearable electronic device, a smartphone, a desktop computer, a laptop, or a head mounted device (e.g., a head mounted augmented reality and/or extended reality device))) that is in communication with a display generation component (e.g., a display controller, a touch-sensitive display system, and/or a head mounted display system). In some embodiments, the computer system is in communication with one or more input devices (e.g., a button, a rotatable input mechanism, a speaker, a camera, a motion detector (e.g., an accelerometer and/or gyroscope), and/or a touch-sensitive surface. Some operations in method 1700 are, optionally, combined, the orders of some operations are, optionally, changed, and some operations are, optionally, omitted.

As described below, method 1700 provides an intuitive way for displaying clock user interfaces that are displayed with colors that are based on a selected color. The method reduces the cognitive burden on a user for displaying clock user interfaces that are displayed with colors that are based on a selected color, thereby creating a more efficient human-machine interface. For battery-operated computing devices, enabling a user to view and update the clock user interfaces that are displayed with colors that are based on a selected color faster and more efficiently conserves power and increases the time between battery charges.

The computer system detects (1702) a request to display a clock user interface (e.g., 1610) (e.g., a watch face user interface, a phone or tablet wake screen, or another user interface that includes an indication of time (e.g., an analog and/or digital indication of time), and/or a clock face) that includes a background and one or more foreground user interface elements (e.g., 1610a-1610e) (e.g., user interface elements that are overlaid on top of the background and/or user interface elements that include information, such as the time of day, the state of the weather, the state of one or more health metrics (e.g., heart rate and/or mediation)), wherein the background (or a color pattern of the background) is associated with (e.g., the color of the background is determined by) a currently selected (e.g., a user-selected (e.g., selected through one or more inputs detected at the computer system) and/or a manually selected) background color pattern (e.g., as indicated by 1628a1) (e.g., a solid color (e.g., red, blue, green, yellow, etc.) or a pattern that has a gradient (e.g., two or more colors). In some embodiments, the clock user interface is displayed on a wearable electronic device. In some embodiments, the clock user interface is displayed on a smartphone. In some embodiments, the clock user interface is displayed on a tablet. In some embodiments, the one or more foreground user interface elements includes one or more user interface elements, such as an indication of time, an indication of weather (e.g., current weather and/or weather for a physical location in a physical environment), an indication of one more health metrics and/or goals (e.g., number of detected steps taken in a day, number of times per hour that a person has detected to be standing, and/or a detected heart rate). In some embodiments, the current user-selected background color pattern corresponds to a background color pattern setting that has been set and/or adjusted by a user. In some embodiments, the request is detected in response to detecting a wake operation and/or that a wake operation should be performed. In some embodiments, detecting a wake operation includes detecting an input at or on the display generation component, detecting that the computer system has been raised, and/or detecting one or more inputs at and/or on a rotatable input mechanism and/or a hard button of the computer system. In some embodiments, in response to detecting the request to display the clock user interface that includes the background and the one or more foreground user interface elements, the computer system is transitioned from an inactive, a first power state, and/or a sleep state to an active state, a second power state that causes the computer system to use and/or to be configured to use more power than the first power state, and/or a wake.

In response to detecting the request to display the clock user interface that includes the background and the one or more foreground user interface elements (e.g., 1610a-1610e), the computer system displays (1704), via the display generation component, the clock user interface (e.g., 1610), including in accordance with a determination that the currently selected background color pattern corresponds to a first background color pattern (e.g., as indicated by 1628a1) (e.g., a solid color (e.g., red, blue, green, yellow, etc.) or a pattern such as a gradient (e.g., two or more colors)) displaying (1706), via the display generation component, (e.g., a color of and/or a color pattern of) the background with (e.g., to include and/or to be) the first background color pattern (and/or, in some embodiments, a color pattern (or color) that is backed on the first background color pattern) (and not with the second background color pattern, described below) (e.g., as described above in relation to user interface 1610 on computer system 1602a or 1602b) and displaying (1708), via the display generation component (and, in some embodiments concurrently with the background with the first background color pattern), (e.g., a color of (each of) and/or a color pattern of) the one or more foreground user interface elements (e.g., 1610a-1610e) with (e.g., to include and/or to be) a first foreground element color pattern that is different from the first background color pattern (and not with the second foreground element color pattern, described below) (e.g., one or more solid colors (e.g., red, blue, green, yellow, etc.) or a pattern that has a gradient (e.g., two or more colors (e.g., a secondary and/or a tertiary color)) (e.g., as described above in relation to user interface 1610 on computer system 1602a or 1602b) and in accordance with a determination that the currently selected background color pattern corresponds to a second background color pattern (e.g., as indicated by 1628a1) that is different from the first background color pattern displaying (1710), via the display generation component, (e.g., a color of and/or a color pattern of) the background with (e.g., to include and/or to be) the second background color pattern (and/or, in some embodiments, a color pattern (or color) that is backed on the first background color pattern) (and not with the first background color pattern) (e.g., as described above in relation to user interface 1610 on computer system 1602a or 1602b) and displaying (1710), via the display generation component (and, in some embodiments concurrently with the background with the second background color pattern), (e.g., a color of (each of) and/or a color pattern of) the one or more foreground user interface elements (e.g., 1610a-1610e) with (includes) a second foreground element color pattern that is different from the first foreground element color pattern and is different from the second background color pattern (e.g., as described above in relation to user interface 1610 on computer system 1602a or 1602b) (e.g., one or more solid colors (e.g., red, blue, green, yellow, etc.)

or a pattern such as a gradient (e.g., two or more colors (e.g., a secondary and/or tertiary color)) (and not with the first foreground element color pattern) (e.g., that is different from the first background color pattern, and/or the first foreground element color pattern). In some embodiments, the background with (and/or that has) the second background color pattern is not displayed with (and/or concurrently displayed with) the one or more foreground user interface elements with the first foreground element color pattern. In some embodiments, the background with the first background color pattern is not displayed with (and/or concurrently displayed with) the one or more foreground user interface elements with the second foreground element color pattern. In some embodiments, the background with the second background color pattern is not displayed with (and/or concurrently displayed with) the one or more foreground user interface elements with the first foreground element color pattern. In some embodiments, the one or more foreground user interface elements are displayed at one or more respective locations and/or continued be displayed at the same one or more locations, irrespective of the currently selected background color. In some embodiments, the first foreground element color pattern is derived from and/or chosen based one or more characteristics of the first background color pattern and is not derived from the second background color pattern. In some embodiments, the second foreground element color pattern is derived from and/or chosen based one or more characteristics of the second background color pattern and is not derived from the first background color pattern. Displaying the background with a respective background color pattern and the one or more foreground user interface elements with (that include) a respective foreground element color pattern (e.g., that is different) based on a determination concerning the currently selected pattern allows the computer system to perform an operation based on a user selected preference, which performs an operation when a set of conditions has been met, provides additional control options without cluttering the user interface with additional displayed controls, and provides improved visual feedback to the user.

In some embodiments, the clock user interface (e.g., 1610) that is displayed in response to detecting the request to display the clock user interface that includes the background and the one or more foreground user interface elements (e.g., 1610a-1610e) is displayed while operating in a first mode (e.g., mode described in relation to computer system 1602a) (e.g., a power mode that causes the computer system to use (or be configured to use) more power than the amount of power that is used while the computer system is operating in a second mode (e.g., a low power mode), a high power mode, and/or a full power mode). In some embodiments, while operating in the first mode and while displaying the background with the first background color pattern and the one or more foreground user interface elements with the first foreground element color pattern, the computer system detects a condition for transitioning the computer system (e.g., from operating in the first power mode) to operate in a second mode (e.g., mode described in relation to computer system 1602b) (e.g., a power mode that causes the computer system to use (or be configured to use) less power and/or a reduced form of power than the amount of power that is used while the computer system is operating in the first mode (e.g., a higher power mode), a low power mode, a hibernation mode, and/or a sleep mode) that is different from the first mode (e.g., as described above in relation to FIGS. 16A-16C). In some embodiments, in response to detecting the condition for transitioning the computer system to operate in the second mode (e.g., as described above in relation to FIGS. 16A-16C) (and in accordance with a determination that the currently selected background color pattern corresponds to the first background color pattern), the computer system transitions from operating in the first mode to operating in the second mode (e.g., as described above in relation to FIGS. 16A-16C. In some embodiments, while operating in the second mode, the computer system displays, via the display generation component, the background with a third background color pattern that is different from the first background color pattern (and, in some embodiments, the second background color pattern) (e.g., as described above in relation to computer system 1602b) and the computer system displays, via the display generation component, the one or more foreground user interface elements with a third foreground element color pattern that is different from the third background color pattern and the first foreground element color pattern (e.g., as described above in relation to computer system 1602b) (and, in some embodiments, and the second foreground element color pattern). In some embodiments, while operating in the first mode and while displaying the background with the second background color pattern and the one or more foreground user interface elements with the second foreground element color pattern, the computer system detects the condition for transitioning the computer system. In some embodiments, in response to system detecting the condition for transitioning the computer system transitions from operating in the first mode to operate in the second mode. In some embodiments, while operating in the second mode, the computer displays, via the display generation component, the background with a fourth background color pattern that is different from the second background color pattern (and, in some embodiments, the first background color pattern); and displays, via the display generation component, the one or more foreground user interface elements with a fourth foreground element color pattern that is different from the second background color pattern and the second foreground element color pattern (and, in some embodiments, and the first foreground element color pattern). In some embodiments, the fourth foreground element color pattern is the second background color pattern. In some embodiments, as a part of detecting the condition for transitioning the computer system to operate in the second mode, the computer system detects that a threshold period of time has passed (e.g., 5 seconds-5 minutes) since an input (e.g., a tap input and/or a non-tap input (e.g., a press-and-hold input, a mouse click, a rotation of the computer system's rotatable input mechanism, and/or a pressing of the computer system's hardware button) was detected by the computer system. In some embodiments, as a part of detecting the condition for transitioning the computer system to operate in the second mode, the computer system detects (e.g., via one or more accelerometers and/or gyroscopes) a wrist lowering gesture. In some embodiments, while operating in the second mode, the computer system detects a condition for transitioning the computer system to operate in the first mode. In some embodiments, as a part of detecting the condition for transitioning the computer system to operate in the first mode, the computer system detects one or more inputs (e.g., a tap input and/or a non-tap input (e.g., a press-and-hold input, a mouse click, a rotation of the computer system's rotatable input mechanism, and/or a pressing of the computer system's hardware button) and/or a wrist raise gesture). In some embodiments, as a part of transitioning from the first mode to the second mode, the computer system turns of one or more settings (e.g., a Wi-Fi setting that turns Wi-Fi connectivity on/off, a Bluetooth setting that turns Bluetooth connectivity on/off, a GPS tracking that turns GPS tracking on/off, and/or a battery conservation setting) and/or reduces one or more settings (e.g., a brightness setting and/or a time to be idle before sleeping/hibernating setting). In some embodiments, the third background color pattern is black. Displaying, via the display generation component, the background with a third background color pattern that is different from the first background color pattern and displaying, via the display generation component, the one or more foreground user interface elements with a third foreground element color pattern that is different from the third background color pattern and the first foreground element color pattern while operating in the second mode gives the computer system the ability to automatically change the color patterns of the background and the foreground user interface elements after the computer system has transitioned from operating in the first mode to the second mode, which performs an operation when a set of conditions has been met and provides improved visual feedback to the user.

In some embodiments, the third foreground element color pattern is the first background color pattern (e.g., as described above in relation to computer system 1602*b*). In some embodiments, in a reduced power mode (e.g., compared to another power mode), the foreground elements have the color pattern that was used to display the background while the computer system was in the other power mode (e.g., the mode where the computer system is configured to use more power than while in the reduced power mode). Displaying, via the display generation component, the one or more foreground user interface elements with the third foreground element color pattern that is the first background color pattern gives the computer system the ability to automatically change the color patterns of the background and the foreground user interface elements after the computer system has transitioned from operating in the first mode to the second mode, which performs an operation when a set of conditions has been met and provides improved visual feedback to the user.

In some embodiments, the clock user interface (e.g., 1610) includes first content that is displayed at a first size while operating in the first mode (e.g., as described above in relation to computer system 1602*c*). In some embodiments, while operating in the second mode: in accordance with a determination that the currently selected background color pattern satisfies a first set of dark background criteria (e.g., has color with a characteristic (e.g., amount of black and/or amount of darkness or brightness) that is above a first threshold (e.g., a threshold amount of black and/or darkness (e.g., 40%-60% black and/or dark) (e.g., amount of average blackness, darkness, and/or value (e.g., color value); minimum/maximum blackness, darkness, and/or value, and/or amount of total blackness, darkness, value)), the computer system displays, via the display generation component, the first content at a second size that is smaller than the first size (e.g., as described above in relation to computer system 1602*b*) and in accordance with a determination that the currently selected background color pattern satisfies the first set of dark background criteria, the computer system forgoes displaying, via the display generation component, the first content at the second size (e.g., as described above in relation to computer system 1602*c*). In some embodiments, in accordance with a determination that the currently selected background color pattern does not satisfy the first set of dark background criteria, the computer system displays the first content at the first size and/or a size that is between the first size and the second size. Displaying, via the display generation component, the first content at a second size that is smaller than the first size in accordance with a determination that the currently selected background color pattern satisfies the first set of dark background criteria gives the computer system the ability to automatically maximize the size of the first content in different conditions (e.g., whether the display generation appears to be bigger/smaller because the background will be black and/or non-black), which performs an operation when a set of conditions has been met and provides improved visual feedback to the user.

In some embodiments, while operating in the second mode, an appearance of the clock user interface (e.g., 1610) is the same (e.g., has the same visual appearance (e.g., with respect to layout, colors, and elements (e.g., is visually identical) (e.g., the size of the elements, the shape of the elements, spacing between the elements), irrespective of whether or not a first user-selected color pattern has been selected for use in a background of the clock user interface (e.g., 1610) (e.g., as opposed to a black, grey, default, or neutral color background). In some embodiments, in accordance with a determination that a first background setting is on and the computer system is operating in the first mode, the background is the currently selected background color pattern and the one or more foreground user interface elements are a color that is based on the currently selected background color pattern (e.g., changes as the currently selected background color pattern changes) and one or more other user interface elements are a default color, such as white or black. In some embodiments, in accordance with a determination that the first background setting is off and the computer system is operating in the first mode, the background is a primary color, such as black or white, the one or more foreground user interface elements are the currently selected background color pattern, and one or more other user interfaces elements are a default color, such as black or white. In some embodiments, in accordance with a determination that the first background setting is on and the computer system is operating in the second mode, the background is a default color, such as black or white, the one or more foreground user interface elements are the currently selected background color pattern, and one or more other user interfaces elements are a default color, such as black or white. In some embodiments, in accordance with a determination that the first background setting is off and the computer system is operating in the second mode, the background is a default color, such as black or white, the one or more foreground user interface elements are the currently selected background color pattern, and one or more other user interfaces elements are a default color, such as black or white. Displaying the clock user interface having the same size irrespective of whether or not a first user-selected color pattern has been selected for use in a background of the clock user interface allows the computer system to provide consistent visual feedback regardless of whether or not a first user-selected color pattern has been selected for use in the background of the clock user interface, which provides improved visual feedback.

In some embodiments, the clock user interface (e.g., 1610) includes second content, wherein (e.g., while the computer system is operating in the first mode or the second mode): in accordance with a determination that a second user-selected color pattern has been selected for use in the background of the clock user interface (e.g., via a second background setting, which is the same setting as described above in relation to the first background setting), the second content is displayed at a third size (e.g., as described above in relation to computer system 1602*c*) and in accordance with a determination that the second user-selected color pattern has not been selected for use in the background of the clock user interface, the second content is displayed at a fourth size that is larger than the third size (e.g., as described above in relation to computer system 1602*c*). In some embodiments, the second content is displayed at a larger size when the background setting is off (and/or the second user-selected color pattern has not been selected for use in the background of the clock user interface) because more a display of the computer system is useable while the background setting is off and/or the background is not being displayed with color than when the background setting is on and/or the background is being displayed with color. In some embodiments, the computer system displays a control for switching the second background setting. In some embodiments, in response to detecting input directed to the control for switching the second background setting, the computer system configures the background of the clock user interface to be turned on (e.g., displayed with a color that is not white (or solid black or white) and/or black and/or displayed with the currently selected background color pattern) and/or configured the background of the clock user interface to be turned off (e.g., displayed without the color that is not white and/or black (or solid black or white) and/or displayed with the currently selected background color pattern). Displaying the content at a different size based on whether or not the second user-selected color pattern has been selected for use in the background of the clock user interface gives the computer system the ability to automatically maximize the size of the first content in different conditions (e.g., whether the display generation appears to be bigger/smaller because a color pattern has been selected as the background color), which performs an operation when a set of conditions has been met and provides improved visual feedback to the user.

In some embodiments, the first background color pattern (or the second background color pattern) is a solid color (e.g., one color, such as red, blue, yellow, green, magenta, and/or orange) (e.g., as described above in relation to computer system 1602*a* of FIGS. 16A-16C) (e.g., 1624*c*). Having a first background color pattern that is a solid color pattern, which can be the currently selected color pattern, provides the user with more control options regarding the user's preferences for how the clock user interface will be displayed, which provides the user with more control over the computer system and provides improved visual feedback.

In some embodiments, the first background color pattern (or the second background color pattern, the first foreground element color pattern, and/or the second foreground element color pattern) includes one or more of a visual texture (e.g., a color texture) and a gradient (e.g., as described above in relation to computer system 1602*a* of FIG. 16E) (e.g., 1624*d*). In some embodiments, the first background color pattern is a first solid color, and the second background color pattern includes (and/or is) a first gradient (e.g., that is different from the first solid color) and/or a first texture, or vice-versa. In some embodiments, the first background color pattern includes a second texture, and the second background color pattern includes a third texture that is different from the second texture. In some embodiments, the first background color pattern includes a second gradient, and the second background color pattern includes a third gradient that is different from the second gradient. Having a first background color pattern that includes one or more of a texture and a gradient, which can be the currently selected color pattern, provides the user with more control options regarding the user's preferences for how the clock user interface will be displayed, which provides the user with more control over the computer system and provides improved visual feedback.

In some embodiments, the first background color pattern includes a gradient formed by a plurality of colors arranged in a predetermined order (e.g., pattern) (or the second background color pattern, the first foreground element color pattern, and/or the second foreground element color pattern) (e.g., different colors for different foreground elements that change in one direction (e.g., light to dark and/or dark to light) based on the gradient and, in some embodiments, each foreground element is a different color that is represented by the gradient). In some embodiments, an approximation of a gradient rather than a true gradient formed by an ordered progression in brightness, hue, and/or saturation of a single color).

In some embodiments, the one or more foreground user interface elements (e.g., 1610*a*-1610*e*) include a first selectable user interface element (e.g., 1610*a*-1610*e*). In some embodiments, in accordance with a determination that the currently selected background color pattern corresponds to the first background color pattern, the first selectable user interface element (e.g., a complication (e.g., a watch face element that does not convey a current time of day)) is displayed with the first foreground element color pattern and in accordance with a determination that the currently selected background color pattern corresponds to the second background color pattern, the first selectable user interface element is displayed with the second foreground element color pattern. In some embodiments, a selectable user interface element is associated with an application. In some embodiments, a complication refers to any clock face feature other than those used to indicate the hours and minutes of a time (e.g., clock hands or hour/minute indications). In some embodiments, complications provide data obtained from an application. In some embodiments, a complication includes an affordance that when selected launches a corresponding application. In some embodiments, a complication is displayed at a fixed, predefined location on the display. Displaying the first selectable user interface element with a particular color pattern that is based on the currently selected background color pattern allows the computer system to automatically set the color pattern to use for the first selectable user interface element based on the currently selected background color pattern (e.g., set by the user) without requiring additional input, which performs an operation when a set of conditions has been met, provides improved visual feedback to the user, and gives the computer system the ability to conserve energy by modifying display of the clock user interface.

In some embodiments, the one or more foreground user interface elements (e.g., 1610*a*-1610*e*) include a second selectable user interface element (e.g., 1610*a*-1610*e*) that is different from the first selectable user interface element. In some embodiments, while displaying the one or more foreground user interface elements that include the first selectable user interface element and the second selectable user interface element, the computer system detects a respective input directed to the one or more foreground user interface elements. In some embodiments, in response to detecting the respective input: in accordance with a determination that the respective input is directed to the first selectable user interface element, the computer system displays, via the display generation component, a first application user interface corresponding to the first selectable user interface element (e.g., and corresponds to a first application) (e.g., as described above in relation to FIG. 16A) and in accordance with a determination that the respective input is directed to the second selectable user interface element, the computer system displays, via the display generation component, a second application user interface corresponding to the second selectable user interface element (e.g., and corresponds to a second application that is different from the first application) (e.g., as described above in relation to FIG. 16A), wherein the second application user interface is different from the first application user interface. In some embodiments, in response to detecting the input directed to a selectable user interface element, the computer system launches the application user interface (and/or the application) corresponding the selectable user interface element. Displaying, via the display generation component, an application user interface corresponding to the selectable user interface object in response to detecting the input directed to the selectable user interface element (e.g., that is displayed with a particular color pattern that is based on the currently selected background color pattern allows the computer system) to provide the user with optional control for launching an application that corresponds to a selectable user interface element, where the color of the selectable user interface element has been chosen based on the currently selected background color pattern, which provides the user with more control over the computer system and provide improved visual feedback to the user.

In some embodiments, while displaying the clock user interface (e.g., 1610) that includes the background and the one or more foreground user interface elements (e.g., and while displaying an editing user interface), the computer system detects a first input (e.g., 1650a, 1650b, and/or 1650d2) directed to a control for modifying the currently selected background color pattern. In some embodiments, in response to detecting the first input (e.g., 1650a, 1650b, and/or 1650d2) (e.g., tap input, a swipe input, a drag input, and/or a non-tap input and/or a non-swipe input (e.g., a mouse click, a mouse press-and-dragging input, and/or one or more air gestures)) directed to the control for modifying the currently selected background color pattern: the computer system changes the currently selected background color pattern to a modified background color pattern (e.g., and displaying the background with the modified background color pattern) (e.g., as described above in relation to FIGS. 16A-16E) and the computer system changes the one or more foreground user interface elements from a first color (and/or color pattern) to a second color (and/or color pattern) (e.g., the one or more foreground user interface elements the first color modifying to the second color) (e.g., and displaying the one or more foreground user interface elements with the second color) (e.g., as described above in relation to FIGS. 16A-16E). In some embodiments, the second color is not the color that corresponds to the control for modifying the currently selected background color pattern but is based on the color that corresponds to the control for modifying the currently selected background color pattern (e.g., when a background setting is on and/or a user has selected the background to be a color pattern based on the state of a background setting). In some embodiments, the second color is the color that corresponds to the control for modifying the currently selected background color pattern but is based on the color that corresponds to the control for modifying the currently selected background color pattern (e.g., when a user has not selected a color pattern to be used for the background). In some embodiments, the clock user interface is a representation of the clock user interface (e.g., in an editing mode and/or editing user interface). Displaying, via the display generation component, the one or more foreground user interface elements modifying from a first color to a second color in response to detecting the first input allows the user to get visual feedback concerning how the one or more foreground user interface elements are modified based on a change to the currently selected background color pattern, which provides visual feedback to the user, reduces the risks of an unintended change to the user, and reduces the number of additional inputs that would be needed to manually change or reverse the changes to the one or more foreground user interface elements.

In some embodiments, the control for modifying the currently selected background color pattern is a control (e.g., a button and/or an affordance) for modifying the currently selected background color pattern to a discrete color (e.g., a specific color selected from a plurality of predefined color options) (e.g., 1624b, 1624c, and/or 1624e). In some embodiments, the control for modifying the currently selected background color pattern to the discrete color is displayed concurrently with a plurality of controls for modifying the currently selected background color pattern to a plurality of discrete colors, where each control corresponds to a different discreet color. In some embodiments, the one or more foreground user interface elements (e.g., 1610a-160e) is modified from the first color to the second color discretely and not based on movement of the first input after the first input was initially detected. In some embodiments, modifying from the first color to the second color occurs discretely. Discretely modifying the color pattern of the one or more foreground user interface elements in response to detecting the first input directed to a control for modifying the currently selected background color pattern to a discrete color allows the user to get visual feedback concerning how the one or more foreground user interface elements are modified based on a discrete change to the currently selected background color pattern, which provides visual feedback to the user, reduces the risks of an unintended change to the user, and reduces the number of additional inputs that would be needed to manually change or reverse the changes to the one or more foreground user interface elements.

In some embodiments, the control for modifying the currently selected background color pattern is a control (e.g., 1628) (e.g., a slider) for modifying the currently selected background color pattern to a color that is in a range of colors (e.g., a range of reds, a range of greens, a range of blues, a range of purples, and/or a range of yellows). In some embodiments, the control for modifying the currently selected background color pattern to a color that is in a range of colors is not displayed with a plurality of controls for modifying the currently selected background color pattern to a plurality of discrete colors, where each control corresponds to a different discreet color. IN some embodiments, the one or more foreground user interface elements (e.g., 1610a-1610e) are modified from the first color to the second color continuously based on a characteristic of (e.g., the magnitude and/or duration) (e.g., a movement characteristic) the first input (e.g., after the first input was initially detected). In some embodiments, modifying from the first color to the second color occurs continuously as the movement of the input is detected. In some embodiments, the direction of change of the color is based on a direction of the first input (e.g., moving toward a first end of the spectrum if the input is in a first direction and moving toward a second end of the spectrum that is different from the first end of the spectrum if the input is in a second direction different from the first direction). Continuously modifying the color pattern of the one or more foreground user interface elements in response to detecting the first input directed to a control for modifying the currently selected background color pattern to a color that is in a range of colors allows the user to get visual feedback concerning how the one or more foreground user interface elements are modified based on a continuous change to the currently selected background color pattern, which provides visual feedback to the user, reduces the risks of an unintended change to the user, and reduces the number of additional inputs that would be needed to manually change or reverse the changes to the one or more foreground user interface elements.

In some embodiments, while displaying the clock user interface (e.g., 1610) that includes the background and the one or more foreground user interface elements (e.g., 1610a-1610e) (e.g., and while displaying an editing user interface, where the clock user interface is displayed as a part of the editing user interface), the computer system detects a second input (e.g., 1650a) directed to a control for modifying the currently selected background color pattern. In some embodiments, in response to detecting the second input (e.g., 1650a, 1650b, and/or 1650d2) (e.g., tap input, a swipe input, a drag input, and/or a non-tap input and/or a non-swipe input (e.g., a mouse click, a mouse press-and-dragging input, and/or one or more air gestures)) directed to the control for modifying the currently selected background color pattern, the computer system updates the currently selected background color pattern (e.g., as described in relation to FIGS. 16A-16F) and the computer system modifies a color of the background based on the updated currently selected background color pattern (e.g., as described in relation to FIGS. 16A-16F). In some embodiments, the modified color of the background is the updated currently selected background color pattern. In some embodiments, the modified color of the background is not the updated currently selected background color pattern (e.g., but a color that is based on and/or associated with the updated currently selected background color pattern). In some embodiments, the first mode and/or the second mode is an editing mode. Modifying a color of the background based on an updated currently selected background color pattern in response to detecting the second input provides the user with control to select a preferred background of the clock user interface and provides the user with feedback indicating how an input changes the clock user interface, which provides visual feedback to the user, reduces the risks of an unintended change to the user, and reduces the number of additional inputs that would be needed to manually change or reverse the changes to the one or more foreground user interface elements.

In some embodiments, in response to detecting the second input (e.g., 1650a, 1650b, and/or 1650d2) directed to the control for modifying the currently selected background color pattern, the computer system modifies a color of the one or more foreground user interface elements to the updated currently selected background color pattern (e.g., as described above in relation to FIGS. 16A-16C). In some embodiments, while the color of the one or more foreground user interface elements is the updated currently selected background color pattern, the computer system does not display the background as the updated currently selected background color pattern. In some embodiments, while the color of the one or more foreground user interface elements is not the updated currently selected background color pattern, the computer system does display the background as the updated currently selected background color pattern. Modifying a color of the one or more foreground user interface elements to the updated currently selected background color pattern in response to detecting the second input provides the user with control to select a preferred background of the clock user interface and provides the user with feedback indicating how the changes to the background would impact the foreground elements in one or more particular scenarios, which provides visual feedback to the user, reduces the risks of an unintended change to the user, and reduces the number of additional inputs that would be needed to manually change or reverse the changes to the one or more foreground user interface elements.

In some embodiments, after displaying the background with the first background color pattern and the one or more foreground user interface elements with the first foreground element color pattern, the computer system detects a request to switch the background from a first dark background color pattern to a first light background color pattern (e.g., where the first light background color pattern is lighter than the first dark background color pattern) (e.g., as described above in relation to FIGS. 16A-16F). In some embodiments, in response to detecting the request to switch the background from the first dark background color pattern to the first light background color pattern, the computer system modifies the one or more foreground user interface elements from a first light foreground color pattern to a first dark foreground color pattern (e.g., as described above in relation to FIGS. 16A-16F) (e.g., where the first dark foreground color pattern is darker than the first light foreground color pattern). In some embodiments, in accordance with a determination that the currently selected background color pattern satisfies a set of dark background criteria (e.g., as described above in relation to the first set of dark background criteria). In some embodiments, in accordance with a determination that the currently selected background color pattern does not satisfy the set of dark background criteria, the first foreground element color pattern is a second color pattern that is different from (e.g., lighter than) the first color pattern (e.g., while operating in the first mode or the second mode). Modifying the one or more foreground user interface elements from a first light foreground color pattern to a first dark foreground color pattern in response to detecting the request to switch the background from the first dark background color pattern to the first light background color pattern allows the computer system to increase the visibility of content and/or elements on the clock user interface, which reduces the number of inputs needed for the user to increase the visibility of certain displayed elements and/or content of the clock user interface in conjunction with the background of the clock user interface modifying.

In some embodiments, after displaying the background with the first background color pattern and the one or more foreground user interface elements with the first foreground element color pattern, the computer system detects a request to switch the background from a second light background color pattern to a second dark background color pattern (e.g., as described above in relation to FIGS. 16A-16F) (e.g., where the second light background color pattern is lighter than the second dark background color pattern). In some embodiments, in response to detecting the request to switch the background from the second light background color pattern to the second dark background color pattern, the computer system modifies the one or more foreground user interface elements from a second dark foreground color pattern to a second light foreground color pattern (e.g., where the second dark foreground color pattern is darker than the second light foreground color pattern) (e.g., as described above in relation to FIGS. 16A-16F). Modifying the one or more foreground user interface elements from a second dark foreground color pattern to a second light foreground color pattern in response to detecting the request to switch the background from the second light background color pattern to the second dark background color pattern, which reduces the number of inputs needed for the user to increase the visibility of certain displayed elements and/or content of the clock user interface in conjunction with the background of the clock user interface modifying.

In some embodiments, the clock user interface is displayed in an editing user interface that includes one or more controls for a first background setting. In some embodiments, while displaying the one or more controls (e.g., 1630a and/or 1630b) for the first background setting, the computer system detects an input (e.g., 1650c and/or 1650d1) directed to the one or more controls for the first background setting. In some embodiments, in response to detecting the input directed to the one or more controls for the first background setting, the computer system modifies the first background setting from a first state to a second state. In some embodiments, in conjunction with (e.g., after and/or while) modifying the first background setting from the first state to the second state: in accordance with a determination that a third user-selected color pattern (and/or any) has been selected for use in the background of the clock user interface (e.g., after modifying a background setting from a first state to a second state) based on the second state of the first background setting, the computer system displays, via the display generation component, the background with the currently selected background color pattern (e.g., as described above in relation to FIGS. 16C-16D) and in accordance with a determination that the third user-selected color pattern (and/or any) has not been selected for use in the background of the clock user interface (e.g., after modifying a background setting from a first state to a second state) based on the second state of the first background setting (e.g., off state and/or a state of the background having a color that is either white or black)) (e.g., after modifying the first background setting from a first state to a second state), the computer system displays, via the display generation component, the background with a default color (e.g., as described above in relation to FIGS. 16C-16D) (e.g., solid black and/or white) (e.g., and not the currently selected background color pattern). Displaying the background with the currently selected background color pattern or the default color based on the state of a user-configurable setting provides the user with control over the clock user interface, provides the user with feedback about how a user's setting is impacting the clock user interface, and gives the computer system the ability to automatically increase the visibility of certain user interface elements on the clock user interface.

In some embodiments, at least one of the one or more foreground user interface elements is displayed with an accent color. In some embodiments, in conjunction with (e.g., after and/or while) modifying the first background setting from the first state to the second state: in accordance with a determination that the third user-selected color pattern (and/or any) has been selected for use in the background of the clock user interface (e.g., after modifying a background setting from a first state to a second state) based on the second state of the first background setting, the accent color is a first respective color that is not included in the currently selected background color pattern (e.g., as described above in relation to FIGS. 16A-16F and computer systems 1602a and 1602b) and in accordance with a determination that a third user-selected color pattern (and/or any) has not been selected for use in the background of the clock user interface (e.g., after modifying a background setting from a first state to a second state) based on the second state of the first background setting, the accent color is a second respective color that is included in the currently selected background color pattern (e.g., as described above in relation to FIGS. 16A-16F and computer systems 1602a and 1602b). In some embodiments, in accordance with a determination that the third user-selected color pattern (and/or any) has been selected for use in the background of the clock user interface (e.g., after modifying a background setting from a first state to a second state) based on the second state of the first background setting, the computer system displays, via the display generation component, the one or more foreground user interface elements with a color element (e.g., accent color) that is selected using (e.g., at least a portion of) a respective color pattern (and not the currently selected background color pattern) (e.g., without displaying the one or more foreground user interface elements with the color element (e.g., accent color) that is selected using the background color pattern). In some embodiments, the respective color pattern is different from the currently selected background color pattern. In some embodiments, the respective color pattern is based on the current selected background color pattern and/or was selected because the particular current selected background color pattern was selected. In some embodiments, in accordance with a determination that the third user-selected color pattern (and/or any) has not been selected for use in the background of the clock user interface (e.g., after modifying a background setting from a first state to a second state) based on the second state of the first background setting, the computer system displays, via the display generation component, the one or more foreground user interface elements with a color element (e.g., accent color) that is selected using (e.g., at least a portion of) the currently selected background color pattern (and not the respective color pattern) (e.g., without displaying the one or more foreground user interface elements with the color element (e.g., accent color) that is selected using the respective color pattern). Selecting an accent color for the one or more foreground user interface elements based on the state of a user-configurable setting provides the user with control over the clock user interface, provides the user with feedback about how a user's setting is impacting the clock user interface, and gives the computer system the ability to automatically display user interface elements that have a higher the visibility on the particular clock user interface that is being displayed based on the state of the user-configurable setting.

In some embodiments, the currently selected background color pattern corresponds to an adjustable spectrum of color options that range from a first end color to a second end color, and wherein the second respective color is the same as or substantially the same as (e.g., within a threshold distance from) the first end color (e.g., as described above in relation to FIGS. 16A-16C). In some embodiments, the appearance second respective color is closer to the appearance of first end color than the appearance of the second end color. Displaying, via the display generation component, the one or more foreground user interface elements with the color pattern that is different from the currently selected background color pattern based on the second state of the first background setting allows the computer system to increase the visibility of certain user interface elements on the clock user interface while the background of the user interface is off, which automatically performs an operation when a set of conditions are met and provides improved visual feedback.

In some embodiments, in accordance with a determination that the currently selected background color pattern satisfies a second set of dark background criteria, the first end color is on the dark end of the adjustable spectrum of color options (e.g., on a half of the adjustable spectrum that is between a darkest color and a midpoint of the spectrum) (e.g., as described above in relation to FIGS. 16A-16C and computer systems 1602a and 1602b) and in accordance with a determination that the currently selected background color pattern satisfies the second set of dark background criteria, the first end color is on the light end of the adjustable spectrum of color options (e.g., as described above in relation to FIGS. 16A-16C and computer systems 1602a and 1602b) (e.g., on a half of the adjustable spectrum that is between a lightest color and a midpoint of the spectrum). In some embodiments, in accordance with a determination that the currently selected background color pattern satisfies a second set of dark background criteria (e.g., as described above in relation to the first set of dark background criteria), the respective color pattern is closer to a lighter end of the color range than a darker end of the color range. In some embodiments, in accordance with a determination that the currently selected background color pattern does not satisfy the second set of dark background criteria, the respective color pattern is closer to a darker end of the color range than the lighter end of the color range. In some embodiments, the lighter end of the color range is different from and/or opposite from the darker end of the color range. Displaying, via the display generation component, the one or more foreground user interface elements with the color pattern that is based on the currently selected color pattern is light or dark allows the computer system to increase the visibility of certain user interface elements on the clock user interface based on the color of the clock user interface's background, which automatically performs an operation when a set of conditions are met and provides improved visual feedback.

In some embodiments, the second set of dark background criteria includes a criterion that is satisfied when a determination is made that a characteristic (e.g., amount of black and/or darkness) of the currently selectable background color pattern is above a respective threshold (e.g., a threshold amount of black and/or darkness (e.g., 40%-60% black and/or dark) (e.g., as described above in relation to FIGS. 16A-16C and computer systems 1602a and 1602b). In some embodiments, in accordance with a determination that the currently selected background color pattern is a first color pattern (e.g., a first solid color and/or a first gradient), the respective threshold is a first threshold (e.g., 40% dark and/or black) (e.g., as described above in relation to FIGS. 16A-16C and computer systems 1602a and 1602b) and in accordance with a determination that the currently selected background color pattern is a second color pattern that is different from the first color pattern (e.g., a second solid color and/or a second gradient), the respective threshold is a second threshold (e.g., 60% dark and/or black) that is different from the first threshold (e.g., as described above in relation to FIGS. 16A-16C and computer systems 1602a and 1602b). Displaying, via the display generation component, the one or more foreground user interface elements with the color pattern that is based on different thresholds for a characteristic allows the computer system to increase the visibility of certain user interface elements on the clock user interface based on the color of the clock user interface's background, which automatically performs an operation when a set of conditions are met and provides improved visual feedback.

In some embodiments, the currently selected background color pattern includes a plurality of different colors (e.g., a rainbow of colors; a plurality of different primary, secondary, and/or tertiary colors; red and blue; red, blue, green, and yellow; and/or different hues). In some embodiments, while displaying the background as being off and without the currently selected background color pattern and displaying the one or more foreground user interface elements with the currently selected background color pattern, the computer system detects a request to turn the background on (e.g., detecting a request to wake the computer system (e.g., change from a lower power mode to a higher power mode) and/or detecting an input that causes a background setting to be turn on) (e.g., as described above in relation to FIG. 16F). In some embodiments, in response to detecting the request to turn the background on while the currently selected background color pattern includes the plurality of different colors (and, in accordance with a determination that the currently selected background color pattern includes the plurality of different colors): the computer system displays, via the display generation component, the background with the plurality of different colors (e.g., without displaying the background with the first background color pattern or the second background color pattern) (e.g., as described above in relation to FIG. 16F) and displays, via the display generation component, the one or more foreground user interface elements with different amounts of transparency for different portions of the one or more foreground user interface elements (e.g., as described above in relation to FIG. 16F) (e.g., the one or more foreground element were not displayed with the different amounts of transparency for different portions of the one or more foreground user interface elements before the computer system detected the request to turn the background on) (e.g., without displaying the one or more foreground user interface elements with the currently selected color pattern). In some embodiments, in accordance with a determination that the currently selected background color pattern does not include the plurality of different colors and/or the background is not currently being displayed with the plurality of colors, the one or more foreground user interface elements are not displayed with different amounts of transparency for different portions of the one or more foreground user interface elements. Choosing whether to display the plurality of different colors and the one or more foreground user interface elements with different amounts of transparency for different portions of the one or more foreground user interface while the currently selected background color pattern includes the plurality of different colors allows the computer system to increase the visibility of certain user interface elements on the clock user interface based on the color of the clock user interface's background, which automatically performs an operation when a set of conditions are met and provides improved visual feedback.

In some embodiments, the first foreground element color pattern is selected (e.g., automatically and without additionally user input) based on the first background color pattern (e.g., and not based on the second background color pattern) (e.g., as described above in relation to FIG. 16F). In some embodiments, the second foreground element color pattern is selected based on the second background color pattern (e.g., and not based on the first background color pattern) (e.g., as described above in relation to FIG. 16F). Automatically choosing to display the one or more foreground user interface elements with different amounts of transparency for different portions of the one or more foreground user interface, based on the currently selected background color pattern and while the currently selected background color pattern includes the plurality of different colors, allows the computer system to automatically increase the visibility of certain user interface elements on the clock user interface based on the color of the clock user interface's background, which automatically performs an operation when a set of conditions are met and provides improved visual feedback.

Note that details of the processes described above with respect to method 1700 (e.g., FIG. 17) are also applicable in an analogous manner to the methods described herein. For example, methods 700, 900, 1100, 1300, 1500, and 1900 optionally includes one or more of the characteristics of the various methods described above with reference to method 1700. For example, method 1700 optionally includes one or more of the characteristics of the various methods described above with reference to method 700. For example, displaying a clock user interface as described with respect to method 1700 optionally includes displaying a simulated light effect as described with reference to method 700. For another example, method 1700 optionally includes one or more of the characteristics of the various methods described above with reference to method 900. For example, displaying a clock user interface as described with respect to method 1700 optionally includes displaying an astronomical object as described with reference to method 900. As another example, method 1700 optionally includes one or more of the characteristics of the various methods described above with reference to method 1100. For another example, method 1700 optionally includes one or more of the characteristics of the various methods described above with reference to method 1300. For example, displaying a clock user interface as described with respect to method 1700 optionally includes displaying a time indication with a first set of style options, and in response to detecting the set of one or more inputs, displaying the time indication with a second set of style options as described with reference to method 1100. For example, displaying a clock user interface as described with respect to method 1700 optionally includes displaying a first calendar system and a second calendar system as described with reference to method 1300. For brevity, these details are not repeated below.

FIGS. 18A-18P illustrate example clock user interfaces including animated lines, in accordance with some embodiments. The user interfaces in these figures are used to illustrate the processes described below, including the processes in FIG. 19.

FIG. 18A illustrates computer system 1800 (e.g., a smart-watch), which includes rotatable and depressible input mechanism 1800a, button 1800b, and display 1800c. In some embodiments, computer system 1800 includes one or more features of device 100, device 300, and/or device 500. In some embodiments, computer system 1800 is a tablet, phone, laptop, desktop, and/or camera. In some embodiments, the inputs described below can be substituted for alternate inputs, such as a press input and/or a rotational input received via rotatable and depressible input mechanism 1800a.

As illustrated in FIG. 18A, computer system 1800 is displaying user interface 1804, which is a clock user interface. A clock user interface is a user interface that includes an indicator of a time (e.g., the current time). User interface 1804 includes lines 1804 that span across user interface 1804 (e.g., vertically across in FIG. 18A). Lines 1804 includes lines 1804a-1804o (e.g., from left to right across user interface 1804). In FIG. 18A, each of lines 1804a-1804o are different colors, which is indicated by the different shading (e.g., different levels of grey) and patterns of lines 1804a-1804o with respective to each other. In some embodiments, computer system 1800 displays one or more lines 1804a-1804o as being the same color.

As illustrated in FIG. 18A, computer system 1800 displays lines 1804a-1804o with different amounts of variable thickness. In some embodiments, the variable thickness of a line is different amounts of thickness of different portions within the respective line itself. For example, a portion of line 1804b is thicker (e.g., wider) than another portion of line 1804b in FIG. 18A, which denotes that line 1804b has variable thickness. Moreover, a portion of line 1804c is thicker (e.g., wider) than another portion of line 1804c, which denotes that line 1804c has various thickness. In some embodiments, lines 1804b and 1804c in FIG. 18A have different amounts of variable thickness because the thickness in the lines are not uniform for all corresponding portions (e.g., vertically aligned portions) of lines 1804b and 1804c (e.g., a portion of line 1804c is wider than an aligned portion of line 1804b in FIG. 18A).

As illustrated in FIG. 18A, computer system 1800 displays lines 1804a-1804o with different amounts of variable thickness to display current-time representation 1810. Current-time representation 1810 indicates that the current time (e.g., and/or the current time from which the watch has been set by a user) is 3:59. Current-time representation 1810 includes hours digit 1810a, first-minutes digit 1810b, and second minutes digit 1810c. At FIG. 18A, computer system 1800 displays the hours digit of the current time (e.g., hours digit 1810a) via the different amounts of variable thickness in lines 1804h-1804m (e.g., a set of lines), displays the first minutes digit of the current time (e.g., first-minutes digit 1810b) via the different amounts of variable thickness in lines 1804b-1804h, and displays the second minutes digit of the current time (e.g., second-minutes digit 1810c) via the different amounts of variable thickness in lines 1840i-1804n. As illustrated in FIG. 18A, variable thickness in different portions of one line can be used to represent different digits in the time, such as computer system 1800 displaying a lower portion of line 1804k with an amount of variable thickness to show the second minutes digit (e.g., "9," second-minutes digit 1810c) and displaying an upper portion of line 1804k with a different amount of variable thickness to show the hours digit (e.g., "3," hours-digit 1810a). For other lines, as illustrated in FIG. 18A, computer system 1800 displays a respective line with the same or uniform amount of thickness, such as line 1804a, where line 1804a is not being used to indicate a portion of the current time. In some embodiments, current-time representation included one or more other digits, such as another hours digit and/or one or more seconds digits.

At FIG. 18A, computer system 1800 detects a condition regarding the change in the current time, where the current time is changing (or has changed) from 3:59 to 4:00. In some embodiments, as a part of detecting the condition regarding the change in the current time, computer system 1800 detects that the current time has changed, that the current time is changing, and/or that the current time will change within a predetermined period of time (e.g., 1-10 seconds and/or the time computer system 1800 will take to change the variable thickness in lines to represent the updated time (e.g., 4:00), as illustrated in FIGS. 18A-18C).

As illustrated in FIG. 18B, computer system 1800 begins changing the variable thickness in one or more of lines 1804 to update current-time representation 1810 to indicate that the current time is 4:00 (e.g., and no longer 3:59). Here, computer system 1800 changes the variable thickness in lines 1804b-1804n to update current-time representation 1810. In some embodiments, computer system 1800 changes the variable thickness in a different combination of lines 1804 than lines 1804b-1804n (e.g., when current-time representation 1810 is updated to represent a different time than 4.00). At FIG. 18C, computer system 1800 has completed changing the variable thickness of lines 1804*b*-1804*n*, and current-time representation 1810 indicates that the current time is 4:00. In some embodiments, computer system 1800 continues to change the variable thickness in one or more of lines 1804 to display different times as the computer system detects that the current time is changing. At FIG. 18C, computer system 1800 detects tap input 1850*c* at a location corresponding to a portion of hours-digit 1810*a*.

As illustrated in FIG. 18D, in response to detecting tap input 1850*c*, computer system 1800 changes the amount of variable thickness in lines 1804*k*-1804*m*, such that the thickness in lines 1804*k*-1804*m* is more uniform. At FIG. 18D, computer system 1800 changes 1804*k*-1804*m* because 1804*k*-1804*m* are near and/or at the location at which tap input 1850*c* was detected at FIG. 18C. Computer system 1800 did not change any other lines of lines 1804 because computer system 1800 determined that the other lines (e.g., 1804*j* and 1804*n*) were not close enough to the location at which tap input 1850*c* was detected. As illustrated in FIG. 18D, computer system 1800 changes the variable thickness in lines 1804*k*-1804*m*, such that the thickness in each of lines 1804*k*-1804*m* is uniform. In some embodiments, in response to detecting tap input 1850*c*, computer system 1800 only changes portions of lines 1804*k*-1804*m* that are near the location at which tap input 1850*c* was detected at FIG. 18C to have a uniform (or more uniform) amount of thickness and does not change portions of lines 1804*k*-1804*m* that are not near the location at which tap input 1850*c* was detected to have the uniform amount of thickness. In some embodiments, computer system 1800 only changes the amount of variable thickness in lines 1804*k*-1804*m*, such that the thickness in lines 1804*k*-1804*m* is more uniform, while input 1850*c* is being detected and/or for a predetermined amount of time (e.g., 0.1-5 seconds) after input 1850*c* was last detected. At FIG. 18D, computer system 1800 detects that tap input 1850*c* has not been detected (or has been removed) for the predetermined period of time (e.g., at the location of input 1850*c* in FIG. 18C).

As illustrated in FIG. 18E, in response to detecting that tap input 1850*c* has not been detected for the predetermined period of time, computer system 1800 changes the variable thickness in lines 1804*k*-1804*m* to show the current time (e.g., reverts back to showing all of current time like in FIG. 18C before tap input 1850*c* was detected). At FIG. 18E, computer system 1800 detects a first portion of (e.g., a non-movement portion) rightward swipe input 1850*e*, and while detecting rightward swipe input 1850*e*, computer system 1800 changes the variable thickness in one or more of lines 1804 (e.g., 1804*c*-1804*d*) that are near the location of swipe input 1850*e* (e.g., while swipe input 1850*e* is momentarily stationary and/or as the swipe input moves across computer system 1800) to be more uniform (e.g., using one or more similar techniques discussed above in relation to FIG. 18D).

As illustrated in FIG. 18F, in response to detecting a second portion of (e.g., a movement portion) of rightward swipe input 1850*e*, computer system 1800 displays clock user interface 1806, which is a clock user interface that is different from user interface 1804 of FIG. 18E. At FIG. 18F, computer system 1800 detects leftward swipe input 1850*f*. In some embodiments, computer system 1800 does not change any variable thickness of the lines on clock user interface 1806 in response to detecting leftward swipe input 1850*f* (e.g., while swipe input 1850*e* is momentarily stationary and/or as the swipe input moves across computer system 1800) (e.g., because user interface 1804 is not displayed). As illustrated in FIG. 18G, in response to detecting leftward swipe input 1850*f*, computer system 1800 re-displays user interface 1804 (e.g., which is the same as the user interface of FIG. 18E). At FIG. 18G, computer system 1800 detects clockwise rotation input 1850*g* on input mechanism 1800*a* (e.g., or detects that input mechanism 1800*a* has been rotating in a clockwise direction).

As illustrated in FIG. 18H, in response to detecting clockwise rotation input 1850*g* on input mechanism 1800*a*, computer system 1800 changes the thickness of lines 1804*a*-1804*d*, such that the thickness of lines 1804*a*-1804*d* are uniform. In response to detecting clockwise rotation input 1850*g* on input mechanism 1800*a*, computer system 1800 outputs audio and/or provides one or more haptic responses (e.g., as indicated by output indicator 1860 of FIG. 18H). In some embodiments, computer system 1800 outputs audio that includes one or more music notes. In some embodiments, computer system 1800 outputs audio for each of lines 1804*a*-1804*d*. In some embodiments, computer system 1800 outputs different audio for each of lines 1804*a*-1804*d* and/or provides a different haptic output for each of lines 1804*a*-1804*d* (e.g., as the thickness of each of lines 1804*a*-1804*d* change). In some embodiments, computer system 1800 outputs a first music note to indicate that the variable thickness of line 1804*a* has changed, a second music note to indicate that the variable thickness of line 1804*b* has changed, a third music note to indicate that the variable thickness of line 1804*c* has changed, and a fourth music note to indicate that the variable thickness of line 1804*d* has changed. In some embodiments, the first music note, the second music note, the third music note, and the fourth music note are different music notes of a musical scale. In some embodiments, if input mechanism 1800*a* is rotated fast enough, the audio output by computer system 1800 would sound like a chord that is building (e.g., one music note playing, followed by two music notes playing, followed by three music notes playing, etc.). In some embodiments, one or more of the music notes are adjacent to each other on the musical scale. In some embodiments, computer system 1800 changes the variable thickness of lines 1804*m*-1804*o* from right to left as input mechanism 1800*a* is rotating in the counterclockwise direction. In some embodiments, computer system 1800 changes the thickness of line 1804*a* to be more uniform without changing the thickness of lines 1804*b*-1804*d* in response to detecting a first portion of the clockwise rotation input 1850*g*. In some embodiments, computer system 1800 changes the variable thickness of line 1804*b* to be more uniform in response to detecting a second portion of the clockwise rotation input 1850*g* (e.g., after detecting the first portion of clockwise rotation input 1850*g*) (e.g., without changing the variable thickness of lines 1804*c*-1804*d* and/or after changing the variable thickness of lines 1804*a*). In some embodiments, computer system 1800 changes the variable thickness of line 1804*c* to be more uniform in response to detecting a third portion of the clockwise rotation input 1850*g* (e.g., after detecting the first portion and the second portion of clockwise rotation input 1850*g*) (e.g., after changing the variable thickness of lines 1804*a*-1804*b* and without changing the variable thickness of line 1804). In some embodiments, computer system 1800 provides individual audio outputs as the thickness for each individual line is changed in response to detecting clockwise rotation input 1850*g* on input mechanism 1800*a*.

At a time that occurs after displaying user interface 1804 of FIGS. 18G-18H, computer system 1800 displays user interface 1804 of FIG. 18I. At FIG. 18I, computer system 1800 detects counterclockwise rotation input 1850*i* on input mechanism 1800*a* (e.g., or detects that input mechanism 1800*a* has been rotating in a clockwise direction). As illustrated in FIG. 18J, in response to detecting counterclockwise rotation input 1850*i* on input mechanism 1800*a*, computer system 1800 changes the thickness of lines 1804*l*-1804*o*, such that the variable thickness of lines 1804*l*-1804*o* are uniform. In response to detecting counterclockwise rotation input 1850*i* on input mechanism 1800*a*, computer system 1800 outputs audio and/or provides one or more haptic responses (e.g., as indicated by output indicator 1860 of FIG. 18J). Notably, computer system 1800 changes the lines 1804 based on the direction that input mechanism 1804 is rotated. Looking back at FIGS. 18G-18H, computer system 1800 begins changing the variable thickness of lines 1804 that are on the right side (e.g., 1804*l*-1804*o*) of computer system 1800 in response to detecting that input mechanism 1800*a* has started rotating (or is being rotated) in the counterclockwise direction. On the other hand, computer system 1800 begins changing the variable thickness of lines 1804 that are on the left side (e.g., 1804*a*-1804*d*) of computer system 1800 as input mechanism 1804 has started rotating (or is being rotated) in the clockwise direction. In some embodiments, computer system 1800 changes the variable thickness of lines on the left side of computer system 1800 in response to detecting that input mechanism 1800*a* has started rotating in the counterclockwise direction and changes the variable thickness of lines on the right side of computer system 1800 in response to detecting that input mechanism 1800*a* has started rotating in the clockwise direction. While displaying lines 1804*l*-1804*o*, such that the variable thickness of lines 1804*l*-1804*o* are uniform, computer system 1800 detects clockwise rotation input 1850*j* on input mechanism 1800*a* (e.g., or detects that input mechanism 1800*a* has been rotating in a clockwise direction) at FIG. 18J.

As illustrated in FIG. 18K, in response to detecting clockwise rotation input 1850*j* on input mechanism 1800*a*, computer system 1800 changes the variable thickness of line 1804*l* and provides a haptic and/or audio output (e.g., as indicated by output indicator 1860 of FIG. 18K), such that the thickness of line 1804*l* is no longer uniformed. Thus, at FIG. 18K, computer system 1800 removes the variable thickness of line 1804*l* based on the direction that input mechanism 1800*a* is being rotated (e.g., because the direction of input mechanism 1800*a* was reversed from the counterclockwise rotation input 1850*i* to clockwise rotation input 1850*j*). At FIG. 18K, computer system 1800 detects clockwise rotation input 1850*k*1 on input mechanism 1800*a* and rightward movement 1850*k*2 of computer system 1800. As illustrated in FIG. 18L, in response to detecting clockwise rotation input 1850*k*1 on input mechanism 1800*a*, computer system 1800 changes the variable thickness of lines 1804*m*-1804*o* (e.g., using one or more techniques discussed in relation to FIG. 18K) and provides a haptic and/or audio output (e.g., as indicated by output indicator 1860 of FIG. 18L).

As illustrated in FIG. 18L, in response to detecting rightward movement 1850*k*2 of computer system 1800, computer system 1800 changes the variable thickness of lines 1804, such that time representation 1810 is moved to the right in the direction that computer system 1800 has been moved. Graphical representation 1880 is provided at FIG. 18L to show that computer system 1800 has been moved, where indicator 1880*a* represents the original position of computer system 1800 and indicator 1880*b* represents the changed position of computer system 1800 (e.g., because computer system 1800 was moved to the right in FIGS. 18K-18L indicator 1880*b* is to the right of indicator 1880*a*). In some embodiments, as a part of changing the variable thickness of lines 1804 at FIGS. 18K-18L, computer system 1800 displays time representation 1810 gradually floating to the right and/or delays movement of time representation 1810 (e.g., a lazy follow animation), such that time representation 1810 appears to be catching up to the location of the computer system 1800 as computer system 1800 is moved. At FIG. 18L, computer system 1800 detects downward movement 1850*l* of computer system 1800.

As illustrated in FIG. 18M, in response to detecting downward movement 1850*l* (e.g., indicated by current position indicator 1880*b* moving below original position indicator 1880*a* in FIG. 18M as compared to FIG. 18L), computer system 1800 changes the variable thickness of lines 1804, such that time representation 1810 is moved to down in the direction that computer system 1800 has been moved. At FIG. 18M, computer system 1800 detects rotation movement 1850*m* of computer system 1800. As illustrated in FIG. 18N, in response to detecting rotation movement 1850*m*, computer system 1800 changes the variable thickness of lines 1804, such that time representation 1810 is moved to the left, which is based on the direction that computer system 1800 has been moved (e.g., towards the lower side (e.g., left side in FIG. 18N, as indicated by current position indicator 1890*b* relative to original position 1890*a*) of computer system 1800). In some embodiments, in response to detecting rotation movement 1850*m*, computer system 1800 changes the variable thickness of lines 1804, such that time representation 1810 is rotated in the direction that computer system 1800 has been rotated. As illustrated in FIG. 18O, computer system 1800 continues to change the variable thickness of lines 1804, such that time representation 1810 is further moved left due to computer system 1800 continuing to be rotated (and/or tilted). At FIG. 18O, computer system 1800 detects a condition that causes the computer system to change to a reduced power state (e.g., from the state in which computer system 1800 operated at FIGS. 18A-18O).

As illustrated in FIG. 18P, in response to detecting the condition that causes the computer system to change to the reduced power state, computer system 1800 changes user interface 1804, such that the background of user interface 1804 appears to be a dark color (e.g., black). When changing user interface 1804 such that the background of user interface 1804 appears to be a dark color, computer system 1800 changes the colors of 1804*c*, 1804*k*, 1804*m*, and 1804*n* while maintaining the colors of the other lines. At FIG. 18P, computer system 1800 changes the colors of 1804*c*, 1804*k*, 1804*m*, and 1804*n* because a determination was made that 1804*c*, 1804*k*, 1804*m*, and 1804*n* are too dark for display with the dark background of user interface 1804. At FIG. 8Q, computer system 1800 changes the variable thickness of lines 1804, such that time indicator 1810 is moved to the right to a default position. Computer system 1800 changes the variable thickness of lines 1804, such that time indicator 1810 is moved to the right to a default position, because computer system 1800 is in the reduced power state. In the reduced power state, time indicator 1810 moves and stays at a default position, irrespective of the movement of computer system 1800.

FIG. 19 is a flow diagram illustrating a method for displaying a digital clock face including animating lines. Method 1900 is performed at a computer system (e.g., 1800) (e.g., a smartwatch, a wearable electronic device, a smartphone, a desktop computer, a laptop, or a head mounted device (e.g., a head mounted augmented reality and/or extended reality device))) that is in communication with a display generation component (e.g., a display controller, a touch-sensitive display system, and/or a head mounted display system). In some embodiments, the computer system is in communication with one or more input devices (e.g., a button, a rotatable input mechanism, a speaker, a camera, a motion detector (e.g., an accelerometer and/or gyroscope), and/or a touch-sensitive surface. Some operations in method 1900 are, optionally, combined, the orders of some operations are, optionally, changed, and some operations are, optionally, omitted.

As described below, method 1900 provides an intuitive way for displaying a digital clock face that includes animated lines. The method reduces the cognitive burden on a user for viewing a digital clock face that includes animated lines, thereby creating a more efficient human-machine interface. For battery-operated computing devices, enabling a user to view a digital clock face that includes animated lines faster and more efficiently conserves power and increases the time between battery charges.

The computer system displays (1902), via the display generation component, a clock user interface that includes a plurality of lines (e.g., 1804) that indicate a first time (e.g., a current time), where a first set of lines (e.g., (1904) (e.g., 1804g-1804n) of the plurality of lines including a first line of the first set of lines having a variable thickness and a second line of the first set of lines having a variable thickness (and/or wideness and/or width of at least one or more portions of a respective line), the variable thickness in lines in the first set of lines indicating a first portion (e.g., 1810a-1810c) (e.g., one or more hour portions, minute portions, and/or seconds portions) of the first time (e.g., the current time) and a second set of lines (1906) (e.g., 1804h-1804n) of the plurality of lines including a first line of the second set of lines having a variable thickness and a second line of the second set of lines having a variable thickness (and/or wideness and/or width), the variable thickness in lines in the second set of lines indicating a second portion (e.g., one or more hour portions, minute portions, and/or seconds portions) of the first time (e.g., the current time) (e.g., that is different from the first portion of the current time). In some embodiments, each line in the second set of lines and/or at least two lines in the second set of lines have different amounts of thickness and/or are different widths. In some embodiments, the first set of lines are concurrently displayed with the first set of lines. In some embodiments, the first set of lines are displayed to the right of, above, below, and/or to the left of the second set of lines. In some embodiments, the first set of lines are displayed in a first area of the clock user interface and the second set of lines are displayed in a second area of the clock user interface. In some embodiments, the first area of the clock user interface is not encompassed by, does not encompass, is not contained with, does not contain, does not include, is not included in, and/or is separate from the second area. In some embodiments, the first area is adjacent to the second area. In some embodiments, the second area is separated from the first area by at least the third area. In some embodiments, the second is not separated from the first area by another area. In some embodiments, the plurality of lines includes lines that extend across the display generation component (e.g., from the top of display generation component and/or clock user interface to the bottom of the display generation component and/or clock user interface). In some embodiments, the plurality of lines extends horizontally across the clock user interface. In some embodiments, the plurality of lines extends vertical across the clock user interface. In some embodiments, the plurality of lines contains lines that extend vertically across the display and does not contain lines that extend horizontally across the display. In some embodiments, the plurality of lines contains lines that extend horizontally across the display and does not contain lines that extend vertically across the display. In some embodiments, the plurality of lines extends in the same direction (e.g., horizontally, vertically, and/or obliquely). In some embodiments, the plurality of lines are substantially parallel. In some embodiments, the plurality of lines is equally distanced apart. In some embodiments, an empty space exists between the plurality of lines and/or one or more user interface objects and/or lines are not displayed between the plurality of lines. In some embodiments, each line in the first set of lines and/or at least two lines in the first set of lines have different amounts of thickness and/or are different widths.

While displaying the clock user interface that includes the first set of lines (e.g., 1804g-1804n) (e.g., a set of widths and/or thickness for at least a portion of a respective set of lines) and the second set of lines, the computer system detects (1908) a change in the current time from the first time to a second time.

In response to detecting the change in current time from the first time to the second time (and in accordance with a determination that the first portion (e.g., the hour, minute, and/or seconds) of the current time changed), the computer system modifies (1910) (e.g., changing, adjusting, and/or displaying) (e.g., gradually modifying and/or modifying over a predetermined period of time (e.g., greater than 1-5 seconds) the variable thickness in lines in the first set of lines (e.g., 1804g-1804n) to indicate the first portion of the second time (e.g., the changed time and/or the updated time) (and, in some embodiments, the variable thickness in lines in the first set of lines is modified to indicate the second portion of the second time (e.g., with or without modifying the variable thickness in lines in the first set of lines to indicate the first portion of the second time)) (and, in some embodiments, while continuing to display the variable thickness in lines in the first set of lines to indicate the first portion of the second time). In some embodiments, in response to detecting the change in the current time and in accordance with a determination that the first portion (e.g., the hour, minute, and/or seconds) of the current time has not changed and the computer system is not moving, the computer system continues to display the first set of lines in the plurality of lines without modifying them (and/or does not modify the variable thickness in lines in the first set of lines). In some embodiments, in response to detecting the change in the current time and in accordance with a determination that the second portion (e.g., the hour, minute, and/or seconds) of the current time has not changed and the computer system is not moving, the computer system continues to display the second set of lines without modifying them (and/or does not modify the variable thickness in lines in the first set of lines). Modifying the variable thickness in lines in the first set of lines to indicate the first portion of the second time in response to detecting the change in current time from the first time to the second time allows the computer system to automatically (e.g., without intervening user input) adjust the variable thickness in a set of lines to indicate a change to the current time, which performs an operation when a set of conditions has been met without requiring further user input, reduces the number of inputs needed to correct the time, and provides improved visual feedback.

In some embodiments, in response to detecting the change in current time from the first time to the second time (and in accordance with a determination that the second portion (e.g., the hour, minute, and/or seconds) of the current time changed), the computer system modifies the variable thickness in lines in the second set of lines (e.g., 1804h-1804n) to indicate the second portion of the second time (e.g., the changed time and/or the updated time). In some embodiments, the variable thickness in lines in the second set of lines is changed while the variable thickness in lines in the first set of lines are not changed, or vice-versa. Modifying the variable thickness in lines in the second set of lines to indicate the first portion of the second time in response to detecting the change in current time from the first time to the second time allows the computer system to automatically (e.g., without intervening user input) independently adjust the variable thickness in sets of lines to indicate a change to the current time, which performs an operation when a set of conditions has been met without requiring further user input, reduces the number of inputs needed to correct the time, and provides improved visual feedback.

In some embodiments, the first portion is a first digit (e.g., 1810a-1810c) (e.g., an hour digit, a minute digit, and/or a seconds digit) of a digital time, and the second portion is a second digit (e.g., 1810a-1810c) of the digital time (e.g., an hour digit, a minute digit, and/or a seconds digit). In some embodiments, the first digit (e.g., the "1" in "12:00 AM") is next to the second digit (e.g., the "2" in "12:00 AM"). In some embodiments, the first digit is separated from the second digit by at least one other digit. In some embodiments, the first digit is an hours digit while the second digit is a minutes digit. In some embodiments, the first digit is a minutes digit while the second digit is a seconds digit. In some embodiments, the first digit and second digit are hours digits (or minute digits, or seconds digits). Displaying a clock user interface that includes sets of lines with different variable thickness, which indicates different portions of digital time, allows the computer system to display a clock user interface representative of the current time based on the conditions of a selected clock face, which provides the user with control over the technique that is being used to display the current time and provides improved visual feedback.

In some embodiments, the first set of lines (e.g., 1804g-1804n) includes one or more respective lines, and the second set of lines (e.g., 1804h-1804n) includes at least one line of the one or more respective lines. In some embodiments, the first set of lines and the second set of lines include one or more shared lines. In some embodiments, the first set of lines includes at least one line that is not included in the first set of lines. In some embodiments, the first set of lines includes a first line, and the second set of lines includes the first line. Displaying a clock user interface that includes sets of lines with different variable thickness, where certain lines are shared, allows the computer system to display a clock user interface representative of the current time without further cluttering the user interface with other set of lines and/or less of the current time being represented of the clock user interface, which provides improved visual feedback.

In some embodiments, as a part of displaying the clock user interface that includes the first set of lines (e.g., 1804g-1804n) including the variable thickness in lines in the first set of lines indicating the first portion of the first time and the second set of lines (e.g., 1804h-1804n) including the variable thickness in lines in the second set of lines indicating the second portion of the first time the computer system detects a change in an orientation of the computer system. In some embodiments, in response to detecting the change in the orientation (e.g., 1850k2, 1850m, and/or 1850l) of the computer system and in accordance with a determination that the orientation of the computer system has changed to be in a first orientation the computer system shifts (e.g., moving) a location of the first portion of the first time by modifying the variable thickness in lines in the first set of lines in a first manner (e.g., by an amount and/or in a direction (e.g., portions of a line become thicker in one direction and thinner (e.g., less thick) in another direction)) (e.g., as discussed above in relation to FIGS. 18K-18O) and the computer system shifts a location of the second portion of the first time by modifying the variable thickness in lines in the second set of lines in a second manner (e.g., as discussed above in relation to FIGS. 18K-18O). In some embodiments, in response to detecting the change in the orientation (e.g., 1850k2, 1850m, and/or 1850l) of the computer system and in accordance with a determination that the orientation of the computer system has changed to be in a second orientation that is different from the first orientation the computer system shifts a location of the first portion of the first time by modifying the variable thickness in lines in the first set of lines in a third manner that is different from the first manner (and, in some embodiments, the second manner and the fourth manner) (e.g., as discussed above in relation to FIGS. 18K-18O) and the computer system shifts a location of the second portion of the first time by modifying the variable thickness in lines in the second set of lines in a fourth manner that is different from the second manner. In some embodiments, the computer system shifts the location of the second portion of the first time by modifying the thickness in lines in the second set of lines in the first manner and the third manner) (e.g., as discussed above in relation to FIGS. 18K-18O). Shifting the sets of lines differently based on different changes in orientation allows the computer system to automatically change how the time is displayed, provides feedback that indicates the movement of the computer system to a user, and provides the user with control over the location at which the plurality of lines (e.g., or the current time) is displayed, which performs an operation when a set of conditions has been met without requiring further user input, provides the user with additional control over the computer system without cluttering the user interface with additional displayed control, reduces the number of inputs needed to move the time, and provides improved visual feedback.

In some embodiments, while displaying the clock user interface that includes the first set of lines (e.g., 1804g-1804n) including the variable thickness in lines in the first set of lines indicating the first portion of the first time and the second set of lines (e.g., 1804h-1804n) including the variable thickness in lines in the second set of lines indicating the second portion of the first time, the computer system detects an input directed to the computer system (e.g., a tap on the display, an actuation of a button and/or a rotatable input mechanism). In some embodiments, in response to detecting the input (e.g., 1850c, 1850e, 1850g-1850i, and/or 1850k1) directed to the computer system, the computer system modifies (e.g., modifying and/or adjusting) (e.g., increasing or decreasing) one or more of the variable thickness in lines in the first set of lines and the variable thickness in lines in the second set of lines (and, in some embodiments, while the variable thickness in lines in the first set of lines continue to indicate the first portion of the first time and while the variable thickness in lines in the second set of lines continue to indicate the second portion of the first time). Modifying one or more of the variable thickness in lines in the first set of lines and the variable thickness in lines in the second set of lines in response to detecting the input directed to the computer system provides the user with control over the location at which and/or how the plurality of lines (e.g., or the current time) is displayed and indicates to a user that an input has been detected, which provides the user with additional control over the computer system without cluttering the user interface with additional displayed control and provides improved visual feedback.

In some embodiments, in response to detecting an end of the input (e.g., 1850c, 1850e, 1850g-1850i, and/or 1850k1) directed to the computer system and after modifying one or more of the variable thickness in lines in the first set of lines (e.g., 1804g-1804n) and the variable thickness in lines in the second set of lines (e.g., 1804h-1804n), the computer system displays (and/or modifying), via the display generation component, the first set of lines with the variable thickness in lines in the first set of lines that lines in the first set of lines had before the input directed to the computer system was detected (e.g., reversing the modification that was made while the input was detected). Displaying the first set of lines with the variable thickness in lines in the first set of lines that lines in the first set of lines had before the input directed to the computer system was detected in response to detecting an end of the input directed to the computer system provides the user with control over the location at which and/or how the plurality of lines (e.g., or the current time) is displayed and indicates to a user that the input is not being detected, which provides the user with additional control over the computer system without cluttering the user interface with additional displayed control and provides improved visual feedback.

In some embodiments, as a part of detecting the input (e.g., 1850c) directed to the computer system the computer system detects a first portion of the input directed to the computer system at a first location (e.g., the input directed to the computer system is a tap input at the first location that is on the first set of lines (or on the second set of lines)). In some embodiments, as a part of modifying one or more of the variable thickness in lines in the first set of lines (e.g., 1804g-1804n) the computer system displays the variable thickness in lines in the first set of lines (or the second set of lines) as being more uniform at a second location (of the first set of lines or the second set of lines) and less uniform at a third location (of the first set of lines or the second set of lines), wherein a distance between the first location and the second location is shorter than the distance between the first location and the third location (e.g., the first location is closer to the second location than the third location). In some embodiments, the second location is between the first location and the third location. In some embodiments, modifying the variable thickness in lines in the second set of lines includes displaying the variable thickness in lines in the second set of lines as being more uniform at a fourth location and less uniform at a fifth location. In some embodiments, the fourth location is closer to the first location than the fifth location. In some embodiments, the variable thickness in a line becomes more uniform near the first location and/or the location of the input). Displaying the variable thickness in lines in the first set of lines as being more uniform at a second location and less uniform at a third location, where a distance between the first location and the second location is shorter than the distance between the first location and the third location (e.g., in response to detecting a first portion of the input directed to the computer system is detected at a first location) allows the computer system to provide feedback to the user regarding where the first portion of the input was detected and provides the user with control over how the plurality of lines (e.g., or the current time) is displayed, which provides the user with additional control over the computer system without cluttering the user interface with additional displayed control and provides improved visual feedback.

In some embodiments, after detecting the first portion of the input directed to the computer system (e.g., 600), the computer system detects a second portion of the input (e.g., 1850e) directed to the computer system, wherein the second portion includes movement corresponding to (e.g., movement of an input element or input device) the input directed to the computer system from the first location to a fourth location. In some embodiments, in response to detecting the second portion of the input that includes movement corresponding to the input directed to the computer system from the first location to the fourth location, the computer system displays a second clock user interface that does not include one or more of the first set of lines (e.g., 1804g-1804n) and the second set of lines (e.g., 1804h-1804n) (e.g., a different clock user interface that is different from the clock user interface that includes the first set of lines and the second set of lines). Displaying a second clock user interface that does not include one or more of the first set of lines and the second set of lines in response to detecting the second portion of the input that includes movement corresponding to the input directed to the computer system from the first location to the fourth location provides the user with control over the user interface to switch between displaying different clock user interface, which provides the user with additional control over the computer system without cluttering the user interface with additional displayed control and provides improved visual feedback.

In some embodiments, the computer system is in communication a hardware element (e.g., 1800a) (e.g., a rotational input mechanism (e.g., a crown) and/or a pressable and/or de-pressable input mechanism (e.g., a button)). In some embodiments, the hardware element is physically and/or electronically coupled to the computer system. In some embodiments, as a part of detecting the input (e.g., 1850g-1850k) directed to the computer system the computer system detects activation of the hardware element. In some embodiments, in response to detecting the input (e.g., 1850g-1850k) directed to the computer system that includes activation of the hardware element, the computer system displays (and/or modifying), via the display generation component, the variable thickness in lines in the first set of lines (e.g., 1804g-1804n) (or the second set of lines) as being more uniform at a location that is closer to an edge of the display generation component (e.g., at a location that is at the edge of the display) than a location that is further away from the edge of the display generation component (e.g., as discussed above in relation to FIGS. 18H and 18J). In some embodiments, the first set of lines become more uniform as one moves from the location that is further away from the edge of the display generation component to the location closer to the edge of the display. In some embodiments, as a part of detecting activation of the hardware element, the computer system detects a rotation of the hardware element. In some embodiments, as a part of detecting activation of the hardware element, the computer system detects that the hardware element has been pressed and/or depressed. Displaying the variable thickness in lines in the first set of lines as being more uniformed at a location that is closer to an edge of the display generation component than a location that is further away from the edge of the display generation component in response to detecting the input directed to the computer system that includes activation of the hardware element allows the computer system to provide feedback to the user regarding the input and provides the user with control over how the plurality of lines (e.g., or the current time) is displayed, which provides the user with additional control over the computer system without cluttering the user interface with additional displayed control and provides improved visual feedback.

In some embodiments, in accordance with a determination that the activation of the hardware element includes a rotation of the hardware element that is in a first direction, the edge of the display generation component at which the variable thickness in lines in the first set of lines (e.g., 1804g-1804n) (or the second set of lines) is more uniform is on a first side of the display generation component (e.g., as discussed above in relation to FIGS. 18G-18K) and in accordance with a determination that the activation of the hardware element includes a rotation of the hardware element that is in a second direction that is different from the first location, the edge of the display generation component at which the variable thickness in lines in the first set of lines (or the second set of lines) is more uniform is on a second side of the display generation component that is different from the first side of the display generation component. In some embodiments, the second side is opposite the first side) (e.g., as discussed above in relation to FIGS. 18G-18K). Displaying the variable thickness in lines in the first set of lines as being more uniform at a location that is closer to an edge that has been choose based on the direction of the input directed to the computer system allows the computer system to provide feedback to the user regarding the input and provides the user with control over how the plurality of lines (e.g., or the current time) is displayed, which provides the user with additional control over the computer system without cluttering the user interface with additional displayed control and provides improved visual feedback.

In some embodiments, after displaying, via the display generation component, the variable thickness in lines in the first set of lines (e.g., 1804g-1804n) (or the second set of lines) as being more uniform at the location that is closer to the edge of the display generation component (e.g., at a location that is at the edge of the display) than the location that is further away from the edge of the display, the computer system detects a portion of the input (e.g., 1850j and/or 1850k1) (e.g., while continuing to detect the input directed to the computer system) directed to the computer system that includes activation of the hardware element. In some embodiments, in response to detecting the portion of the input directed to the computer system that includes activation of the hardware element: in accordance with a determination that a portion of the input (e.g., a second portion of the input) includes the rotation of the hardware element that is in the first direction, the computer system modifies modifying the variable thickness in lines in the first set of lines in a third direction that is based on the first direction (e.g., as discussed above in relation to FIGS. 18G-18K) and in accordance with a determination that the portion of the input includes the rotation of the hardware element that is in the second direction, the computer system modifies the variable thickness in lines in the first set of lines in a fourth direction that is based on the second direction and that is different from the third direction (e.g., as discussed above in relation to FIGS. 18G-18K). In some embodiments, the fourth direction is the second direction (and/or a direction that is opposite of the second direction). In some embodiments, the third direction is the first direction (and/or is a direction that is opposite of the first direction). Modifying the variable thickness in lines in the first set of lines in a direction that is based on the direction of the rotation of the hardware element allows the computer system to provide feedback to the user regarding the input and provides the user with control over how the plurality of lines (e.g., or the current time) is displayed, which provides the user with additional control over the computer system without cluttering the user interface with additional displayed control and provides improved visual feedback.

In some embodiments, while continuing to detect the input directed to the computer system, the computer system provides one or more haptic outputs (e.g., 1860) (e.g., vibrating and/or buzzing outputs) as movement corresponding to the input is detected. Providing one or more haptics as movement corresponding to the input is being detected allows the computer system to provide feedback about the input being detected, which allows user to adjust the input in real time.

In some embodiments, as a part of providing the one or more haptic outputs (e.g., 1860), the computer system: while continuing to detect the input directed to the computer system, detects a first portion of the input (e.g., 1850e, 1850g-1850j, and/or 1850k1) directed to the computer system; in response to detecting the first portion of the input directed to the computer system, provides a first haptic output in conjunction with (e.g., while, before, and/or after) changing the variable thickness in a first respective line (e.g., a line in the first set of lines or the second set of lines) in the plurality of lines (e.g., based on the movement of the first portion of the input) (e.g., as discussed above in relation to FIGS. 18G-18K); and after detecting the first portion of the input directed to the computer system, detects a second portion of the input directed to the computer system, provides a second haptic output in conjunction with (e.g., while, before, and/or after) changing the variable thickness in a second respective line (e.g., a line in the first set of lines or the second set of lines) in the plurality of lines (e.g., based on the movement of the first portion of the input) (e.g., as discussed above in relation to FIGS. 18G-18K). In some embodiments, the first respective line is different from (e.g., is not the same line as) the second respective line. Providing one or more haptics as movement of the input is being detected and as variable thickness in different lines is changed allows the computer system to provide feedback about the input being detected and the impact of the input, which allows user to adjust the input in real time.

In some embodiments, while continuing to detect the input (e.g., 1850e, 1850g-1850j, and/or 1850k1) directed to the computer system that includes activation of the hardware element (e.g., 1800a), the computer system provides one or more audio outputs (e.g., 1860) as movement corresponding to the input is detected (e.g., as discussed above in relation to FIGS. 18G-18K). Providing one or more audio outputs as movement corresponding to the input is detected while continuing to detect the input directed to the computer system that includes activation of the hardware element allows the computer system to provide feedback about the input being detected and the impact of the input, which allows user to adjust the input in real time.

In some embodiments, as providing the one or more audio outputs, the computer system: while continuing to detect the input (e.g., 1850e, 1850g-1850j, and/or 1850k1) directed to the computer system, detects a third portion of the input directed to the computer system; in response to detecting the third portion of the input directed to the computer system, provides a first audio output that corresponds to a first tone in conjunction with changing (e.g., while, before, and/or after) variable thickness in a third respective line (e.g., 1804m-1804o) (e.g., a line in the first set of lines or the second set of lines) in the plurality of lines (e.g., based on movement of the third portion of the input) (e.g., as described above in relation to FIGS. 18G-18K); and after detecting the third portion of the input directed to the computer system, detecting a fourth portion of the input directed to the computer system, provides a second audio output that corresponds to a second tone in conjunction with (e.g., while, before, and/or after) changing variable thickness in a fourth respective line (e.g., 1804*m*-1804*o*) (e.g., a line in the first set of lines or the second set of lines) in the plurality of lines (e.g., based on movement of the fourth portion of the input) (e.g., as described above in relation to FIGS. 18G-18K). In some embodiments, the second tone is different from the first tone, and wherein fourth respective line is different from the third respective line. In some embodiments, the second tone is whole step in tonality and/or a half step in tonality as the first tone. In some embodiments, the first tone and the second tone are tones of the same scale (e.g., major scale, minor scale, and/or pentatonic scale). Providing a first audio output that corresponds to a first tone and a second audio output that corresponds to a second tone that is different from the first tone while continuing to detect the input allows the computer system to provide feedback about the input being detected and the impact of the input on the modification of displayed content (e.g., which portion of time and/or line of color is being changed/modified), which allows user to adjust the input in real time.

In some embodiments, the clock user interface includes a background. In some embodiments, as a part of display the background and in accordance with a determination that a currently selected background color pattern (e.g., user selected background color pattern, using one or more techniques as described above in relation to method 1700) corresponds to a first background color pattern, the computer system displays the background (and/or as) with the first background color pattern. In some embodiments, as a part of display the background and in accordance with a determination that the currently selected background color pattern corresponds to a second background color pattern (e.g., user selected background color pattern, using one or more techniques as described above in relation to method 1700) that is different from the first background color pattern, the computer system displays the background with the second background color pattern. Displaying a background that has a color pattern that is based on a currently selected background color patterns provides the user with additional control options to manipulate and/or customize the display of the clock user interface.

In some embodiments, in accordance with a determination that the currently selected background color pattern corresponds to the first background color pattern (and/or in accordance with a determination that the background has the first background color pattern), the plurality of lines (e.g., the first set of lines and/or second set of lines) are a first set of colors (e.g., each line being at least one color in the set of colors) (e.g., using one or more similar techniques as described above in relation to method 1700 and the foreground user interface elements and/or the foreground color patterns). In some embodiments, in accordance with a determination that the currently selected background color pattern corresponds to the second background color pattern (and/or in accordance with a determination that the background has the second background color pattern), the plurality of lines are a second set of colors that is different from the first set of colors (e.g., using one or more similar techniques as described above in relation to method 1700 and the foreground user interface elements and/or the foreground color patterns). Displaying the plurality of lines with (that include) a respective set of colors that is selected based on the particular color pattern that corresponds to the currently selected pattern allows the computer system to perform an operation based on a user selected preference, which performs an operation when a set of conditions has been met, provides additional control options without cluttering the user interface with additional displayed controls, and provides improved visual feedback to the user.

In some embodiments, the clock user interface includes the background and background is displayed with a third background color pattern. In some embodiments, the computer system is operating in a first mode while displaying the clocker user interface (e.g., as discussed above in relation to FIGS. 18O-18P). In some embodiments, while displaying the clock user interface that includes the background that is displayed with the third background pattern and while the computer system is operating in the first mode, the computer system detects a condition for transitioning (e.g., as described above in relation to method 1700) the computer system (e.g., 600) from operating in the first mode to operate a second mode (e.g., as discussed above in relation to FIGS. 18O-18P), wherein the computer system is configured to use more power while operating in the first mode than the power that is used while the computer system is operating in the second mode. In some embodiments, as a part of detecting the condition for transitioning the computer system from operating in the first mode to operate in the second mode, the computer system detects that a threshold period of time has passed (e.g., 5 seconds-5 minutes) since an input (e.g., a tap input and/or a non-tap input (e.g., a press-and-hold input, a mouse click, a rotation of the computer system's rotatable input mechanism, and/or a pressing of the computer system's hardware button) was detected by the computer system. In some embodiments, as a part of detecting the condition for transitioning the computer system to operate in the second mode, the computer system detects (e.g., via one or more accelerometers and/or gyroscopes) a wrist lowering gesture. In some embodiments, while operating in the second mode, the computer system detects a condition for transitioning the computer system to operate in the first mode. In some embodiments, as a part of detecting the condition for transitioning the computer system to operate in the first mode, the computer system detects one or more inputs (e.g., a tap input and/or a non-tap input (e.g., a press-and-hold input, a mouse click, a rotation of the computer system's rotatable input mechanism, and/or a pressing of the computer system's hardware button) and/or a wrist raise gesture. In some embodiments, as a part of transitioning from the first mode to the second mode, the computer system turns of one or more settings (e.g., a Wi-Fi setting that turns Wi-Fi connectivity on/off, a Bluetooth setting that turns Bluetooth connectivity on/off, a GPS tracking that turns GPS tracking on/off, and/or a battery conservation setting) and/or reduces one or more settings (e.g., a brightness setting and/or a time to be idle before sleeping/hibernating setting). In some embodiments, in response to detecting that the computer system detecting the condition for transitioning the computer system from operating in the first mode to operate a second mode, the computer system transitions the computer system from operating in the first mode to the second mode (e.g., as discussed above in relation to FIGS. 18O-18P), including: in accordance with a determination the third background color pattern is a first color pattern, modifying the background to be displayed with a color pattern that is darker than the third background color pattern (e.g., using one or more similar techniques as described above in relation to method 1700 and the foreground user interface elements and/or the foreground color patterns) (e.g., as discussed above in relation to FIGS. 18O-18P); and in accordance with a determination the third background color pattern is a second color pattern that is different from the first color pattern, forgoing modifying the background to be displayed with a color pattern that is darker than the third background color pattern (e.g., using one or more similar techniques as described above in relation to method 1700 and the foreground user interface elements and/or the foreground color patterns) (e.g., and continuing to display the background with the third background color pattern) (e.g., as discussed above in relation to FIGS. 18O-18P). Choosing whether to modify the third background color pattern to a color pattern that is darker than the third background color pattern as a part of transitioning the computer system from operating in the first mode to the second mode allows the computer system to automatically control the color for various elements of the user interface based on prescribed conditions, where in certain conditions (e.g., such as in a reduced power mode) the computer system is configured to increase battery conservation.

In some embodiments, the plurality of lines is a third set of colors while the computer system is operating in the first mode. In some embodiments, as a part of transitioning the computer system from operating in the first mode to the second mode, the computer system: in accordance with a determination the third background color pattern is the first color pattern, modifies the plurality of lines (e.g., 1804a-1804o) from being the third set of colors to be a fourth set of colors that is different from the third set of colors (e.g., using one or more similar techniques as described above in relation to method 1700 and the foreground user interface elements and/or the foreground color patterns); and in accordance with a determination the third background color pattern is the second color pattern, forgoes modifying the plurality of lines (e.g., 1804a-1804o) from being the third set of colors to be the fourth set of colors (e.g., forgoing modifying the plurality of lines from being the third set of colors at all) (e.g., using one or more similar techniques as described above in relation to method 1700 and the foreground user interface elements and/or the foreground color patterns) (e.g., and continuing to display the background with the color pattern that the background was displayed with while the computer system was operating in the first mode. In some embodiments, some of the plurality of lines are not modified, irrespective of the color pattern being the first color pattern or the second color pattern. Choosing whether to modify the plurality of lines from being the third set of colors to be a fourth set of colors that is different from the third set of colors as a part of transitioning the computer system from operating in the first mode to the second mode allows the computer system to automatically control the color for various elements of the user interface based on prescribed conditions, where in certain conditions (e.g., such as in a reduced power mode) the computer system is configured to increase battery conservation.

In some embodiments, the plurality of lines is displayed with a first brightness level. In some embodiments, transitioning the computer system from operating in the first mode to the second mode includes displaying the plurality of lines with a second brightness level that is less bright than the first brightness level. In some embodiments, in accordance with a determination the third background color pattern is the first color pattern, the computer system displays the plurality of lines with a second brightness level that is less bright than the first brightness level (e.g., using one or more similar techniques as described above in relation to method 1700 and the foreground user interface elements and/or the foreground color patterns). In some embodiments, accordance with a determination the third background color pattern is the second color pattern, the computer system displays the plurality of lines with the first brightness level. Displaying the plurality of lines with a second brightness level that is less bright than the first brightness level as a part of transitioning the computer system from operating in the first mode to the second mode allows the computer system to automatically control the brightness for various elements of the user interface based on prescribed conditions, where in certain conditions (e.g., such as in a reduced power mode) the computer system is configured to increase battery conservation.

In some embodiments, while displaying the clock user interface that includes the first set of lines (e.g., 1804g-1804n) that are displayed with the variable thickness in lines in the first set of lines indicating the first portion of the first time and the second set of lines (e.g., 1804h-1804n) that are displayed with the variable thickness in lines in the second set of lines indicating the first portion of the second time, the computer system detects movement of the computer system (e.g., via an accelerometer or gyroscope that is in communication with the computer system). In some embodiments, in response to detecting movement of the computer system, the computer system modifies one or more of: the variable thickness in lines in the first set of lines indicating the first portion of the first time, such that the first portion of first time moves based on the detected movement of the computer system (e.g., using one or more similar techniques as described above in relation to method 1700 and the foreground user interface elements and/or the foreground color patterns in response to movement of the computer system and/or indications of time) (e.g., as discussed above in relation to FIGS. 18O-18P); and the variable thickness in lines in the second set of lines (e.g., 1804h-1804n) indicating the second portion of the first time, such that the second portion of second time moves based on the detected movement of the computer system (e.g., using one or more similar techniques as described above in relation to method 1700 and the foreground user interface elements and/or the foreground color patterns in response to movement of the computer system and/or indications of time) (e.g., as discussed above in relation to FIGS. 18O-18P). Modifying the variable thickness in lines in the first set of lines indicating the first portion of the first time, such that the first portion of first time moves based on the detected movement of the computer system, and/or modifying the variable thickness in lines in the second set of lines indicating the second portion of the first time, such that a portion of the second time moves based on the detected movement of the computer system, in response to detecting movement of the computer system allows the computer system to automatically change how the time is displayed, provides feedback that indicates the movement of the computer system to a user, and provides the user with control over the location at which the plurality of lines (e.g., or the current time) is displayed, which performs an operation when a set of conditions has been met without requiring further user input, provides the user with additional control over the computer system without cluttering the user interface with additional displayed control, reduces the number of inputs needed to move the time, and provides improved visual feedback.

In some embodiments, the movement of the computer system includes lateral movement. In some embodiments, in response to detecting the movement (e.g., 1850*k*) (e.g., lateral movement) of the computer system, one or more of: the variable thickness in lines in the first set of lines (e.g., 1804*g*-1804*n*) indicating the first portion of the first time is modified, such that the first portion of first time moves laterally based on the lateral movement of the computer system (e.g., in the direction of and/or opposite of the lateral movement); and the variable thickness in lines in the second set of lines (e.g., 1804*h*-1804*n*) indicating the second portion of the first time is modified, such that the second portion of the second time moves laterally based on the lateral movement of the computer system (e.g., in the direction of and/or opposite of the lateral movement). Modifying the variable thickness in lines in the first set of lines indicating the first portion of the first time, such that the first portion of first time moves laterally, and/or modifying the variable thickness in lines in the second set of lines indicating the second portion of the first time, such that a portion of the second time moves laterally, in response to detecting lateral movement of the computer system allows the computer system to automatically change how the time is displayed, provides feedback that indicates the movement of the computer system to a user, and provides the user with control over the location at which the plurality of lines (e.g., or the current time) is displayed, which performs an operation when a set of conditions has been met without requiring further user input, provides the user with additional control over the computer system without cluttering the user interface with additional displayed control, reduces the number of inputs needed to move the time, and provides improved visual feedback.

In some embodiments, the movement (e.g., 1850*m*) of the computer system includes a rotation of the computer system. In some embodiments, in response to detecting the movement (e.g., rotational movement) of the computer system, one or more of: the variable thickness in lines in the first set of lines (e.g., 1804*g*-1804*n*) indicating the first portion of the first time is modified, such that the first portion of first time rotates based on the rotation of the computer system (e.g., in the direction of the detected rotational movement or opposite of the detected rotational input); and the variable thickness in lines in the second set of lines (e.g., 1804*h*-1804*n*) indicating the second portion of the first time is modified, such that the second portion of the second time rotates based on the rotation of the computer system (e.g., in the direction of the detected rotational movement or opposite of the detected rotational input). In some embodiments, in response to detecting the movement of the computer system, the variable thickness of the first set of lines is modified by a first amount and the variable thickness of the second set of lines is modified by a second amount that is different from the first amount. In some embodiments, in response to detecting the movement of the computer system, the variable thickness of the first set of lines is modified by the first amount and the variable thickness of the second set of lines is modified by the second amount (or the first amount), such that the first portion of first time and the second portion of the second time rotate in the same direction and/or in a different direction. Modifying the variable thickness in lines in the first set of lines indicating the first portion of the first time, such that the first portion of first time rotates, and/or modifying the variable thickness in lines in the second set of lines indicating the second portion of the first time, such that a portion of the second time rotates, in response to detecting rotational of the computer system allows the computer system to automatically change how the time is displayed, provides feedback that indicates the movement of the computer system to a user, and provides the user with control over the location at which the plurality of lines (e.g., or the current time) is displayed, which performs an operation when a set of conditions has been met without requiring further user input, provides the user with additional control over the computer system without cluttering the user interface with additional displayed control, reduces the number of inputs needed to move the time, and provides improved visual feedback.

In some embodiments, while modifying one or more of the variable thickness in lines in the first set of lines (e.g., 1804*g*-1804*n*) indicating the first portion of the first time (e.g., such that the first portion of first time moves based on the detected movement of the computer system) and the variable thickness in lines in the second set of lines (e.g., 1804*h*-1804*n*) indicating the second portion of the first time (e.g., such that the second portion of second time moves based on the detected movement of the computer system), the computer system detects a condition for transitioning (e.g., as described above in relation to the condition for transiting the computer system from operating in the first mode to operate in the second mode) the computer system from operating in a third mode to operate a fourth mode. In some embodiments, the computer system is configured to use more power while operating in the third mode than the power that is used while the computer system is operating in the fourth mode (e.g., as described in relation to FIGS. 18P-18Q). In some embodiments, in response to detecting the condition for transitioning the computer system from operating in the third mode to operate in the fourth mode (e.g., as described in relation to FIGS. 18P-18Q), the computer system: transitions from operating in the third mode to operate in the fourth mode (e.g., as described in relation to FIGS. 18P-18Q); and decreasing one or more of: a rate of change of the variable thickness in lines in the first set of lines indicating the first portion of the first time (e.g., as described in relation to FIGS. 18P-18Q); and a rate of change of the variable thickness in lines in the second set of lines indicating the second portion of the first time (e.g., as described in relation to FIGS. 18P-18Q). In some embodiments, in response to detecting the request to transition from operating in the third mode to operate in the fourth mode, the computer system stops modifying the variable thickness in lines in the first set of lines indicating the first portion of the first time and/or modifying the variable thickness in lines in the second set of lines indicating the second portion of the first time. Decreasing the rate of change in variable thickness in lines in response to detecting the request to transition from operating in the third mode to operate in the fourth mode allows the computer system to automatically increase the amount of energy being conserved by the computer system when the computer system is operating in the fourth mode, which performs an operation when a set of conditions has been met and provides improved visual feedback.

In some embodiments, in response to detecting the request to transition from operating in the third mode to operate in the fourth mode, the computer system displays an animation that includes one or more of: modifying the variable thickness in lines in the first set of lines (e.g., 1804*g*-1804*n*) indicating the first portion of the first time, such that the first portion of the first time is moved to a default position (e.g., for the fourth mode) (e.g., the same target position and/or state for every low power mode) that corresponds to the first portion of the current time (e.g., on the display generation component) (e.g., as described in relation to FIGS. 18P-18Q); and modifying the variable thickness in lines in the second set of lines (e.g., 1804*h*-

1804*n*) indicating the second portion of the first time, such that the second portion of the first time is moved to a default position (e.g., for the fourth mode) that corresponds to the second portion of the current time (e.g., on the display generation component) (e.g., as described in relation to FIGS. 18P-18Q). Displaying the animation that includes one or more of modifying the variable thickness one or more of the plurality of times, such that the first portion of the first time and/or second portion of time is moved to a default position that corresponds to the first portion of the current time provide feedback to the user indicating that the computer system has been transitioned into operating into the new mode (e.g., a reduce power consumption mode), which performs an operation when a set of conditions has been met and provides improved visual feedback.

Note that details of the processes described above with respect to method 1900 (e.g., FIG. 19) are also applicable in an analogous manner to the methods described herein. For example, methods 700, 900, 1100, 1300, 1500, and 1700 optionally includes one or more of the characteristics of the various methods described above with reference to method 1900. For example, method 1900 optionally includes one or more of the characteristics of the various methods described above with reference to method 700. For example, displaying a clock user interface as described with respect to method 1900 optionally includes displaying a simulated light effect as described with reference to method 700. For another example, method 1900 optionally includes one or more of the characteristics of the various methods described above with reference to method 900. For example, displaying a clock user interface as described with respect to method 1900 optionally includes displaying an astronomical object as described with reference to method 900. As another example, method 1900 optionally includes one or more of the characteristics of the various methods described above with reference to method 1100. For another example, method 1900 optionally includes one or more of the characteristics of the various methods described above with reference to method 1300. For example, displaying a clock user interface as described with respect to method 1900 optionally includes displaying a time indication with a first set of style options, and in response to detecting the set of one or more inputs, displaying the time indication with a second set of style options as described with reference to method 1100. For example, displaying a clock user interface as described with respect to method 1900 optionally includes displaying a first calendar system and a second calendar system as described with reference to method 1300. For brevity, these details are not repeated below.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

As described above, one aspect of the present technology is the gathering and use of data available from various sources to improve the delivery to users of clock user interfaces. The present disclosure contemplates that in some instances, this gathered data may include personal information data that uniquely identifies or can be used to contact or locate a specific person. Such personal information data can include demographic data, location-based data, telephone numbers, email addresses, twitter IDs, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to deliver clock user interfaces that are of greater interest to the user. Accordingly, use of such personal information data enables users to have calculated control of the delivered content. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of clock user interfaces, the present technology can be configured to allow users to select to "opt in" or "opt out" of participation in the collection of personal information data during registration for services or anytime thereafter. In another example, users can select not to provide mood-associated data for clock user interfaces services. In yet another example, users can select to limit the length of user interface data is maintained or entirely prohibit the development of a baseline user interface profile. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the clock user interface services, or publicly available information.

What is claimed is:

1. A computer system configured to communicate with a display generation component and one or more input devices, comprising:
    one or more processors; and
    memory storing one or more programs configured to be executed by the one or more processors, the one or more programs including instructions for:
        receiving, via the one or more input devices, a request to display a clock user interface; and
        in response to receiving the request to display the clock user interface, displaying, via the display generation component, the clock user interface, including concurrently displaying:
            a first visual effect portion that includes simulated emitted light that indicates a position of a first user interface region in the clock user interface, wherein the position and/or shape of the first user interface region indicates a first unit of a current time of day;
            a second visual effect portion that is based on the simulated emitted light from the first visual effect portion and a position of the first user interface region relative to a position of a second user interface region, wherein the second user interface region is different from the first user interface region, and wherein the position and/or shape of the second user interface region indicates a second unit of the current time of day different from the first unit of the current time of day;
            wherein in accordance with a determination that the current time of day is a first time of day, the first visual effect portion is displayed with a first size and the second visual effect portion is displayed with a second size, wherein the first size is larger than the second size; and
            wherein in accordance with a determination that the current time of day is a second time of day different from the first time of day, the first visual effect portion is displayed with a third size and the second visual effect portion is displayed with a fourth size, wherein the third size is smaller than the fourth size.

2. The computer system of claim 1, the one or more programs further including instructions for:
    displaying a third visual effect portion that includes a combination of the simulated emitted light that indicates the position of the first user interface region and other simulated emitted light.

3. The computer system of claim 1, wherein the second user interface region blocks the simulated emitted light.

4. The computer system of claim 1, wherein the first user interface region is a same color as a background of the clock user interface.

5. The computer system of claim 1, wherein the second user interface region is a same color as a background of the clock user interface.

6. The computer system of claim 1, the one or more programs further including instructions for:
    in accordance with the current time being a first time, the first user interface region has a first position; and
    in accordance with the current time being a second time, the first user interface region has a second position.

7. The computer system of claim 1, wherein the simulated emitted light is emitted from a first edge of the first user interface region and not from a second edge of the first user interface region.

8. The computer system of claim 1, wherein the simulated emitted light has a simulated height relative to a background of the clock user interface and illuminates the background of the clock user interface.

9. The computer system of claim 1, wherein:
    the simulated emitted light is based on a first simulated emitted light source and a second simulated emitted light source;
    the first simulated emitted light source of the simulated emitted light includes light of a first color; and
    the second simulated emitted light source of the simulated emitted light includes light of a second color different from the first color.

10. The computer system of claim 1, wherein the first user interface region includes one or more cutouts.

11. The computer system of claim 1, wherein:
    displaying the clock user interface includes displaying, via the display generation component, a third visual effect portion that includes simulated emitted light that indicates a position of the second user interface region;
    the simulated emitted light that indicates the position of the first user interface region includes a first color; and
    the simulated emitted light that indicates the position of the second user interface region includes a second color different from the first color.

12. The computer system of claim 1, wherein;
displaying the clock user interface includes displaying, via the display generation component, a third visual effect portion that includes simulated emitted light that indicates a position of the second user interface region;
the simulated emitted light that indicates the position of the first user interface region is emitted from a from an edge of the first user interface region; and
the simulated emitted light that indicates the position of the second user interface region is emitted from an edge of the second user interface region, wherein the edge of the first user interface region is opposite the edge of the second user interface region relative to the clock user interface.

13. The computer system of claim 12, wherein the edge of the first user interface region faces towards the edge of the second user interface region.

14. The computer system of claim 12, wherein the edge of the first user interface region faces away from the edge of the second user interface region.

15. The computer system of claim 12, wherein a position of the edge of the first user interface region and a position of the edge of the second user interface region are based on the current time of day.

16. The computer system of claim 1, wherein displaying the clock user interface includes:
displaying simulated emitted light that indicates the position of the first user interface region and simulated emitted light that indicates a position of a third user interface region such that the simulated emitted light that indicates the position of the first user interface region and the simulated emitted light that indicates the position of the third user interface region are divided by a fourth user interface region, wherein the position and/or shape of the fourth user interface region indicates the current time of day.

17. The computer system of claim 16, wherein the fourth user interface region prevents mixing of the simulated emitted light that indicates the position of the first user interface region and the simulated emitted light that indicates the position of the third user interface region.

18. The computer system of claim 16, the one or more programs further including instructions for:
in response to a determination that a predetermined condition is met:
displaying simulated emitted light that indicates the position of the first user interface region and simulated emitted light that indicates a position of the third user interface region such that the simulated emitted light that indicates the position of the first user interface region is mixed with the simulated emitted light that indicates the position of the third user interface region.

19. The computer system of claim 16, wherein displaying the clock user interface includes:
in accordance with a determination that the current time of day is a first time of day, the fourth user interface region has a first position; and
in accordance with a determination that the current time of day is a second time of day different from the first time of day, the fourth user interface region has a second position, wherein the fourth user interface region overlaps less of the first visual effect portion in the second position than in the first position.

20. The computer system of claim 16, wherein the first user interface region has a first point and a second point and wherein the fourth user interface region blocks more light at the first point of the first user interface region than at the second point of the first user interface region.

21. A method, comprising:
at a computer system that is in communication with a display generation component and one or more input devices:
receiving, via the one or more input devices, a request to display a clock user interface; and
in response to receiving the request to display the clock user interface, displaying, via the display generation component, the clock user interface, including concurrently displaying:
a first visual effect portion that includes simulated emitted light that indicates a position of a first user interface region in the clock user interface, wherein the position and/or shape of the first user interface region indicates a first unit of a current time of day;
a second visual effect portion that is based on the simulated emitted light from the first visual effect portion and a position of the first user interface region relative to a position of a second user interface region, wherein the second user interface region is different from the first user interface region, and wherein the position and/or shape of the second user interface region indicates a second unit of the current time of day different from the first unit of the current time of day;
wherein in accordance with a determination that the current time of day is a first time of day, the first visual effect portion is displayed with a first size and the second visual effect portion is displayed with a second size, wherein the first size is larger than the second size; and
wherein in accordance with a determination that the current time of day is a second time of day different from the first time of day, the first visual effect portion is displayed with a third size and the second visual effect portion is displayed with a fourth size, wherein the third size is smaller than the fourth size.

22. The method of claim 21, further comprising:
displaying a third visual effect portion that includes a combination of the simulated emitted light that indicates the position of the first user interface region and other simulated emitted light.

23. The method of claim 21, wherein the second user interface region blocks the simulated emitted light.

24. The method of claim 21, wherein the first user interface region is a same color as a background of the clock user interface.

25. The method of claim 21, wherein the second user interface region is a same color as a background of the clock user interface.

26. The method of claim 21, further comprising:
in accordance with the current time being a first time, the first user interface region has a first position; and
in accordance with the current time being a second time, the first user interface region has a second position.

27. The method of claim 21, wherein the simulated emitted light is emitted from a first edge of the first user interface region and not from a second edge of the first user interface region.

28. The method of claim 21, wherein the simulated emitted light has a simulated height relative to a background of the clock user interface and illuminates the background of the clock user interface.

29. The method of claim 21, wherein:
the simulated emitted light is based on a first simulated emitted light source and a second simulated emitted light source;
the first simulated emitted light source of the simulated emitted light includes light of a first color; and
the second simulated emitted light source of the simulated emitted light includes light of a second color different from the first color.

30. The method of claim 21, wherein the first user interface region includes one or more cutouts.

31. The method of claim 21, wherein:
displaying the clock user interface includes displaying, via the display generation component, a third visual effect portion that includes simulated emitted light that indicates a position of the second user interface region;
the simulated emitted light that indicates the position of the first user interface region includes a first color; and
the simulated emitted light that indicates the position of the second user interface region includes a second color different from the first color.

32. The method of claim 21, wherein:
displaying the clock user interface includes displaying, via the display generation component, a third visual effect portion that includes simulated emitted light that indicates a position of the second user interface region;
the simulated emitted light that indicates the position of the first user interface region is emitted from a from an edge of the first user interface region; and
the simulated emitted light that indicates the position of the second user interface region is emitted from an edge of the second user interface region, wherein the edge of the first user interface region is opposite the edge of the second user interface region relative to the clock user interface.

33. The method of claim 32, wherein the edge of the first user interface region faces towards the edge of the second user interface region.

34. The method of claim 32, wherein the edge of the first user interface region faces away from the edge of the second user interface region.

35. The method of claim 32, wherein a position of the edge of the first user interface region and a position of the edge of the second user interface region are based on the current time of day.

36. The method of claim 21, wherein displaying the clock user interface includes:
displaying simulated emitted light that indicates the position of the first user interface region and simulated emitted light that indicates a position of a third user interface region such that the simulated emitted light that indicates the position of the first user interface region and the simulated emitted light that indicates the position of the third user interface region are divided by a fourth user interface region, wherein the position and/or shape of the fourth user interface region indicates the current time of day.

37. The method of claim 36, wherein the fourth user interface region prevents mixing of the simulated emitted light that indicates the position of the first user interface region and the simulated emitted light that indicates the position of the third user interface region.

38. The method of claim 36, further comprising:
in response to a determination that a predetermined condition is met:
displaying simulated emitted light that indicates the position of the first user interface region and simulated emitted light that indicates a position of the third user interface region such that the simulated emitted light that indicates the position of the first user interface region is mixed with the simulated emitted light that indicates the position of the third user interface region.

39. The method of claim 36, wherein displaying the clock user interface includes:
in accordance with a determination that the current time of day is a first time of day, the fourth user interface region has a first position; and
in accordance with a determination that the current time of day is a second time of day different from the first time of day, the fourth user interface region has a second position, wherein the fourth user interface region overlaps less of the first visual effect portion in the second position than in the first position.

40. The method of claim 36, wherein the first user interface region has a first point and a second point and wherein the fourth user interface region blocks more light at the first point of the first user interface region than at the second point of the first user interface region.

41. The method of claim 21, further comprising:
displaying a third visual effect portion that is based on the simulated emitted light from the first visual effect portion and a position of the first user interface region relative to a position of a third user interface region, wherein the third user interface region is different from the first user interface region and the second user interface region.

42. The method of claim 41, wherein the third user interface region represents a time marker.

43. The method of claim 41, wherein the third user interface region includes a user interface element associated with an application and the simulated emitted light does not affect a visual appearance of the third user interface region.

44. A non-transitory computer-readable storage medium storing one or more programs configured to be executed by one or more processors of a computer system that is in communication with a display generation component and one or more input devices, the one or more programs including instructions for:
receiving, via the one or more input devices, a request to display a clock user interface; and
in response to receiving the request to display the clock user interface, displaying, via the display generation component, the clock user interface, including concurrently displaying:
a first visual effect portion that includes simulated emitted light that indicates a position of a first user interface region in the clock user interface, wherein the position and/or shape of the first user interface region indicates a first unit of a current time of day;
a second visual effect portion that is based on the simulated emitted light from the first visual effect portion and a position of the first user interface region relative to a position of a second user interface region, wherein the second user interface region is different from the first user interface region, and wherein the position and/or shape of the second user interface region indicates a second unit of the current time of day different from the first unit of the current time of day;
wherein in accordance with a determination that the current time of day is a first time of day, the first visual effect portion is displayed with a first size and the second visual effect portion is displayed with a second size, wherein the first size is larger than the second size; and
wherein in accordance with a determination that the current time of day is a second time of day different from the first time of day, the first visual effect portion is displayed with a third size and the second visual effect portion is displayed with a fourth size, wherein the third size is smaller than the fourth size.

45. The computer system of claim 1, the one or more programs further including instructions for:
displaying a third visual effect portion that is based on the simulated emitted light from the first visual effect portion and a position of the first user interface region relative to a position of a third user interface region, wherein the third user interface region is different from the first user interface region and the second user interface region.

46. The computer system of claim 45, wherein the third user interface region represents a time marker.

47. The computer system of claim 45, wherein the third user interface region includes a user interface element associated with an application and the simulated emitted light does not affect a visual appearance of the third user interface region.

48. The non-transitory computer-readable storage medium of claim 44, the one or more programs further including instructions for:
displaying a third visual effect portion that includes a combination of the simulated emitted light that indicates the position of the first user interface region and other simulated emitted light.

49. The non-transitory computer-readable storage medium of claim 44, wherein the second user interface region blocks the simulated emitted light.

50. The non-transitory computer-readable storage medium of claim 44, wherein the first user interface region is a same color as a background of the clock user interface.

51. The non-transitory computer-readable storage medium of claim 44, wherein the second user interface region is a same color as a background of the clock user interface.

52. The non-transitory computer-readable storage medium of claim 44, the one or more programs further including instructions for:
in accordance with the current time being a first time, the first user interface region has a first position; and
in accordance with the current time being a second time, the first user interface region has a second position.

53. The non-transitory computer-readable storage medium of claim 44, wherein the simulated emitted light is emitted from a first edge of the first user interface region and not from a second edge of the first user interface region.

54. The non-transitory computer-readable storage medium of claim 44, wherein the simulated emitted light has a simulated height relative to a background of the clock user interface and illuminates the background of the clock user interface.

55. The non-transitory computer-readable storage medium of claim 44, wherein:
the simulated emitted light is based on a first simulated emitted light source and a second simulated emitted light source;
the first simulated emitted light source of the simulated emitted light includes light of a first color; and
the second simulated emitted light source of the simulated emitted light includes light of a second color different from the first color.

56. The non-transitory computer-readable storage medium of claim 44, wherein the first user interface region includes one or more cutouts.

57. The non-transitory computer-readable storage medium of claim 44, wherein:
displaying the clock user interface includes displaying, via the display generation component, a third visual effect portion that includes simulated emitted light that indicates a position of the second user interface region;
the simulated emitted light that indicates the position of the first user interface region includes a first color; and
the simulated emitted light that indicates the position of the second user interface region includes a second color different from the first color.

58. The non-transitory computer-readable storage medium of claim 44, wherein:
displaying the clock user interface includes displaying, via the display generation component, a third visual effect portion that includes simulated emitted light that indicates a position of the second user interface region;
the simulated emitted light that indicates the position of the first user interface region is emitted from a from an edge of the first user interface region; and
the simulated emitted light that indicates the position of the second user interface region is emitted from an edge of the second user interface region, wherein the edge of the first user interface region is opposite the edge of the second user interface region relative to the clock user interface.

59. The non-transitory computer-readable storage medium of claim 58, wherein the edge of the first user interface region faces towards the edge of the second user interface region.

60. The non-transitory computer-readable storage medium of claim 58, wherein the edge of the first user interface region faces away from the edge of the second user interface region.

61. The non-transitory computer-readable storage medium of claim 58, wherein a position of the edge of the first user interface region and a position of the edge of the second user interface region are based on the current time of day.

62. The non-transitory computer-readable storage medium of claim 44, wherein displaying the clock user interface includes:
displaying simulated emitted light that indicates the position of the first user interface region and simulated emitted light that indicates a position of a third user interface region such that the simulated emitted light that indicates the position of the first user interface region and the simulated emitted light that indicates the position of the third user interface region are divided by a fourth user interface region, wherein the position and/or shape of the fourth user interface region indicates the current time of day.

63. The non-transitory computer-readable storage medium of claim 62, wherein the fourth user interface region prevents mixing of the simulated emitted light that indicates the position of the first user interface region and the simulated emitted light that indicates the position of the third user interface region.

64. The non-transitory computer-readable storage medium of claim 62, the one or more programs further including instructions for:

in response to a determination that a predetermined condition is met:
displaying simulated emitted light that indicates the position of the first user interface region and simulated emitted light that indicates a position of the third user interface region such that the simulated emitted light that indicates the position of the first user interface region is mixed with the simulated emitted light that indicates the position of the third user interface region.

65. The non-transitory computer-readable storage medium of claim 62, wherein displaying the clock user interface includes:
in accordance with a determination that the current time of day is a first time of day, the fourth user interface region has a first position; and
in accordance with a determination that the current time of day is a second time of day different from the first time of day, the fourth user interface region has a second position, wherein the fourth user interface region overlaps less of the first visual effect portion in the second position than in the first position.

66. The non-transitory computer-readable storage medium of claim 62, wherein the first user interface region has a first point and a second point and wherein the fourth user interface region blocks more light at the first point of the first user interface region than at the second point of the first user interface region.

67. The non-transitory computer-readable storage medium of claim 44, the one or more programs further including instructions for:
displaying a third visual effect portion that is based on the simulated emitted light from the first visual effect portion and a position of the first user interface region relative to a position of a third user interface region, wherein the third user interface region is different from the first user interface region and the second user interface region.

68. The non-transitory computer-readable storage medium of claim 67, wherein the third user interface region represents a time marker.

69. The non-transitory computer-readable storage medium of claim 67, wherein the third user interface region includes a user interface element associated with an application and the simulated emitted light does not affect a visual appearance of the third user interface region.

* * * * *

UNITED STATES PATENT AND TRADEMARK OFFICE
CERTIFICATE OF CORRECTION

| | | |
|---|---|---|
| PATENT NO. | : 12,045,014 B2 | |
| APPLICATION NO. | : 17/949081 | |
| DATED | : July 23, 2024 | |
| INVENTOR(S) | : Aurelio Guzman et al. | |

It is certified that error appears in the above-identified patent and that said Letters Patent is hereby corrected as shown below:

In the Claims

In Column 171, Line 1, Claim 12, delete "wherein;" and insert -- wherein: --, therefor.

Signed and Sealed this
Third Day of September, 2024

Katherine Kelly Vidal
*Director of the United States Patent and Trademark Office*